United States Patent
Phillips et al.

(10) Patent No.: US 10,904,375 B2
(45) Date of Patent: Jan. 26, 2021

(54) USER INTERFACES FOR SUBSCRIPTION APPLICATIONS

(71) Applicant: Apple Inc., Cupertino, CA (US)

(72) Inventors: Joseph Stanley Phillips, San Francisco, CA (US); Joseph Andrew Magnani, San Francisco, CA (US); Michael Evashevski, San Francisco, CA (US); Alex Rofman, Palo Alto, CA (US); Ann M. Thai, San Carlos, CA (US); Monika E. Gromek, Oakland, CA (US); Colin Bennett, San Francisco, CA (US); Terry Y. Liu, San Francisco, CA (US); Sonja Waskan-Lui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/585,542

(22) Filed: Sep. 27, 2019

(65) Prior Publication Data
US 2020/0302512 A1   Sep. 24, 2020

Related U.S. Application Data

(60) Provisional application No. 62/822,944, filed on Mar. 24, 2019, provisional application No. 62/820,130, filed on Mar. 18, 2019.

(51) Int. Cl.
*G06Q 30/06* (2012.01)
*H04M 1/725* (2006.01)
(Continued)

(52) U.S. Cl.
CPC ...... *H04M 1/72544* (2013.01); *G06F 3/0482* (2013.01); *G06F 3/0483* (2013.01);
(Continued)

(58) Field of Classification Search
CPC .................................................. G06G 30/06–08
(Continued)

(56) References Cited

U.S. PATENT DOCUMENTS 6,323,846 B1    11/2001  Westerman et al.
6,570,557 B1    5/2003  Westerman et al.
(Continued)

FOREIGN PATENT DOCUMENTS

WO    2013/169849 A2    11/2013
WO    2014/105276 A1    7/2014

OTHER PUBLICATIONS

IOS6 App Store, IDB video, available at: https://www.youtube.com/watch?v=jXCrM1rzLZY, Jun. 11, 2012 (hereafter IDB). (Year: 2012).*

(Continued)

*Primary Examiner* — Ming Shui
(74) *Attorney, Agent, or Firm* — Kubota & Basol LLP

(57) ABSTRACT

In some embodiments, an electronic device presents user interfaces of the application store that are specific to a respective application. In some embodiments, an electronic device presents application store user interfaces that include information about applications in a respective category. In some embodiments, an electronic device presents application store user interfaces for accessing a respective category of applications. In some embodiments, an electronic device presents a visual indication of a number of application updates that are available in an application store user interface. In some embodiments, an electronic device presents user interfaces for launching and removing a respective application. In some embodiments, an electronic device presents user interfaces of a generic application store and a dedicated application store for a respective category of
(Continued)

applications. In some embodiments, an electronic device presents notifications of the completion of a download.

30 Claims, 219 Drawing Sheets

(51) Int. Cl.
    *G06F 3/0488*      (2013.01)
    *G06F 3/0481*      (2013.01)
    *G06F 3/0485*      (2013.01)
    *G06F 3/0482*      (2013.01)
    *G06F 3/0483*      (2013.01)
    *G06Q 20/12*      (2012.01)

(52) U.S. Cl.
    CPC ........ *G06F 3/0485* (2013.01); *G06F 3/04817* (2013.01); *G06F 3/04886* (2013.01); *G06Q 30/0635* (2013.01); *G06Q 30/0641* (2013.01); *G06Q 20/12* (2013.01)

(58) Field of Classification Search
    USPC .............................................. 705/26.1–27.2
    See application file for complete search history.

(56) References Cited

U.S. PATENT DOCUMENTS

| | | | |
|---|---|---|---|
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 8,743,151 | B1* | 6/2014 | Fulcher ............... G06F 3/04817 345/684 |
| 9,348,458 | B2 | 5/2016 | Hotelling et al. |
| 9,933,937 | B2 | 4/2018 | Lemay et al. |
| 2002/0015024 | A1 | 2/2002 | Westerman et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2009/0307105 | A1* | 12/2009 | Lemay ................ G06F 3/04817 705/26.1 |
| 2011/0010759 | A1* | 1/2011 | Adler ...................... G06F 21/10 726/4 |
| 2013/0169546 | A1 | 7/2013 | Thomas et al. |
| 2014/0236846 | A1* | 8/2014 | Melika ................. G06Q 50/184 705/310 |
| 2015/0033132 | A1* | 1/2015 | Zhang ............... H04M 1/72522 715/733 |
| 2015/0113605 | A1 | 4/2015 | Henderson et al. |
| 2015/0186621 | A1 | 7/2015 | Uy et al. |
| 2015/0281795 | A1 | 10/2015 | Mcelhatten et al. |
| 2016/0316244 | A1 | 10/2016 | Biagini et al. |
| 2018/0293573 | A1 | 10/2018 | Ortiz et al. |
| 2020/0302513 | A1 | 9/2020 | Phillips et al. |
| 2020/0304626 | A1 | 9/2020 | Phillips et al. |

OTHER PUBLICATIONS

Apple unveils all-new App Store, press release, available at: https://www.apple.com/newsroom/2017/06/apple-unveils-all-new-app-store/, Jun. 5, 2017 (Year: 2017).*
How to Optimize Apple Store Preview Videos, Rachel Wilson, available at: https://www.mobileaction.co/blog/app-store-optimization/optimize-apple-app-store-preview-videos/, Nov. 15, 2016 (Year: 2015).*
How to Make the Most of your app store preview and promo videos, Maja Sinkovec, available at: https://appradar.com/academy/bonus-chapters/app-preview-ios-and-google-play/, Mar. 5, 2019 (Year: 2019).*
Surlatable.com, NPL, printed Feb. 24, 2020; (Year: 2020).*
Xbox Game Pass Walkthrough, https://www.youtube.com/watch?v=t3fDMJxVziY, May 24, 2017. (Year: 2017).*
Non-Final Office Action received for U.S. Appl. No. 16/585,555, dated Mar. 9, 2020, 13 pages.
Non-Final Office Action received for U.S. Appl. No. 16/585,569, dated Mar. 9, 2020, 17 pages.
4WD Tech, "Angry Birds Stella Gameplay iOS iPhone & iPad HD", YouTube, Available online at: <https://www.youtube.com/watch?v=MQllrnO8pag>, Sep. 11, 2014, 3 pages.
Anas KC,"How to Buy app in the Google Play Store?", YouTube, Available online at: <https://www.youtube.com/watch?v=YreW1yxukVg>, Jun. 29, 2016, 1 page.
Android Developers,"Grow and Optimize your Subscriptions with New Google Play Features", YouTube, Available online at: <https://www.youtube.com/watch?v=x1AYelepG6o>, May 8, 2018, 1 page.
Boxall, Andy, "Google's $5 Play Pass will Make all the Apps you Want from the Play Store Free", Digital Trends, Available online at: <https://www.digitaltrends.com/mobile/google-play-pass-test-news/>, Aug. 1, 2019, 7 pages.
Brennan's Tech Bite,"New Hulu Plus App for iPad, iPhone, iPod Touch", YouTube, Available online at: <https://www.youtube.com/watch?v=g0dtlpRgHyM, Jun. 30, 2010, 2 pages.
GAMERZR,"Please Help Explain Humble Bundle to Me", Tom's Hardware Forum, Available online at: <https://forums.tomshardware.com/threads/please-help-explain-humble-bundle-to-me.1454313/>, Aug. 13, 2013, 4 pages.
No Filter Reviews,"How to Cancel Play Store Subscriptions", YouTube, Available online at: <https://www.youtube.com/watch?v=ZZA-5fWhoys>, Feb. 8, 2019, 1 page.
Padhiyar, Jingesh, "How to Purchase Apps with Apple Pay on iPhone or iPad", iGEEKSBLOG, Available online at: <https://www.igeeksblog.com/how-to-purchase-apps-with-apple-pay/>, Apr. 16, 2015, 2 pages.
The Macudotcom,"How to Manage App Store Purchases & Subscriptions on iPad, iPhone & Mac", YouTube, Available online at: <https://www.youtube.com/watch?v=AWgVbg4Vc24>, Dec. 13, 2016, 1 page.
Weiler, Lauren, "How Many People Can Stream Videos at Once on Hulu, Netflix, and Amazon Prime?", Showbiz Cheat Sheet, Available online at: <https://www.cheatsheet.com/entertainment/how-many-people-can-stream-videos-at-once-on-hulu-netflix-and-amazon-prime.html/>, Jul. 25, 2018, 3 pages.
Corrected Notice of Allowability received for U.S. Appl. No. 16/585,569, dated Sep. 30, 2020, 5 pages.
Notice of Allowance received for U.S. Appl. No. 16/585,569, dated Aug. 11, 2020, 8 pages.
Notice of Allowance received for U.S. Appl. No. 16/585,555, dated Aug. 12, 2020, 8 pages.
Search Report and Opinion received for Danish Patent Application No. PA 202070127, dated Oct. 8, 2020, 9 pages.
Microsoft, "Xbox One game store", Retrieved from:<https://web.archive.org/web/20190125020741/https:/www. xbox.com/en-us/games/xbox-one?xr=shellnav> (Jan. 25, 2019), printed on Nov. 10, 2020, 10 pages.
Microsoft, "Xbox One game store- theHunter: Call of the Wild", Retrieved from: <https://web.archive.org/web/20190130084018/https:/www.microsoft.com/en-us/p/thehunter-call-of-the-wild/bxbjq1932138> (Jan. 30, 2019), Printed on Nov. 10, 2020, 4 pages.
Microsoft, "Xbox One game store- Project Cars 2", Retrieved from: <https://web.archive.org/ web/20190205195540/https:/www.microsoft.com/en-us/p/project-cars-2/c17sfnlnxz37> (Feb. 5, 2019), printed on Nov. 10, 2020, 4 pages.
Microsoft, "Xbox One game store- Xbox Game Pass", Retrieved from: <https://web.archive.org/ web/20190129223320/https:/www.microsoft.com/en-us/p/xbox-game-pass/cfq7ttc0k618> (Jan. 29, 2019), printed on Nov. 10, 2020, 6 pages.

(56) References Cited

OTHER PUBLICATIONS

Microsoft, "Xbox One game store- Call of Duty: Black Ops III—Zombies Chronicles Edition", retrieved from: https://web.archive.org/web/20181019094930/https:/www.microsoft.com/en-us/p/call-of-duty-black-ops-iii—zombies-chronicles-edition/C492DG1TQQ09> (Oct. 19, 2018), printed on Nov. 10, 2020, 21 pages.

* cited by examiner (Download is complete)

(While Game A is being downloaded)

(Download is complete)

(Game A progress: level 1)

(Game A progress: level 20)

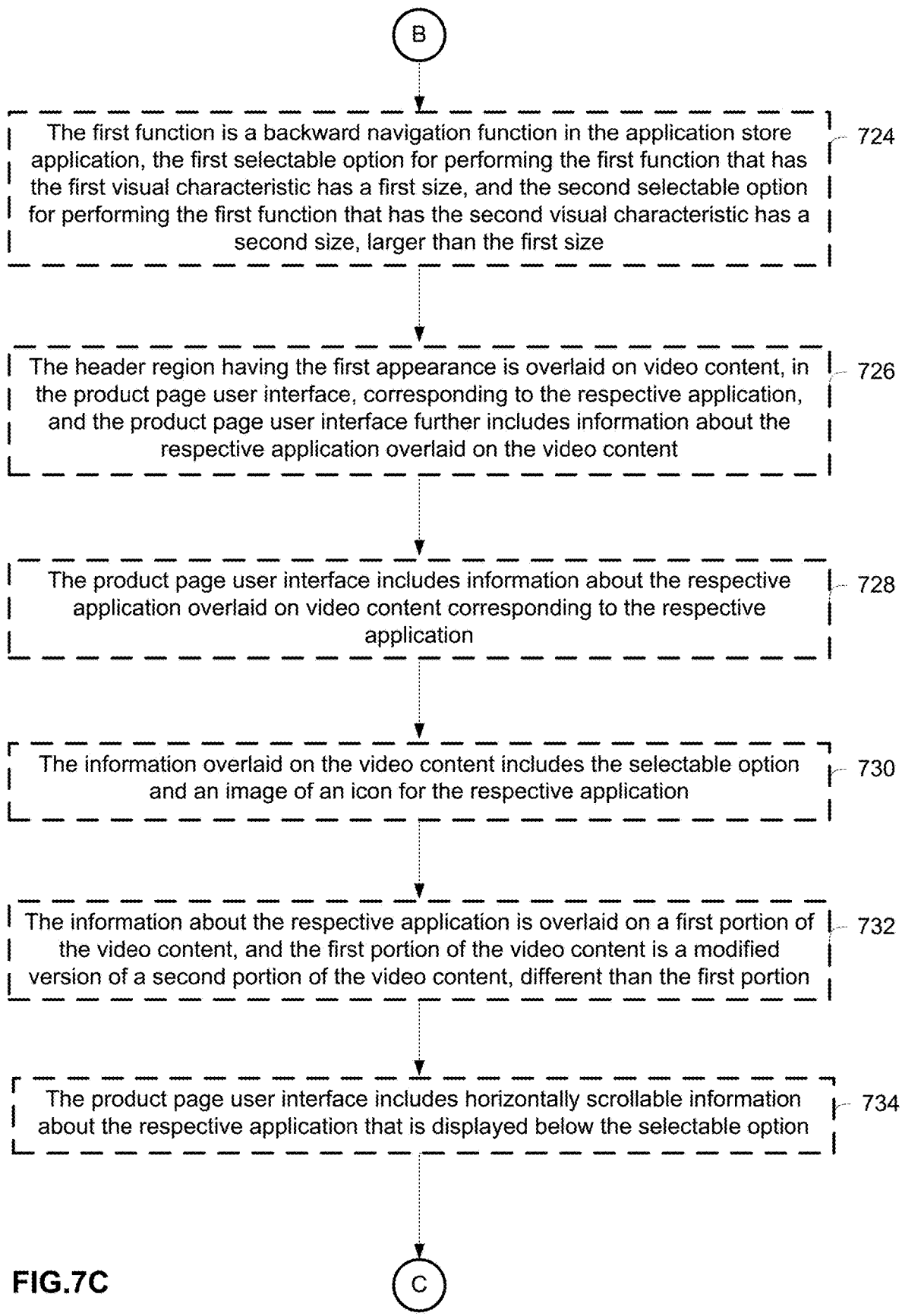

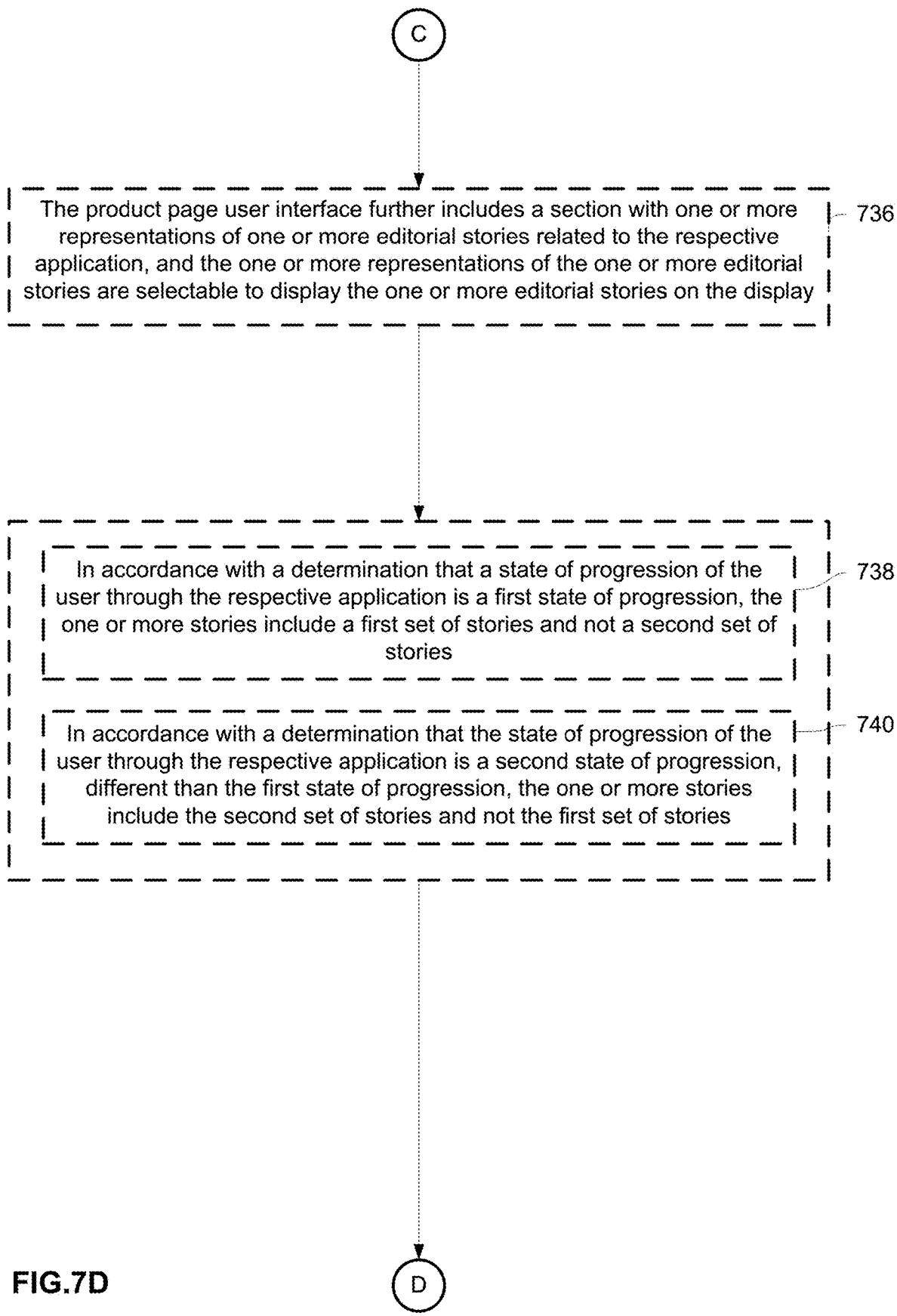

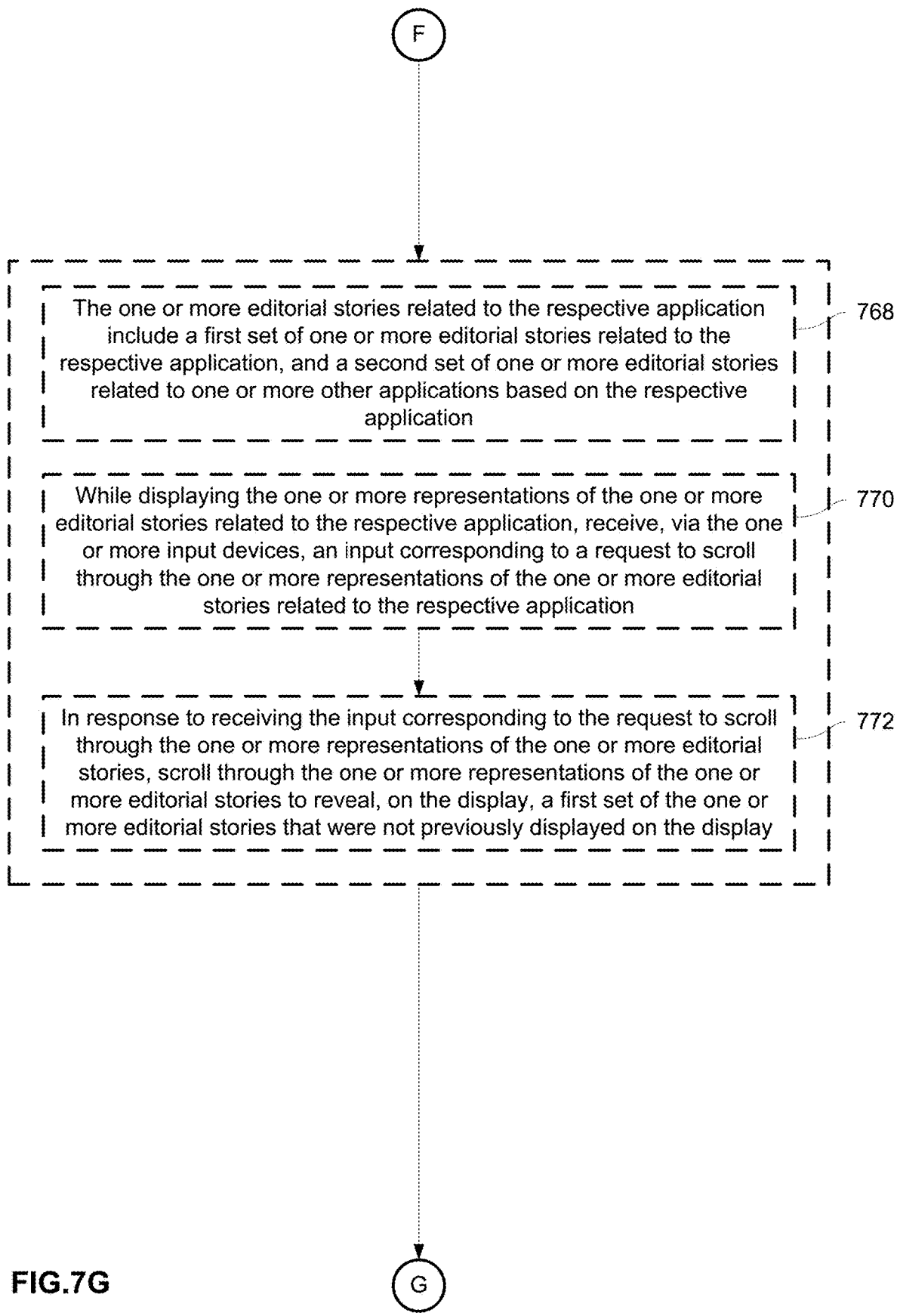

(D)

↓

In accordance with the determination that the user of the electronic device is not subscribed to the subscription service that provides access to the subscription applications, the subscription applications user interface includes a second that includes a horizontally scrollable plurality of icons of subscription applications ⟶ 950

↓

In accordance with the determination that the user of the electronic device is not subscribed to the subscription service that provides access to the subscription applications, the subscription applications user interface includes a section that includes information about accessing the subscription applications from a plurality of electronic devices of different types ⟶ 952

↓

In accordance with the determination that the user of the electronic device is not subscribed to the subscription service that provides access to the subscription applications, the subscription applications user interface includes a section that includes a horizontally scrollable plurality of icons for recommended subscription applications ⟶ 954

↓

In accordance with the determination that the user of the electronic device is not subscribed to the subscription service that provides access to the subscription applications, the subscription applications user interface includes a section that includes a horizontally scrollable plurality of representations of editorial collections of subscription applications ⟶ 956

958 — In accordance with the determination that the user of the electronic device is subscribed to the subscription service that provides access to the subscription applications, the subscription applications user interface includes a section that includes a plurality of selectable options that are selectable to display respective categories of subscription applications

↓

960 — In accordance with the determination that the user of the electronic device is subscribed to the subscription service that provides access to the subscription applications, the subscription applications user interface includes:

962 — A section that includes one or more representations of one or more stories related to subscription applications, the one or more representations of the one or more stories selectable to display the respective stories on the display 964 — The one or more representations of the one or more stories are displayed overlaid over a background, and a visual characteristic of the background updates based on which representation of the one or more representations of the one or more stories has a current focus

↓

966 — In accordance with the determination that the user of the electronic device is subscribed to the subscription service that provides access to the subscription applications:

968 — In accordance with a determination that the user of the electronic device uses a first set of subscription applications, the one or more stories include a first set of stories but not a second set of stories 970 — In accordance with a determination that the user of the electronic device uses a second set of subscription applications, the one or more stories include the second set of stories but not the first set of stories

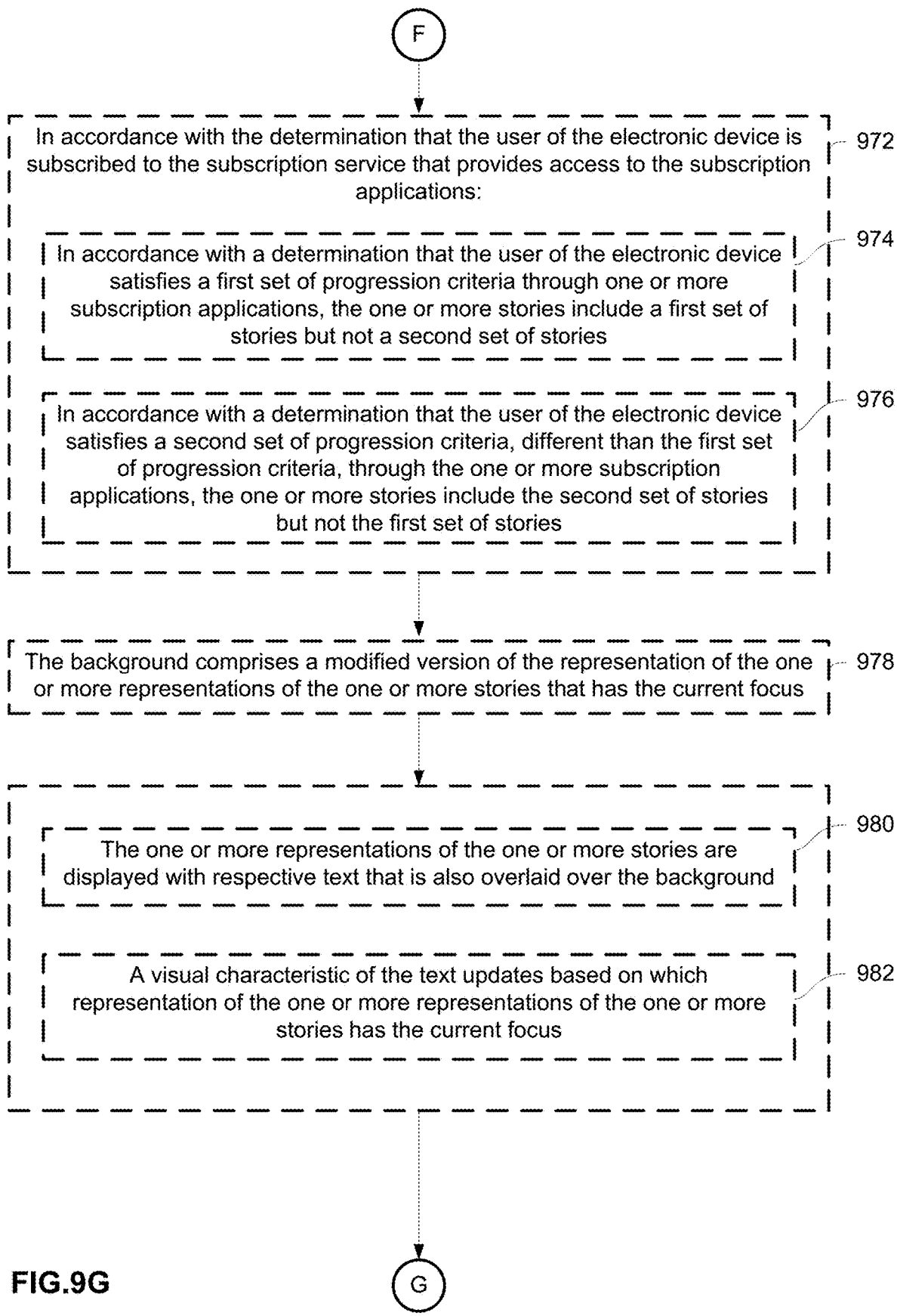

1300

Display, on the display, a first user interface of an application store application, wherein the first user interface is a user interface including content related to applications in a first category of applications, and the first user interface includes a visual indication that indicates a number of updates available for applications, including applications in the first category and applications in a second category of applications, different than the first category, on the electronic device ⎯ 1302

While displaying the first user interface, receive, via the one or more input devices, an input corresponding to a request to navigate to a second user interface of the application store application, wherein the second user interface is a user interface including content related to applications in the second category of applications ⎯ 1304

In response to receiving the input, display, on the display, the second user interface, wherein the second user interface includes the visual indication that indicates the number of updates available for the applications, including applications in the first category and applications in the second category, on the electronic device ⎯ 1306

FIG. 13A 

Valid Current Subscription

No Current Subscription

Valid Current Subscription

Valid Current Subscription

Subscription Expired

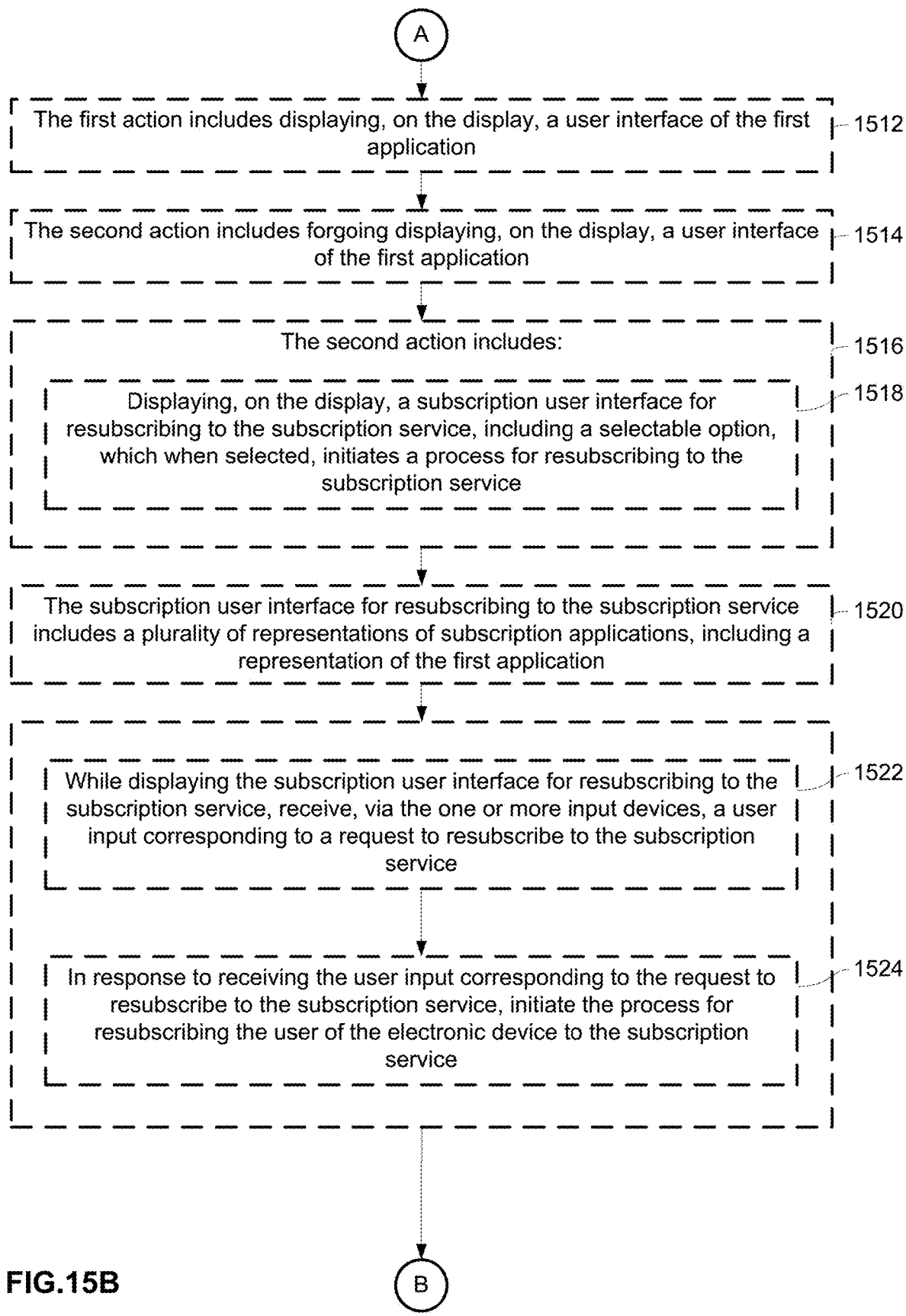

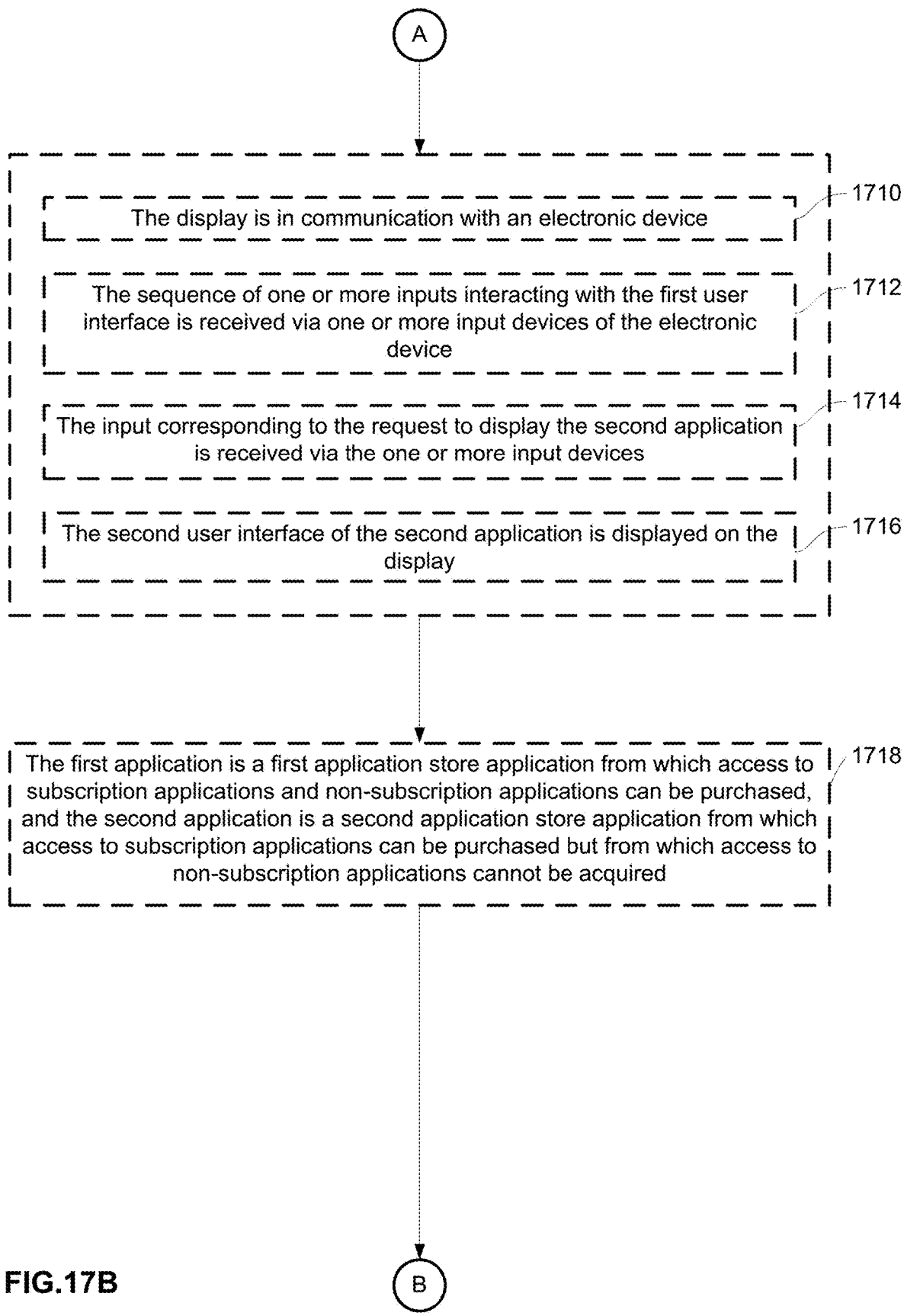

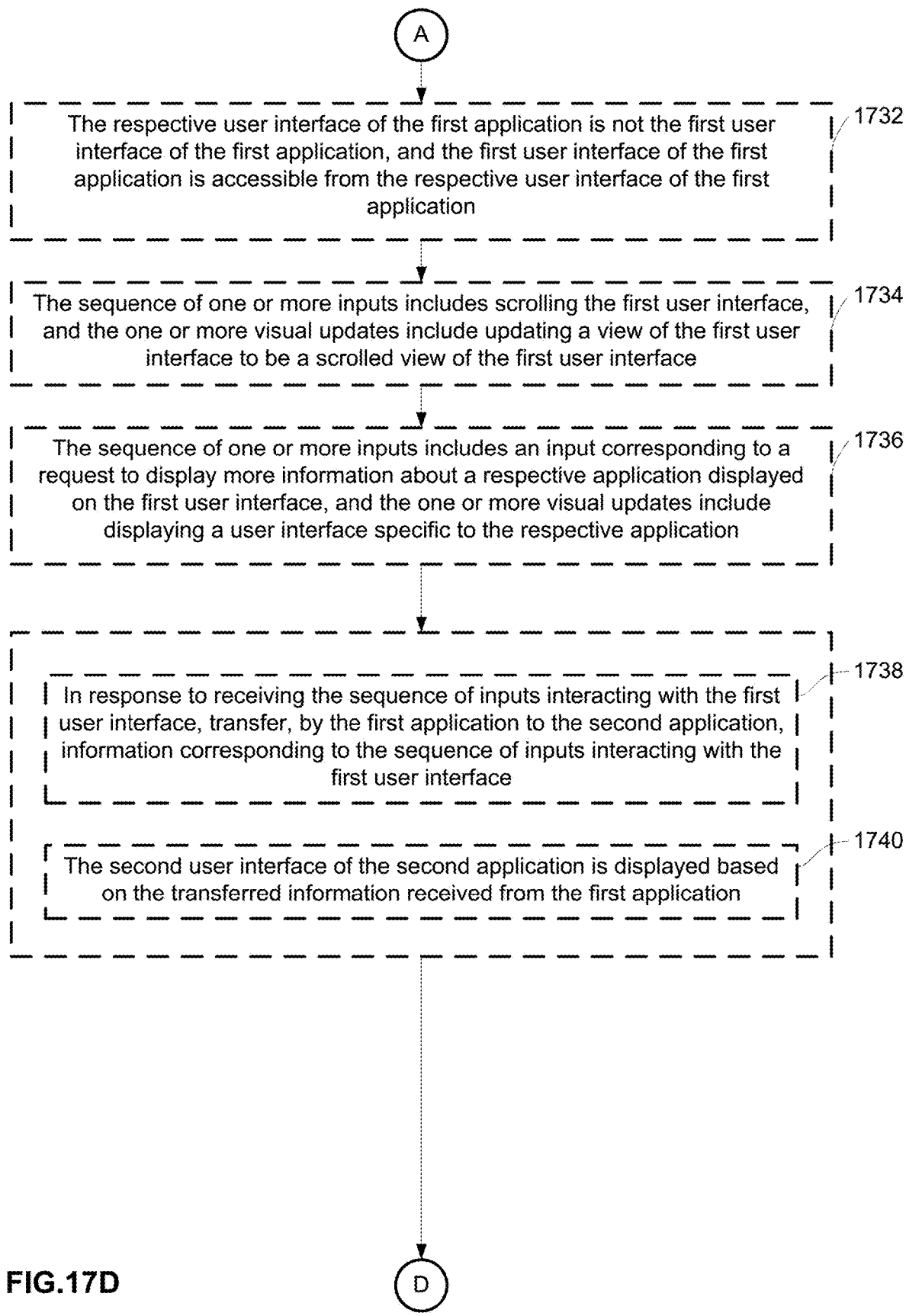

USER INTERFACES FOR SUBSCRIPTION APPLICATIONS

CROSS-REFERENCE TO RELATED APPLICATIONS

This application claims the benefit of U.S. Provisional Application No. 62/820,130, filed Mar. 18, 2019, and U.S. Provisional Application No. 62/822,944, filed Mar. 24, 2019, the contents of which are hereby incorporated by reference in their entireties for all purposes.

FIELD OF THE DISCLOSURE

This relates generally to electronic devices that interact with subscription applications, and user interactions with such devices.

BACKGROUND

User interaction with electronic devices has increased significantly in recent years. These devices can be devices such as computers, tablet computers, televisions, multimedia devices, mobile devices, and the like.

In some circumstances, users wish to interact with applications of various types. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY

Some embodiments described in this disclosure are directed to product page user interfaces of the application store that are specific to a respective application. Some embodiments described in this disclosure are directed to application store user interfaces that present information about applications in a respective category. Some embodiments described in this disclosure are directed to accessing subscription and non-subscription applications. Some embodiments described in this disclosure are directed to presenting a visual indication of a number of application updates that are available in an application store user interface. Some embodiments described in this disclosure are directed to launching and removing access to subscription and non-subscription applications. Some embodiments described in this disclosure are directed to transferring context between a generic application store application and a dedicated application store application. Some embodiments described in this disclosure are directed to notifying a user of the completion of a download.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 7A-7I are flow diagrams illustrating a method of presenting user interfaces of the application store that are specific to a respective application in accordance with some embodiments.

FIGS. 9A-9J are flow diagrams illustrating a method of presenting application store user interfaces that include information about applications in a respective category in accordance with some embodiments.

FIGS. 13A-13C are flow diagrams illustrating a method of presenting a visual indication of a number of application updates that are available in an application store user interface in accordance with some embodiments.

FIGS. 15A-15G are flow diagrams illustrating a method of providing ways to launch and remove access to subscription and non-subscription applications in accordance with some embodiments.

FIGS. 17A-17H are flow diagrams illustrating a method of transferring context between a generic application store application and a dedicated application store application in accordance with some embodiments.

DETAILED DESCRIPTION

Figure 1A:
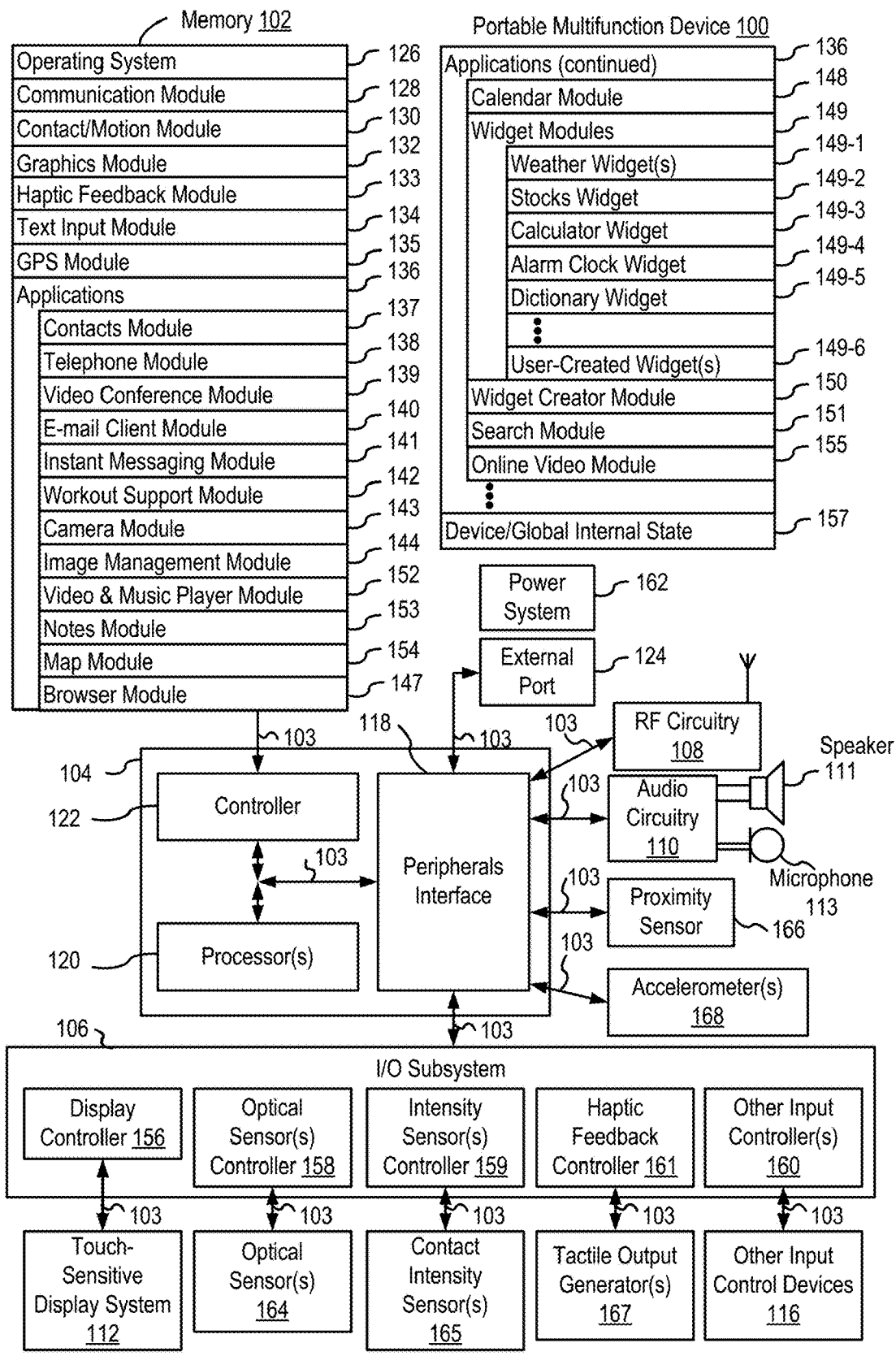
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that interact with subscription applications. There is also a need for electronic devices that distinguish subscription applications from non-subscription applications. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
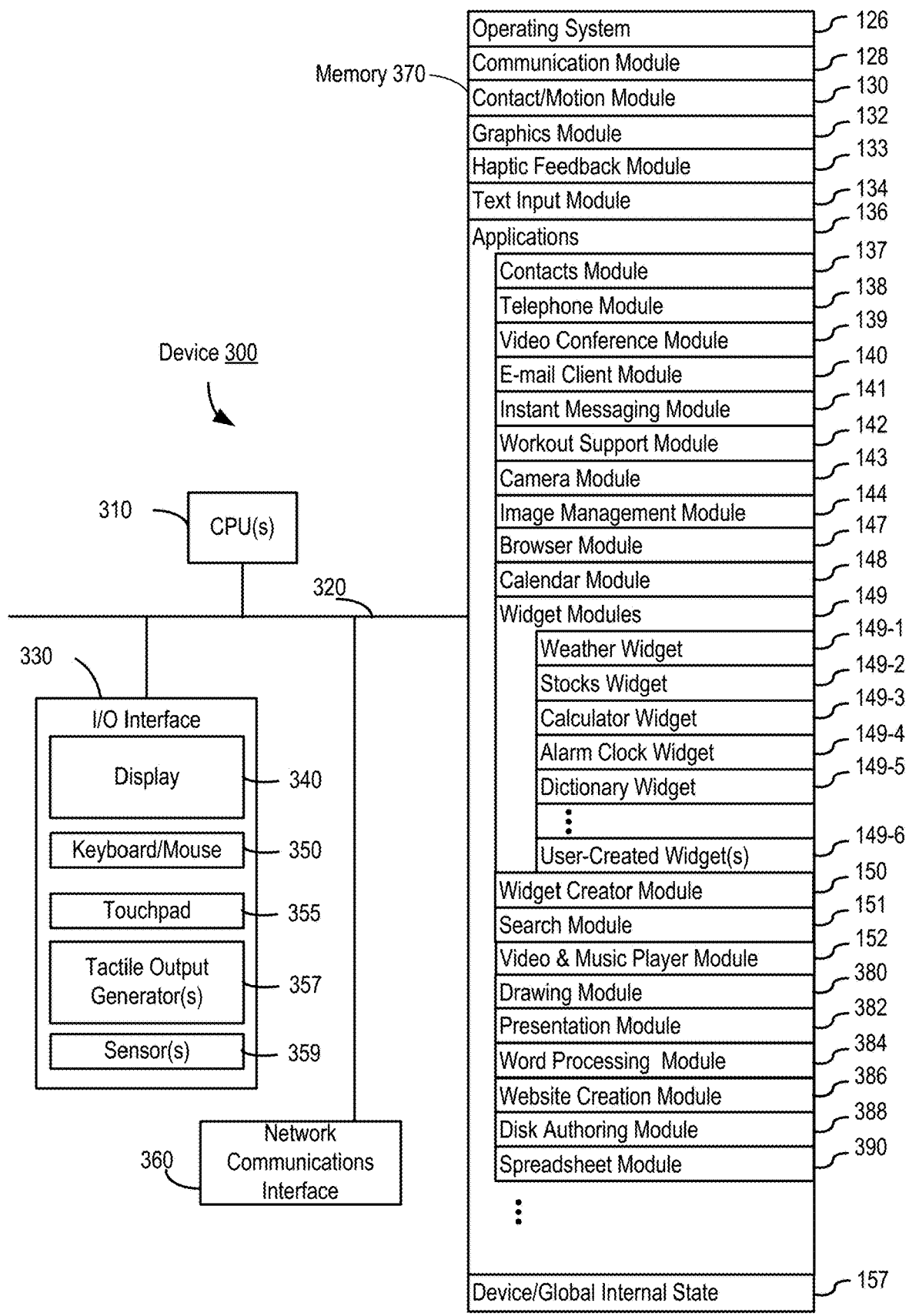
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;

Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
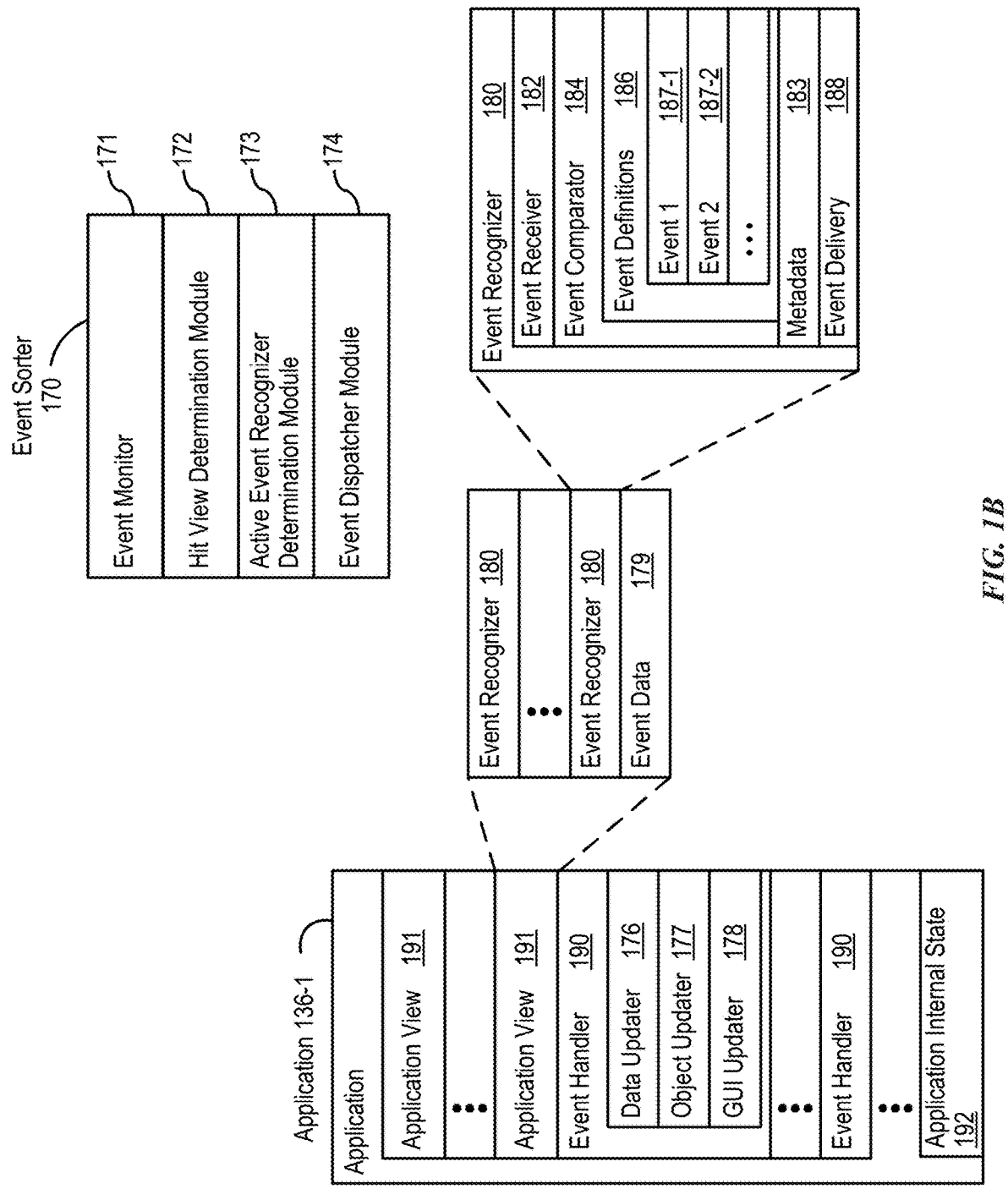
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113

(through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
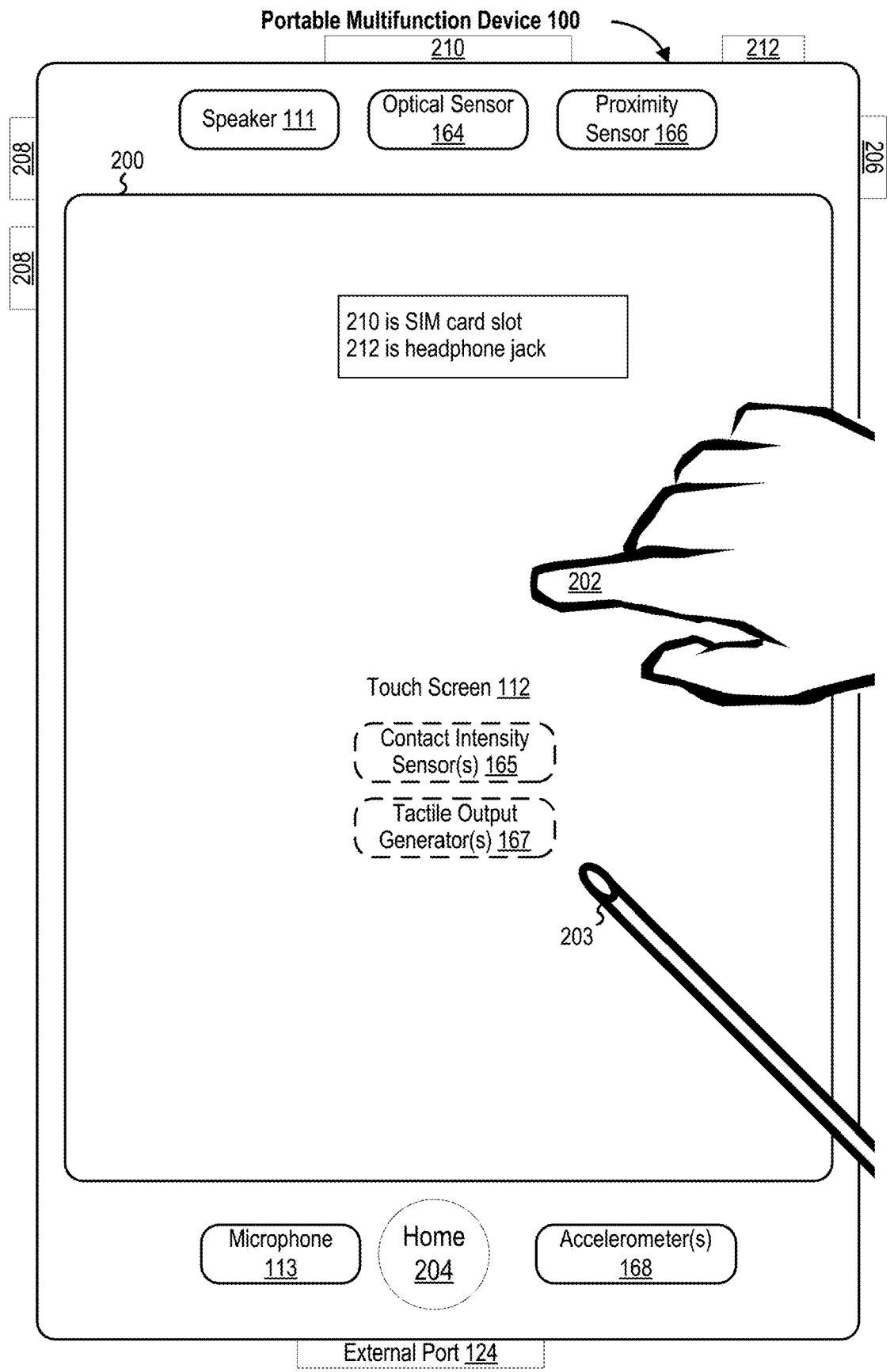
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
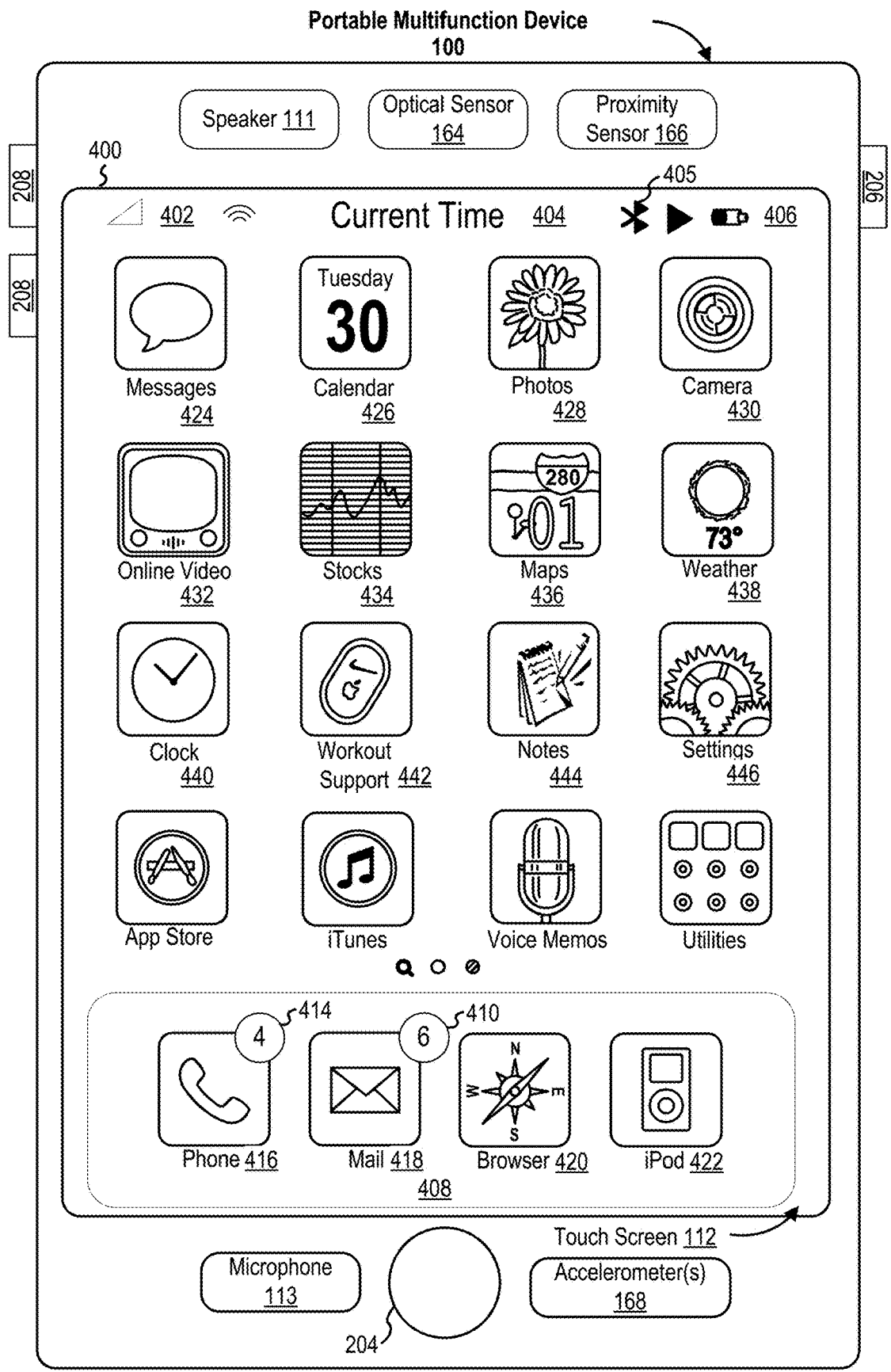
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
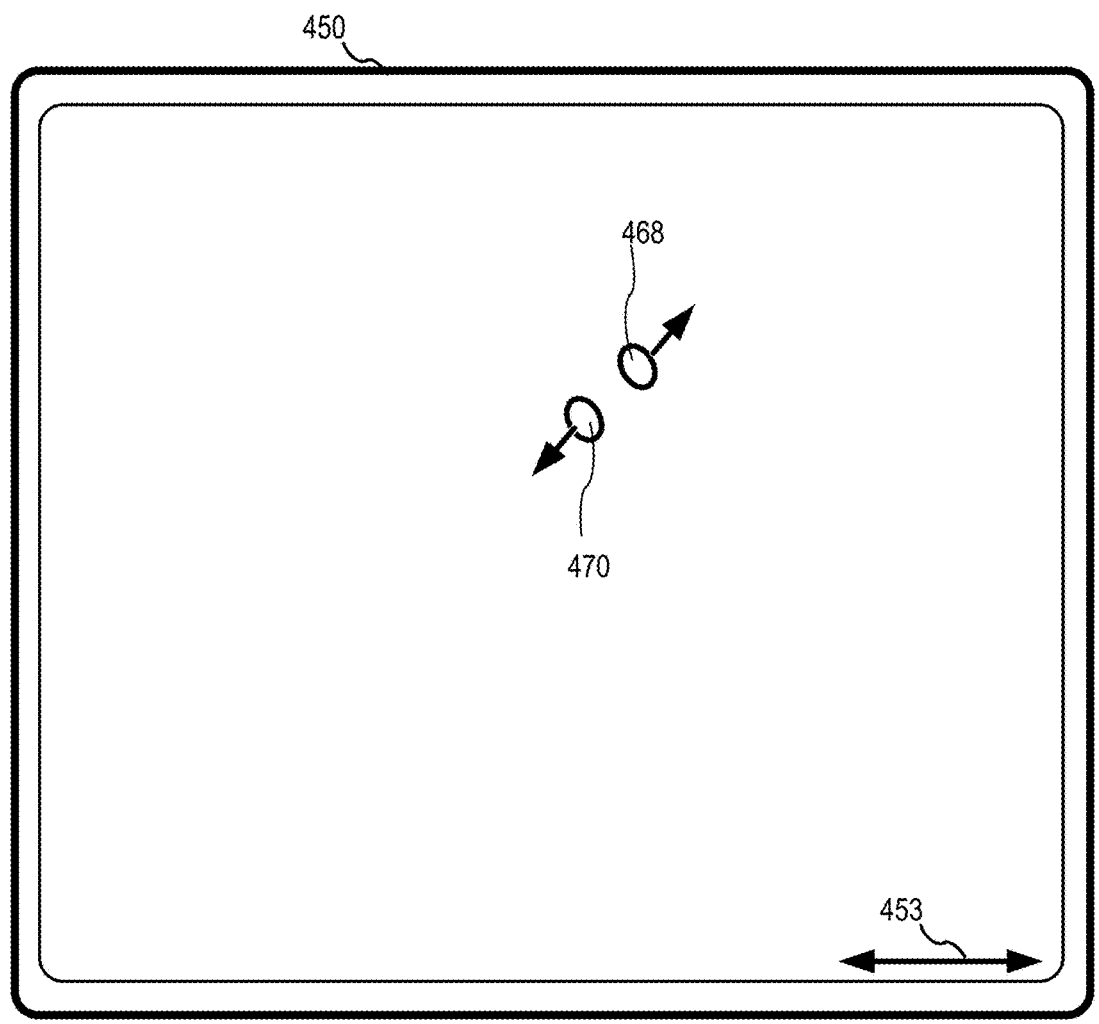
FIG. 4B illustrates an exemplary user interface for a multifunction device with a touch-sensitive surface that is separate from the display in accordance with some embodiments.
Figure 4B:
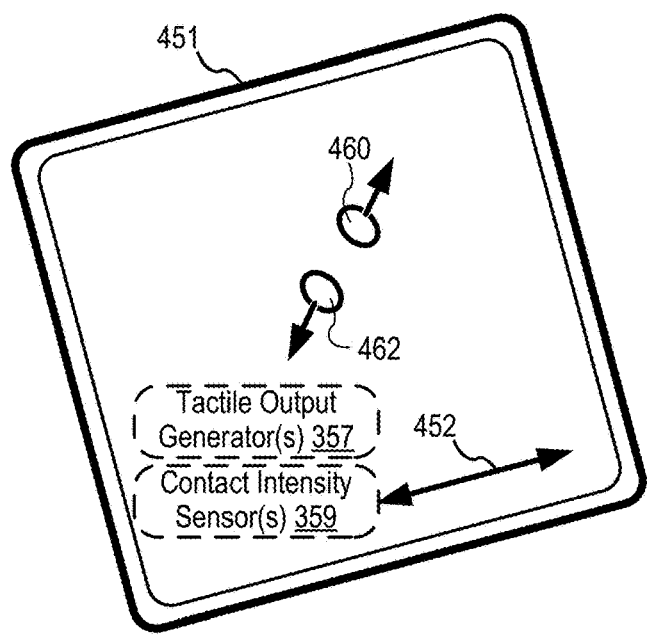

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
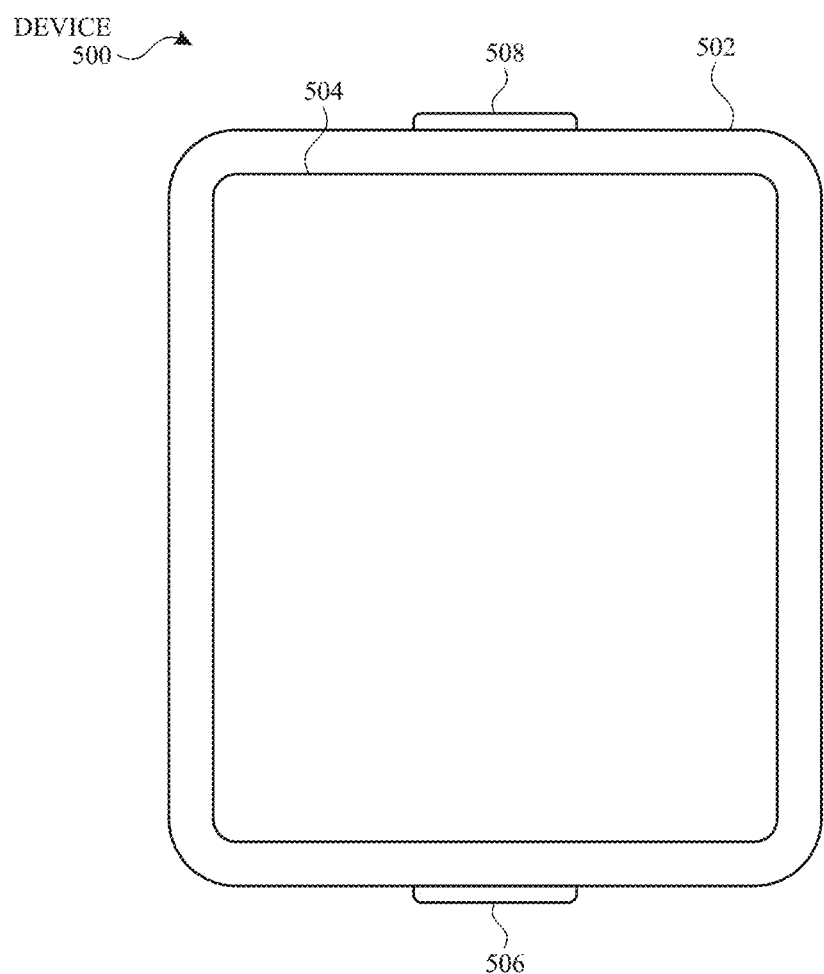
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
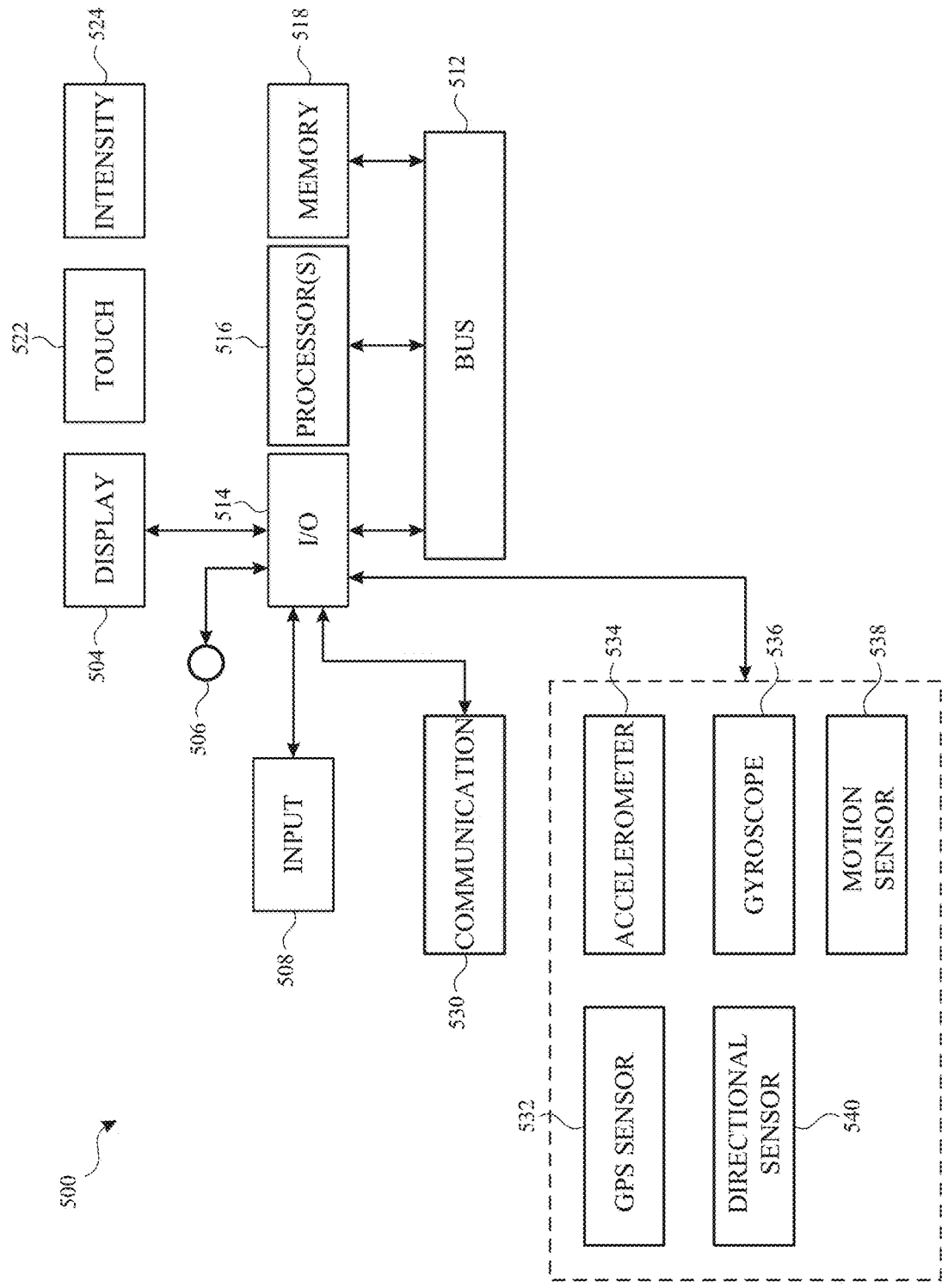
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-18. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input)

is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
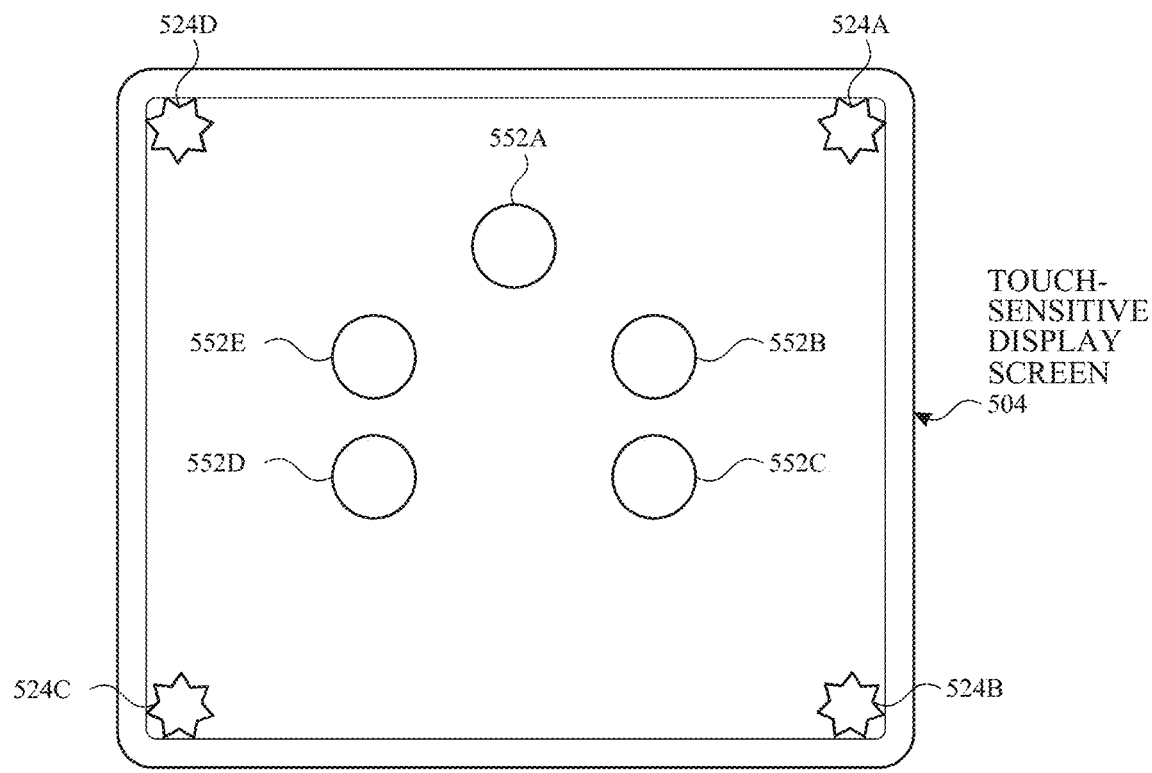
FIGS. 5C-5D illustrate exemplary components of a personal electronic device having a touch-sensitive display and intensity sensors in accordance with some embodiments.
Figure 5C:
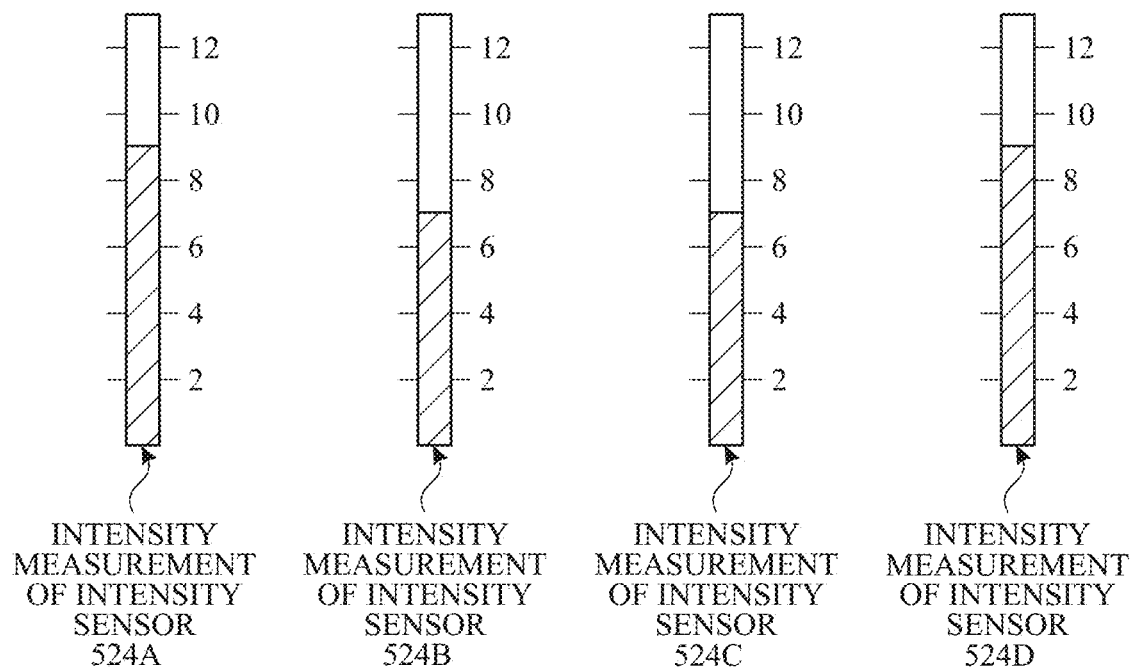
Figure 5D:
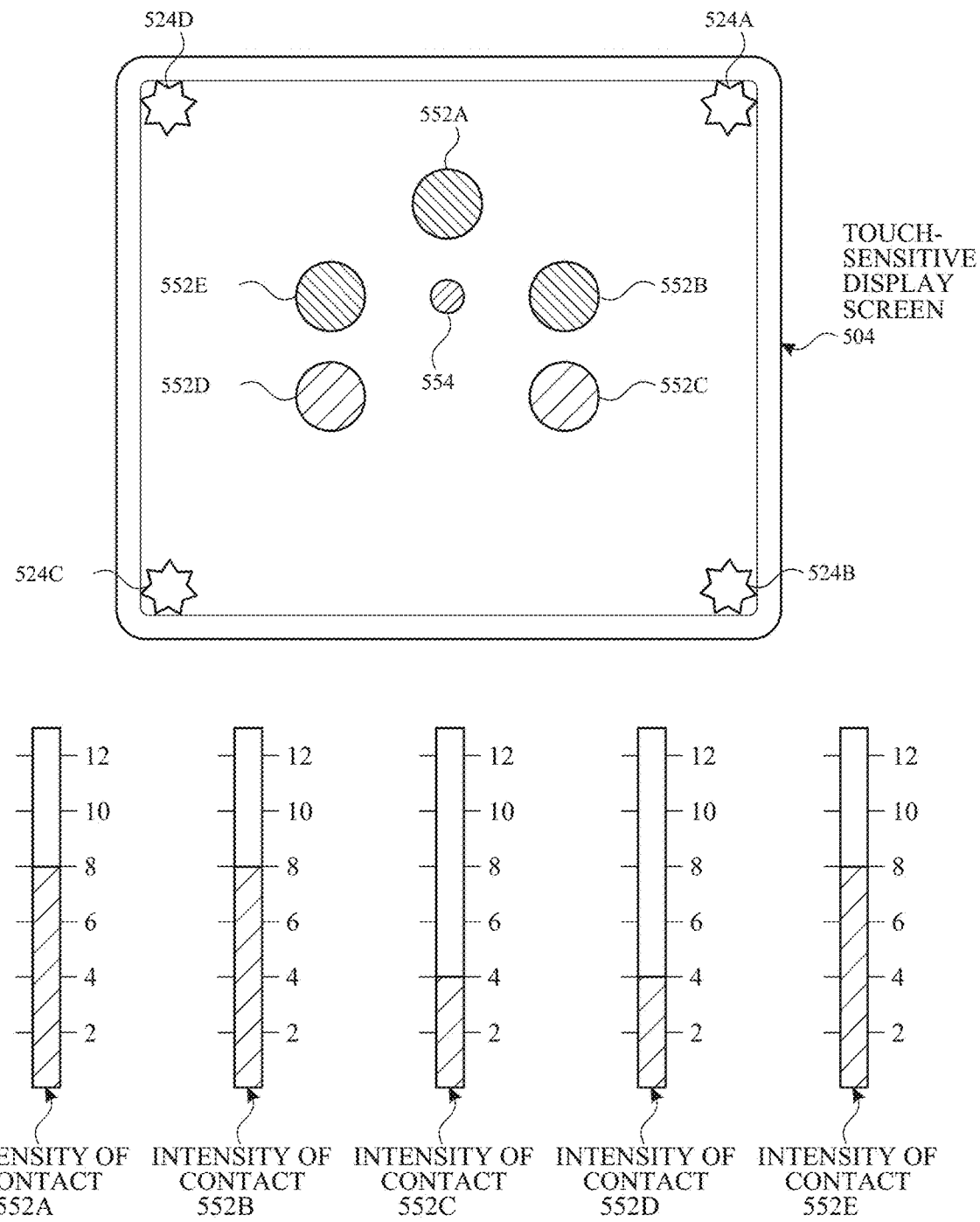

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
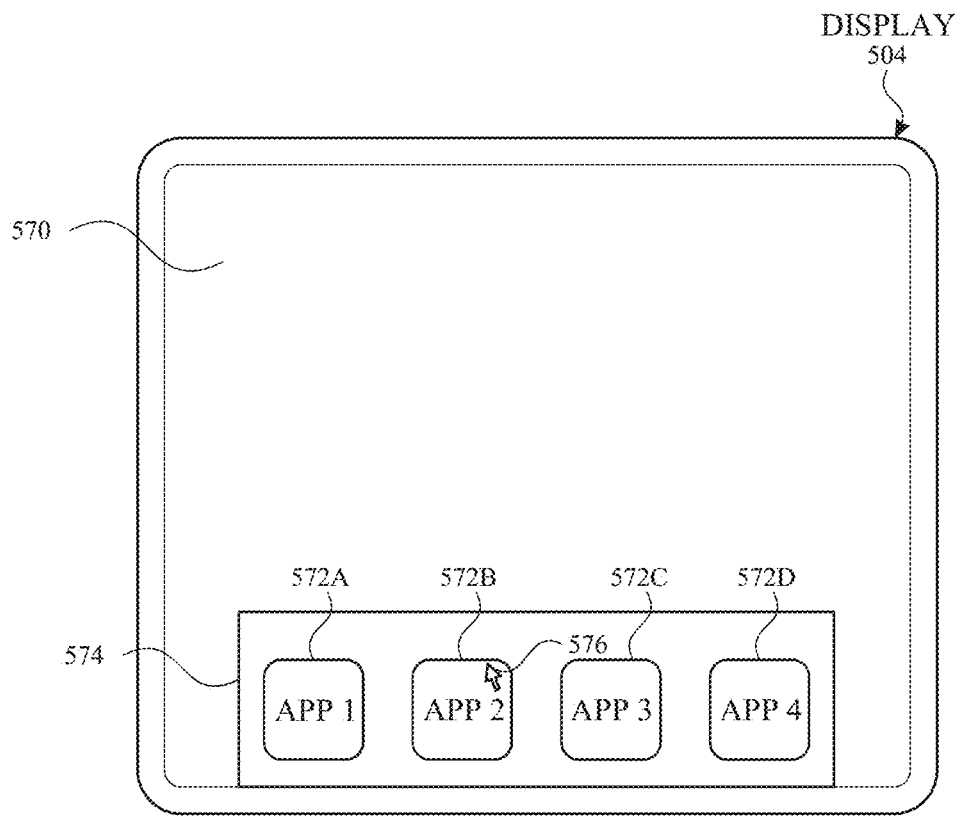
FIGS. 5E-5H illustrate exemplary components and user interfaces of a personal electronic device in accordance with some embodiments.
Figure 5E:
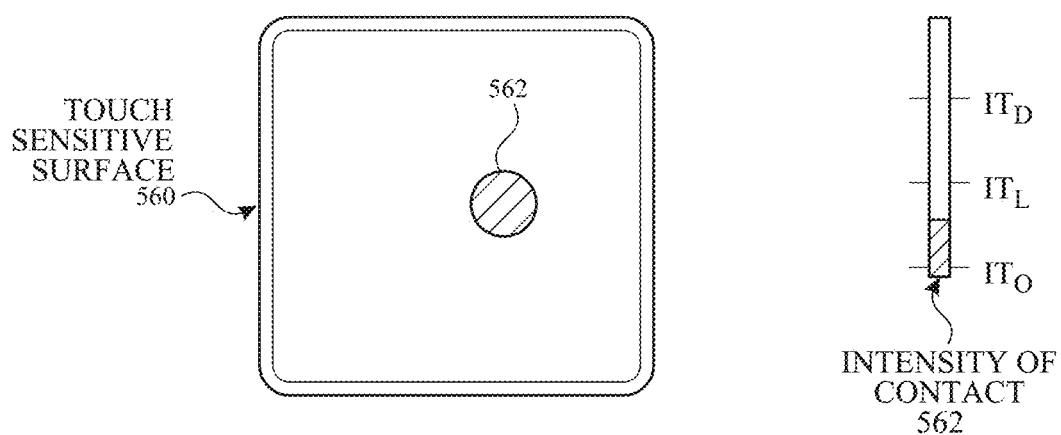
Figure 5F:
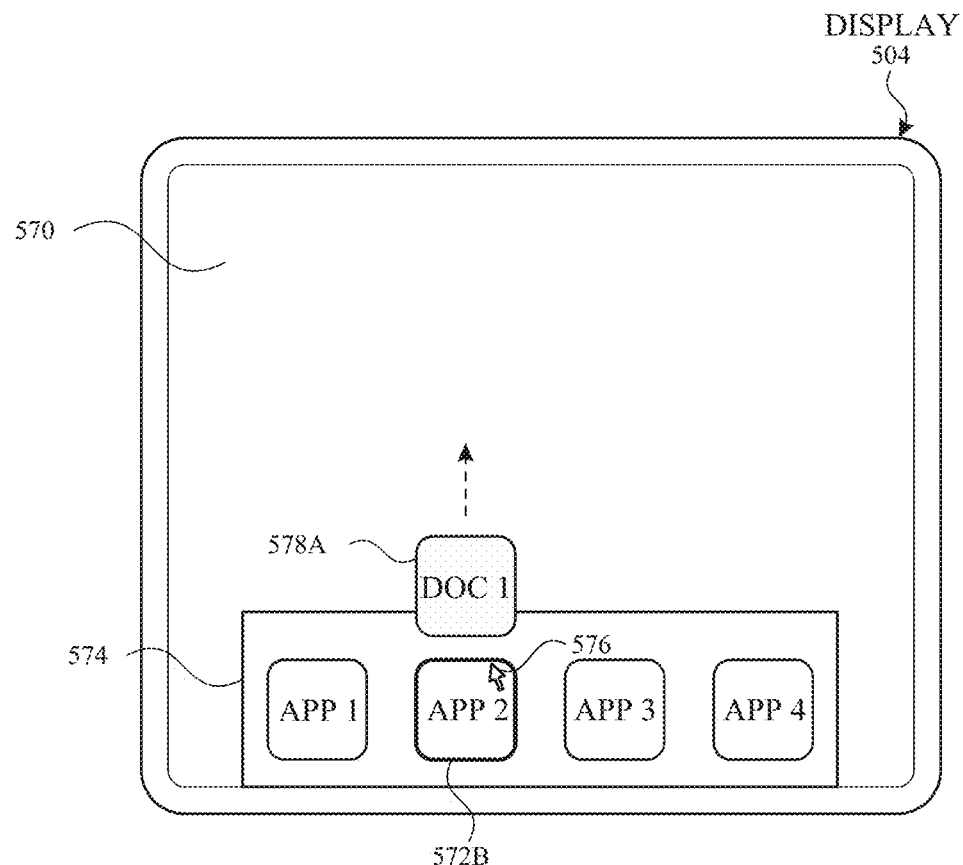
Figure 5F:
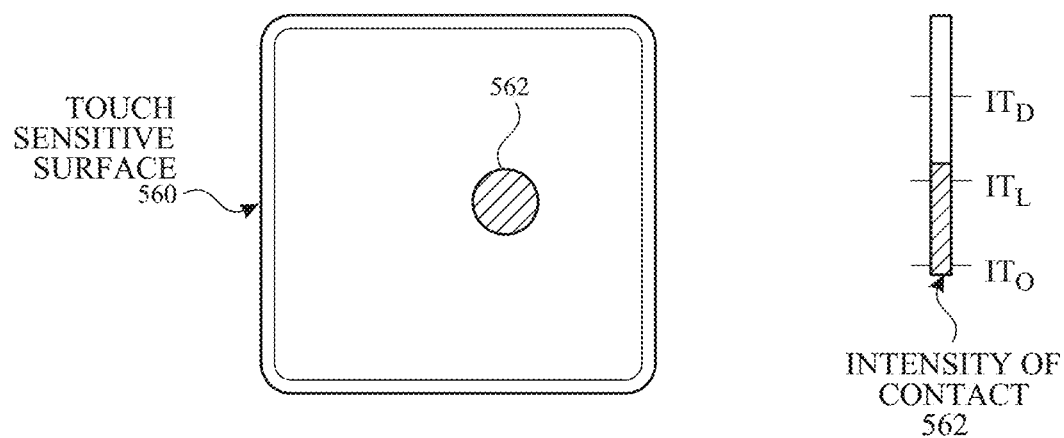
Figure 5G:
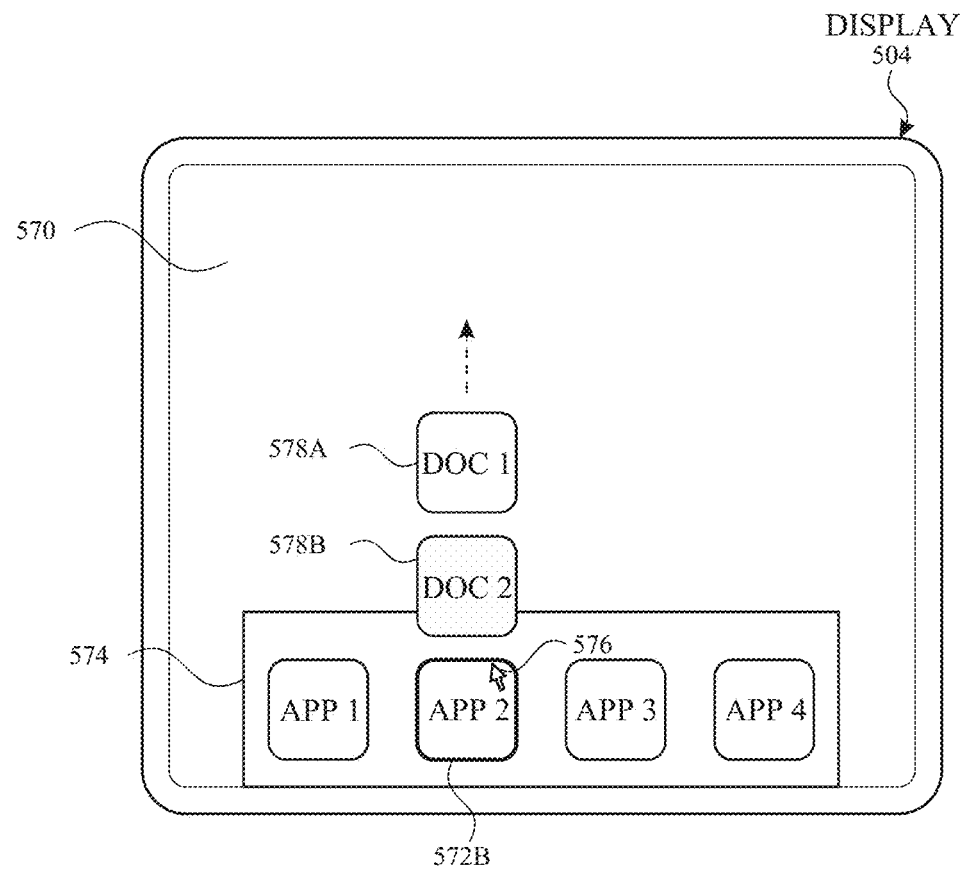
Figure 5G:
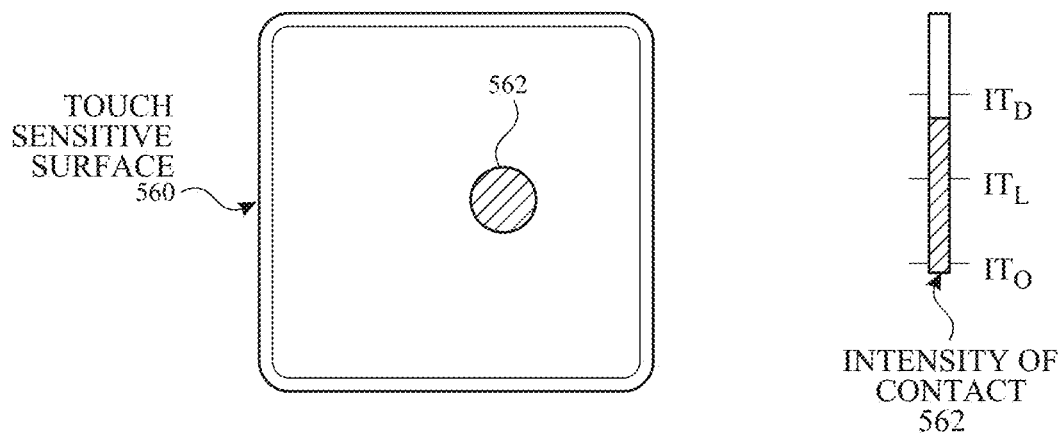
Figure 5H:
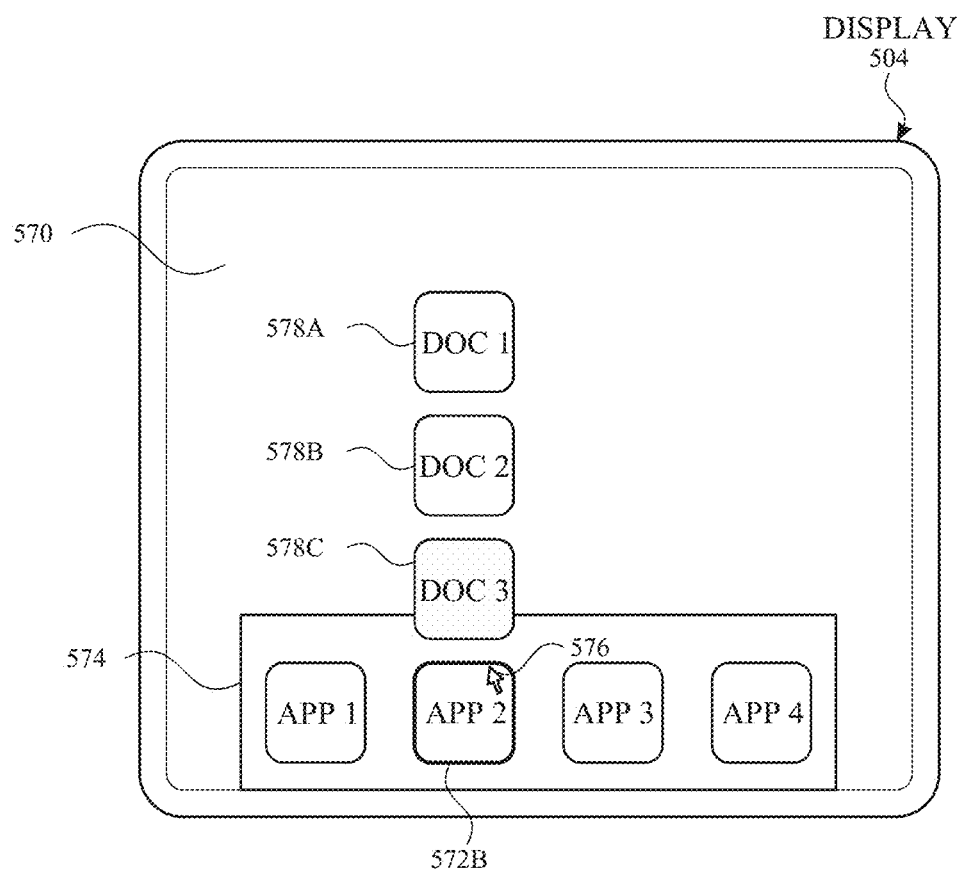
Figure 5H:
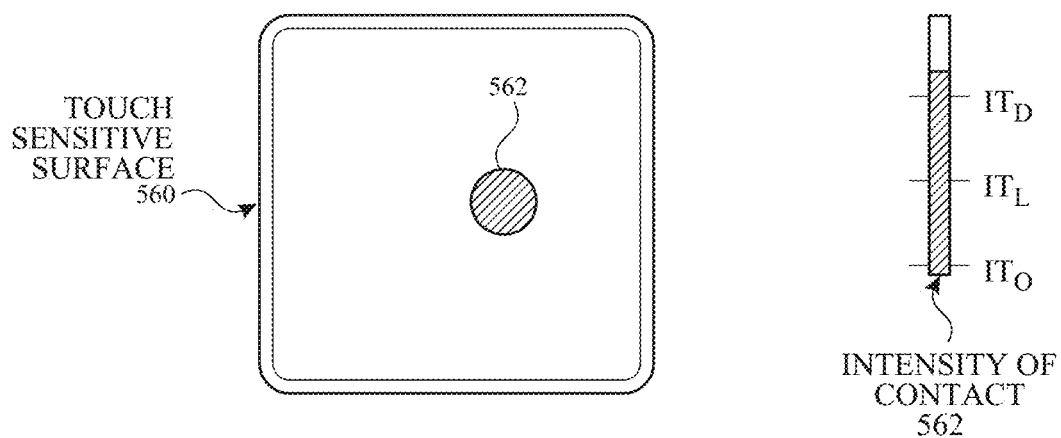

FIGS. 5E-5H illustrate detection of a gesture that includes a press input that corresponds to an increase in intensity of a contact 562 from an intensity below a light press intensity threshold (e.g., "IT$_L$") in FIG. 5E, to an intensity above a deep press intensity threshold (e.g., "IT$_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT$_D$"). Contact 562 is maintained on touch-sensitive surface 560. In response to the detection of the gesture, and in accordance with contact 562 having an intensity that goes above the deep press intensity threshold (e.g., "IT$_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT$_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

Figure 5I:
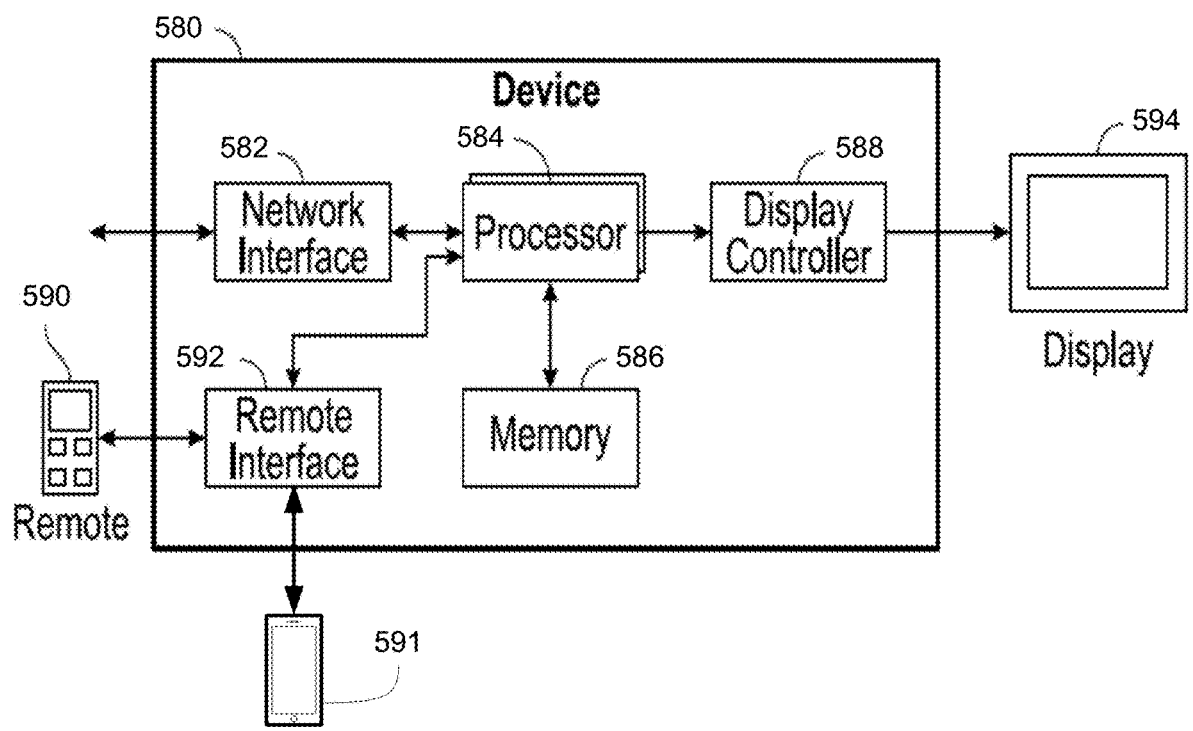
FIGS. 5I-5K illustrate block diagrams of exemplary architectures for devices according to some embodiments of the disclosure.

FIG. 5I illustrates a block diagram of an exemplary architecture for the device 580 according to some embodiments of the disclosure. In the embodiment of FIG. 5I, media or other content is optionally received by device 580 via network interface 582, which is optionally a wireless or wired connection. The one or more processors 584 optionally execute any number of programs stored in memory 586 or storage, which optionally includes instructions to perform one or more of the methods and/or processes described herein (e.g., methods 700, 900, 1100, 1300, 1500, 1700, and 1900).

In some embodiments, display controller 588 causes the various user interfaces of the disclosure to be displayed on display 594. Further, input to device 580 is optionally provided by remote 590 via remote interface 592, which is optionally a wireless or a wired connection. In some embodiments, input to device 580 is provided by a multifunction device 591 (e.g., a smartphone) on which a remote control application is running that configures the multifunction device to simulate remote control functionality, as will be described in more detail below. In some embodiments, multifunction device 591 corresponds to one or more of device 100 in FIGS. 1A and 2, device 300 in FIG. 3, and device 500 in FIG. 5A. It is understood that the embodiment of FIG. 5I is not meant to limit the features of the device of the disclosure, and that other components to facilitate other features described in the disclosure are optionally included in the architecture of FIG. 5I as well. In some embodiments, device 580 optionally corresponds to one or more of multifunction device 100 in FIGS. 1A and 2, device 300 in FIG. 3, and device 500 in FIG. 5A; network interface 582 optionally corresponds to one or more of RF circuitry 108, external port 124, and peripherals interface 118 in FIGS. 1A and 2, and network communications interface 360 in FIG. 3; processor 584 optionally corresponds to one or more of processor(s) 120 in FIG. 1A and CPU(s) 310 in FIG. 3; display controller 588 optionally corresponds to one or more of display controller 156 in FIG. 1A and I/O interface 330 in FIG. 3; memory 586 optionally corresponds to one or more of memory 102 in FIG. 1A and memory 370 in FIG. 3; remote interface 592 optionally corresponds to one or more of peripherals interface 118, and I/O subsystem 106 (and/or its components) in FIG. 1A, and I/O interface 330 in FIG. 3; remote 590 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 594 optionally corresponds to one or more of touch-sensitive display system 112 in FIGS. 1A and 2, and display 340 in FIG. 3.

Figure 5J:
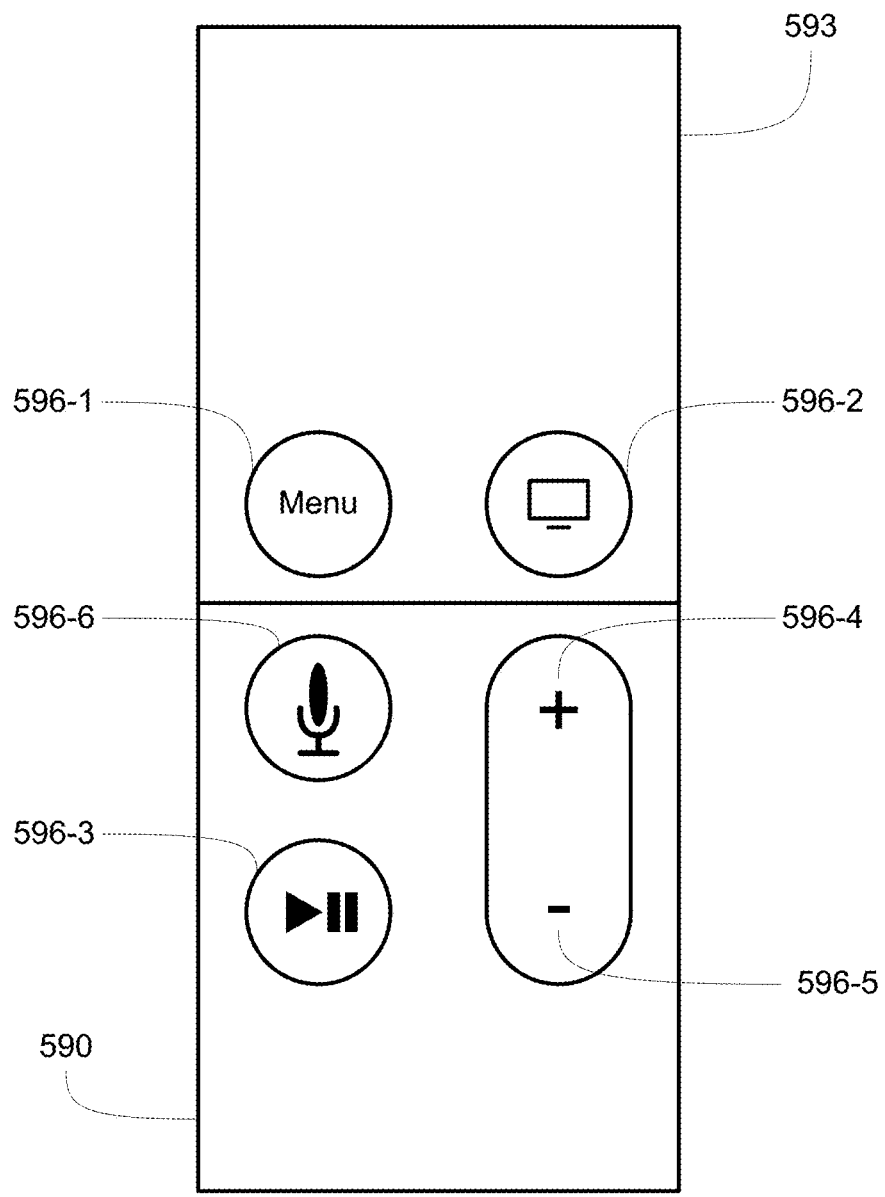

FIG. 5J illustrates an exemplary structure for remote 590 according to some embodiments of the disclosure. In some embodiments, remote 590 optionally corresponds to one or more of multifunction device 100 in FIGS. 1A and 2, device 300 in FIG. 3, and device 500 in FIG. 5A. Remote 590 optionally includes touch-sensitive surface 593, similar to touch-sensitive surface 451 in FIG. 4. In some embodiments, touch-sensitive surface 593 is edge-to-edge (e.g., it extends to the edges of remote 590, such that little or no surface of remote 590 exists between the touch-sensitive surface 593 and one or more edges of remote 590, as illustrated in FIG. 5J). Touch-sensitive surface 593 is optionally able to sense contacts as well as contact intensities (e.g., clicks of touch-sensitive surface 593), as previously described in this disclosure. Further, touch-sensitive surface 593 optionally includes a mechanical actuator for providing physical button click functionality (e.g., touch-sensitive surface 593 is "clickable" to provide corresponding input to device 580). Remote 590 also optionally includes buttons 596-1, 596-2, 596-3, 596-4, 596-5, and 596-6. Buttons 596-1, 596-2, 596-3, 596-4, 596-5, and 596-6 are optionally mechanical buttons or mechanical button alternatives that are able to sense contact with, or depression of, such buttons to initiate corresponding action(s) on, for example, device 580. In some embodiments, selection of "menu" button 596-1 by a user navigates device 580 backwards in a currently-executing application or currently-displayed user interface (e.g., back to a user interface that was displayed previous to the currently-displayed user interface), or navigates device 580 to a one-higher-level user interface than the currently-displayed user interface. In some embodiments, selection of "home" button 596-2 by a user navigates device 580 to a main, home, or root user interface from any user interface that is displayed on device 580 (e.g., to a home screen of device 580 that optionally includes one or more applications accessible on device 580). In some embodiments, selection of the "home" button 596-2 causes the electronic device to navigate to a unified media browsing application. In some embodiments, selection of "play/pause" button 596-3 by a user toggles between playing and pausing a currently-playing content item on device 580 (e.g., if a content item is playing on device 580 when "play/pause" button 596-3 is selected, the content item is optionally paused, and if a content item is paused on device 580 when "play/pause" button 596-3 is selected, the content item is optionally played). In some embodiments, selection of "+" 596-4 or "−" 596-5 buttons by a user increases or decreases, respectively, the volume of audio reproduced by device 580 (e.g., the volume of a content item currently-playing on device 580). In some embodiments, selection of "audio input" button 596-6 by a user allows the user to provide audio input (e.g., voice input) to device 580, optionally, to a voice assistant on the device. In some embodiments, remote 590 includes a microphone via which the user provides audio input to device 580 upon selection of "audio input" button 596-6. In some embodiments, remote 590 includes one or more accelerometers for detecting information about the motion of the remote.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

Figure 5K:
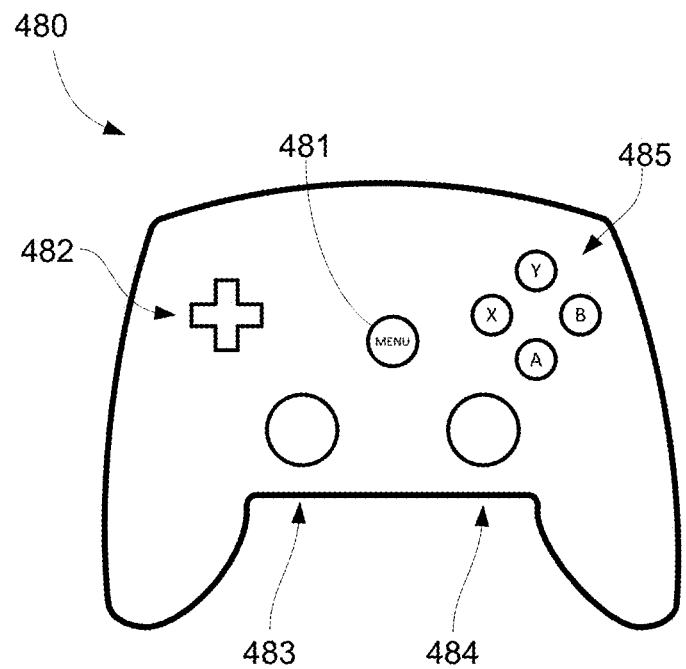

FIG. 5K illustrates an exemplary structure for game controller 480 according to some embodiments of the disclosure. In some embodiments, game controller 480 optionally corresponds to one or more of multifunction device 100 in FIGS. 1A and 2, device 300 in FIG. 3, and device 500 in FIG. 5A. In some embodiments, game controller 480 includes "menu" button 481 that performs the same or similar functions to "menu" button 596-1 of remote 590. In some embodiments, game controller 480 includes directional pad 482, which provides directional and/or navigational commands (e.g., up/down/left/right inputs). For example, when direction pad 482 is pressed down on the left side of directional pad 482, a left command is transmitted (e.g., and similarly for up, down, and right). In some embodiments, game controller 480 includes analog sticks 483 and 484. In some embodiments, analog sticks 483 and 484 provide an analog navigational command. In some embodiments, an analog command refers to a command that is not discrete (e.g., not either "0" or "1" or not either "on" or "off"), but rather encompasses a range of values. For example, analog sticks 483 and 484 can transmit a vector including a direction and intensity. In some embodiments, game controller 480 includes one or more function buttons 485. In some embodiments, the function buttons can be mapped to particular functions within an application or game. In some embodiments, game controller 480 includes a touch-sensitive surface (not shown). In some embodiments, the touch-sensitive surface can be the same or share similar features as touch sensitive surface 593 of remote 590.

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Application Store User Interfaces Specific to a Respective Application

Users interact with electronic devices in many different manners, including using an electronic device to view information in an application store application that is specific to a respective application. In some embodiments, an electronic device is able to present an application store user interface that is specific to a respective application. The embodiments described below provide ways in which an electronic device presents a user interface of the application store that includes information about a respective subscription application. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
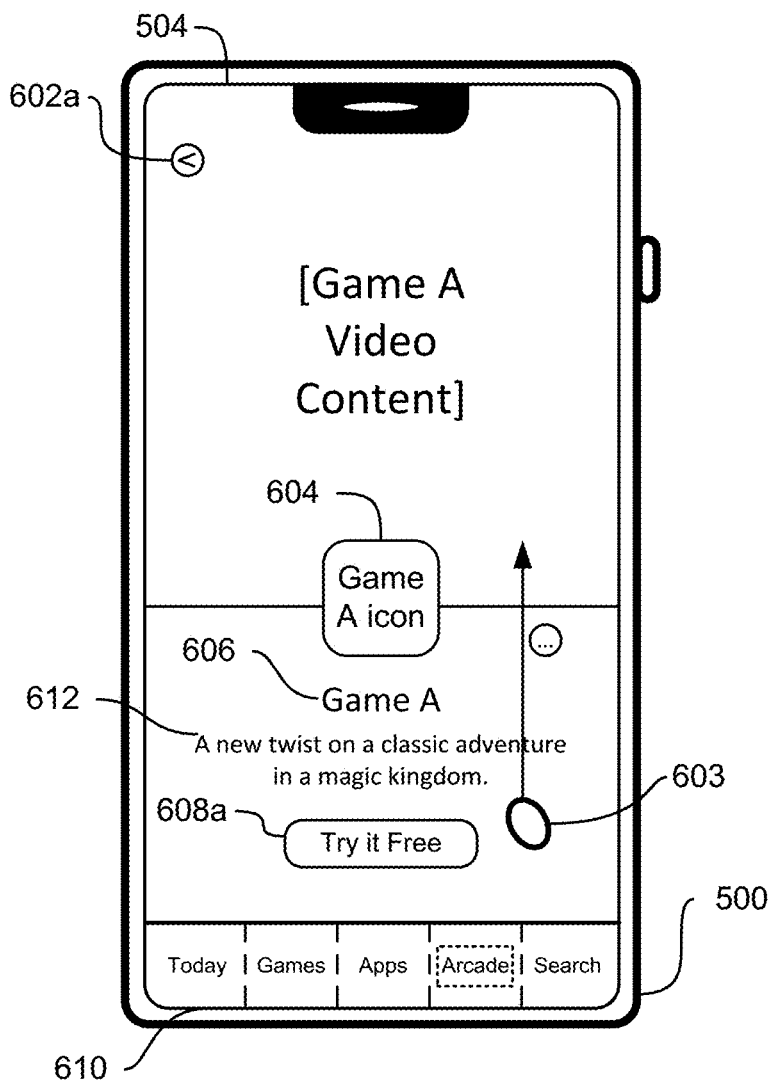
FIGS. 6A-6BB illustrate exemplary ways in which an electronic device presents user interfaces of the application store that are specific to a respective application in accordance with some embodiments.
Figure 6B:
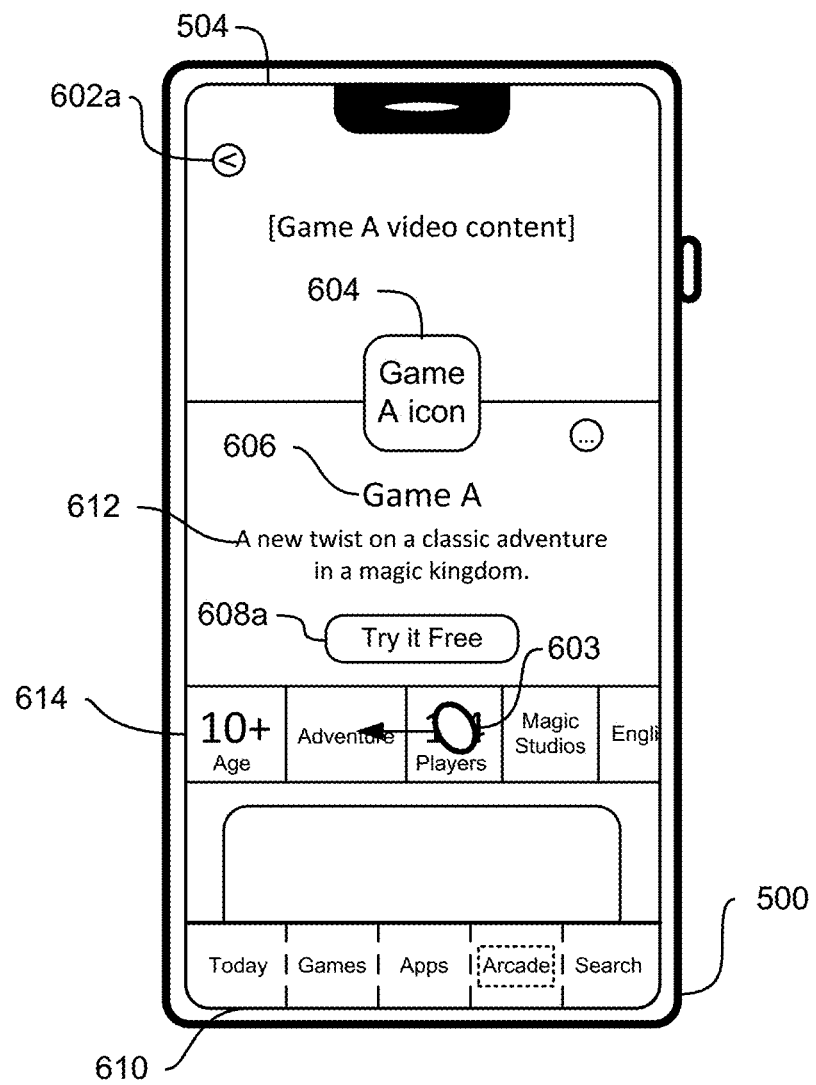

FIGS. 6A-6BB illustrate exemplary ways in which an electronic device 500 presents user interfaces of the application store that are specific to a respective application in accordance with some embodiments. The embodiments in these figures are used to illustrate the processes described below, including the processes described with reference to FIGS. 7A-7I.

FIGS. 6A-6D illustrate an exemplary product page user interface of a subscription application when the user of the electronic device 500 is not subscribed to the subscription service that provides access to the subscription application. As shown in FIG. 6A, the product page user interface includes a selectable option 602a that, when selected causes the electronic device 500 to navigate backward in the user interface. The user interface further includes an image 604 of an icon that represents the application, the name 606 of the application, a description 612 of the application, and a selectable option 608a that, when selected, causes the electronic device to initiate a process to subscribe to the subscription service that provides access to the application. The user interface further includes a navigation bar 610 that includes a plurality of selectable options for navigating to different user interfaces of the application store application. As shown in FIG. 6A, the user scrolls (e.g., with contact 603) down in the user interface.

As shown in FIG. 6B, in response to the user's scrolling in FIG. 6A, the electronic device 500 scrolls the product page user interface to reveal an information ribbon 614. The information ribbon 614 includes information about the application, such as the recommended age, the genre, the number of players, the developer, and the language of the application. The information ribbon 614 is horizontally scrollable to reveal additional information. As shown in FIG. 6B, the user scrolls (e.g., with contact 603) the information ribbon.

Figure 6C:
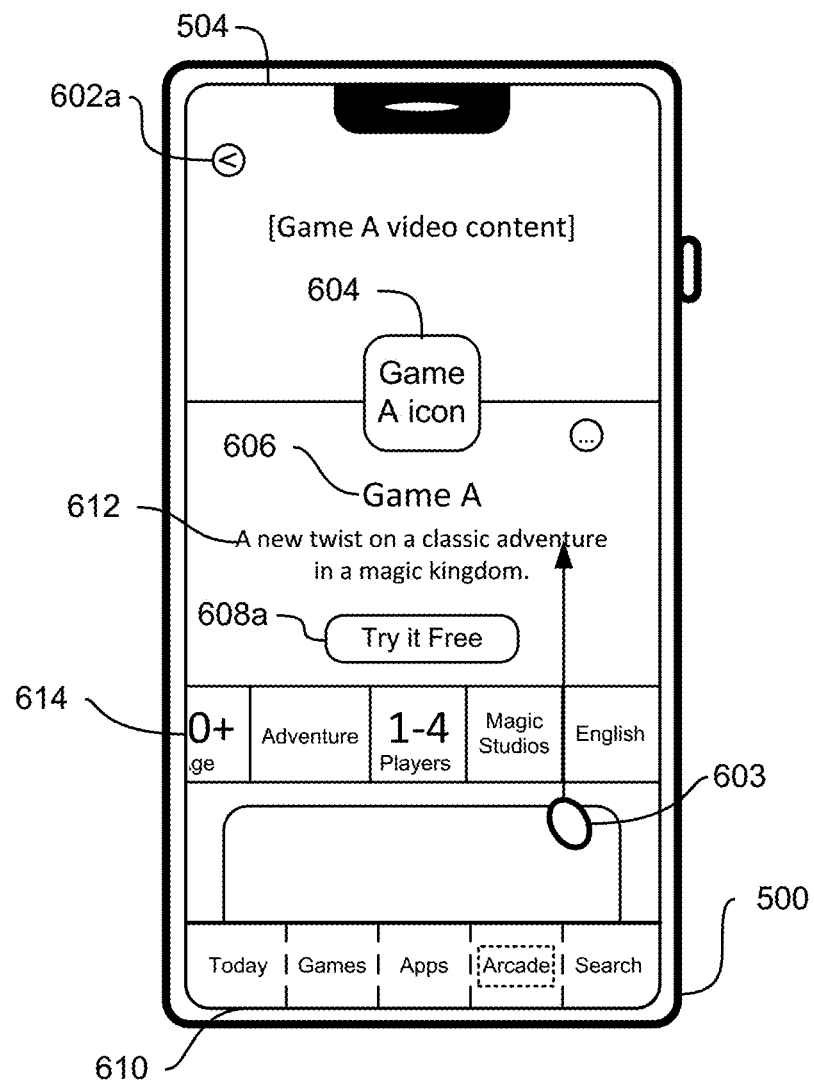

As shown in FIG. 6C, in response to the user's scrolling in FIG. 6B, the electronic device scrolls the information ribbon to reveal the language of the application. The electronic device 500 continues to present the selectable option 602*a* with the same appearance as before because the user has not scrolled past a predetermined point in the user interface at which the selectable option 602*a* changes appearance. The small appearance of the selectable option 602*a* allows the electronic device 500 to present as much of the Game A video content as possible. The user scrolls (e.g., with contact 603) the user interface down.

Figure 6D:
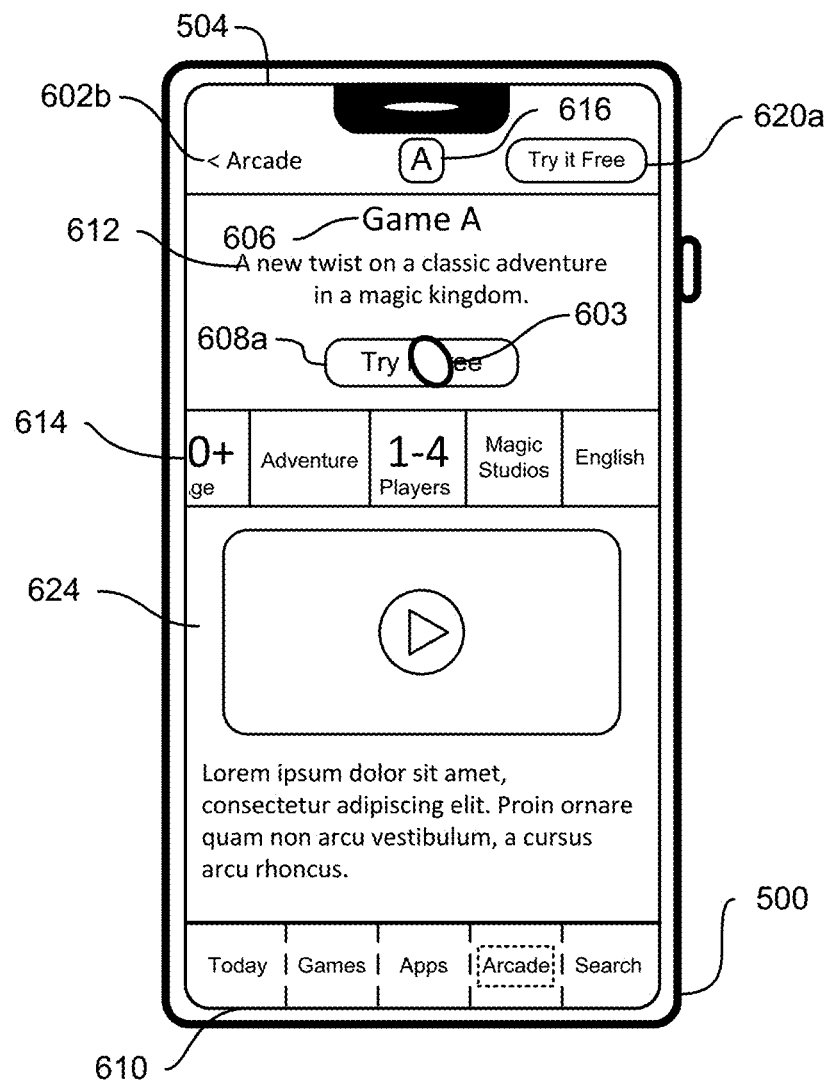

As shown in FIG. 6D, in response to the user's scrolling, the electronic device 500 scrolls the user interface down. The electronic device 500 now presents a selectable option 602*b* with a different appearance in a header of the user interface. The header further includes an image 616 of the icon that represents the application and a selectable option 620*a* that, when selected, causes the electronic device 500 to initiate a process to subscribe to the subscription service that provides access to the application. The user interface further includes video content 624 related to the application, such as a trailer of the application or a video demonstration of the application. As shown in FIG. 6D, the user selects (e.g., with contact 603) the selectable option 608*a*. In response to the user's selection, the electronic device 500 presents a user interface for subscribing to the subscription service that provides access to the application, as shown in FIG. 6E.

Figure 6E:
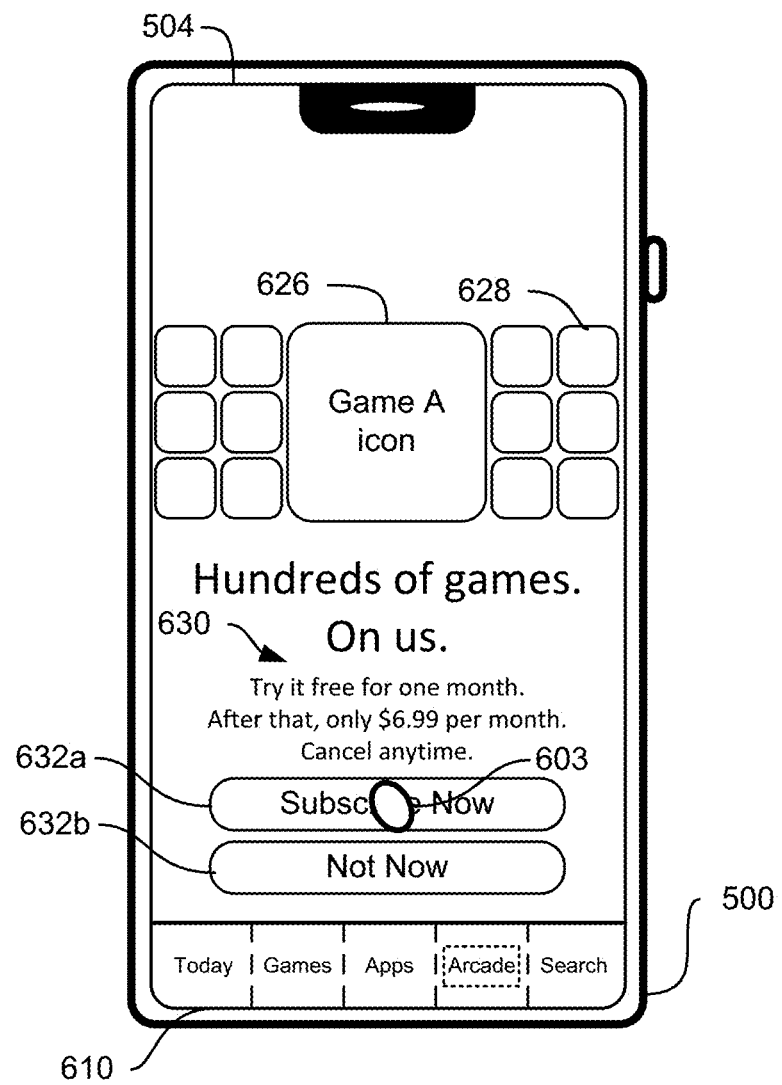

FIG. 6E illustrates a user interface including information 630 about subscribing to the subscription service that provides access to the application. The user interface further includes an image 626 of the icon that represents the subscription application, and a plurality of other images 628 of icons representing other applications that are available through the subscription service. The user interface further includes a selectable option 632*a* that, when selected, causes the electronic device 500 to subscribe to the subscription service and a selectable option 632*b* to close the user interface without subscribing to the subscription service. As shown in FIG. 6E, the user selects (e.g., with contact 603) the option 632*a* to subscribe to the subscription service. In response to the user's selection, the electronic device 500 presents a payments user interface from which the user is able to pay for access to the subscription service, as shown in FIG. 6F.

Figure 6F:
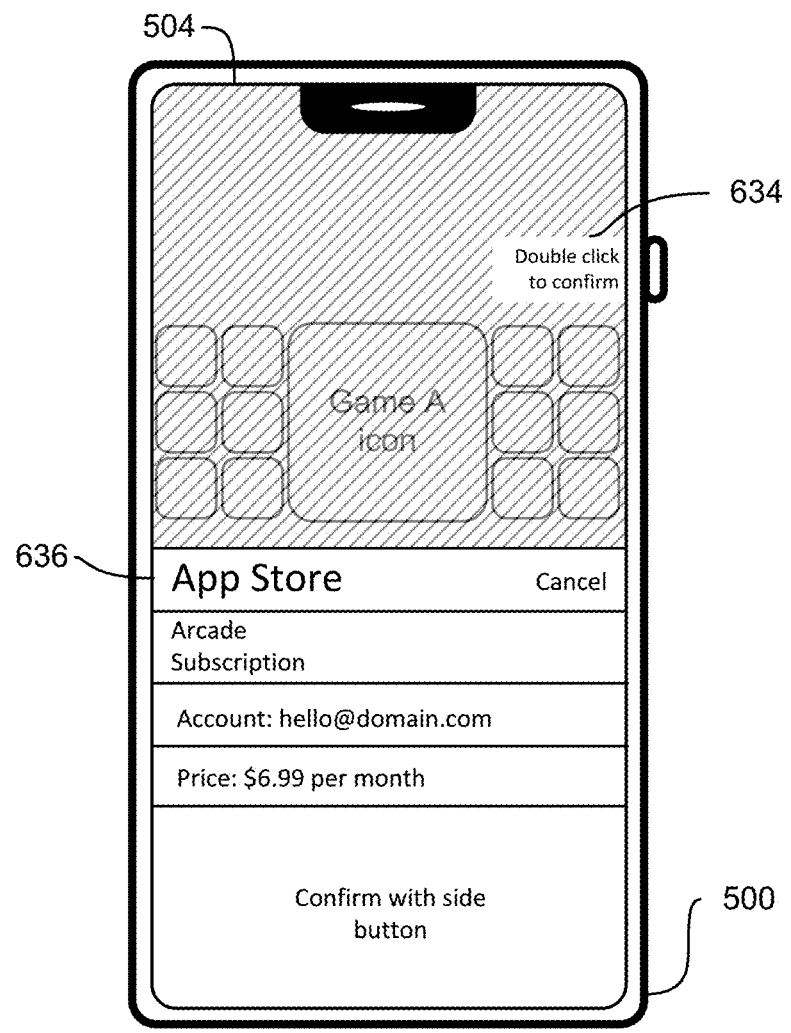

FIG. 6F illustrates the payments user interface. The payments user interface includes information 636 about the subscription. In some embodiments, not all of the information illustrated in FIG. 6F is shown in the payments user interface. The user interface further includes an indication 634 to the user to double-click a button of the electronic device 500 to confirm the purchase.

Figure 6G:
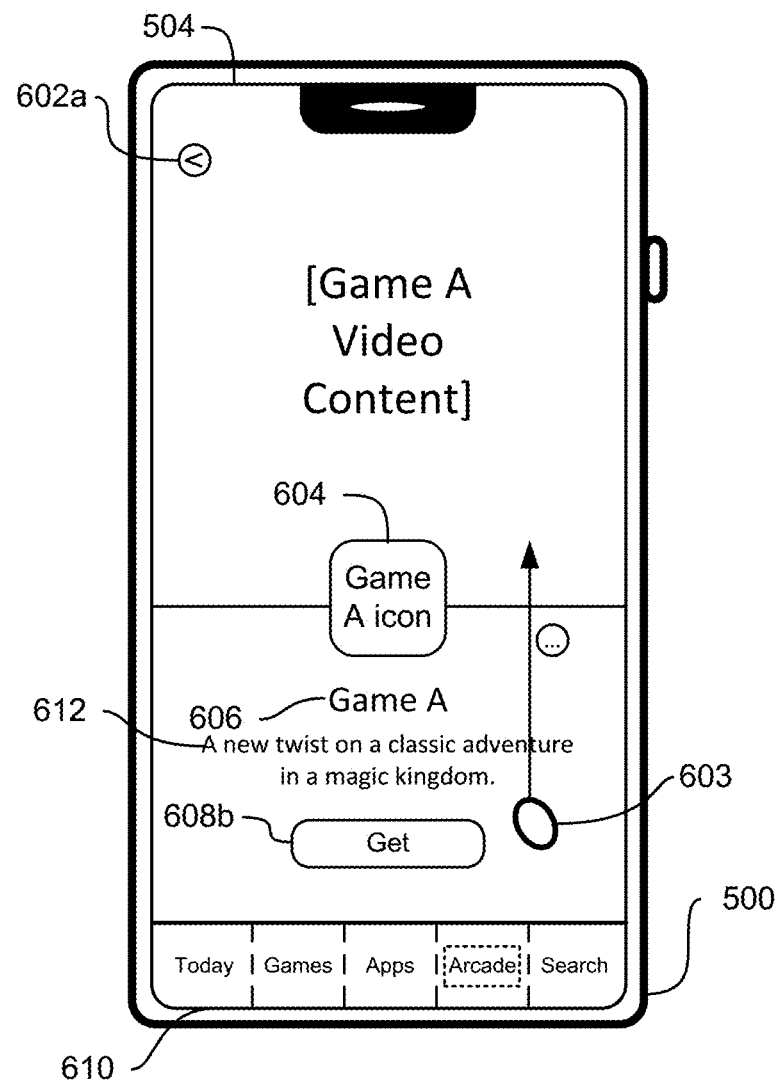

FIG. 6G illustrates the product page user interface when the user is subscribed to the subscription service that provides access to the application. The product page user interface includes the same elements as the elements included in the user interface when the user was not subscribed to the subscription service, except the user interface includes a selectable option 608*b* for downloading the application instead of a selectable option to subscribe to the subscription service (e.g., because the application is not currently downloaded on the electronic device). As shown in FIG. 6G, the user scrolls (e.g., with contact 603) down in the user interface. In response to the user's scrolling, the electronic device presents additional content of the user interface.

Figure 6H:
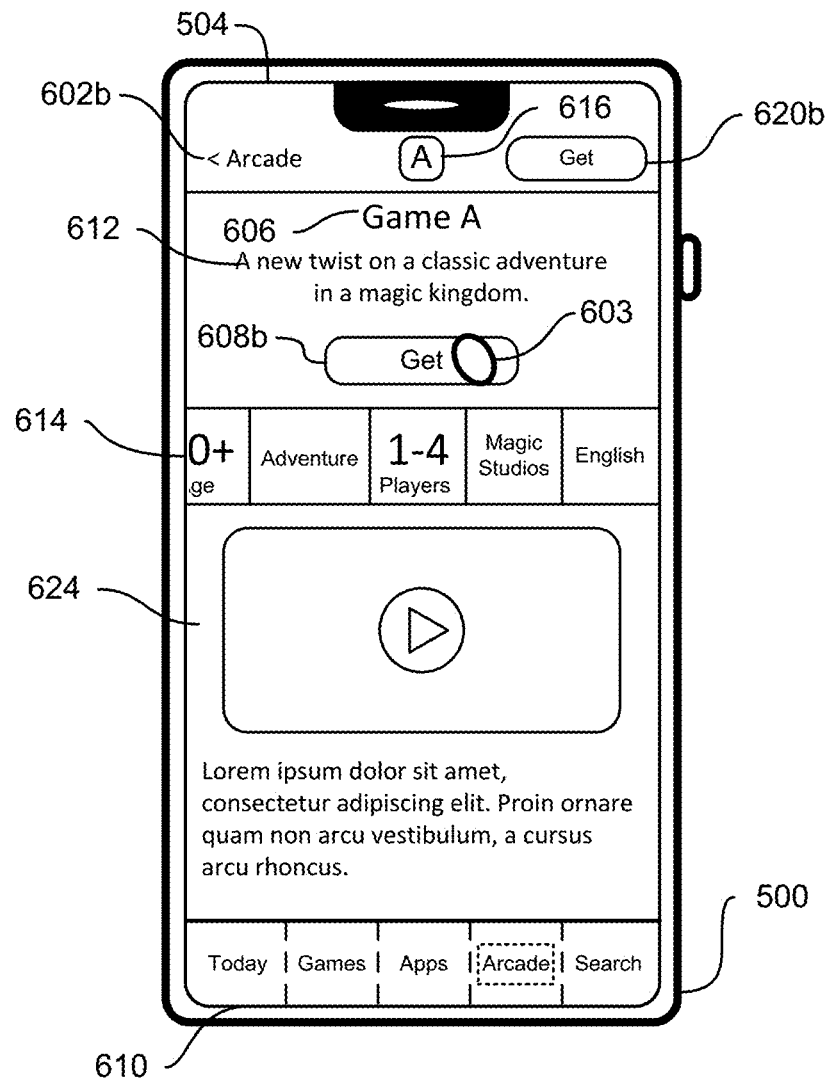

As shown in FIG. 6H, when the user scrolls past a predetermined point in the user interface, the electronic device 500 presents the selectable option 602*b* for navigating backwards in a header region of the user interface. The header region also includes an image 616 of the icon that represents the application and a selectable option 620*b* to download the application. The user interface further includes the video content 624 (e.g., a trailer or a demonstration video) related to the application. As shown in FIG. 6H, the user selects (e.g., with contact 603) the selectable option 608*b* to download the application.

Figure 6I:
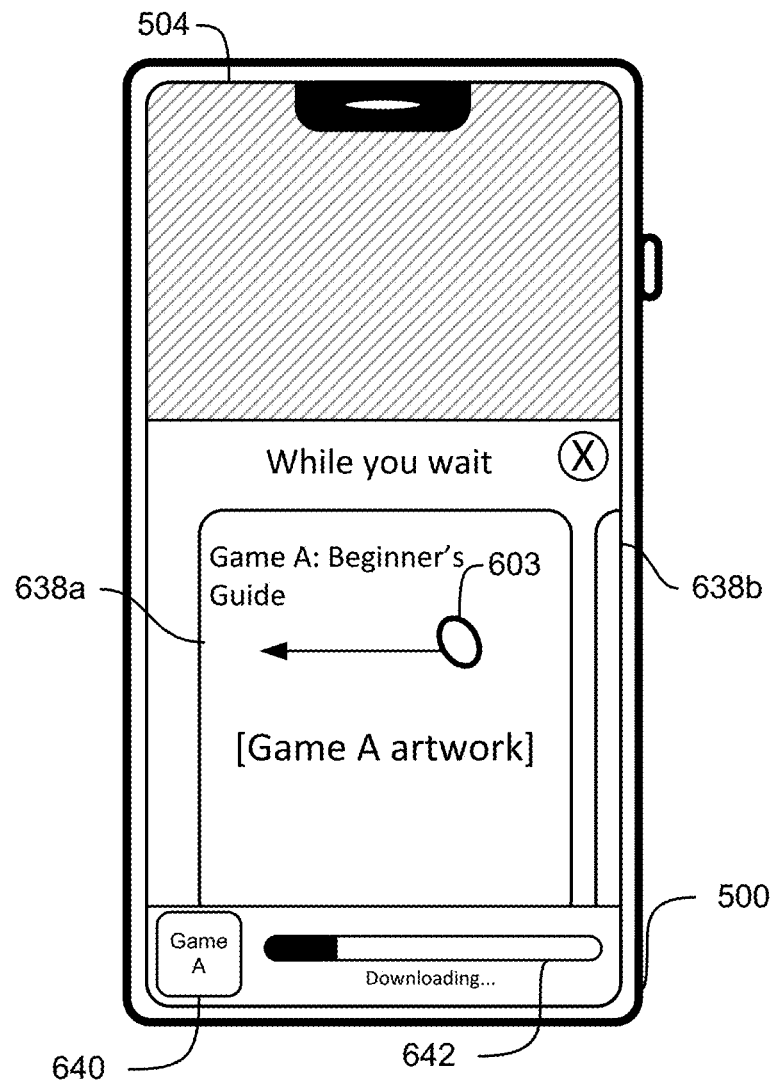

FIGS. 6I-6S illustrate possible behaviors of the electronic device 500 while the application is downloading. FIGS. 6I-6M illustrate the electronic device 500 presenting a plurality of representations of editorial stories related to the application while the application is being downloaded. In FIG. 6I, the electronic device 500 presents a plurality of representations 638*a-b* of editorial stories that are horizontally scrollable. As shown in FIG. 6I, one of the stories 638*a* is about the application that is being downloaded. The user interface further includes an image 640 of the icon that represents the application and a download progress bar 642. As shown in FIG. 6I, the user scrolls (e.g., with contact 603) the representations 638*a-b* of the stories. In response to the user's scrolling, the electronic device 500 scrolls the representations 638*a-b* of the stories to reveal representation 638*b* in full.

Figure 6J:
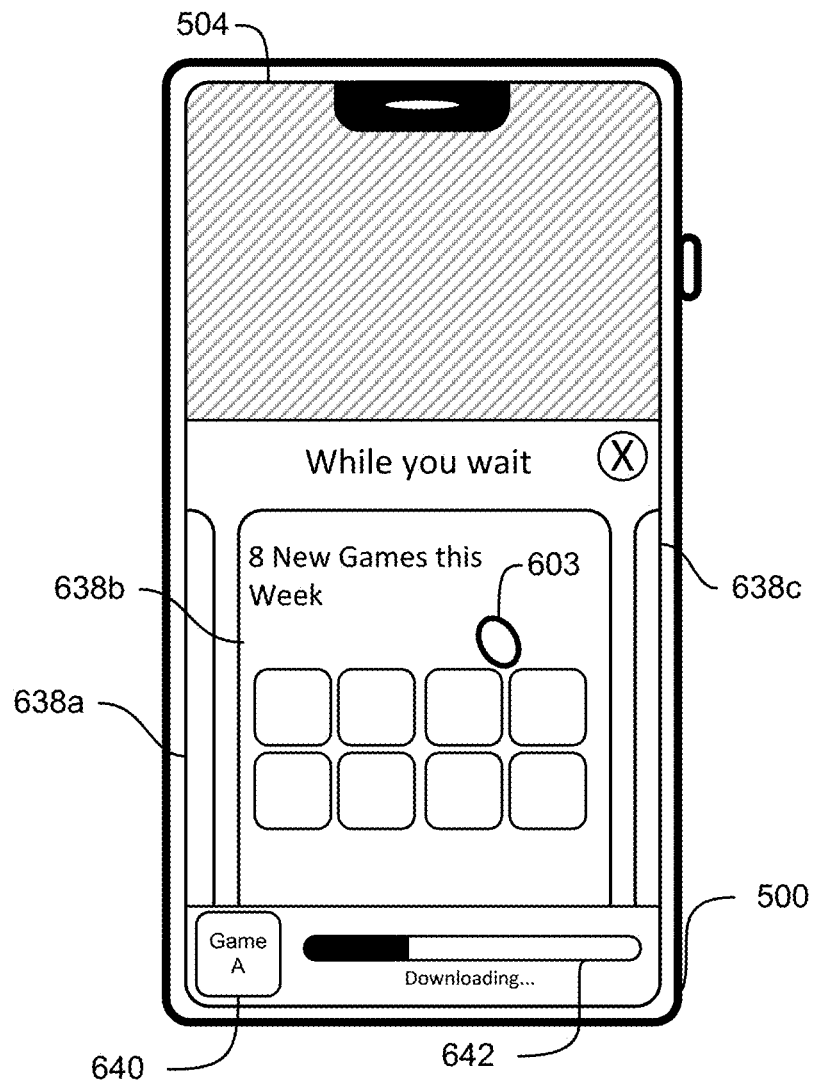

FIG. 6J illustrates the user interface including the representations 638*a-c* of editorial stories after the user scrolls. The download progress bar 642 indicates the updated status of the download process. The progress bar 642 continuously updates as the download process occurs (e.g., rather than only updating in response to the user's scrolling). As shown in FIG. 6J, the user selects (e.g., with contact 603) the representation 638*b* of an editorial story. In response to the user's selection, the electronic device 500 presents the editorial story while the download process continues.

Figure 6K:
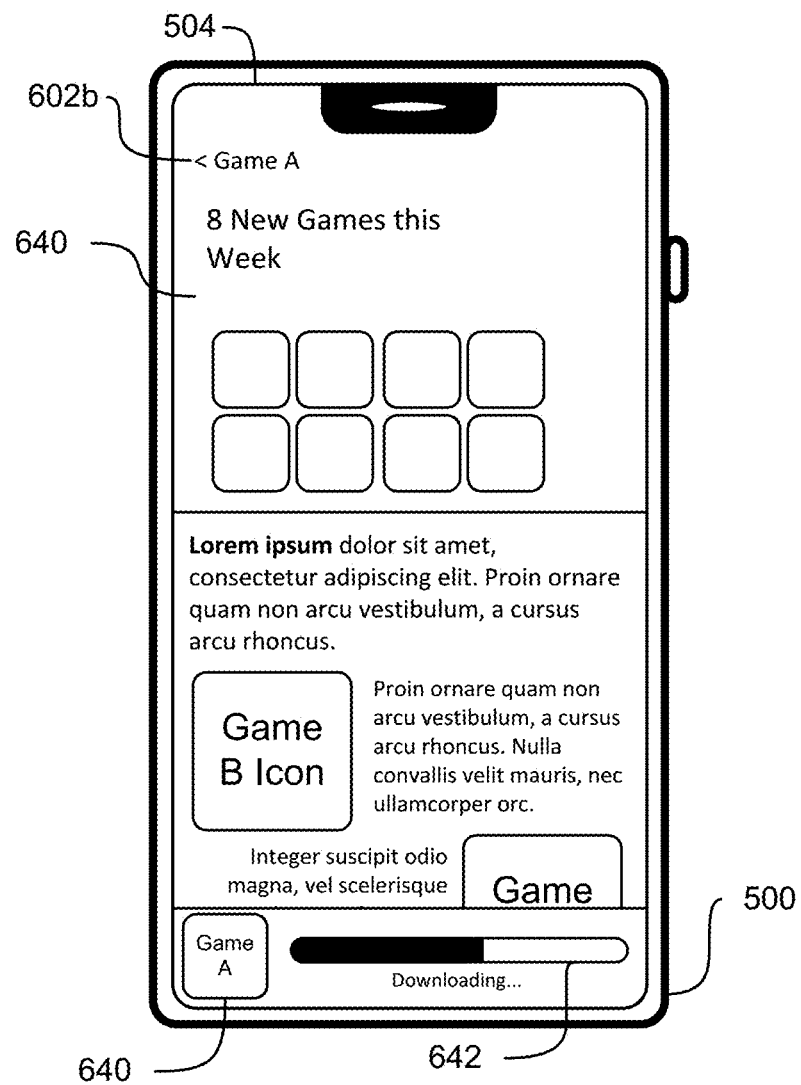

FIG. 6K illustrates the editorial story 640 represented by the representation 638*b* selected by the user in FIG. 6J. The editorial story 640 includes text and images about subscription games. While presenting the editorial story 640, the electronic device 602*b* presents a selectable option 602*b* that, when selected, causes the electronic device 500 to navigate back in the user interface (e.g., to the product page user interface of the application or to the user interface including the plurality of representations of editorial stories). The electronic device 500 continues to present the image 640 of the icon of the application and the download progress bar 642.

Figure 6L:
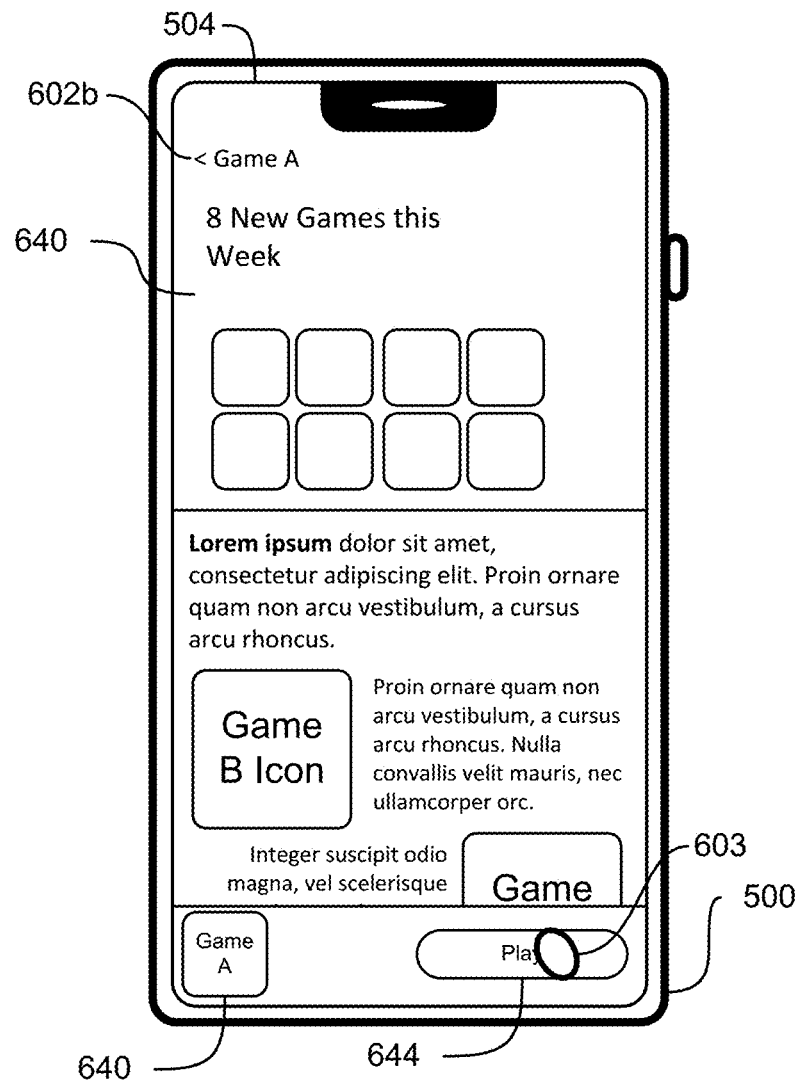

FIG. 6L illustrates the user interface when the download process is complete. As shown in FIG. 6L, when the download process is complete, the electronic device 500 stops presenting the download progress bar 642 and presents a selectable option 644 that, when selected, causes the electronic device 500 to open the application. As shown in FIG. 6L, the user selects (e.g., with contact 603) the selectable option 644 to open the application.

Figure 6M:
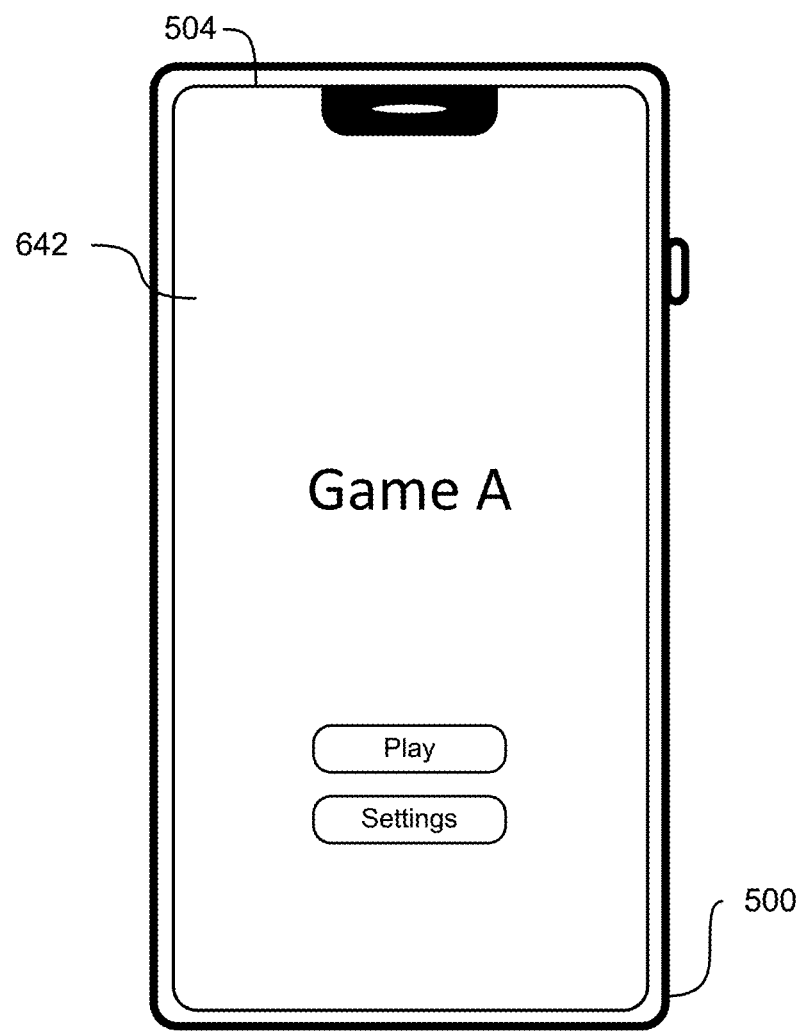

In response to the user's selection in FIG. 6L, the electronic device 500 presents the user interface 642 of the application, as shown in FIG. 6M.

Figure 6N:
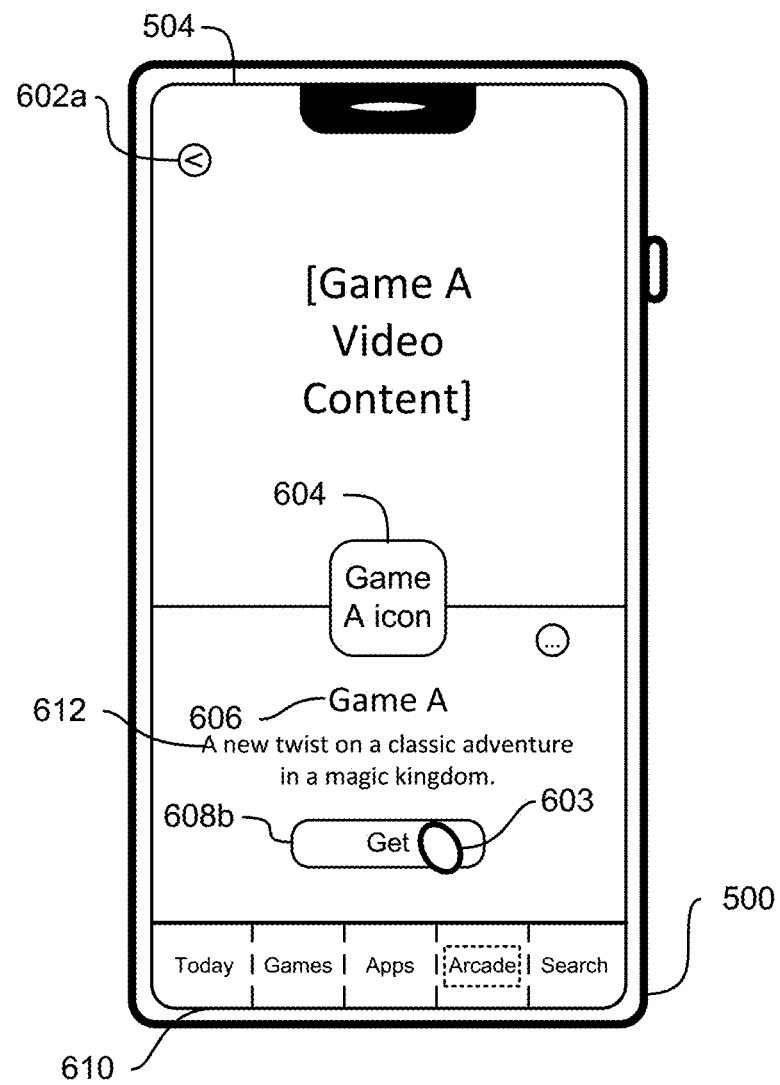
Figure 6O:
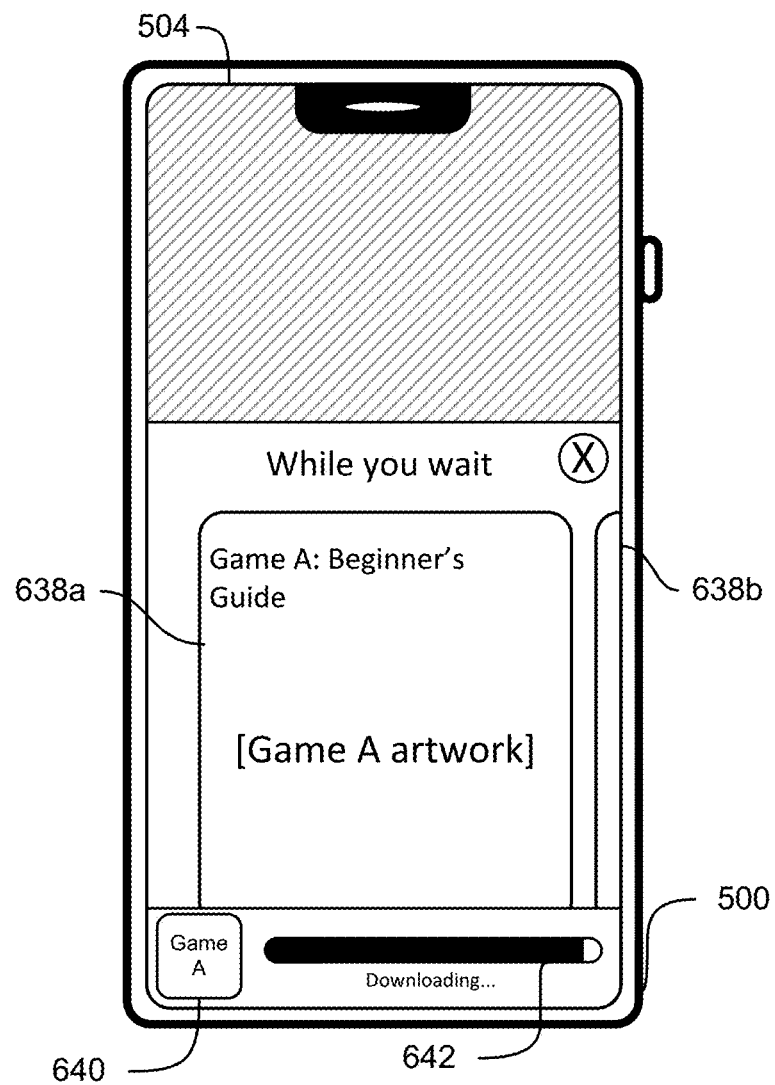
Figure 6P:
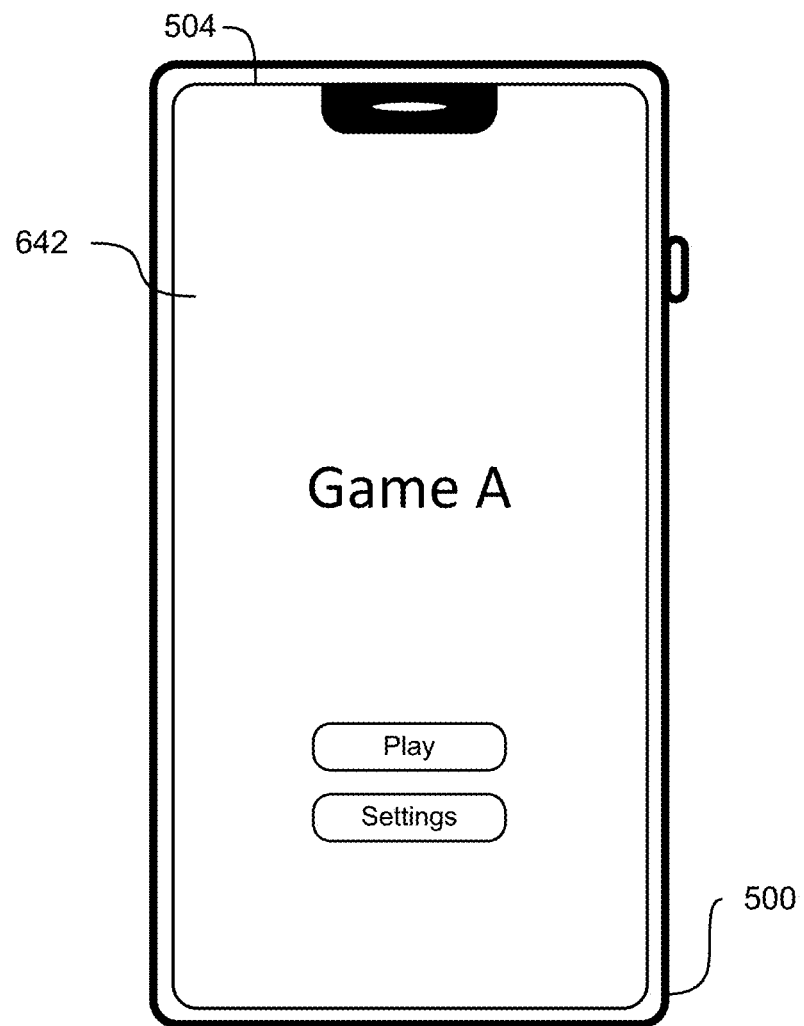

FIGS. 6N-6P illustrate the electronic device 500 presenting representations of stories while the application is being downloaded and presenting the application when the download process is complete. In FIG. 6N, the electronic device presents the product page user interface of the application while the user is subscribed to the subscription service that provides access to the application and while the application is not downloaded to the electronic device 500. The user selects (e.g., with contact 603) the selectable option 608*b* to download the application. In response to the user's selection, the electronic device 500 initiates the process to download the application, as shown in FIG. 6O.

FIG. 6O shows the user interface including the selectable representations 638a-b of editorial stories during the download process. The user interface further includes the image 640 of the icon representing the application and the progress bar 642 indicating the progress of the download process.

In FIG. 6P, in response to completing the download process, the electronic device 500 presents automatically presents the user interface 642 of the application.

Figure 6Q:
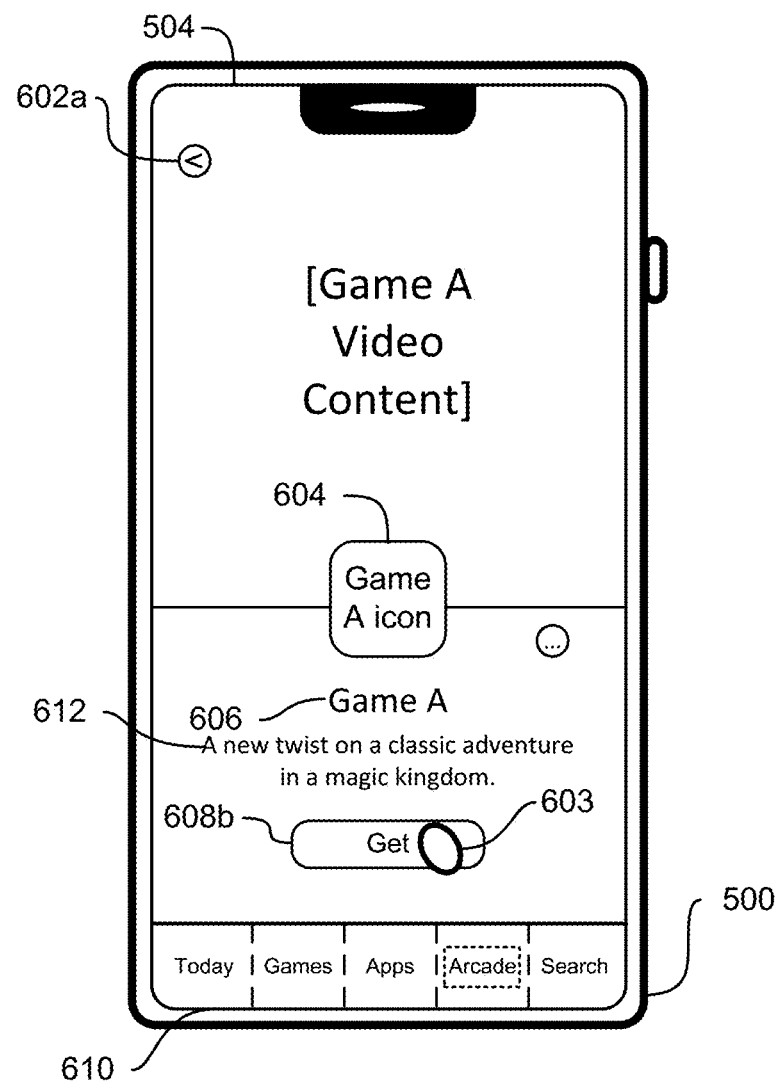
Figure 6R:
Figure 6S:
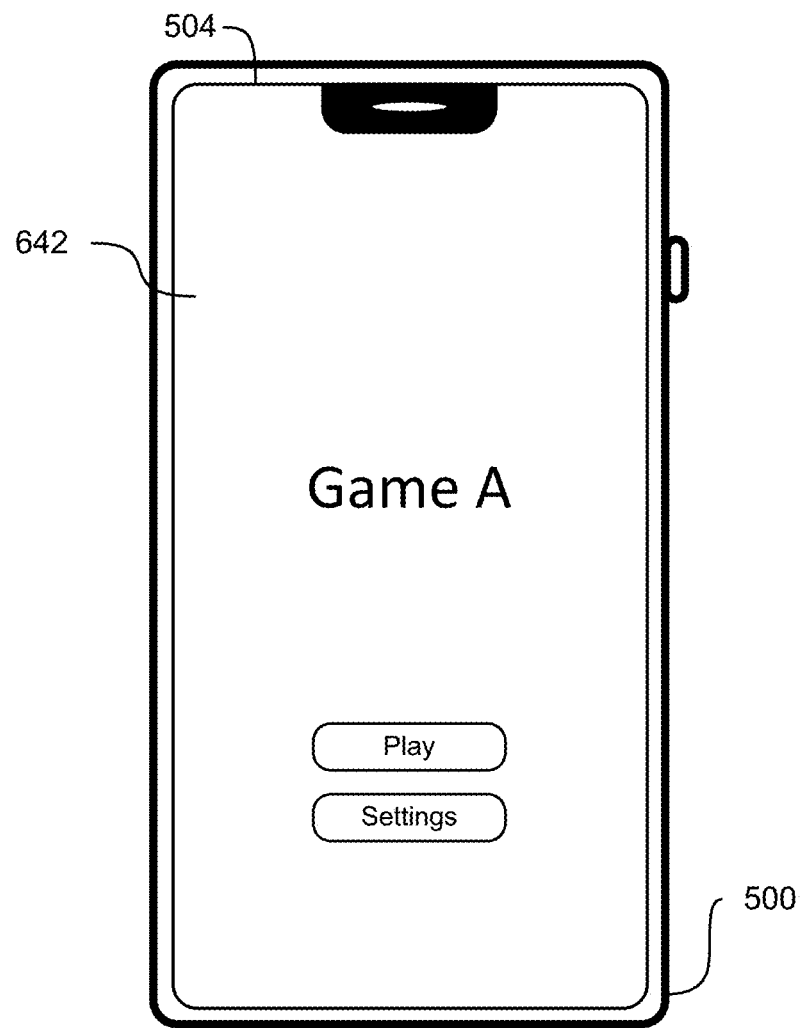

FIGS. 6Q-6S illustrate the electronic device presenting a video trailer of the application during the download process. In FIG. 6Q, the user selects (e.g., with contact 603) a selectable option 608b to download the application. As shown in FIG. 6R, in response to the user's selection, the electronic device 500 presents a video trailer 644 of the application while the download process occurs.

As shown in FIG. 6S, the electronic device 500 automatically presents the user interface 642 of the application once the download process is complete. In some embodiments, the electronic device 500 waits until the video trailer has finished playing before presenting the user interface 642 of the application.

Figure 6T:
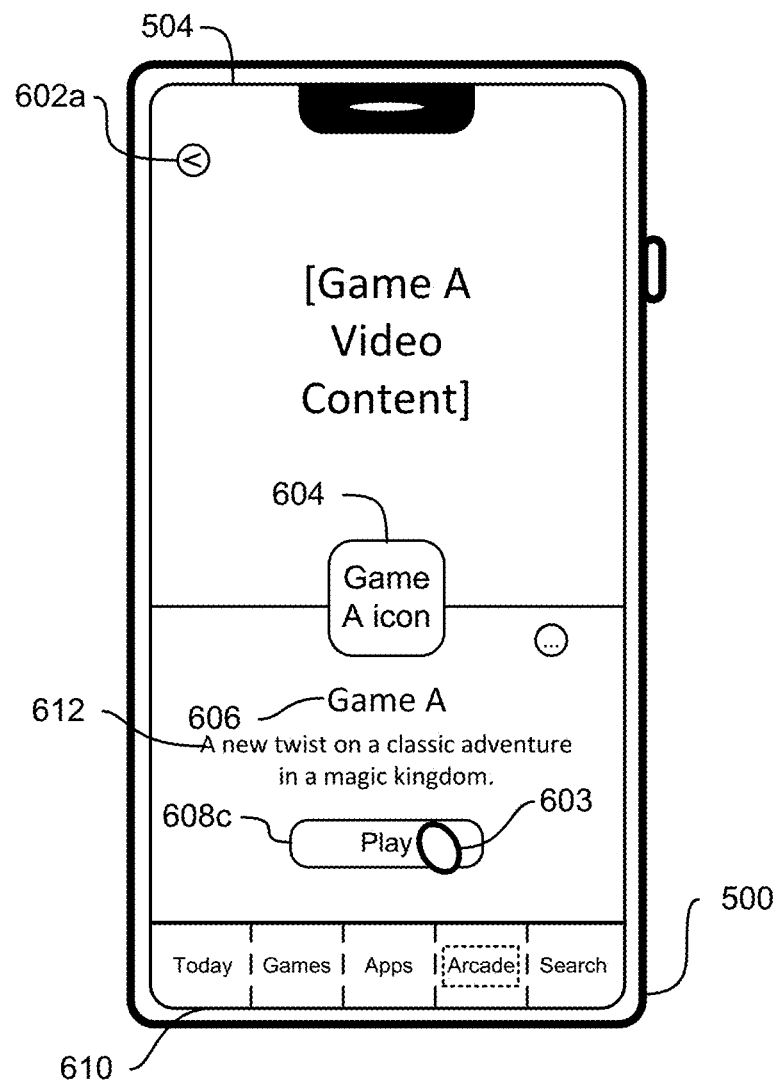
Figure 6U:
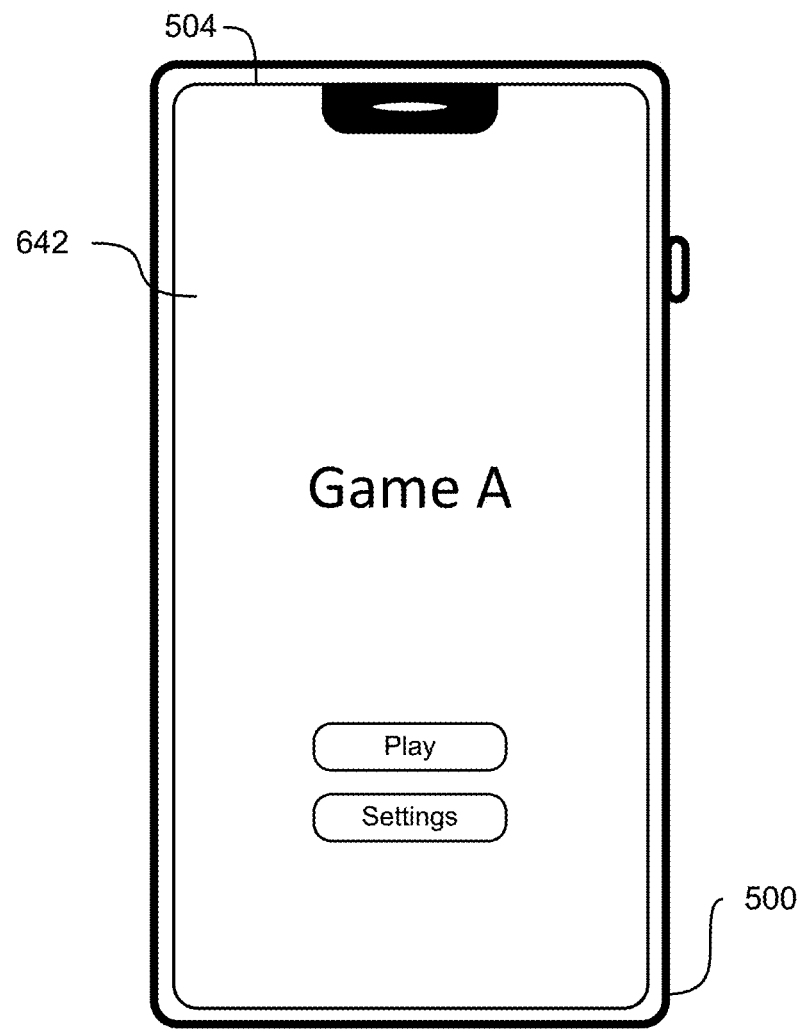

FIG. 6T illustrates the product page user interface after the user has already downloaded the respective subscription application. The product page user interface includes the same components as the product page user interface described above with reference to FIG. 6A, except it includes a selectable option 508c that, when selected, causes the electronic device 500 to open the application. As shown in FIG. 6T, the user selects (e.g., with contact 603) the selectable option 608c. In response to the user's selection, the electronic device 500 opens the application, as shown in FIG. 6U.

Figure 6V:
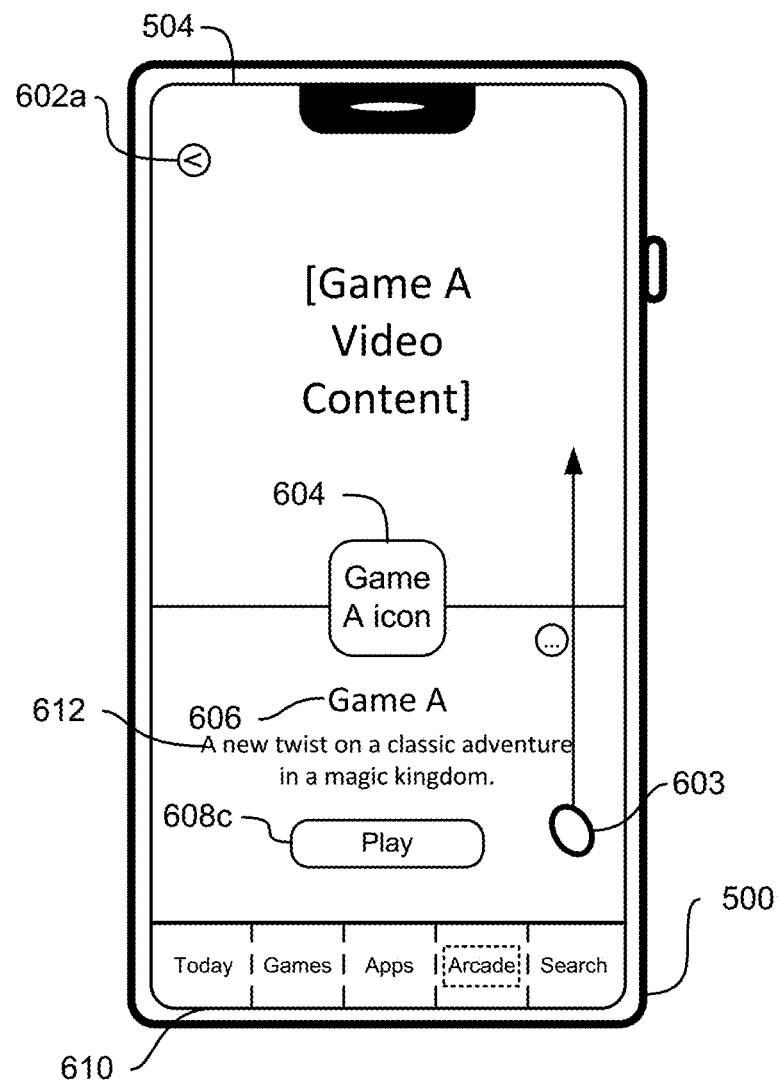

FIGS. 6V-6Y illustrate the product page user interface of the application when the user is subscribed to the subscription service and has downloaded the application. As shown in FIG. 6V, the product page user interface includes the same content that was included before the user downloaded the application, but instead of including a selectable option to download the application, the user interface includes a selectable option 608c to open the application (e.g., because the application is currently already downloaded on the electronic device). As shown in FIG. 6V, the user scrolls (e.g., with contact 603) down in the user interface. In response to the user's scrolling, the electronic device scrolls the user interface in accordance with the input.

Figure 6W:
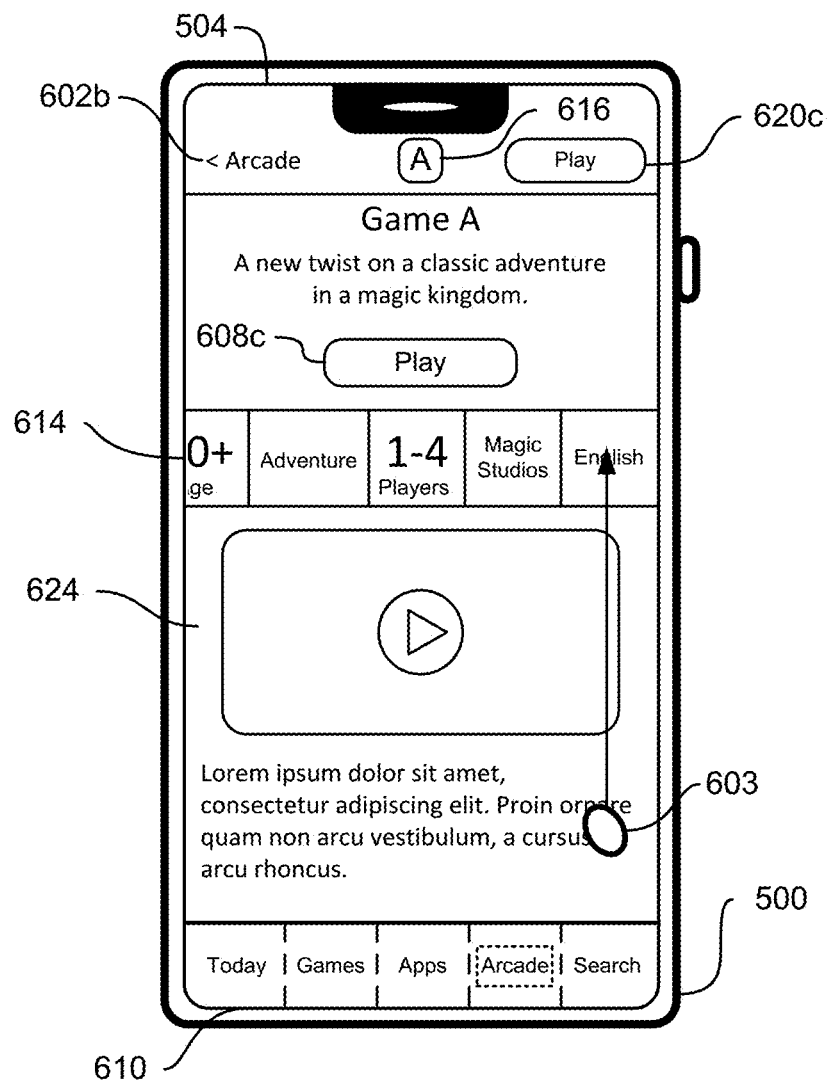

As shown in FIG. 6W, in response to the user's scrolling, the electronic device 500 reveals the information ribbon 614 and the video content 624 (e.g., trailer or demonstration video) related to the application in the user interface. The electronic device 500 presents, in a header region of the user interface, the selectable option 602b to navigate backward in the user interface, the image 616 of the icon that represents the application, and a selectable option 602c to open the application. As shown in FIG. 6W, the user scrolls (e.g., with contact 603) down in the user interface. In response to the user's scrolling, the electronic device reveals a representation 638d of a story related to the application, as shown in FIG. 6X.

Figure 6X:
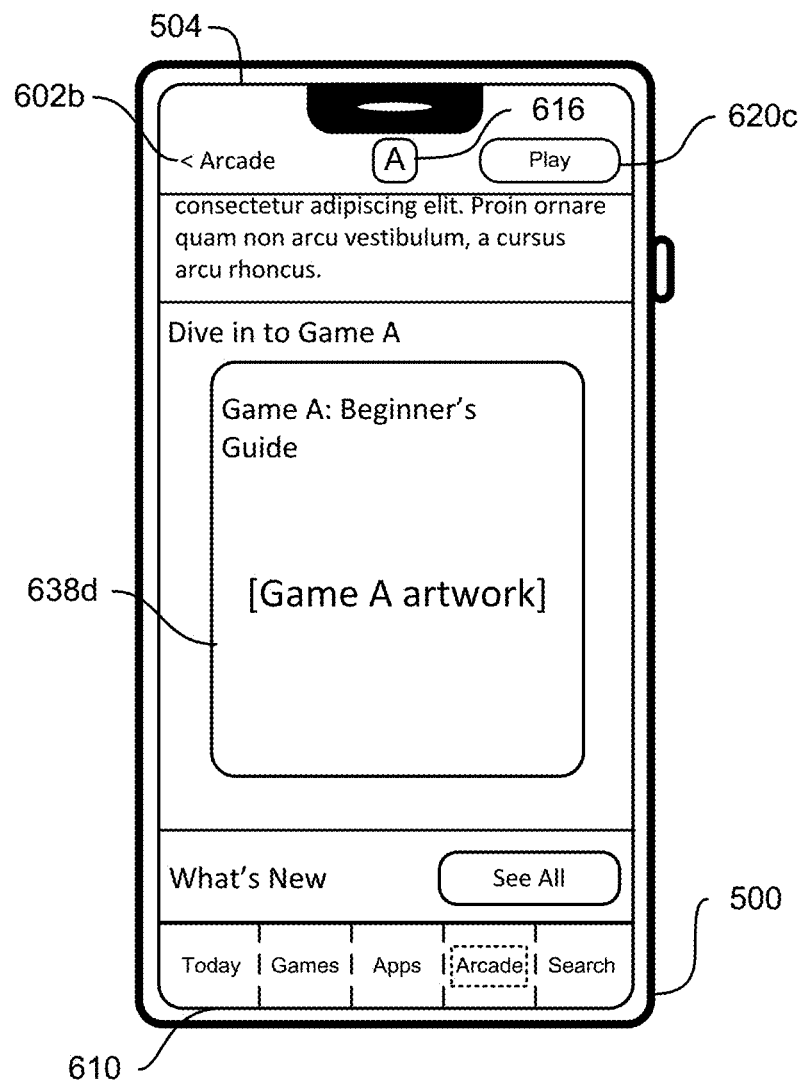

FIG. 6X illustrates a portion of the user interface that includes a representation 638d of a story related to the application. In some embodiments, the electronic device 500 presents representations of multiple stories related to the application in the user interface. As shown in FIG. 6X, when the user views the user interface, the user's progress in the application is level 1. In accordance with the user's progress, the electronic device 500 presents a story related to the user's progress (e.g., "Game A. A Beginner's Guide").

Figure 6Y:
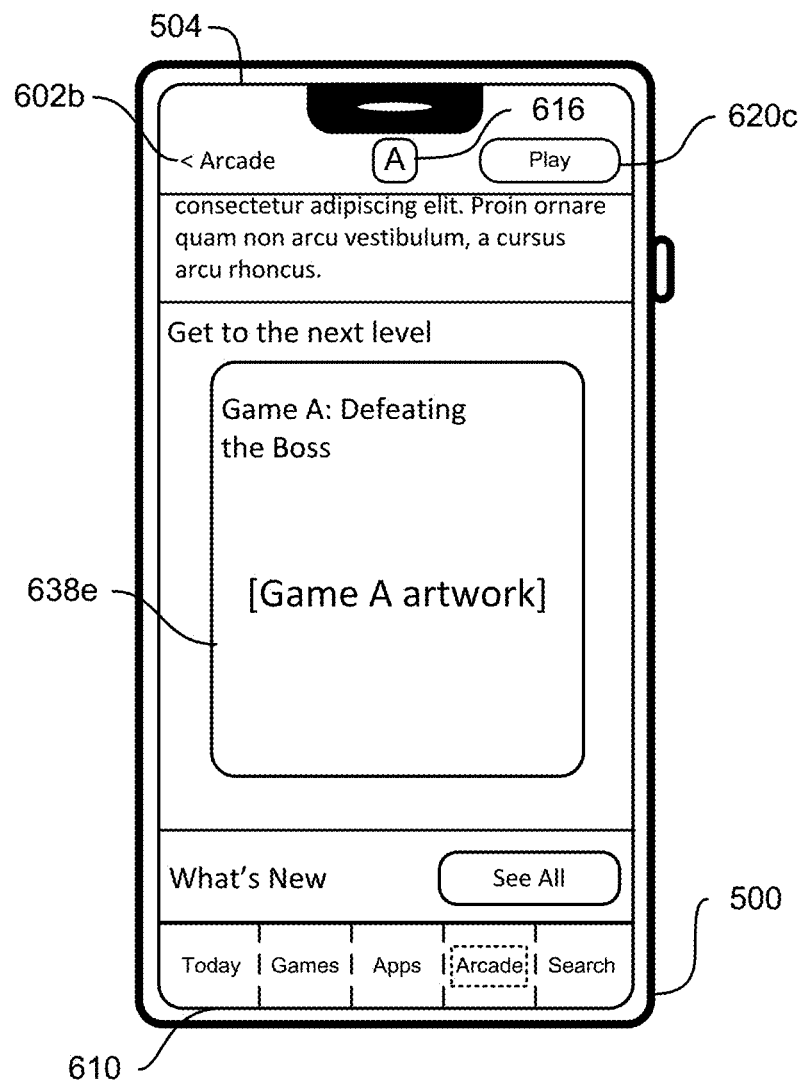

FIG. 6Y illustrates the user interface including a representation 638e of a story related to the application in accordance with a different user progress in the application. As shown in FIG. 6Y, the user's progress in the application is level 20 and the story is related to the user's progress (e.g., "Game A: Defeating the Boss").

Figure 6Z:
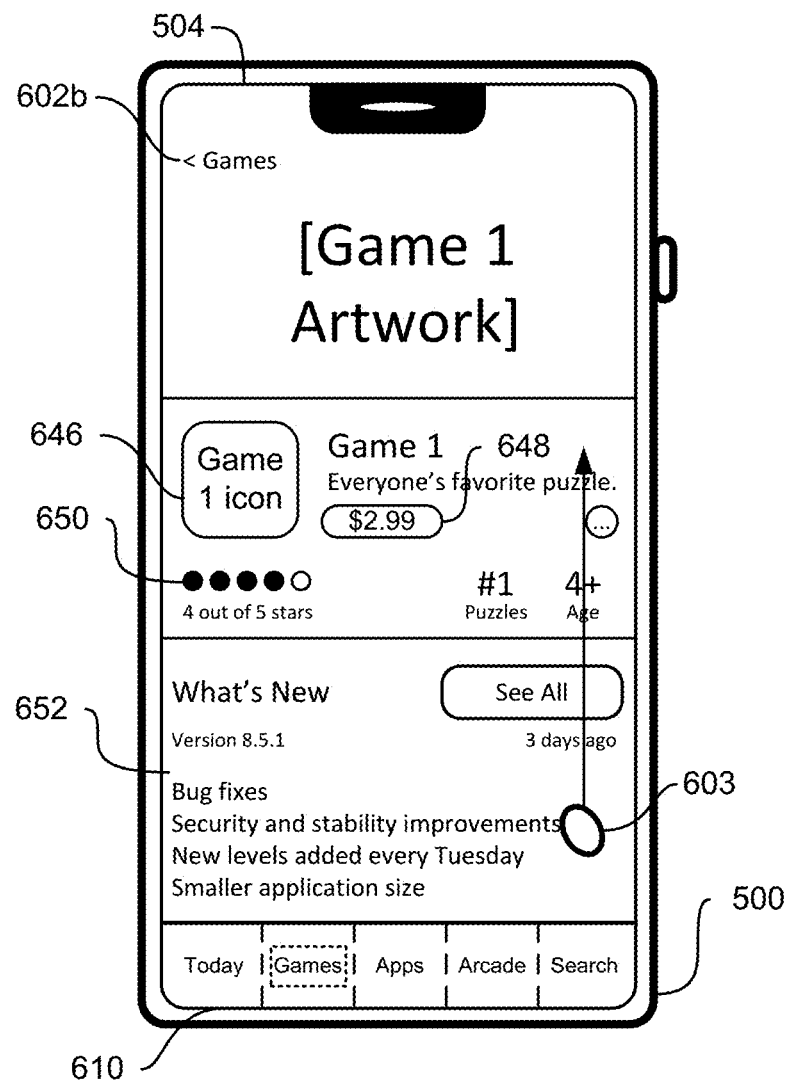
Figure 6A:
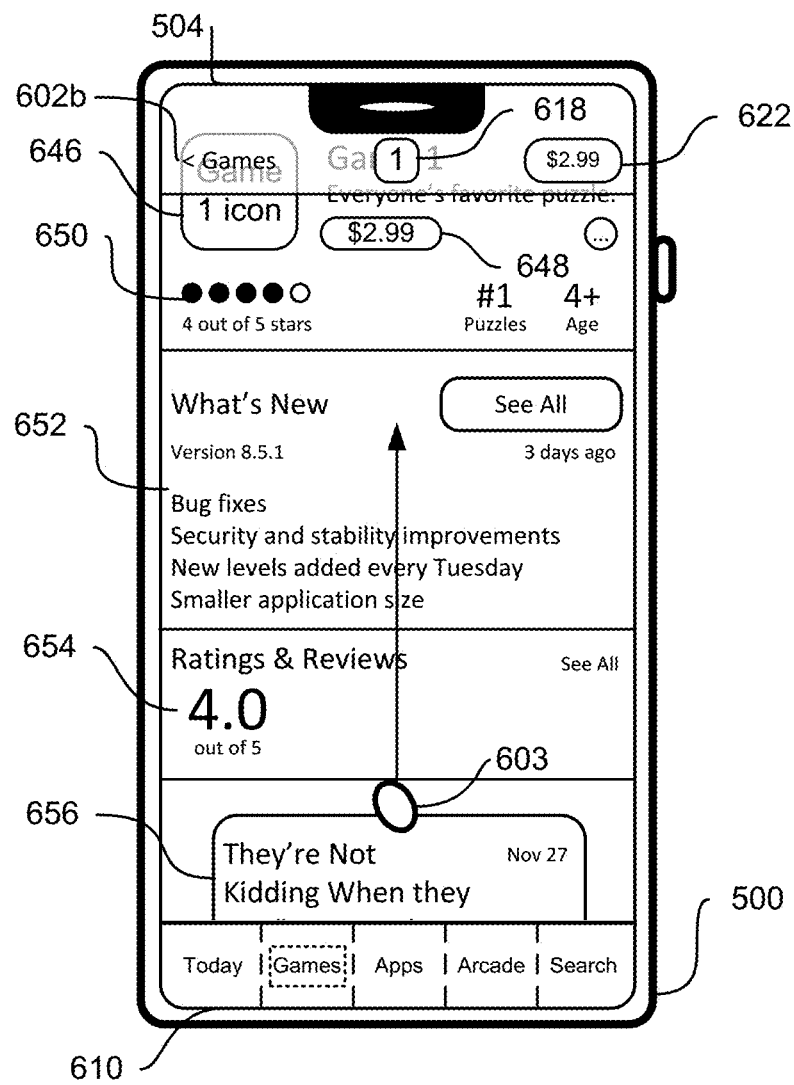
Figure 6B:
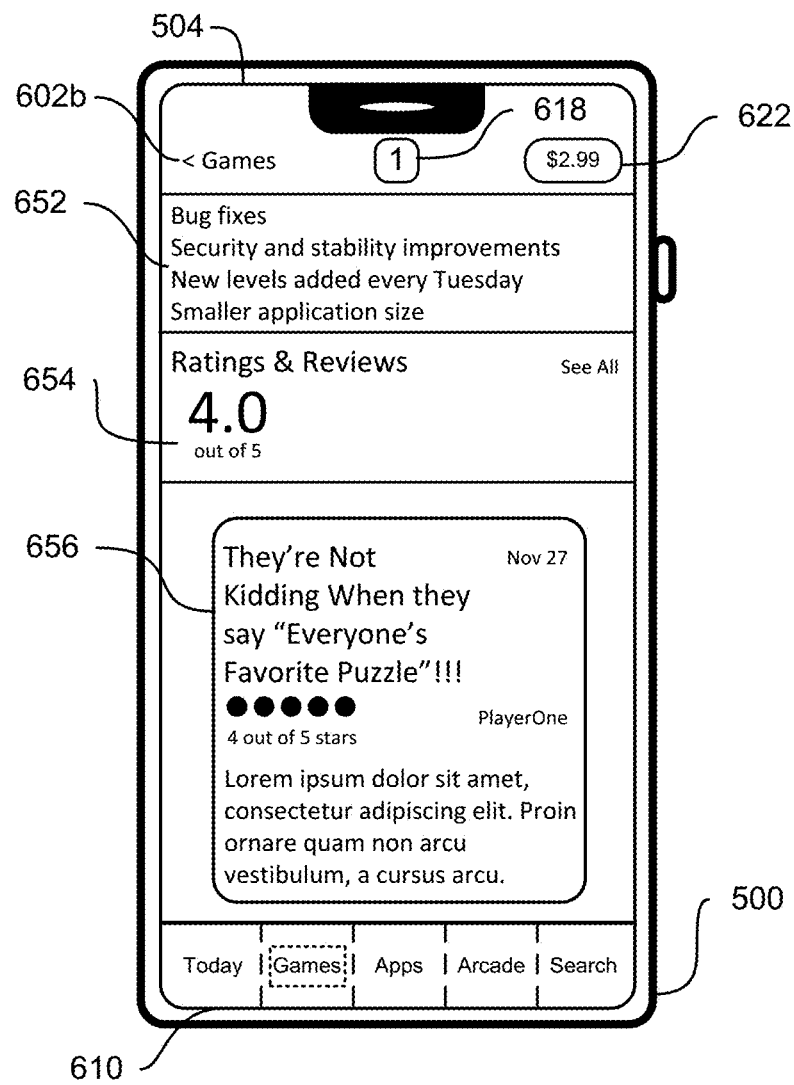
Figure 7A:
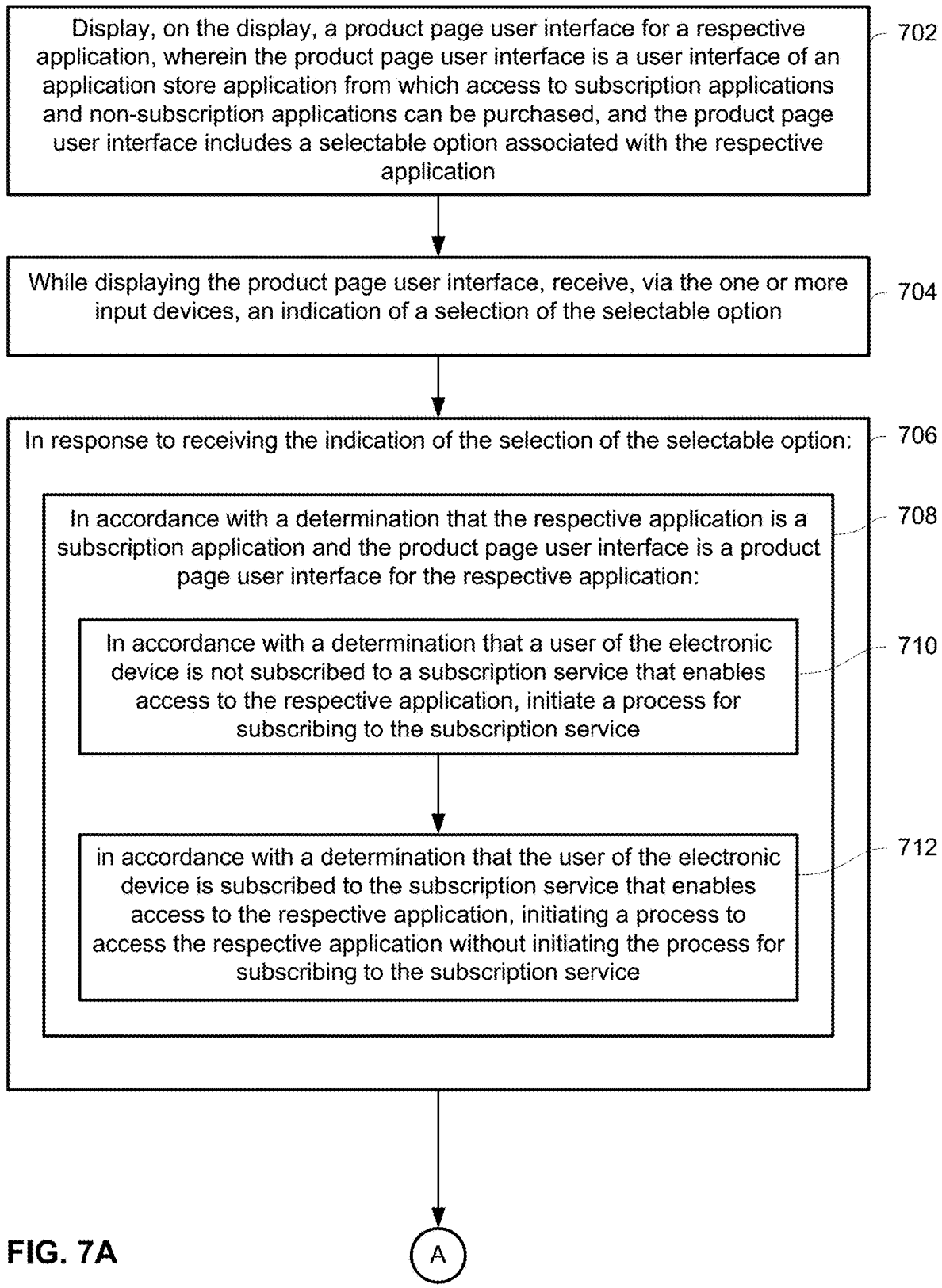
Figure 7B:
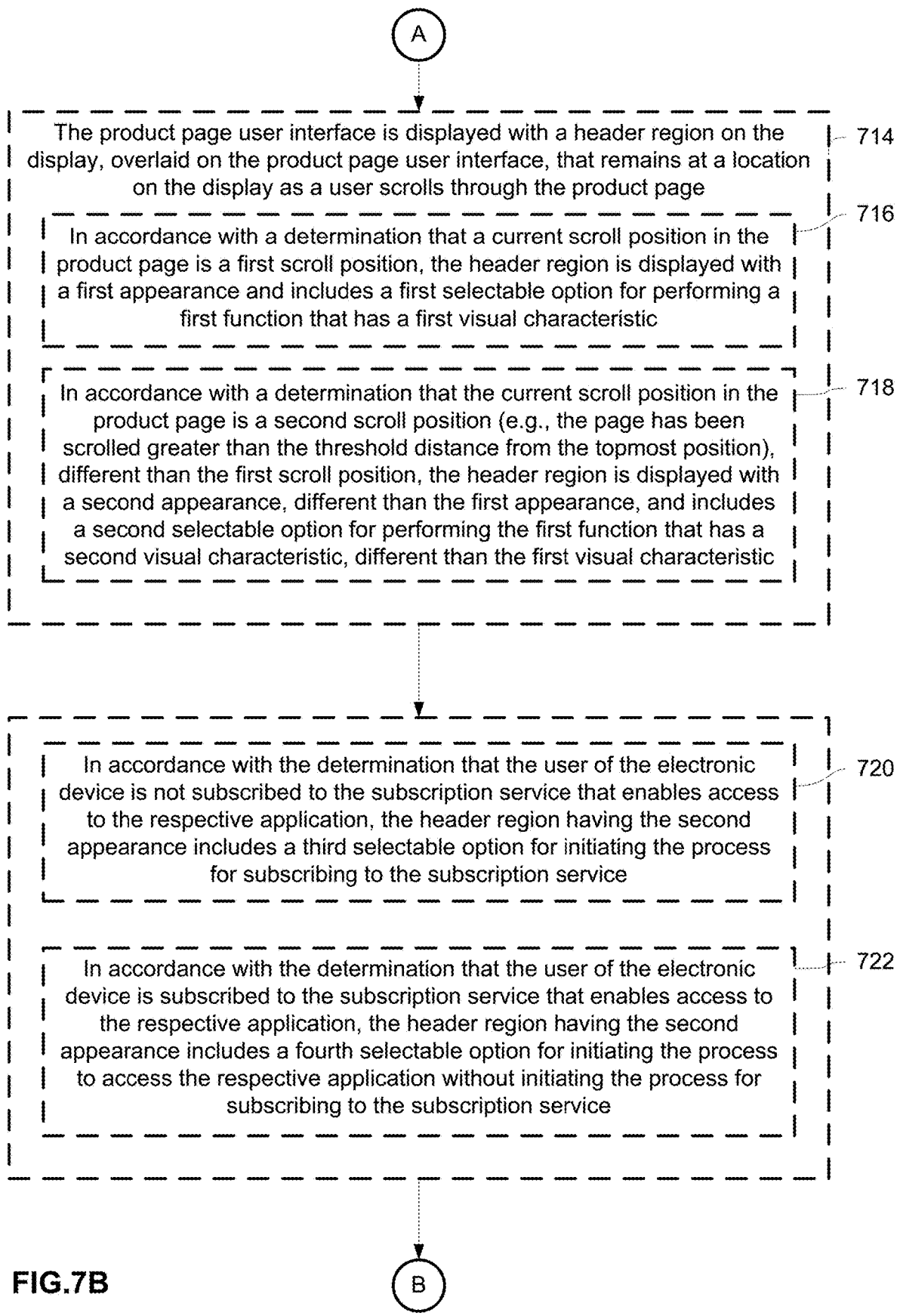
Figure 7E:
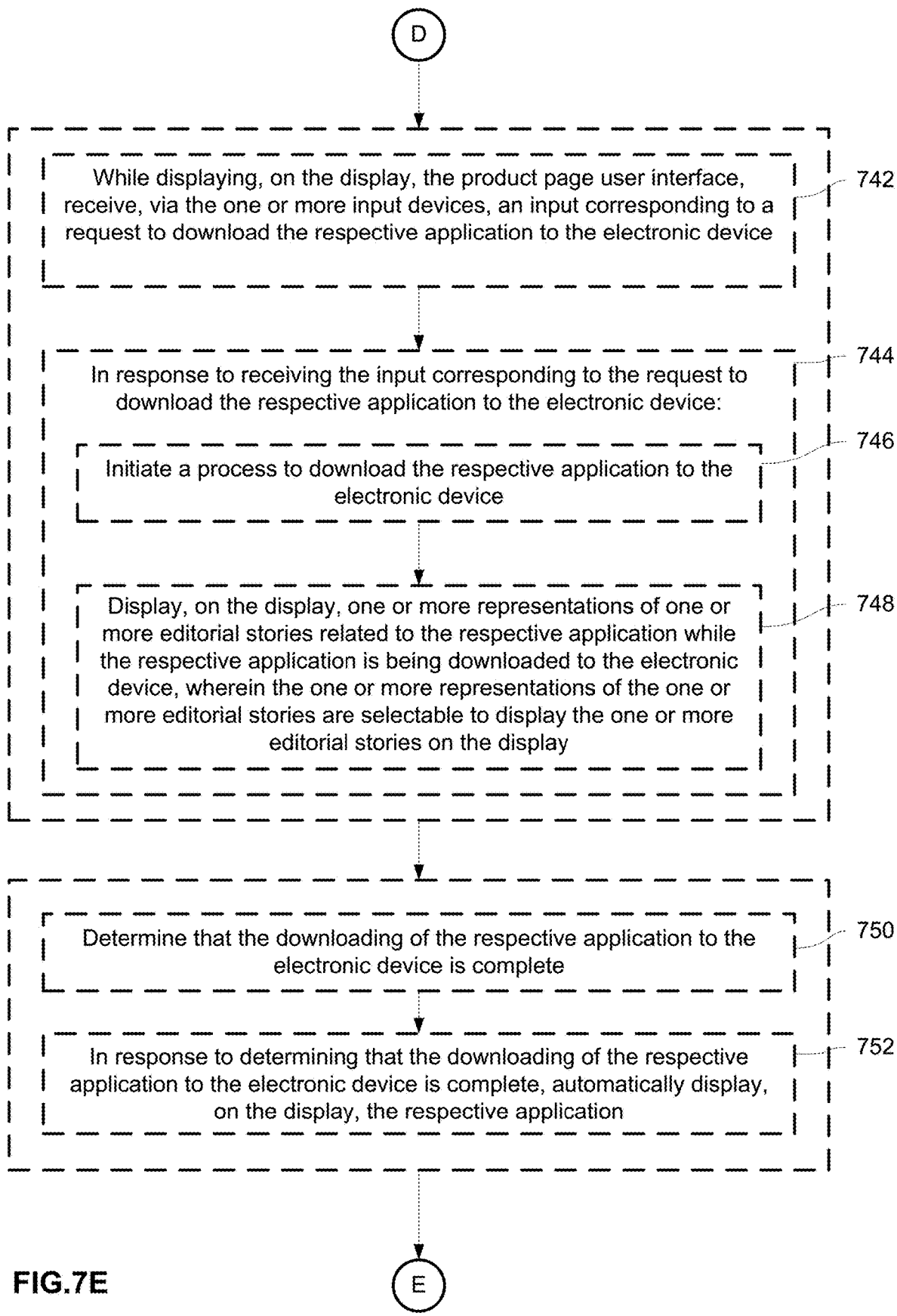
Figure 7F:
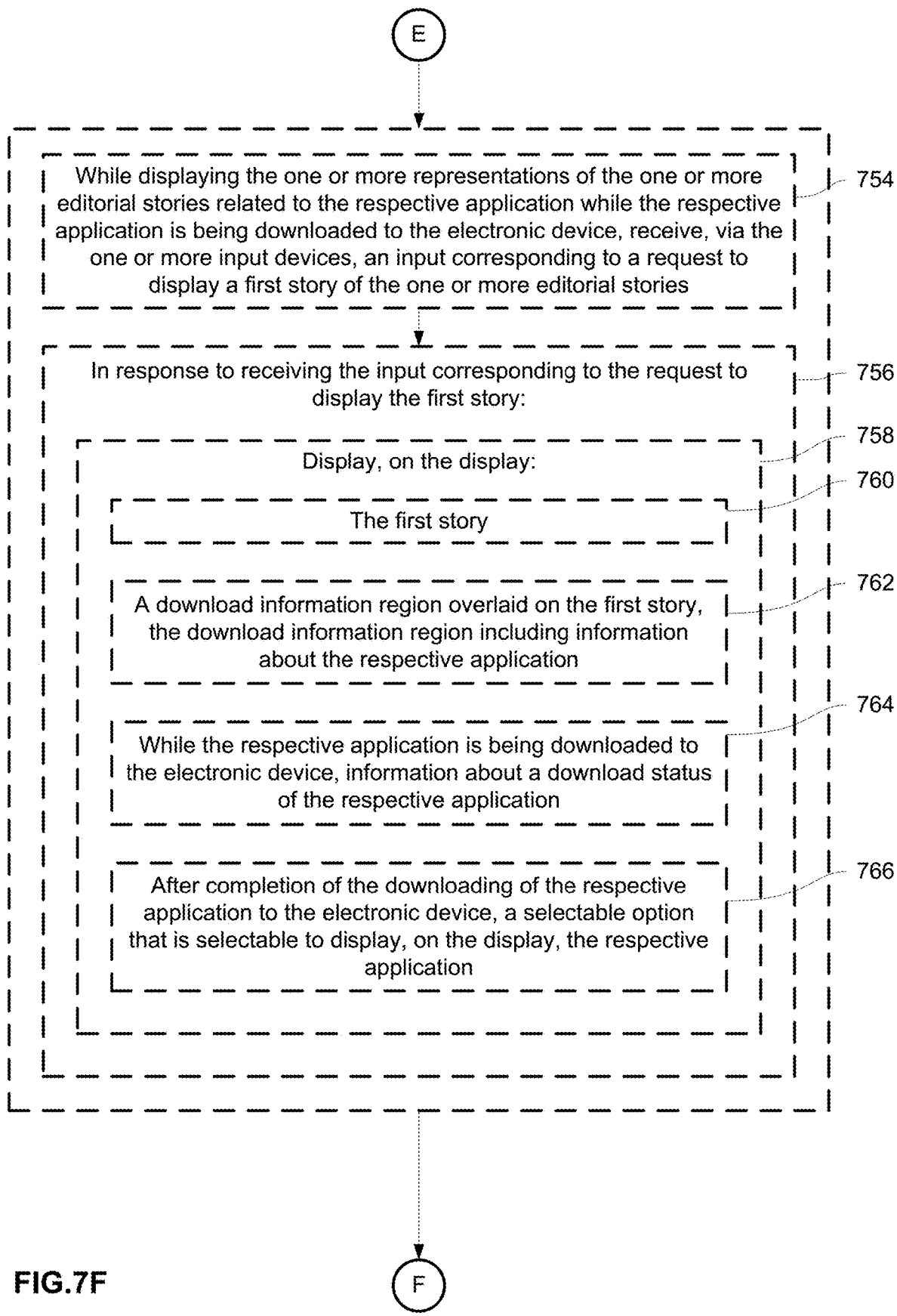
Figure 7H:
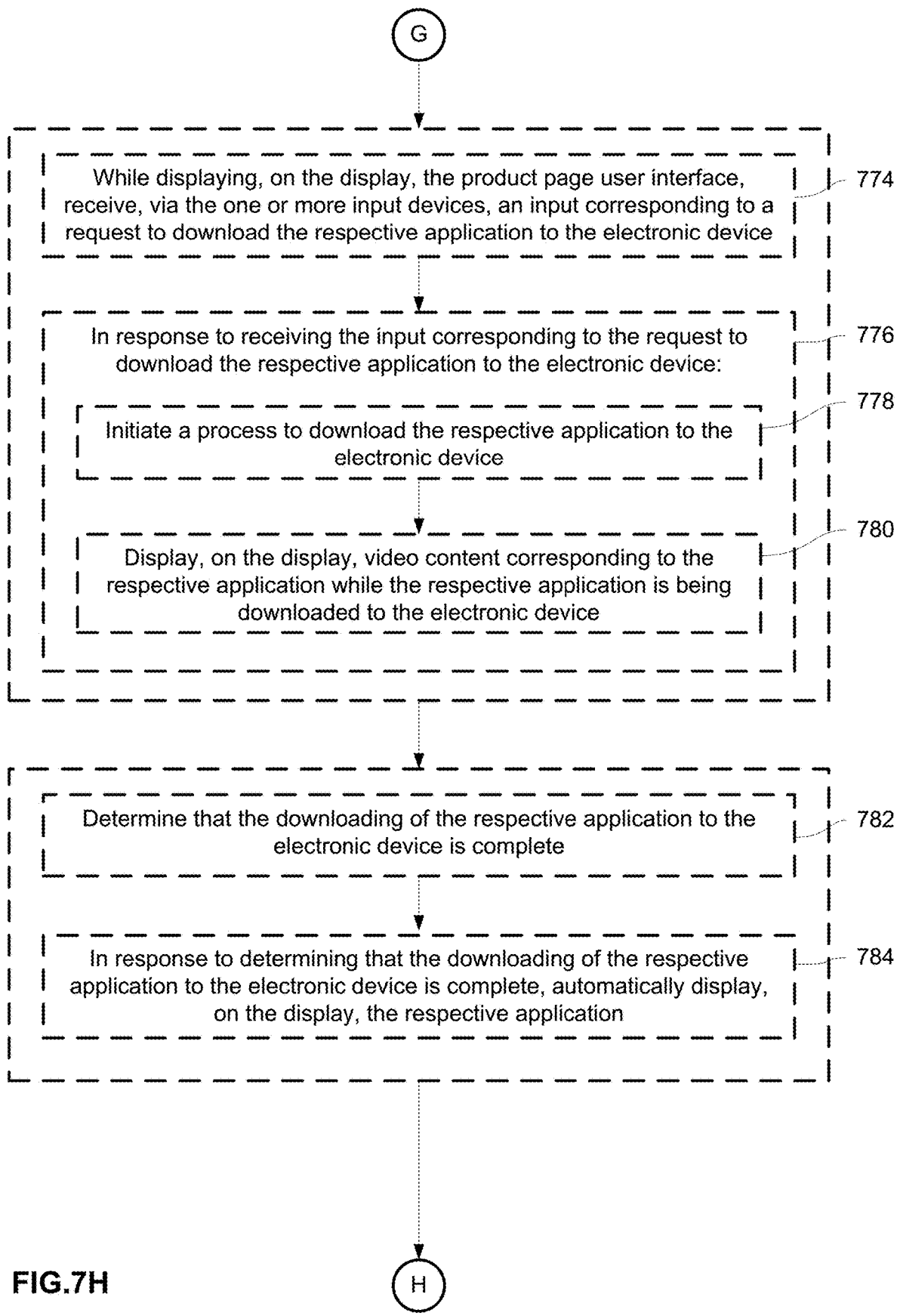
Figure 7I:
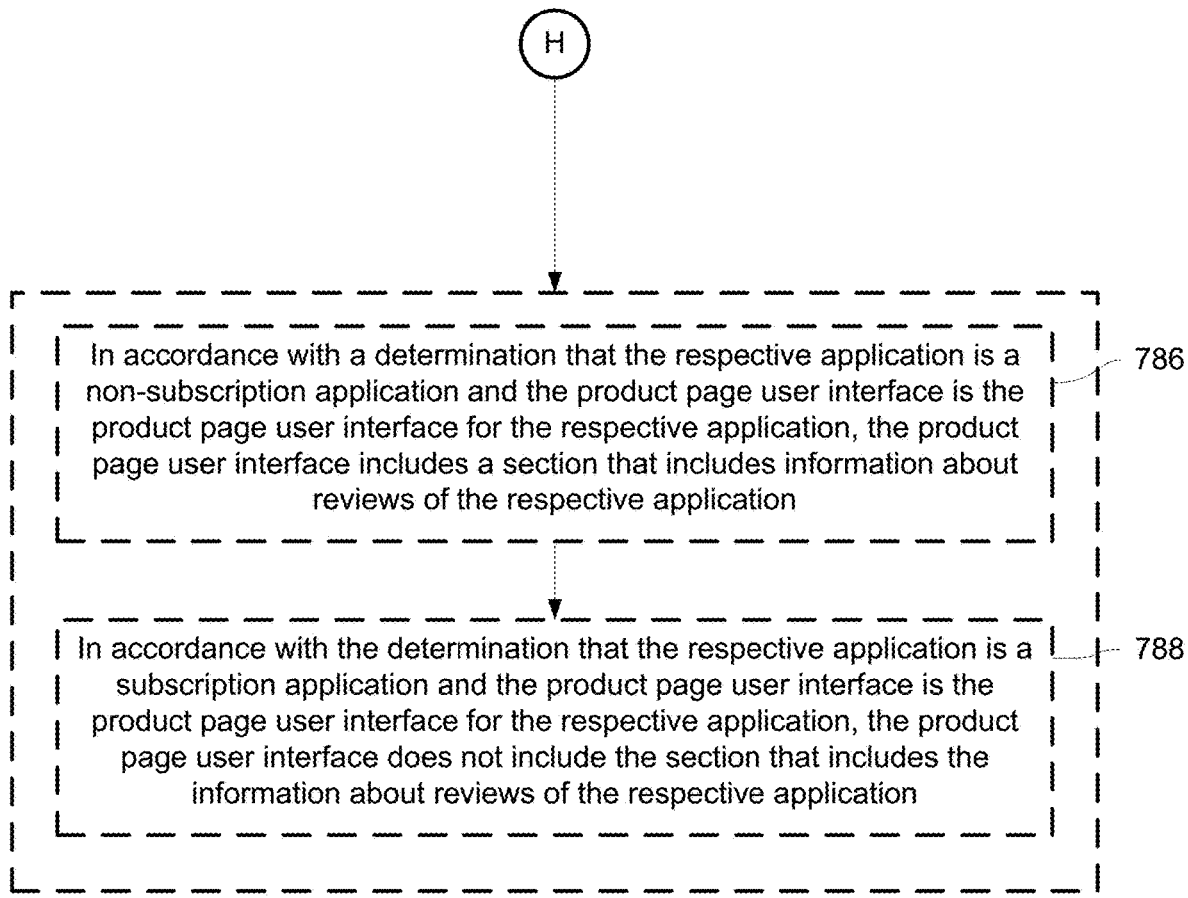

FIGS. 6Z-6BB illustrate a user interface of a non-subscription application. As shown in FIG. 6Z, the user interface includes a selectable option 602b to navigate backward in the user interface, an image 646 of an icon representing the application, an indication 650 of ratings of the application, a selectable option 648 that, when selected, causes the electronic device 500 to purchase the application (e.g., as opposed to a subscription application, which has a selectable option to subscribe to the subscription application, download the subscription application, or open the subscription application, depending on the user's subscription status, none of which includes purchasing access to only that single application as is the case with a non-subscription application), and an updates section 652. The selectable option 648 indicates the purchase price of the application. As shown in FIG. 6Z, the user scrolls (e.g., with contact 603) down in the user interface. In response to the user's scrolling, the electronic device 500 scrolls the user interface down.

FIG. 6AA illustrates the user interface in response to the user's scrolling shown in FIG. 6Z. As shown in FIG. 6Z, the selectable option 602b to navigate back in the user interface is now presented in a header region that has a translucent appearance over the rest of the user interface. The header region further includes an image 618 of the icon that represents the application and a selectable option 622 to purchase the application. The header region gradually becomes more opaque as the user continues to scroll down until a predetermined part of the user interface in which the header region becomes completely opaque. After the predetermined part of the user interface, the header region continues to be presented completely opaquely.

The header region gradually becomes more opaque because the product page user interface for the non-subscription application does not include video content, so the header region does not obscure video content by becoming gradually more opaque. On the other hand, the subscription application product page described above with reference to FIGS. 6A-6Y includes video content, so the header region is not presented until the user has scrolled down such that at least half of the video content is not displayed so as not to obscure the video content while at least half of the video content is on the display. Likewise, the selectable option 602b to navigate back is presented at a full size in FIG. 6Z because the non-subscription application product page does not include video content, so the selectable option 602b does not obscure video content when presented at its full size.

As shown in FIG. 6AA, the user interface further includes a reviews section 654 including a representation 656 of a review. The user scrolls (e.g., with contact 603) down. In response to the user's scrolling, the electronic device 500 scrolls the user interface down.

FIG. 6BB illustrates the user interface that is presented in response to the user's scrolling in FIG. 6AA. The user interface includes a representation 656 of a review in the reviews section 654. The header region including the selectable options 602b and 622 and the image 618 of the icon is presented fully opaquely.

As shown in FIGS. 6Z-6BB, the product page user interface of the non-subscription application includes a reviews section that has reviews. The product page user interface of the subscription application does not include a reviews section.

FIGS. 7A-7I are flow diagrams illustrating a method 700 of presenting user interfaces of the application store that are specific to a respective application in accordance with some embodiments. The method 700 is optionally performed at an electronic device such as device 100, device 300, device 500, device 501, device 510, and device 591 as described above with reference to FIGS. 1A-1B, 2-3, 4A-4B and 5A-5J. Some operations in method 700 are, optionally, combined and/or order of some operations is, optionally, changed.

As described below, the method 700 provides ways to present user interfaces in an application store that are specific to a respective application. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) displays (702), on the display 504, a product page user interface, such as in FIG. 6A for a respective application, wherein the product page user interface is a user interface of an application store application from which access to subscription applications and non-subscription applications can be purchased, and the product page user interface includes a selectable option 608*a*, *b*, or *c* associated with the respective application. The product page user interface optionally includes content related to the respective application, such as one or more of the application title, a description of the application, one or more images of the user interface of the application, content that highlights features of the application, marketing content related to the application (e.g., text, images, video, etc. meant to entice the user to download the application), information about the application such as publisher, parental control information, hardware compatibility information, and other content. In some embodiments, the selectable option is selectable to perform an operation related to accessing the application (e.g., buying the application, initiating download of the application, subscribing to a subscription service that provides access to the application, downloading an updated version of the application, opening the application, etc.).

In some embodiments, such as in FIG. 6D, while displaying the product page user interface, the electronic device receives (704), via the one or more input devices, an indication of a selection 603 of the selectable option 608*a*. In some embodiments, the electronic device detects touch on a touch screen, selection with a cursor, trackpad, or remote control device, a keyboard shortcut, or a voice input that indicates selection of the selectable option.

In some embodiments, in response to receiving the indication of the selection of the selectable option 608*a* (706): in accordance with a determination that the respective application is a subscription application and the product page user interface is a product page user interface for the respective application (708): in accordance with a determination that a user of the electronic device is not subscribed to a subscription service that enables access to the respective application, such as in FIGS. 6D-6E, the electronic device 500 initiates (710) a process for subscribing to the subscription service, such as in FIGS. 6E-6F.

In some embodiments, the respective application is accessible via a subscription service. Rather than paying a for the application at the time of acquisition (e.g., download), the user pays a reoccurring subscription fee for access to one or more applications including the respective application on an ongoing basis until the subscription is canceled, for example. In some embodiments, a subscription service provides access to a plurality of applications by allowing subscribers to download and run any of the subscription applications while the subscribers have a subscription that is in good standing (e.g., paid for or operating under a free trial). In some examples, the product page for the subscription application is accessed from a subscription application section of the application store application. In some embodiments, the selectable option is presented with text that indicates that selection of the selectable option will initiate the process for subscribing to the subscription service (e.g., "subscribe now," "try it free," etc.). A user account of the electronic device is optionally able to be subscribed to the subscription service, thereby providing the electronic device access to the subscription applications. In some embodiments, the user account is associated with a plurality of electronic devices such that each of those devices that are configured with or logged into the user account are able to utilize the subscription service (and thus access the applications associated with the subscription service). The subscription is optionally accessible to a plurality of associated user accounts (e.g., accounts of each family member in a family group of accounts, where subscription by a user in the family provides access to the subscription service to all users in the family). Initiating the subscription process optionally comprises presenting a user interface describing the subscription service and including a selectable option to subscribe to the subscription service.

In some embodiments, in accordance with a determination that the user of the electronic device 500 is subscribed to the subscription service that enables access to the respective application, such as in FIG. 6H, the electronic device initiates (712) a process to access the respective application without initiating the process for subscribing to the subscription service, such as in FIGS. 6I-6S. In some embodiments, the selectable option is presented with text that indicates that selection of the selectable option will initiate the process to access the respective application (e.g., "get," "play," "open," etc.). The user account of the electronic device is optionally a subscriber of the subscription service. Initiating the process to access to the respective application is one or more of downloading the application or opening the application (e.g., if it is already downloaded or if it is possible to run the application remotely, such as on a server in communication with the electronic device), for example. Initiating the process to access the subscription application optionally does not include initiating the process for subscribing to the subscription service because the electronic device or the user account of the electronic device is already subscribed to the subscription service. In accordance with a determination that the respective application is a non-subscription application and in accordance with a determination that the electronic device (e.g., or a user account of the electronic device) has not downloaded the non-subscription application, the electronic device optionally initiates a process for downloading the non-subscription application in response to selection of the selectable option. If the application costs money to download, initiating the process to download the application includes accepting payment for the application. Thus, the selectable option is optionally presented with text that indicates that selection of the selectable option will initiate the process to access the respective application (e.g., an indication of the price, "free," "get," etc.). In accordance with a determination that the respective application is a non-subscription application and in accordance with a determination that the application is downloaded on the electronic device, the electronic device optionally opens the application in response to selection of the selectable option. In some embodiments, the selectable option is presented with text that indicates that selection of the selectable option will open the application (e.g., "open"). The electronic device optionally presents the selectable option with different text indicating that selecting the selectable option will open the respective application depending on whether the application is a subscription application or a non-subscription application. For example, the selectable option that is selectable to open a non-subscription application optionally includes the text "open," whereas the selectable option that is selectable to open a subscription application (e.g., a game application) optionally includes the text "play."

The above-described manner of presenting a selectable option on the product page that is selectable to initiate a process for subscribing to the subscription service if the user is not subscribed to the subscription service allows the electronic device to enable the user to subscribe to the subscription service to gain access to the application, which simplifies the interaction between the user and the electronic device and enhances the operability of the electronic device and makes the user-device interface more efficient (e.g., by providing a mechanism to subscribe to the subscription service without navigating away from the product), which additionally reduces power usage and improves battery life of the electronic device by enabling the user to use the electronic device more quickly and efficiently, such as by streamlining the process of subscribing to the subscription service and accessing the application for which the product page had recently been presented.

In some embodiments, the product page user interface is displayed with a header region on the display 504, such as in FIGS. 6C-6D, overlaid on the product page user interface, that remains at a location on the display as a user scrolls through the product page (714). The header region is optionally located at the top of the user interface and optionally includes a back option that, when selected, causes the electronic device to display the user interface that was displayed prior to displaying the product page. In some embodiments, in accordance with a determination that a current scroll position in the product page is a first scroll position, such as in FIG. 6C, the header region is displayed with a first appearance and includes a first selectable option 602a for performing a first function that has a first visual characteristic (716). In some embodiments, at the first scroll position, the page has been scrolled less than a threshold distance from the topmost position. In some embodiments, the header is transparent and includes a back option that has a first appearance (e.g., a circle with a back arrow inside of it). For example, the top of the product page includes video content and the transparent header is designed to allow as much of the video content as possible to be visible on the display. The electronic device optionally presents the header region with the first appearance while at least half of the video is included on the display and presents the header region with a second appearance once less than half of the video is included on the display. In some embodiments, such as in FIG. 6D, in accordance with a determination that the current scroll position in the product page is a second scroll position, different than the first scroll position, the header region is displayed with a second appearance, different than the first appearance, and includes a second selectable option 602b for performing the first function that has a second visual characteristic, different than the first visual characteristic (718). In some embodiments, at the second scroll position, the page has been scrolled greater than the threshold distance from the topmost position. In some embodiments, the header is opaque and includes a back option that includes a back arrow and text describing the previous page. For example, if the user had been viewing an arcade user interface that includes representations of subscription games in an "arcade" collection, the back option includes the text "Arcade" next to the back arrow. In some embodiments, the header further includes a visual representation of the respective application and a selectable option that, when selected, causes the electronic device to initiate the process for accessing the respective application.

The above-described manner of presenting the header with a different appearance depending on the scroll position of the product page allows the electronic device to present more content of the product page when needed (e.g., while presenting video content at the top of the product page) and to present more information in the header (e.g., a back button with an indication of which page the electronic device will go back to, a visual indication of the respective application, and a selectable option to initiate the process to access the respective application) when the display space in the product page is not needed which simplifies the interaction between the user and the electronic device and enhances the operability of the electronic device and makes the user-device interface more efficient (e.g., by intelligently allocating display space to optimize the amount of information that is presented to the user concurrently), which additionally reduces power usage and improves battery life of the electronic device by enabling the user to use the electronic device more quickly and efficiently.

In some embodiments, such as in FIG. 6D, in accordance with the determination that the user of the electronic device 500 is not subscribed to the subscription service that enables access to the respective application, the header region having the second appearance includes a third selectable option 620a for initiating the process for subscribing to the subscription service (720). In some embodiments, the third selectable option is an option to subscribe to the subscription service. In some embodiments, in response to detecting selection of the third option, the electronic device initiates a process to subscribe to the subscription service and, if the subscription is successful, initiates a process to download the respective application. The header optionally does not include the third selectable option when the header is presented with the first visual appearance. In some embodiments, the product page user interface includes a selectable option for initiating a process to access the respective application (e.g., including subscribing to the subscription service if the user is not yet subscribed to the subscription service) that is visible when the product page user interface is scrolled to a location where the header has the first appearance. In some embodiments, such as in FIG. 6H, in accordance with the determination that the user of the electronic device 500 is subscribed to the subscription service that enables access to the respective application, the header region having the second appearance includes a fourth selectable option 620b for initiating the process to access the respective application without initiating the process for subscribing to the subscription service (722). In some embodiments, the fourth selectable option is an option to download or, if the respective application has already been downloaded, open the respective application. In response to detecting selection of the fourth selectable option, the electronic device initiates a process to download the respective application if the respective application is not yet downloaded. If the respective application has already been downloaded on the electronic device, in response to detecting selection of the third option, the electronic device optionally initiates a process to open the respective application. In some embodiments, when the header is presented with the first visual appearance, the header does not include the third selectable option. In some embodiments, the product page user interface includes a selectable option for initiating a process to access the respective application that is visible when the product page user interface is scrolled to a location where the header has the first appearance.

The above-described manner of presenting, in the header, a selectable option to subscribe to the subscription service if the user is not yet subscribed to the subscription service or a selectable option to access the respective application if the user is already subscribed to the subscription service allows the electronic device to present the user with a selectable option to perform the next step needed to access the application while viewing any part of the product page that includes the header with the second visual appearance, which simplifies the interaction between the user and the electronic device and enhances the operability of the electronic device and makes the user-device interface more efficient (e.g., by eliminating the need for the user to scroll to a different part of the user interface to view a selectable option to access the application or subscribe to the subscription service), which additionally reduces power usage and improves battery life of the electronic device by enabling the user to use the electronic device more quickly and efficiently.

In some embodiments, the first function is a backward navigation function in the application store application, the first selectable option 620a for performing the first function that has the first visual characteristic has a first size illustrated in FIG. 6C, and the second selectable option 602b for performing the first function that has the second visual characteristic has a second size illustrated in FIG. 6D, larger than the first size (724). In some embodiments, the first function is presenting a user interface that was previously presented before presenting the product page. In some embodiments, an image that does not include a text indication of the user interface that will be presented in response to selecting the first selectable option. In some embodiments, an image and text that indicates the user interface that will be presented in response to selection of the second selectable option. For example, if the electronic device presented an arcade user interface that includes representations of subscription game applications prior to presenting the product page user interface, the second selectable option includes text that says "Arcade" to indicate that the arcade user interface will be presented in response to detecting selection of the second selectable option. As another example, the selectable option with the second visual characteristic includes a text indication of "Back" and the selectable option with the first visual characteristic does not include the text.

The above-described manner of presenting the first selectable option with a smaller size of the second selectable option allows the electronic device to conserve display area for other content when presenting the header with the first visual appearance, which simplifies the interaction between the user and the electronic device and enhances the operability of the electronic device and makes the user-device interface more efficient (e.g., by enabling the user to view more content at once without entering an input to scroll the user interface or navigate to a different user interface while the header is presented with the first visual appearance), which additionally reduces power usage and improves battery life of the electronic device by enabling the user to use the electronic device more quickly and efficiently.

In some embodiments, such as in FIG. 6C, the header region having the first appearance is overlaid on video content, in the product page user interface, corresponding to the respective application, and the product page user interface further includes information 604, 606, and 612 about the respective application overlaid on the video content (726). In some embodiments, the video content is video content related to the application, such as a trailer. In some embodiments, the information are title, publisher, release date, short written summary, etc. For example, the respective application is a game and the video content is a trailer for the game. The information optionally includes the name of the game, the game publisher, and a short description of the game. In some embodiments, the header region having the first appearance has a transparent background that enables the user to view the video content on as much display area as possible.

The above-described manner of overlaying the header region having the first appearance and information about the respective application on video content allows the electronic device to present the information and header region while presenting the video content using as much display area as possible, which simplifies the interaction between the user and the electronic device and enhances the operability of the electronic device and makes the user-device interface more efficient (e.g., by increasing the amount of information and the space occupied by the video to present the user with more information about the respective application without a user input to navigate between user interfaces), which additionally reduces power usage and improves battery life of the electronic device by enabling the user to use the electronic device more quickly and efficiently.

In some embodiments, such as in FIG. 6A, the product page user interface includes information 604, 606, and 612 about the respective application overlaid on video content corresponding to the respective application (728). In some embodiments, the video content is a trailer for the respective application, a video showing the respective application in use, etc. In some embodiments, the information about the respective application includes the title, publisher, and a short description of the respective application.

The above-described manner of overlaying information about the respective application on video content allows the electronic device to present the information while presenting the video content using as much display area as possible, which simplifies the interaction between the user and the electronic device and enhances the operability of the electronic device and makes the user-device interface more efficient (e.g., by increasing the amount of information and the space occupied by the video to present the user with more information about the respective application without a user input to navigate between user interfaces), which additionally reduces power usage and improves battery life of the electronic device by enabling the user to use the electronic device more quickly and efficiently.

In some embodiments, such as in FIG. 6A, the information overlaid on the video content includes the selectable option 608a and an image 604 of an icon for the respective application (730). In some embodiments, the selectable option and the image of the icon for the respective application are overlaid on the video content. In some embodiments, if the electronic device downloads the respective application, the icon for the respective application will appear on a home screen user interface of the electronic device and is selectable to access the respective application.

The above-described manner of overlaying the selectable option and the image of the icon on the video content allows the electronic device to present the selectable option and the image of the icon while presenting the video content using as much display area as possible, which simplifies the interaction between the user and the electronic device and enhances the operability of the electronic device and makes the user-device interface more efficient (e.g., by increasing the amount of information and the space occupied by the video to present the user with more information about the respective application without a user input to navigate between user interfaces), which additionally reduces power usage and improves battery life of the electronic device by enabling the user to use the electronic device more quickly and efficiently.

In some embodiments, such as in FIG. 6A the information 604, 606, 608a, and 612 about the respective application is overlaid on a first portion of the video content, and the first portion of the video content is a modified version of a second portion of the video content, different than the first portion (732). In some embodiments, the second portion of the video content is a blurred mirror of the first portion of the video content. In some embodiments, the second portion of the video content spans the display of the electronic device (e.g., when the electronic device is a smartphone or media player). In some embodiments, the second portion of the video content odes not span the width of the display of the electronic device (e.g., when the electronic device is a tablet).

The above-described manner of overlaying the information about the respective application on the second portion of the video content allows the electronic device to present the first portion of the video content in an unobstructed view, which simplifies the interaction between the user and the electronic device and enhances the operability of the electronic device and makes the user-device interface more efficient (e.g., by enabling the user to view the entire first portion of the video content while viewing the information about the respective application), which additionally reduces power usage and improves battery life of the electronic device by enabling the user to use the electronic device more quickly and efficiently.

In some embodiments, such as in FIGS. 6B-6C the product page user interface includes horizontally scrollable information 614 about the respective application that is displayed below the selectable option 608a (734). The information optionally includes recommended age for the application, type of application, number of players (e.g., for a game application), developer, language, application size. In some embodiments, the product page user interface is vertically scrollable and the information ribbon is horizontally scrollable, thereby reducing the number of vertical scrolling inputs needed to traverse the information ribbon when the user wants to look at a different part of the product page while also allowing the user a way to view more information than the amount of information that would fit in the footprint of the information ribbon.

The above-described manner of presenting the information in a horizontally scrollable region allows the electronic device to conserve display area, which simplifies the interaction between the user and the electronic device and enhances the operability of the electronic device and makes the user-device interface more efficient (e.g., by reducing the number of inputs needed to traverse the information), which additionally reduces power usage and improves battery life of the electronic device by enabling the user to use the electronic device more quickly and efficiently.

In some embodiments, such as in FIG. 6X, the product page user interface further includes a section with one or more representations 638d of one or more editorial stories related to the respective application, and the one or more representations of the one or more editorial stories are selectable to display the one or more editorial stories on the display, similar to how representation 638b is selectable to display story 640 as shown in FIGS. 6J-6K (736). In some embodiments, the representations include text indicating the title of the story and optionally a short summary of the story and optionally an image representing the story and/or the respective application. In some embodiments, the representations of the stories are presented in a scrollable list. In response to detecting selection of one of the representations, the electronic device presents the story on the display.

The above-described manner of including one or more editorial stories in the product page user interface allows the electronic device to present content related to the respective application in the product page user interface so the user is able to learn about the respective application before downloading it, which simplifies the interaction between the user and the electronic device and enhances the operability of the electronic device and makes the user-device interface more efficient (e.g., by reducing the number of inputs needed to navigate between the product page user interface and the one or more editorial stories), which additionally reduces power usage and improves battery life of the electronic device by enabling the user to use the electronic device more quickly and efficiently.

In some embodiments, such as in FIG. 6X, in accordance with a determination that a state of progression of the user through the respective application is a first state of progression, the one or more stories include a first set of stories 638d and not a second set of stories 638e (738). In some embodiments, if the application is a games application, the state of progression is the user has played the game for a first duration of time, the user has reached a first level in a series of levels, or some other state of progression in the game. In some embodiments, the first set of stories are related to the first state of progression in the application. For example, if the respective application is a game application and the user has played to a first level of the game application, the stories are related to the first level of the game and the electronic device does not present stories related to a second level of the game that is after the first level of the game. In some embodiments, such as in FIG. 6Y, in accordance with a determination that the state of progression of the user through the respective application is a second state of progression, different than the first state of progression, the one or more stories include the second set of stories 638e and not the first set of stories 638d (740). In some embodiments, the second set of one or more stories are related to the second state of progression in the respective application. For example, if the respective application is a game application and the user has played to a second level of the game application, the stories are related to the second level of the game and the electronic device does not present stories related to the first level of the game that is before the first level of the game.

The above-described manner of presenting stories that are related to the user's progression in the respective application allows the electronic device to present stories the user is more likely to be interested in reading, which simplifies the interaction between the user and the electronic device and enhances the operability of the electronic device and makes the user-device interface more efficient (e.g., by making the most relevant information the easiest to access), which additionally reduces power usage and improves battery life of the electronic device by enabling the user to use the electronic device more quickly and efficiently, such as by reducing the number of inputs needed to locate a story related to the user's current progression in the respective application.

In some embodiments, such as in FIG. 6H, while displaying, on the display, the product page user interface, the electronic device 500 receives (742), via the one or more input devices, an input corresponding to a request to download the respective application to the electronic device, such as selection (e.g., with contact 603) of selectable option 608*b*. In some embodiments, selection of the selectable option or selection of a different selectable option that, when selected, causes the electronic device to initiate a process to access the respective application that includes downloading the respective application. In some embodiments, such as in FIGS. 6I-6J in response to receiving the input corresponding to the request to download the respective application to the electronic device (744): the electronic device 500 initiates (746) a process to download the respective application to the electronic device 500 and displays (748), on the display 504, one or more representations 638*a* and 638*b* of one or more editorial stories related to the respective application while the respective application is being downloaded to the electronic device 500, wherein the one or more representations 638*b* of the one or more editorial stories are selectable to display the one or more editorial stories 640 on the display, as shown in FIGS. 6J-6K. In some embodiments, the stories are about the respective application or mention the respective application. In some embodiments, the user is able to select a representation of an editorial story to view the editorial story while the download continues. In some embodiments, the electronic device concurrently displays a download progress bar while presenting the representations of the one or more stories or the content of a selected story.

The above-described manner of presenting editorial stories related to the respective application while downloading the respective application allows the electronic device to present content related to the respective application to the user while the respective application is being downloaded, which simplifies the interaction between the user and the electronic device and enhances the operability of the electronic device and makes the user-device interface more efficient (e.g., by enabling the user to view editorial stories related to the respective application while downloading the respective application without entering inputs to navigate to a user interface including the editorial stories), which additionally reduces power usage and improves battery life of the electronic device by enabling the user to use the electronic device more quickly and efficiently.

In some embodiments, such as in FIG. 6P, the electronic device 500 determines (750) that the downloading of the respective application to the electronic device is complete; and in response to determining that the downloading of the respective application to the electronic device 500 is complete, the electronic device 500 automatically displays (752), on the display 504, the respective application 642. In some embodiments, displaying the respective application includes ceasing to display the representations of the editorial stories or the content of an editorial story. For example, while the respective application is being downloaded by the electronic device, the user selects a representation of an editorial story and views the story. When the download is complete, the electronic device optionally ceases displaying the editorial story and presents the respective application without further user input to do so.

The above-described manner of automatically presenting the respective application when the download is complete allows the electronic device to present the application without requiring the user to enter an input to present the application, which simplifies the interaction between the user and the electronic device and enhances the operability of the electronic device and makes the user-device interface more efficient (e.g., by reducing the number of user inputs needed to access the respective application), which additionally reduces power usage and improves battery life of the electronic device by enabling the user to use the electronic device more quickly and efficiently.

In some embodiments, such as in FIG. 6J, while displaying the one or more representations 638*a*, 638*b*, and 638*c* of the one or more editorial stories related to the respective application while the respective application is being downloaded to the electronic device 500, the electronic device 500 receives (754), via the one or more input devices, an input corresponding to a request to display a first story of the one or more editorial stories, such as selection (e.g., with contact 603) of representation 638*b*. In some embodiments, selection of a selectable option associated with the first story that, when selected, causes the electronic device to present the first story (e.g., a "read," "view," or "open") option. In some embodiments, such as in FIGS. 6J-6K, in response to receiving the input (e.g., selection (e.g., with contact 603) of representation 638*b*) corresponding to the request to display the first story (756): the electronic device 500 displays (758), on the display: the first story 640 (760); and a download information region overlaid on the first story, the download information region including information about the respective application 640 (764), and: while the respective application is being downloaded to the electronic device 500, information 642 about a download status of the respective application (764) and after completion of the downloading of the respective application to the electronic device 500, such as in FIG. 6L, a selectable option 644 that is selectable to display, on the display 504, the respective application 642, as shown in FIG. 6M (766). The first story optionally includes text and/or images. In some embodiments, the download information region includes the name of the respective application and an image of an icon representing the respective application. In some embodiments, the information about the download is a download status bar that advances as the download progresses and/or text or a numerical indication of the download progress. For example, the electronic device presents a download progress bar and an indication of the percentage of the download process is complete. In some embodiments, the selectable option that is selectable to display the respective application is displayed in place of the download progress bar.

The above-described manner of concurrently presenting information about the download status of the respective application and the editorial story allows the electronic device to concurrently present the content of the editorial story while presenting information about the progress of the download of the respective application, which simplifies the interaction between the user and the electronic device and enhances the operability of the electronic device and makes the user-device interface more efficient (e.g., by reducing the number of user inputs needed to navigate between a user interface that includes the download status information and the content of the editorial story), which additionally reduces power usage and improves battery life of the electronic device by enabling the user to use the electronic device more quickly and efficiently.

In some embodiments, such as in FIGS. 6I-6J, the one or more editorial stories related to the respective application include a first set of one or more editorial stories 638*a* related to the respective application, and a second set of one or more editorial stories 638*b* related to one or more other applications based on the respective application (768). The one or more other applications are optionally in the same category, by the same publisher, or downloaded by others who also downloaded the respective application. In some embodiments, such as in FIG. 6, while displaying the one or more representations 638*a* of the one or more editorial stories related to the respective application, the electronic device 500 receives (770), via the one or more input devices, an input (e.g., movement of contact 603) corresponding to a request to scroll through the one or more representations 638*a* and 638*b* of the one or more editorial stories related to the respective application. In some embodiments, the input is a directional input such as swipe or a tap on a touch-sensitive surface or touch screen, selection with a mouse or other input device in a region of the display that corresponds to scrolling, a voice input, etc. In some embodiments, in response to receiving the input (e.g., movement of contact 603) corresponding to the request to scroll through the one or more representations of the one or more editorial stories, such as in FIG. 6J, the electronic device scrolls (772) through the one or more representations of the one or more editorial stories to reveal, on the display, a first set of the one or more editorial stories 638*b* that were not previously displayed on the display. For example, the electronic device presents an entire representation of one story with portions of representations of other stories to the side of the entire representation. In response to the input to scroll, the electronic device optionally presents a different representation of a story in its entirety.

The above-described manner of presenting different representations of editorial stories in response to an input to scroll allows the electronic device to present more representations of editorial stories than an amount of representations of editorial stories that would fit on the display, which simplifies the interaction between the user and the electronic device and enhances the operability of the electronic device and makes the user-device interface more efficient (e.g., by presenting the representations of stories in a scrollable list, as opposed to presenting the stories in different user interfaces that would require additional user inputs to navigate to), which additionally reduces power usage and improves battery life of the electronic device by enabling the user to use the electronic device more quickly and efficiently, such as by reducing the number of inputs needed to browse the editorial stories.

In some embodiments, such as in FIGS. 6Q-6R, while displaying, on the display 504, the product page user interface, the electronic device 500 receives (774), via the one or more input devices, an input (e.g., selection of option 608*b* with contact 603) corresponding to a request to download the respective application to the electronic device. In some embodiments, selection of the selectable option or selection of a different selectable option that, when selected, causes the electronic device to initiate a process to access the respective application that includes downloading the respective application. In some embodiments, in response to receiving the input (e.g., selection of option 608*b* with contact 603) corresponding to the request to download the respective application to the electronic device 500 (776): the electronic device 500 initiates (778) a process to download the respective application to the electronic device 500 and displays (780), on the display 504, video content 644 corresponding to the respective application while the respective application is being downloaded to the electronic device 500, as shown in FIG. 6R. In some embodiments, the video comprises a trailer of the respective application. For example, the video includes a video of the user interface of the respective application that highlights the features of the respective application.

The above-described manner of presenting video content corresponding to the respective application while the respective application is being downloaded allows the electronic device to provide the user with information about the respective application while the respective application is being downloaded, which simplifies the interaction between the user and the electronic device and enhances the operability of the electronic device and makes the user-device interface more efficient (e.g., by reducing the number of inputs needed to navigate from the user interface to initiate the download process of the respective application and a user interface to view video content corresponding to the respective application), which additionally reduces power usage and improves battery life of the electronic device by enabling the user to use the electronic device more quickly and efficiently.

In some embodiments, such as in FIG. 6P, the electronic device 500 determines (782) that the downloading of the respective application to the electronic device 500 is complete; and in response to determining that the downloading of the respective application to the electronic device 500 is complete, the electronic device 500 automatically displays (784), on the display 504, the respective application 642. In some embodiments, the electronic device ceases the display of the video content and presents the respective application. In some embodiments, the respective application is not displayed unless the video content has finished playing. For example, the electronic device initiates a process to download the respective application. While downloading the respective application, the electronic device optionally presents the video content related to the respective application. In some embodiments, once the download is complete, the electronic device ceases to display the video content and presents the respective application without further user input to do so.

The above-described manner of automatically presenting the respective application when the download is complete allows the electronic device to present the application without requiring the user to enter an input to present the application, which simplifies the interaction between the user and the electronic device and enhances the operability of the electronic device and makes the user-device interface more efficient (e.g., by reducing the number of user inputs needed to access the respective application), which additionally reduces power usage and improves battery life of the electronic device by enabling the user to use the electronic device more quickly and efficiently.

In some embodiments, such as in FIG. 6BB, in accordance with a determination that the respective application is a non-subscription application and the product page user interface is the product page user interface for the respective application, the product page user interface includes a section 654 that includes information about reviews 656 of the respective application (786). In some embodiments, the section includes ratings and reviews provided by other users who have downloaded the respective application. For example, users are able to assign a number of stars to the application as a rating and publish text reviews that are intended to explain the pros and cons of the respective application. In some embodiments, such as in FIG. 6A, in accordance with the determination that the respective application is a subscription application and the product page user interface is the product page user interface for the respective application, the product page user interface does not include the section that includes the information about reviews of the respective application (788). In some embodiments, users are not able to publish reviews of subscription applications.

The above-described manner of including reviews for non-subscription applications and excluding reviews from subscription applications allows the electronic device to inform the user if other uses enjoy a non-subscription application before the user purchases the non-subscription application while conserving display area in a product page for a subscription application, which simplifies the interaction between the user and the electronic device and enhances the operability of the electronic device and makes the user-device interface more efficient (e.g., by excluding reviews for subscription applications, which the user does not need to purchase individually), which additionally reduces power usage and improves battery life of the electronic device by enabling the user to use the electronic device more quickly and efficiently.

It should be understood that the particular order in which the operations in FIGS. 7A-7I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300, 1500, 1700, and 1900) are also applicable in an analogous manner to method 700 described above with respect to FIGS. 7A-7I. For example, the operation of the electronic device to present a product page user interface described above with reference to method 700 optionally has one or more of the characteristics of the presentation of application store user interfaces that include information about a respective category of applications, user interfaces of an application store for accessing a respective category of applications, visual indications of the number of available updates, user interfaces of an electronic device for launching and removing a respective application, user interfaces of a generic application store and a dedicated application store for a respective category of applications, notifications of the completion of a download, etc., described herein with reference to other methods described herein (e.g., methods 900, 1100, 1300, 1500, 1700, and 1900). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5J) or application specific chips. Further, the operations described above with reference to FIGS. 7A-7I are, optionally, implemented by components depicted in FIGS. 1A-1B. For example, displaying operations 702, 704, 714, 716, 718, 734, 736, 742, 748, 752, 754, 756, 758, 766, 770, 772, 774, 780, and 784, receiving operations 704, 706, 742, 744, 754, 756, 770, 772, 774, and 776, and initiating operations 710, 712, 720, 722, 746, and 778 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Application Store User Interfaces Related to Applications in a Respective Category Users interact with electronic devices in many different manners, including using an electronic device to view information about applications in a respective category in an application store. In some embodiments, an electronic device is able to present a user interface that includes information about applications in a respective category of applications, such as subscription applications and non-subscription applications. The embodiments described below provide ways in which an electronic device presents application store user interfaces including information about subscription applications and non-subscription applications. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 8A-8L and 8N-8CC illustrate exemplary ways in which an electronic device 500 presents application store user interfaces that include information about applications in a respective category in accordance with some embodiments. The embodiments in these figures are used to illustrate the processes described below, including the processes described with reference to FIGS. 9A-9J.

Figure 8A:
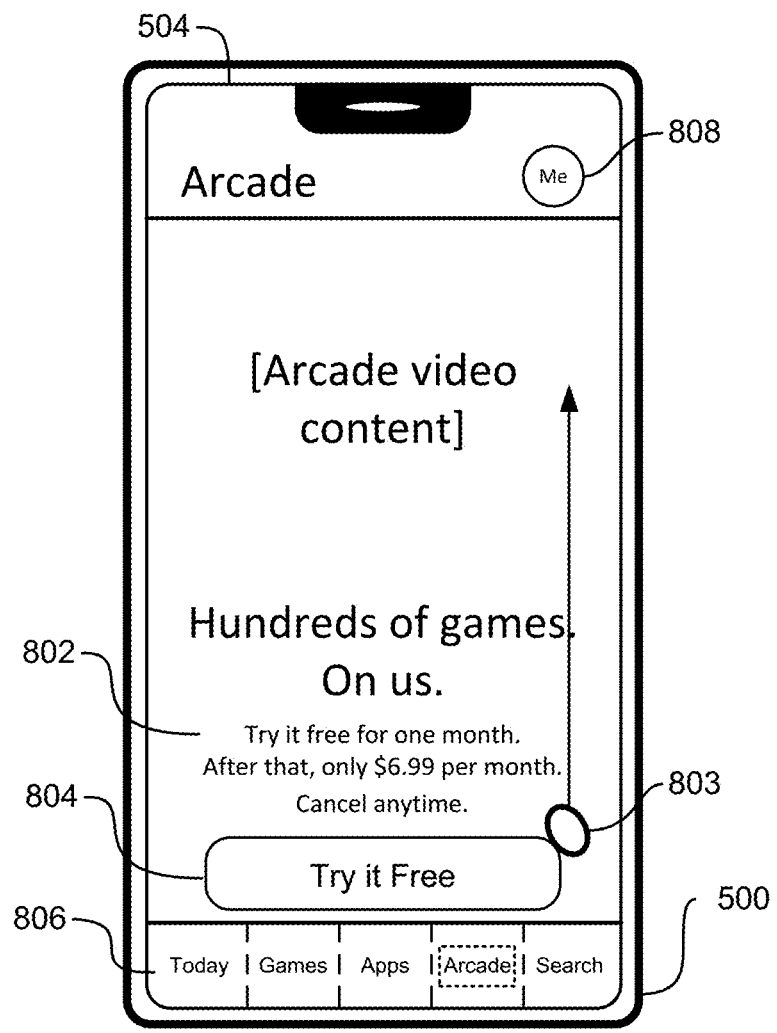
FIGS. 8A-8L and 8N-8CC illustrate exemplary ways in which an electronic device presents application store user interfaces that include information about applications in a respective category in accordance with some embodiments.

FIGS. 8A-8L and 8N illustrate a subscription applications user interface of an application store application (e.g., shown in response to selection of the "Arcade" element in navigation bar 806) when the user is not subscribed to the subscription service that provides access to one or more subscription applications on the electronic device. The user interface includes a selectable option 808 associated with a user account on the electronic device, information 802 about the subscription service, a selectable option 804 for subscribing to the subscription service, and a navigation bar 806. As shown in FIG. 8A, the user scrolls (e.g., with contact 803) down. In response to the user's scrolling, the electronic device scrolls the user interface down.

Figure 8B:
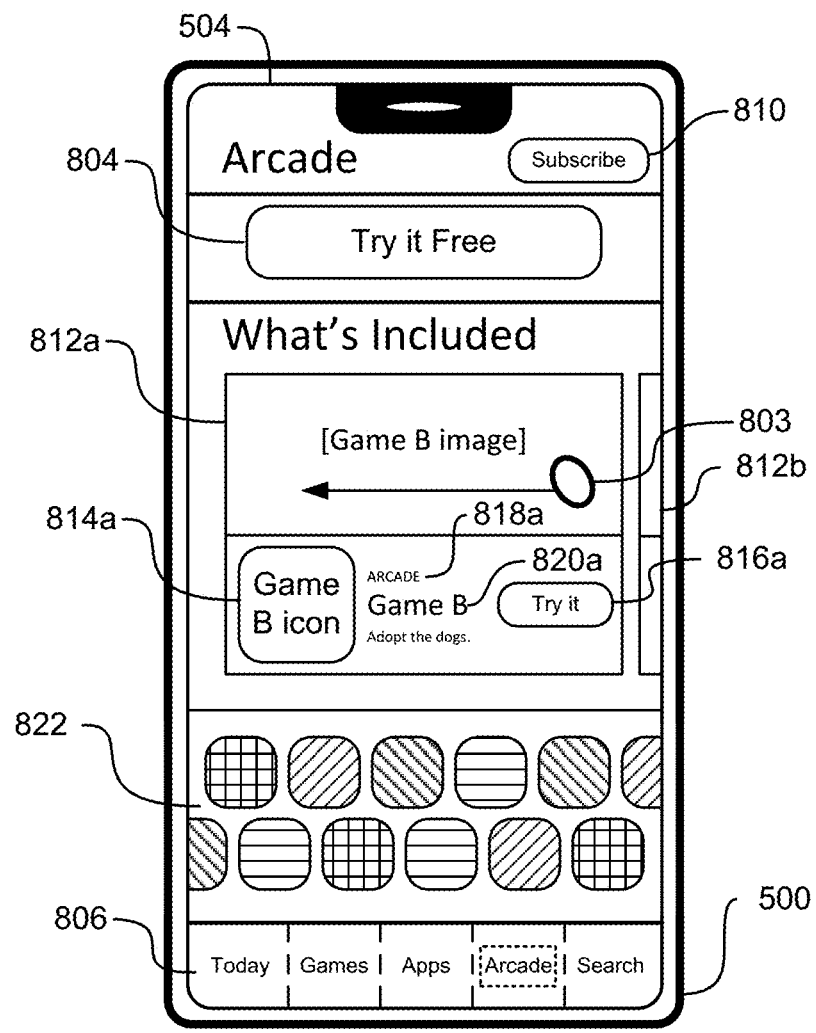

As shown in FIG. 8B, the electronic device 500 scrolls the user interface down to reveal a plurality of representations 812a-b of applications included in the subscription service that include information 820a about the respective applications of the representations 812a, and a plurality of images 822 of icons of applications available on the subscription service. The user interface further includes a header region including a selectable option 810 that, when selected, causes the electronic device 500 to initiate a process to subscribe to the subscription service that provides access to the subscription applications. The header region was optionally not displayed until the scroll position in the user interface was further than a threshold scroll position from the top of the user interface as shown in FIGS. 8A-8B. Once the user scrolls past the threshold scroll position from the top of the user interface, the electronic device 500 continues to present the header region as the user continues to scroll.

Representation 812*a* includes an image representing the application, an image 814*a* of the icon that represents the application, a subscription service icon 818*a* that indicates that the application is accessible via the subscription service, the name 820*a* of the application, and a selectable option 816 to initiate a process to subscribe to the subscription service. The representations 812*a-b* are horizontally scrollable. As shown in FIG. 8B, the user scrolls (e.g., with contact 803) horizontally in the user interface. In response to the user's selection, the electronic device 500 presents the next representation 812*b* in full.

Figure 8C:
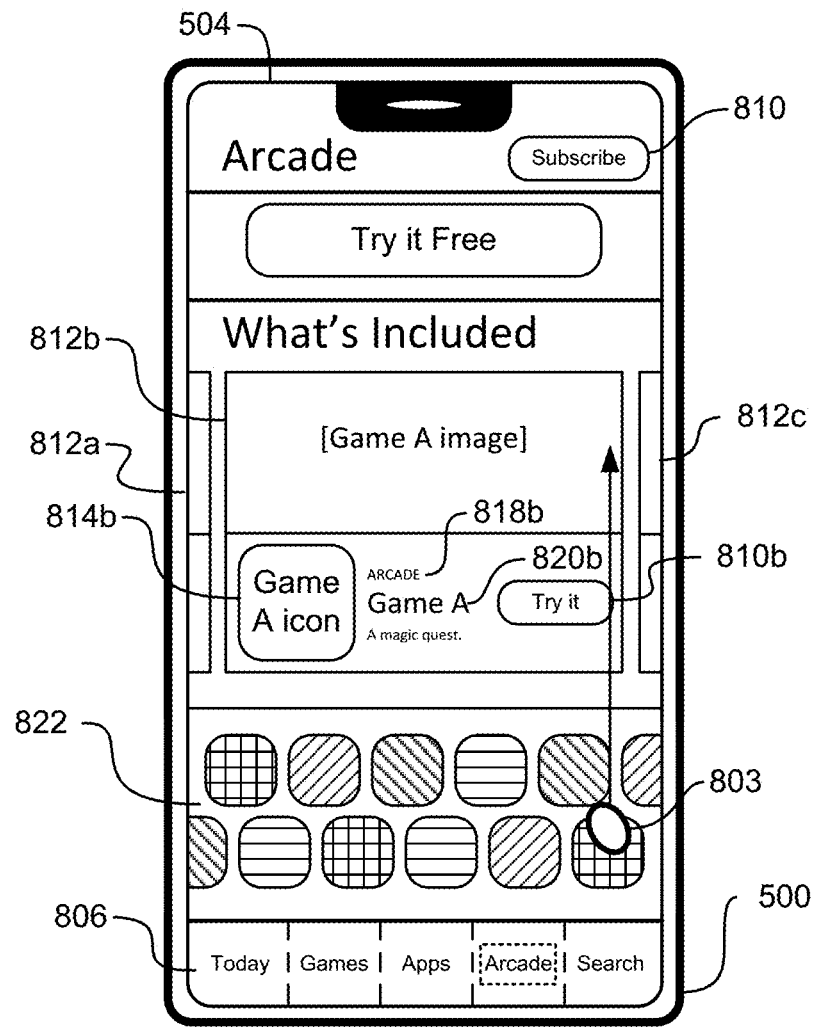

FIG. 8C illustrates the user interface in response to the user's scrolling illustrated in FIG. 8B. The electronic device presents a representation 812*b* of a different application. The representation 812*b* includes an image representing the application, an image 814*b* of the icon that represents the application, a subscription service icon 818*b* that indicates that the application is accessible via the subscription service, the name 820*b* of the application, and a selectable option 816 to initiate a process to subscribe to the subscription service. As shown in FIG. 8C, the user scrolls (e.g., with contact 803) down. In response to the user's scrolling, the electronic device 500 scrolls the user interface in accordance with movement of contact 803.

Figure 8D:
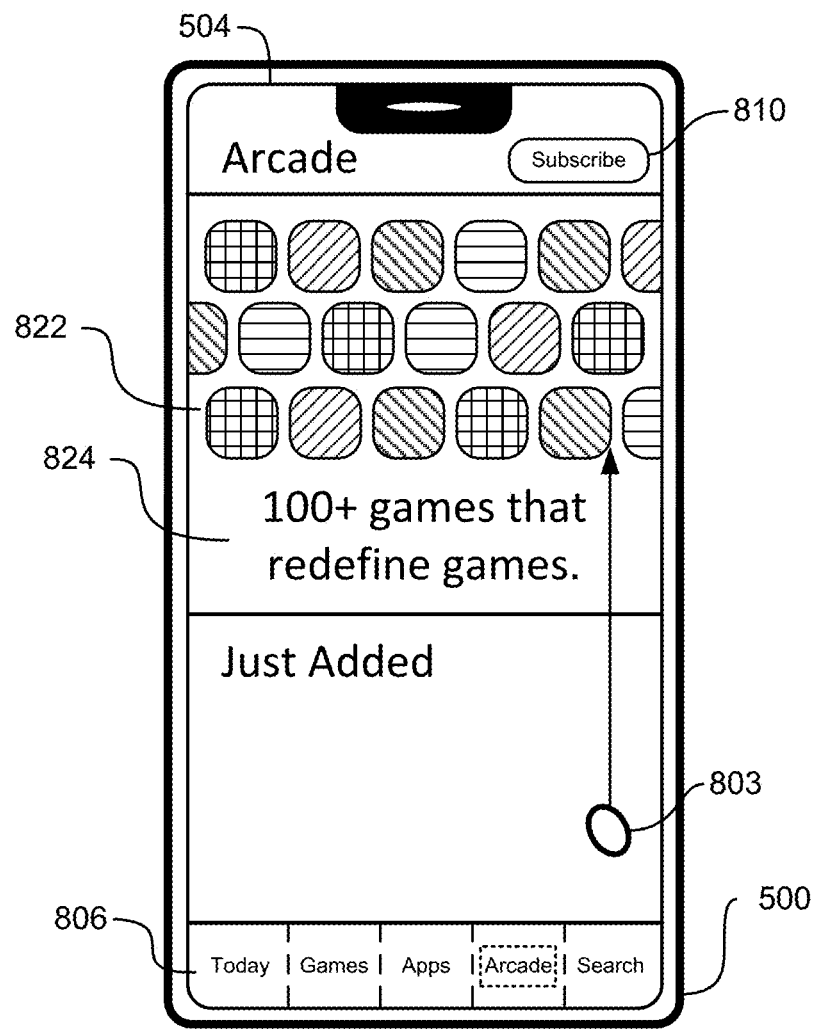

As shown in FIG. 8D, the electronic device 500 presents the images 822 of the icons that represent the applications available from the subscription service. Below the images 822, the electronic device 500 presents information 824 about the subscription service. As shown in FIG. 8D, the user scrolls (e.g., with contact 803) down in the user interface. In response to the user's scrolling, the electronic device 500 scrolls the user interface in accordance with the movement of contact 803.

Figure 8E:
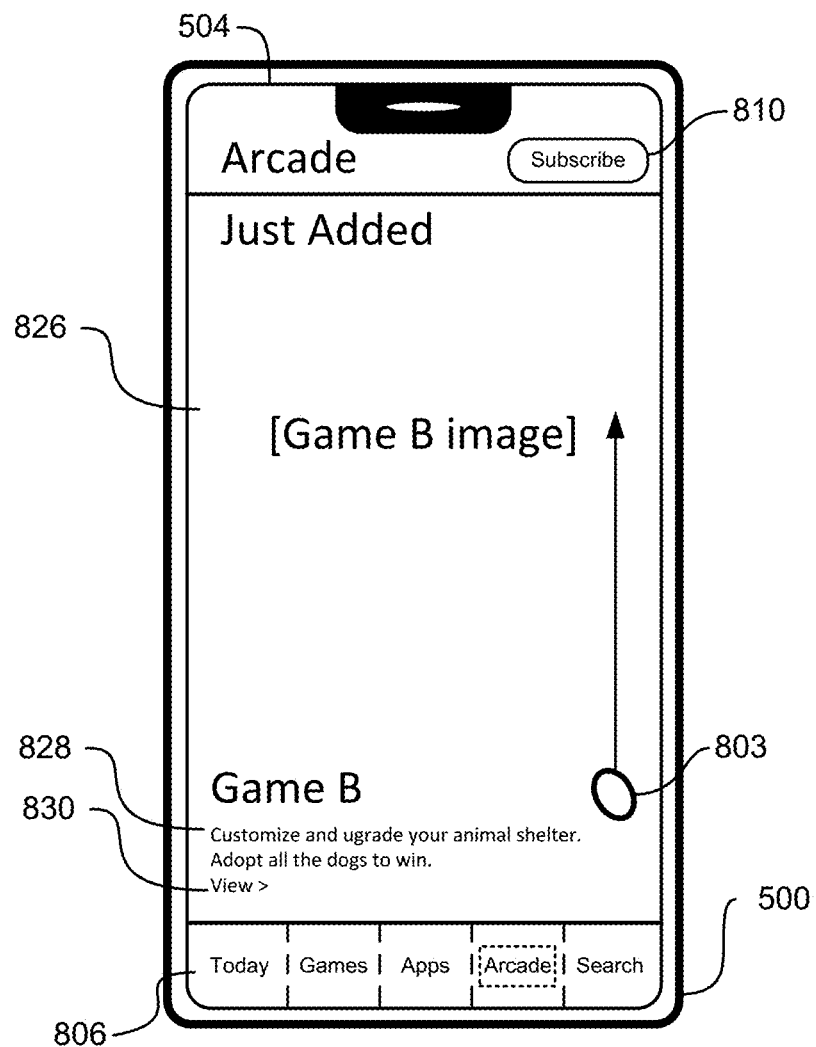

As shown in FIG. 8E, the electronic device 500 presents an image 826 representing one of the applications accessible on the subscription service. The electronic device presents information 828 about the application overlaid on the image 826 and a selectable option 830 to view more information about the application. As shown in FIG. 8E, the user scrolls (e.g., with contact 803) down in the user interface. In response to the user's scrolling, the electronic device 500 scrolls the user interface in accordance with the movement of contact 803.

Figure 8F:
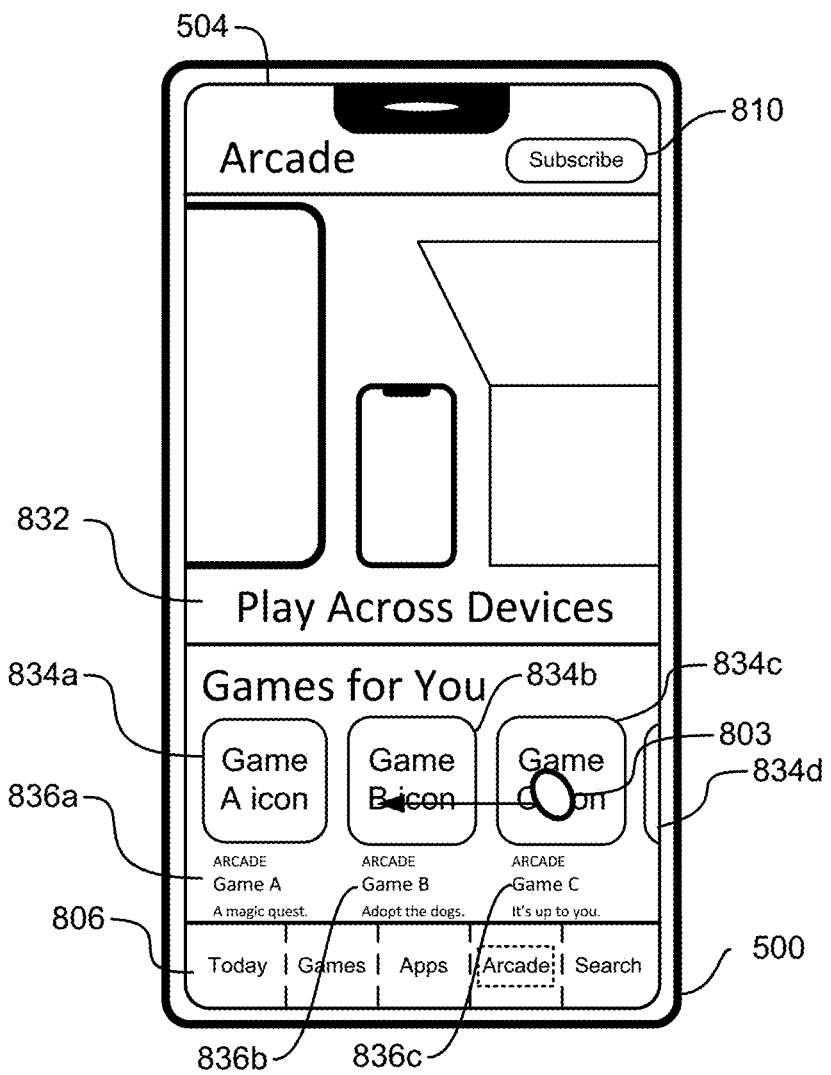

FIG. 8F illustrates the user interface presented by the electronic device 500 following the user's scrolling illustrated in FIG. 8E. The user interface includes information 832 about running the subscription applications on a plurality of types of devices, such as tablets, smartphones or media players, and personal computers. The user interface further includes a plurality of representations 834*a-d* of subscription applications in a horizontally scrollable list. The representations 834*a-d* include images 834*a-d* of icons representing the subscription applications and text 836*a-d* indicating the title of the application, a summary of the application, and the subscription application indication. As shown in FIG. 8F, the user scrolls (e.g., with contact 803) horizontally. In response to the user's scrolling, the electronic device 500 scrolls the plurality of representations 834*a-d* in accordance with the movement of contact 803.

Figure 8G:
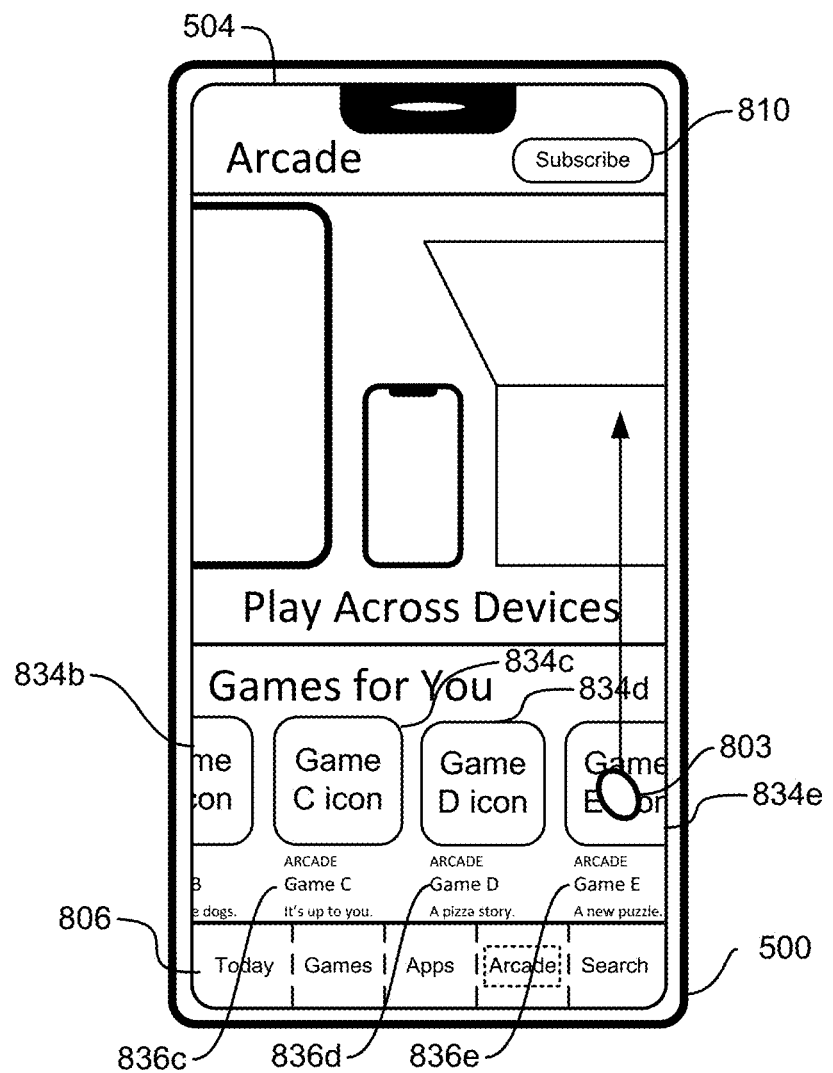

As shown in FIG. 8G, in response to the user's scrolling, the electronic device 500 scrolls the representations of subscription applications to present representations 834*b-e*. The user scrolls (e.g., with contact 803) down. In response to the user's scrolling, the electronic device 500 scrolls the user interface in accordance with movement of contact 803.

Figure 8H:
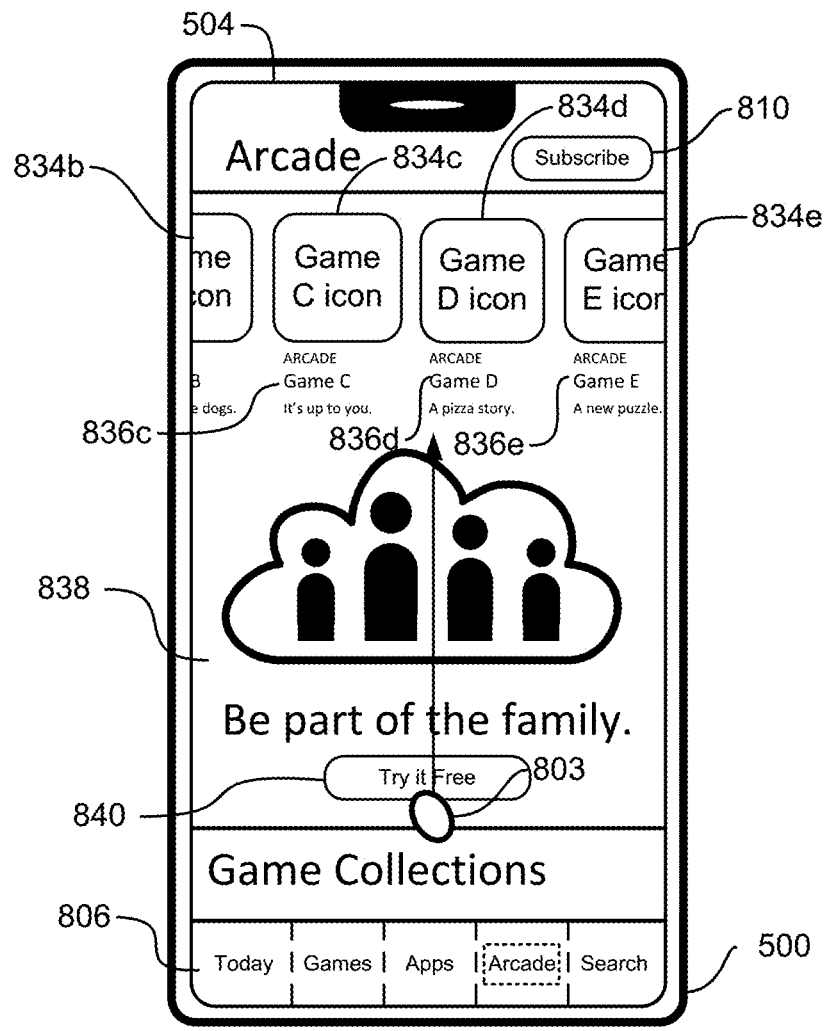

As shown in FIG. 8H, the electronic device 500 reveals information 838 about sharing the subscription services with user accounts in family group of user accounts and a selectable option 840 to subscribe to the subscription service in response to the user's scrolling. A user account associated with the electronic device 500 is optionally one of a plurality of associated accounts within a family account. The subscription service is shared among all of the accounts in the family account, allowing each user account in the family account to access the subscription applications as long as the family account is subscribed to the subscription service. The user scrolls (e.g., with contact 803) down in the user interface.

Figure 8I:
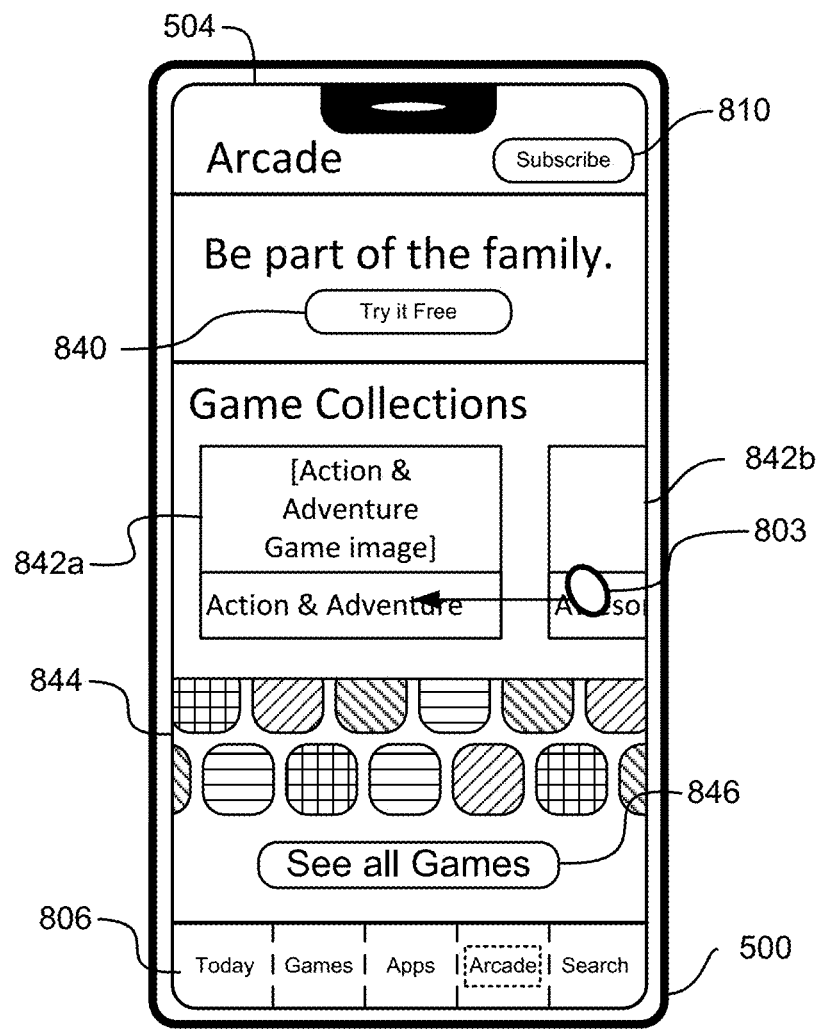

In response to the user's scrolling, the electronic device 500 scrolls the user interface as shown in FIG. 8I. The electronic device presents a plurality of representations 842*a-842b* of collections of subscription applications. The representations 842*a-b* are selectable to present representations of the plurality of applications included in each collection. The representations 842*a-b* are horizontally scrollable. The user interface further includes images 844 of icons representing the subscription applications. The rest of the user interface is overlaid on the images 844, which are optionally animated to scroll horizontally. Beneath the images 844, the electronic device 500 presents a selectable option 846 that, when selected, causes the electronic device to present representations of all of the subscription applications. As shown in FIG. 8I, the user scrolls (e.g., with contact 803) horizontally. In response to the user's scrolling, the electronic device 500 scrolls the user interface in accordance with the movement of contact 803.

Figure 8J:
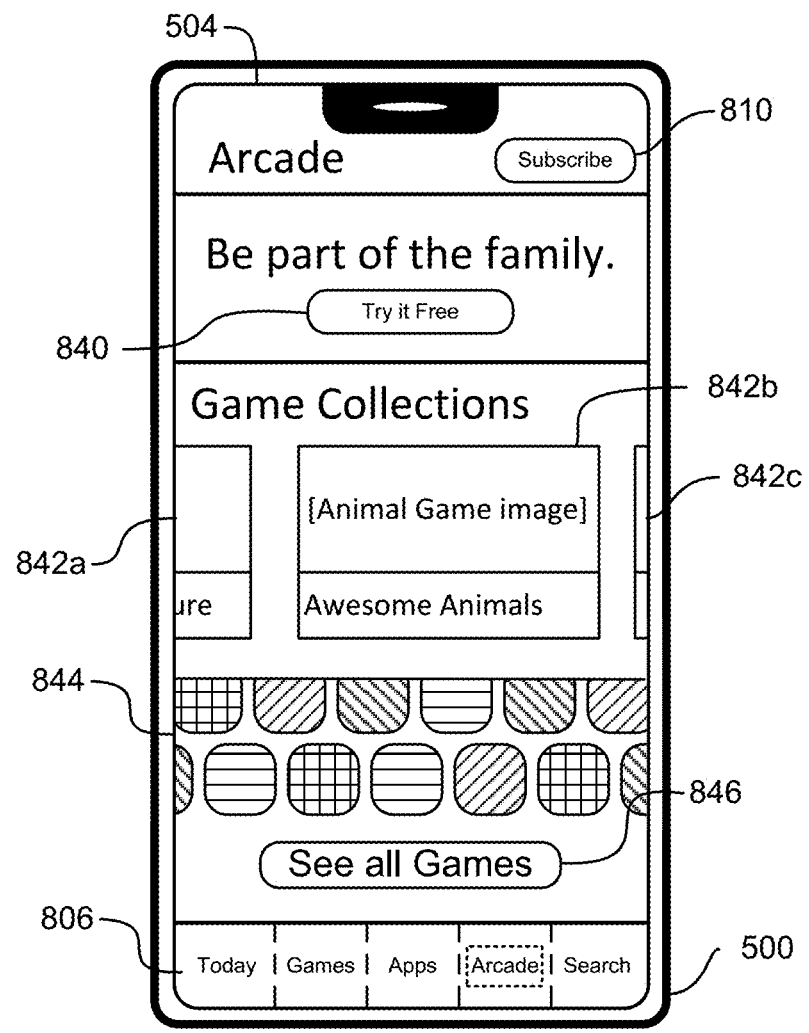

As shown in FIG. 8J, in response to the user's scrolling in FIG. 8, the electronic device 500 presents the entirety of representation 842*b* of a collection of subscription applications and a portion of a representation 842*c* of another collection of subscription applications.

Figure 8K:
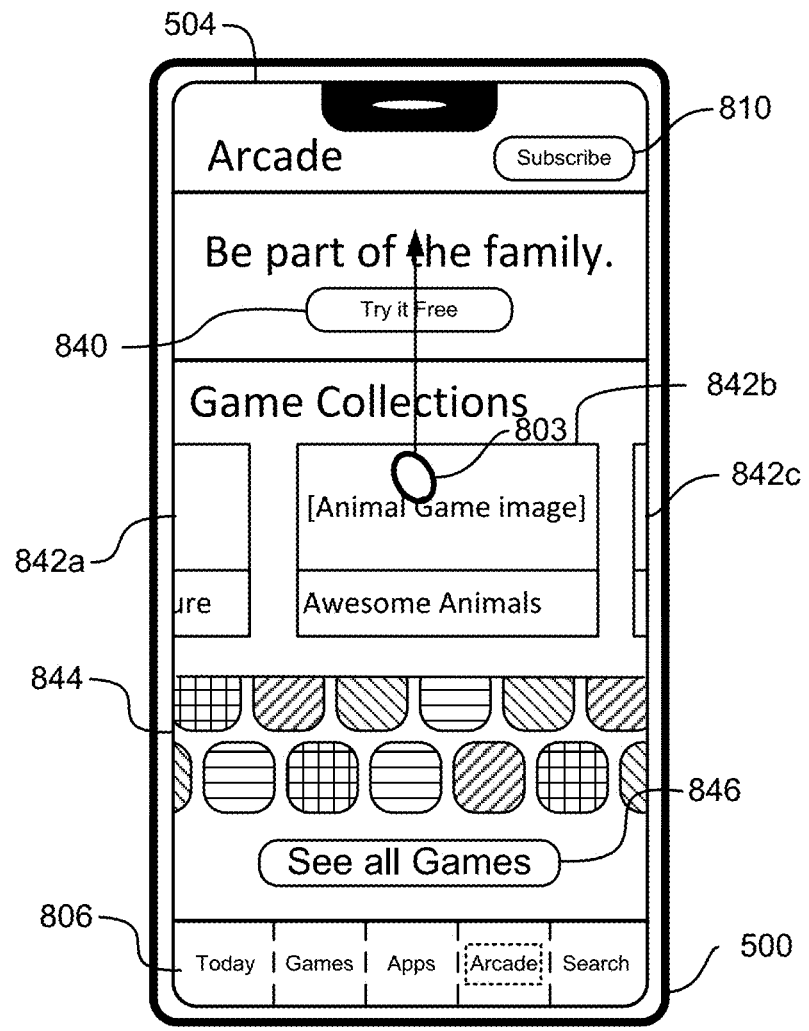
Figure 8L:
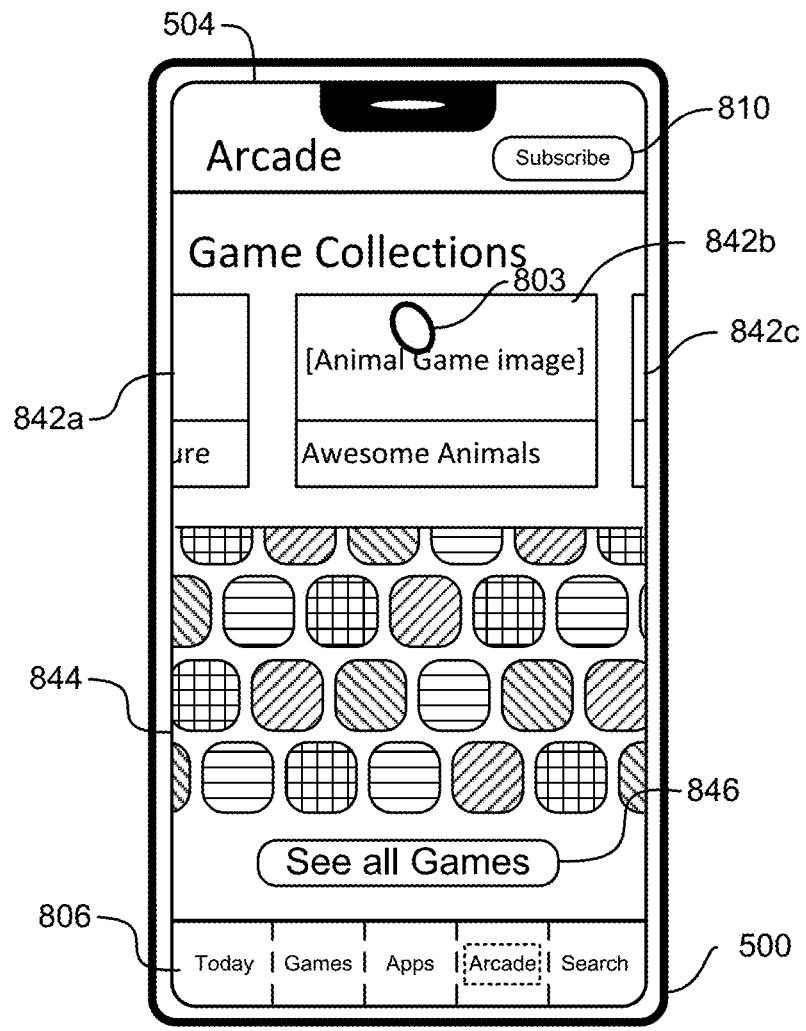

In FIG. 8K, the user scrolls (e.g., with contact 803) down in the user interface. As shown in FIG. 8L, while the user continues to hold contact 803, the user interface scrolls to reveal additional images 844 of icons of subscription applications from beneath the user interface. In response to detecting liftoff of the contact 803, the electronic device 500 presents the user interface at the position it was in before the user scrolled down past the end of the user interface, as shown in FIG. 8N.

Figure 8N:
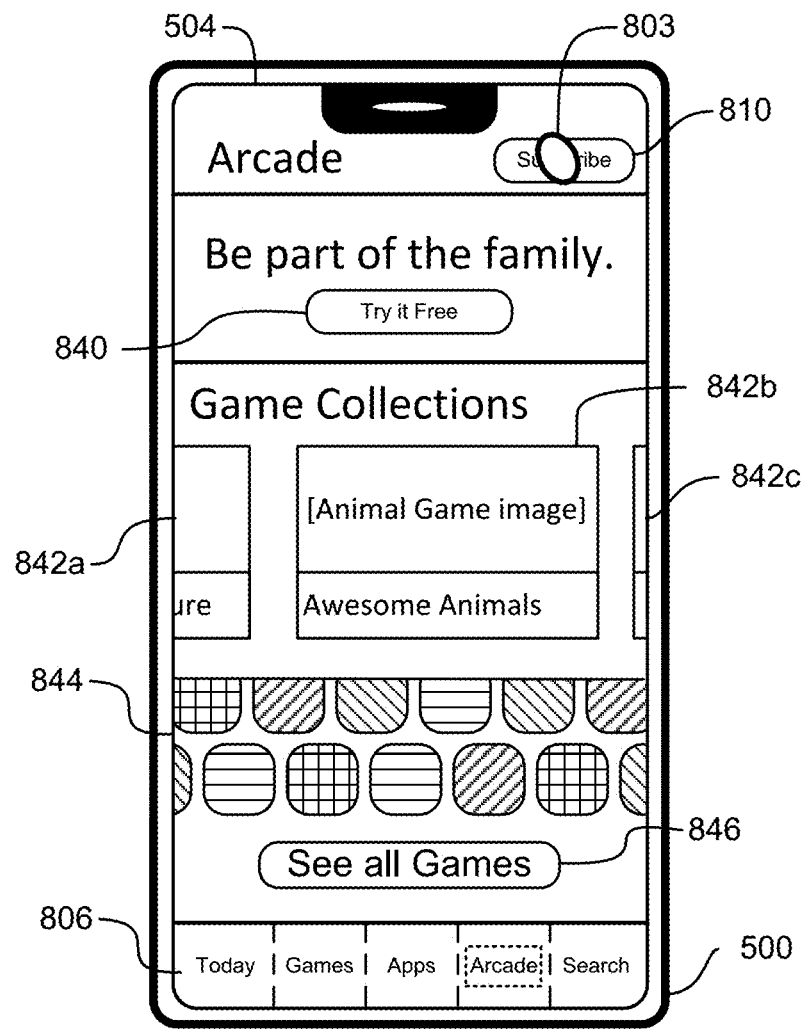

Also shown in FIG. 8N, the user selects (e.g., with contact 803) the selectable option 810 to subscribe to the subscription service. In response to the user's selection, the electronic device initiates a process to subscribe to the subscription service. Successfully subscribing to the subscription service enables the electronic device 500 to access the subscription applications.

Figure 8O:
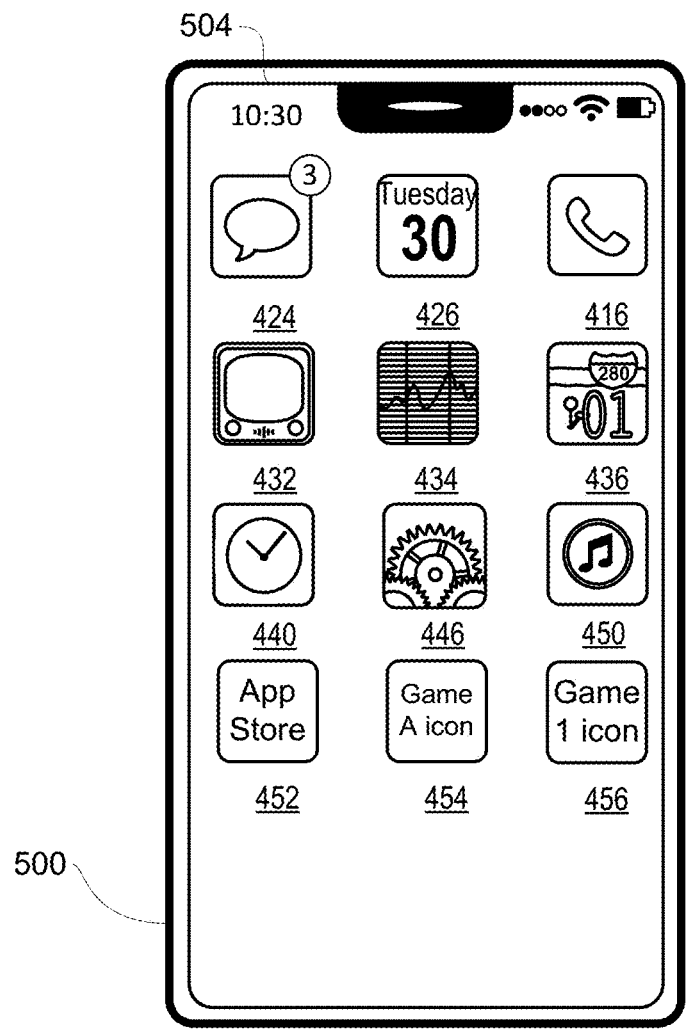

FIG. 8O illustrates a home screen user interface including an icon 454 representing a subscription application that has been downloaded to the electronic device and an icon 564 representing a non-subscription application that has been downloaded to the electronic device. As shown in FIG. 8O, the icon 454 of the subscription application does not include an indication of the subscription service, although images of the icon include an indication of the subscription service when presented in the application store user interface. In some embodiments, the indication of the subscription service is presented on the home screen on or proximate to the icon 454 representing the subscription application.

Figure 8P:
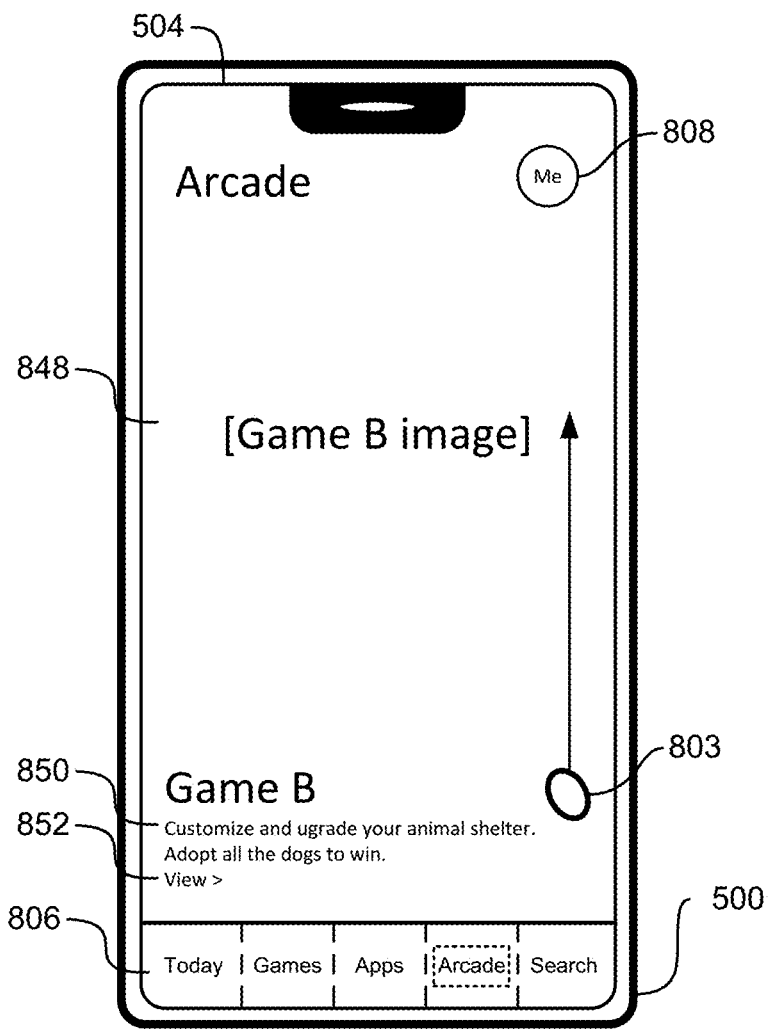

FIGS. 8P-8BB illustrate a subscription applications user interface of an application store application when the user is subscribed to the subscription service that provides access to one or more subscription applications on the electronic device. As shown in FIG. 8P, the user interface includes the indication 808 of the user account, an image 848 representing one of the subscription applications, information 850 about the subscription application, and a selectable option 852 that is selectable to present a product page user interface of the subscription application in accordance with method 700. The user interface further includes the navigation bar 806. The user scrolls (e.g., with contact 803) down. In response to the user's scrolling, the electronic device 500 scrolls the user interface in accordance with the movement of contact 803.

Figure 8Q:
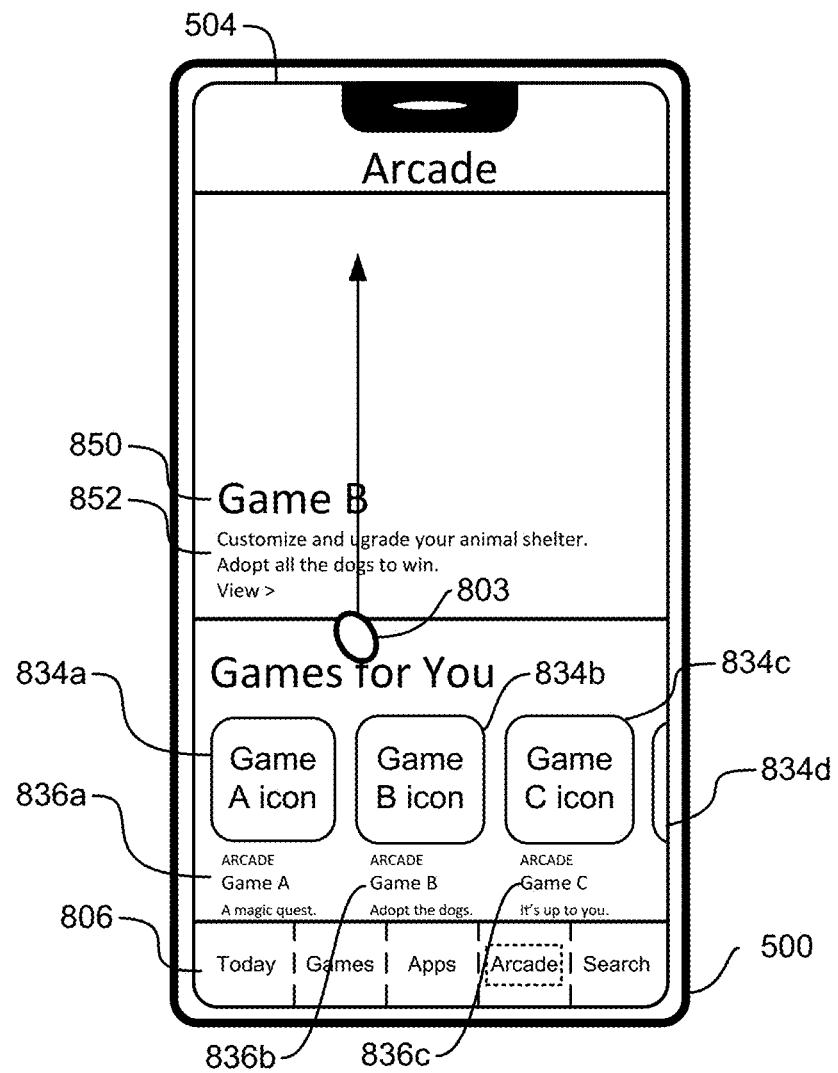

As shown in FIG. 8Q, in response to the user's scrolling in FIG. 8P, the electronic device presents a plurality of images 834a-834d of icons of subscription applications with information 836a-c about the respective subscription applications. The images 834a-d and information 836a-c are horizontally scrollable in a manner similar to that illustrated in FIGS. 8F-8G. The images 834a-d are selectable to present product page user interfaces of the selected application in accordance with method 700. As shown in FIG. 8Q, the user scrolls (e.g., with contact 803) down. In response to the user's scrolling, the electronic device 500 scrolls the user interface in accordance with the movement of contact 803.

Figure 8R:
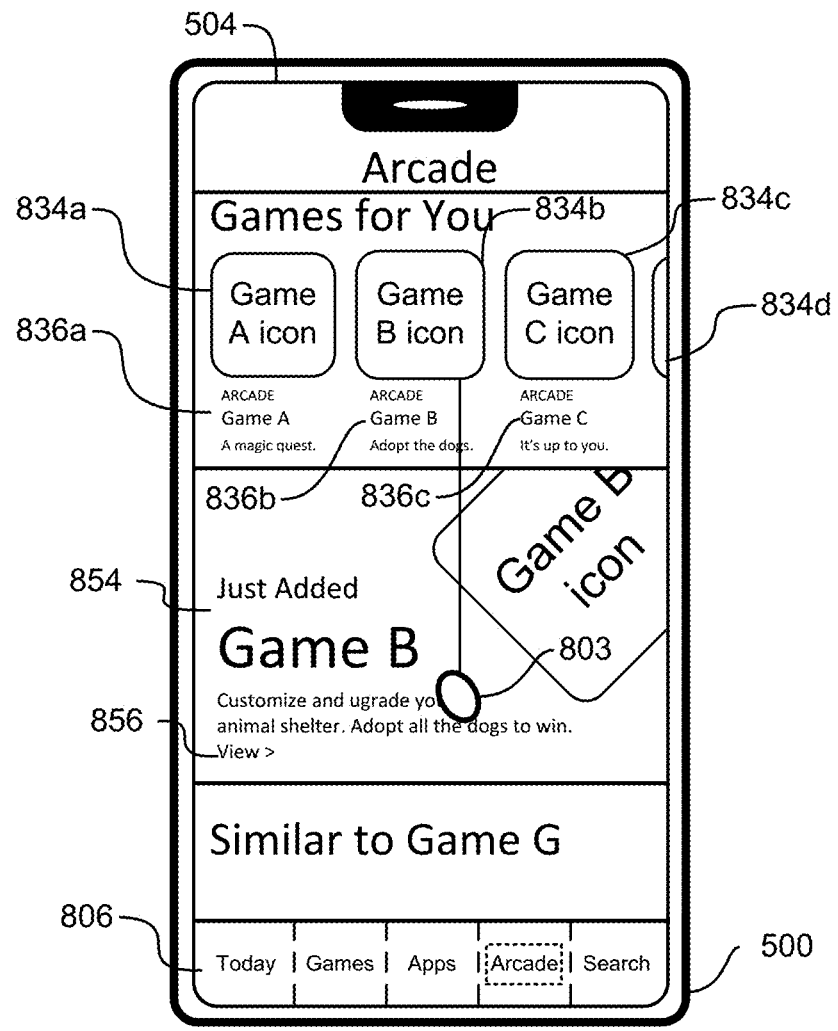

FIG. 8R illustrates the user interface after the user's scrolling illustrated in FIG. 8Q. The user interface includes a representation 854 of one of the subscription applications including information about the application and a selectable option 856 to present the product page user interface of the application in accordance with method 700. As shown in FIG. 8R, the user scrolls (e.g., with contact 803) down. In response to the user's scrolling, the electronic device 500 scrolls the user interface in accordance with the movement of contact 803.

Figure 8S:
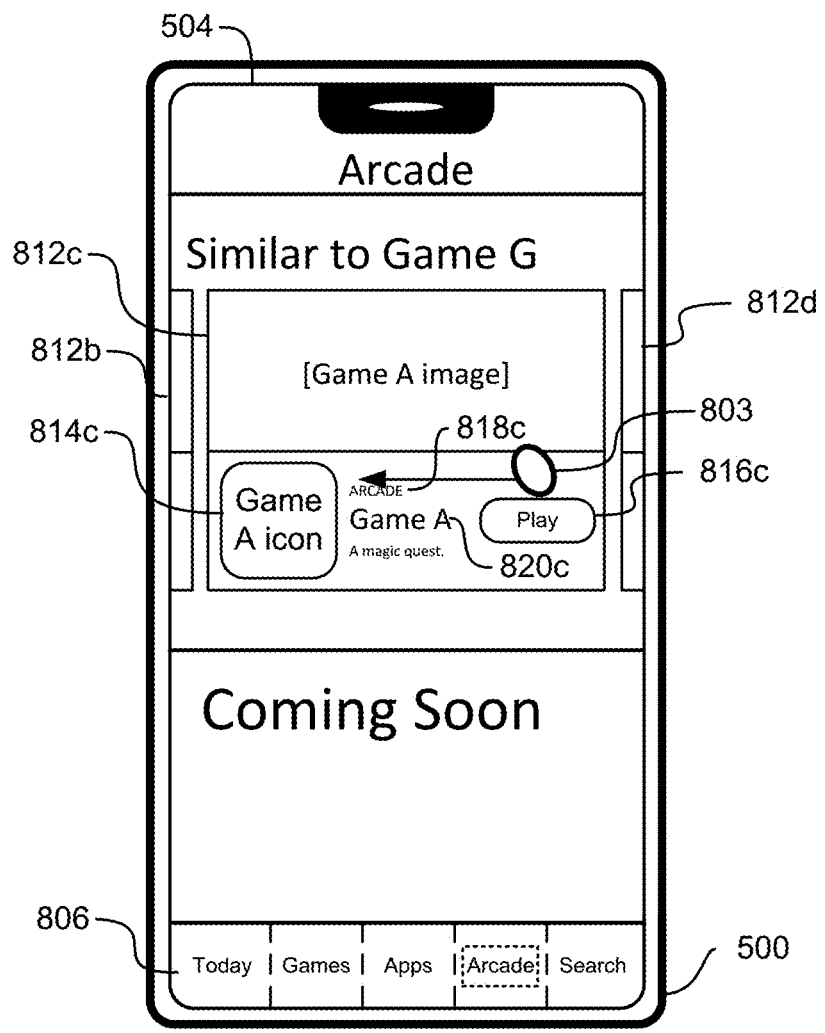

As shown in FIG. 8S, in response to the user's scrolling in FIG. 8R, the electronic device presents a plurality of representations 812b-d, including the entirety of one of the representations 812c. The representation 812c includes an image representation of the application, an image 814c of an icon of the application, the visual indication 818c of the subscription service, the title 820c of the application, and a selectable option 816c to open the application, if the application is installed on the electronic device (e.g., because the user is subscribed to the subscription service—in the case where the user was not subscribed to the subscription service, as described previously, the selectable option 816c was optionally selectable to initiate a process to subscribe to the subscription service rather than to open the application). As shown in FIG. 8S, the user scrolls (e.g., with contact 803) the representations 812b-d of the applications horizontally.

Figure 8T:
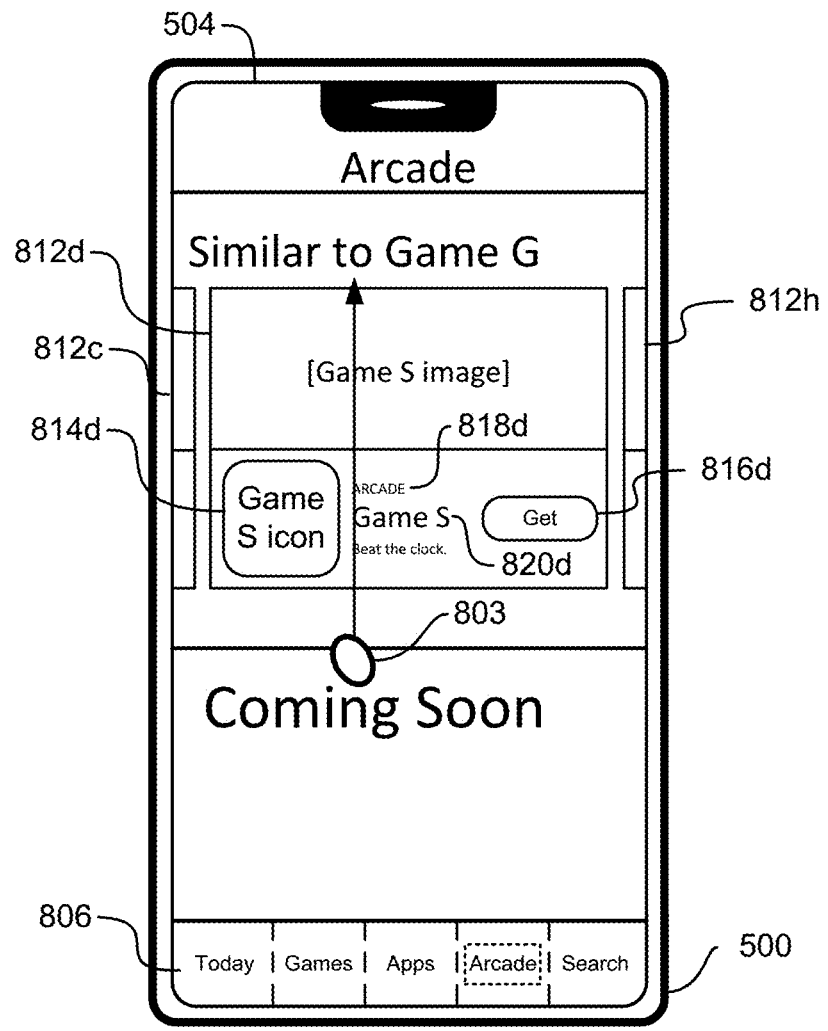

In response to the user's scrolling in FIG. 8S, the electronic device 500 presents the entirety of representation 812d, as shown in FIG. 8T. The representation 812d includes similar content to representation 812c except instead of including a selectable option to open the application, the representation 812c includes a selectable option 816d to download the application because the application has not been downloaded to the electronic device yet. As shown in FIG. 8T, the user scrolls down (e.g., with contact 803) in the user interface.

Figure 8U:
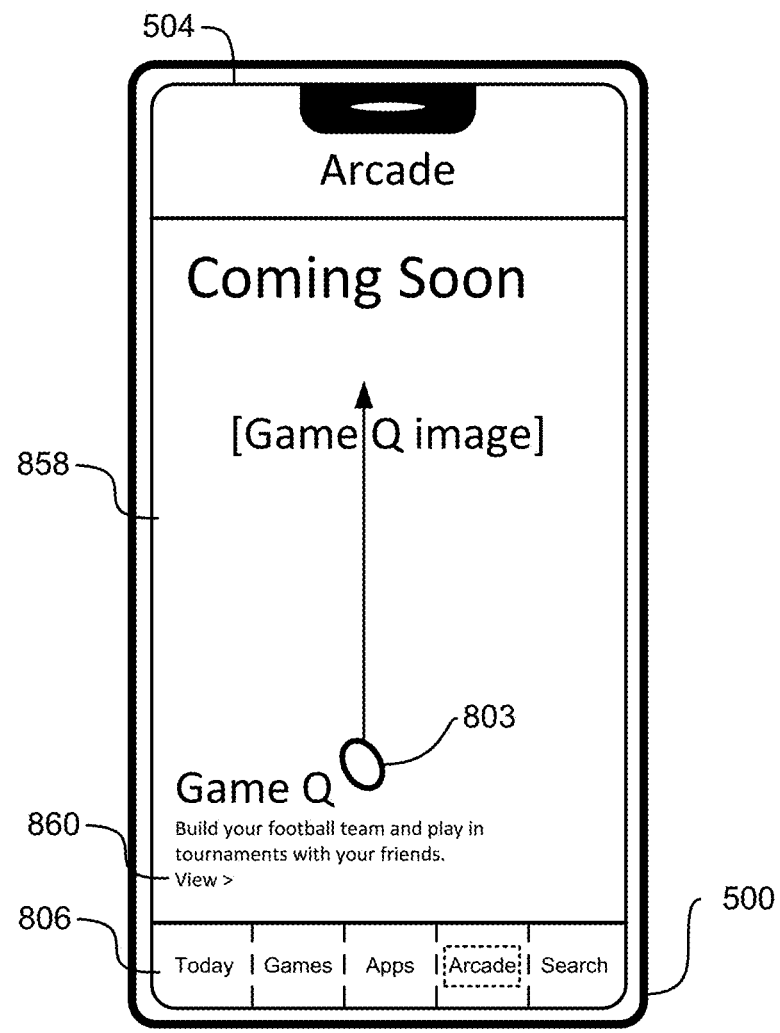

As shown in FIG. 8U, in response to the user's scrolling in FIG. 8T, the electronic device presents an image 858 representing one of the subscription applications with information about the application overlaid on the image. The information includes a selectable option 860 to present the product page user interface of the application in accordance with method 700. As shown in FIG. 8U, the user scrolls (e.g., with contact 803) down. In response to the user's scrolling, the electronic device 500 scrolls the user interface in accordance with the movement of contact 803.

Figure 8V:
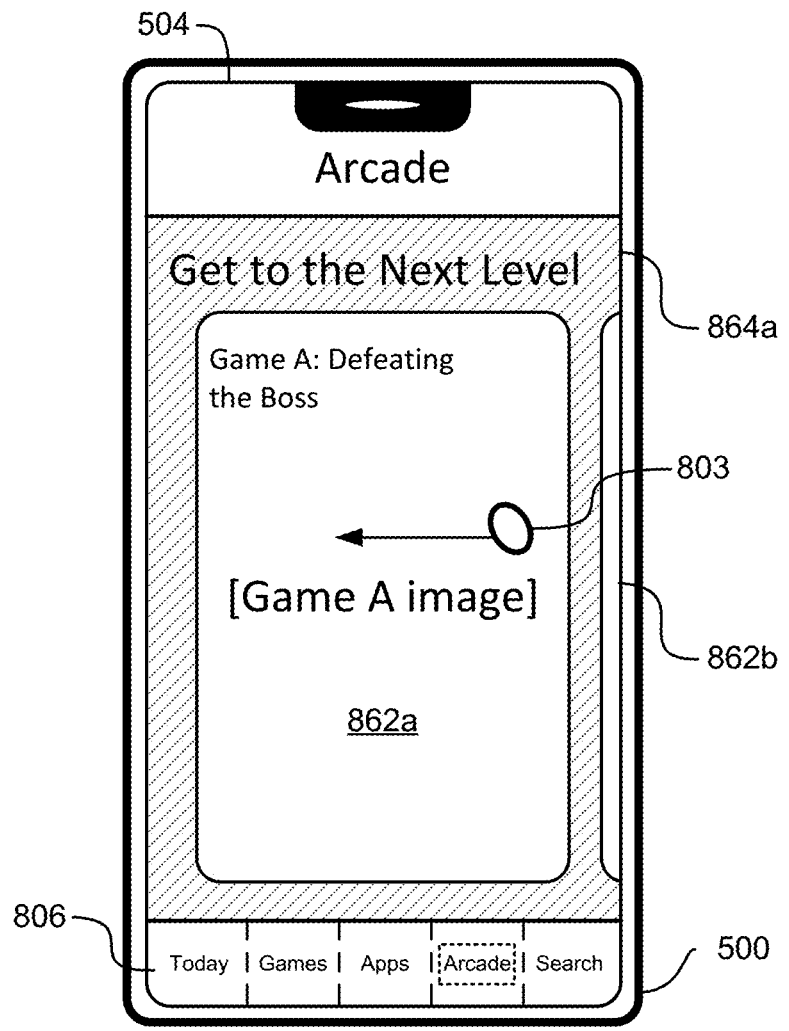

As shown in FIG. 8V, in response to the user's scrolling, the electronic device 500 reveals representations 862a-b of editorial stories related to subscription applications available through the subscription service. The editorial stories shown optionally relate to the user's subscription application usage history, including progress within one or more applications. The electronic device 500 presents a representation 862a of a first story overlaid on a background 864a that has a color based on the colors of the representation 862a. The user scrolls (e.g., with contact 803) horizontally in the user interface.

Figure 8W:
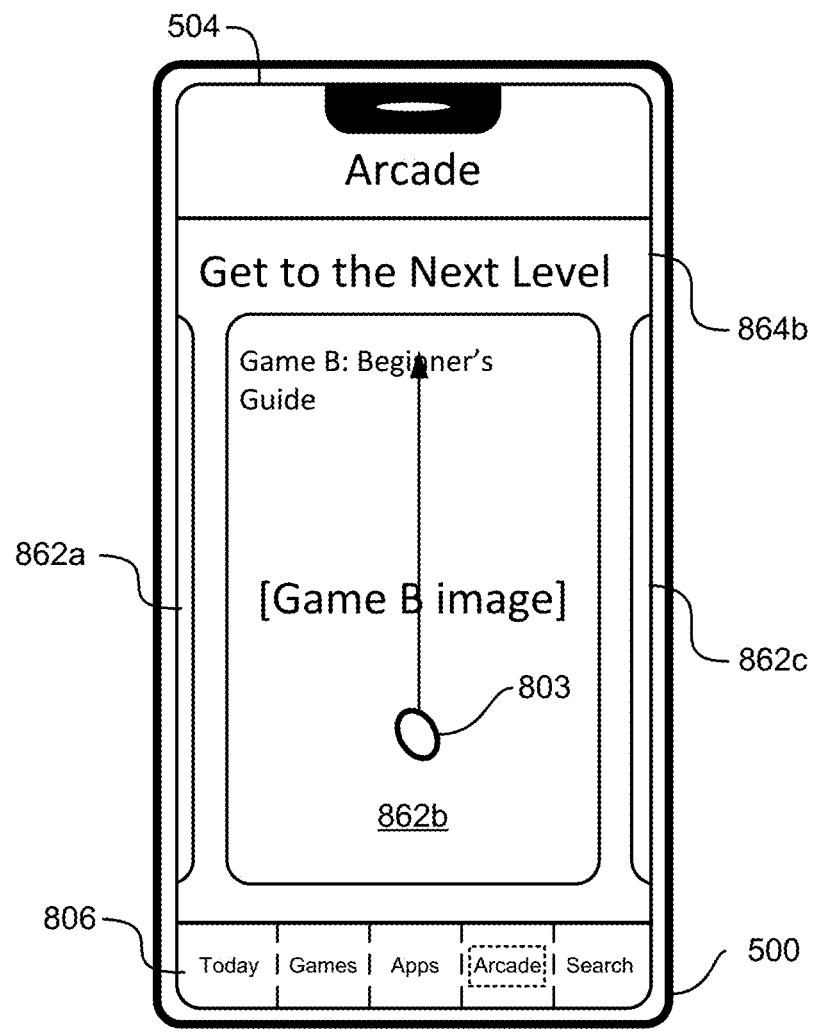

In response to the user's scrolling in FIG. 8V, the electronic device presents the representation 862b in full. The representation 862b is presented on a background 864b that has a color based on the colors of the representation 862b (e.g., the background changed when the user scrolled from representation 862a to 862b). As shown in FIG. 8W, the user scrolls (e.g., with contact 803) down. In response to the user's scrolling, the electronic device 500 scrolls the user interface in accordance with movement of contact 803.

Figure 8X:
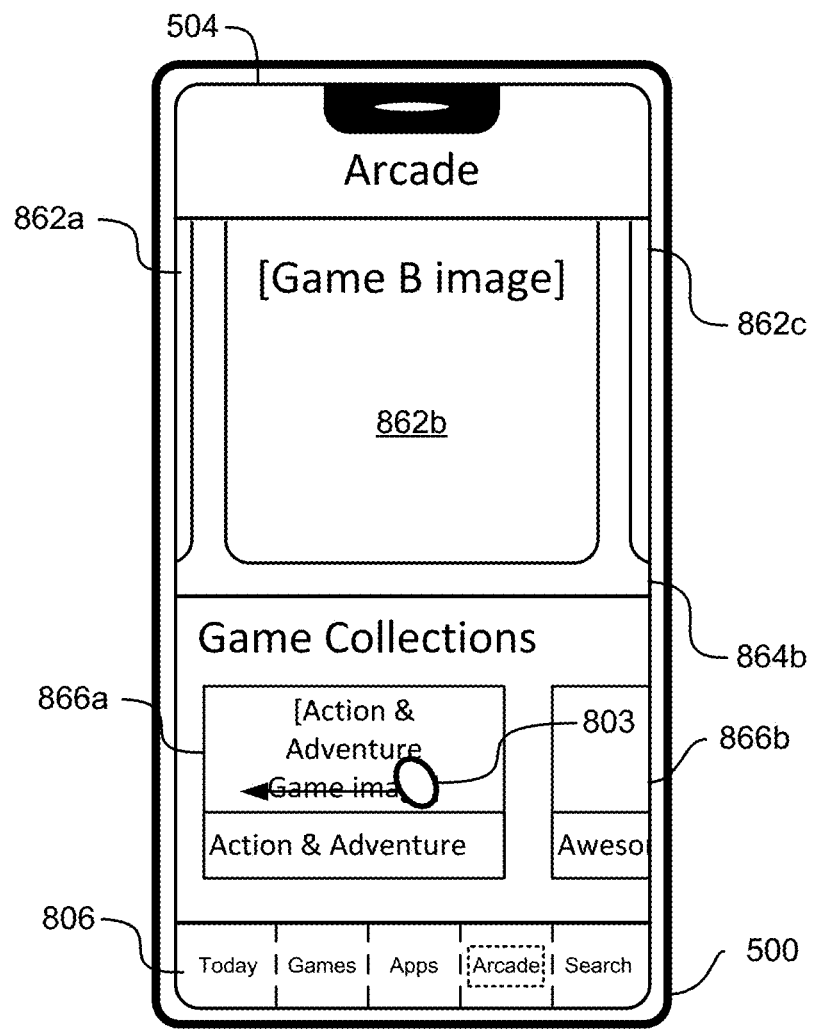
Figure 8Y:
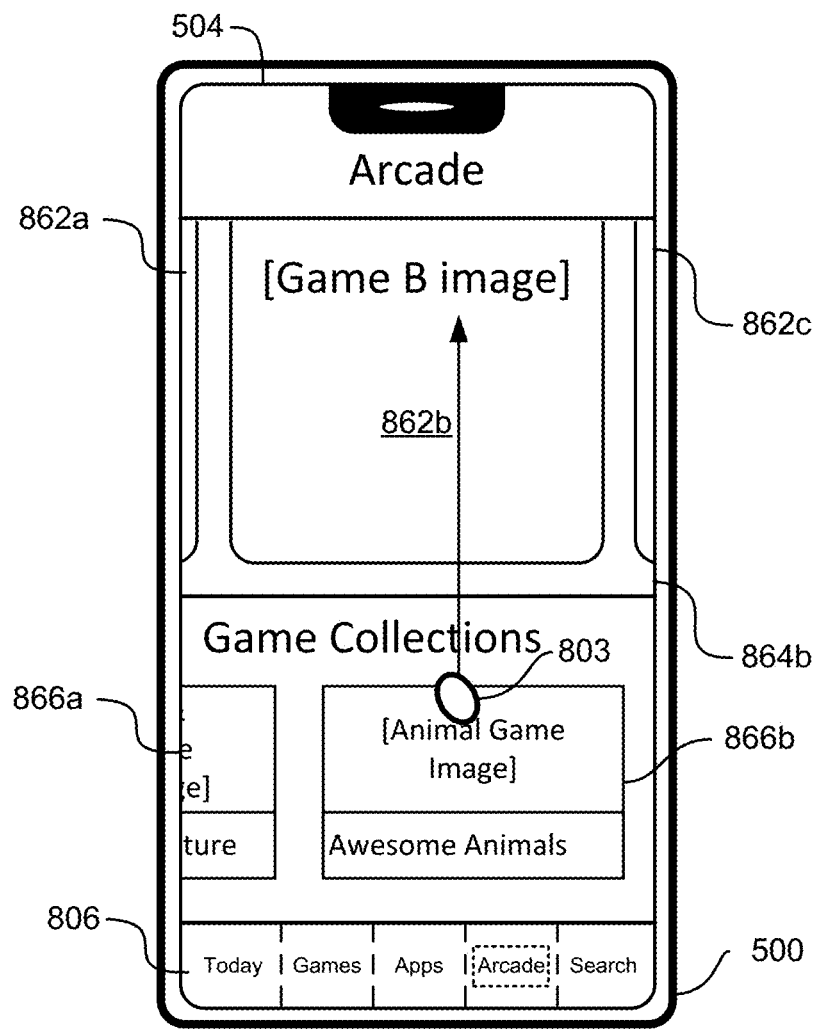

As shown in FIGS. 8X-8Y, in response to the user's scrolling, the electronic device presents representations 866a-b of application collections that are similar to the representations 842a-b described above with respect to FIGS. 8I-8J. In FIG. 8Y, the user scrolls (e.g., with contact 803) down. In response to the user's scrolling, the electronic device 500 scrolls the user interface in accordance with the movement of contact 803.

Figure 8Z:
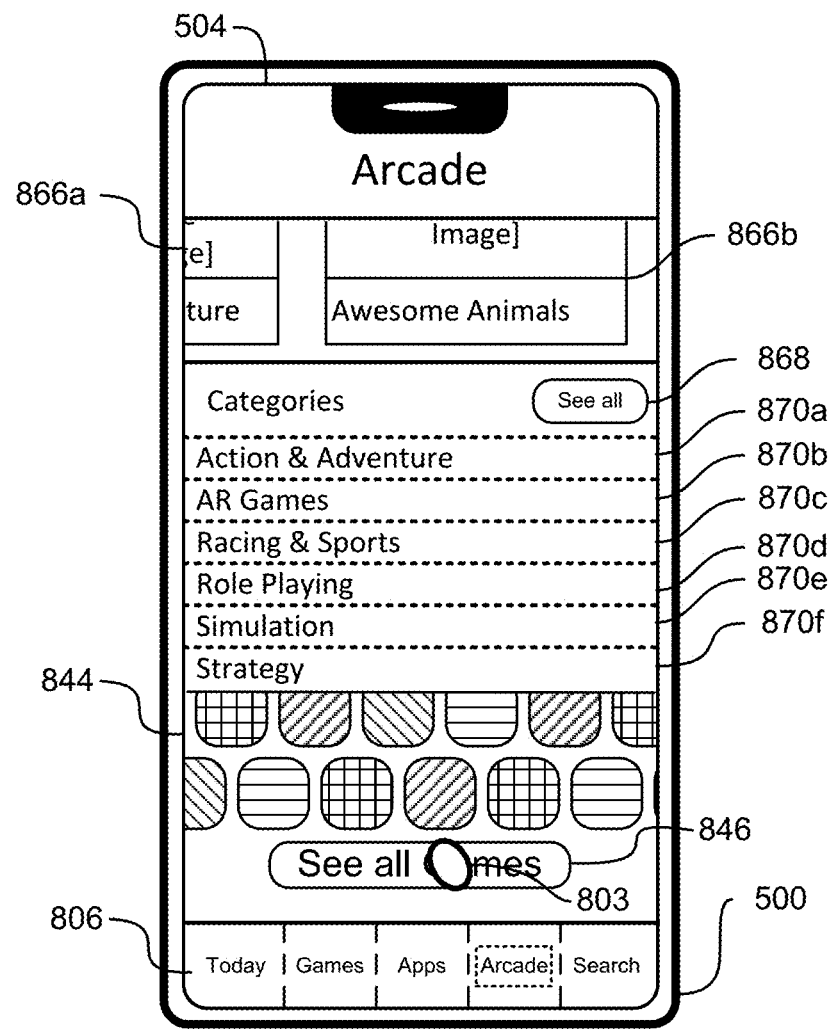
Figure 8A:
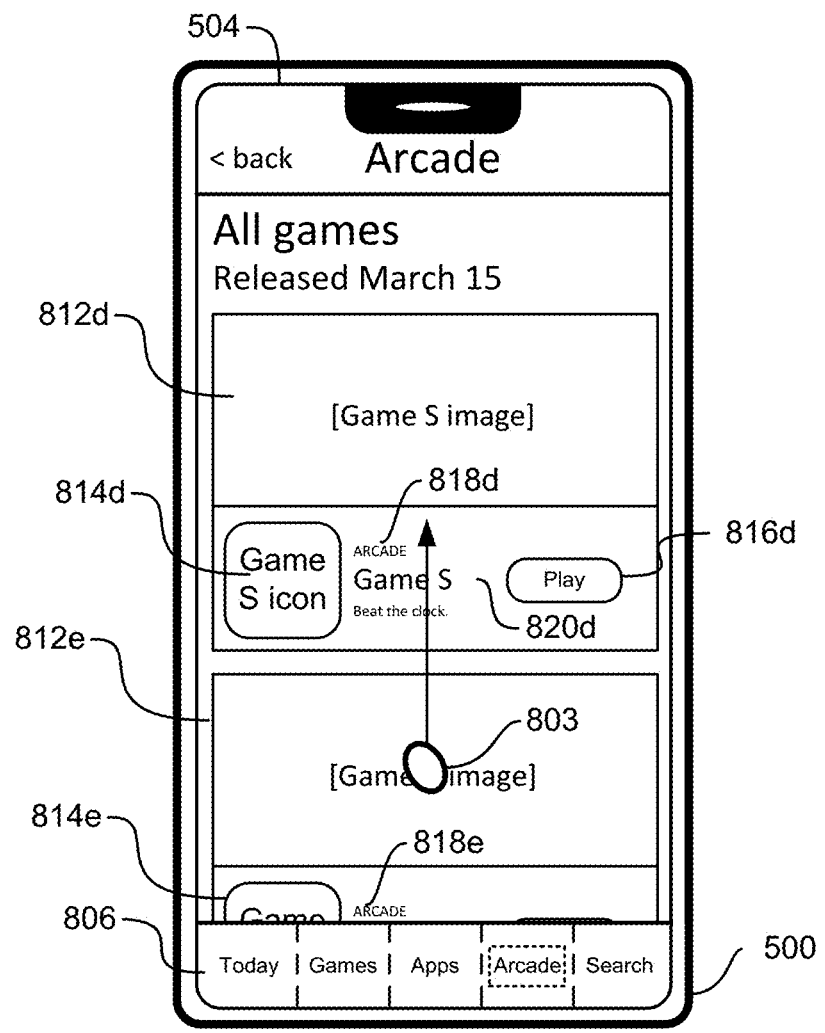
Figure 8B:
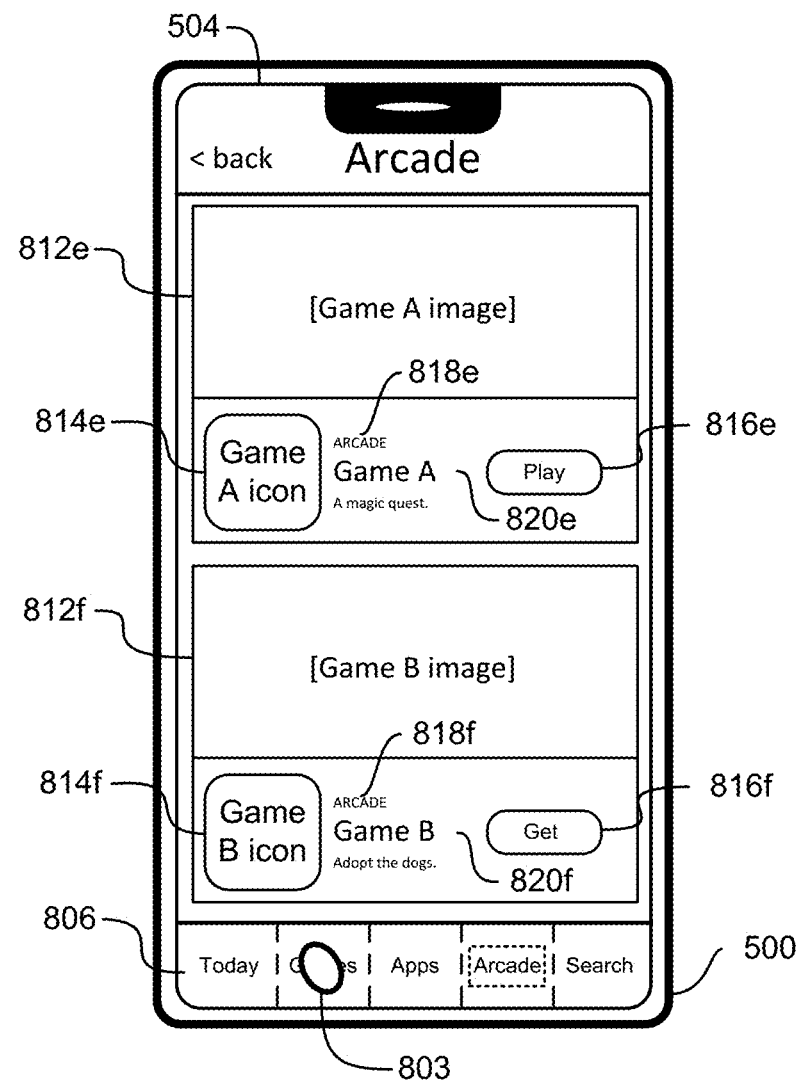
Figure 8C:
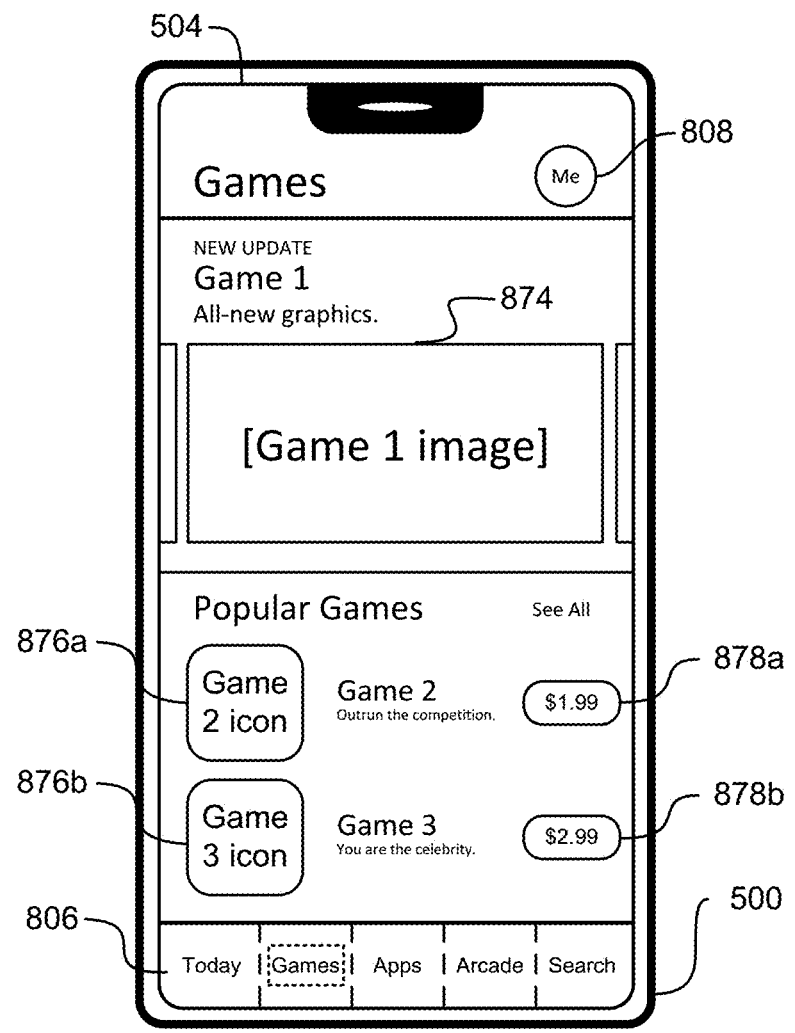
Figure 9A:
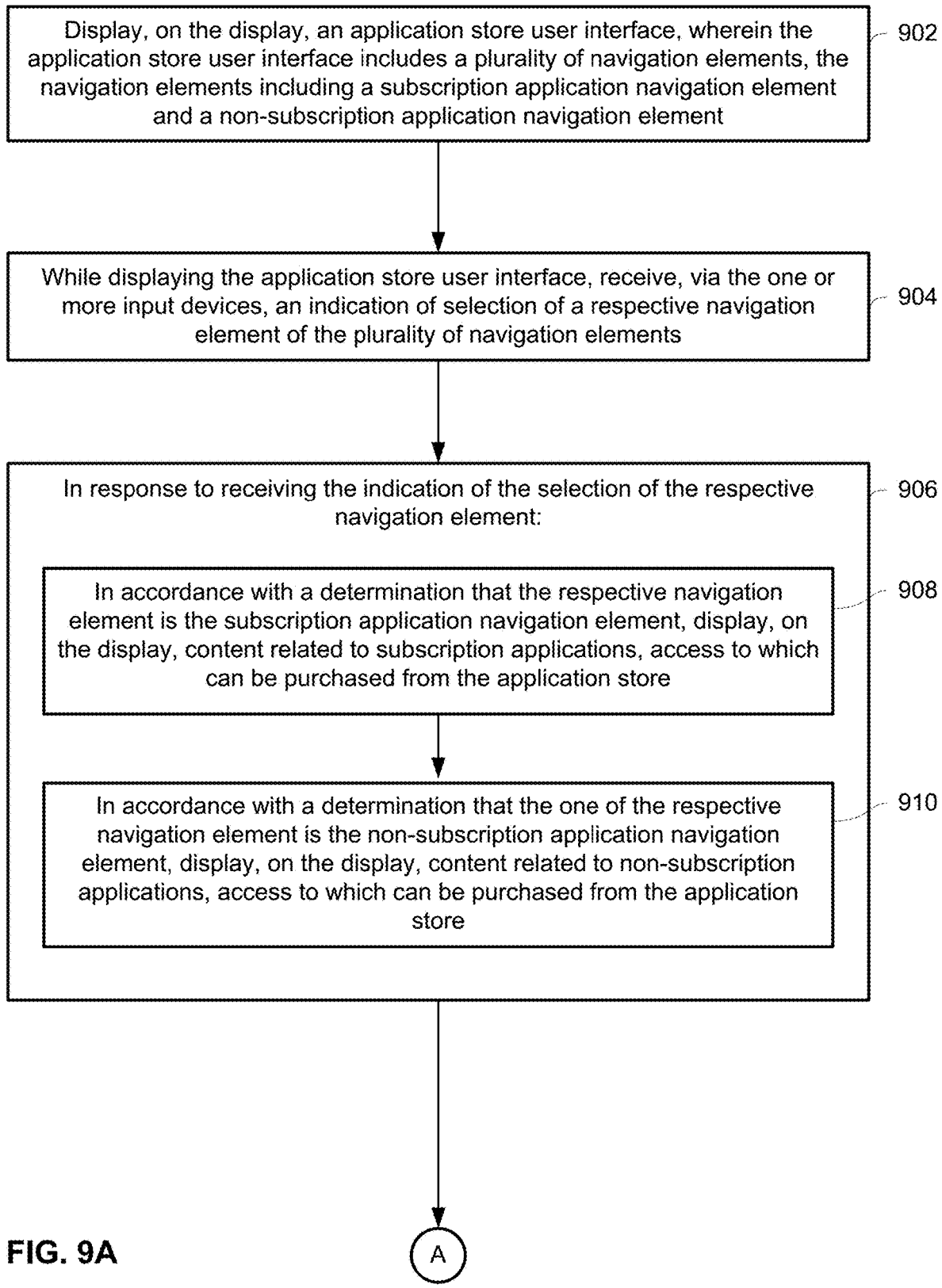
Figure 9B:
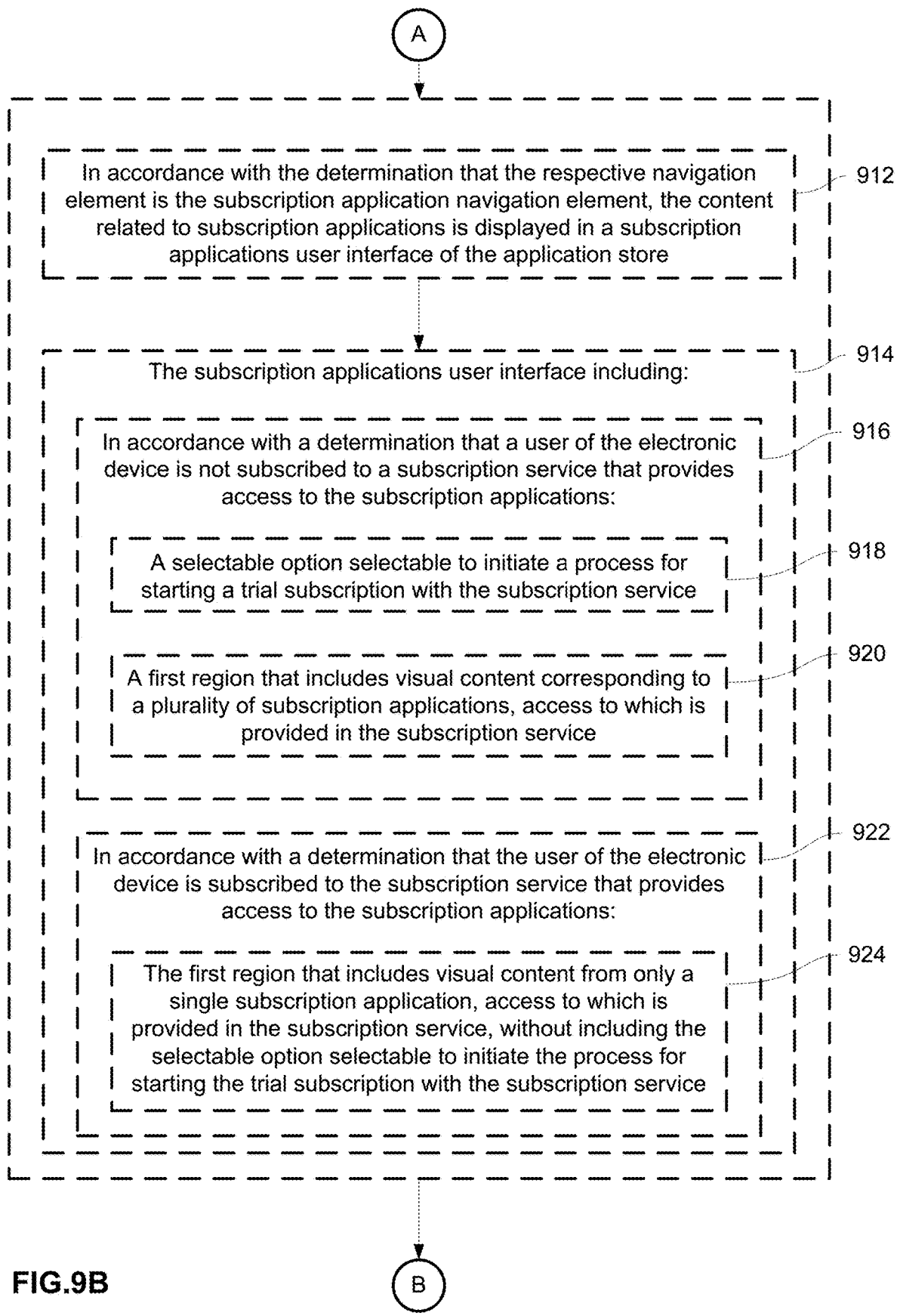
Figure 9C:
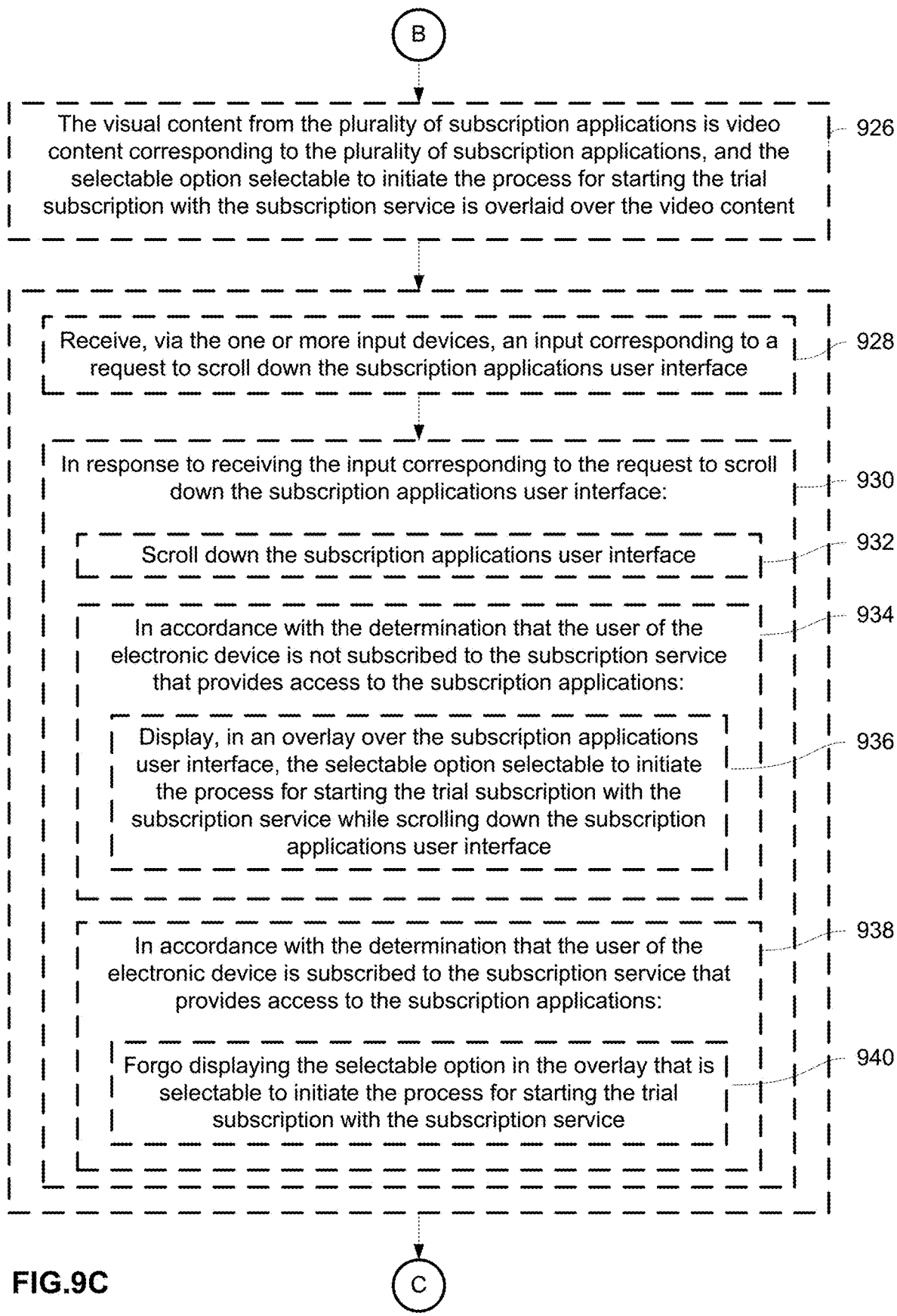
Figure 9D:
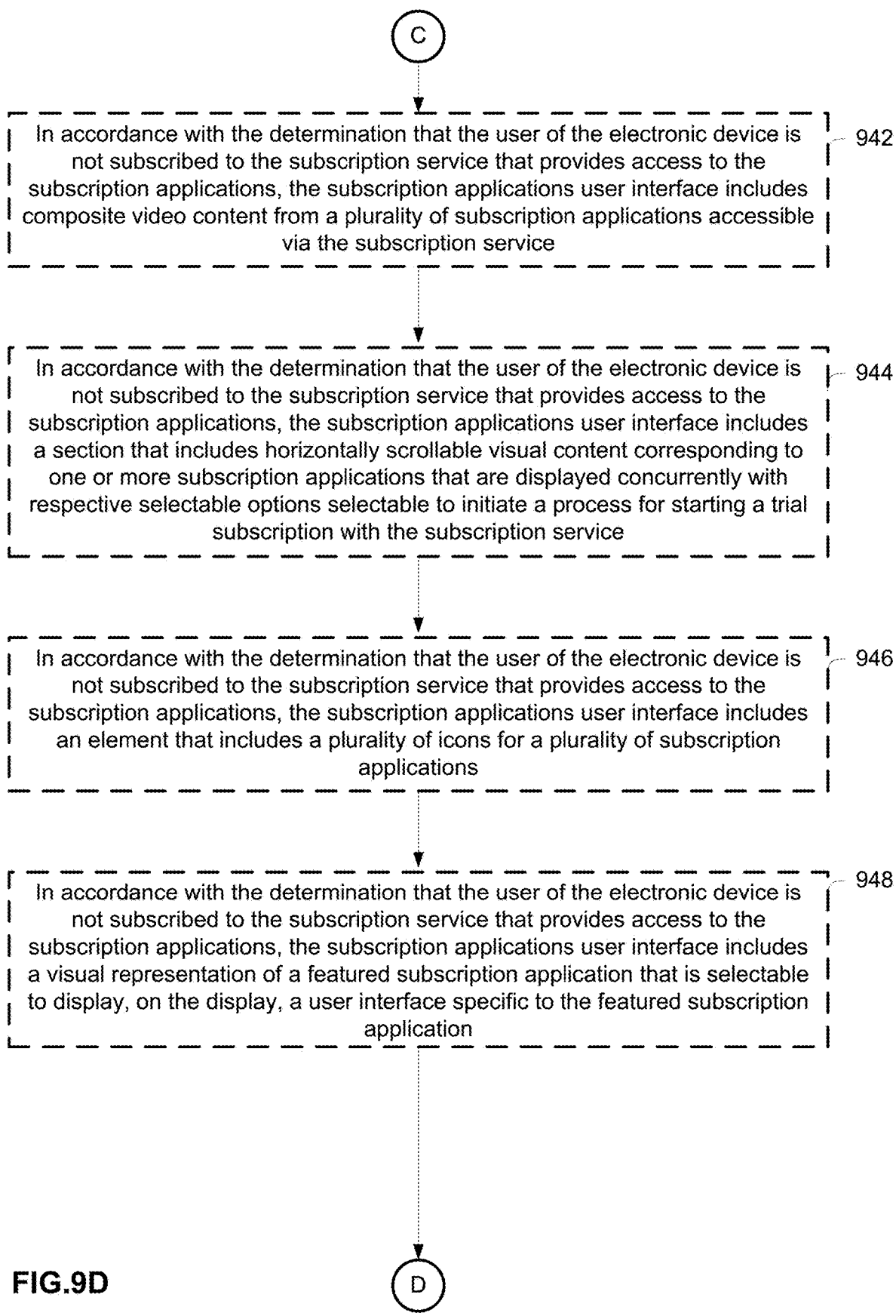
Figure 9H:
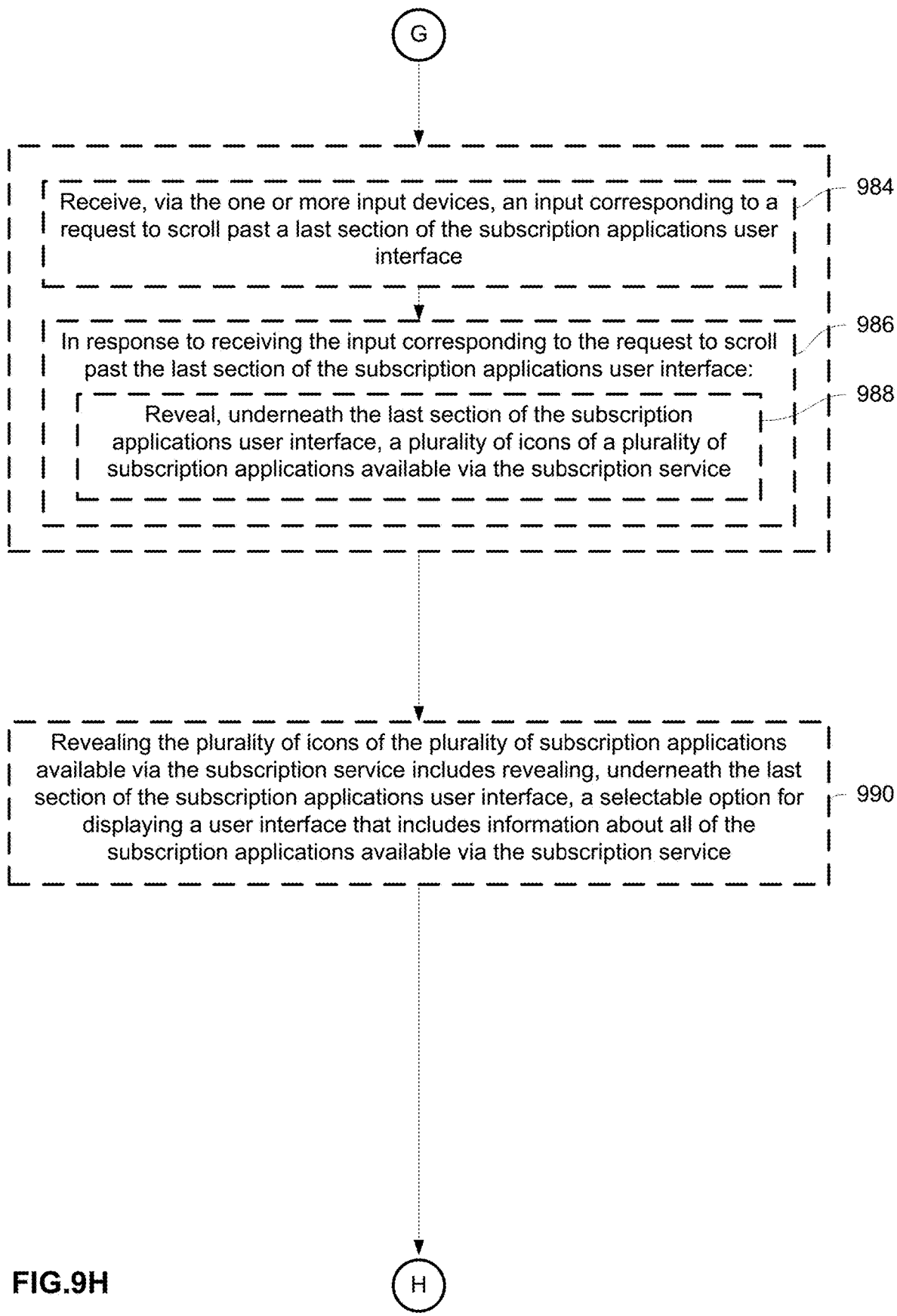
Figure 9I:
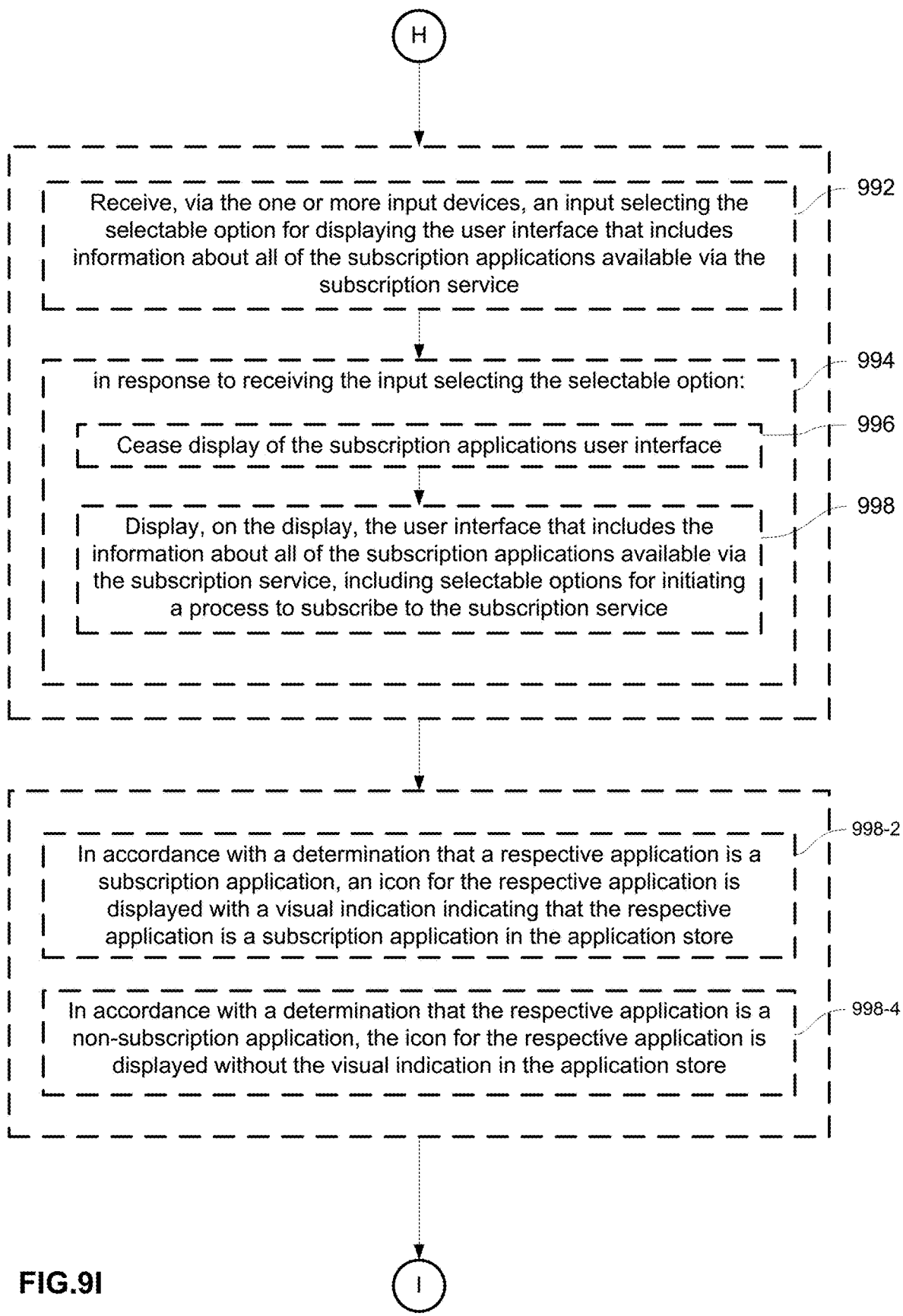
Figure 9J:
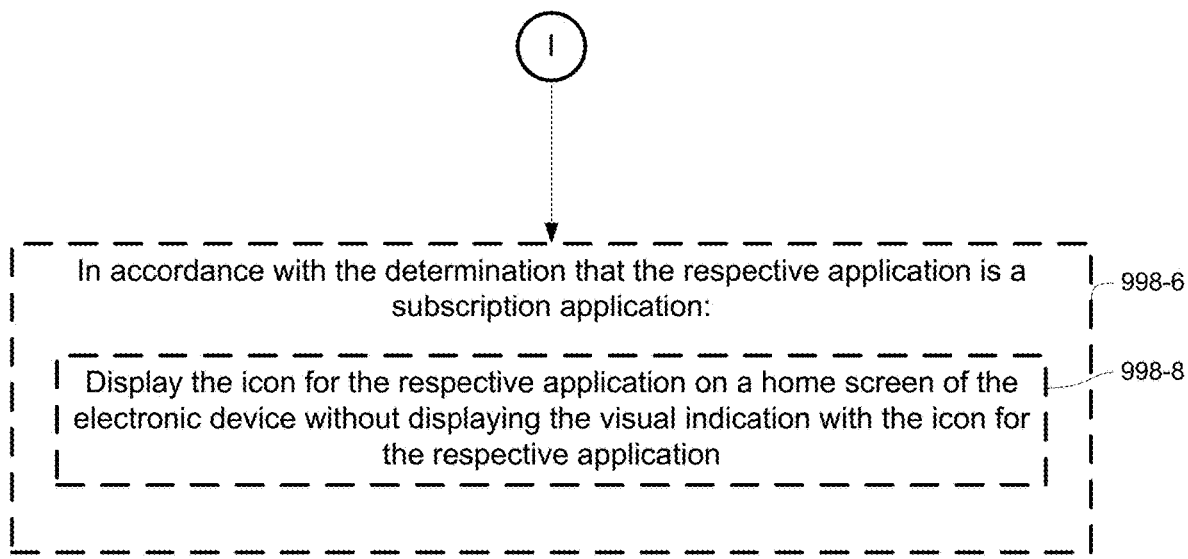

As shown in FIG. 8Z, in response to the user's scrolling, the electronic device 500 reveals a plurality of categories 870a-f of subscription applications and a selectable option 868 to view all categories of subscription applications. Each category 870a-f is selectable to present a plurality of representations of applications in the respective category. The user interface further includes a plurality of images 844 of icons of applications available via the subscription service and a selectable option that, when selected, causes the electronic device 500 to present representations of all of the applications available via the subscription service. As shown in FIG. 8Z, the user selects (e.g., with contact 803) the selectable option 846.

As shown in FIG. 8AA, in response to the user's selection, the electronic device 500 presents a plurality of representations 812d-e of subscription applications. Each representation, such as representation 812d includes an image representing the application, an image 814d of an icon representing the application, the visual indication 818d of the subscription service, an indication 820d of the title of the application, and a selectable option 816d for initiating a process to access the application, such as a selectable option to open the application if it is installed on the electronic device 500. As shown in FIG. 8AA, the user scrolls (e.g., with contact 803) down in the user interface. In response to the user's scrolling, the electronic device 500 scrolls the user interface in accordance with the movement of contact 803.

As shown in FIG. 8BB, in response to the user's scrolling, the electronic device 500 scrolls the user interface to reveal representations 812e and 812f, which include similar items included in representation 816d. Representation 812f includes a selectable option 816f to download the respective application instead of an option to open the respective application because the application has not yet been downloaded on the electronic device. As shown in FIG. 8BB, the user selects (e.g., with contact 803) a "Games" tab in the navigation bar 806. In response to the user's selection, the electronic device 500 presents the "Games" user interface, which is a user interface of non-subscription applications.

FIG. 8CC illustrates a non-subscription application user interface of an application store user interface (e.g., shown in response to selection of the "Games" element in navigation bar 806). The user interface includes the representation 808 of the user account, an image 874 representing a non-subscription application, a plurality of icons 876a-b representing non-subscription applications and selectable options 878a-b that, when selected, cause the electronic device 500 to purchase and download the respective applications with which the selected option is associated. The icons 876a-b representing the non-subscription applications are not presented with or proximate to an indication of the subscription service because the non-subscription applications are accessible by purchasing the applications instead of through the subscription service.

FIGS. 9A-9J are flow diagrams illustrating a method 900 of presenting application store user interfaces that include information about applications in a respective category in accordance with some embodiments. The method 900 is optionally performed at an electronic device such as device 100, device 300, device 500, device 501, device 510, and device 591 as described above with reference to FIGS. 1A-1B, 2-3, 4A-4B and 5A-5J. Some operations in method 900 are, optionally combined and/or order of some operations is, optionally, changed.

As described below, the method 900 provides ways to present application store user interfaces that include information about applications in a respective category. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display 504 and one or more input devices displays (902), on the display, an application store user interface, such as in FIG. 8A, wherein the application store user interface includes a plurality of navigation elements 806, the navigation elements 806 including a subscription application navigation element (e.g., "Arcade") and a non-subscription application navigation element (e.g., "Games"). In some embodiments, each navigation element (e.g., tab, menu item, etc.) is selectable to display, in the application store user interface, a respective application store page including representations of applications of a respective type and product pages of applications of the respective type. For example, a "today" application store user interface page includes representations and product pages for a variety of applications related to categories or topics that are currently popular (e.g., tax preparation applications during tax season) and/or curated for the user based on the user's application download history. As another example, a non-subscription games application store user interface page includes representations and product pages for non-subscription game applications. An "Applications" application store user interface optionally includes product pages and representations of a variety of applications and optionally includes curated lists such as applications that are currently popular, most popular applications of all time, and/or curated lists of applications based on the user's application download history. In some embodiments, a subscription applications application store user interface includes content, such as representations of applications and product pages of applications, related to applications that are accessible via a reoccurring subscription to a subscription service. For example, the subscription applications subscription is a subscription games subscription. Other navigation elements are optionally contemplated, such as a "search" element that, when selected, presents a search user interface from which the user is able to search for an application by title, publisher, category, description, or other criteria, are possible.

In some embodiments, such as in FIG. 6BB, while displaying the application store user interface, the electronic device 500 receives (904), via the one or more input devices, an indication of selection of a respective navigation element of the plurality of navigation elements 806, such as with contact 803. In some embodiments, the electronic device receives an indication that a touch is detected on a touch screen at a location that displays the navigation element, selection via a mouse, trackpad, or remote control device, a keyboard shortcut, a voice input, etc.

In some embodiments, in response to receiving the indication of the selection of the respective navigation element (906): in accordance with a determination that the respective navigation element 806 is the subscription application navigation element (e.g., "Arcade"), the electronic device 500 displays (908), on the display 504, content related to subscription applications, such as in FIG. 8A, access to which can be purchased from the application store. In some embodiments, the content are product pages of subscription applications, representations of subscription applications, marketing content related to subscription applications, articles related to subscription applications. In some embodiments, access to subscription applications is gained by paying a reoccurring subscription fee. The subscription account must optionally be current (e.g., paid for) for that account to access the subscription applications, for example. In some embodiments, a user account associated with the electronic device is associated with a subscription, thereby providing the electronic device with access to the subscription applications.

In some embodiments, in accordance with a determination that the one of the respective navigation element 806 is the non-subscription application navigation element (e.g., "Games"), the electronic device displays (910), on the display 504, content related to non-subscription applications, such as in FIG. 8CC, access to which can be purchased from the application store. In some embodiments, the content are product pages of non-subscription applications, representations of non-subscription applications, marketing content related to non-subscription applications, articles related to non-subscription applications. In some embodiments, access to non-subscription applications is gained by paying a one-time download or access fee. Optionally, some non-subscription applications are free to download and operate. Some non-subscription applications include additional content that is accessed in exchange for an additional fee paid after the user downloads such applications and during use of such applications, which is either a one-time fee or a subscription fee, for example.

The above-described manner of presenting the subscription applications together in a subscription application user interface and the non-subscription applications together in a non-subscription application user interface allows the electronic device to present applications with similar pricing structures together, which simplifies the interaction between the user and the electronic device and enhances the operability of the electronic device and makes the user-device interface more efficient (e.g., by enabling the user to browse applications with a desired pricing structure together), which additionally reduces power usage and improves battery life of the electronic device by enabling the user to use the electronic device more quickly and efficiently, such as by enabling the user to locate applications with a given pricing structure from a designated user interface more quickly and efficiently and with fewer inputs.

In some embodiments, in accordance with the determination that the respective navigation element 806 is the subscription application navigation element (e.g., "Arcade"), the content related to subscription applications is displayed in a subscription applications user interface of the application store, such as in FIG. 8A (912). In some embodiments, access to the subscription applications is provided by the electronic device in accordance with a determination that a user account has a current subscription, which is kept current through reoccurring payments. In some embodiments, such as in FIG. 8A, the subscription applications user interface includes (914): in accordance with a determination that a user of the electronic device 500 is not subscribed to a subscription service that provides access to the subscription applications (916): a selectable option 804 selectable to initiate a process for starting a trial subscription with the subscription service (918) and a first region that includes visual content 802 corresponding to a plurality of subscription applications, access to which is provided in the subscription service (920). In some embodiments, the user was never subscribed to the subscription service or the user has allowed their account subscription to lapse (e.g., due to lack of payment of one of the reoccurring payments). In some embodiments, a region of the user interface that is at the top of the user interface when the user interface is first presented. In some embodiments, when the user scrolls down in the user interface, the first region is no longer displayed. In some embodiments, the visual content includes video content that cycles through shorter video content related to each of the plurality of subscription applications. The visual content optionally includes a still image representing the plurality of subscription applications. In some embodiments, the visual content is presented proximate to the selectable option to initiate the process for starting the free trial. In some embodiments, the selectable option is overlaid on the visual content. In some embodiments, such as in FIG. 8P, in accordance with a determination that the user of the electronic device is subscribed to the subscription service that provides access to the subscription applications (922): the first region that includes visual content 848 from only a single subscription application, access to which is provided in the subscription service, without including the selectable option selectable to initiate the process for starting the trial subscription with the subscription service (924). In some embodiments, the visual content is a still image or video related to a featured subscription application. In some embodiments, the first region includes a selectable option to initiate a process to access the single subscription application. In some embodiments, the visual content itself is selectable to present a product page of the single subscription application.

The above-described manner of presenting the selectable option to subscribe to the subscription service when the user is not subscribed to the subscription service allows the electronic device to provide the user with a way to access the subscription applications, which simplifies the interaction between the user and the electronic device and enhances the operability of the electronic device and makes the user-device interface more efficient (e.g., by reducing the number of inputs needed to navigate between a user interface that includes information about a plurality of subscription applications and a user interface from which the process to subscribe to the subscription service is initiated), which additionally reduces power usage and improves battery life of the electronic device by enabling the user to use the electronic device more quickly and efficiently.

In some embodiments, such as in FIG. 8A, the visual content from the plurality of subscription applications is video content corresponding to the plurality of subscription applications, and the selectable option 804 selectable to initiate the process for starting the trial subscription with the subscription service is overlaid over the video content (926). In some embodiments, the video content occupies substantially all of the display area of the user interface that is not occupied by a system indicator, a user interface top header, and a navigation region of the user interface and the selectable option is presented within the footprint of the video content.

The above-described manner of overlaying the selectable option on the video content allows the electronic device to concurrently present the video content with a larger footprint than would be possible if the selectable option was displayed next to the video content, which simplifies the interaction between the user and the electronic device and enhances the operability of the electronic device and makes the user-device interface more efficient (e.g., by reducing the number of inputs needed to navigate between a user interface with the selectable option and a user interface with the video content), which additionally reduces power usage and improves battery life of the electronic device by enabling the user to use the electronic device more quickly and efficiently.

In some embodiments, such as in FIGS. 8A-8B, the electronic device 500 receives (928), via the one or more input devices, an input corresponding to a request to scroll down the subscription applications user interface, such as movement of contact 803. In some embodiments, the input is a swipe or a tap on a touch screen or other touch-sensitive surface or some other directional input (e.g., via a keyboard, mouse, trackpad, or voice interface). In some embodiments, in response to receiving the input corresponding to the request to scroll down the subscription applications user interface (930): the electronic device 500 scrolls (932) down the subscription applications user interface. In some embodiments, in accordance with the determination that the user of the electronic device 500 is not subscribed to the subscription service that provides access to the subscription applications (934): the electronic device 500 displays (936), in an overlay over the subscription applications user interface, the selectable option 810 selectable to initiate the process for starting the trial subscription with the subscription service while scrolling down the subscription applications user interface. In some embodiments, the overlay is presented at the top of the user interface and persists as the user continues to scroll down in the user interface. For example, the user interface includes an overlay at the top with an indication of the user's account when the user has scrolled less than a threshold distance in the user interface. Once the user has scrolled a threshold distance in the user interface, the electronic device optionally presents the overlay with the selectable option to initiate the process for starting the free trial subscription. In some embodiments, such as in FIGS. 8P-8Q, in accordance with the determination that the user of the electronic device 500 is subscribed to the subscription service that provides access to the subscription applications (938): the electronic device 500 forgoes (940) displaying the selectable option in the overlay that is selectable to initiate the process for starting the trial subscription with the subscription service. In some embodiments, the overlay is not presented or the overlay is presented without the selectable option. For example, the overlay includes text that indicates that the user interface is a user interface related to subscription applications.

The above-described manner of presenting the selectable option for starting the free trial of the subscription in an overlay over the subscription applications user interface allows the electronic device to continue to present the selectable option regardless of the position in the user interface that the user has scrolled to, which simplifies the interaction between the user and the electronic device and enhances the operability of the electronic device and makes the user-device interface more efficient (e.g., by reducing the number of inputs necessary to present the selectable option), which additionally reduces power usage and improves battery life of the electronic device by enabling the user to use the electronic device more quickly and efficiently, such as by reducing the number of inputs needed to subscribe to the subscription service.

In some embodiments, such as in FIG. 8A, in accordance with the determination that the user of the electronic device is not subscribed to the subscription service that provides access to the subscription applications, the subscription applications user interface includes composite video content (e.g., "Arcade video content") from a plurality of subscription applications accessible via the subscription service (942). In some embodiments, the video content includes a plurality of short videos each related to one of a plurality of subscription applications. In some embodiments, the video content is not presented in the subscription application user interface if the user is subscribed to the subscription service.

The above-described manner of presenting video content related to a plurality of subscription applications in accordance with a determination that the user is not subscribed to the subscription service allows the electronic device to provide information about a plurality of applications available through the subscription, which simplifies the interaction between the user and the electronic device and enhances the operability of the electronic device and makes the user-device interface more efficient (e.g., by reducing the number of inputs needed to browse a plurality of subscription applications), which additionally reduces power usage and improves battery life of the electronic device by enabling the user to use the electronic device more quickly and efficiently.

In some embodiments, such as in FIGS. 8B-8C, in accordance with the determination that the user of the electronic device 500 is not subscribed to the subscription service that provides access to the subscription applications, the subscription applications user interface includes a section that includes horizontally scrollable visual content 812a-812b corresponding to one or more subscription applications that are displayed concurrently with respective selectable options 816a selectable to initiate a process for starting a trial subscription with the subscription service (944). In some embodiments, each representation of a subscription application includes an image of an icon representing the subscription application, the name of the subscription application, a short description of the subscription application, and a selectable option that is selectable to initiate the process for starting the free trail of the subscription service.

In some embodiments, the horizontally scrollable visual content corresponding to the one or more subscription applications is not presented if the user is subscribed to the subscription service. The above-described manner of presenting the horizontally scrollable content corresponding to the plurality of subscription applications allows the electronic device to provide the user with information about a plurality of subscription applications in a region of the user interface that takes less scrolling to traverse, which simplifies the interaction between the user and the electronic device and enhances the operability of the electronic device and makes the user-device interface more efficient (e.g., by reducing the number of inputs required to view other sections of the subscription application user interface) which additionally reduces power usage and improves battery life of the electronic device by enabling the user to use the electronic device more quickly and efficiently.

In some embodiments, such as in FIG. 8B, in accordance with the determination that the user of the electronic device 500 is not subscribed to the subscription service that provides access to the subscription applications, the subscription applications user interface includes an element 822 that includes a plurality of icons for a plurality of subscription applications (946). In some embodiments, each icon is an icon that appears on the home screen and is selectable to access the application if the application is downloaded. In some embodiments, the element is not presented if the user is subscribed to the subscription service.

The above-described manner of presenting an element that includes a plurality of icons for a plurality of subscription applications allows the electronic device to communicate to the user which applications are included in the subscription, which simplifies the interaction between the user and the electronic device and enhances the operability of the electronic device and makes the user-device interface more efficient (e.g., by reducing the number of inputs needed to browse the plurality of subscription applications), which additionally reduces power usage and improves battery life of the electronic device by enabling the user to use the electronic device more quickly and efficiently.

In some embodiments, in accordance with the determination that the user of the electronic device is not subscribed to the subscription service that provides access to the subscription applications, the subscription applications user interface includes a visual representation of a featured subscription application that is selectable to display, on the display, a user interface specific to the featured subscription application (948). The user interface specific to the featured subscription application optionally includes one or more selectable options that are selectable to initiate the process to subscribe to the subscription service. In some embodiments, the subscription application user interface includes the visual representation of a featured application when the user is subscribed to the subscription service, but the user interface specific to the feature application includes one or more selectable options to access the application but does not include the selectable options to subscribe to the subscription service.

The above-described manner of presenting a visual representation of a featured subscription application allows the electronic device to provide additional information about the featured application, which simplifies the interaction between the user and the electronic device and enhances the operability of the electronic device and makes the user-device interface more efficient (e.g., by enabling the user to access information about the subscription application without first subscribing to the subscription service), which additionally reduces power usage and improves battery life of the electronic device by enabling the user to use the electronic device more quickly and efficiently, such as by reducing the need for the user to enter inputs to subscribe to the subscription service before viewing the user interface specific to the featured subscription application.

In some embodiments, such as in FIG. 8F, in accordance with the determination that the user of the electronic device 500 is not subscribed to the subscription service that provides access to the subscription applications, the subscription applications user interface includes a section that includes a horizontally scrollable plurality of icons 634a-634d of subscription applications (950). In some embodiments, the icons are selectable to view a user interface specific to the respective subscription application represented by the selected icon. In some embodiments, the icons are not selectable and are merely for the purpose of illustrating which applications are included in the subscription service.

The above-described manner of presenting the horizontally scrollable plurality of icons of subscription applications allows the electronic device to present to the user to plurality of icons of subscription applications in a format that requires fewer vertical scrolling inputs to traverse compared to a static array of icons, which simplifies the interaction between the user and the electronic device and enhances the operability of the electronic device and makes the user-device interface more efficient (e.g., by reducing the number of inputs needed to view other sections of the subscription application user interface), which additionally reduces power usage and improves battery life of the electronic device by enabling the user to use the electronic device more quickly and efficiently.

In some embodiments, such as in FIG. 8F, in accordance with the determination that the user of the electronic device 500 is not subscribed to the subscription service that provides access to the subscription applications, the subscription applications user interface includes a section 832 that includes information about accessing the subscription applications from a plurality of electronic devices of different types (952). In some embodiments, the section includes images of the electronic devices (e.g., smartphones, media players, tablets, personal computers, set-top box units, etc.) that are able to access the subscription service. In some embodiments, the information includes text describing which electronic devices are able to access the subscription service. The information about the plurality of electronic devices of different types is optionally not presented in the subscription application user interface if the user is subscribed to the subscription service.

The above-described manner of presenting information about the plurality of electronic devices of different types allows the electronic device to inform the user which electronic devices are able to access the subscription service within a user interface that includes a selectable option to subscribe to the subscription service, which simplifies the interaction between the user and the electronic device and enhances the operability of the electronic device and makes the user-device interface more efficient (e.g., by reducing the number of inputs needed to navigate between a user interface including the selectable option and a user interface including the information about the plurality of electronic devices of different types), which additionally reduces power usage and improves battery life of the electronic device by enabling the user to use the electronic device more quickly and efficiently.

In some embodiments, such as in FIG. 8F, in accordance with the determination that the user of the electronic device 500 is not subscribed to the subscription service that provides access to the subscription applications, the subscription applications user interface includes a section that includes a horizontally scrollable plurality of icons 634a-634d for recommended subscription applications (954). The recommended subscription applications are optionally presented based on an application usage history of the user. In some embodiments, the section is included in the subscription application user interface when the user is subscribed to the subscription service. In some embodiments, the section is not included when the user is subscribed to the subscription service.

The above-described manner of presenting the horizontally scrollable plurality of icons for recommended subscription applications allows the electronic device to enable the user to view the recommended applications with fewer user inputs when browsing applications, which simplifies the interaction between the user and the electronic device and enhances the operability of the electronic device and makes the user-device interface more efficient (e.g., by reducing the number of inputs needed to locate applications that the user is most likely to be interested in) which additionally reduces power usage and improves battery life of the electronic device by enabling the user to use the electronic device more quickly and efficiently.

In some embodiments, such as in FIG. 8I, in accordance with the determination that the user of the electronic device 500 is not subscribed to the subscription service that provides access to the subscription applications, the subscription applications user interface includes a section that includes a horizontally scrollable plurality of representations 842a-842b of editorial collections of subscription applications (956). In some embodiments, the section includes collections of a plurality of subscription applications that are curated and/or have a shared theme (e.g., type of application, publisher, etc.). In some embodiments, the horizontally scrollable plurality of representations of editorial collections is presented when the user is subscribed to the subscription service. In some embodiments, the horizontally scrollable plurality of representations of editorial collections is not presented when the user is subscribed to the subscription service.

The above-described manner of presenting the horizontally scrollable plurality of representations of editorial collections allows the electronic device to enable the user to scroll horizontally to browse the editorial collection and scroll vertically to view a different section of the user interface which simplifies the interaction between the user and the electronic device and enhances the operability of the electronic device and makes the user-device interface more efficient (e.g., by reducing the number of inputs needed to traverse the horizontally scrollable plurality of representations if desired), which additionally reduces power usage and improves battery life of the electronic device by enabling the user to use the electronic device more quickly and efficiently.

In some embodiments, such as in FIG. 8Z, in accordance with the determination that the user of the electronic device 500 is subscribed to the subscription service that provides access to the subscription applications, the subscription applications user interface includes a section that includes a plurality of selectable options 870a-870f that are selectable to display respective categories of subscription applications (958). In some embodiments, the section includes a plurality of selectable options for each of a plurality of categories, such as Action and Adventure, AR Games, Racing and Sports, Role Playing, Simulation, and Strategy. In response to detecting selection of one of the categories, the electronic device optionally presents a plurality of representations of subscription application belonging to the selected category. In some embodiments, the categories are presented in the subscription game user interface when the user is not subscribed to the subscription service. In some embodiments, the categories are not presented in the subscription game user interface when the user is not subscribed to the subscription service.

The above-described manner of presenting a plurality of selectable options that are selectable to display respective categories of subscription applications allows the electronic device to present the user with a subset of applications the user is interested in viewing, which simplifies the interaction between the user and the electronic device and enhances the operability of the electronic device and makes the user-device interface more efficient (e.g., by reducing the number of inputs needed to browse applications of a given category), which additionally reduces power usage and improves battery life of the electronic device by enabling the user to use the electronic device more quickly and efficiently.

In some embodiments, such as in FIGS. 8V-8W, in accordance with the determination that the user of the electronic device 500 is subscribed to the subscription service that provides access to the subscription applications, the subscription applications user interface includes (960): a section that includes one or more representations 862a and 862b of one or more stories related to subscription applications, the one or more representations of the one or more stories selectable to display the respective stories on the display (962). In some embodiments, the one or more representations 862a or 826b of the one or more stories are displayed overlaid over a background 864a, and a visual characteristic of the background updates based on which representation of the one or more representations of the one or more stories has a current focus (964). In some embodiments, the section includes text and/or an image representing the stories. The stories optionally include text and/or images related to subscription applications. In some embodiments, rather than including content to encourage the user to subscribe to the subscription service, the stories include content to communicate to the user which applications are available to the user through the subscription service. In some embodiments, the background has a color that is selected to complement, contrast, or match the color of the representation of the story that has the current focus. In some embodiments, the electronic device presents the representation of a story that has the current focus in full and presents the other representations of stories in part. In some embodiments, representations of stories also appear in other user interfaces of the application store application, such as a user interface for subscription and non-subscription applications. The stories shown in the other user interfaces are optionally about subscription and non-subscription applications, whereas the stories shown in the subscription application user interface are optionally related to subscription applications.

In some embodiments, the representations of stories are not presented in the subscription application user interface when the user is not subscribed to the subscription service. The above-described manner of presenting a section including one or more representations of stories related to subscription applications allows the electronic device to present content to the user that is related to subscription applications while the user is viewing the subscription applications user interface, which simplifies the interaction between the user and the electronic device and enhances the operability of the electronic device and makes the user-device interface more efficient (e.g., by reducing the number of inputs needed to navigate between a user interface for viewing stories related to subscription applications and a user interface with other information about the subscription applications), which additionally reduces power usage and improves battery life of the electronic device by enabling the user to use the electronic device more quickly and efficiently.

In some embodiments, such as in FIG. 8V, in accordance with the determination that the user of the electronic device 500 is subscribed to the subscription service that provides access to the subscription applications (966): in accordance with a determination that the user of the electronic device uses a first set of subscription applications, the one or more stories include a first set of stories 862a-862b but not a second set of stories (968). In some embodiments, the first set of stories includes stories related to the first set of subscription applications or related to subscription applications that are similar to the first set of subscription applications. In some embodiments, in accordance with a determination that the user of the electronic device 500 uses a second set of subscription applications, the one or more stories include the second set of stories but not the first set of stories 862a-862b (970). In some embodiments, the second set of stories includes stories related to the second set of subscription applications or related to subscription applications that are similar to the second set of subscription applications. In some embodiments, the representations of stories are not presented when the user is not subscribed to the subscription service because the user is not able to access subscription applications if they are not subscribed to the subscription service.

The above-described manner of presenting representations of stories based on the subscription applications that are used by the electronic device allows the electronic device to make it easier for the user to access stories the user is likely to be interested in, which simplifies the interaction between the user and the electronic device and enhances the operability of the electronic device and makes the user-device interface more efficient (e.g., by reducing the number of inputs needed to locate stories the user is interested in), which additionally reduces power usage and improves battery life of the electronic device by enabling the user to use the electronic device more quickly and efficiently.

In some embodiments, such as in FIGS. 8V-8W, in accordance with the determination that the user of the electronic device 500 is subscribed to the subscription service that provides access to the subscription applications (972): in accordance with a determination that the user of the electronic device 500 satisfies a first set of progression criteria through one or more subscription applications, the one or more stories include a first set of stories but not a second set of stories (974). In some embodiments, the first set of progression criteria includes criteria that are satisfied when the user has played one or more specific levels of a game, interacted with the one or more subscription applications for a predetermined duration of time, viewed one or more specific user interfaces of the subscription applications, utilized one or more specific features of the subscription applications, etc. In some embodiments, the first set of stories are related to the first set of progression criteria that are met. In some embodiments, in accordance with a determination that the user of the electronic device satisfies a second set of progression criteria, different than the first set of progression criteria, through the one or more subscription applications, the one or more stories include the second set of stories but not the first set of stories (976). For example, the user has reached a higher level in Game A than in Game B. Thus, the story 862*a* related to Game A is related to a higher level of progression as shown in FIG. 8V and the story 862*b* related to Game B is related to a lower level of progression, as shown in FIG. 8W. In some embodiments, the second set of stories are related to the second set of progression criteria that are met. In some embodiments, the representations of stories are not presented when the user is not subscribed to the subscription service because the user is not able to access subscription applications if they are not subscribed to the subscription service.

The above-described manner of presenting representations of stories based on which progression criteria are met allows the electronic device to make it easier for the user to access stories the user is likely to be interested in, which simplifies the interaction between the user and the electronic device and enhances the operability of the electronic device and makes the user-device interface more efficient (e.g., by reducing the number of inputs needed to access stories that are interesting to the user), which additionally reduces power usage and improves battery life of the electronic device by enabling the user to use the electronic device more quickly and efficiently.

In some embodiments, such as in FIG. 8V, the background 864*a* comprises a modified version of the representation 862*a* of the one or more representations of the one or more stories that has the current focus (978). In some embodiments, the representation that has the current focus comprises an image and the background includes a blurred and/or scaled and/or rotated version of the image.

The above-described manner of presenting the representation of the story on a background that comprises a modified version of the representation allows the electronic device to indicate to the use which representation has the current focus, which simplifies the interaction between the user and the electronic device and enhances the operability of the electronic device and makes the user-device interface more efficient (e.g., by showing which representation has the current focus without changing the input focus), which additionally reduces power usage and improves battery life of the electronic device by enabling the user to use the electronic device more quickly and efficiently.

In some embodiments, such as in FIG. 6V, the one or more representations 862*a* of the one or more stories are displayed with respective text that is also overlaid over the background 864*a* (980). The text optionally describes the one or more stories. For example, if the stories are related to applications that were recently added to the subscription service, the text is along the lines of "Newly Added," "Just Added," "New this Week," etc. In some embodiments, a visual characteristic of the text updates based on which representation of the one or more representations of the one or more stories has the current focus (982). In some embodiments, the color of the text changes depending on the color of the background that the story representations are overlaid on. In some embodiments, the color of the background is based on the one or more colors included in the representation that has the current focus.

The above-described manner of modifying a visual characteristic of the text based on the representation that has the current focus allows the electronic device to render the text in a way that is legible, which simplifies the interaction between the user and the electronic device and enhances the operability of the electronic device and makes the user-device interface more efficient (e.g., by enabling the user to read the text without changing which representation has the current focus), which additionally reduces power usage and improves battery life of the electronic device by enabling the user to use the electronic device more quickly and efficiently, such as by reducing the number of inputs needed to view the text.

In some embodiments, the electronic device 500 receives (984), via the one or more input devices, an input corresponding to a request to scroll past a last section of the subscription applications user interface, such as movement of contact 803 in FIG. 8K. In some embodiments, the user interface reaches the bottom and the user requests to continue scrolling down. In some embodiments, the request to scroll comprises selection and dragging of the user interface (e.g., with a touch screen or other touch-sensitive device, with a mouse or trackpad, etc.). In some embodiments, in response to receiving the input corresponding to the request to scroll past the last section of the subscription applications user interface (986): the electronic device 500 reveals (988), underneath the last section of the subscription applications user interface, a plurality of icons 844 of a plurality of subscription applications available via the subscription service, as shown in FIG. 8L. In some embodiments, the user interface is overlaid on a plurality of representations of subscription applications. In some embodiments, the user is able to scroll the user interface past the last section of the user interface to reveal additional icons. In response to detecting that the user released the scrolling input (e.g., liftoff of a touch on a touch sensitive surface or release of a mouse button) the user interface snaps back into the last position of the user interface. In some embodiments, the plurality of icons are animated to move in the background of the user interface. In some embodiments, the user interface does not scroll past the last point in the user interface and a fixed number of icons are presented at the end of the user interface. The plurality of icons are optionally included underneath the last section of the subscription application user interface regardless of whether the user is subscribed or is not subscribed to the subscription service.

The above-described manner of revealing the plurality of icons allows the electronic device to present additional icons, which simplifies the interaction between the user and the electronic device and enhances the operability of the electronic device and makes the user-device interface more efficient (e.g., by enabling the user to browse the icons without navigating to different parts of the user interface that include the icons), which additionally reduces power usage and improves battery life of the electronic device by enabling the user to use the electronic device more quickly and efficiently.

In some embodiments, such as in FIG. 8L, revealing the plurality of icons 844 of the plurality of subscription applications available via the subscription service includes revealing, underneath the last section of the subscription applications user interface, a selectable option 846 for displaying a user interface that includes information about all of the subscription applications available via the subscription service (990). In some embodiments, the selectable option is presented below the plurality of icons and is presented even if the user is not scrolling past the end location of the subscription application user interface. In response to detecting selection of the option, the electronic device optionally presents representations of all of the subscription applications.

The above-described manner of presenting the option for displaying information about all of the subscription applications allows the electronic device to present information that includes information about one or more of the icons visible to the user at the end of the user interface, which simplifies the interaction between the user and the electronic device and enhances the operability of the electronic device and makes the user-device interface more efficient (e.g., by reducing the inputs needed to locate information about all of the applications), which additionally reduces power usage and improves battery life of the electronic device by enabling the user to use the electronic device more quickly and efficiently.

In some embodiments, such as in FIG. 8Z, the electronic device 500 receives (992), via the one or more input devices, an input selecting (e.g., with contact 803) the selectable option 846 for displaying the user interface that includes information about all of the subscription applications available via the subscription service, such as the user interface illustrated in FIG. 8AA. In some embodiments, in response to receiving the input selecting the selectable option 846 (994): the electronic device ceases (996) display of the subscription applications user interface and displays (998), on the display, the user interface that includes the information about all of the subscription applications available via the subscription service, including selectable options for initiating a process to subscribe to the subscription service. For example, the electronic device 500 presents the user interface illustrated in FIG. 8AA that includes selectable options for subscribing to the subscription service instead of selectable options 816*d* for accessing a respective application. In some embodiments, the information about all of the subscription applications includes, for each application, an image of the application, the application icon, the title of the application, a short description of the application, and a selectable option for subscribing to the subscription service if the user is not yet subscribed to the subscription service. If the user is subscribed to the subscription service, the user interface optionally includes a selectable option for each application that, when selected, causes the electronic device to present a product page user interface that is specific to the respective application.

The above-described manner of presenting selectable options to subscribe to the subscription service while presenting the representations of all of the subscription applications allows the electronic device to enable the user to access the subscription applications while browsing the available subscription applications, which simplifies the interaction between the user and the electronic device and enhances the operability of the electronic device and makes the user-device interface more efficient (e.g., by reducing the number of inputs needed to navigate between the user interface including information about all of the subscription applications and a user interface with an option to subscribe to the subscription service), which additionally reduces power usage and improves battery life of the electronic device by enabling the user to use the electronic device more quickly and efficiently.

In some embodiments, in accordance with a determination that a respective application is a subscription application, an icon for the respective application is displayed with a visual indication indicating that the respective application is a subscription application in the application store (998-2). In some embodiments, a subscription icon or text/visual indication is presented proximate to the icon representing the subscription application when the icon is presented in the application store application. In some embodiments, in accordance with a determination that the respective application is a non-subscription application, the icon for the respective application is displayed without the visual indication in the application store (998-4). For example, the icons of subscription applications are visually associated with a visual indication (e.g., logo, text, etc.) of the subscription service and non-subscription application icons are presented without the subscription service icon.

The above-described manner of presenting an indication of the subscription service with the icons of subscription applications allows the electronic device to communicate to the user which applications are accessible via the subscription without the user selecting the icon to view more information about the applications, which simplifies the interaction between the user and the electronic device and enhances the operability of the electronic device and makes the user-device interface more efficient (e.g., by reducing the number of inputs needed to navigate between a user interface of the application store that includes the icon and a user interface that indicates whether or not the application is included in the subscription service), which additionally reduces power usage and improves battery life of the electronic device by enabling the user to use the electronic device more quickly and efficiently.

In some embodiments, such as in FIG. 8O, in accordance with the determination that the respective application is a subscription application (998-6): the electronic device 500 displays (998-8) the icon 454 for the respective application on a home screen of the electronic device without displaying the visual indication with the icon for the respective application (e.g., once the user downloads the subscription application, an icon that is selectable to access the subscription application is presented in a home screen user interface of the electronic device that includes icons that are selectable to open other applications. In some embodiments, the subscription application icons on the home screen are presented without the visual indication that the application is a subscription application. In some embodiments, the electronic device presents the subscription application icons on the home screen with the visual indication that the applications are subscription applications.

The above-described manner of forgoing presenting the subscription service icon on the home screen allows the electronic device to conserve display area on the home screen, which simplifies the interaction between the user and the electronic device and enhances the operability of the electronic device and makes the user-device interface more efficient (e.g., by enabling the home screen to present additional icons at once, which reduces the number of inputs needed to browse the icons on the home screen), which additionally reduces power usage and improves battery life of the electronic device by enabling the user to use the electronic device more quickly and efficiently.

It should be understood that the particular order in which the operations in FIGS. 9A-9J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300, 1500, 1700, and 1900) are also applicable in an analogous manner to method 900 described above with respect to FIGS. 9A-9J. For example, the operation of the electronic device to present a user interface related to subscription applications described above with reference to method 900 optionally has one or more of the characteristics of the presentation of user interfaces of an application store that are specific to respective applications, user interfaces of an application store for accessing a respective category of applications, visual indications of the number of available updates, user interfaces of an electronic device for launching and removing a respective application, user interfaces of a generic application store and a dedicated application store for a respective category of applications, notifications of the completion of a download, etc., described herein with reference to other methods described herein (e.g., methods 700, 1100, 1300, 1500, 1700, and 1900). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5J) or application specific chips. Further, the operations described above with reference to FIGS. 9A-9J are, optionally, implemented by components depicted in FIGS. 1A-1B. For example, displaying operations 902, 904, 908, 910, 912, 936, 970, 944, 948, 958, 962, 964, 980, 990, 992, 996, 998, 998-2, 998-4, and 998-8, receiving operations 905, 906, 928, 930, 984, 986, 992, and 994, and initiating operations 918, 924, 926, 936, 940, 944, and 998, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Accessing Subscription Applications

Users interact with electronic devices in many different manners. In some embodiments, applications are installed onto the electronic devices. In some embodiments, the applications serve any number of purposes from accessing content to receiving information to playing games. In some embodiments, the applications installed onto the electronic devices can be included with the electronic device, purchased and installed onto the electronic device by the user, or can be "rented" or "leased" by the user. In some embodiments, these rented or leased applications can be referred to as subscription applications such that access to the application is granted via a subscription model. The embodiments described below provide ways in which an electronic device notifies a user of the completion of a download of an application, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10A:
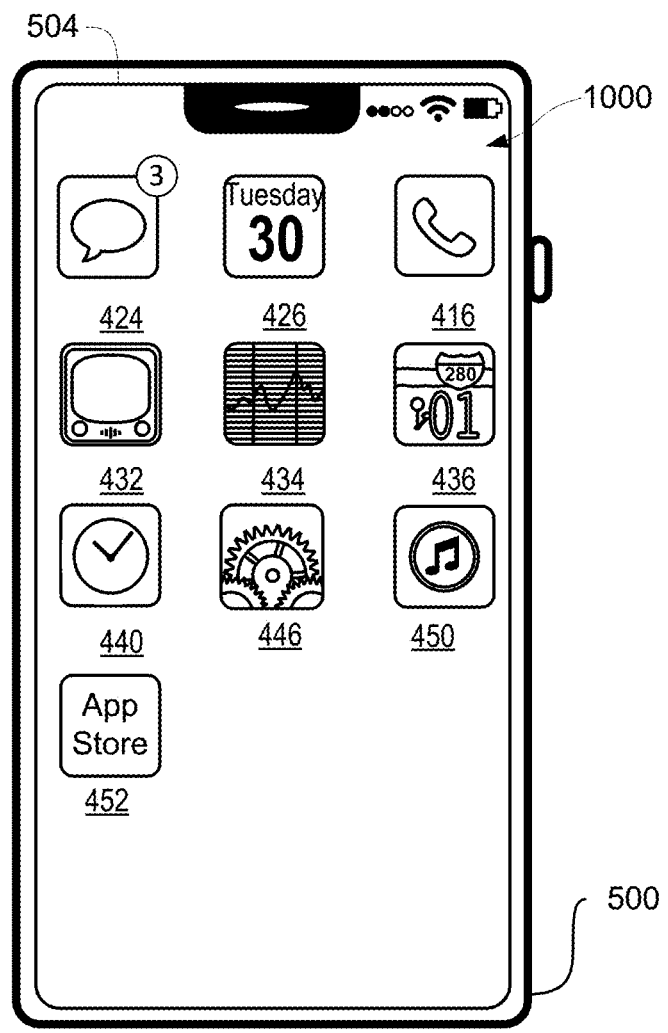
FIGS. 10A-10CC illustrate exemplary ways in which an electronic device accesses subscription and non-subscription applications in accordance with some embodiments.
Figure 10B:
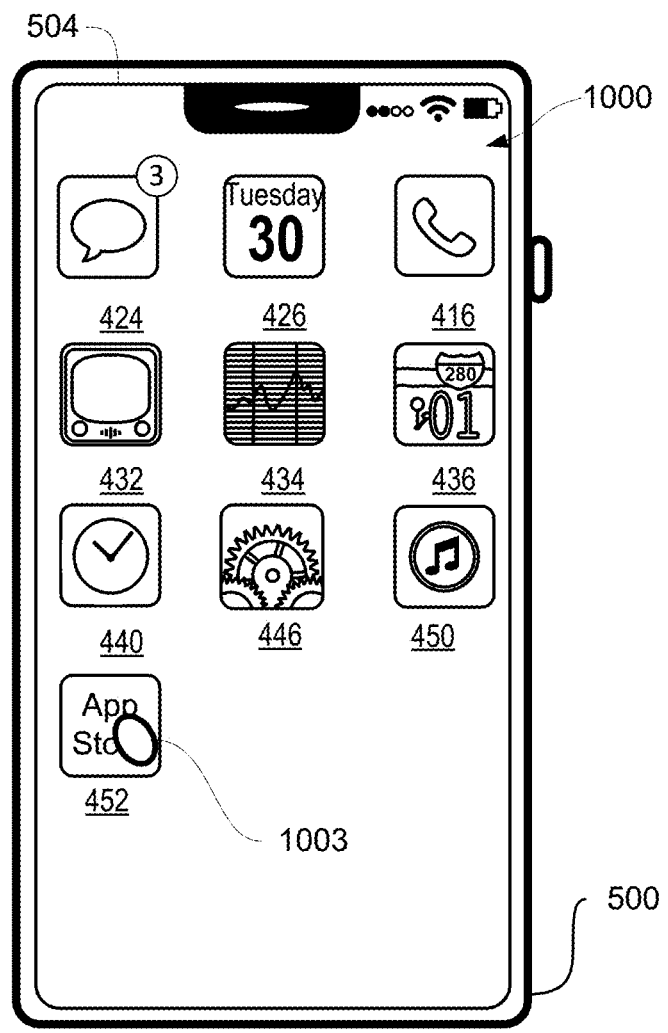
Figure 10C:
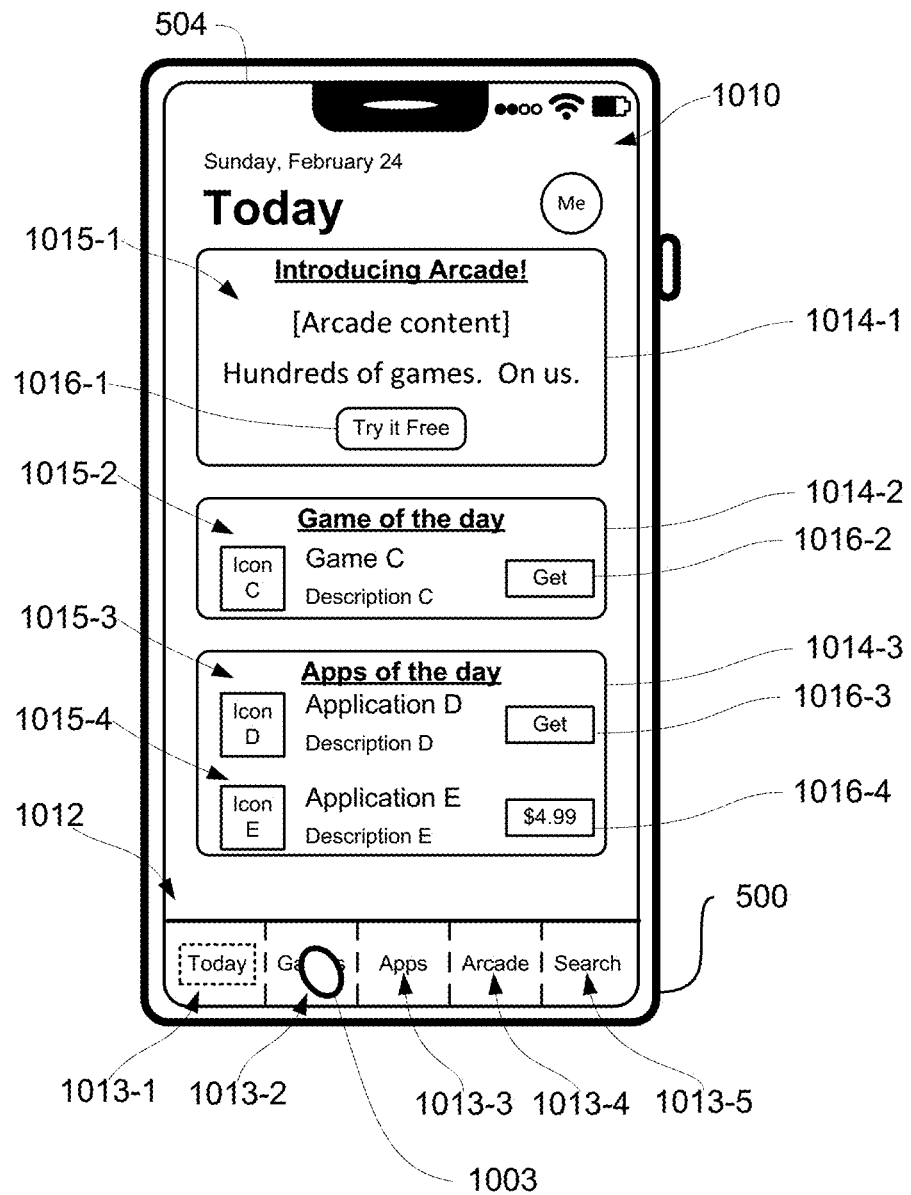

FIGS. 10A-10CC illustrate exemplary ways in which an electronic device accesses subscription and non-subscription applications. The embodiments in these figures are used to illustrate the processes described below with reference to FIGS. 11A-11G.

FIGS. 10A-10CC illustrate operation of electronic device 500 for accessing subscription and non-subscription applications. FIG. 10A illustrates an exemplary device 500 that includes touch screen 504. As shown in FIG. 10A, the electronic device 500 presents a home screen user interface 1000. In some embodiments, home screen user interface 1000 is an application launching user interface. For example, home screen user interface 1000 includes multiple selectable options that when selected causes the electronic device 500 to launch or otherwise present applications. In some embodiments, home screen user interface 1000 includes multiple pages or tabs and includes all launchable applications that have been installed onto electronic device 500. In some embodiments, home screen user interface 1000 includes a subset of the applications that are installed and launchable on electronic device 500. In some embodiments, home screen user interface 1000 includes an application store icon 452 for launching an application store application. In some embodiments, the application store application is an application in which the user can browse for and purchase applications (e.g., include games, services, or other content) to download and install onto electronic device 500. In some embodiments, the application store includes both subscription and non-subscription applications for the user to purchase access, download, and/or install.

In FIG. 10B, a user input 1003 is detected on touch screen 504 selecting application store icon 452. In some embodiments, user input 1003 is a tap input on the touch screen 504. In some embodiments, in response to user input 1003 selecting application store icon 452, electronic device 500 launches or otherwise displays the application store application, as shown in FIG. 10C. In some embodiments, the application store application displays user interface 1010 of the application store application. In some embodiments, user interface 1010 is a landing page (e.g., the initial page, tab, or user interface displayed when the application store application is first launched) in which certain featured items or content is displayed or otherwise suggested to the user. In some embodiments, if the application store application is already running in the background (for example, in an inactive state), then the application store application displays the user interface that was previously displayed when the application store application entered in the inactive state.

In some embodiments, user interface 1010 displays current items which are featured or recommended to the user. In some embodiments, user interface 1010 is updated daily with new items. In some embodiments, user interface 1010 includes the current date of the electronic device and a profile icon. In some embodiments, selecting the profile icon displays a user interface in which the user can view or change user settings, as is described in more detail with respect to FIGS. 12A-12D. In some embodiments, user interface 1010 includes multiple card elements promoting content that are accessible from the application store application (e.g., cards 1014-1 to 1014-3 promoting content 1015-1 to 1015-4, respectively). In some embodiments, arcade card 1014-1 promotes the arcade subscription service in which users can gain access to multiple arcade games via a single periodic subscription to the arcade subscription service. In some embodiments, the arcade applications are subscription-based applications. For example, a subscription to the arcade subscription service is required to access the arcade applications. In some embodiments, the arcade applications are interactive games. In some embodiments, arcade card 1014-1 displays a photo or video representing the arcade subscription service. In some embodiments, arcade card 1014-1 includes a text label describing the arcade applications and/or the arcade subscription service. In some embodiments, arcade card 1014-1 includes selectable option 1016-1 (e.g., a button or affordance labeled "Try it Free") that is selectable to initiate a process for subscribing to the arcade subscription service. In some embodiments, a user input selecting arcade card 1014-1 itself (e.g., as opposed to the selectable option), causes display of a user interface with more information about the arcade subscription service (e.g., displays a user interface with more information about the content promoted in the card).

In some embodiments, user interface 1010 includes game card 1014-2 (e.g., a "game of the day" card) promoting one or more games that have been selected to be promoted for the day and apps card 1014-3 (e.g., an "apps of the day" card) promoting one or more applications that have been selected to be promoted for the day. In some embodiments, game card 1014-2 promotes game 1015-2. In some embodiments, game card 1014-2 includes an icon representative of game 1015-2 (e.g., the game's logo), the name of game 1015-2 and/or a description of game 1015-2. In some embodiments, game card 1014-2 includes selectable option 1016-2 (e.g., a button or affordance labeled "Get"), selection of which initiates a process for acquiring, downloading, and/or installing game 1015-2 onto electronic device 500. In some embodiments, selection of game card 1014-2 causes display of a user interface specific to game 1015-2. In some embodiments, apps card 1014-3 promotes application 1015-3 and application 1015-4. Similarly to games card 1014-2, each application in apps card 1015-3 includes an icon representative of the application, the name of the application, and/or a description of the application. As shown in FIG. 10C, some applications and games are free, in which case the selectable option optionally is labeled "Get" (e.g., selectable option 1016-3) while some applications are purchasable for a fee, in which case the selectable option optionally lists the price of the application (e.g., $4.99, $2.99, etc.) (e.g., selectable option 1016-4). For example, application 1015-4 (e.g., Application E) can be acquired with a payment of $4.99, so selectable option 1016-4 displays $4.99, the price to acquire or otherwise access application 1015-4. In some embodiments, selection of selectable option 1016-4 initiates a process for purchasing application 1015-4.

In some embodiments, the application store application includes navigation bar 1012. In some embodiments, navigation bar 1012 includes multiple selectable options, selection of which causes display of a different page or user interface in the application store application. For example, navigation bar 1012 includes selectable option 1013-1 (e.g., for the "Today" page), which displays the initial splash page of the application store application, selectable option 1013-2 (e.g., for the "Games" page), which displays a user interface dedicated to games, selectable option 1013-3 (e.g., for the "Apps" page), which displays a user interface dedicated to applications, selectable option 1013-4 (e.g., for the "Arcade" page), which displays a user interface dedicated to arcade games (e.g., subscription applications and/or games), and/or selectable option 1013-5 (e.g., for the "Search" page), which displays a user interface for searching for content within the application store application. It is understood that the selectable options can be in any order and is not limited to those displayed in FIG. 10C. In FIG. 10C, user input 1003 selects selectable option 1013-2 (e.g., for the "Games" page). In response, electronic device 500 displays user interface 1020 of the application store application dedicated to browsing and purchasing "games", as shown in FIG. 10D.

In some embodiments, similarly to user interface 1010, user interface 1020 include multiple cards for items that can be acquired, purchased, or otherwise accessed from the application store application (e.g., cards 1024-1 to 1024-4 for items 1025-1 to 1025-4). In some embodiments, the cards can be different sizes. For example, card 1024-1 is a larger size with a larger icon representing game 1025-1, while cards 1024-2 to 1024-4 are smaller sized cards with a smaller icon representing games 1025-2 to 1025-4. In some embodiments, card 1024-1 includes a title, a description, a large icon of game 1025-1 and selectable option 1026-1 for acquiring or otherwise accessing game 1025-1. In some embodiments, the icon can be a still image, an animation, a movie, a trailer, or any other suitable media. In some embodiments, cards 1024-2 to 1024-4 are smaller cards and similarly include the game title, an icon, and a description, and selectable options 1026-2 to 1026-4 for acquiring or accessing the respective game (e.g., games 1025-2 to 1025-4). In some embodiments, as described above, some of the games are free and can be acquired or accessed without payment (e.g., game 1025-2), in which case the selectable option optionally is labeled "Get". In some embodiments, some of the games are paid games and requirement payment to acquire or otherwise access (e.g., games 1025-3 and 1025-4), in which case the selectable option is labeled with the price of the game. For example, game 1025-3 costs $4.99, so selectable option 1026-3 is labeled "$4.99" and game 1025-4 costs $2.99 to acquire, so selectable option 1026-4 is labeled "$2.99".

Figure 10D:
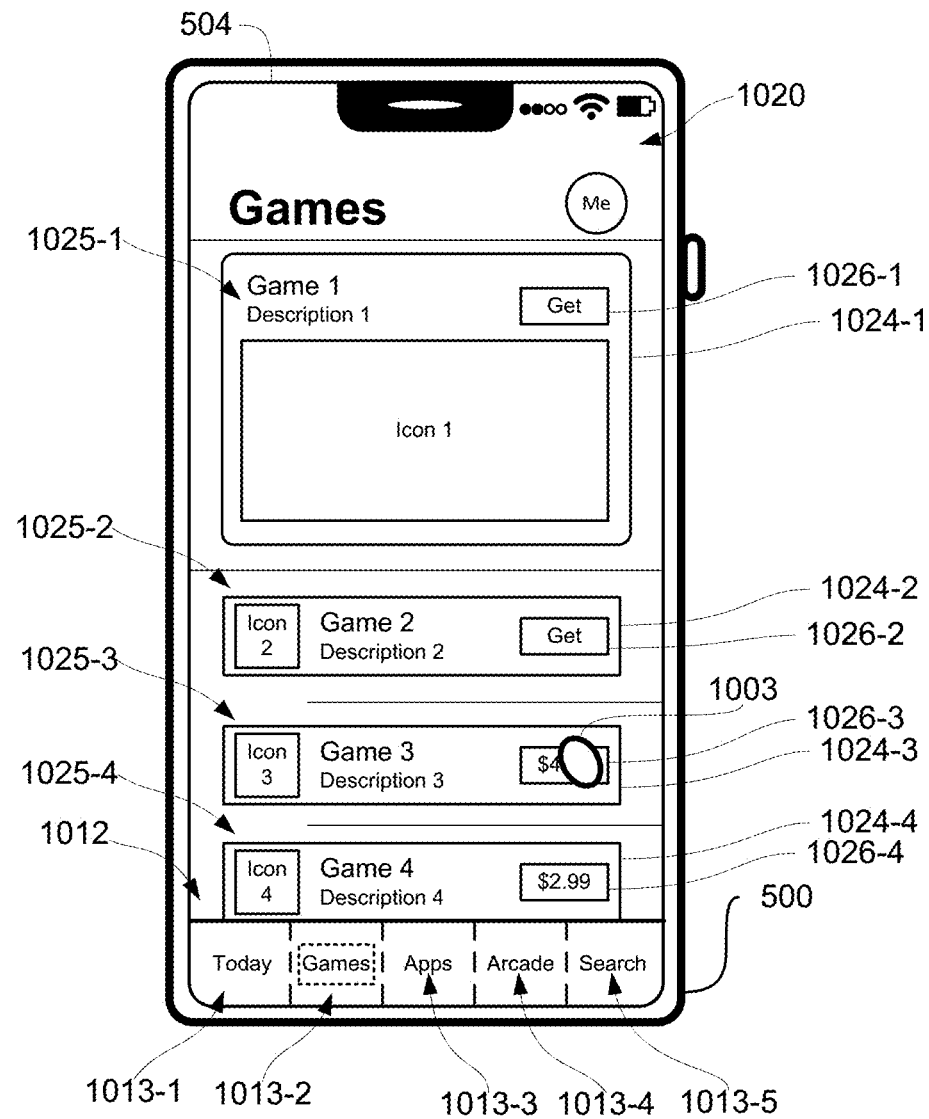
Figure 10E:
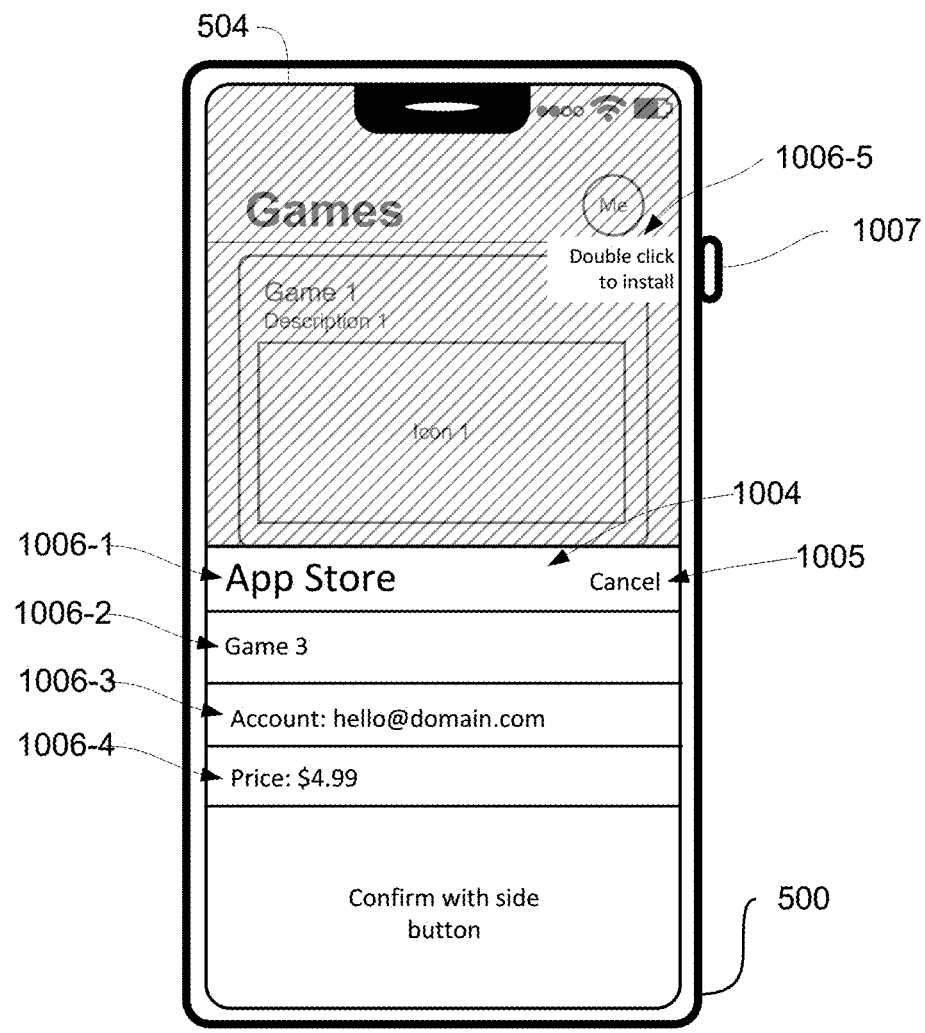

As shown in FIG. 10D, user input 1003 is detected on selectable option 1026-3 for purchasing game 1025-3 for $4.99. In some embodiments, in response to receiving user input 1003 indicating a desire to purchase game 1025-3, a purchase confirmation card is displayed, as shown in FIG. 10E. In some embodiments, purchase confirmation card 1004 is displayed over the user interface that induced display of the purchase confirmation card (e.g., user interface 1020). In some embodiments, the user interface beneath the purchase confirmation card is tinted or otherwise greyed out. In some embodiments, as shown in FIG. 10E, purchase confirmation card 1004 is displayed in the lower half of touch screen 504 and includes information regarding the item that is being purchased (e.g., game 1025-3). For example, purchase confirmation card 1004 includes text label 1006-1 indicating that the purchase is from the application store application, and text label 1006-2 indicating that the purchase is of "Game 3" (e.g., game 1025-3). In some embodiments, purchase confirmation card 1004 includes text label 1006-3 indicating the account that will be used to purchase the game. In some embodiments, purchase confirmation card 1004 includes text label 1006-4 indicating the price of the game (e.g., $4.99). In some embodiments, purchase confirmation card 1004 includes selectable option 1005 to cancel the process of purchasing the game. In some embodiments, selecting selectable option 1005 causes purchase confirmation card 1004 to be dismissed. In some embodiments, purchase confirmation card 1004 includes a description for how to confirm the purchase (e.g., double-clicking side-button 1007). In some embodiments, text label 1006-5 adjacent to side button 1007 provides a further hint of how to confirm the purchase.

Figure 10F:
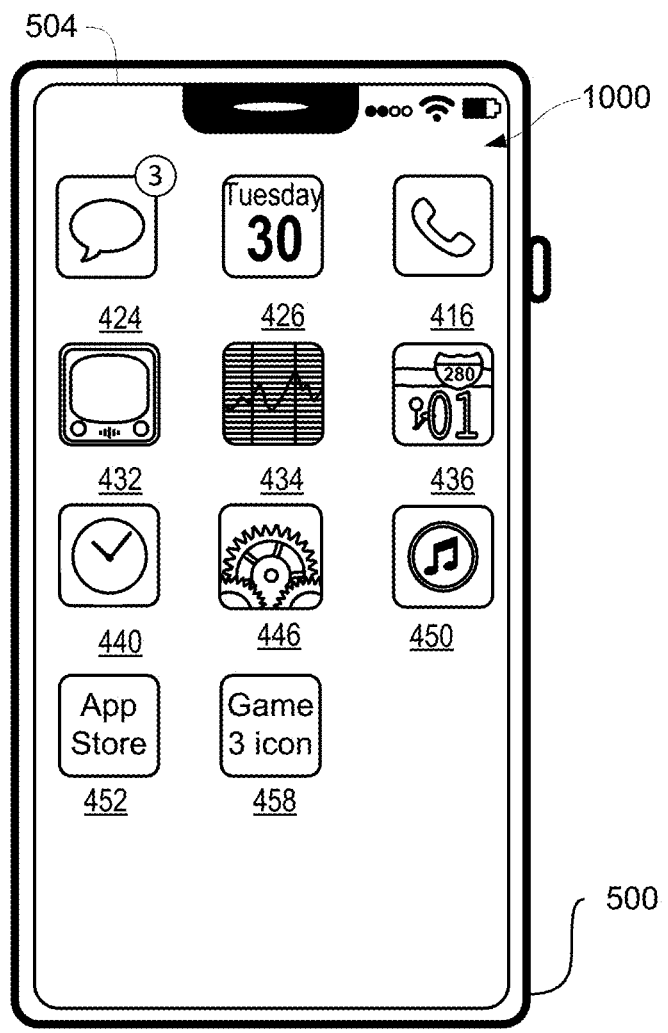

In some embodiments, after the user confirms the purchase of the game, the electronic device causes authorization of the purchase. In some embodiments, after the purchase is confirmed, game 1025-3 (e.g., Game 3) is downloaded and installed onto electronic device 500. As shown in FIG. 10F, when game 1025-3 is downloaded and installed onto the electronic device, icon 458 is placed onto home screen user interface 1010 (e.g., application launching user interface). In some embodiments, as described above, selection of the icon 458 (e.g., corresponding to game 3) causes electronic device 500 to launch game 3.

In some embodiments, the application store includes bundles of applications. In some embodiments, a bundle of applications is a single purchaseable product which includes a plurality of applications. In some embodiments, purchasing the bundle provides the user with access to all applications within the bundle and causes downloading and installation of all applications within the bundle (e.g., effectively purchasing all the applications within the bundle). In some embodiments, purchasing the bundle is a single transaction and the user authorizes a single payment to purchase the bundle, which includes all the applications and/or games within the bundle. In some embodiments, the applications within the bundle can be purchased separately from the bundle. A subscription service optionally shares certain similar features as a bundle of applications insofar as a single transaction (e.g., subscribing to the subscription service and/or payment of the periodic subscription fee) causes the user to receive access to a plurality of applications (e.g., games). However, in contrast to a bundle of application, as a result of the single transaction (e.g., subscription to the subscription service), the electronic device does not download all applications which have now received access as a result of the subscription. As will be discussed in more detail below, only certain applications or no applications are downloaded and installed as a result of the single transaction.

Figure 10G:
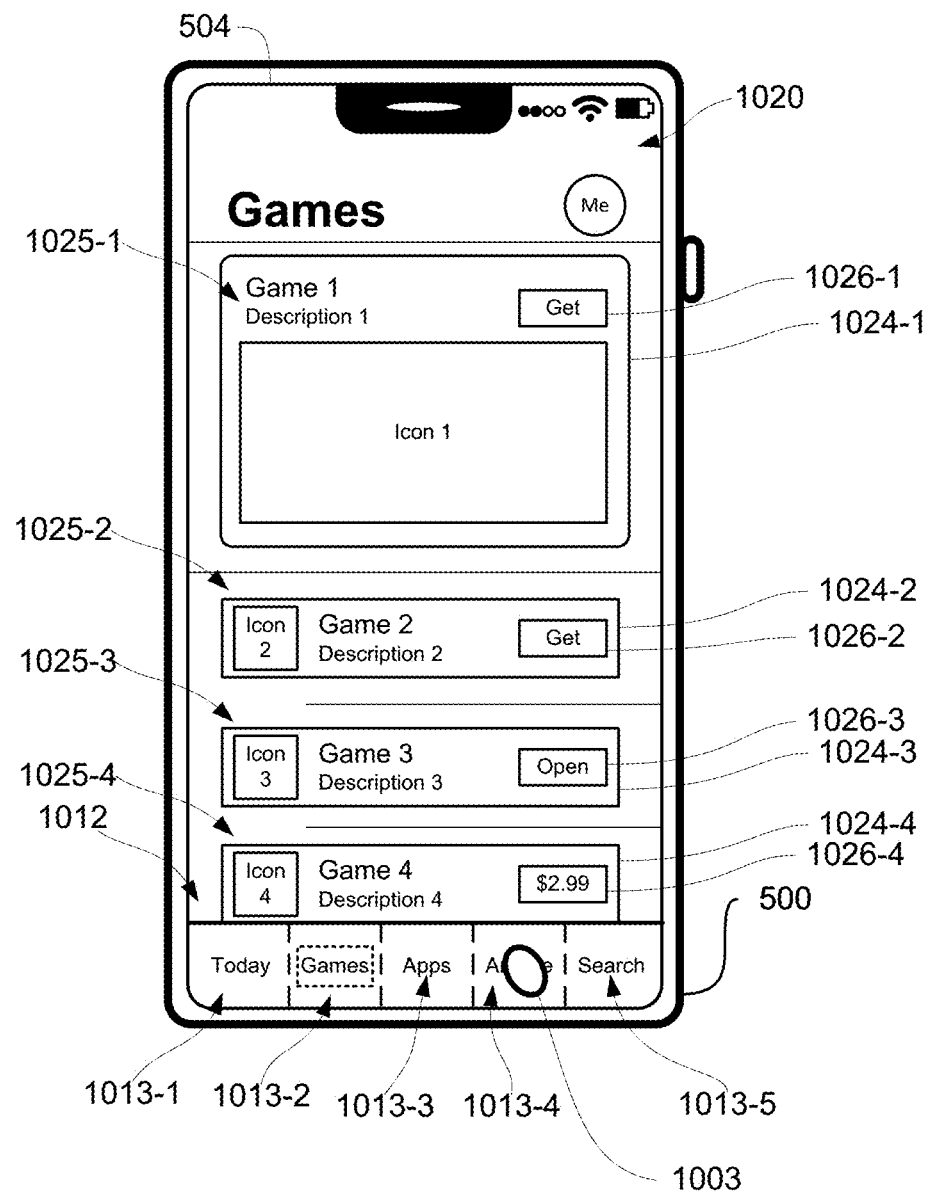
Figure 10H:
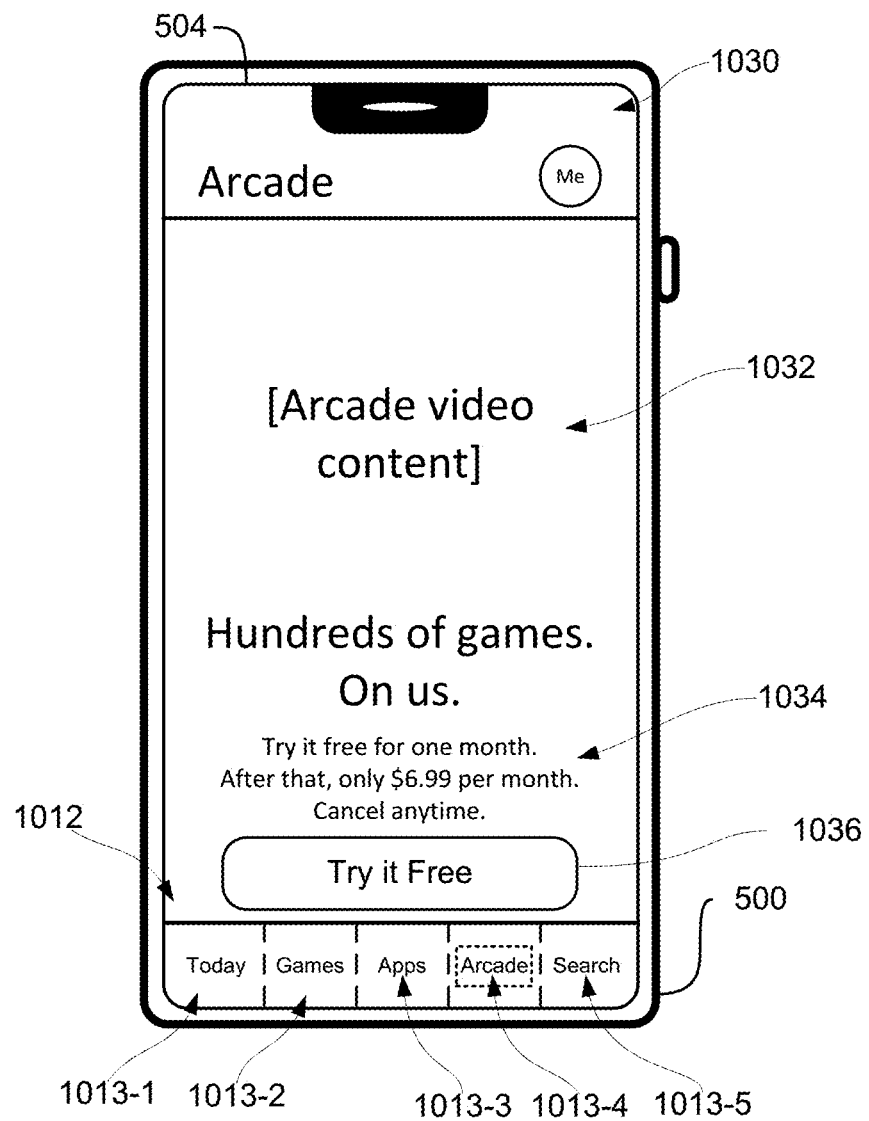

In FIG. 10G, user input 1003 selects selectable option 1013-4 on navigation bar 1012 corresponding to the "Arcade" page. In response, electronic device 500 displays user interface 1030 dedicated to browsing and purchasing "arcade" applications (e.g., arcade subscription games), as shown in FIG. 10H. In some embodiments, user interface 1030 includes a scrollable page associated with the arcade subscription service (e.g., top/down scroll). In some embodiments, electronic device 500 displays an initial portion of user interface 1030 (e.g., scrolled to the top of the page). In some embodiments, the initial portion is different depending on whether the user is subscribed to the arcade subscription service. For example, FIG. 10H displays one exemplary embodiment of user interface 1030 when the user does not have a subscription to the subscription service. In some embodiments, user interface 1030 includes a photo, video, or other media 1032 representing or promoting the arcade subscription service. In some embodiments, user interface 1030 includes text label 1034 describing the arcade applications and/or the arcade subscription service. In some embodiments, user interface 1030 includes selectable option 1039 (e.g., button or affordance labeled "Try it Free") that is selectable to initiate a process for subscribing to the arcade subscription service (e.g., or initiating a free trial to the subscription service). In some embodiments, user interface 1030 is scrollable to display more information, content, and/or subscription games that are included in the arcade subscription service, as described above with respect to FIGS. 6 and 8. For example, FIG. 10 displays user interface 1030 scrolled downwards to display card 1038 (e.g., corresponding to Game A). In some embodiments, card 1038 includes an image of Game A, an icon for Game A (e.g., a logo), the title, an indicator that the game is an arcade subscription application, and/or a selectable option (e.g., a button or affordance labeled "Try it") which is selectable to initiate a process for subscribing to the arcade subscription service (e.g., or initiating a free trial to the subscription service), as further described below with respect to FIG. 10K.

Figure 10I:
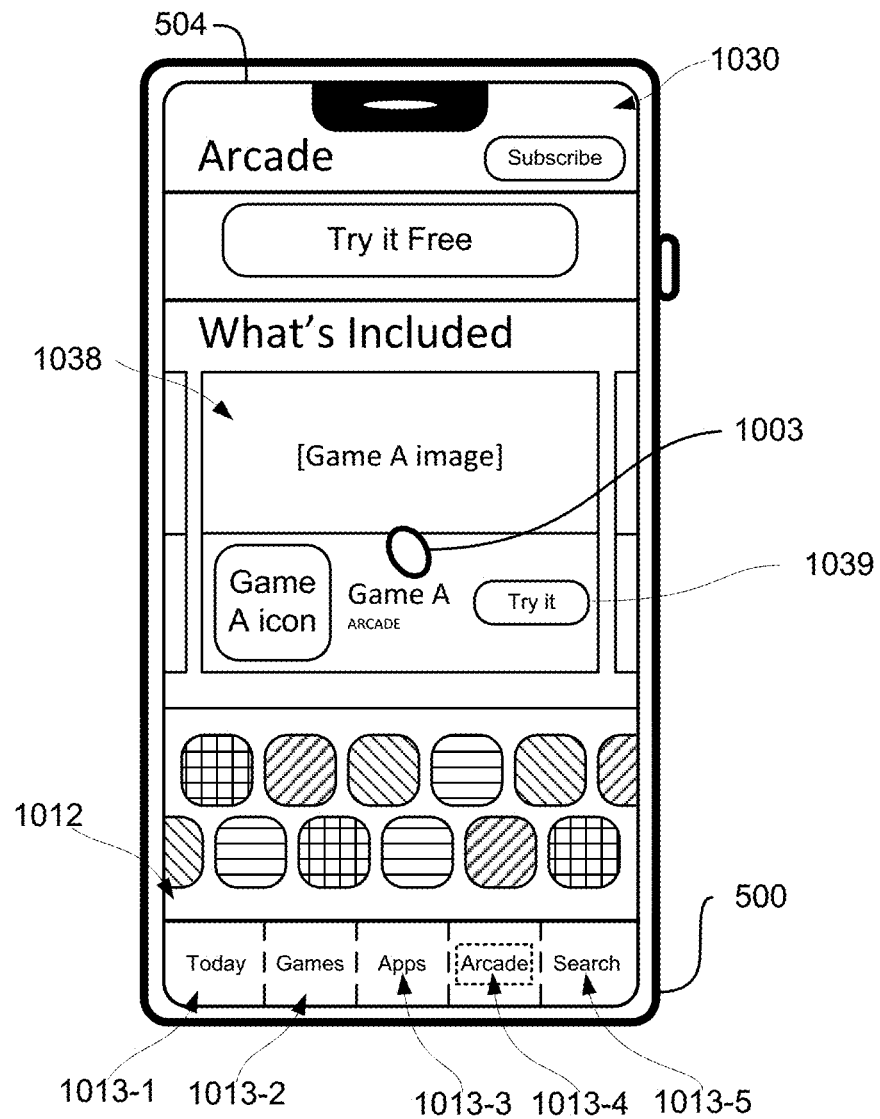
Figure 10J:
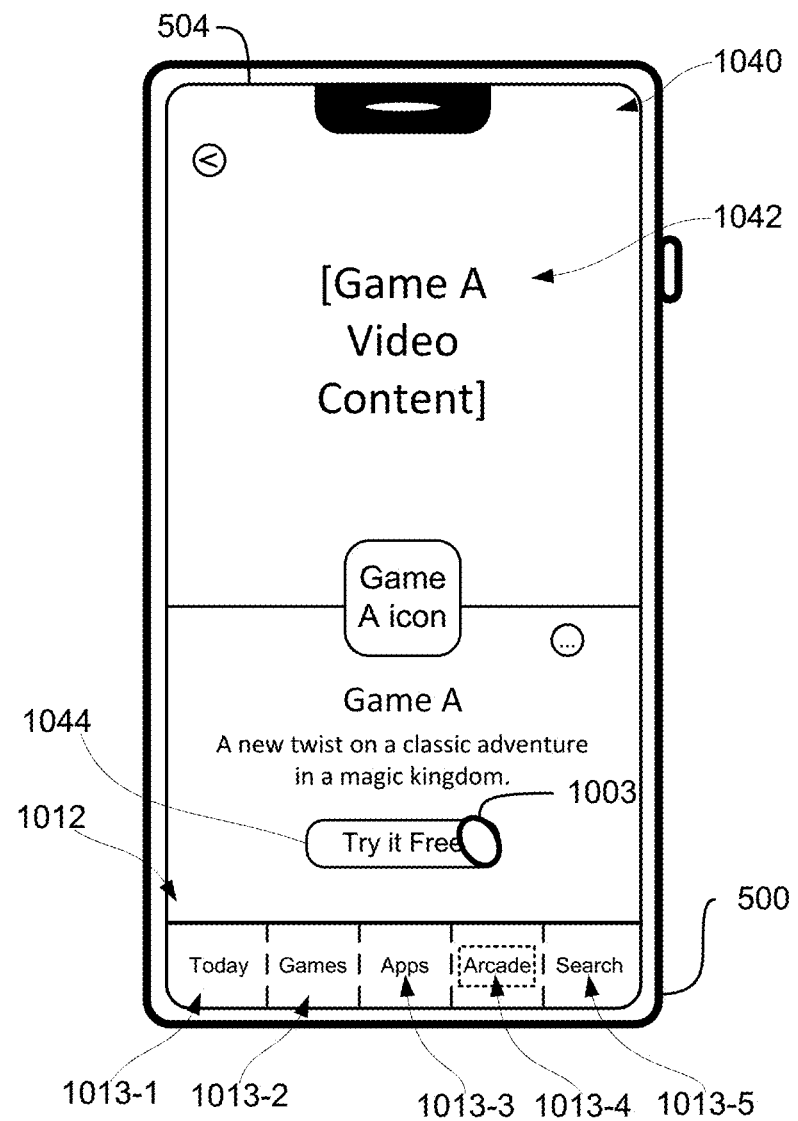

In some embodiments, as shown in FIG. 10I, user input 1003 is detected selecting the card 1038 (e.g., as opposed to selecting selectable option 1039). In response to user input 1003, the electronic device 500 displays user interface 1040, as shown in FIG. 10J. In some embodiments, user interface 1040 is a dedicated page for game A (e.g., product page, canonical page, etc.). In some embodiments, user interface 1040 includes a graphic 1042 (e.g., still image, video, animation, etc.) of the game, an icon of the game, the title of the game, a description of the game, and/or selectable option 1044 (e.g., a button or affordance labeled "Try it Free") which is selectable to initiate a process for subscribing to the arcade subscription service (e.g., or initiating a free trial to the subscription service). In some embodiments, as shown in FIG. 10J, user input 1003 selects selectable option 1044 indicating a request to subscribe to the arcade subscription service (e.g., or to begin the free trial of the arcade subscription service) or otherwise indicating the user's request to access game A. In some embodiments, because Game A is an arcade subscription game in which access is granted only if the user has a subscription to the arcade subscription service, accessing game A requires that the user have a subscription to the arcade subscription service. In some embodiments, if the user does not yet have a subscription to the subscription service, then selectable option 1044 reads "Try it Free", selection of which initiates a process for beginning a free trial of the subscription service.

Figure 10K:
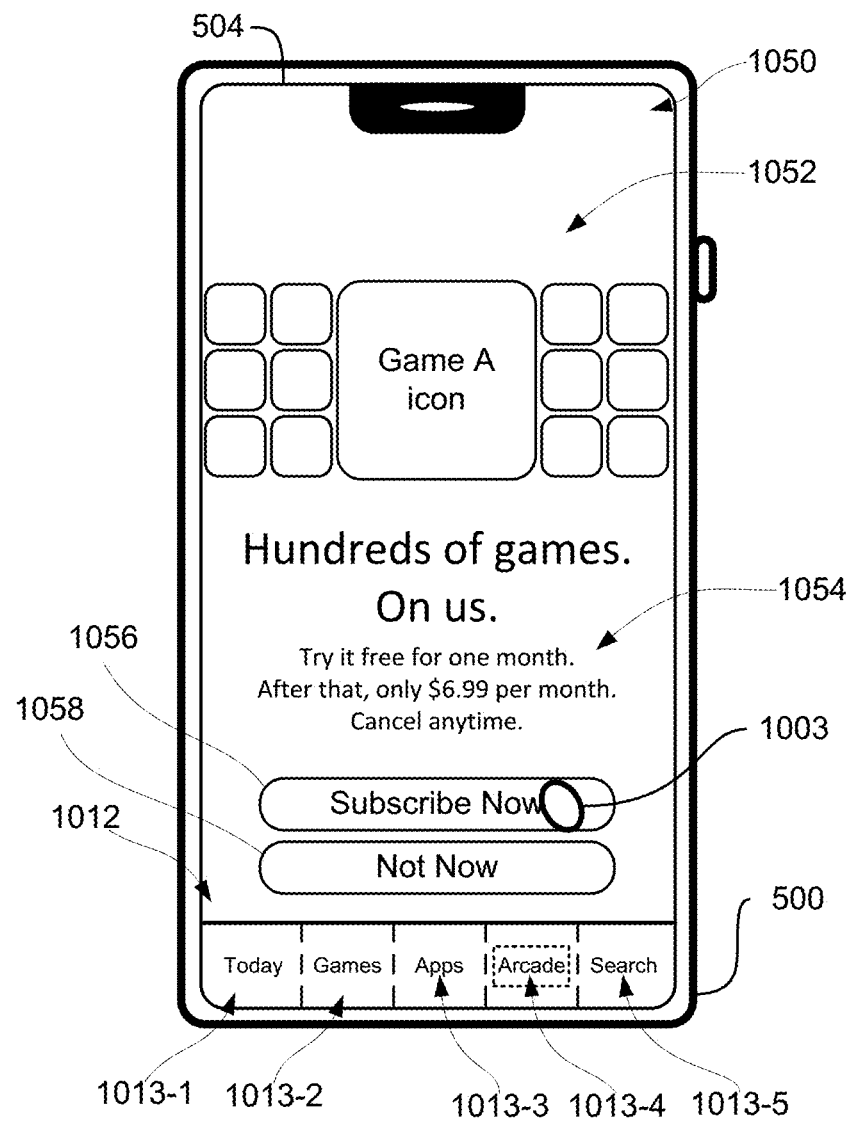

In some embodiments, in response to user input 1003 selecting selectable option 1044 (e.g., to begin the free trial of the arcade subscriptions service), subscription information user interface 1050 is displayed, as shown in FIG. 10K. In some embodiments, subscription information user interface 1050 is displayed whenever the user requests to subscribe to the subscription service (e.g., or start a free trial) from a page that does not include certain information that is included in the subscription information page. For example, subscription information user interface 1050 includes pricing information (e.g., "only $6.99 per month") and that the user can cancel his or her subscription at any time (e.g., "cancel anytime"). In some embodiments, because user interface 1040 (e.g., game A product page) did not include the subscription service pricing information or that the user can cancel anytime, subscription information user interface 1050 is displayed to inform the user of this information. In some embodiments, if user interface 1050 did include this information (e.g., pricing and that the user can cancel at any time), then subscription information user interface 1050 is optionally not displayed and is skipped (e.g., purchase confirmation card 1004 is displayed to confirm the purchase, as shown in FIG. 10L).

In some embodiments, subscription information user interface 1050 includes a grid 1052 of icons (e.g., logos or other representations) of games that are included in the arcade subscription service. In some embodiments, if subscription information user interface 1050 was reached from a particular game's product page (e.g., user interface 1040 corresponding to the game A product page), then the grid 1052 includes an enlarged icon of the particular game (e.g., game A). In some embodiments, the enlarged icon is in the center of the grid 1052 of icons. In some embodiments, subscription information user interface 1050 includes a selectable option 1056 (e.g., button or representation labeled "Subscribe Now") to continue the process of subscribing to the subscription service (e.g., or to begin the free trial) and selectable option 1058 (e.g., button or representation labeled "Not Now") to cancel the process of subscribing to the subscription service.

Figure 10L:
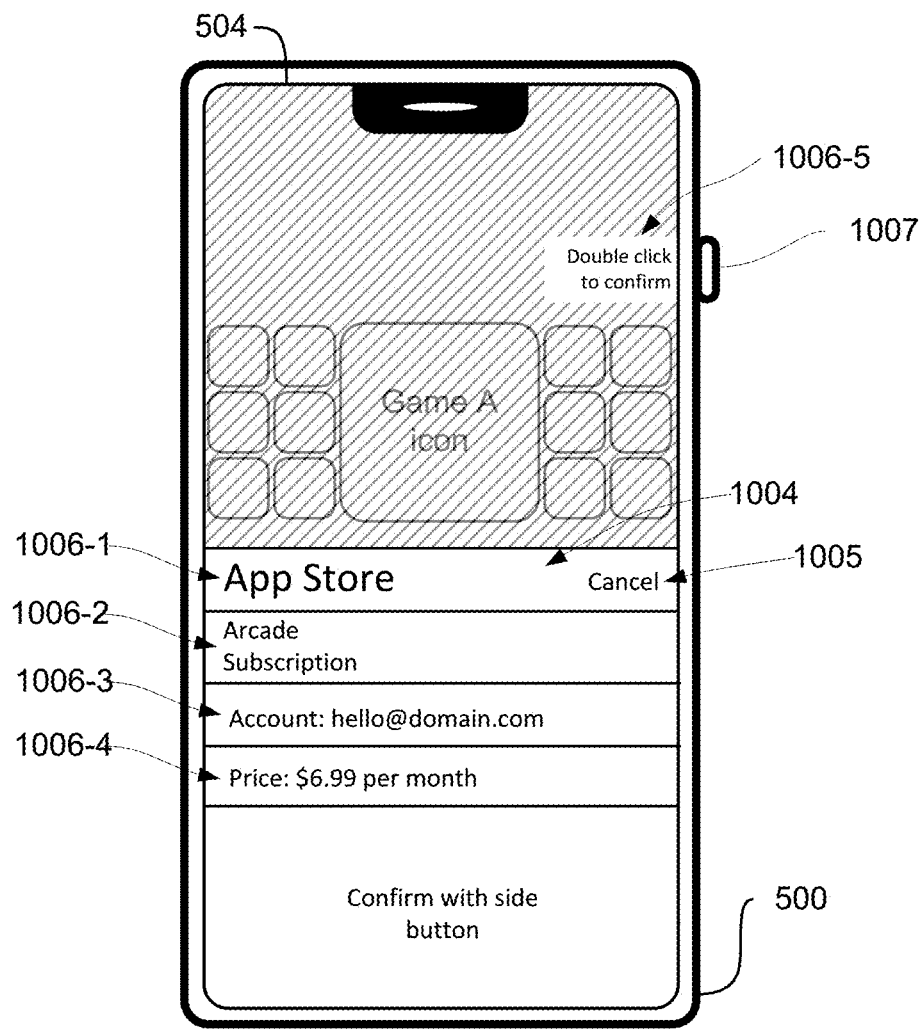

In response to user input 1003 selecting selectable option 1056 to continue the process of subscribing to the subscription service, purchase confirmation card 1004 is displayed, as shown in FIG. 10L. In some embodiments, purchase confirmation card 1004 for purchasing (e.g., or for beginning the free trial) a subscription to the subscription service is similar to the purchase confirmation card 1004 described with respect to FIG. 10E. In some embodiments, purchase confirmation card 1004 for the subscription service includes information that the user is subscribing to the "Arcade" subscription service (e.g., text label 1006-2) and that the price is $6.99 a month (e.g., text label 1006-4).

Figure 10M:
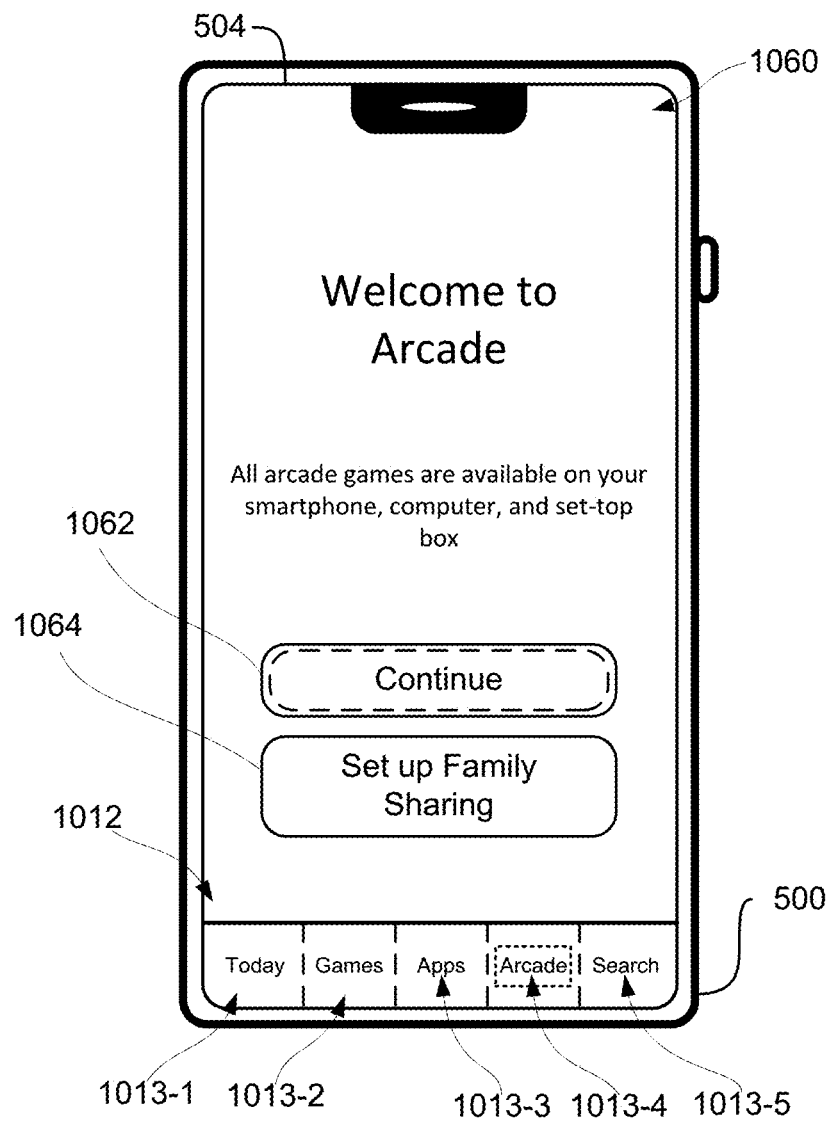

In some embodiments, after the user confirms the purchase of the subscription to the subscription service (e.g., or after beginning the free trial), subscription welcome user interface 1060 is displayed, as shown in FIG. 10M. In some embodiments, subscription welcome user interface 1060 includes a description of the subscription service. For example, the description of the subscription service includes notifying the user that the user's subscription to the subscription service includes access to the subscription service on the user's other electronic devices (such as a smartphone, computer or laptop, set-top box, tablet device, etc.) in which the user's has logged into with the same user account, as is described in more detail with respect to FIG. 10W-10X. In some embodiments, subscription welcome user interface 1060 includes selectable option 1062 (e.g., button or representation labeled "continue") to return to the user interface that was being displayed before the user began the process to subscribe to the subscription service (e.g., user interface 1040 corresponding to the game A product page). In some embodiments, subscription welcome user interface 1060 includes selectable option 1064 (e.g., button or representation labeled "Set up Family Sharing") button for setting up a family sharing feature. In some embodiments, a subscription to the arcade subscription service can be shared amongst members of a family group. In other words, once a member of a family group is subscribed to the subscription service and the subscription is shared with other members of the family group, then the other members have access to the games and/or applications that are included in the subscription service. Thus, selection of selectable option 1064 initiates a process for setting up the family sharing feature and sharing the subscription to the other members of the family group.

Figure 10N:
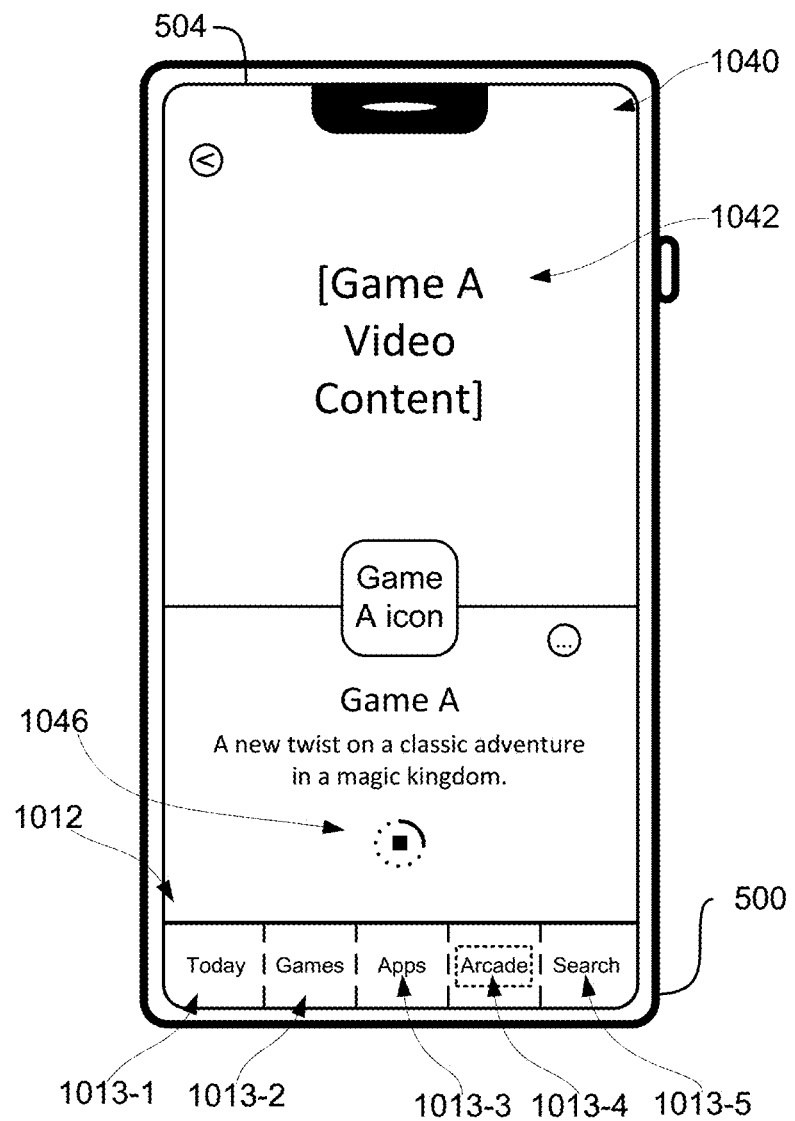
Figure 10O:
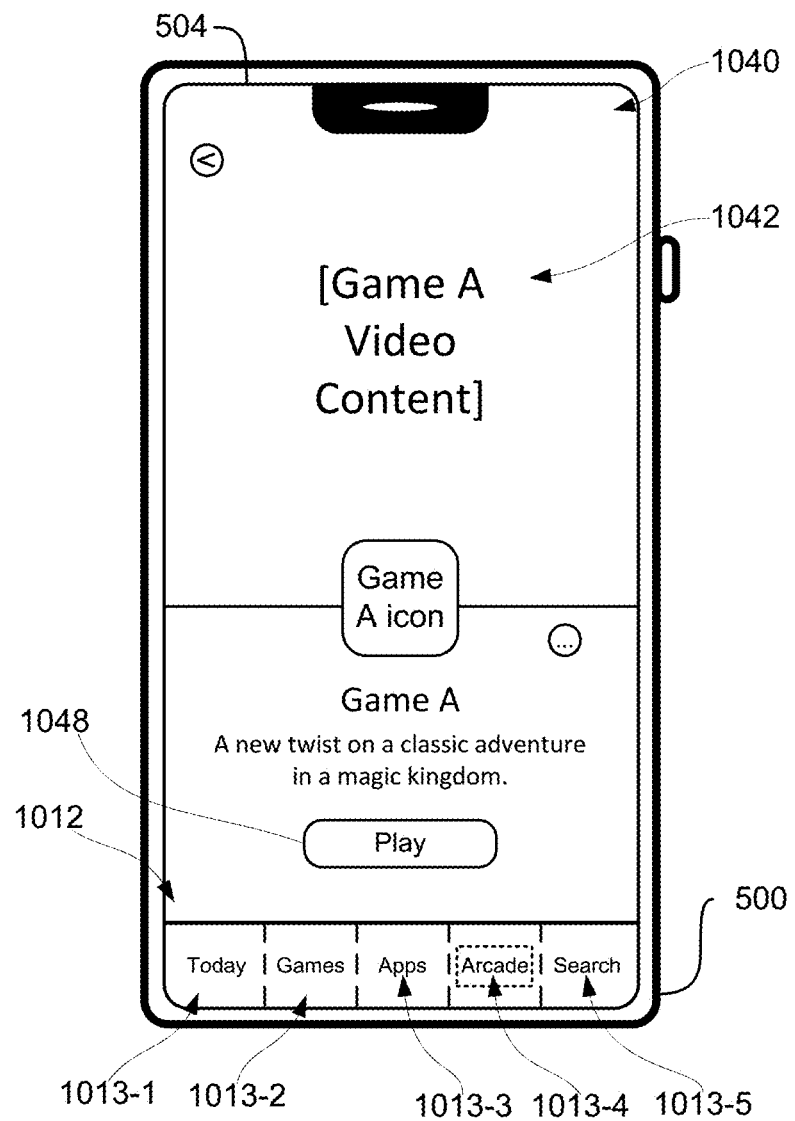
Figure 10P:
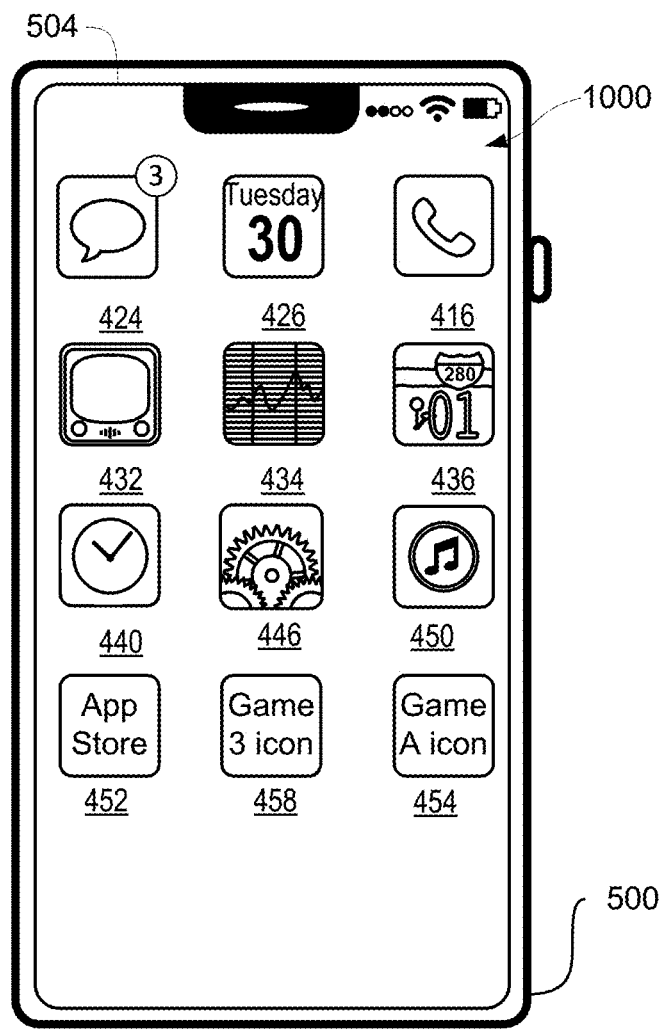

As shown in FIG. 10N, after the user selects selectable option 1062, electronic device 500 returns to displaying user interface 1040 corresponding to the game A product page. In some embodiments, after the user subscribes to the subscription service, game A automatically begins downloading and installing onto electronic device 50. In some embodiments, user interface 1040 replaces selectable option 10003 with an icon 1046 of the download progress of the game. In some embodiments, icon 1046 is an animated icon. In some embodiments, a user can select icon 1046 to stop the download of game A. In some embodiments, as shown in FIG. 10O, after the download of game A completes and installs onto electronic device 500, icon 1046 is replaced with a selectable option 1048 (e.g., button or affordance labeled "play"). In some embodiments, selection of selectable option 1048 causes electronic device 500 to launch or otherwise display game A. In some embodiments, after game A is downloaded and installed onto electronic device 500, icon 454 corresponding to game A is added to home screen user interface 1000 of the electronic device 500 (or, in some embodiments, the application launching user interface), as shown in FIG. 10P. In some embodiments, selection of icon 454 causes electronic device 500 to launch or otherwise display game A.

Figure 10Q:
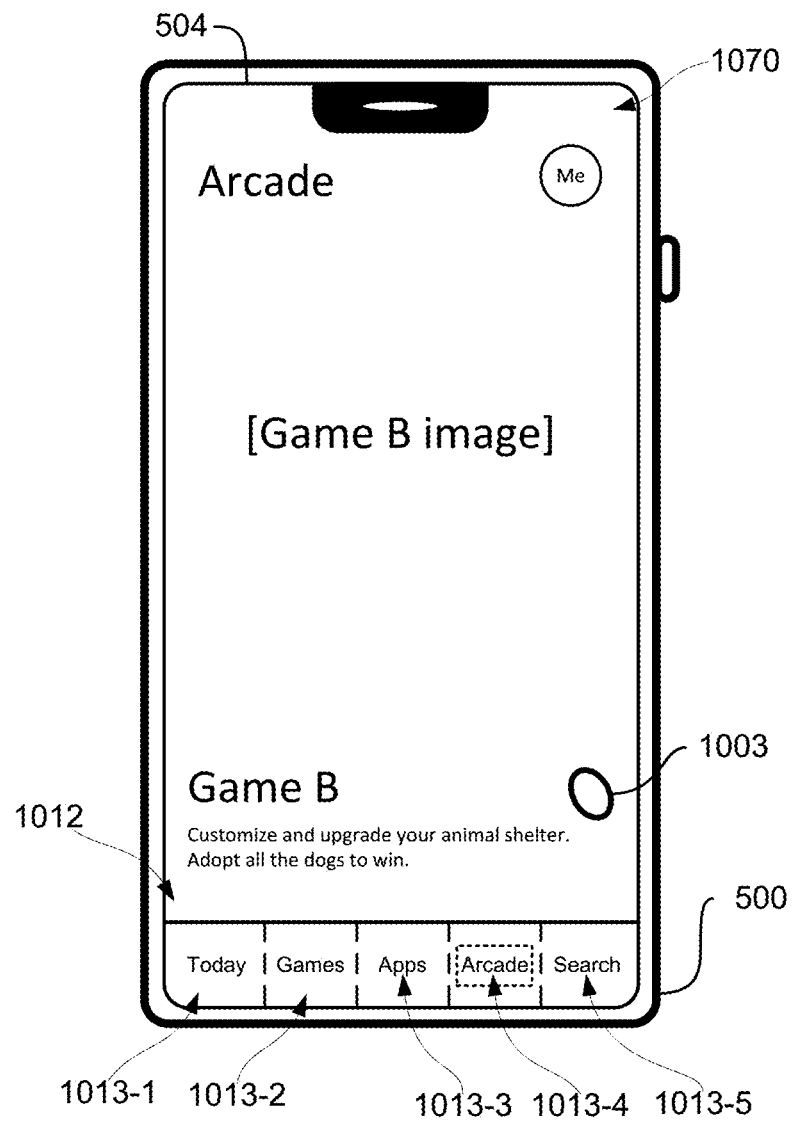

In FIG. 10Q, the user returns to user interface 1030 dedicated to browsing and purchasing "arcade" applications (e.g., arcade subscription games). In some embodiments, because the user now has a subscription to the arcade subscription service, the initial portion of user interface 1030 (e.g., scrolled to the top of the page) does not include media promoting the subscription service or information about the subscription service. In some embodiments, instead, user interface 1030 displays a featured game included in the arcade subscription service (e.g., game B). In some embodiments, because the user has subscribed to the subscription service (e.g., or began a free trial of the subscription service), the user now has access to all subscription games that are included in the subscription service. In some embodiments, even though the user now has access to all subscription games that are included in the subscription service, the subscription games are not all downloaded onto the electronic device. In some embodiments, no subscription games have been downloaded onto the electronic device (e.g., if the user subscribed to the subscription service from a user interface not specific to a particular game). In some embodiments, only one subscription game has been downloaded onto the electronic device (e.g., if the user subscribed to the subscription service from the game's product page or if the user selected a subscribe button from a game card).

Figure 10R:
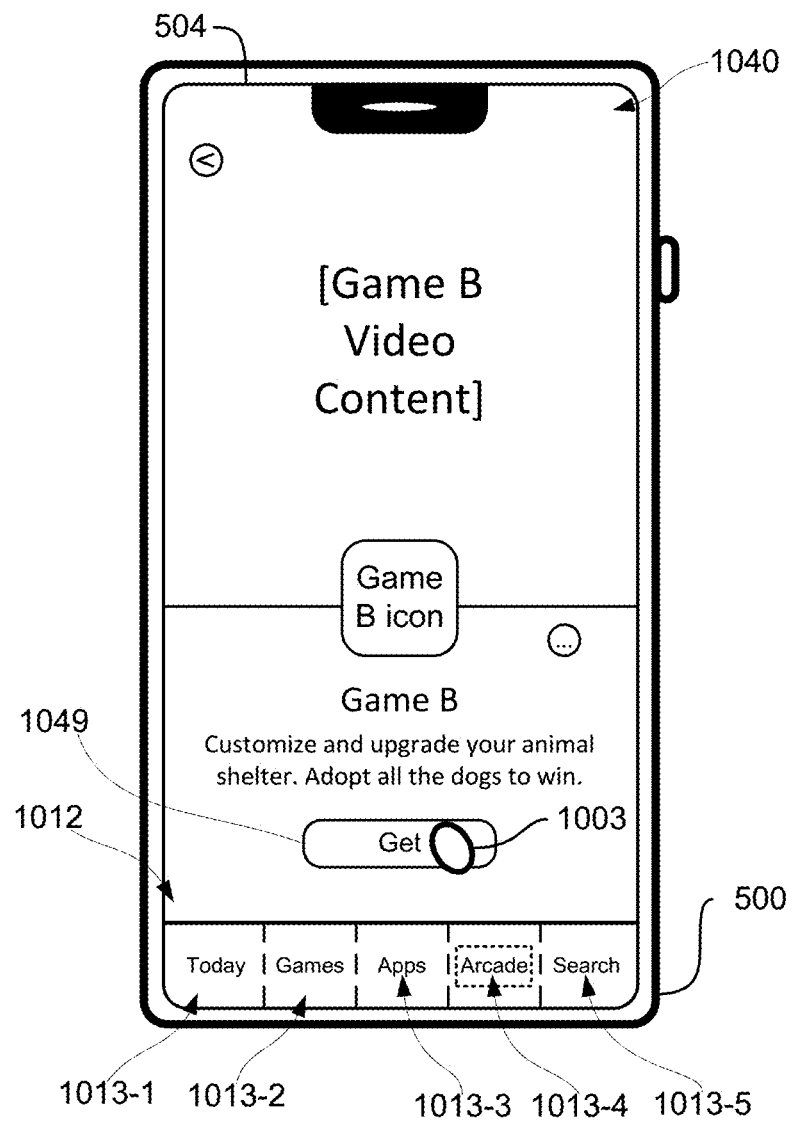

As shown in FIG. 10Q, the user clicks or otherwise selects the game B image or description (or other element related to game B). In some embodiments, in response to the user selection, user interface 1040 corresponding to a product page for game B is displayed, as shown in FIG. 10R. In some embodiments, user interface 1040 for game B (e.g., game B product page) shares similar elements as user interface 1040 for game A (e.g., game A product page) (e.g., as described in FIG. 10J) (e.g., with information for game B instead of game A). In some embodiments, because the user has a subscription to the arcade subscription service, product pages display a "Get" button instead of a "Try it Free" button (e.g., selectable option 1049). In other words, in some embodiments, the user no longer needs to subscribe to the arcade subscription service, and selection of the "get" button will begin a process for downloading the game, without requiring the user to proceed through the subscription process again.

Figure 10S:
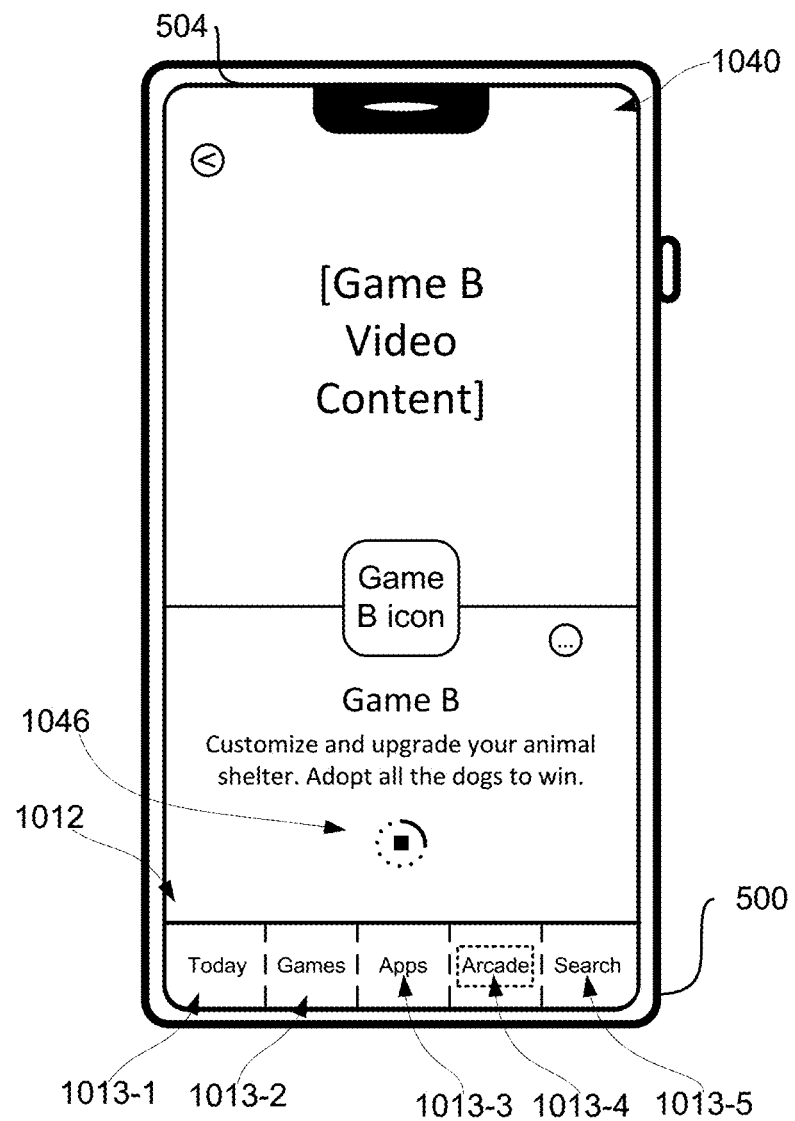
Figure 10T:
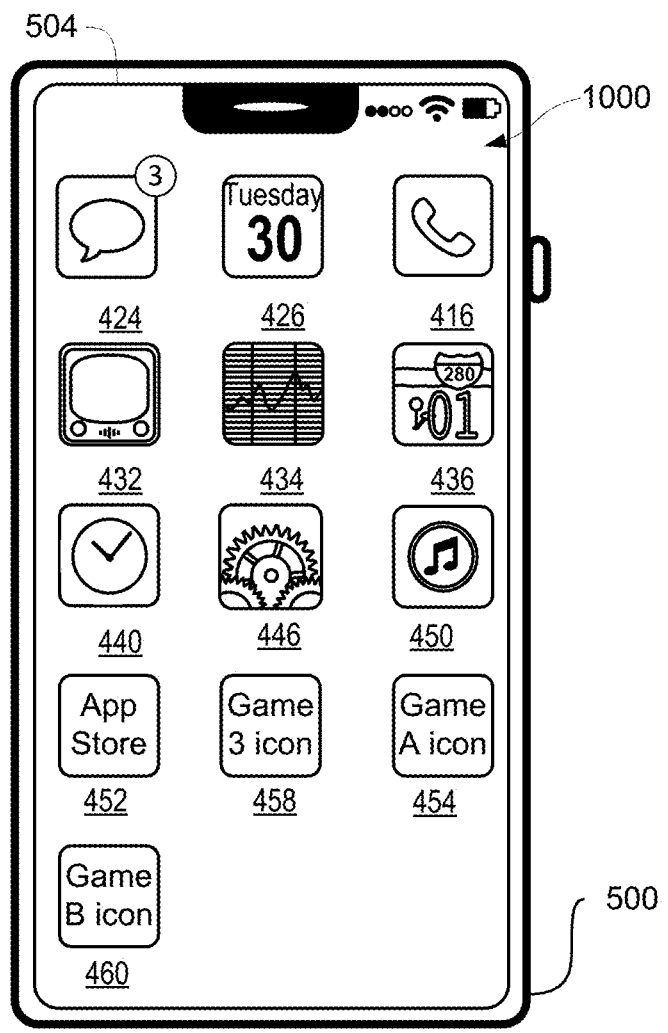

As shown in FIG. 10R, user input 1003 is detected selecting selectable option 1049 (e.g., button or affordance labeled "Get") indicating the user's request to download or otherwise access game B. In some embodiments, in response to the user input 1003 selecting selectable option 1049, the electronic device begins download of game B. In some embodiments, in response to user input 1003 selecting selectable option 1049, the electronic displays a confirmation page or card before beginning download of game B. In some embodiments, when downloading begins, selectable option 1049 is replaced with an icon 1046 of the download progress of the game, as shown in FIG. 10S. In some embodiments, icon 1046 is an animated icon the animated icon. In some embodiments, icon 1406 shares similar features as icon 1406 described in FIG. 10N. In some embodiments, after the download of game B completes, icon 460 for game B is added to home screen user interface 1000 (or, in some embodiments, the application launching user interface), as shown in FIG. 10T.

Figure 10U:
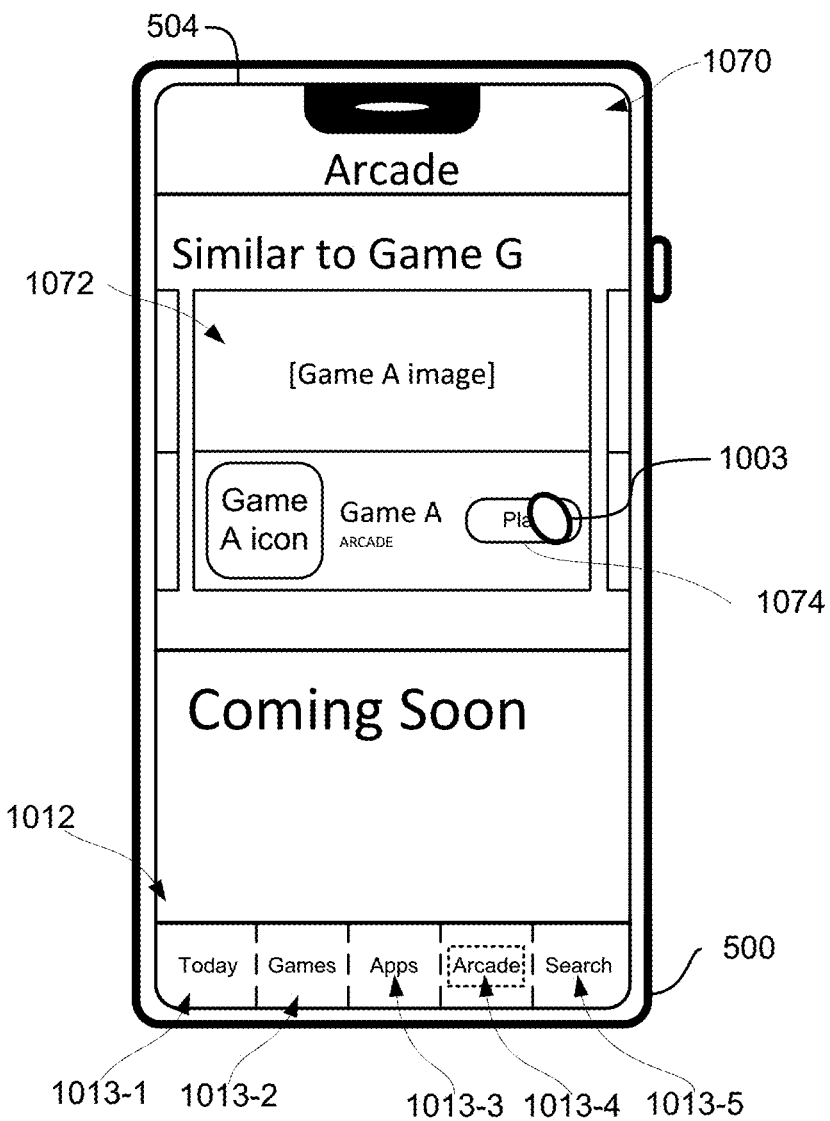
Figure 10V:
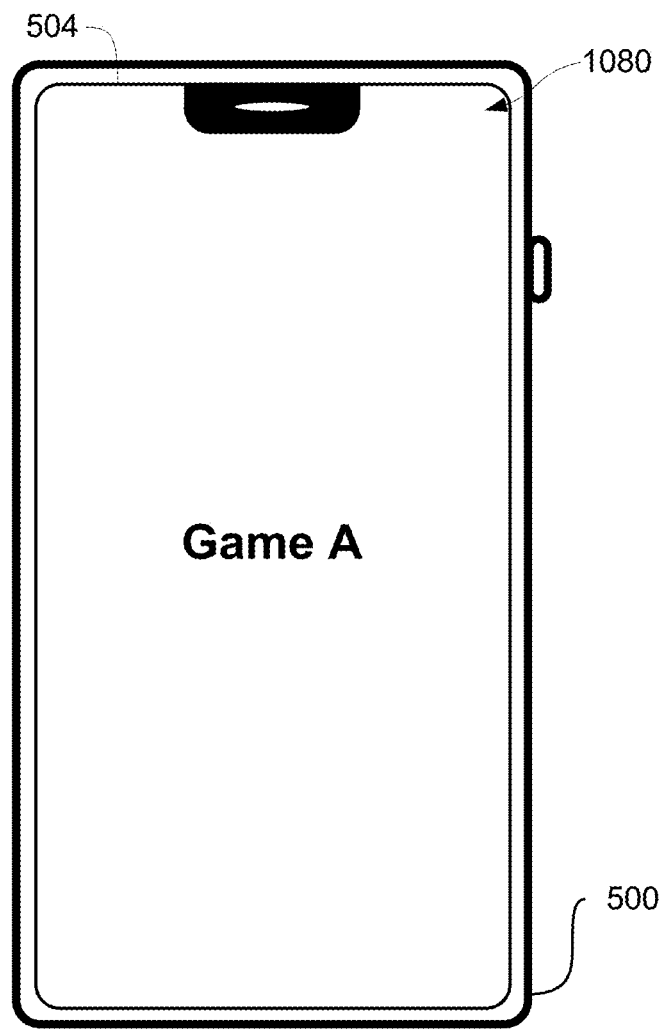

FIG. 10U illustrates an exemplary embodiment of user interface 1070 dedicated to browsing and purchasing "arcade" applications (e.g., arcade subscription games) scrolled downwards to display card 1072 (e.g., corresponding to Game A). In some embodiments, card 1072 includes selectable option 1074 (e.g., a button or affordance labeled "Play") which is selectable to launch game A, because game A has already been installed on electronic device 500 (e.g., and the user has a valid subscription to the arcade subscription service), as shown in FIG. 10V. In some embodiments, because the electronic device has already downloaded and installed game A onto the electronic device, selectable option 1074 now reads "Play" (e.g., as opposed to "Try it" or "Get") indicating to the user that the user can immediately play or otherwise launch the game without subscribing or downloading the game.

Figure 10W:
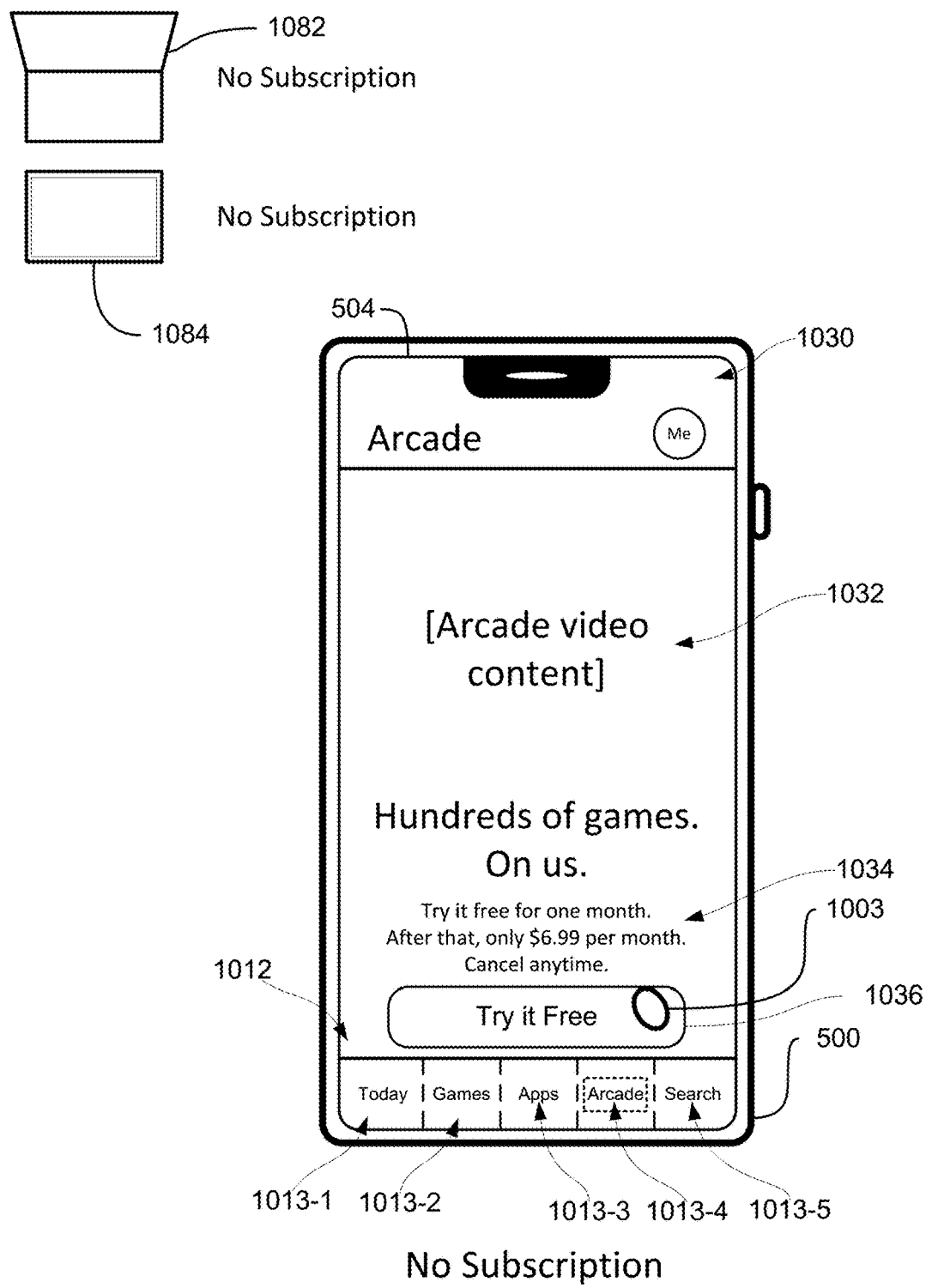

FIG. 10W illustrates an exemplary user interface 1030 in which the user does not have a subscription to the arcade subscription service. In FIG. 10W, the user selects selectable option 1036 to begin the process of subscribing to the subscription service, similar to the process described above. In some embodiments, the user has one or more other electronic devices, such as a laptop device 1082 and/or a tablet device 1084. In some embodiments, the user has logged into laptop device 1082 and/or tablet device 1084 with the same account with which the user has logged into electronic device 500. In some embodiments, none of the electronic devices have a subscription to the arcade subscription service.

Figure 10X:
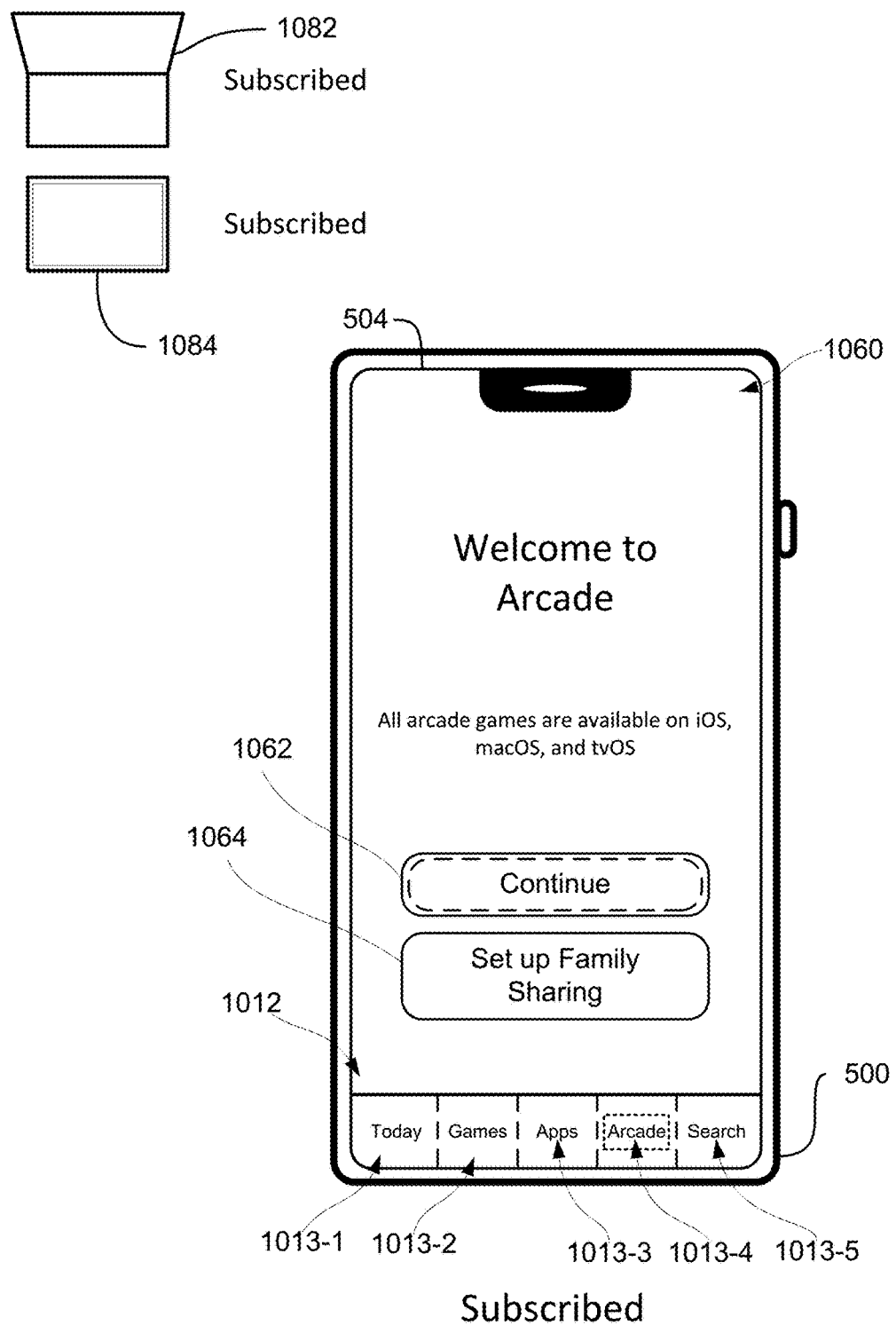

FIG. 10X illustrates an exemplary user interface 1060 in which the user has completed the process for subscribing to the subscription service and now has a valid subscription to the arcade subscription service. In some embodiments, subscribing to the subscription service on electronic device 500 causes the subscription to also be accessible on the user's other electronic devices including laptop device 1082 and/or the tablet device 1084. In some embodiments, the subscription with the subscription service is associated with the user's account and any electronic device in which the user has logged into with the user's account and with which the subscriptions service is compatible, will have access to the subscription with the subscription service. In other words, any or all of the electronic devices with which the subscription has been shared can download, play, or otherwise access the subscription games within the subscription service (e.g., in some embodiments, based on the particular electronic device's compatibility with the particular subscription game).

Figure 10Y:
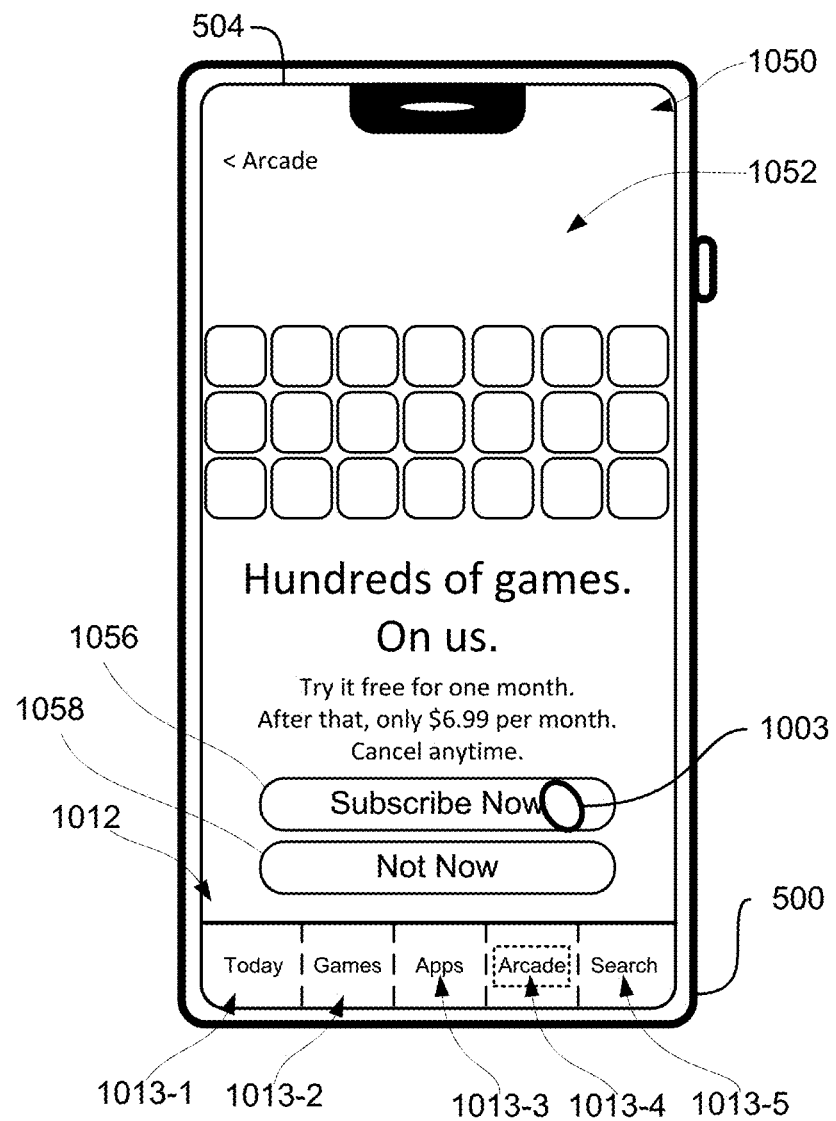
Figure 10Z:
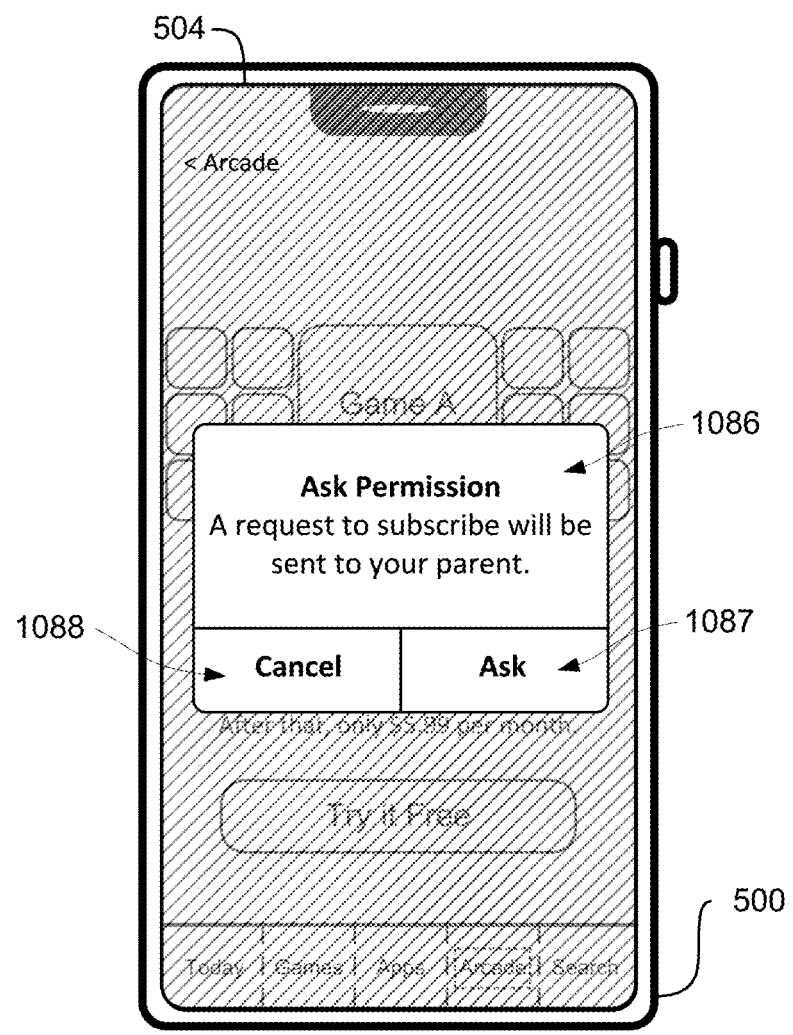
Figure 10A:
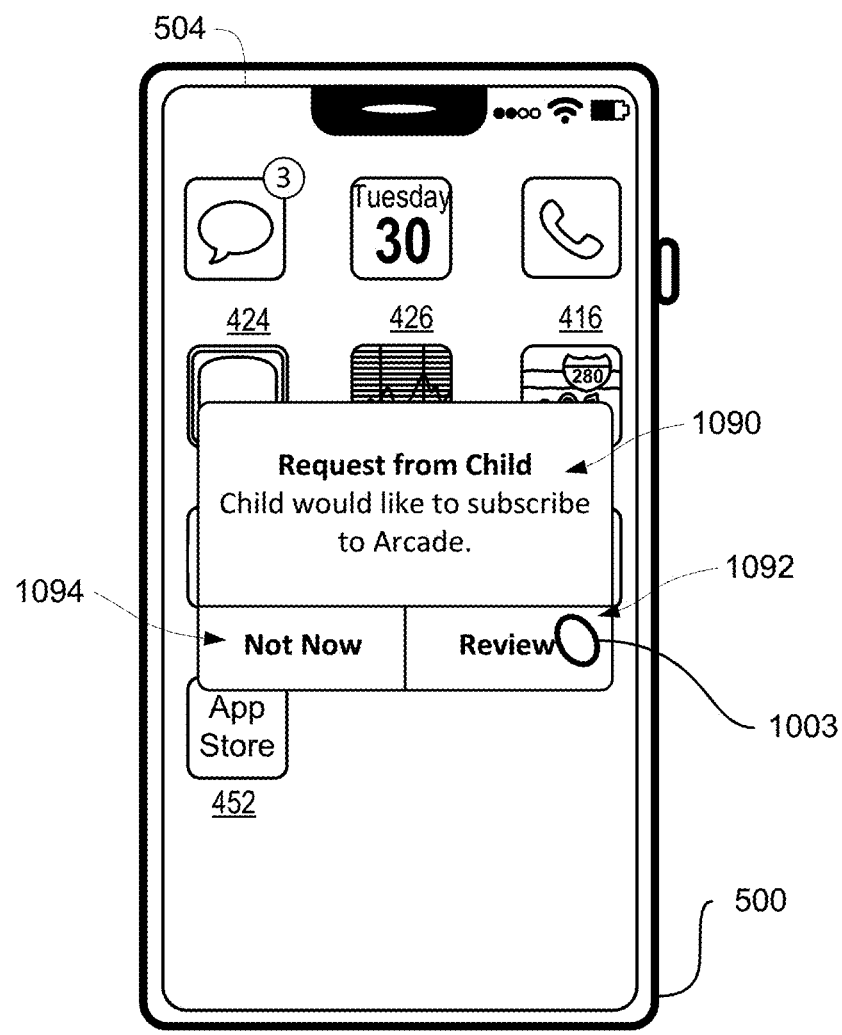
Figure 10B:
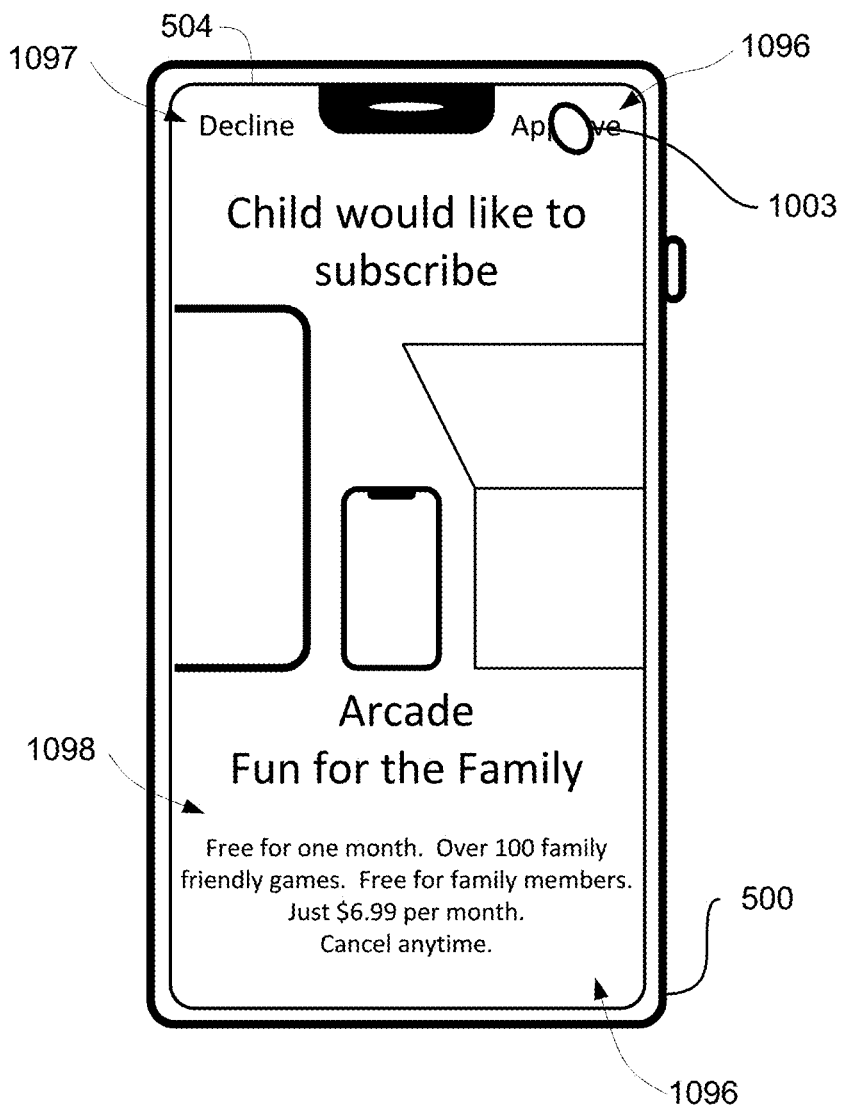
Figure 10C:
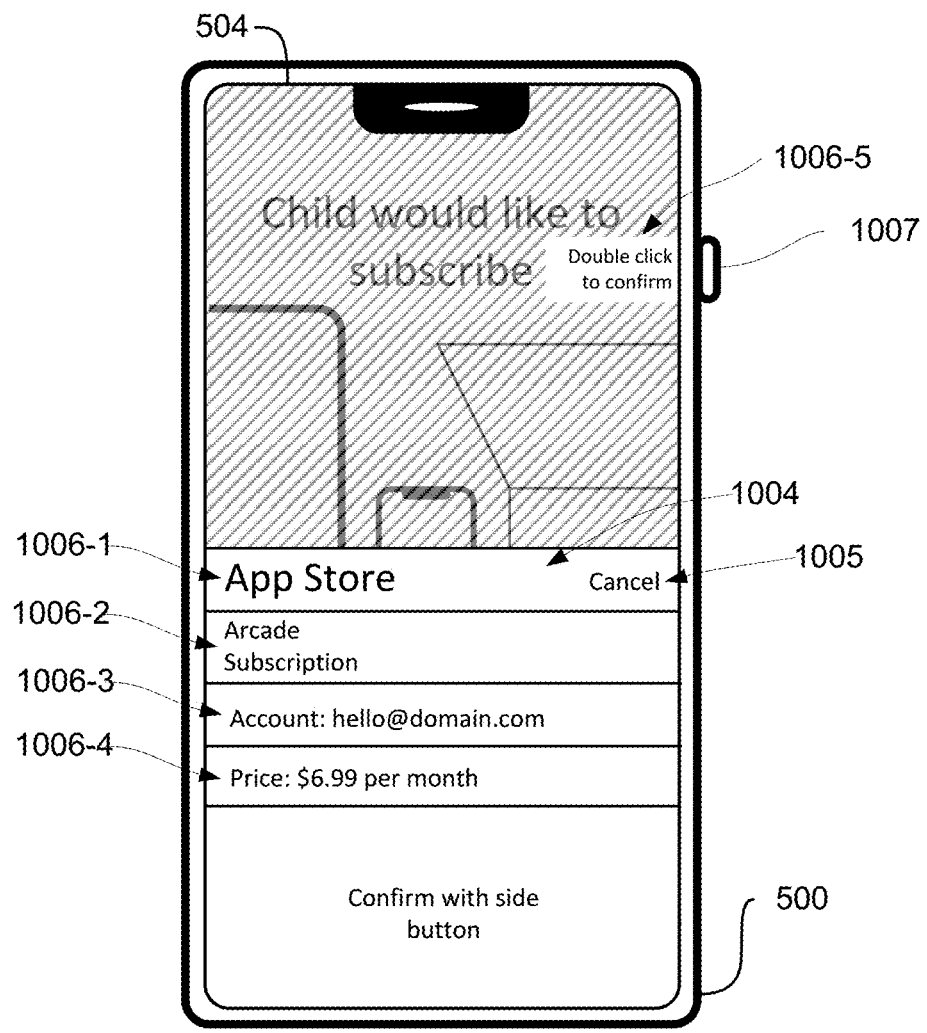
Figure 11A:
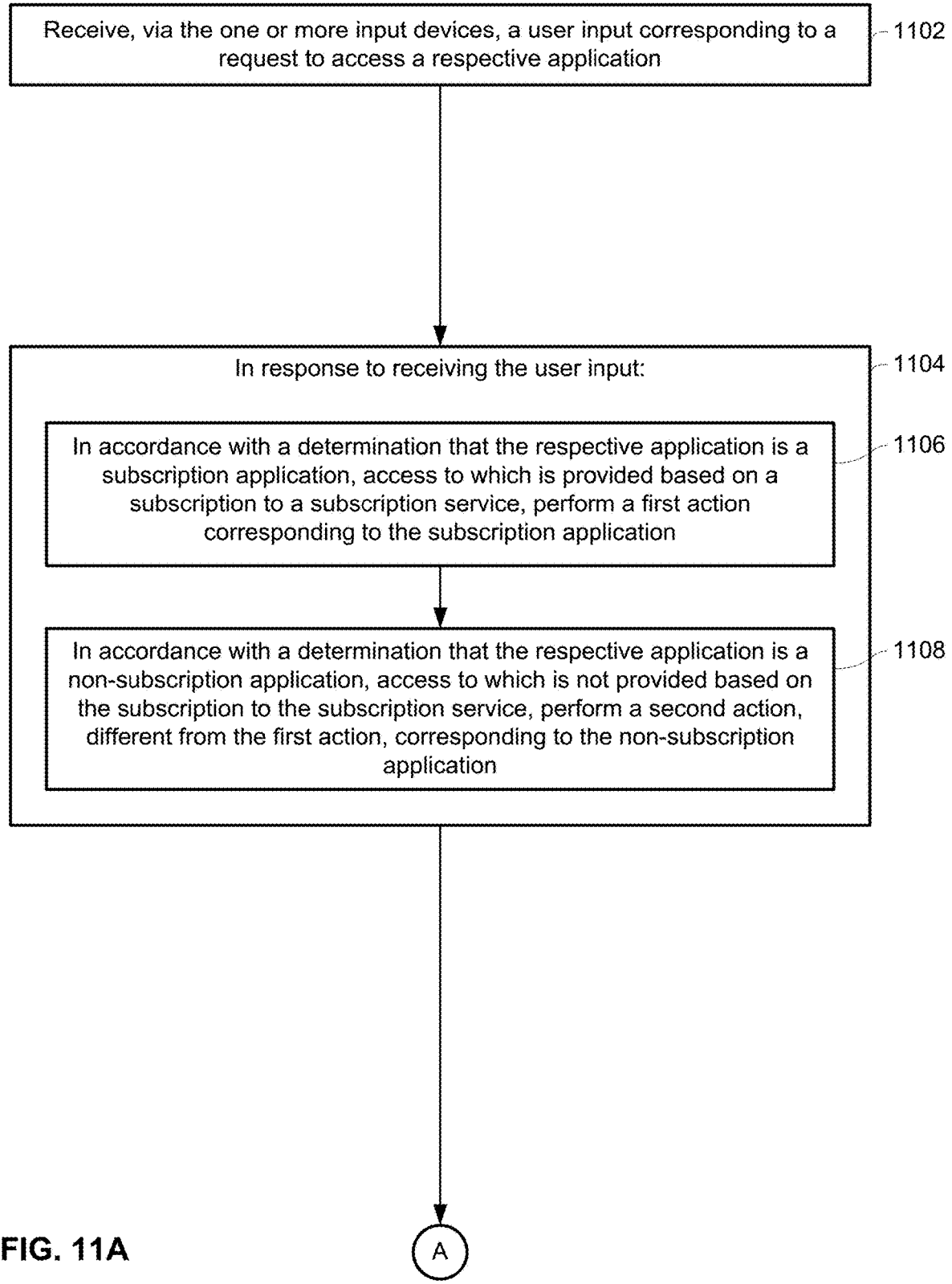
FIGS. 11A-11G are flow diagrams illustrating a method of providing ways to access subscription and non-subscription applications in accordance with some embodiments.
Figure 11B:
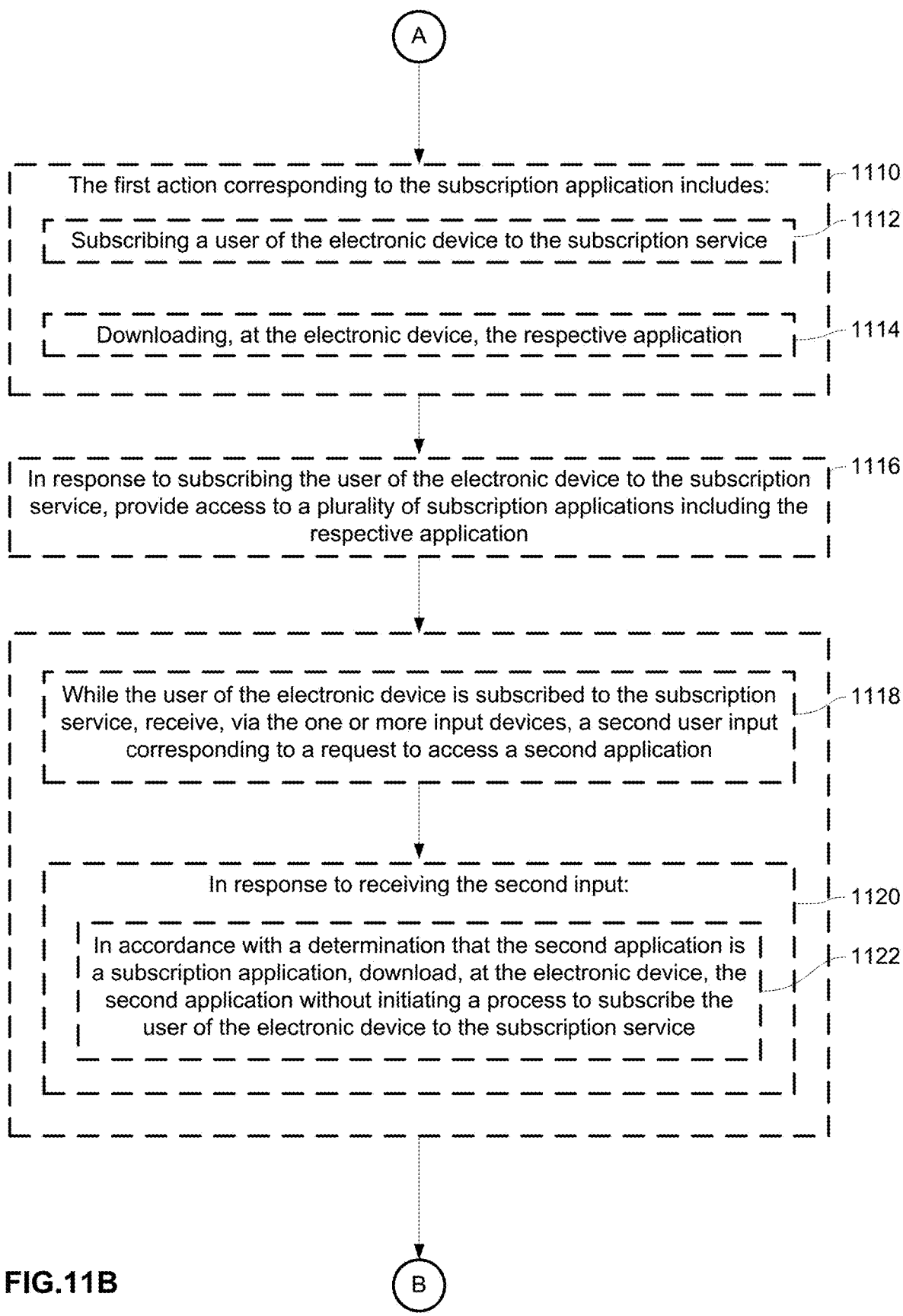
Figure 11C:
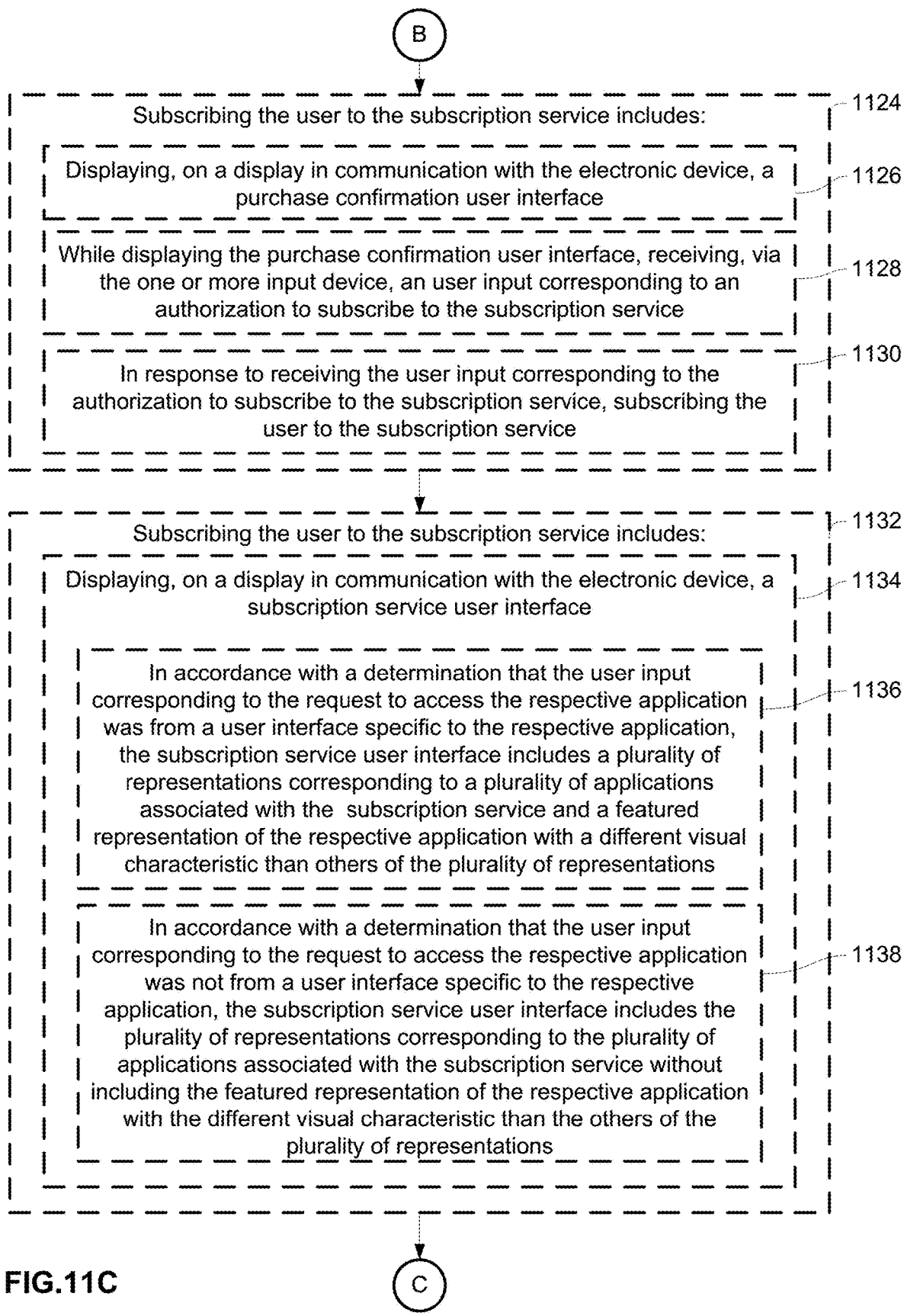
Figure 11D:
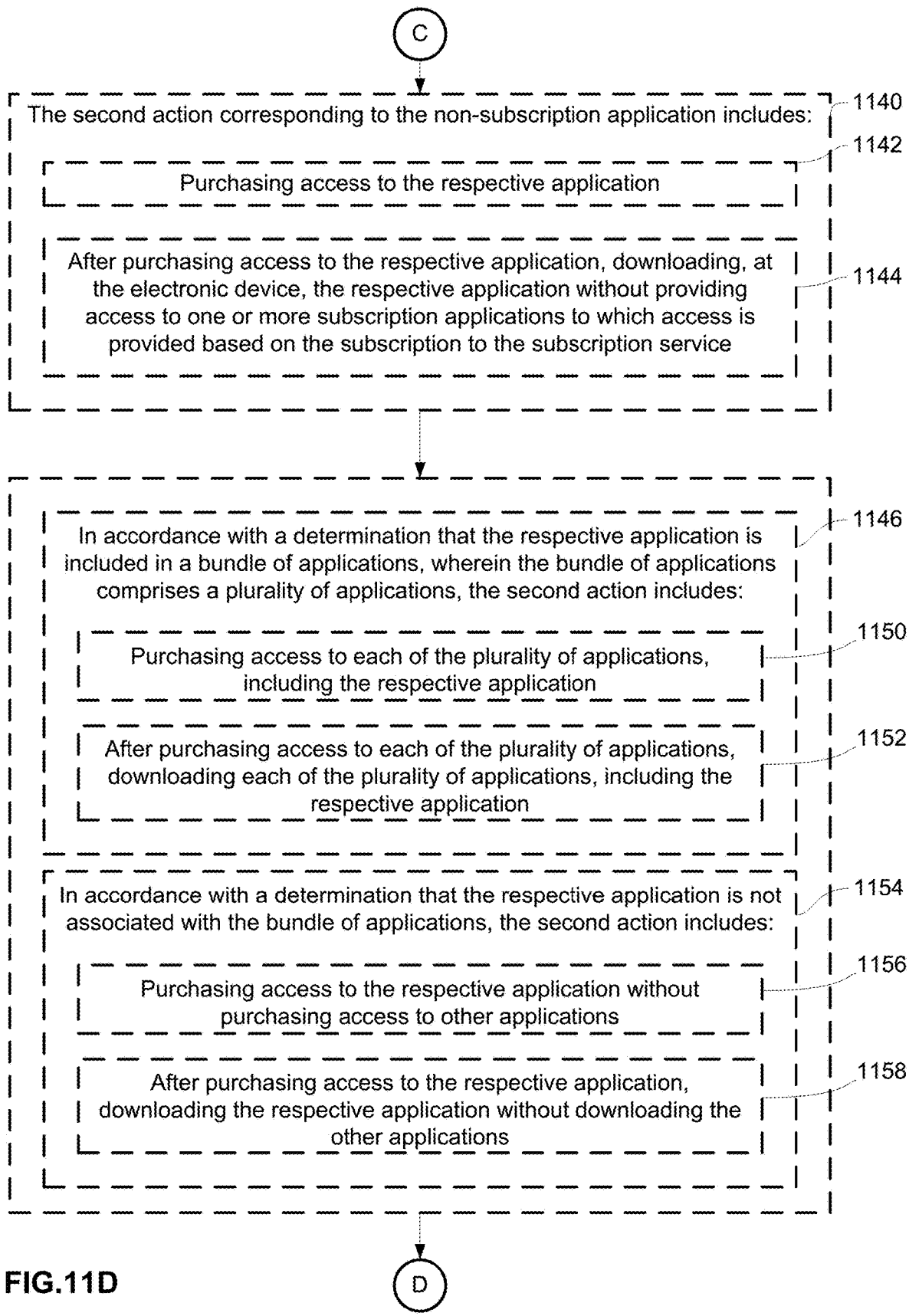
Figure 11E:
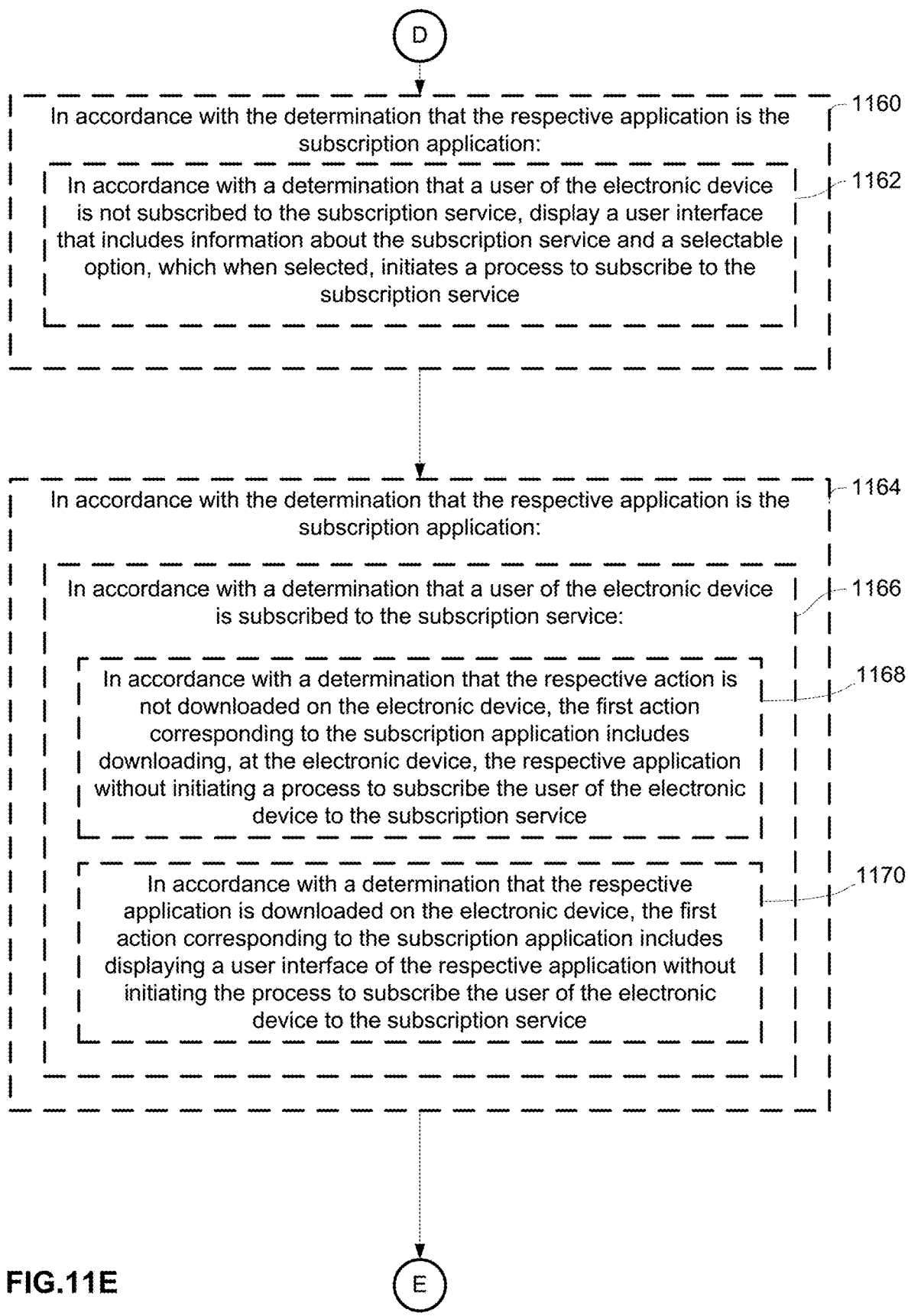
Figure 11F:
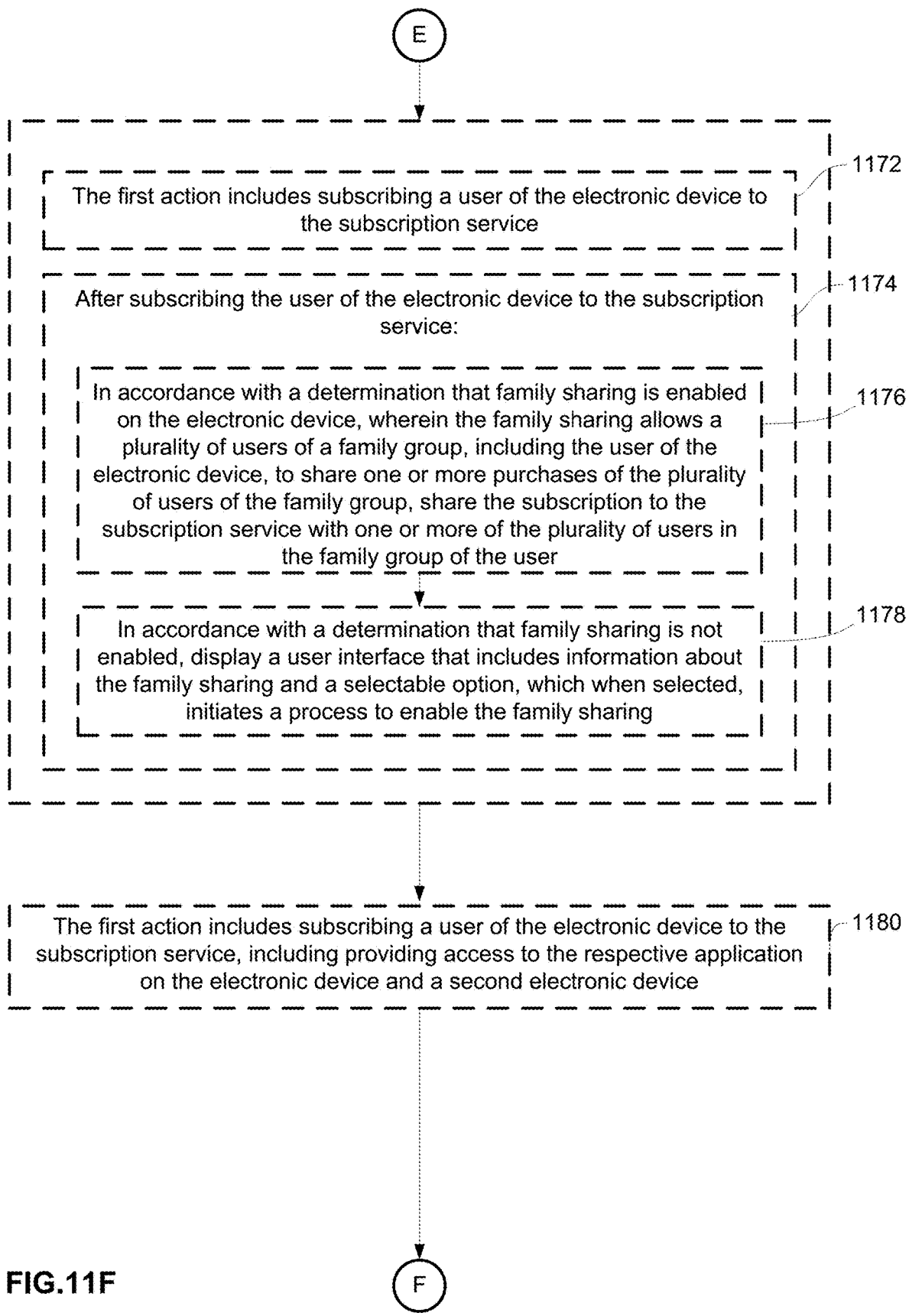
Figure 11G:
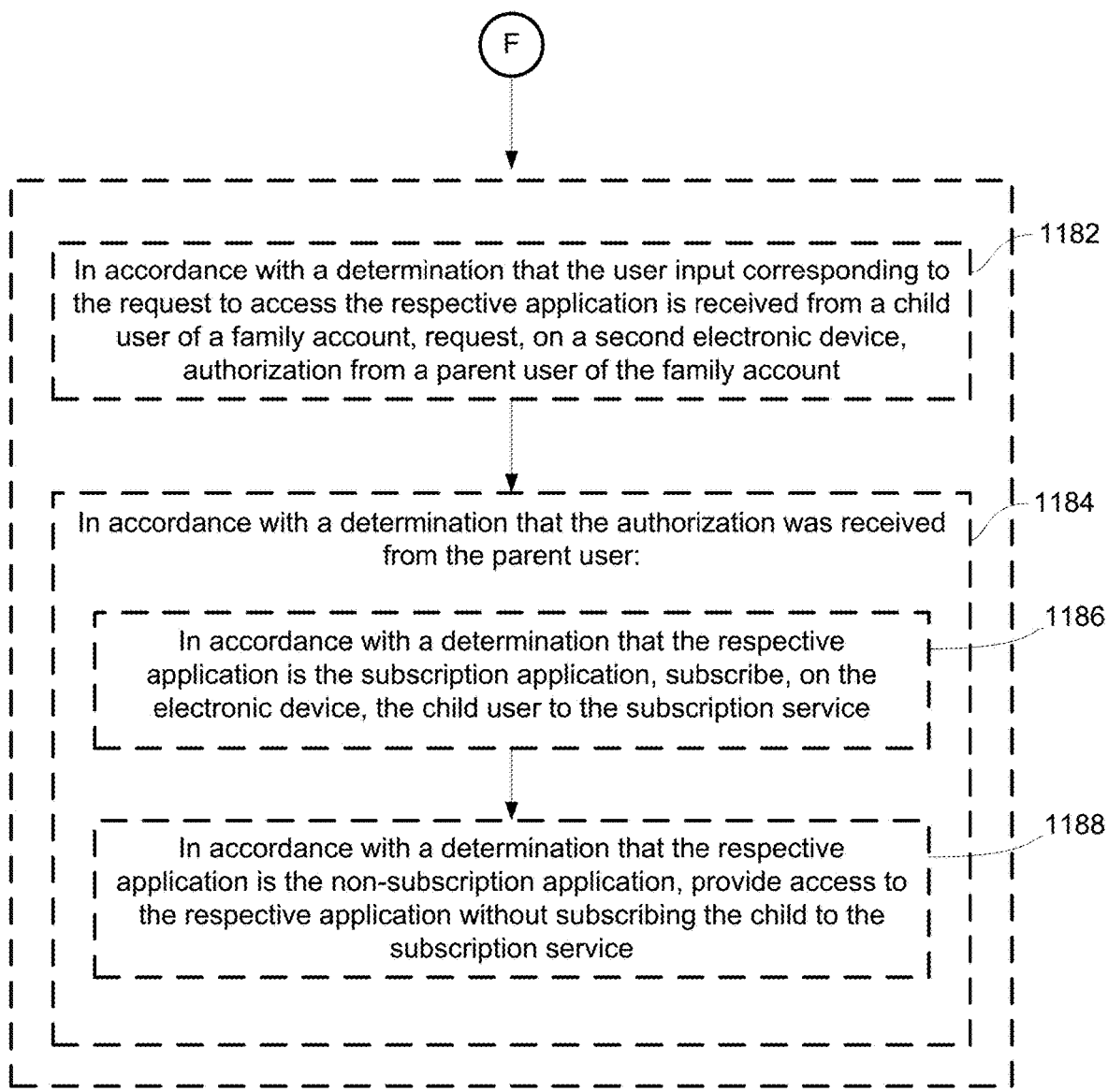

FIG. 10Y-10CC illustrate an exemplary embodiment in which a child of a family group requests approval to subscribe to the subscription service from a parent of the family group. In some embodiments, as shown in FIG. 10Y, device 500 displays user interface 1050 and a user input 1003 from a child selects selectable option 1056 to begin the process for subscribing to the subscription service (e.g., or to start a free trial). In some embodiments, if subscription information user interface 1050 was reached from a particular game's product page (e.g., user interface 1040 corresponding to the game A product page), then the grid 1052 does not include an enlarged icon of the particular game (e.g., compared to grid 1052 described in FIG. 10K). In some embodiments, as shown in FIG. 10Z, in response to the child's selection of selectable option 1056, pop-up 1086 is displayed confirming whether the user (e.g., the child) wants to proceed with requesting permission from the parent. In some embodiments, selection of selectable option 1086 (e.g., button or affordance labeled "ask") confirms that the user wants to ask permission from the parent.

In response to receiving the confirmation, the parent's electronic device is prompted with the request to approve the subscription to the arcade subscription service, as shown in FIG. 10AA. In some embodiments, popup 1090 (e.g., prompt or in some embodiments, a notification) includes selectable option 1094 (e.g., button or affordance labeled "not now") and selectable option 1092 (e.g., button or affordance labeled "review"). In some embodiments, selection of selectable option 1094 causes rejection of the request. In some embodiments, selection of selectable option 1092 causes display of subscription approval user interface 1096 to providing more information about the subscription service, as shown in FIG. 10BB. For example, subscription approval user interface 1096 includes description 1098 including pricing information and the fact that the subscription can be cancelled at any time. In some embodiments, subscription approval user interface 1096 includes selectable option 1097 (e.g., button or affordance labeled "decline") and selectable option 1096 (e.g., button or affordance labeled "approve"). In some embodiments, selection of selectable option 1097 rejects the request to subscribe to the subscription service and selection of selectable option 1096 approves the request and causes display of purchase confirmation card 1004 on the parent's electronic device. In some embodiments, when the parent confirms the purchase, a subscription to the subscription service is granted to the child user. In some embodiments, granting the subscription to the child optionally grants the parent with a subscription as well. In some embodiments, if family sharing is enabled, all members of the family sharing group is also granted the subscription to the subscription service. It is understood that although the request-and-approve process discussed above is discussed with respect to a child requesting access from a parent, the above-described request-and-approve process is not limited to families and can be performed between members of any group (e.g., between a member of a group of users and an administrator of the group of users).

FIGS. 11A-11G are flow diagrams illustrating a method 1100 of providing ways to access subscription and non-subscription applications in accordance with some embodiments. The method 1100 is optionally performed at an electronic device such as device 100, device 300, device 500, device 501, device 510, device 591, and device 480 as described above with reference to FIGS. 1A-1B, 2-3, 4A-4B and 5A-5K. Some operations in method 1100 are, optionally, combined and/or order of some operations is, optionally, changed.

As described below, the method 1100 provides ways to access subscription and non-subscription applications. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with one or more input devices receives (1102), via the one or more input devices, a user input corresponding to a request to access a respective application, such as in FIG. 10D (e.g., a user requesting to purchase, download, launch, or otherwise acquiring access to an application).

In some embodiments, in response to receiving the user input (1104): in accordance with a determination that the respective application is a subscription application, access to which is provided based on a subscription to a subscription service, the electronic device performs (1106) a first action corresponding to the subscription application, such as in FIG. 10K-10M. In some embodiments, the selected application is only available via a subscription service. In some embodiments, having a subscription to the subscription service provides the user with access to one or more applications for a predetermined amount of time (e.g., a monthly unlimited-access subscription). In some embodiments, having a subscription to the subscription services allows the user to launch the respective application a predetermined number of times. In some embodiments, multiple subscription services exist and different subscription services provide access to a different set of applications. In some embodiments, providing the user with access includes allowing the user to download, install, and launch the application. In some embodiments, the first action includes displaying a user interface for the user to subscribe to the subscription service. In some embodiments, the electronic device displays a subscription service splash page. In some embodiments, after the user subscribes to the subscription service, the electronic device downloads and installs the respective application. In some embodiments, after installing the respective application, the electronic device automatically launches the respective application. In some embodiments, instead of downloading and installing the respective application, subscribing to the subscription service causes the electronic device to return to a previously displayed user interface for the respective application and provide the user with a selectable option to download and install the respective application. In some embodiments, if the user reached the subscription service splash page independently of a given application, then subscribing to the subscription purchase causes the electronic device to display a user interface of the applications included in the subscription service that are now accessible to be downloaded and displayed In some embodiments, if the user already has a subscription to the subscription service, the electronic device does not display the user interface for the user to subscribe to the subscription service or the subscription service splash page. In such embodiments, the electronic device optionally verifies that the user is subscribed to the subscription service (e.g., by querying a server) and downloads and installs the requested application. In some embodiments, if the user has a subscription to the subscription service and the requested application is already downloaded and installed on the electronic device, the electronic devices launches the requested application.

In some embodiments, in accordance with a determination that the respective application is a non-subscription application, access to which is not provided based on the subscription to the subscription service, the electronic device performs (1108) a second action, different from the first action, corresponding to the non-subscription application, such as in FIG. 10E-10F. In some embodiments, the respective application is an application that is purchasable for unlimited access on the electronic device. In some embodiments, purchasing the respective application provides the user with unlimited access to the respective application regardless of whether the user has a subscription to the subscription service or not. In some embodiments, purchasing the respective application and downloading and installing the respective application. In some embodiments, a user interface is displayed for confirming purchase of the respective application. In some embodiments, downloading and installing the respective application places an icon on the home screen user interface or the application launching user interface. In some embodiments, if the respective application is already downloaded and installed on the electronic device, the electronic device launches the respective application or otherwise displays the respective application (e.g., if the respective application is already running, for example, as a background process or in standby mode)). In some embodiments, the second action does not include initiating a process to subscribe to the subscription service.

The above-described manner of gaining access to a respective application (e.g., by providing the user with the option to subscribe to a subscription service to download and install the respective application if the respective application is accessible via a subscription service or by purchasing the respective application if the respective application is purchasable without a subscription service) allows the electronic device to provide the user with the ability to access different types of applications (e.g., by automatically determining whether a subscription to a subscription service is required to access the respective application or whether purchase of the respective application is required to access the respective application without requiring the user to separately research or determine whether a respective application is accessible via a subscription or not and navigating to a separate user interface to subscribe to the required subscription service), which simplifies the interaction between the user and the electronic device and enhances the operability of the electronic device and makes the user-device interface more efficient (e.g., by automatically determining the action required to access the respective application and providing the user with the appropriate option), which additionally reduces power usage and improves battery life of the electronic device by enabling the user to use the electronic device more quickly and efficiently while reducing errors in the usage of the device.

In some embodiments, the first action corresponding to the subscription application includes (1110): subscribing a user of the electronic device to the subscription service (1112), such as in FIG. 10M, and downloading, at the electronic device, the respective application (1114), such as in FIG. 10N. In some embodiments, in response to a user input requesting access to a subscription application, the first action includes subscribing the user to the subscription service. In some embodiments, subscribing the user to the subscription service includes providing the user with access to the subscription service for a predetermined period of time (e.g., 1 week, 1 month, 1 year, etc.). In some embodiments, the subscription to the subscription services includes a free trial period and a paid period. In some embodiments, the paid period automatically begins after the free trial and the user can cancel the subscription service at any time. In some embodiments, the first includes downloading and/or installing the requested subscription application onto the electronic device. In some embodiments, downloading and installing occurs after subscribing the user to the subscription service, and without further user input to download and install the application. In some embodiments, the downloaded and installed subscription application can only be launched or otherwise accessed as long as a subscription to the subscription service is valid.

The above-described manner of gaining access to a respective application (e.g., by subscribing to the subscription service and downloading the application onto the electronic device) allows the electronic device to provide the user with the ability to access subscription applications (e.g., by determining whether a subscription is required for the respective application and then subscribing the user to the appropriate subscription service and downloading the respective application without requiring the user to separately research or determine whether the respective application requires a subscription to a subscription service, separately determine which subscription service is required, separately subscribe to the subscription service, and then separately download the respective application), which simplifies the interaction between the user and the electronic device and enhances the operability of the electronic device and makes the user-device interface more efficient (e.g., by automatically determining the action required to access the respective application and performing the required actions to enable the user to access the respective application), which additionally reduces power usage and improves battery life of the electronic device by enabling the user to use the electronic device more quickly and efficiently while reducing errors in the usage of the device.

In some embodiments, in response to subscribing the user of the electronic device to the subscription service, the electronic device provides (1116) access to a plurality of subscription applications including the respective application, such as in FIG. 10R. In some embodiments, subscribing the user to the subscription service provides the user with access to the subscription-based applications that are included in the subscription service. In some embodiments, the subscription-based applications included in the subscription service can only be accessed via the subscription service. In other words, the user must subscribe to the subscription service in order to gain access (e.g., be able to launch, play, or otherwise interact with) to the subscription-based applications. In some embodiments, a given subscription-based application can be associated with multiple subscription services (e.g., access can be achieved by subscribing to any of the subscription services in which the given subscription-based application is included). By contrast, non-subscription-based applications do not require a subscription to a subscription service. In some embodiments, non-subscription-based applications can be purchased such that the user can access the purchased application at any time without a need for a valid subscription to any subscription service. In some embodiments, non-subscription-based applications are not included in any subscription services and subscribing to a subscription service does not provide the user access to the non-subscription-based applications. Similarly, purchasing a non-subscription-based application does not provide the user with access to any subscription-based applications. In some embodiments, applications can be a hybrid style and can be included in a subscription service and can also be purchasable. In such embodiments, when a user purchases a hybrid application, the user receives unlimited access to the hybrid application. However, if the user gains access by subscribing to the subscription service, the user has access to the hybrid application for as long as the subscription to the subscription service is valid. In some embodiments, if the user later purchases access to the hybrid application, the user gains unlimited access to the application (e.g., the game's subscription requirements are lifted).

The above-described manner of gaining access to applications in a subscription service (e.g., by providing access to all of the applications included in a subscription service when the user subscribes to the subscription service) allows the electronic device to provide the user with the ability to access subscription applications (e.g., by automatically granting access to all applications in a subscription service without requiring that the user authenticate or verify his or her subscription each time the user requests access to an application that is included in the subscription service), which simplifies the interaction between the user and the electronic device and enhances the operability of the electronic device and makes the user-device interface more efficient (e.g., by automatically granting access to all applications that are included in the user's subscription service, in response to the user subscribing to the subscription service), which additionally reduces power usage and improves battery life of the electronic device by enabling the user to use the electronic device more quickly and efficiently while reducing errors in the usage of the device.

In some embodiments, while the user of the electronic device is subscribed to the subscription service (e.g., while the user has a current and valid subscription to the subscription service and/or while the user is currently within a free trial period of the subscription service), the electronic device receives (1118), via the one or more input devices, a second user input corresponding to a request to access a second application, such as in FIG. 10R. In some embodiments, the request includes a user requesting to download and install the second application. In some embodiments, the second application is not yet installed on the electronic device. In some embodiments, in response to receiving the second input (1120): in accordance with a determination that the second application is a subscription application, the electronic device downloads (1122), at the electronic device, the second application without initiating a process to subscribe the user of the electronic device to the subscription service, such as in FIG. 10S. In some embodiments, if the user already has a valid subscription to a subscription service and the user requests to download and/or install an application that is included in the subscription service (i.e., a subscription application), then the electronic device will download and/or install the application without requiring that the user subscribe to the subscription service (because the user already has a valid subscription) or otherwise perform any other actions to gain access to the application.

The above-described manner of accessing a subscription application (e.g., by automatically downloading the subscription application if the user already has a subscription to the subscription service without unnecessarily prompting the user to subscribe to the subscription service) allows the electronic device to provide the user with the ability to acquire further subscription applications (e.g., by downloading the application in response to the user's request to access the application without requiring the user to authenticate or verify his or her subscription or manually indicate that the user already has a subscription to the subscription service), which simplifies the interaction between the user and the electronic device and enhances the operability of the electronic device and makes the user-device interface more efficient (e.g., by allowing the user to download the second application if the user already has the proper subscription, without requiring the user to verify his or her subscription), which additionally reduces power usage and improves battery life of the electronic device by enabling the user to use the electronic device more quickly and efficiently while reducing errors in the usage of the device.

In some embodiments, subscribing the user to the subscription service includes (1124): displaying, on a display in communication with the electronic device, a purchase confirmation user interface (1126), such as in FIG. 10L. In some embodiments, the displaying includes displaying a popup or drawer which requires the user to provide one or more user inputs to confirm the user's intent to purchase a subscription to the subscription service. In some embodiments, if the user is requesting access to a free trial of the subscription service, a purchase confirmation user interface is still displayed because upon expiration of the free trial, the user can be automatically charged for the subscription service. In some embodiments, the purchase confirmation user interface provides information regarding what the user is agreeing to, such as that the purchase is for a subscription to the subscription service and the price that is charged to maintain the subscription to the subscription service. In some embodiments, subscribing the user to the subscription service includes while displaying the purchase confirmation user interface, receiving, via the one or more input device, an user input corresponding to an authorization to subscribe to the subscription service (1128), such as in FIG. 10L. In some embodiments, the subscribing includes receiving one or more user inputs, such as a tap on an authorization button, or a double-click on a physical button on the electronic device, to indicate authorization to subscribe to the subscription service. In some embodiments, subscribing the user to the subscription service includes in response to receiving the user input corresponding to the authorization to subscribe to the subscription service, subscribing the user to the subscription service (1130), such as in FIG. 10M. In some embodiments, the subscribing includes after receiving authorization and/or confirmation to subscribe, then subscribing the user to the subscription service. In some embodiments, subscribing the user includes authorizing a charge to the user's selected payment method. In some embodiments, subscribing includes enabling a free trial period for the user.

The above-described manner of confirming purchase of a subscription to a subscription service (e.g., by displaying a purchase confirmation user interface and receiving a confirmation that authorizes the device to subscribe the user to the subscription service) allows the electronic device to provide the user with the ability to confirm the user's intent to subscribe to the subscription service (e.g., by providing a final confirmation page before the user is potentially charged for the transaction), which simplifies the interaction between the user and the electronic device and enhances the operability of the electronic device and makes the user-device interface more efficient (e.g., by providing the user a final opportunity to confirm whether to authorize the transaction and to indicate to the user that a purchase transaction will be initiated upon confirmation), which additionally reduces power usage and improves battery life of the electronic device by enabling the user to use the electronic device more quickly and efficiently while reducing errors in the usage of the device.

In some embodiments, subscribing the user to the subscription service includes (1132): displaying, on a display in communication with the electronic device, a subscription service user interface (1134), such as in FIG. 10K. In some embodiments, the subscribing includes displaying a user interface that provides the user with information regarding the subscription service. In some embodiments, the user interface is a subscription splash page that includes the price of the subscription service and information regarding any potential free trials. In some embodiments, the user interface includes one or more representations of the applications that are accessible via the subscription service. In some embodiments, in accordance with a determination that the user input corresponding to the request to access the respective application was from a user interface specific to the respective application, the subscription service user interface includes a plurality of representations corresponding to a plurality of applications associated with the subscription service and a featured representation of the respective application with a different visual characteristic than others of the plurality of representations (1136), such as in FIG. 10K. In some embodiments, if the user input requesting to subscribe to the subscription service was received from a user interface specific to a given subscription-based application (e.g., such as the user selecting a "subscribe" or similar button on an application landing page and/or an application canonical page), then the subscription service user interface includes an enlarged and/or otherwise visually prioritized icon of the given application. For example, the representation of the given application can be larger than and in the center of the plurality of other representations of other applications. In some embodiments, in accordance with a determination that the user input corresponding to the request to access the respective application was not from a user interface specific to the respective application, the subscription service user interface includes the plurality of representations corresponding to the plurality of applications associated with the subscription service without including the featured representation of the respective application with the different visual characteristic than the others of the plurality of representations (1138), such as in FIG. 10Y. In some embodiments, if the user input requesting to subscribe to the subscriptions service was not received from a user interface specific to a given subscription-based application (e.g., such as the user selecting a "subscribe" or similar button on a user interface from a subscription landing page that is not dedicated to any particular subscription game), then the subscription service user interface does not include an enlarged and/or otherwise visually prioritized icon of any particular application in the same way as when the user subscribed through an application-dedicated user interface. In some embodiments, the subscription service user interface includes a plurality of representations of a plurality of subscription-based applications. In some embodiments, the plurality of subscription-based applications displayed can be a random selection of subscription-based applications in the subscription service or the most popular subscription-based applications in the subscription service. In some embodiments, any of the subscription-based applications in the subscription service can be displayed in the subscription service user interface including, in some embodiments, the respective application.

The above-described manner of providing information on the subscription service (e.g., by displaying a subscription service user interface which includes pricing information and icons of some of the applications that are included in the subscription service including, if the user navigated to the subscription service user interface from a respective application's application-specific page, a prioritized icon of a respective application) allows the electronic device to provide the user with information about the subscription and for the user to confirm that the application in which the user is interested is included in the subscription (e.g., by displaying a prioritized icon of the respective application so the user can verify that the respective application is indeed included in the subscription service, without requiring the user to navigate to a separate user interface, thus interrupting the subscription process, or perform separate research to verify that the subscription service includes access to the respective application), which simplifies the interaction between the user and the electronic device and enhances the operability of the electronic device and makes the user-device interface more efficient (e.g., by providing the user with a single interface in which the user can understand the pricing of the subscription service and the applications that are included in the subscription service), which additionally reduces power usage and improves battery life of the electronic device by enabling the user to use the electronic device more quickly and efficiently while reducing errors in the usage of the device.

In some embodiments, the second action corresponding to the non-subscription application includes (1140): purchasing access to the respective application (1142), such as in FIG. 10E. In some embodiments, if the respective application is not a subscription-based application, then in response to the user requesting access to the application (e.g., purchasing the application), the electronic device purchases the respective application. In some embodiments, after purchasing access to the respective application, the second action includes downloading, at the electronic device, the respective application without providing access to one or more subscription applications to which access is provided based on the subscription to the subscription service (1144), such as in FIG. 10F. In some embodiments, the second action includes downloading and installing the requested non-subscription application onto the electronic device. In some embodiments, the downloaded and installed non-subscription application can be launched or otherwise accessed at any time without regard to whether the user has a subscription to a subscription service.

The above-described manner of acquiring a non-subscription application (e.g., purchasing access to the respective application and downloading and/or installing the respective application after purchasing access) allows the electronic device to provide the user a method of acquiring applications (e.g., by determining that the respective application is not a subscription application and does not require a subscription to a subscription service and thus purchasing and downloading the application without requiring that the user subscribe to the subscription purpose), which simplifies the interaction between the user and the electronic device and enhances the operability of the electronic device and makes the user-device interface more efficient (e.g., by providing the user with a method of acquiring a non-subscription application without requiring that the user separately research and confirm that the respective application and without requiring the user to subscribe to a subscription service which is unnecessary for acquiring access to the respective application), which additionally reduces power usage and improves battery life of the electronic device by enabling the user to use the electronic device more quickly and efficiently while reducing errors in the usage of the device.

In some embodiments, in accordance with a determination that the respective application is included in a bundle of applications, wherein the bundle of applications comprises a plurality of applications (e.g., the user's request to access the respective application was a request to purchase a bundle of non-subscription applications.), the second action includes (1146): purchasing access to each of the plurality of applications, including the respective application (1150), such as in FIG. 10E. In some embodiments, if the user requests to purchase a bundle of non-subscription applications, then the electronic device purchases the entire bundle of non-subscription applications. In some embodiments, purchasing the bundle of application includes acquiring access to every application in the bundle via a single purchase transaction. In some embodiments, the second action includes after purchasing access to each of the plurality of applications, downloading each of the plurality of applications, including the respective application (1152), such as in FIG. 10F. In some embodiments, the second action includes downloading and installing each of the applications included in the bundle. In some embodiments, the downloaded and installed can be launched or otherwise accessed at any time in response to the user requesting to launch the applications, and without regard to whether the user has a subscription to a subscription service. By contrast, a subscription service can include a plurality of applications, access to all of which is granted via a single purchase transaction (e.g., subscribing to the subscription service), but subscribing to the subscription service (e.g., purchasing access) does not cause each application in the subscription service to be downloaded and/or installed. In some embodiments, subscribing to the subscription service causes a particular selected game to be downloaded and installed (e.g., if the subscription resulted from a user requesting access to a particular game) or causes no games to be downloaded and installed (e.g., if the user subscribed to the subscription service via a process that is not dedicated to a particular subscription game). In some embodiments, in accordance with a determination that the respective application is not associated with the bundle of applications, the second action includes (1154): purchasing access to the respective application without purchasing access to other applications (1156), such as in FIG. 10E. In some embodiments, the application is not included in a bundle of applications and the user is not requesting to purchase the entire bundle or the user is requesting to purchase only the respective application but not the entire bundle (regardless of whether the respective application is included in a bundle of applications). In some embodiments, if the user only requested to purchase access to a single application and not to a bundle of applications, the electronic device only purchases access to the requested application. In some embodiments, the second action includes after purchasing access to the respective application, downloading the respective application without downloading the other applications (1158), such as in FIG. 10F. In some embodiments, the action includes downloading and/or installing the respective application onto the electronic device. In some embodiments, the downloaded and/or installed application can be launched or accessed by the user any time the user requests access regardless of whether the user has a subscription to the subscription service.

The above-described manner of acquiring a bundle of non-subscription applications (e.g., by determining whether the non-subscription application is a part of a bundle and purchasing and downloading each application in the bundle if it is part of a bundle, and only downloading the non-subscription application if it isn't a part of a bundle) allows the electronic device to provide the user a method of acquiring a bundle of applications (e.g., by automatically determining whether the respective application is included in a bundle of applications and automatically downloading the entire bundle without requiring the user to navigate to separate user interfaces for each application included in the bundle to manually download all the applications in the bundle), which simplifies the interaction between the user and the electronic device and enhances the operability of the electronic device and makes the user-device interface more efficient (e.g., by automatically downloading all applications in a bundle for the user if the user is purchasing access to a bundle or an application that is part of a bundle without requiring the user to separately determine what applications are included in the bundle and separately manually download each application), which additionally reduces power usage and improves battery life of the electronic device by enabling the user to use the electronic device more quickly and efficiently while reducing errors in the usage of the device.

In some embodiments, in accordance with the determination that the respective application is the subscription application (1160): in accordance with a determination that a user of the electronic device is not subscribed to the subscription service, the electronic device displays (1162) a user interface that includes information about the subscription service and a selectable option, which when selected, initiates a process to subscribe to the subscription service, such as in FIG. 10K. In some embodiments, the electronic device displays a subscription information splash page. In some embodiments, the subscription information splash page provides pricing information for the subscription service. In some embodiments, the subscription information splash page provides information on what is included in the subscription service. In some embodiments, the subscription information splash page includes an option for the user to continue and/or begin the process of subscribing to the subscription service (e.g., a confirm button). In some embodiments, the subscription information splash page includes an option for the user to cancel the process or opt not to begin the process of subscribing to the subscription service (e.g., a cancel or back button).

The above-described manner of providing information on the subscription service (e.g., by displaying a subscription service user interface which includes pricing information and a button for the user to confirm that the user desires to begin the process of subscribing to the subscription service) allows the electronic device to provide the user with information about the subscription (e.g., by displaying a single user interface in which information about the subscription service is located), which simplifies the interaction between the user and the electronic device and enhances the operability of the electronic device and makes the user-device interface more efficient (e.g., by providing the information to the user in a single user interface along with an option to begin the process of subscribing, without requiring the user to navigate to a separate user interface to receive information about the subscription service and a separate user interface to begin the process of subscribing to the user interface), which additionally reduces power usage and improves battery life of the electronic device by enabling the user to use the electronic device more quickly and efficiently.

In some embodiments, in accordance with the determination that the respective application is the subscription application (1164): in accordance with a determination that a user of the electronic device is subscribed to the subscription service (1166): in accordance with a determination that the respective action is not downloaded on the electronic device, the first action corresponding to the subscription application includes downloading, at the electronic device, the respective application without initiating a process to subscribe the user of the electronic device to the subscription service (1168), such as in FIG. 10S. In some embodiments, if the user already has a valid subscription to a subscription service and the user requests to download and/or install an application that is included in the subscription service, then the electronic device will download and install the application without requiring that the user subscribe to the subscription service (because the user already has a valid subscription) or otherwise perform any other actions to gain access to the application. In some embodiments, in accordance with a determination that the respective application is downloaded on the electronic device, the first action corresponding to the subscription application includes displaying a user interface of the respective application without initiating the process to subscribe the user of the electronic device to the subscription service (1170). In some embodiments, if the user already has a valid subscription to a subscription service and the user requests access to an application that is included in the subscription service and the application is already downloaded and installed on the application, then the electronic device launches the application without requiring that the user subscribe to the subscription service or download and install the application (because the user already has a valid subscription and the application is already downloaded and installed onto the electronic device). In some embodiments, after downloading and installing the respective application, the user interface for requesting access to the respective application updates to indicate that the respective application is already downloaded and installed and requesting access will cause the respective application to launch. For example, in an application store user interface, a canonical page for the respective application has a selectable option labeled as "Play" rather than "Get".

The above-described manner of downloading and launching a subscription application (e.g., by automatically downloading the application if the user already has a subscription to the subscription service and the application is not yet downloaded on the device or by launching the application if the user already has a subscription to the subscription service and the application is already downloaded and installed on the device) allows the electronic device to provide the user with information about the subscription (e.g., by automatically determining whether the user needs to first download an application and if so, downloading the application, and if not, launching the application), which simplifies the interaction between the user and the electronic device and enhances the operability of the electronic device and makes the user-device interface more efficient (e.g., by performing the proper action in response to the user's request to launch or acquire the application without requiring the user to navigate to a separate user interface to download the application and a separate user interface to launch the application), which additionally reduces power usage and improves battery life of the electronic device by enabling the user to use the electronic device more quickly and efficiently.

In some embodiments, the first action includes subscribing a user of the electronic device to the subscription service (1172), such as in FIG. 10M. In some embodiments, after subscribing the user of the electronic device to the subscription service (1174): in accordance with a determination that family sharing is enabled on the electronic device, wherein the family sharing allows a plurality of users of a family group, including the user of the electronic device, to share one or more purchases of the plurality of users of the family group, the electronic device shares (1176) the subscription to the subscription service with one or more of the plurality of users in the family group of the user, such as in FIG. 10M. In some embodiments, family sharing is a feature in which a member of the family group can share his or her purchases to the other members of the family group. In some embodiments, this allows other members of the family group to have access to the purchased item. In some embodiments, an administrator of the family group can set or control what can or cannot be shared with the family group. In some embodiments, individual members of the family group can set or control what can or cannot be shared with the family group. It is understood that although this feature is described as family sharing, the features described are applicable to any type of multiple-user or group sharing mechanism or feature and is not limited to only families. In some embodiments, if family sharing is enabled and if the user participates in the family sharing feature, then the purchase of the subscription service (e.g., subscribing to the subscription service) is also shared with the other members of the family group. In other words, the members of the family group that receive the shared subscription will also have access to subscription applications as if the respective member has a subscription himself/herself In some embodiments, as described above, some members of the family group may be disabled from receiving sharing of the subscription. In some embodiments, the user of the electronic device, who subscribed to the subscription service, can choose who in the family group to share the subscription with. In some embodiments, in accordance with a determination that family sharing is not enabled, the electronic device displays (1178) a user interface that includes information about the family sharing and a selectable option, which when selected, initiates a process to enable the family sharing, such as in FIG. 10M. In some embodiments, the electronic device displays a splash page describing the aspects of the family sharing feature. In some embodiments, the splash page has a selectable option to set up family sharing and to share the subscription with a family group. In some embodiments, the splash page has a selectable option to not set up family sharing.

The above-described manner of sharing the subscription via family sharing (e.g., by automatically sharing the subscription if family sharing is already enabled or by providing the user with an option to enable family sharing if family sharing is not enabled) allows the electronic device to provide the user the ability to share the subscription with the user's family (e.g., by automatically sharing the subscription to the family if family sharing is enabled or by providing the user with the option to set up family sharing to share the subscription if family sharing is not yet enabled.), which simplifies the interaction between the user and the electronic device and enhances the operability of the electronic device and makes the user-device interface more efficient (e.g., by only providing the option to set up and enable family sharing if the user has not already enabled family sharing, but automatically sharing the subscription if the user has already enabled family sharing, without requiring the user to navigate to separate user interfaces to share the subscription and to enable family sharing), which additionally reduces power usage and improves battery life of the electronic device by enabling the user to use the electronic device more quickly and efficiently.

In some embodiments, the first action includes subscribing a user of the electronic device to the subscription service, including providing access to the respective application on the electronic device and a second electronic device (1180), such as in FIG. 10X. In some embodiments, subscribing to a subscription service provides the user with access to the subscription service on any or all of the devices on which the user has registered. For example, if the user of the electronic device also has a tablet device or a laptop device and has registered his or her account on the tablet device or laptop device, then the user also receives access to the subscription service on the tablet device and/or laptop device. In some embodiments, not all applications in the subscription service are compatible with all types of devices. In such embodiments, the applications that are not compatible with a respective device may not be available to download and/or install on the respective device.

The above-described manner of providing access on multiple devices (e.g., by providing access to any or all devices on which the user has an account or is registered) allows the electronic device to provide the user the ability to use the subscription across the user's different devices (e.g., by automatically sharing the subscription to the subscription service across any or all devices that support access to the subscription service), which simplifies the interaction between the user and the electronic device and enhances the operability of the electronic device and makes the user-device interface more efficient (e.g., by automatically enabling access to the subscription on all of the user's devices without requiring that the user separately verify, validate, or add the user's subscription on each of the user's devices), which additionally reduces power usage and improves battery life of the electronic device by enabling the user to use the electronic device more quickly and efficiently.

In some embodiments, in accordance with a determination that the user input corresponding to the request to access the respective application is received from a child user of a family account, the electronic device requests (1182), on a second electronic device, authorization from a parent user of the family account, such as in FIG. 10AA. In some embodiments, if a child, while using the child's user account on the child's electronic device, attempts to make a purchase, including subscribing to a subscription service (e.g., for which there is a monthly payment plan), then a notification is sent to a parent (e.g., to the parent's electronic device on which the parent is logged into the parent's user account) to authorize the purchase and/or subscription. In some embodiments, the child user account and parent user account are registered or otherwise set within a family account or family group as a child and parent, respectively. It is understood that although a child and parent is described as requesting authorization and providing authorization, respectively, this feature is not limited to only families and the requestor can be any member of any group of users without the authority to authorize transactions and/or purchases and the authorizer can be any other member of the group of users with authority to authorize transactions and/or purchases. In some embodiments, the notification is provided to a second electronic device belonging to the parent user (or on which the parent user has logged into). In some embodiments, the notification can be provided on the same electronic device as the child user, but requires a further that the authorization is being provided by a parent user (e.g., requesting and receiving the passcode or pin of the parent user). In some embodiments, in accordance with a determination that the authorization was received from the parent user (1184), such as in FIG.

10BB (e.g., providing a notification to the parent user on the same or another electronic device and receiving an input from the parent user authorizing or otherwise approving the transaction.): in accordance with a determination that the respective application is the subscription application, the other electronic device subscribes (1186), on the electronic device, the child user to the subscription service, such as in FIG. 10CC. In some embodiments, if the request from the child user was to subscribe to a subscription service, then approval of the transaction will cause the child user to subscribe to the subscription service and receive access to the subscription applications included in the subscription service. In some embodiments, if family sharing is enabled, approval also provides access to the parent user. In some embodiments, if the parent user denies the request, forgo subscribing the child user to the subscription service. In some embodiments, a notification is provided to the child user that the request has been denied. In some embodiments, in accordance with a determination that the respective application is the non-subscription application, the electronic device provides (1188) access to the respective application without subscribing the child to the subscription service, such as in FIG. 10CC. In some embodiments, if the request from the child user was to purchase a non-subscription application, then approval of the transaction will purchase the application and cause downloading and/or installing of the application onto the child user's electronic device. In some embodiments, instead of downloading and/or installing the application onto the child user's device, a notification is provided to the child user that approval has been given by the parent user and download and installing of the application is now enabled. In some embodiments, if family sharing is enabled, approval also provides access to the parent user. In such embodiments, the application can be downloaded and/or installed onto the parent user's electronic device. In some embodiments, if the parent user denies the request, forgo purchasing or otherwise providing access to the application to the child user. In some embodiments, a notification is provided to the child user that the request has been denied.).

The above-described manner of requesting approval to access an application (e.g., by providing a notification to a parent of the request to access an application when a child requests access, and upon approval of the request, subscribing to the subscription service if the request was for access of a subscription application and providing access without subscribing if the access was for a non-subscription application) allows the electronic device to provide the user the ability to review and approve access to subscription and non-subscription applications (e.g., by automatically determining whether the request was to access a subscription or non-subscription application and subscribing to the subscription service if the subscription is required and not subscribing if the subscription is not required), which simplifies the interaction between the user and the electronic device and enhances the operability of the electronic device and makes the user-device interface more efficient (e.g., by automatically determining whether a subscription is required and acting appropriately to provide access to the requested application without requiring the user to perform separate research to determine whether a subscription is required or to navigate to a separate user interface to approve access via a subscription to a subscription), which additionally reduces power usage and improves battery life of the electronic device by enabling the user to use the electronic device more quickly and efficiently.

It should be understood that the particular order in which the operations in FIGS. 11A-11G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300, 1500, 1700, and 1900) are also applicable in an analogous manner to method 1100 described above. For example, the operation of the electronic device accessing a respective category of applications described above with reference to method 1100 optionally has one or more of the characteristics of the presentation of user interfaces of an application store that are specific to a respective application, user interfaces of an application store that include information about a respective category of applications, visual indications of the number of available updates, user interfaces of an electronic device for launching and removing a respective application, user interfaces of a generic application store and a dedicated application store for a respective category of applications, notifications of the completion of a download, etc., described herein with reference to other methods described herein (e.g., methods 700, 900, 1300, 1500, 1700, and 1900). Furthermore, the application store(s) described with reference to method 1100 above optionally has one or more of the features of the application store(s) described with reference to methods 700, 900, 1300, 1500, 1700, and 1900. For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5K) or application specific chips. Further, the operations described above with reference to FIGS. 11A-11G are, optionally, implemented by components depicted in FIGS. 1A-1B. For example, displaying operations 1126, 1134, 1162, and 1178, receiving operations 1102, 1118, 1130, and 1184, and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Visual Indications of Available Updates

Users interact with electronic devices in many different manners, including using an electronic device to download updates of one or more applications on the electronic device. In some embodiments, an electronic device is able to indicate to the user the number of download updates that are available. The embodiments described below provide ways in which an electronic device presents a visual indication of a number of download updates in an application store user interface. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 12A-12D illustrate exemplary ways in which an electronic device presents a visual indication of a number of application updates that are available in an application store user interface in accordance with some embodiments. The embodiments in these figures are used to illustrate the processes described below, including the processes described with reference to FIGS. 13A-13C.

Figure 12A:
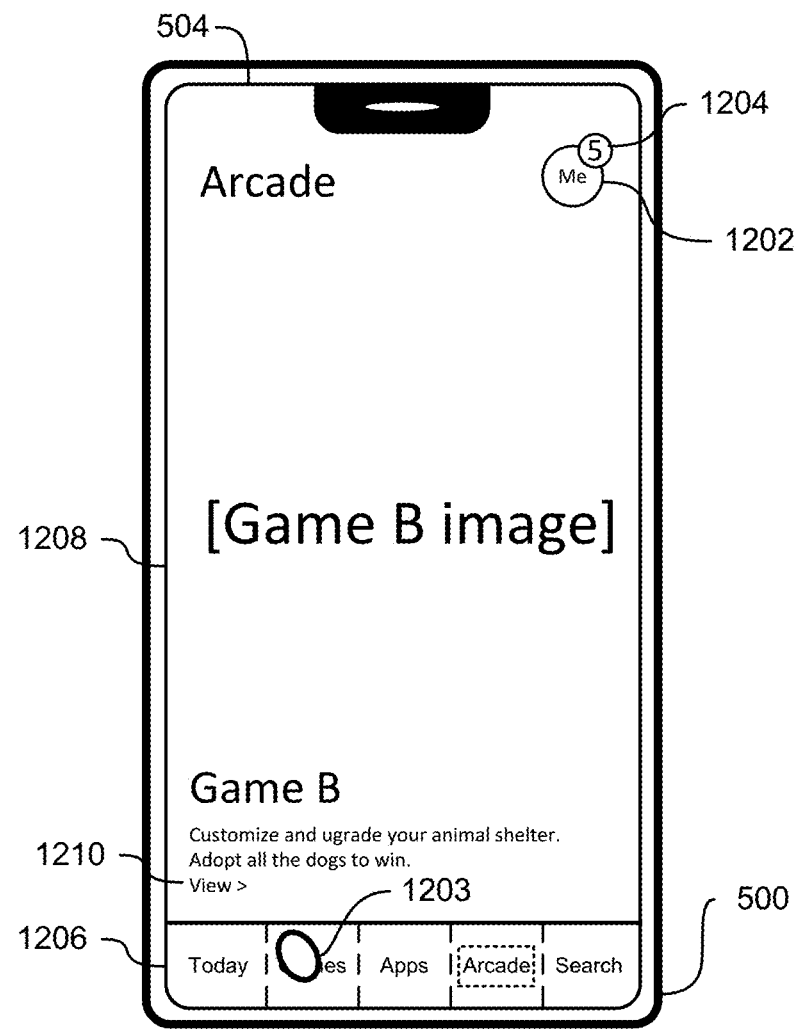
FIGS. 12A-12D illustrate exemplary ways in which an electronic device presents a visual indication of a number of application updates that are available in an application store user interface in accordance with some embodiments.

FIG. 12A illustrates a subscription application user interface. The electronic device presents the subscription application user interface in accordance with method 900. The user interface includes an image 1208 representing a subscription application with information about the application overlaid on the image 1208, including a selectable option 1210 to present a product page user interface of the subscription application in accordance with method 700. The user interface further includes a representation 1202 of a user account that includes a badge 1204 that indicates a number of available updates, including updates to subscription applications and non-subscription applications. As shown in FIG. 12A, the user selects (e.g., with contact 1203) a tab representing a non-subscription application user interface ("Games") in the navigation bar 1206. In response to the user's selection, the electronic device 500 presents the non-subscription application user interface, as shown in FIG. 12B.

Figure 12B:
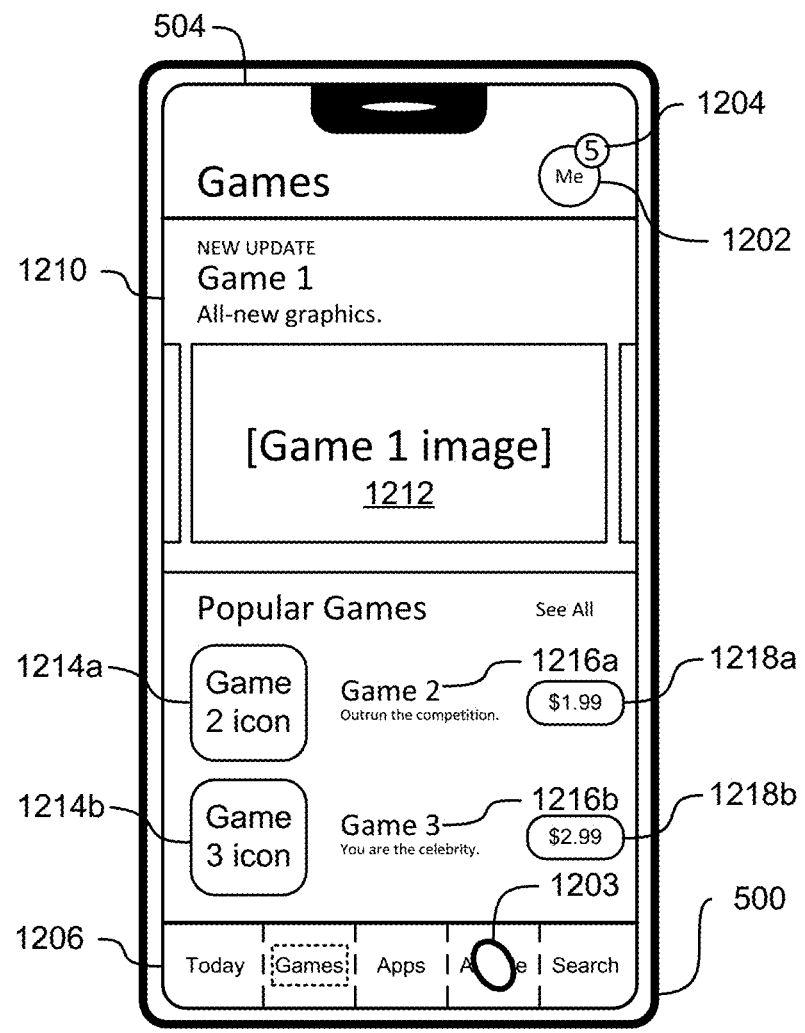

FIG. 12B illustrates a non-subscription application user interface. The user interface includes the representation 1202 of the user account and updates badge 1204, an image 1212 representing a non-subscription application, a plurality of icons 1214a-b representing non-subscription applications and selectable options 1218a-b that, when selected, cause the electronic device 500 to purchase and download the respective applications with which the selected option is associated. Thus, the user account badge 1202 and updates badge 1204 are presented in both the subscription application user interface and the non-subscription application user interface. As shown in FIG. 12B, the user selects (e.g., with contact 1203) the tab (e.g., "Arcade") to navigate to the subscription application user interface in the navigation bar 1206.

Figure 12C:
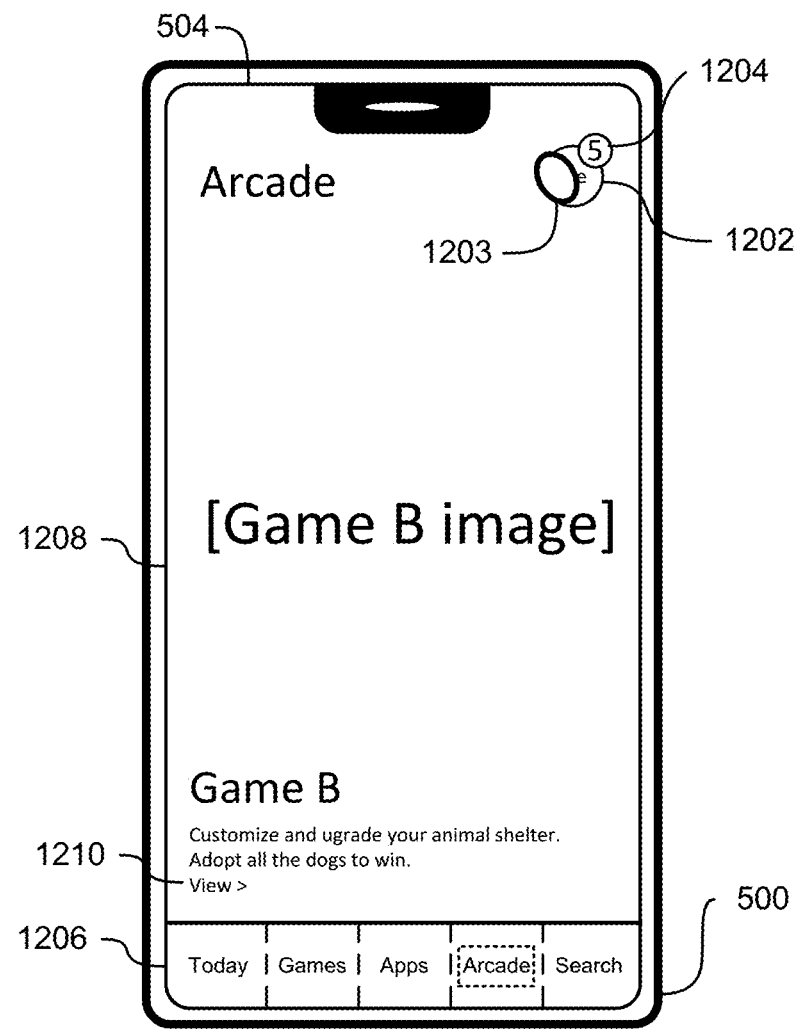

In response to the user's selection in FIG. 12B, the electronic device presents the subscription application user interface of the application store, as shown in FIG. 12C, and as described above with reference to FIG. 12A. As shown in FIG. 12C, the user selects (e.g., with contact 1203) the indication 1202 of the user account. In response to the user's selection, the electronic device 500 presents a user account user interface illustrated in FIG. 12D.

Figure 12D:
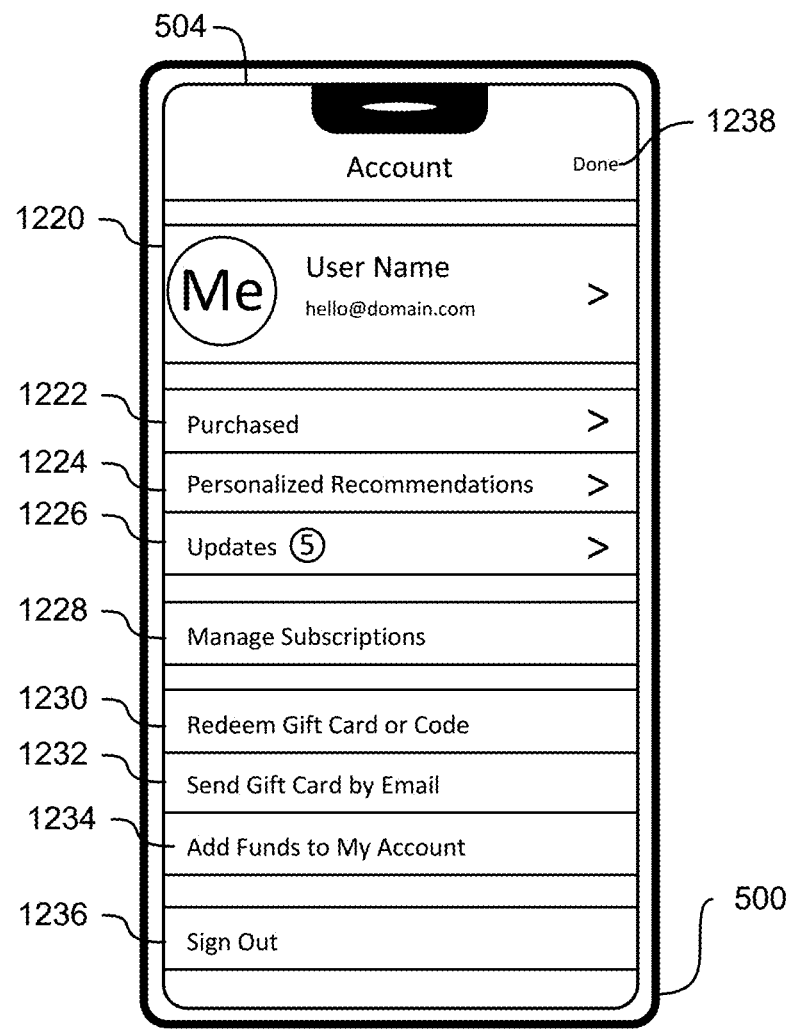

As shown in FIG. 12D, the user account user interface includes a selectable option 1220 for viewing user account settings, a selectable option 1222 for viewing purchased applications, a selectable option 1224 for viewing personalized recommendations, a selectable option 1226 for viewing available updates, a selectable option 1228 for managing subscriptions, a selectable option for redeeming a gift card or code, a selectable option 1232 for sending a gift card by email, a selectable option 1234 for adding funds to the user account, a selectable option 1236 for signing out of the user account, and a selectable option 1238 for navigating backward in the user interface.

The selectable option 1226 for viewing available updates causes the electronic device 500 to present a user interface including information about available updates in response to detecting selection of the option. The user interface includes a plurality of representations of applications—including subscription and non-subscription applications—for which updates are available, each with a selectable option to download the update. The user interface optionally further includes a selectable option to update all applications that have an available update. As shown in FIG. 12D, the selectable option 1226 is presented with a badge that indicates the number of available updates. The number on the badge matches the number on updates badge 1204 illustrated in FIGS. 12A-C.

Figure 13B:
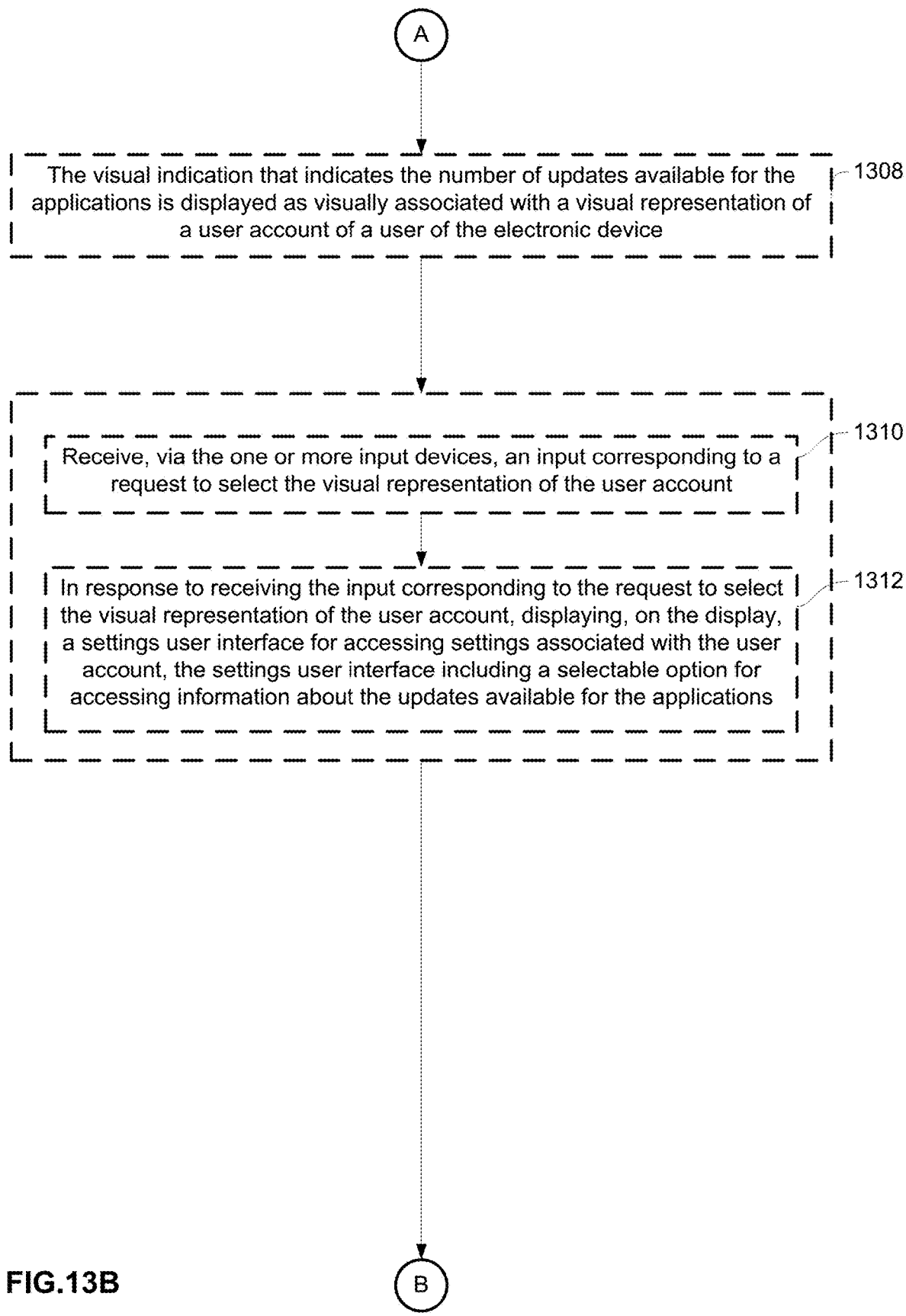
Figure 13C:
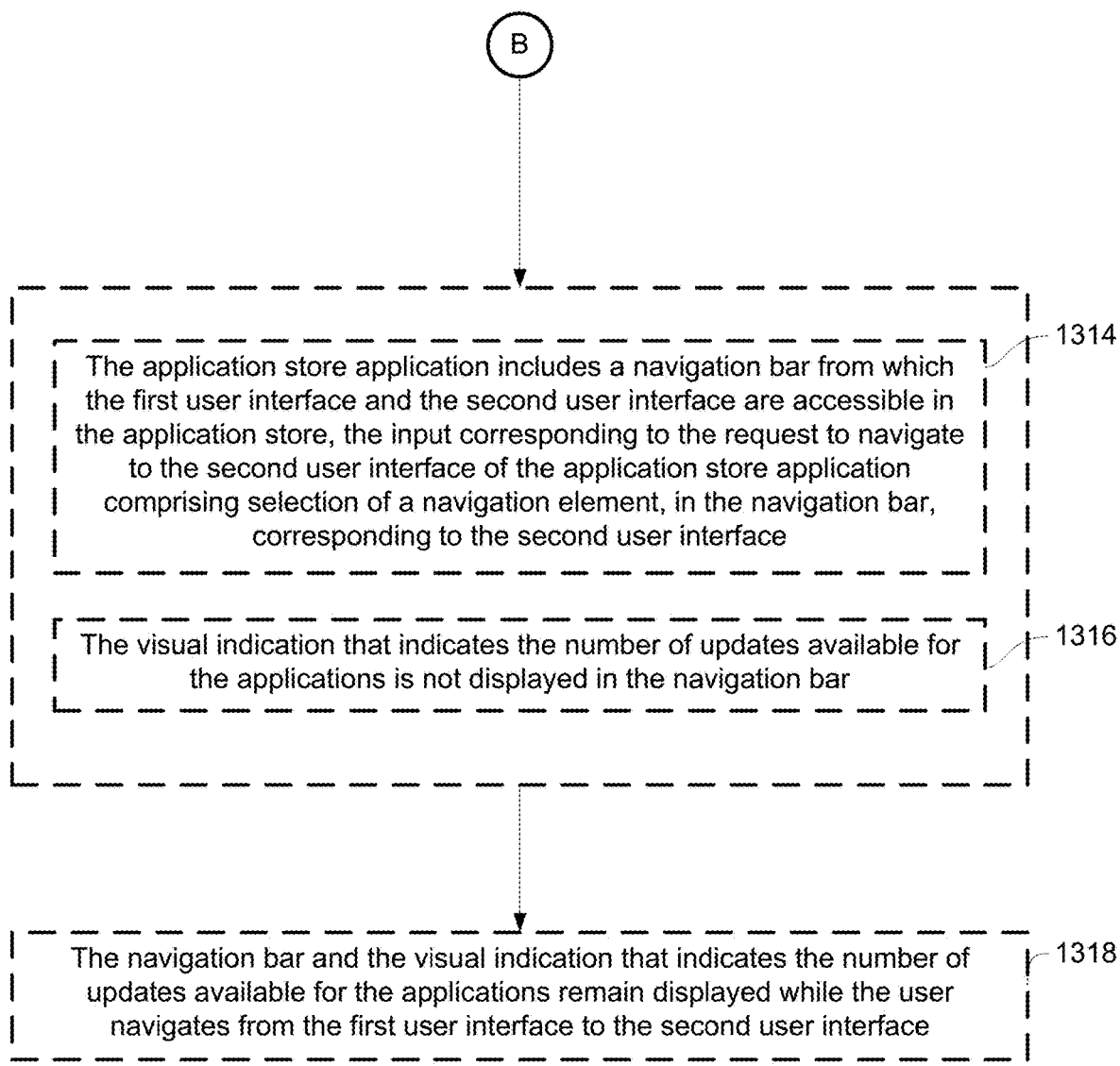

FIGS. 13A-13C are flow diagrams illustrating a method 1300 of presenting a visual indication of a number of application updates that are available in an application store user interface in accordance with some embodiments. The method 1300 is optionally performed at an electronic device such as device 100, device 300, device 500, device 501, device 510, and device 591 as described above with reference to FIGS. 1A-1B, 2-3, 4A-4B and 5A-5J. Some operations in method 1300 are, optionally combined and/or order of some operations is, optionally, changed.

As described below, the method 1300 provides ways to present a visual indication of a number of available download updates in an application store user interface. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display 504 and one or more input devices displays (1302), on the display, a first user interface of an application store application, wherein the first user interface is a user interface including content related to applications in a first category of applications, and the first user interface includes a visual indication 1204 that indicates a number of updates available for applications, including applications in the first category and applications in a second category of applications, different than the first category, on the electronic device, such as in FIG. 12A. In some embodiments, the content includes representations of applications in the first category, product pages of applications in the first category, marketing content (e.g., articles, videos, images, etc.) related to applications in the first category. In some embodiments, the visual indication includes an indication of the total number of applications in the first category, second category, and any other categories for which an update is available to be downloaded to the electronic device.

In some embodiments, such as in FIG. 12A, while displaying the first user interface, the electronic device 500 receives (1304), via the one or more input devices, an input corresponding to a request to navigate to a second user interface of the application store application, such as selection (e.g., with contact 1203) of the "Games" tab in navigation region 1206, wherein the second user interface is a user interface including content related to applications in the second category of applications. In some embodiments, the input includes selection of a navigation element, such as a tab or menu item. In some embodiments, the content includes representations of applications in the second category, product pages of applications in the second category, marketing content (e.g., articles, videos, images, etc.) related to applications in the second category.

In some embodiments, such as in FIG. 12B, in response to receiving the input, the electronic device 500 displays (1306), on the display, the second user interface, wherein the second user interface includes the visual indication 1204 that indicates the number of updates available for the applications, including applications in the first category and applications in the second category, on the electronic device. As an example, while displaying a user interface including content related to non-subscription applications, the electronic device receives a request to display a user interface including content related to subscription applications. The indication of the total number of updates of both subscription and non-subscription applications is optionally presented in both the non-subscription applications user interface and the subscription applications user interface. In some embodiments, the indication of the number of updates available is presented in a region of the user interface that is different from a region of the user interface in which one or more navigation elements (e.g., tabs, menu items, etc.) are presented, and which are used to navigate to the first user interface and/or the second user interface in the application store application. In some embodiments, the indication is presented as a badge overlaid on a selectable option that, when selected, causes the electronic device to display a user interface that includes user profile settings in addition to other indications and settings, such as a selectable option that, when selected, causes the electronic device to present a list of available application updates. The indication is optionally presented in the same region of the first user interface as it is in the second user interface.

The above-described manner of presenting an indication of the number of available updates in both the user interface for applications in the first category and in the user interface for applications in the second category allows the electronic device to present information relevant to both the first category of applications and the second category of applications in both the first and second user interfaces, which simplifies the interaction between the user and the electronic device and enhances the operability of the electronic device and makes the user-device interface more efficient (e.g., by presenting the number of updates in both the first and the second user interfaces without requiring a user input to access the number of updates), which additionally reduces power usage and improves battery life of the electronic device by enabling the user to use the electronic device more quickly and efficiently while reducing errors in the usage of the device.

In some embodiments, such as in FIG. 12A the visual indication 1204 that indicates the number of updates available for the applications is displayed as visually associated with a visual representation 1202 of a user account of a user of the electronic device 500 (1308). In some embodiments, the visual indication includes a user-selected icon that represents the user account, such as a picture, photo, or the user's initials or some other text string that includes a badge indicating the number of available updates overlaid on the icon that represents the user account.

The above-described manner of presenting the visual indication of the number of updates on the visual representation of the user account allows the electronic device to combine the visual indications of the number of updates and the user account, which simplifies the interaction between the user and the electronic device and enhances the operability of the electronic device and makes the user-device interface more efficient (e.g., by conserving display area to include more information about applications or more navigation tabs without requiring a user input to scroll to reveal additional content), which additionally reduces power usage and improves battery life of the electronic device by enabling the user to use the electronic device more quickly and efficiently.

In some embodiments, such as in FIG. 12C, the electronic device 500 receives (1310), via the one or more input devices, an input corresponding to a request to select (e.g., with contact 1203) the visual representation 1204 of the user account. In some embodiments, in response to receiving the input corresponding to the request to select the visual representation of the user account, the electronic device 500 displays (1312), on the display 504, a settings user interface for accessing settings associated with the user account, the settings user interface including a selectable option 1226 for accessing information about the updates available for the applications, such as in FIG. 12D. In some embodiments, the user interface includes selectable options to view a user interface related to the user account, a user interface to view purchased applications, a user interface to view personalized recommended applications, a user interface to view and manage updates, a user interface to view and manage subscriptions, a user interface to redeem a gift card or code, a user interface to send a gift card by email, and/or a user interface to add funds to the user's account. The user interface optionally further includes a selectable option to log out of the user's account.

The above-described manner of presenting the user interface including options to access user account settings and update information allows the electronic device to combine the user account settings user interface and the updates user interface, which simplifies the interaction between the user and the electronic device and enhances the operability of the electronic device and makes the user-device interface more efficient (e.g., by reducing the number of inputs to switch between user account settings and updates information), which additionally reduces power usage and improves battery life of the electronic device by enabling the user to use the electronic device more quickly and efficiently.

In some embodiments, such as in FIGS. 12A-12C, the application store application includes a navigation bar 1206 from which the first user interface and the second user interface are accessible in the application store, the input corresponding to the request to navigate to the second user interface of the application store application comprising selection (e.g., with contact 1203) of a navigation element, in the navigation bar, corresponding to the second user interface (1314). In some embodiments, the navigation bar includes selectable options to view a "today" user interface of the application store, a "games" user interface of the application store, an "apps" user interface of the application store, a subscription application user interface of the application store, and a search user interface to search the application store. In some embodiments, the visual indication 1204 that indicates the number of updates available for the applications is not displayed in the navigation bar 1206 (1316). In some embodiments, the visual indication of the number of updates available is located in a different region of the user interface than the navigation bar. For example, the navigation bar is presented at the bottom of the visible area of the user interface and the updates indication is presented at the top of the user interface and optionally does not persists when the user scrolls down in the user interface.

The above-described manner of presenting the updates indication outside of the navigation bar allows the electronic device to concurrently present a greater number of navigation elements than would be possible if the updates indication was in the navigation bar, which simplifies the interaction between the user and the electronic device and enhances the operability of the electronic device and makes the user-device interface more efficient (e.g., by presenting more categories of applications that have dedicated user interfaces in the application store), which additionally reduces power usage and improves battery life of the electronic device by enabling the user to use the electronic device more quickly and efficiently, such as by reducing the number of inputs needed to locate a desired application in the application store.

In some embodiments, such as in FIGS. 12A-12B the navigation bar 1206 and the visual indication 1204 that indicates the number of updates available for the applications remain displayed while the user navigates from the first user interface to the second user interface (1318). In some embodiments, the visual indication of the number of updates is present in each of the "today," "games," "apps," and subscription application user interfaces of the application store. For example, the navigation bar is displayed at the bottom of the user interface regardless of which tab of the user interface the user is currently viewing and the visual indication of the number of updates is presented at the top of the user interface regardless of which tab the user is currently viewing. In some embodiments, when the user scrolls down in the user interface, the electronic device ceases the display of the indication of the number of updates. In some embodiments, the indication of the number of updates persists as the user scrolls the user interface.

The above-described manner of presenting the updates indication in the first and second user interfaces allows the electronic device to reduce the number of inputs needed to view information about updates, regardless of which user interface the user is viewing, which simplifies the interaction between the user and the electronic device and enhances the operability of the electronic device and makes the user-device interface more efficient (e.g., by reducing the number of user inputs), which additionally reduces power usage and improves battery life of the electronic device by enabling the user to use the electronic device more quickly and efficiently.

It should be understood that the particular order in which the operations in FIGS. 13A-13C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1500, 1700, and 1900) are also applicable in an analogous manner to method 1300 described above with respect to FIGS. 13A-13C. For example, the operation of the electronic device to present an indication of the number of available updates described above with reference to method 1300 optionally has one or more of the characteristics of the presentation of user interfaces of an application store that are specific to a respective application, user interfaces of an application store that include information about a respective category of applications, user interfaces of an application store for accessing a respective category of applications, user interfaces of an electronic device for launching and removing a respective application, user interfaces of a generic application store and a dedicated application store for a respective category of applications, notifications of the completion of a download, etc., described herein with reference to other methods described herein (e.g., methods 700, 900, 1100, 1500, 1700, and 1900). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5J) or application specific chips. Further, the operations described above with reference to FIGS. 13A-13C are, optionally, implemented by components depicted in FIGS. 1A-1B. For example, displaying operations 1302, 1304, 1306, 1308, 1312 and receiving operations 1304, 1306, 1310, and 1312 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Launching and Removing Subscription Applications

Users interact with electronic devices in many different manners. In some embodiments, applications are installed onto the electronic devices. In some embodiments, the applications serve any number of purposes from accessing content to receiving information to playing games. In some embodiments, the applications installed onto the electronic devices can be included with the electronic device, purchased and installed onto the electronic device by the user, or can be "rented" or "leased" by the user. In some embodiments, these rented or leased applications can be referred to as subscription applications such that access to the application is granted via a subscription model. In some embodiments, after applications are installed onto the electronic devices, the user can select the applications to launch the application. In some embodiments, the user can request removal of the application from the electronic device, thus removing access to the application. In some embodiments, while the application is installed on the electronic device, a user's rental or lease of a subscription application can lapse or the user can request cancellation of the rental or lease, thus removing access to the subscription application. The embodiments described below provide ways in which an electronic device launches and removes access to subscription and non-subscription applications, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 14A:
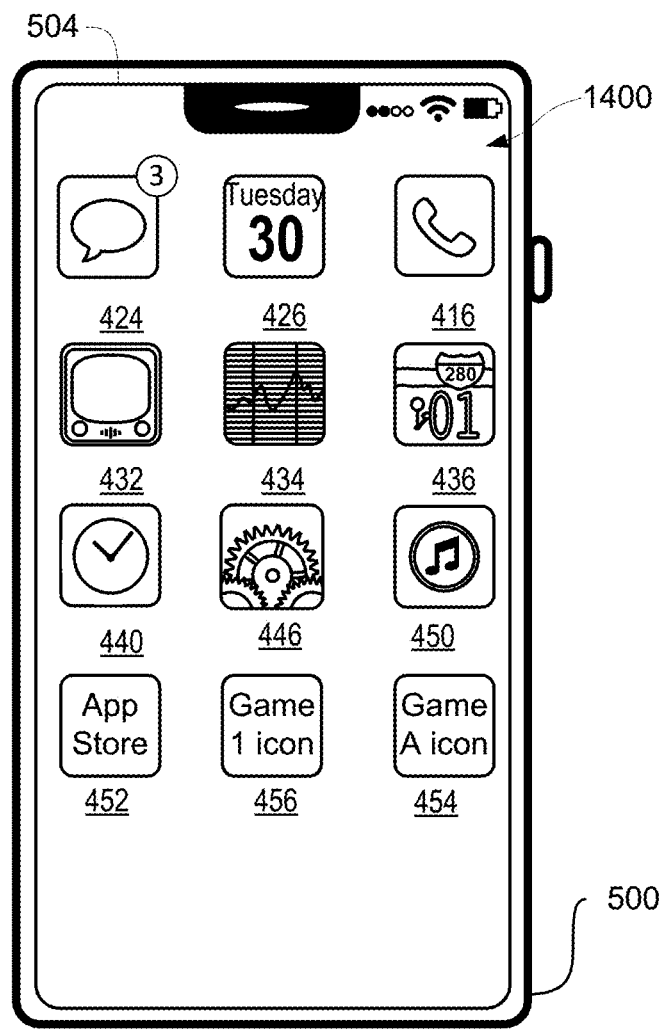
FIGS. 14A-14O illustrate exemplary ways in which an electronic device launches and removes access to subscription and non-subscription applications in accordance with some embodiments.
Figure 14B:
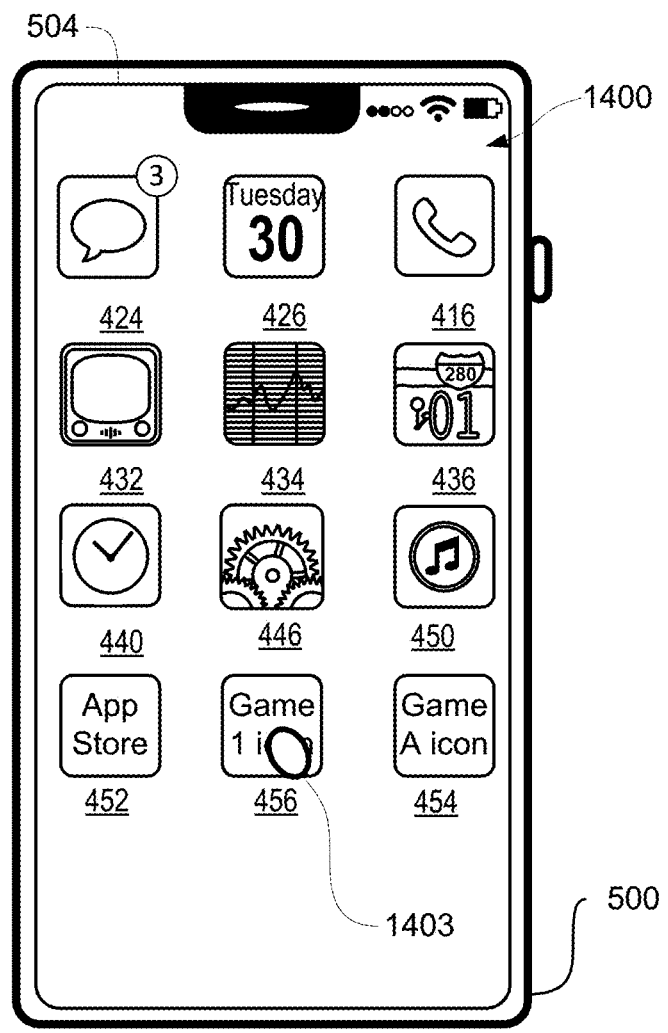
Figure 14C:
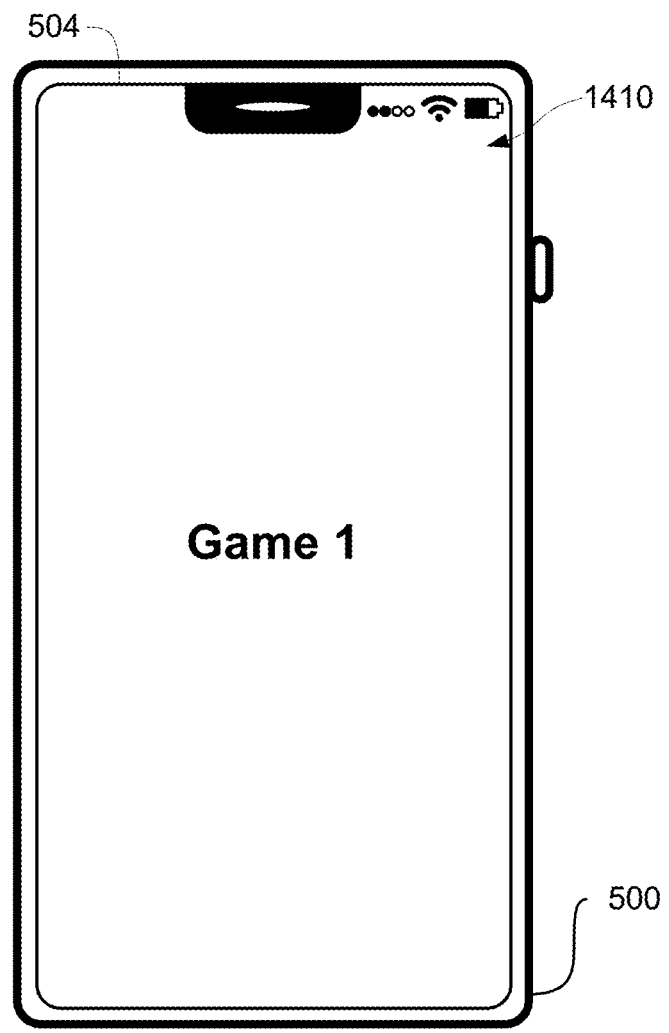
Figure 14D:
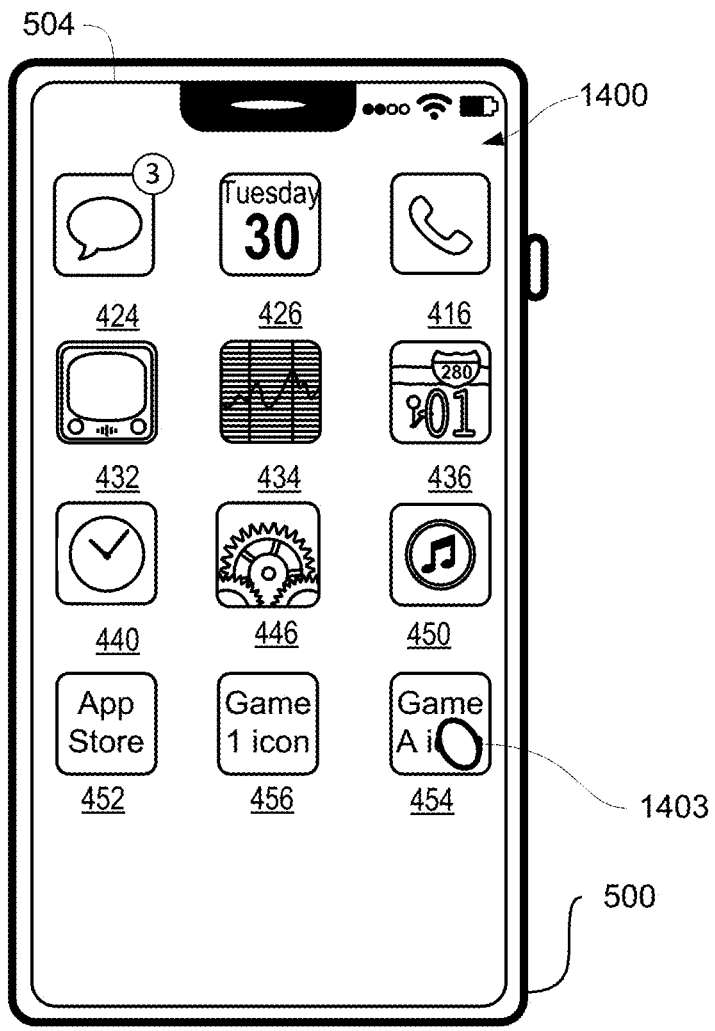
Figure 14E:
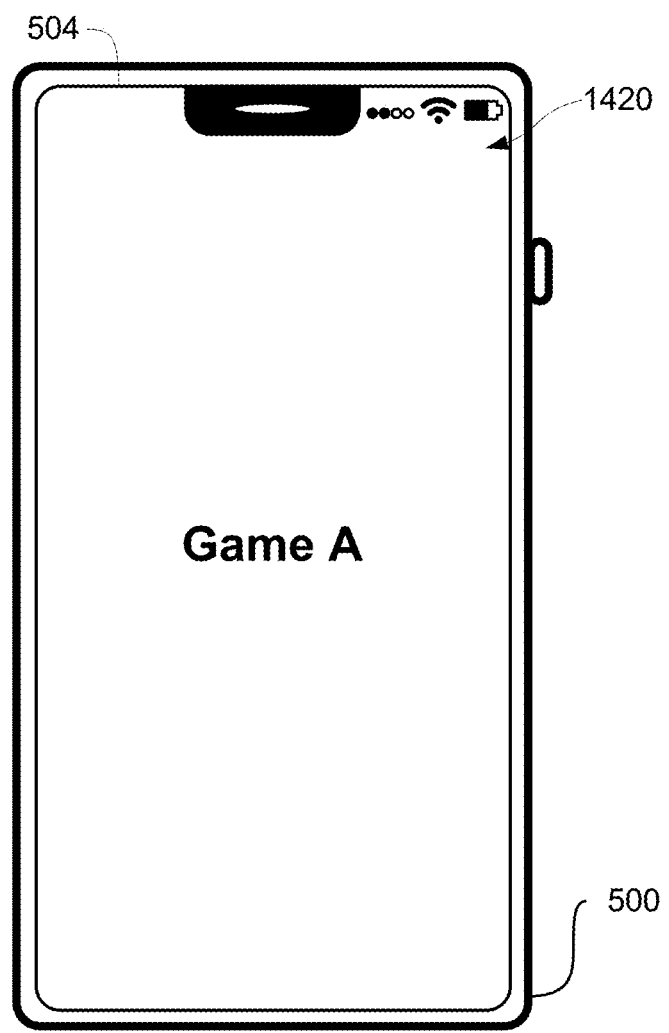
Figure 14F:
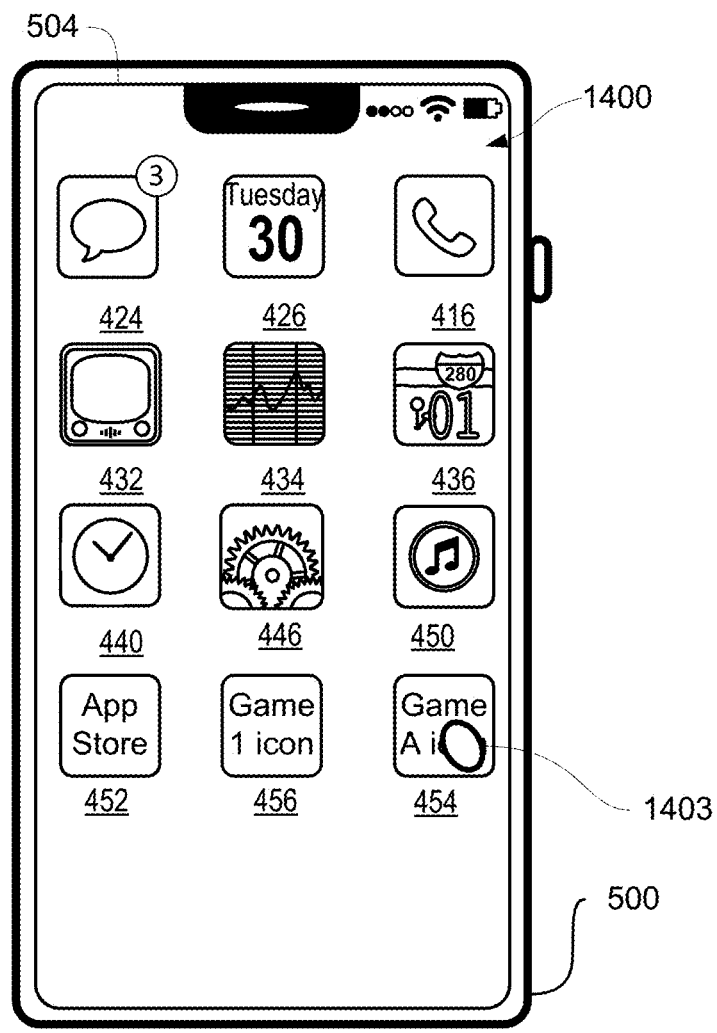
Figure 14G:
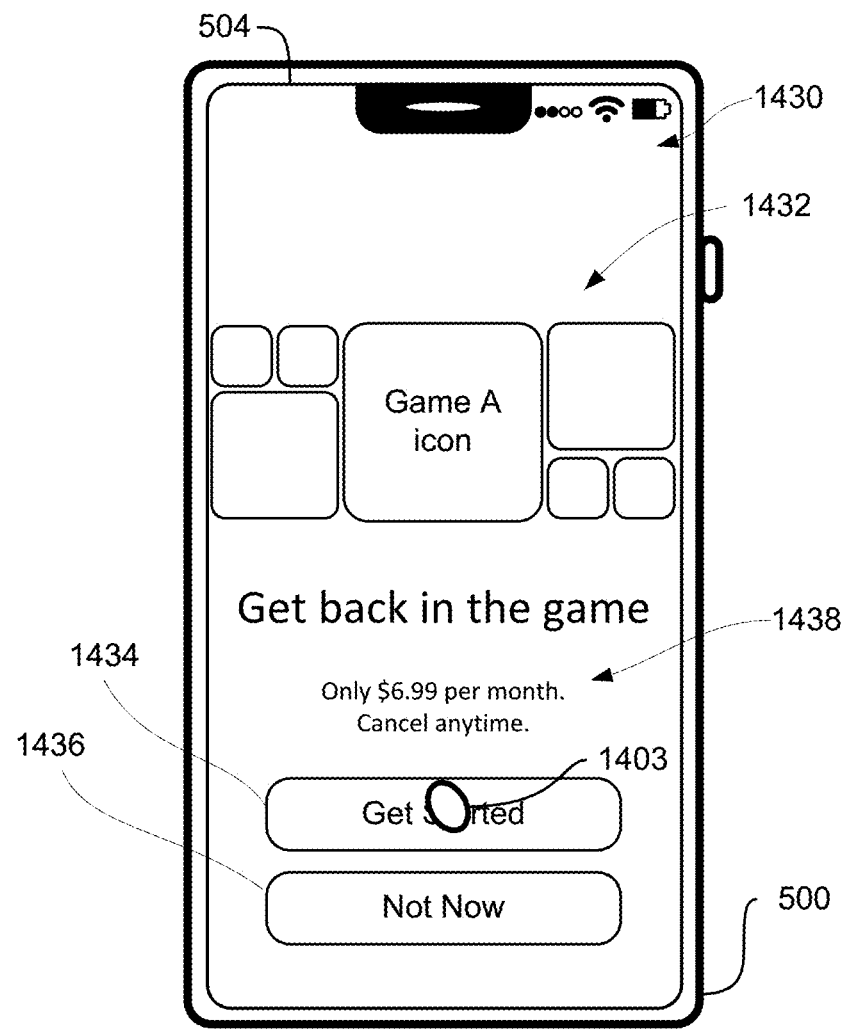
Figure 14H:
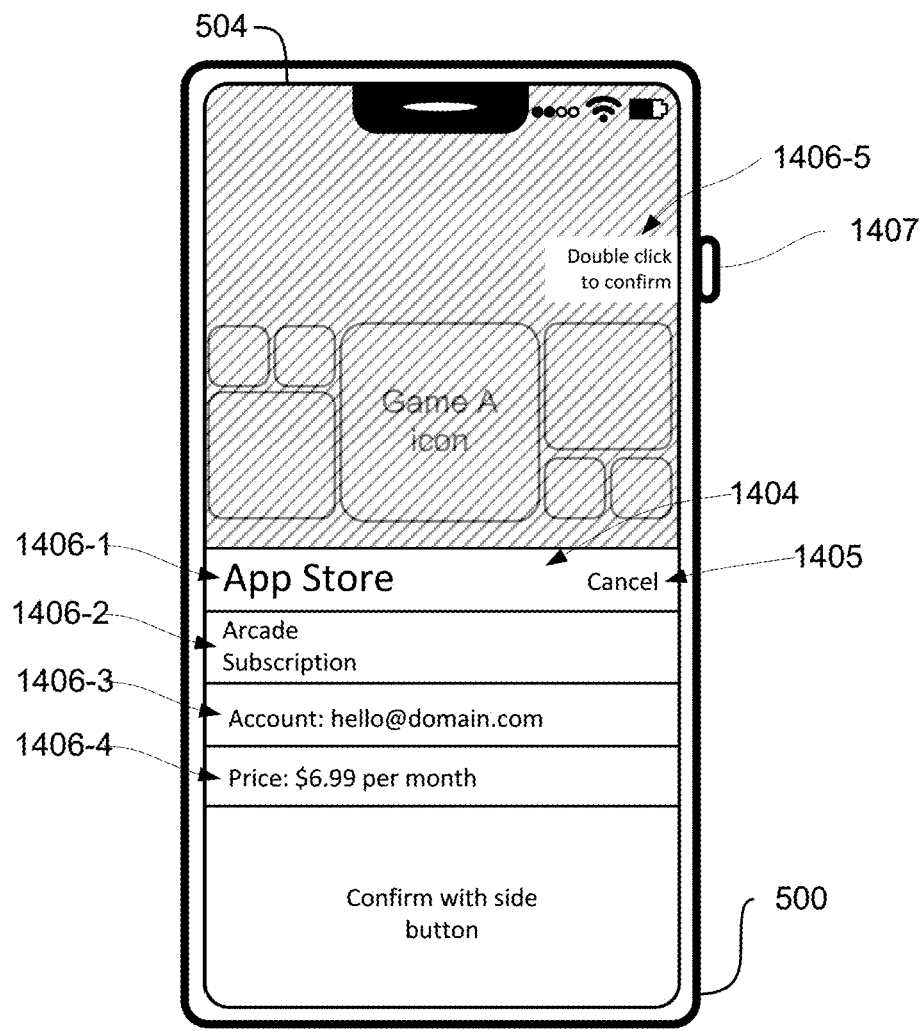
Figure 14I:
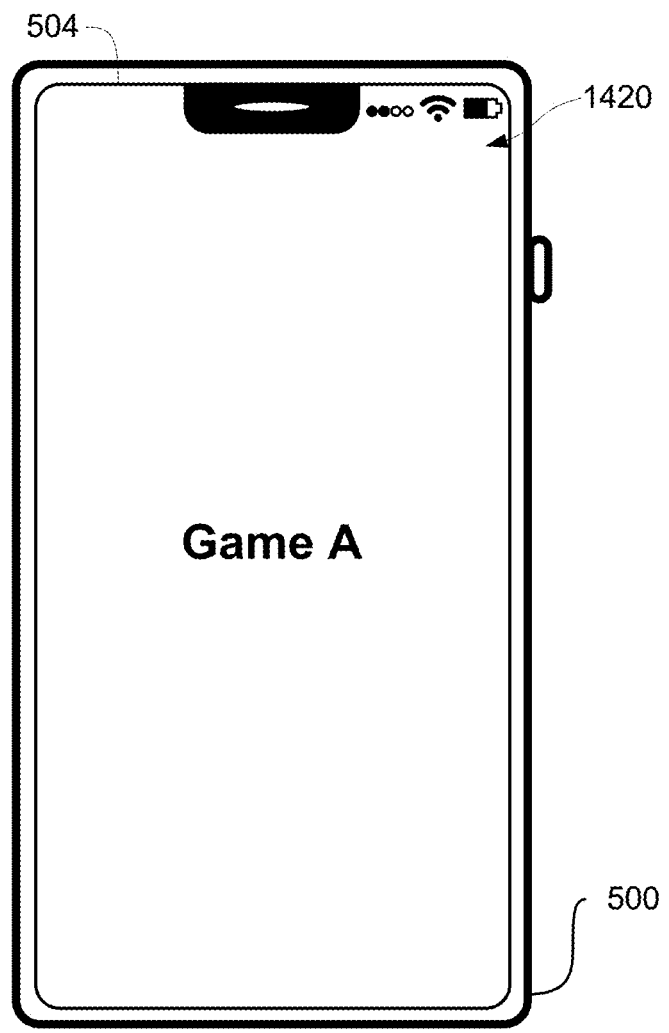
Figure 14J:
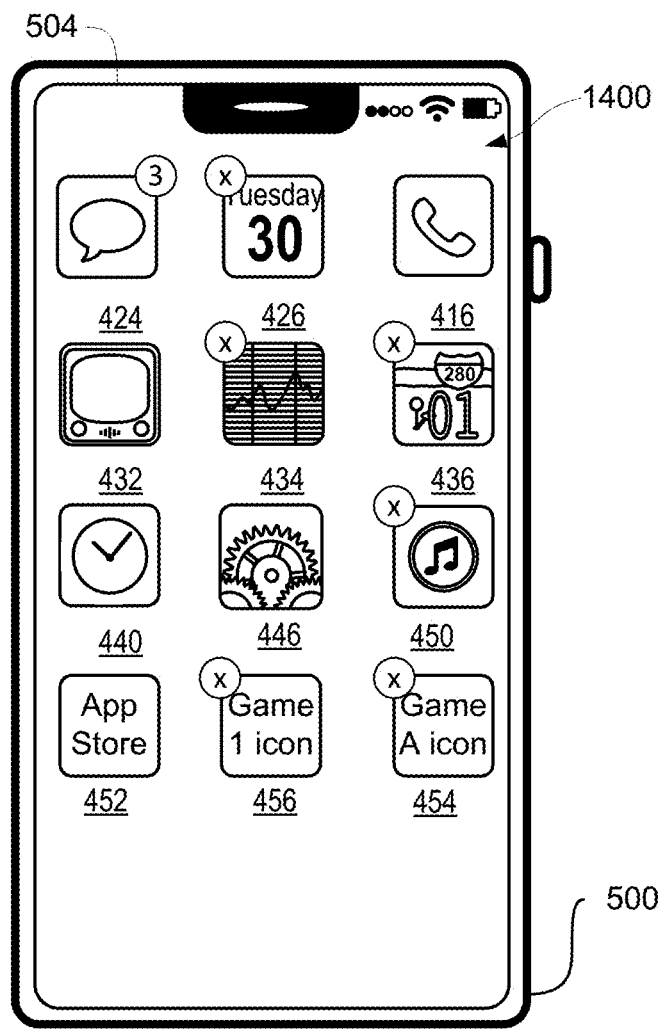
Figure 14K:
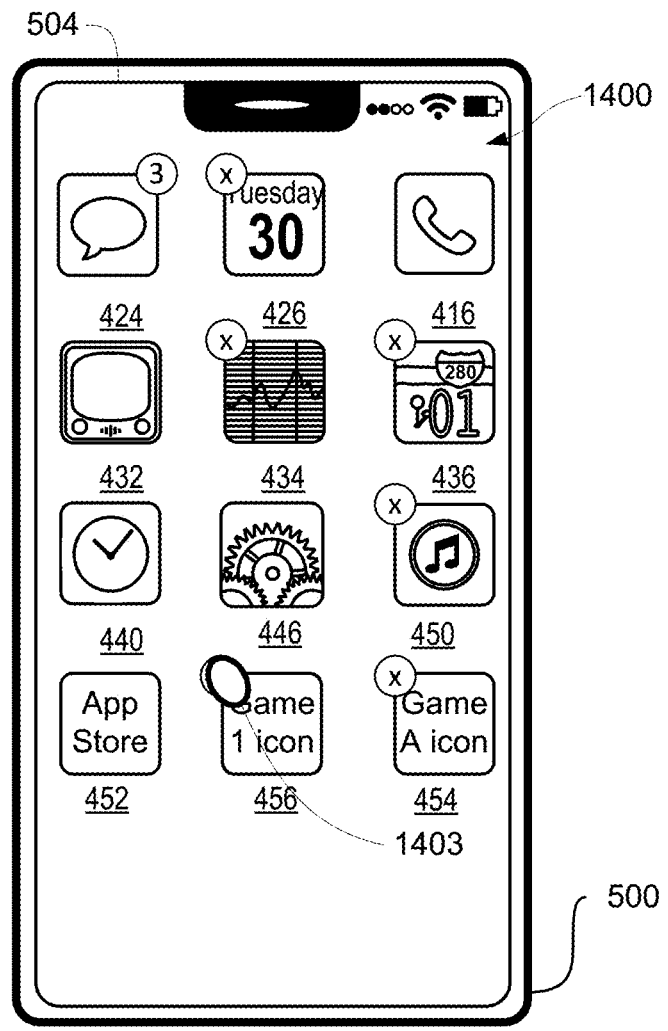
Figure 14L:
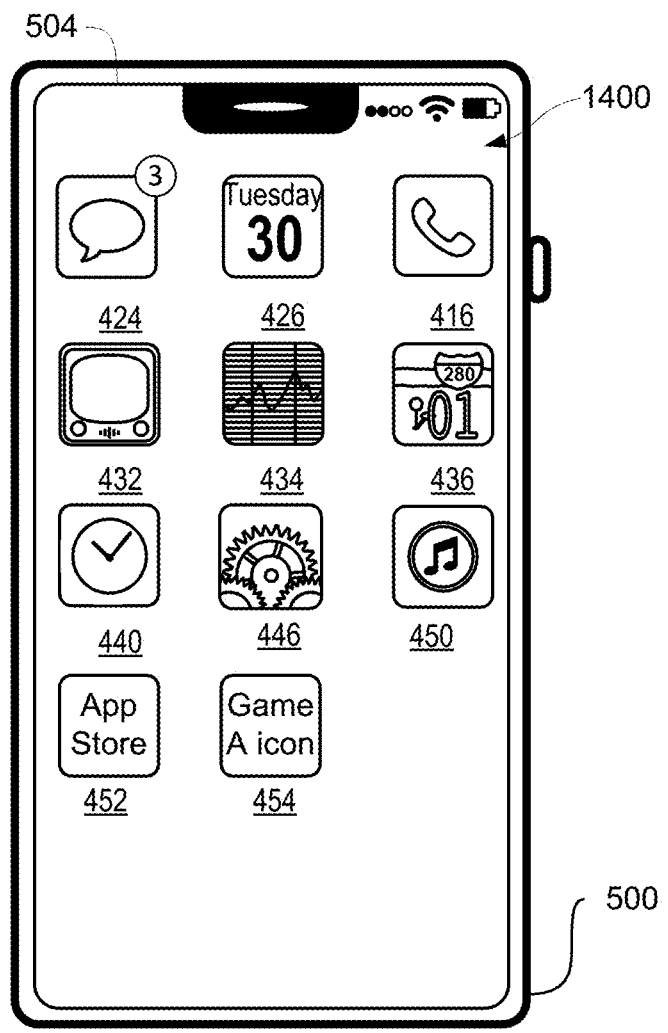
Figure 14M:
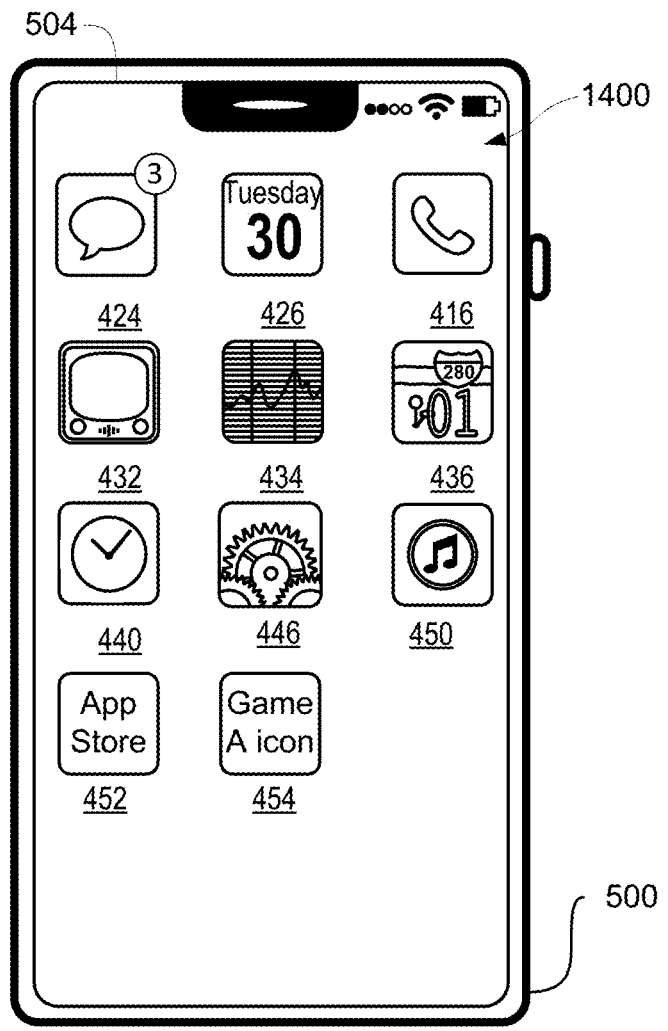
Figure 14N:
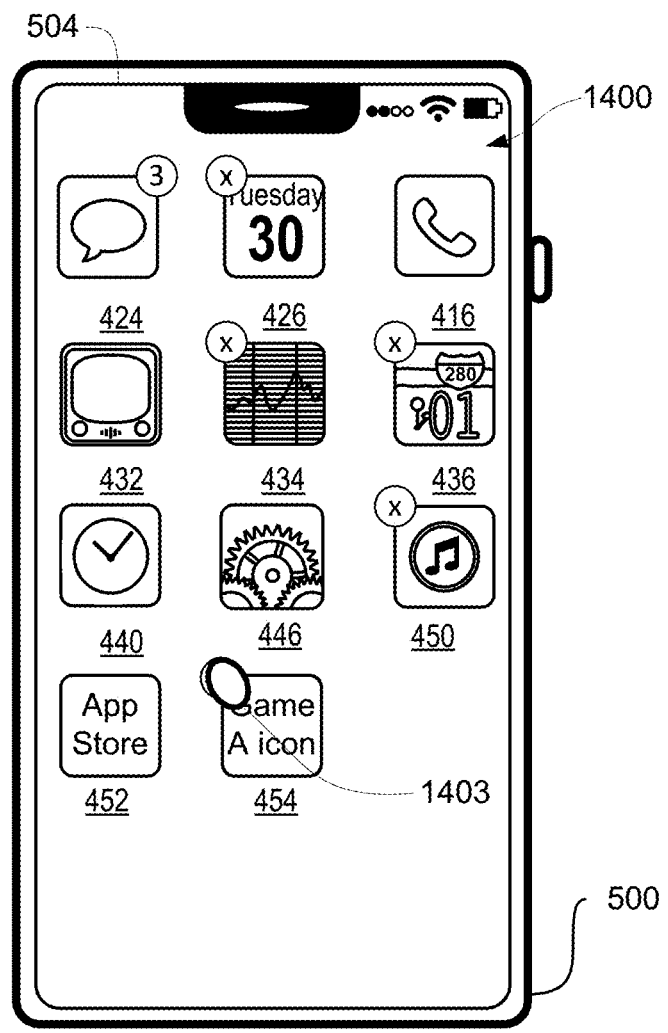
Figure 14O:
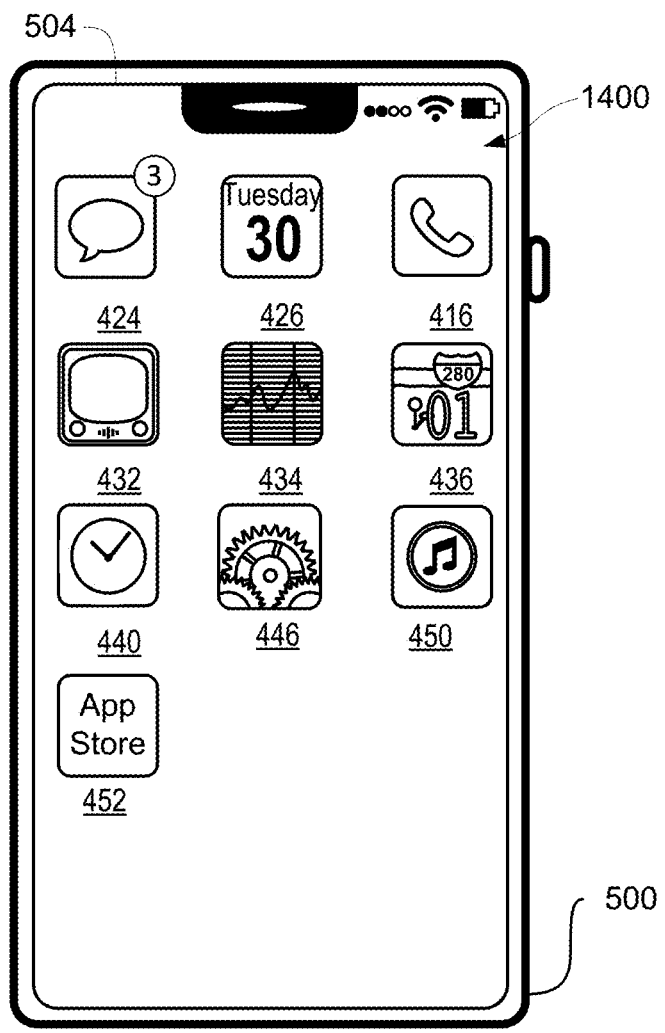
Figure 15A:
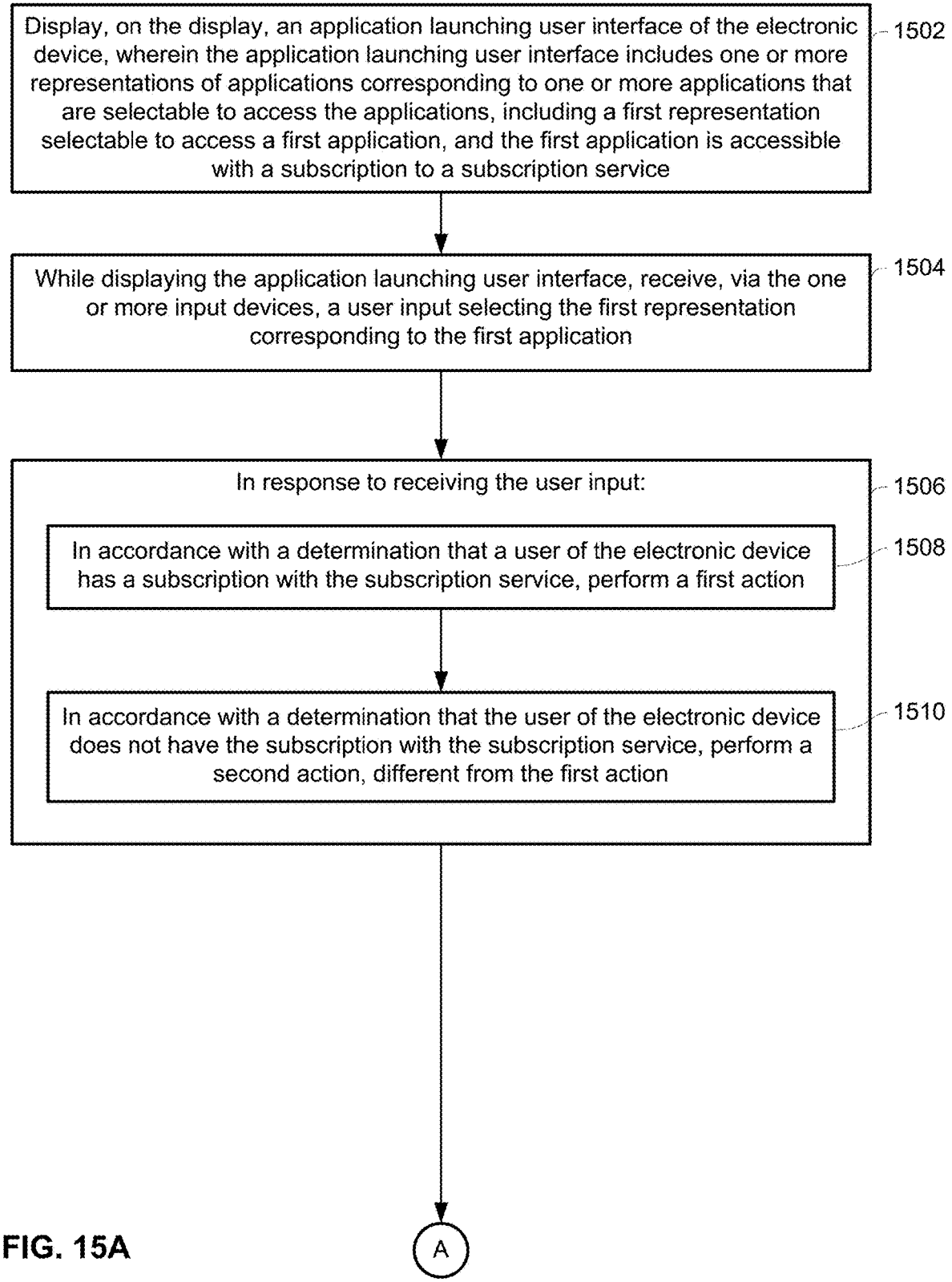
Figure 15C:
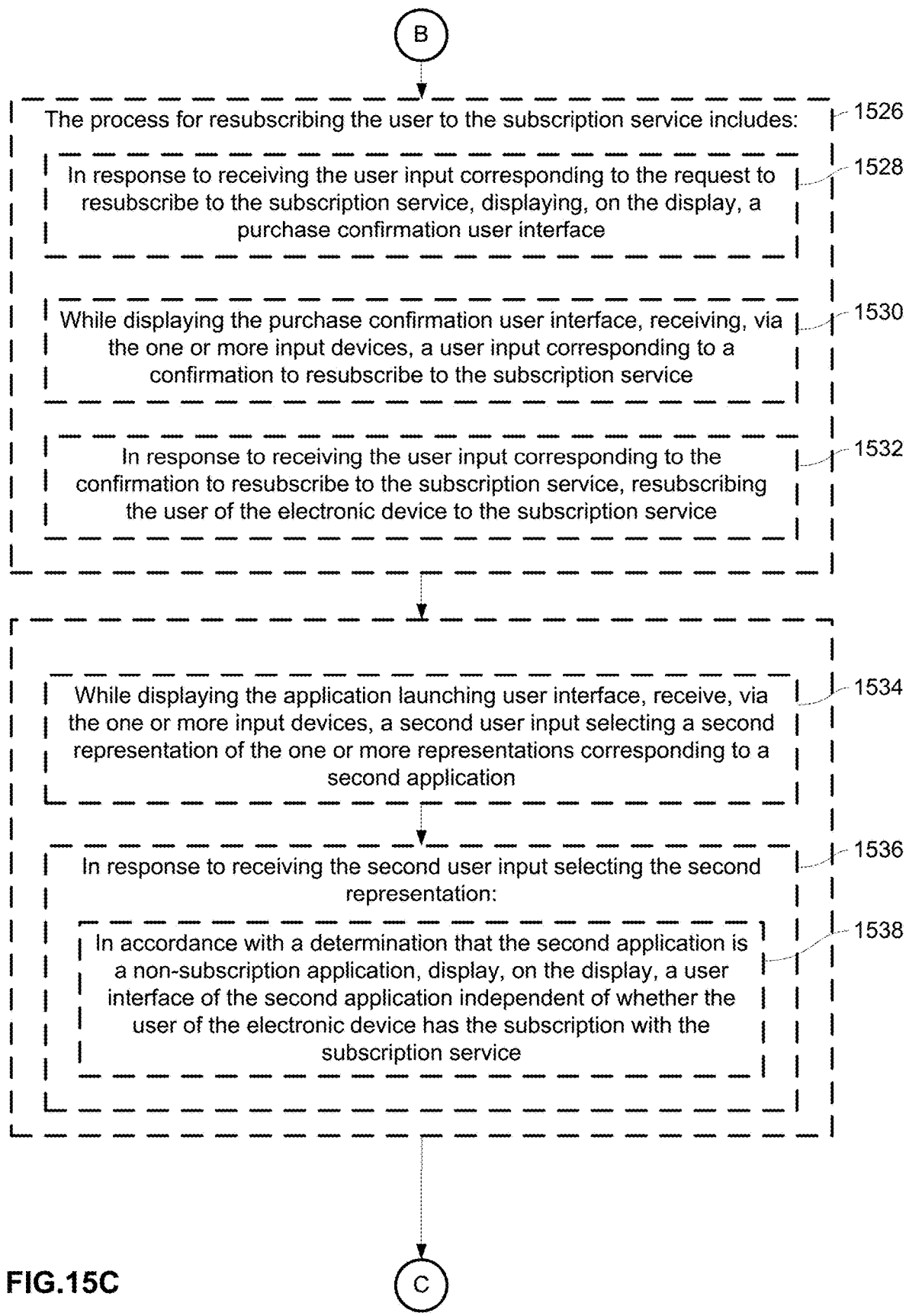
Figure 15D:
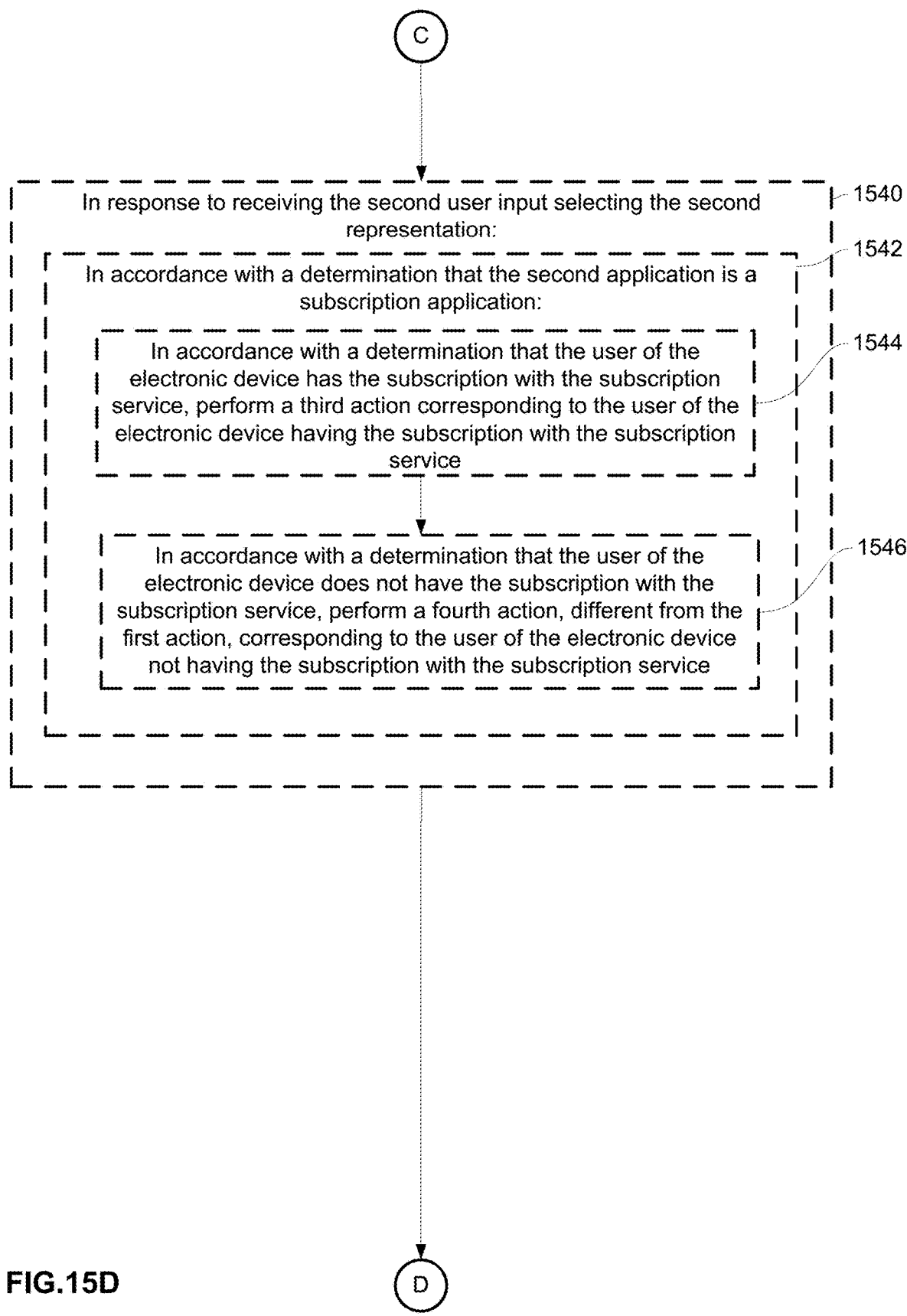
Figure 15E:
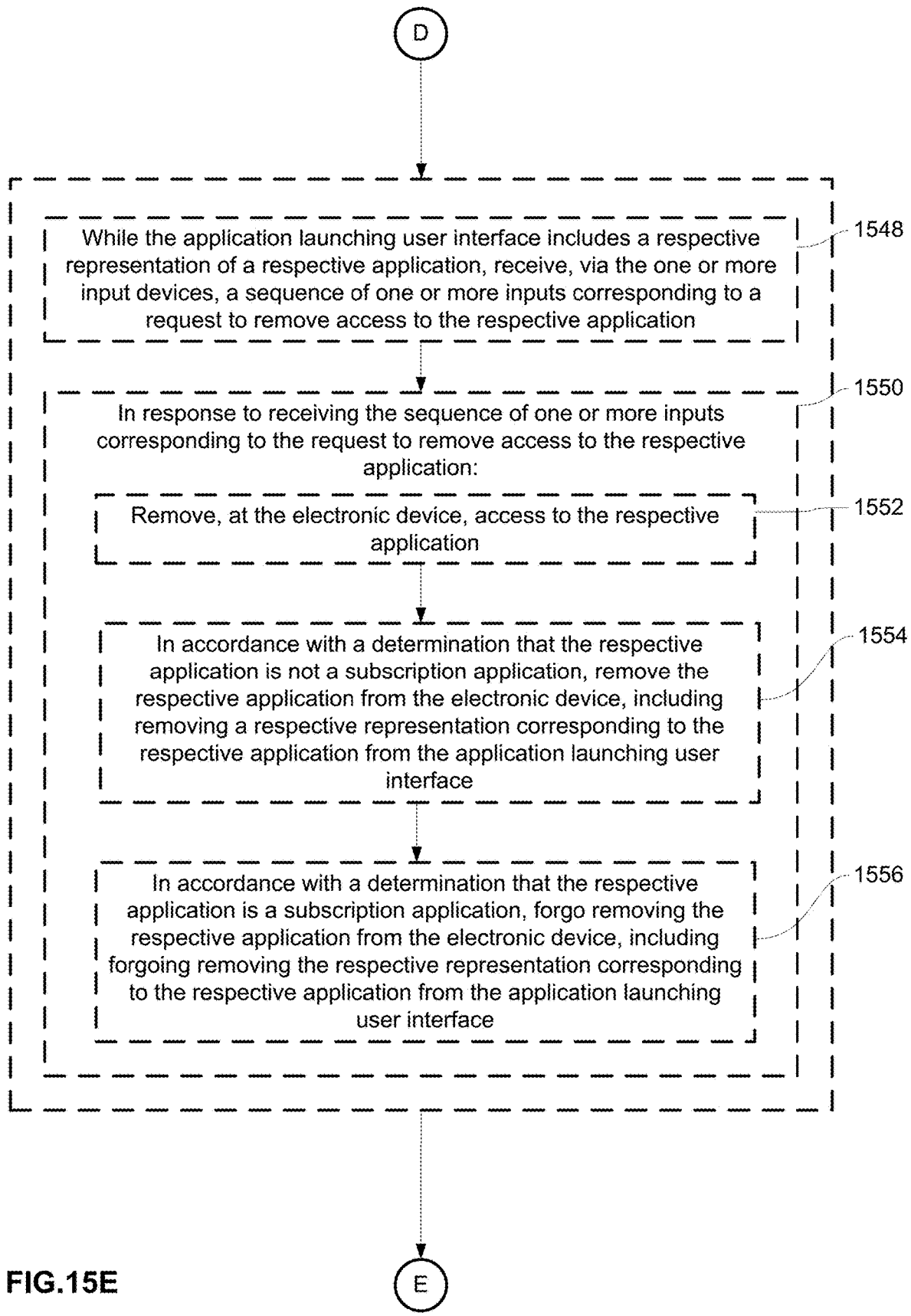
Figure 15F:
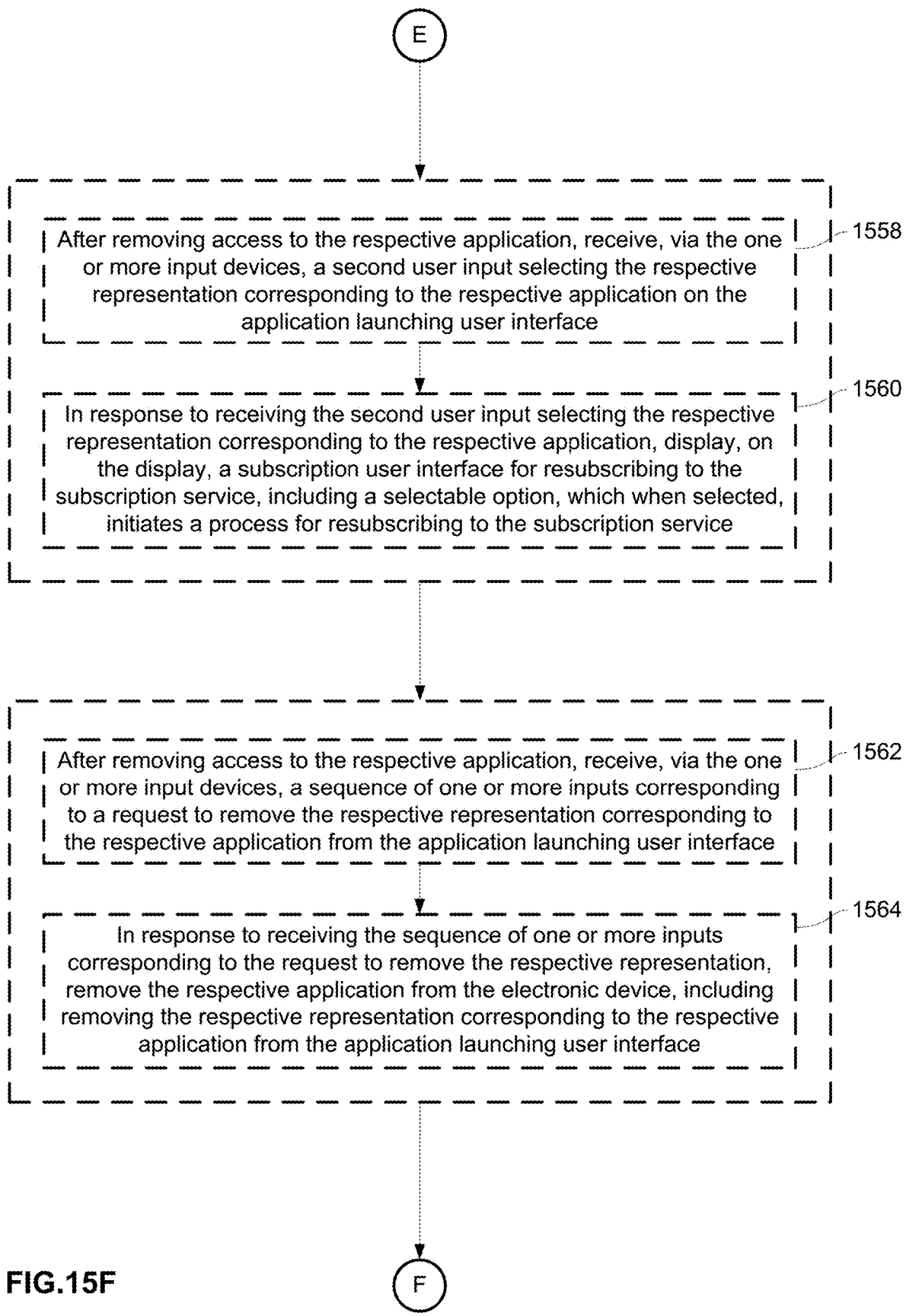
Figure 15G:
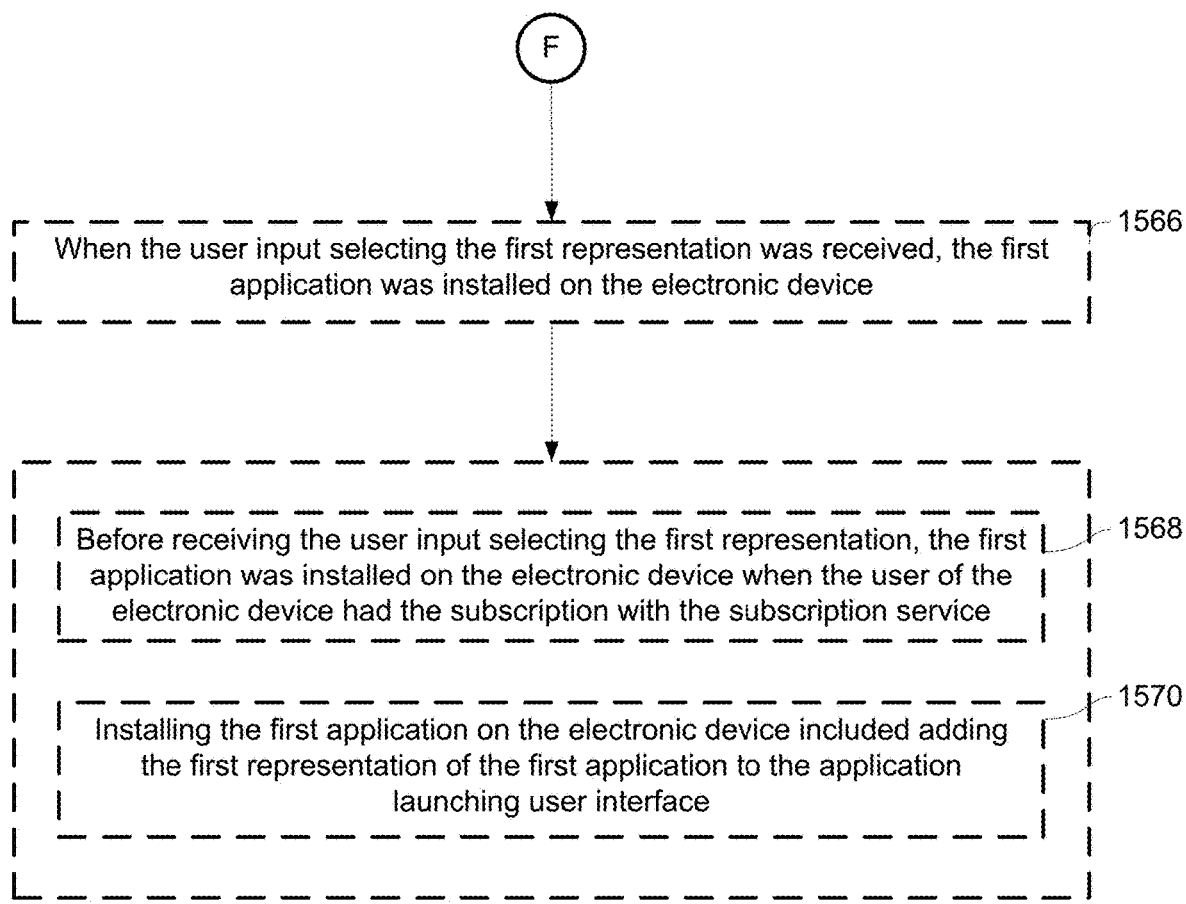

FIGS. 14A-14O illustrate exemplary ways in which an electronic device launches and removes access to subscription and non-subscription applications. The embodiments in these figures are used to illustrate the processes described below with reference to FIGS. 15A-15G.

FIGS. 14A-14O illustrate operation of the electronic device 500 for launching and removing access to subscription and non-subscription applications. FIG. 14A illustrates an exemplary device 500 that includes touch screen 504. As shown in FIG. 14A, the electronic device 500 presents home screen user interface 1400. In some embodiments, home screen user interface 1400 is an application launching user interface. For example, home screen user interface 1400 includes multiple selectable options that when selected causes the electronic device 500 to launch or otherwise present applications. In some embodiments, home screen user interface 1400 includes multiple pages or tabs and includes all launchable applications that have been installed onto the electronic device. In some embodiments, home screen user interface 1400 includes a subset of the applications that are installed and launchable on the electronic device. In some embodiments, home screen user interface 1000 includes an application store icon 452 for launching an application store application. In some embodiments, the application store application is an application in which the user can browse for and purchase applications (e.g., include games, services, or other content) to download and install onto electronic device 500. In some embodiments, the application store includes both subscription and non-subscription applications for the user to purchase access, download, and/or install. In some embodiments, a non-subscription game (e.g., Game 1) and a subscription game (e.g., Game A) are installed onto device 500 (e.g., corresponding to icon 456 and icon 454, respectively). In some embodiments, game A was downloaded and installed on electronic device 500 when the user had a valid subscription to the subscription service.

In FIG. 14B, electronic device 500 detects user input 1403 selecting icon 456 corresponding to the non-subscription game (e.g., Game 1), indicating a request to launch or otherwise access the game. In some embodiments, because game 1 is a non-subscription game, there is no need to determine whether the user has a subscription to the arcade subscription service. Thus, in some embodiments, in response to user input 1403 selecting icon 456 corresponding to the non-subscription game, electronic device 500 launches the game and displays game 1, as shown in FIG. 14C.

In FIG. 14D, electronic device 500 detects user input 1403 selecting icon 454 corresponding to the subscription game (e.g., Game A), indicating a request to launch or otherwise access game A. In some embodiments, because game A is a subscription game, a valid current subscription is required in order to launch or otherwise access game A. In some embodiments, as shown in FIG. 14D, the user of the electronic device has a valid current subscription to the arcade subscription service. Thus, in some embodiments, electronic device 500 launches game A, as shown in FIG. 14E. In some embodiments, determining whether the user of the electronic device has a valid current subscription involves querying a server to determine whether the user has a valid current subscription. In some embodiments, determining whether the user of the electronic device has a valid current subscription involves accessing a file or sending a query (e.g., via an API) to the application store application to determine whether the user has a valid current subscription.

In FIG. 14F, electronic device 500 detects user input 1403 selecting icon 454 corresponding to the subscription game (e.g., Game A), indicating a request to launch or otherwise access the game, while the user does not have a current subscription to the arcade subscription service. For example, the user may have cancelled the user's subscription to the subscription service or the subscription service may have lapsed. Because game A is a subscription game and a valid subscription to the arcade subscription service is required to access the game, electronic device 500 will not launch game A in response to the user input. In some embodiments, in response to user input 1403 selecting icon 454, electronic device 500 displays resubscription user interface 1430. In some embodiments, resubscription user interface 1430 indicates to the user that to access the subscription game, the user must have a valid subscription to the arcade subscription service and that re-subscribing from the resubscription user interface provide the user with the necessary subscription to the subscription service. In some embodiments, resubscription user interface 1430 includes a grid 1432 of icons of games that are included in the subscription service, including a large icon of the game that the user was attempting to access (e.g., game A). In some embodiments, the grid 1432 of icons can include icons of different sizes. In some embodiments, resubscription user interface 1430 includes a selectable option (e.g., a button or an affordance labeled "Get Started") to initiate a process of resubscribing to the subscription service. In some embodiments, resubscription user interface 1430 includes a selectable option 1436 (e.g., button or affordance labeled "Not Now") for dismissing resubscription user interface 1430 and declining to resubscribing to the subscription service. It is understood that although the resubscription user interface is described as a process for re-subscribing to the subscription service, in some embodiments, game A was downloaded when the user did not have a subscription to the subscription service (e.g., in such embodiments, subscription games can be downloaded without a valid subscription, but still cannot be accessed or launched without a valid subscription). Thus, in such embodiments, instead of displaying resubscription user interface 1430, the electronic device displays a subscription user interface suggesting to the user to subscribe to the subscription service (e.g., or begin a free trial).

In FIG. 14G, user input 1403 is received on selectable option 1434 for resubscribing to the subscription service. In some embodiments, in response to user input 1403, electronic device 500 displays purchase confirmation card 1404. In some embodiments, purchase confirmation card 1404 is displayed over the user interface that induced display of the purchase confirmation card. In some embodiments, the user interface beneath the purchase confirmation card is tinted or otherwise greyed out. In some embodiments, as shown in FIG. 14H, purchase confirmation card 1404 is displayed in the lower half of the touch screen and includes information regarding the item that is being purchased. For example, purchase confirmation card 1404 includes text label 1406-1 indicating that the purchase is from the application store application, and text label 1406-2 indicating that the purchase is of a subscription to the arcade subscription service. In some embodiments, purchase confirmation card 1404 includes text label 1406-3 indicating the account that will be used to purchase the subscription. In some embodiments, purchase confirmation card 1404 includes text label 1406-4 indicating the price of the subscription (e.g., $6.99 per month). In some embodiments, purchase confirmation card 1404 includes selectable option 1405 to cancel the process of purchasing the subscription. In some embodiments, selecting selectable option 1405 causes purchase confirmation card 1404 to be dismissed. In some embodiments, purchase confirmation card 1404 includes a description for how to confirm the purchase (e.g., double-clicking side-button 1047). In some embodiments, text label 1406-5 adjacent to side button 1407 provides a further hint of how to confirm the purchase.

In some embodiments, after the user confirms the user's purchase of the subscription service (e.g., resubscription), the user obtains a valid current subscription to the subscription service and launches the subscription game that was originally requested (e.g., game A), as shown in FIG. 14. In some embodiments, the electronic device 500 does not launch the subscription game and instead, returns the user back to home screen user interface 1400.

FIGS. 14J-14O illustrate a process of removing access to subscription and non-subscription games. FIG. 14J illustrates home screen user interface 1400 in an application deletion mode. In some embodiments, in response to the user performing a touch input with a duration longer than a threshold duration, the electronic device 500 enters an application deletion mode. In some embodiments, during application deletion mode, the applications which can be deleted are displayed with a deletion icon. In some embodiments, selecting the deletion icon causes deletion of the respective application. In some embodiments, deleting the respective application causes the user and/or the electronic device to remove access to the respective application. In some embodiments, deleting the respective application includes uninstalling the application from electronic device 500 and removing the associated icon from home screen user interface 1400 (e.g., and/or the application launching user interface). In some embodiments, as shown in FIG. 14J, certain applications cannot be deleted from electronic device 500 (e.g., system applications including a settings application). In such embodiments, the applications that cannot be deleted are not displayed with a deletion icon.

In FIG. 14K, user input 1403 is detected selecting the deletion icon on icon 456 corresponding to game 1 indicating the user's request to delete or otherwise remove access to game 1. In some embodiments, game 1 is a nonsubscription application and is an application that can be deleted from electronic device 500. In some embodiments, in response to user input 1403 selecting the deletion icon for game 1, electronic device 500 removes, uninstalls, deletes, and/or otherwise removes access to game 1. In some embodiments, deleting game 1 includes removing the game 1 icon from home screen user interface 1400, as shown in FIG. 14L.

As shown in FIG. 14L, in some embodiments, the user of the electronic device has a valid current subscription to the arcade subscription service such that game A, a subscription application, is accessible. In FIG. 14M, the user's subscription to the subscription service expires (e.g., is canceled or otherwise lapses). In some embodiments, when the user's subscription to the subscription service expires, the user loses access to subscription games that are included in the subscription service, including losing access to game A (e.g., the lower cannot launch game A without a subscription to the subscription service). Thus, in some embodiments, when the user cancels the user's subscription to the subscription service, the user is requesting to remove access to game A. In some embodiments, even though the user has requested to remove access to game A, and access has been removed (e.g., the subscription expiring and/or being canceled), game A is not deleted or otherwise removed from electronic device 500. In some embodiments, home screen user interface 1400 maintains icon 454 corresponding to game A. Thus, in other words, in response to the user's request removing access to the subscription game, electronic device 500 does not remove the subscription game. In some embodiments, not removing the subscription game from the electronic device when access to the subscription game is removed (e.g., or any time the subscription status changes) reduces the need to remove multiple games (e.g., if multiple subscription games are installed) and potentially require re-downloading and reinstallation of the games in the future when the user re-subscribes to the service. For example, as discussed, re-subscription to the subscription service is a simple method and immediately grants the user access to all subscription games that have already been installed and downloaded, without requiring the user, after re-subscribing, to search for and find all games that were previously downloaded and re-download them again.

In FIG. 14N, home screen user interface 1400 is in an application deletion mode. In some embodiments, when electronic device 500 is in an application deletion mode, icon 454 corresponding to game A includes a deletion icon. In FIG. 14N, electronic device 500 detects a user input 1403 selecting the deletion icon for game A indicating a request to delete or otherwise remove the game. In some embodiments, in response to receiving user input 1403 selecting the deletion icon for game A, game A is uninstalled or otherwise removed from electronic device 500. In some embodiments, after game A is uninstalled or otherwise removed from electronic device 500, icon 454 for game A is removed from home screen user interface 1400. Thus, in some embodiments, when a user requests a removal of access to a non-subscription application (e.g., deletion), electronic device 500 removes the non-subscription application from the electronic device. However, when a user requests a removal of access to a subscription application (e.g., cancellation of the subscription), electronic device 500 does not remove the subscription application. In such embodiments, the user can select the icon for the subscription application to initiate a process for re-subscribing to the subscription service, as was described in detail above with respect to FIG. 12. Thus, in some embodiments, to remove a subscription game (e.g., subscription application) from electronic device 500, electronic device 500 must receive an explicit request to remove the subscription application (e.g., as opposed to receiving only a request to remove access).

FIGS. 15A-15G are flow diagrams illustrating a method 1500 of providing ways to launch and remove access to subscription and non-subscription applications in accordance with some embodiments. The method 1500 is optionally performed at an electronic device such as device 100, device 300, device 500, device 501, device 510, device 591, and device 480 as described above with reference to FIGS. 1A-1B, 2-3, 4A-4B and 5A-5K. Some operations in method 1500 are, optionally combined and/or order of some operations is, optionally, changed.

As described below, the method 1500 provides ways to launch and remove access to subscription and non-subscription applications. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, a mobile device (e.g., a tablet, a smartphone, a media player, or a wearable device) including a touch screen, a computer including one or more of a keyboard, mouse, trackpad, and touch screen, or a set-top box in communication with a remote control device) in communication with a display and one or more input devices displays (1502), on the display, an application launching user interface of the electronic device, such as in FIG. 14A (e.g., an interface from which the user can launch applications that are installed on the electronic device), wherein the application launching user interface includes one or more representations of applications corresponding to one or more applications that are selectable to access the applications, including a first representation selectable to access a first application, and the first application is accessible with a subscription to a subscription service, such as in FIG. 14A. In some embodiments, the application launching user interface is a home screen user interface of the electronic device. In some embodiments, the home screen user interface includes multiple icons for launching applications on the electronic device. In some embodiments, the home screen user interface includes multiple pages or tabs of applications to launch. In some embodiments, the application launching user interface is a user interface separate from the home screen user interface from which the user can browse and launch applications that are installed on the electronic device. It is understood that although the application launching user interface is described as a user interface from which a user launches applications, the application launching user interface is not limited to user interfaces that only launch applications. For example, the application launching user interface can include other elements such as clocks, widgets, and/or other interactive elements. In some embodiments, the first application is an application that is accessible by the user only with a subscription to a subscription service. In some embodiments, the application being accessible means that the user can launch the application on the electronic device. In some embodiments, the application can be downloaded and installed onto the electronic device without a subscription to the subscription service but can only be launched (e.g., run, executed) if the user has a subscription to the subscription service. In some embodiments, a subscription to the subscription service is required to download and install the application onto the electronic device in the first instance. In some embodiments, the application can be launched without a subscription to the subscription service and a subscription to the subscription service enables features in the application that are not accessible or enabled without a subscription to the subscription service. In some embodiments, the application can be a subscription-based game.

In some embodiments, while displaying the application launching user interface, the electronic device receives (1504), via the one or more input devices, a user input selecting the first representation corresponding to the first application, such as in FIG. 14D (e.g., a user input on the touch screen selecting (e.g., tap or long press) a subscription application such as a subscription-based game).

In some embodiments, in response to receiving the user input (1506): in accordance with a determination that a user of the electronic device has a subscription with the subscription service, the electronic device performs (1508) a first action, such as in FIG. 14E. In some embodiments, if the selected application is a subscription-based application and the user has a subscription to the respective subscription service, then launch, execute, or otherwise display the first application. In some embodiments, if the selected application is already running on the electronic device (e.g., as a background process or otherwise in an inactive state), then display the selected application (e.g., promote the application to an active process and/or display an interface of the application that was previously displayed by the application (e.g., when the user navigated away from the application or otherwise demoted the application to a background process).

In some embodiments, in accordance with a determination that the user of the electronic device does not have the subscription with the subscription service, the electronic device performs (1510) a second action, different from the first action, such as in FIG. 14G. In some embodiments, if the selected application is a subscription-based application and the user does not have a current subscription to the respective subscription service, then do not immediately launch, execute, or display the first application. In some embodiments, the selected application was downloaded and installed when the user had a subscription to the respective subscription service but the subscription to the subscription service lapsed or was subsequently canceled. In some embodiments, the selected application is downloadable and installable without a subscription, but a subscription to the subscription service is required to launch (execute, run) the selected application. In some embodiments, in response to the user selecting the selected application, the electronic device displays a user interface suggesting to the user to subscribe to the respective subscription service (e.g., in order to enable access to the application). In some embodiments, the electronic device displays an application store user interface for subscribing to the subscription service. In some embodiments, after successfully subscribing to the subscription service, the selected application will then launch (e.g., execute, run). In some embodiments, if the selected application is already running on the electronic device (e.g., as a background process or otherwise in an inactive state) and the user no longer has a subscription to the subscription, then selecting the selected application will not cause the display of the selected application and instead, the electronic device displays a user interface suggesting to the user to subscribe to the respective subscription service (e.g., in order to enable access to the application).

The above-described manner of accessing a subscription-based application (e.g., by performing a first action, such as launching the application, if the user has a subscription to the respective subscription service or by performing a second, different, action, such as suggesting to the user to purchase a subscription to the subscription service, if the user does not currently have a subscription to the respective subscription service) allows the electronic device to provide the user with the ability to access subscription-based applications (e.g., by automatically determining whether the user has a subscription to the respective subscription service and launching the application if the user does have a subscription and providing an interface for the user to subscribe to the subscription service if the user does not have the proper subscription), which simplifies the interaction between the user and the electronic device and enhances the operability of the electronic device and makes the user-device interface more efficient (e.g., by automatically determining the action required to quickly access the respective application without requiring the user to separately determine whether the required application is a subscription-based application, separately determining whether the user already has a subscription to the appropriate subscription service, and navigating to a separate interface to subscribe to the subscription service if the user does not already have a subscription to the appropriate subscription service), which additionally reduces power usage and improves battery life of the electronic device by enabling the user to use the electronic device more quickly and efficiently while reducing errors in the usage of the device.

In some embodiments, the first action includes displaying, on the display, a user interface of the first application (1512), such as in FIG. 14E. In some embodiments, if the first application is a subscription-based application and the user has a subscription to the respective subscription service, then launch, execute, or otherwise display the first application. For example, if the first application is running as a background process, then promote the first application to a foreground process and display the first application. In some embodiments, if the first application is not already running on the device (e.g., as a background process), then launch the application.

The above-described manner of launching a subscription-based application (e.g., by launching the application if the user has a subscription to the respective subscription service) allows the electronic device to provide the user with the ability to access subscription-based application (e.g., by automatically determining whether the user has a subscription to the respective subscription service and launching the application if the user does have a subscription), which simplifies the interaction between the user and the electronic device and enhances the operability of the electronic device and makes the user-device interface more efficient (e.g., by launching the application without requiring the user to separately verify whether the required application is a subscription-based application or whether the user already has a subscription to the appropriate subscription service), which additionally reduces power usage and improves battery life of the electronic device by enabling the user to use the electronic device more quickly and efficiently.

In some embodiments, the second action includes forgoing displaying, on the display, a user interface of the first application (1514), such as in FIG. 14G. In some embodiments, if the first application is a subscription-based application and the user does not have a subscription to the respective subscription service, then do not launch, execute, or display the first application. For example, instead of launching the first application, providing a user interface for the user to subscribe to the subscription service or providing a warning, pop-up, or other notification that the user does not have access due to not having a subscription to the subscription service.

The above-described manner of forgoing launching a subscription-based application (e.g., by forgoing launching the subscription application when it is determined that the user does not have a valid current subscription to the subscription service) allows the electronic device to prevent the user from accessing a subscription application without the proper requirements to access the subscription application (e.g., by automatically determine that the user does not have a subscription to the subscription service and forgoing launching the application upon request from the user to access the respective application), which simplifies the interaction between the user and the electronic device and enhances the operability of the electronic device and makes the user-device interface more efficient (e.g., by launching the application only when the user has a valid subscription to the subscription service and forgoing launching when the user does not have a valid subscription, without requiring the user to separately verify whether the user has a subscription to the appropriate subscription service), which additionally reduces power usage and improves battery life of the electronic device by enabling the user to use the electronic device more quickly and efficiently.

In some embodiments the second action includes (1516): displaying, on the display, a subscription user interface for resubscribing to the subscription service, including a selectable option, which when selected, initiates a process for resubscribing to the subscription service (1518), such as in FIG. 14G. In some embodiments, if the user does not have a subscription to the subscription service, displaying a subscription splash page that informs the user that the user must re-subscribe to the subscription service in order to access the requested application and provides information to the user on the pricing for re-subscribing. In some embodiments, the subscription splash page includes a button that initiates the process for re-subscribing to the subscription service. For example, the user previously had a subscription to the subscription service and downloaded and installed the first application, and the subscription lapsed or was cancelled. In such examples, if the user attempts to launch the first application, the device will determine that the user previously had a subscription, but the subscription is now no longer in effect, in which case the use is required to re-subscribe to regain access to the first application.

The above-described manner of re-subscribing to the subscription service (e.g., by displaying a subscription service user information which allows the user to re-subscribe to the subscription service in response to the user attempting to access a subscription application when the user no longer has a valid subscription to the subscription service) allows the electronic device to provide the user with a simple user interface for re-subscribing to the subscription service (e.g., by automatically displaying information about the subscription service with an option to re-subscribe when the user has shown a desire to access a subscription application), which simplifies the interaction between the user and the electronic device and enhances the operability of the electronic device and makes the user-device interface more efficient (e.g., without requiring the user to separately determine that the first application is a subscription application and navigate to a separate user interface to re-subscribe to the subscription service before attempting to launch the first application), which additionally reduces power usage and improves battery life of the electronic device by enabling the user to use the electronic device more quickly and efficiently.

In some embodiments, subscription user interface for resubscribing to the subscription service includes a plurality of representations of subscription applications, including a representation of the first application (1520), such as in FIG. 14G. In some embodiments, the subscription service user interface includes a number of icons of applications that are included in the subscription service. In some embodiments, an enlarged and/or otherwise visually prioritized icon of the first application is displayed. For example, the representation of the first application can be larger than and in the center of the plurality of other representations of other applications that are included in the subscription service.

The above-described manner of providing information on the subscription service (e.g., by displaying a subscription service user interface which includes icons of some of the applications that are included in the subscription service including a prioritized icon of a respective application) allows the electronic device to provide the user with information about the subscription, allow the user to confirm that the application in which the user is interested is included in the subscription, and to entice the user to re-subscribe to the subscription service (e.g., by displaying the icon of the first application so the user can easily verify that the first application is indeed included in the subscription service and to remind the user that the user desires to access the first application and re-subscribing to the subscription service will provide the user with that access), which simplifies the interaction between the user and the electronic device and enhances the operability of the electronic device and makes the user-device interface more efficient (e.g., by providing the user with a single interface in which the user can receiving information and pricing information on the subscription service, while also verifying that the subscription service is something that the user is interested in), which additionally reduces power usage and improves battery life of the electronic device by enabling the user to use the electronic device more quickly and efficiently while reducing errors in the usage of the device.

In some embodiments, while displaying the subscription user interface for resubscribing to the subscription service, the electronic device receives (1522), via the one or more input devices, a user input corresponding to a request to resubscribe to the subscription service, such as in FIG. 14G (e.g., the user taps on the button to re-subscribe to the subscription service). In some embodiments, in response to receiving the user input corresponding to the request to resubscribe to the subscription service, the electronic device initiates (1524) the process for resubscribing the user of the electronic device to the subscription service, such as in FIG. 14H (e.g., resubscribing the user to the subscription service). In some embodiments, resubscribing includes providing a purchase confirmation user interface. In some embodiments, resubscribing includes authorizing a charge on the user's account.

The above-described manner of resubscribing to the subscription service (e.g., by resubscribing the user to the subscription service) allows the electronic device to provide the user with the ability to access subscription applications (e.g., by determining whether a subscription is required for the respective application and then re-subscribing the user to the appropriate subscription service), which simplifies the interaction between the user and the electronic device and enhances the operability of the electronic device and makes the user-device interface more efficient (e.g., by re-subscribing the user to the subscription service without requiring the user to separately research or determine whether the first application requires a subscription to a subscription service and navigate to a separate user interface to resubscribe to the subscription service), which additionally reduces power usage and improves battery life of the electronic device by enabling the user to use the electronic device more quickly and efficiently while reducing errors in the usage of the device.

In some embodiments, the process for resubscribing the user to the subscription service includes (1526): in response to receiving the user input corresponding to the request to resubscribe to the subscription service, displaying, on the display, a purchase confirmation user interface (1528), such as in FIG. 14H (e.g., displaying a popup or drawer which requires the user to provide one or more user inputs to confirm the user's intent to purchase a subscription to the subscription service). In some embodiments, the purchase confirmation user interface provides information regarding what the user is agreeing to, such as that the purchase is for a re-subscription to the subscription service and the price that is charged to maintain the subscription to the subscription service. In some embodiments, the process includes while displaying the purchase confirmation user interface, receiving, via the one or more input devices, a user input corresponding to a confirmation to resubscribe to the subscription service (1530), such as in FIG. 14H (e.g., receiving one or more user inputs, such as a tap on an authorization button, or a double-click on a physical button on the electronic device, to indicate authorization to resubscribe to the subscription service). In some embodiments, the process includes in response to receiving the user input corresponding to the confirmation to resubscribe to the subscription service, resubscribing the user of the electronic device to the subscription service (1532), such as in FIG. 14I. In some embodiments, the process includes after receiving authorization and/or confirmation to resubscribe, then resubscribing the user to the subscription service. In some embodiments, resubscribing the user includes authorizing a charge to the user's selected payment method. In some embodiments, resubscribing includes enabling access to the first application.

The above-described manner of confirming purchase of a subscription to a subscription service (e.g., by displaying a purchase confirmation user interface and receiving a confirmation that authorizes the device to resubscribe the user to the subscription service) allows the electronic device to provide the user with the ability to confirm the user's intent to resubscribe to the subscription service (e.g., by providing a final confirmation page before the user is charged for the transaction), which simplifies the interaction between the user and the electronic device and enhances the operability of the electronic device and makes the user-device interface more efficient (e.g., by providing the user a final opportunity to confirm whether to authorize the transaction and to indicate to the user that a purchase transaction will be initiated upon confirmation), which additionally reduces power usage and improves battery life of the electronic device by enabling the user to use the electronic device more quickly and efficiently while reducing errors in the usage of the device.

In some embodiments, while displaying the application launching user interface, the electronic device receives (1534), via the one or more input devices, a second user input selecting a second representation of the one or more representations corresponding to a second application, such as in FIG. 14B (e.g., a user input on the touch screen selecting (e.g., tap or long press) a second application). In some embodiments, in response to receiving the second user input selecting the second representation (1536): in accordance with a determination that the second application is a non-subscription application, the electronic device displays (1538), on the display, a user interface of the second application independent of whether the user of the electronic device has the subscription with the subscription service, such as in FIG. 14C. In some embodiments, if the second application is not a subscription application, then selection of the second application's icon causes launching or otherwise displaying of the second application. In some embodiments, because the second application is not a subscription application, the electronic device does not determine whether the user has a subscription to the subscription service. In some embodiments, because the second application is not a subscription application, the electronic device does not initiate a process for subscribing to the subscription service. In other words, the second application is agnostic to whether the user has a subscription to the subscription service and selecting the second application will not cause any actions related to the user's subscription to the subscription service.

The above-described manner of launching a non-subscription application (e.g., by determining that the application is not a subscription application and launching it without determining whether the user has a subscription with the subscription service) allows the electronic device to provide the user with the ability to launch subscription and non-subscription applications (e.g., by automatically determining the applications that require a subscription and the applications that do not require a subscription and not checking for or requiring that the user subscribe to a subscription process if the requested application does not require a subscription to a subscription service), which simplifies the interaction between the user and the electronic device and enhances the operability of the electronic device and makes the user-device interface more efficient (e.g., by forgoing determining whether the user has a subscription to the subscription service and also by avoiding unnecessarily requiring the user to confirm whether the user has a subscription), which additionally reduces power usage and improves battery life of the electronic device by enabling the user to use the electronic device more quickly and efficiently while reducing errors in the usage of the device.

In some embodiments, in response to receiving the second user input selecting the second representation (1540): in accordance with a determination that the second application is a subscription application (1542) (e.g., the second application is only available via a subscription service.): in accordance with a determination that the user of the electronic device has the subscription with the subscription service, the electronic device performs (1544) a third action corresponding to the user of the electronic device having the subscription with the subscription service, such as in FIG. 14E. In some embodiments, if the second application is a subscription-based application and the user has a subscription to the respective subscription service, then launch, execute, or otherwise display the second application. In some embodiments, if the second application is already running on the electronic device (e.g., as a background process or otherwise in an inactive state), then display the second application (e.g., promote the application to an active process and/or display an interface of the application that was previously displayed by the application (e.g., when the user navigated away from the application or otherwise demoted the application to a background process)). In some embodiments, in accordance with a determination that the user of the electronic device does not have the subscription with the subscription service, the electronic device performs (1546) a fourth action, different from the first action, corresponding to the user of the electronic device not having the subscription with the subscription service, such as in FIG. 14G. In some embodiments, if the second application is a subscription-based application and the user does not have a current subscription to the respective subscription service, then do not immediately launch, execute, or display the second application. In some embodiments, in response to the user selecting the second application, the electronic device displays a user interface suggesting to the user to subscribe to the respective subscription service (e.g., in order to enable access to the application). In some embodiments, the electronic device displays an application store user interface for subscribing to the subscription service. In some embodiments, after successfully subscribing to the subscription service, the second application will then launch (e.g., execute, run).

The above-described manner of accessing a subscription-based application (e.g., by performing a third action, such as launching the application, if the user has a subscription to the respective subscription service or by performing a fourth, different, action, such as suggesting to the user to purchase a subscription to the subscription service, if the user does not currently have a subscription to the respective subscription service) allows the electronic device to provide the user with the ability to access subscription-based applications (e.g., by automatically determining whether the user has a subscription to the respective subscription service and launching the application if the user does have a subscription and providing an interface for the user to subscribe to the subscription service if the user does not have the proper subscription), which simplifies the interaction between the user and the electronic device and enhances the operability of the electronic device and makes the user-device interface more efficient (e.g., by automatically determining the action required to quickly access the respective application without requiring the user to separately determine whether the required application is a subscription-based application, separately determining whether the user already has a subscription to the appropriate subscription service, and navigating to a separate interface to subscribe to the subscription service if the user does not already have a subscription to the appropriate subscription service), which additionally reduces power usage and improves battery life of the electronic device by enabling the user to use the electronic device more quickly and efficiently while reducing errors in the usage of the device.

In some embodiments, while the application launching user interface includes a respective representation of a respective application, the electronic device receives (1548), via the one or more input devices, a sequence of one or more inputs corresponding to a request to remove access to the respective application, such as in FIG. 14K (e.g., deleting, requesting to delete, unsubscribing to a subscription service, or otherwise requesting to remove access to the respective application). In some embodiments, requesting to remove access includes deleting or uninstalling a respective application. In some embodiments, requesting to remove access to a respective application includes cancelling a subscription to a subscription service if the respective application is a subscription application whose access is granted via a subscription to the subscription service. In some embodiments, in response to receiving the sequence of one or more inputs corresponding to the request to remove access to the respective application (1550): the electronic device removes (1552), at the electronic device, access to the respective application, such as in FIG. 14L-14M. In some embodiments, if the request to remove access was to uninstall or delete the respective application, then the electronic device uninstalls or deletes the respective application. In some embodiments, if the request was to cancel a subscription to a subscription service, then cancel the subscription to the subscription service. In some embodiments, when access is removed to the respective application, the user can no longer launch or otherwise access the respective application, even if the application is still installed onto the electronic device and otherwise accessible (e.g., but for the lack of a subscription to a subscription service). In some embodiments, in accordance with a determination that the respective application is not a subscription application, the electronic device removes (1554) the respective application from the electronic device, including removing a respective representation corresponding to the respective application from the application launching user interface, such as in FIG. 14L. In some embodiments, if the respective application is a non-subscription application, then requesting to remove the respective application includes requesting to delete or otherwise uninstall the application from the electronic device. In some embodiments, deleting or otherwise uninstalling the application includes removing the application from the application launching user interface such that the user can no longer select the application to launch. In some embodiments, in accordance with a determination that the respective application is a subscription application, the electronic device forgoes (1556) removing the respective application from the electronic device, including forgoing removing the respective representation corresponding to the respective application from the application launching user interface, such as in FIG. 14M. In some embodiments, if the respective application is a subscription application, then requesting to remove the respective application includes cancelling the subscription to the subscription service. In some embodiments, as a result of cancelling the subscription to the subscription service, the respective application is not removed from the application launching user interface. In other words, even after the subscription has lapsed, a user can select the icon for the respective application to request launch of the application (e.g., which could otherwise launch but for the lack of a subscription to the subscription service). In some embodiments, the respective application remains installed on the electronic device. However, as described above, in some embodiments, the user no longer has access to the application and selection of the application would not cause launching of the application (e.g., unless the user re-acquires a subscription to the subscription service). In some embodiments, to uninstall or otherwise remove a subscription application from the electronic device, the user must request deletion of the subscription application rather than requesting removal of access to the subscription application.

The above-described manner of preserving the icon of a subscription application after removal of access (e.g., by removing the icon of a non-subscription application upon request for removal of access, but forgoing removing the icon of a subscription application when the user requests removal of access) allows the electronic device to provide the user with the ability to request access the subscription-based application (e.g., by preserving the icon in the application launching user interface, which allows the user to interact with the icon and request to launch the respective application), which simplifies the interaction between the user and the electronic device and enhances the operability of the electronic device and makes the user-device interface more efficient (e.g., by not deleting and removing the icon of a subscription application without the user's explicit request to delete and remove the icon or the subscription application and provide the user with another method in which the user can re-subscribe to the subscription service), which additionally reduces power usage and improves battery life of the electronic device by enabling the user to use the electronic device more quickly and efficiently while reducing errors in the usage of the device.

In some embodiments, after removing access to the respective application, the electronic device receives (1558), via the one or more input devices, a second user input selecting the respective representation corresponding to the respective application on the application launching user interface, such as in FIG. 14F. In some embodiments, after removing access to the subscription application and while the subscription application is still installed on the device, the electronic device receives a user input on the touch screen selecting (e.g., tap or long press) a subscription application. In some embodiments, in response to receiving the second user input selecting the respective representation corresponding to the respective application, the electronic device displays (1560), on the display, a subscription user interface for resubscribing to the subscription service, including a selectable option, which when selected, initiates a process for resubscribing to the subscription service, such as in FIG. 14G. In some embodiments, because the user does not have a subscription to the subscription service, displaying a subscription splash page that informs the user that the user must re-subscribe to the subscription service in order to access the subscription application and provides information to the user on the pricing for re-subscribing. In some embodiments, the subscription splash page includes a button that initiates the process for re-subscribing to the subscription service.

The above-described manner of re-subscribing to the subscription service (e.g., by displaying a subscription service user information which allows the user to re-subscribe to the subscription service in response to the user attempting to access a subscription application when the user no longer has a valid subscription to the subscription service) allows the electronic device to provide the user with a simple user interface for re-subscribing to the subscription service (e.g., by automatically displaying information about the subscription service with an option to re-subscribe when the user has shown a desire to access a subscription application), which simplifies the interaction between the user and the electronic device and enhances the operability of the electronic device and makes the user-device interface more efficient (e.g., without requiring the user to navigate to a separate user interface to re-subscribe to the subscription service before attempting to launch the subscription application), which additionally reduces power usage and improves battery life of the electronic device by enabling the user to use the electronic device more quickly and efficiently.

In some embodiments, after removing access to the respective application, the electronic device receives (1562), via the one or more input devices, a sequence of one or more inputs corresponding to a request to remove the respective representation corresponding to the respective application from the application launching user interface, such as in FIG. 14N. In some embodiments, after cancelling the subscription to the subscription service and while the respective application is still installed on the electronic device, the electronic device receives a user input requesting removal of the respective application from the electronic device. In some embodiments, the request to remove the respective application from the electronic device is the same request as to remove the application from the application launching user interface. In some embodiments, in response to receiving the sequence of one or more inputs corresponding to the request to remove the respective representation, the electronic device removes (1564) the respective application from the electronic device, including removing the respective representation corresponding to the respective application from the application launching user interface, such as in FIG. 14O (e.g., uninstalling or otherwise deleting the respective application from the electronic device). In some embodiments, uninstalling the respective application causes the application to be removed from the application launching user interface. It is understood that removing or uninstalling a subscription application is not a request to remove access to the subscription service. In other words, in some embodiments, if the user has a subscription to the subscription service and requests to remove a respective subscription application, the electronic device will uninstall the respective subscription application but will not cause the subscription to the subscription service to be cancelled. Thus, in such embodiments, the user can re-download and install the removed subscription application for as long as the user's subscription to the subscription service remains valid.

The above-described manner of removing a subscription application (e.g., by receiving a user input requesting removal of the respective subscription application and then removing the subscription application from the electronic device and from the application launcher user interface) allows the electronic device to provide the user with agency in removing applications from the electronic device (e.g., by only removing the subscription application from the electronic device in response to receiving an explicit request to remove the application and not removing the application when the request is only to remove access to the subscription application), which simplifies the interaction between the user and the electronic device and enhances the operability of the electronic device and makes the user-device interface more efficient (e.g., by providing a direct cause-and-effect for removing the subscription application and not removing the application after removing access to the application without giving the user any notice that the subscription application would be removed), which additionally reduces power usage and improves battery life of the electronic device by enabling the user to use the electronic device more quickly and efficiently.

In some embodiments, when the user input selecting the first representation was received, the first application was installed on the electronic device (1566), such as in FIG. 14A. In some embodiments, the application was downloaded and installed on the electronic device when the user requested for access to the application to be removed. In some embodiments, when the application is installed on the electronic device, the application launching user interface includes a representation of the application and selection of the representation causes the application to launch. In some embodiments, if the application is a subscription application, selection of the representation causes the device to determine whether the user of the electronic device has a valid subscription to the subscription service before determining whether to launch the first application.

The above-described manner of maintaining the installation of a subscription application on the electronic device (e.g., by not automatically removing or uninstalling the subscription application when the subscription lapses) allows the electronic device to provide the user with the ability to request access to the subscription application (e.g., by maintaining the installation of the subscription service despite changes in the user's subscription status), which simplifies the interaction between the user and the electronic device and enhances the operability of the electronic device and makes the user-device interface more efficient (e.g., by avoiding the need to uninstall and reinstall subscription games every time the user's subscription status changes), which additionally reduces power usage and improves battery life of the electronic device by enabling the user to use the electronic device more quickly and efficiently.

In some embodiments, before receiving the user input selecting the first representation, the first application was installed on the electronic device when the user of the electronic device had the subscription with the subscription service (1568), such as in FIG. 14A. In some embodiments, if the first application is a subscription application, then the first application can only be downloaded and installed when the user has a valid subscription to the subscription service. In some embodiments, a user request to download and/or install a subscription application will cause the user to be prompted to subscribe to the subscription service. In some embodiments, installing the first application on the electronic device included adding the first representation of the first application to the application launching user interface (1570), such as in FIG. 14A. In some embodiments, applications that are installed on the electronic device appear in the application launching user interface. In some embodiments, selecting a respective application in the application launching user interface causes the selected application to be launched. In some embodiments, if the selected application is a subscription application, then further requirements must be met in order for the application to launch (e.g., that the user has a valid subscription to the subscription service). In some embodiments, the user's subscription to the subscription service can be cancelled or lapse, in which case the installed application remains installed on the electronic device. In some embodiments, in order to remove or uninstall the subscription application after the subscription service ends, the user must provide an explicit request (e.g., another user input) to remove the application (e.g., the lapse or cancellation of the subscription service corresponding to a request to remove access is insufficient to cause the application to be removed).

The above-described manner of installing a subscription application (e.g., by downloading and installing the first application when the user of the electronic device has a subscription to the subscription service that provides access to the subscription application) allows the electronic device to download an application when the application is available for the user to access (e.g., by only downloading the application when the user has a valid subscription so that the user can immediately access, launch, or interact with the application as soon as the downloading and/or installing is completed), which simplifies the interaction between the user and the electronic device and enhances the operability of the electronic device and makes the user-device interface more efficient (e.g., by only downloading the application if the user can currently access the application and avoiding a situation in which an application is downloaded and installed, but the user cannot actually access or launch the application without further subscribing to the subscription service), which additionally reduces power usage and improves battery life of the electronic device by enabling the user to use the electronic device more quickly and efficiently.

It should be understood that the particular order in which the operations in FIGS. 15A-15G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1700, and 1900) are also applicable in an analogous manner to method 1500 described above. For example, the operation of the electronic device for launching and removing a respective application described above with reference to method 1500 optionally has one or more of the characteristics of an application store that are specific to a respective application, user interfaces of an application store that include information about a respective category of applications, user interfaces of an application store for accessing a respective category of applications, visual indications of the number of available updates, user interfaces of a generic application store and a dedicated application store for a respective category of applications, notifications of the completion of a download, etc., described herein with reference to other methods described herein (e.g., methods 700, 900, 1100, 1300, 1700, and 1900). Furthermore, the application store(s) described with reference to method 1500 above optionally has one or more of the features of the application store(s) described with reference to methods 700, 900, 1100, 1300, 1700, and 1900. For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5K) or application specific chips. Further, the operations described with reference to FIGS. 15A-15G are, optionally, implemented by components depicted in FIGS. 1A-1B. For example, displaying operations 1502, 1514, and 1518, receiving operations 1504, 1522, 1530, 1534, 1548, 1558, and 1562, and initiating operations are, optionally, implemented by event sorter 170, event recognizer 180, and event handler 190. When a respective predefined event or subevent is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Transferring Context Between Applications

Users interact with electronic devices in many different manners. In some embodiments, applications are installed onto the electronic devices. In some embodiments, the applications serve any number of purposes from accessing content to receiving information to playing games. In some embodiments, the applications installed onto the electronic devices can be included with the electronic device, purchased and installed onto the electronic device by the user, or can be "rented" or "leased" by the user. In some embodiments, these rented or leased applications can be referred to as subscription applications such that access to the application is granted via a subscription model. In some embodiments, the applications can be purchased and downloaded from an application store installed on the electronic devices. In some embodiments, a generic application store allows a user and browse for any and all applications that can be downloaded onto the electronic device. In some embodiments, a dedicated application store allows a user to browse for a particular type of application. In some embodiments, the generic application store has a user interface that is dedicated to the same type of application that the dedicated application store is for. The embodiments described below provide ways in which an electronic device transfers the context from a generic application store and a dedicated application store, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 16A:
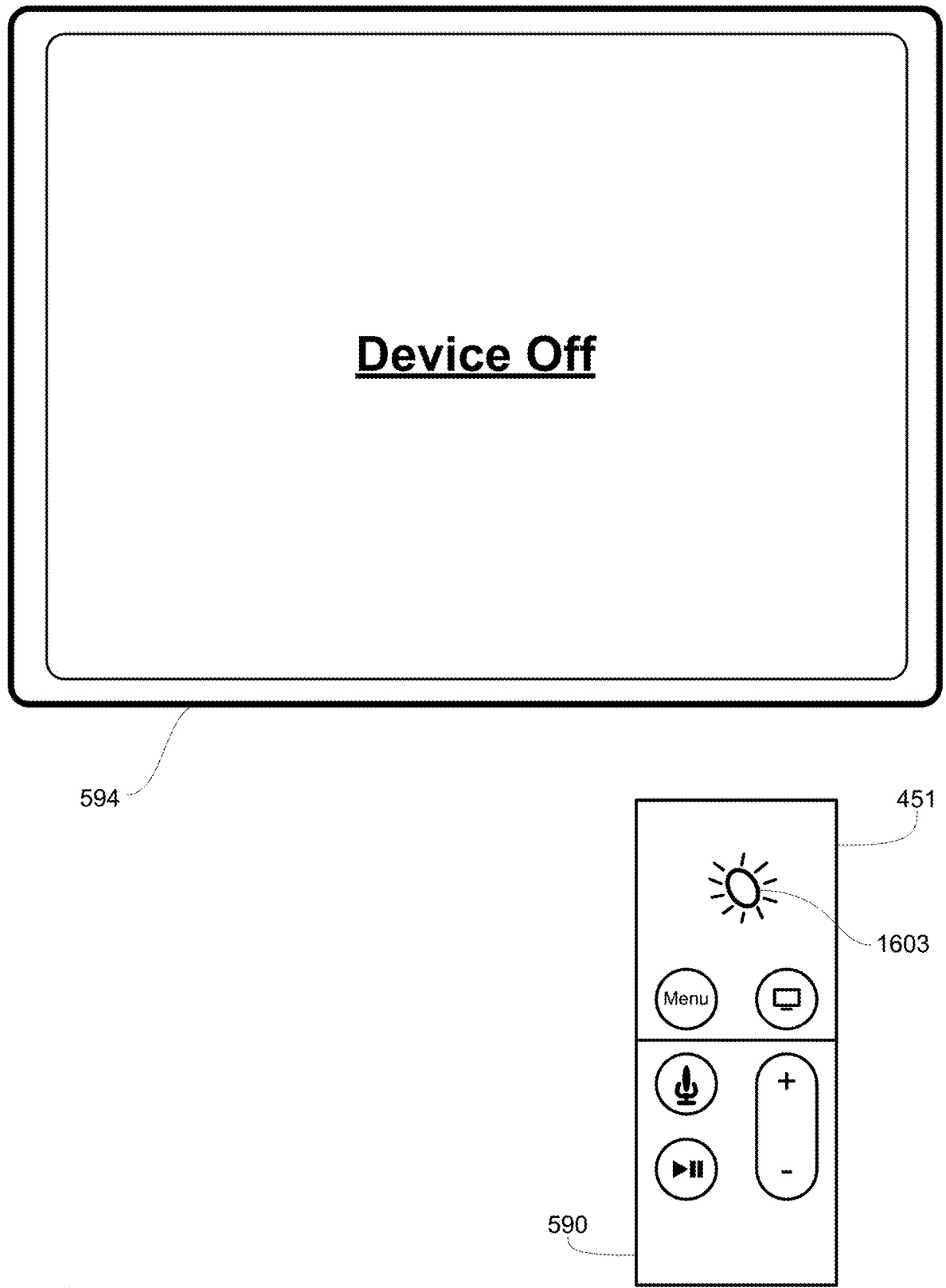
FIGS. 16A-16Y illustrate exemplary ways in which an electronic device transfers context between a generic application store application and a dedicated application store application in accordance with some embodiments.
Figure 16B:
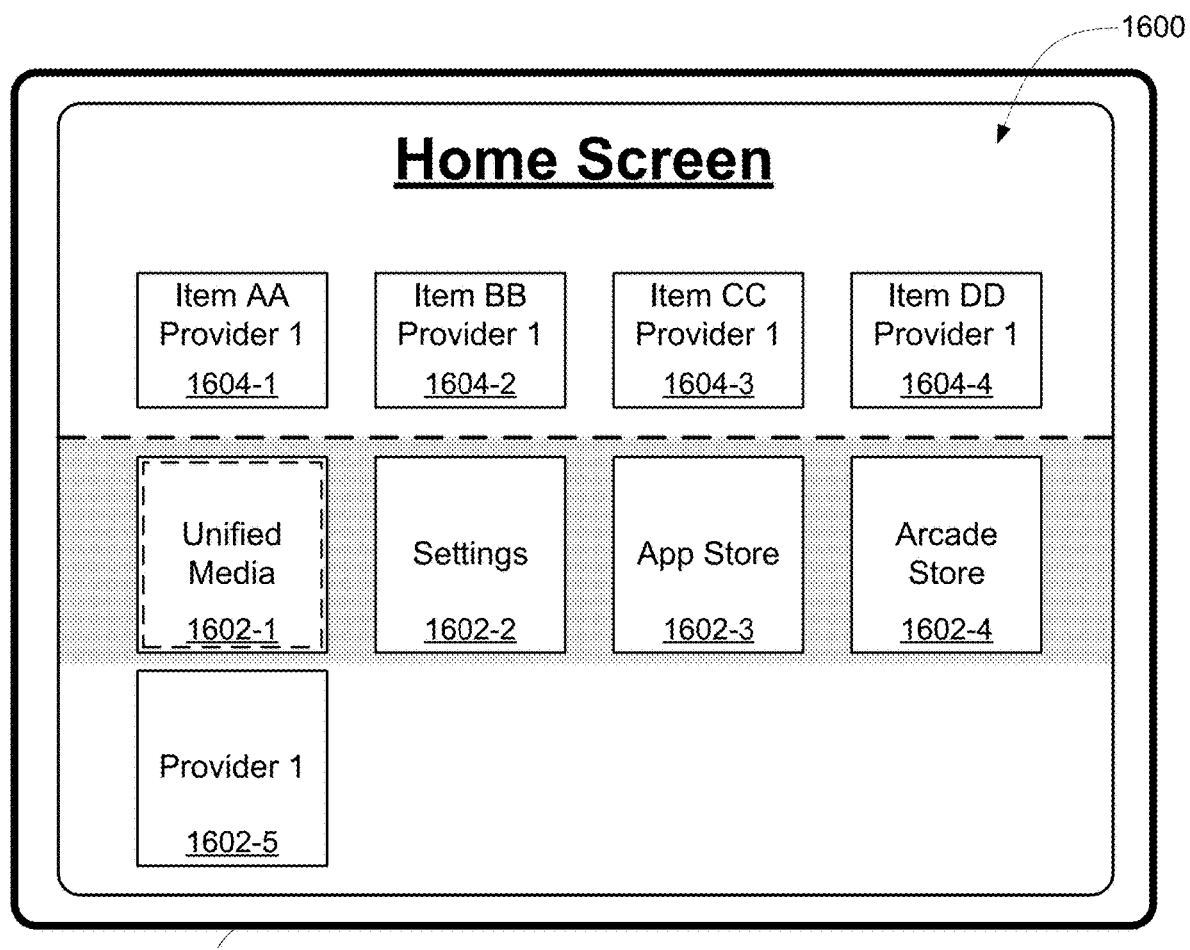
Figure 16B:
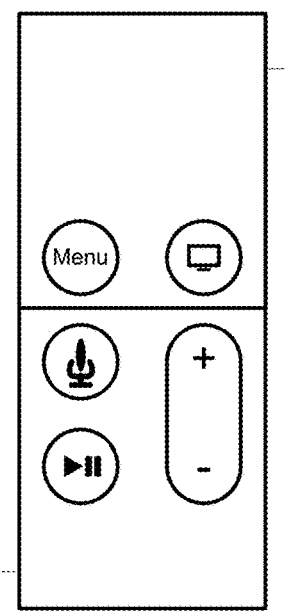
Figure 16C:
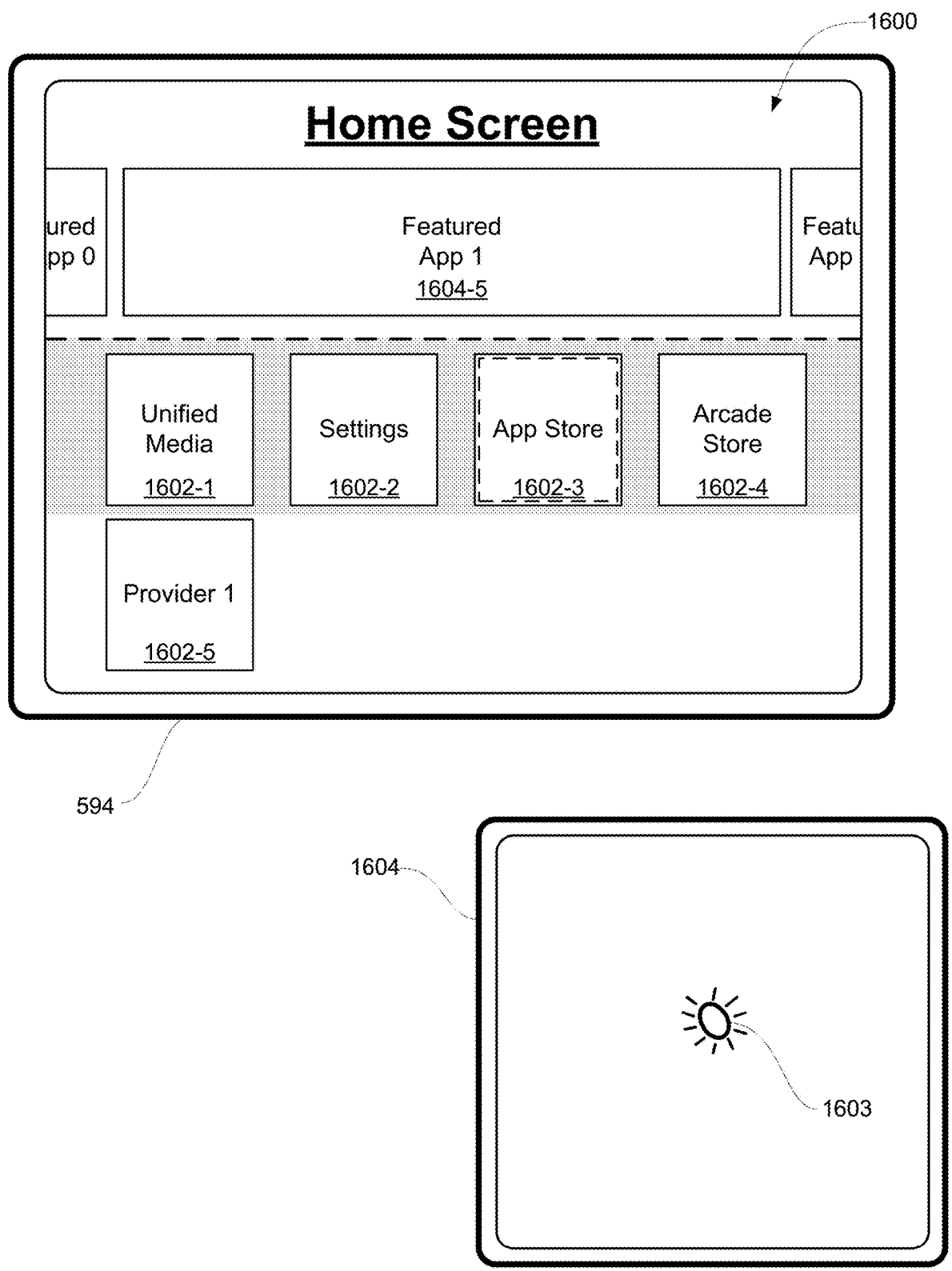
Figure 16D:
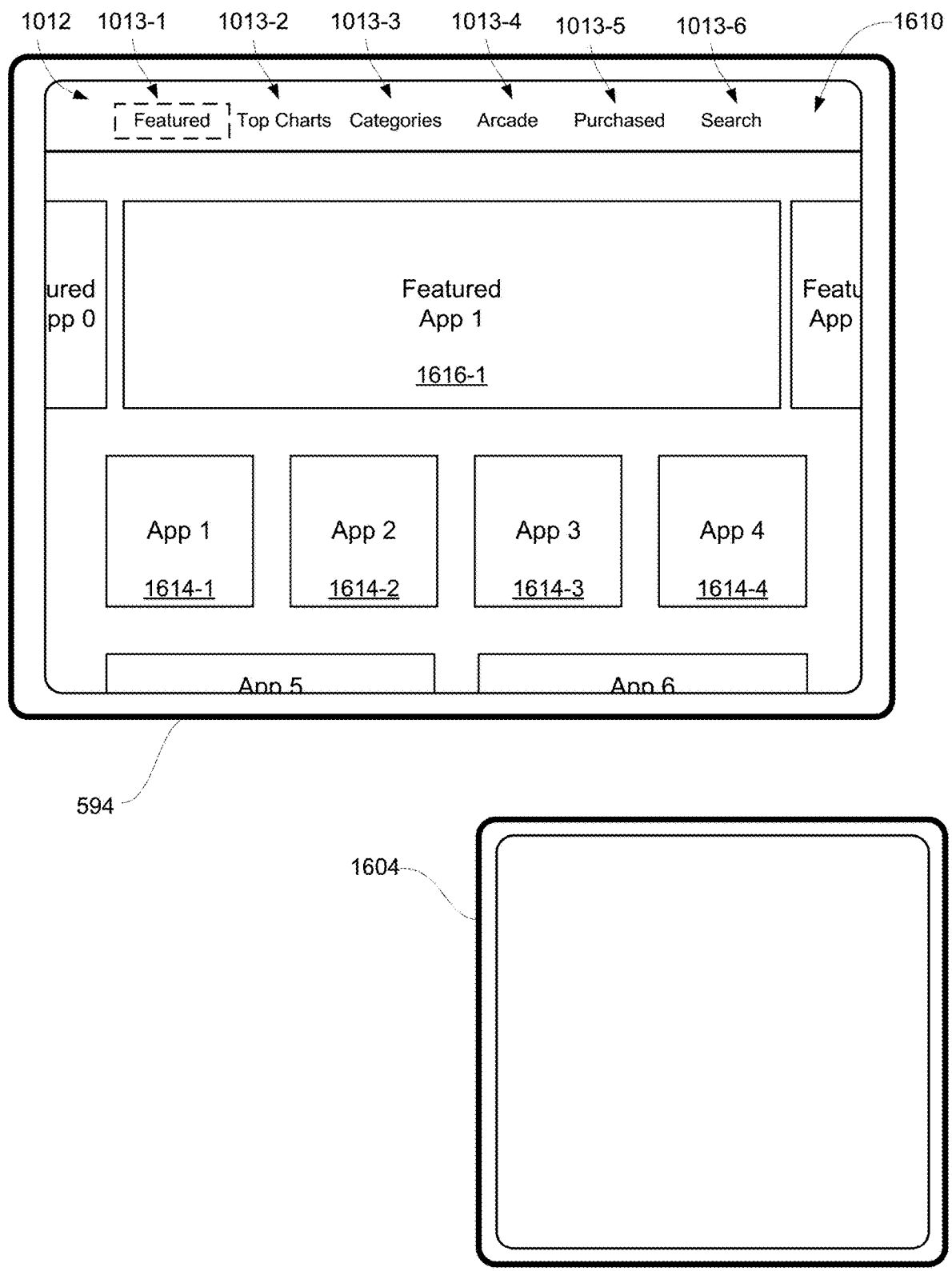
Figure 16E:
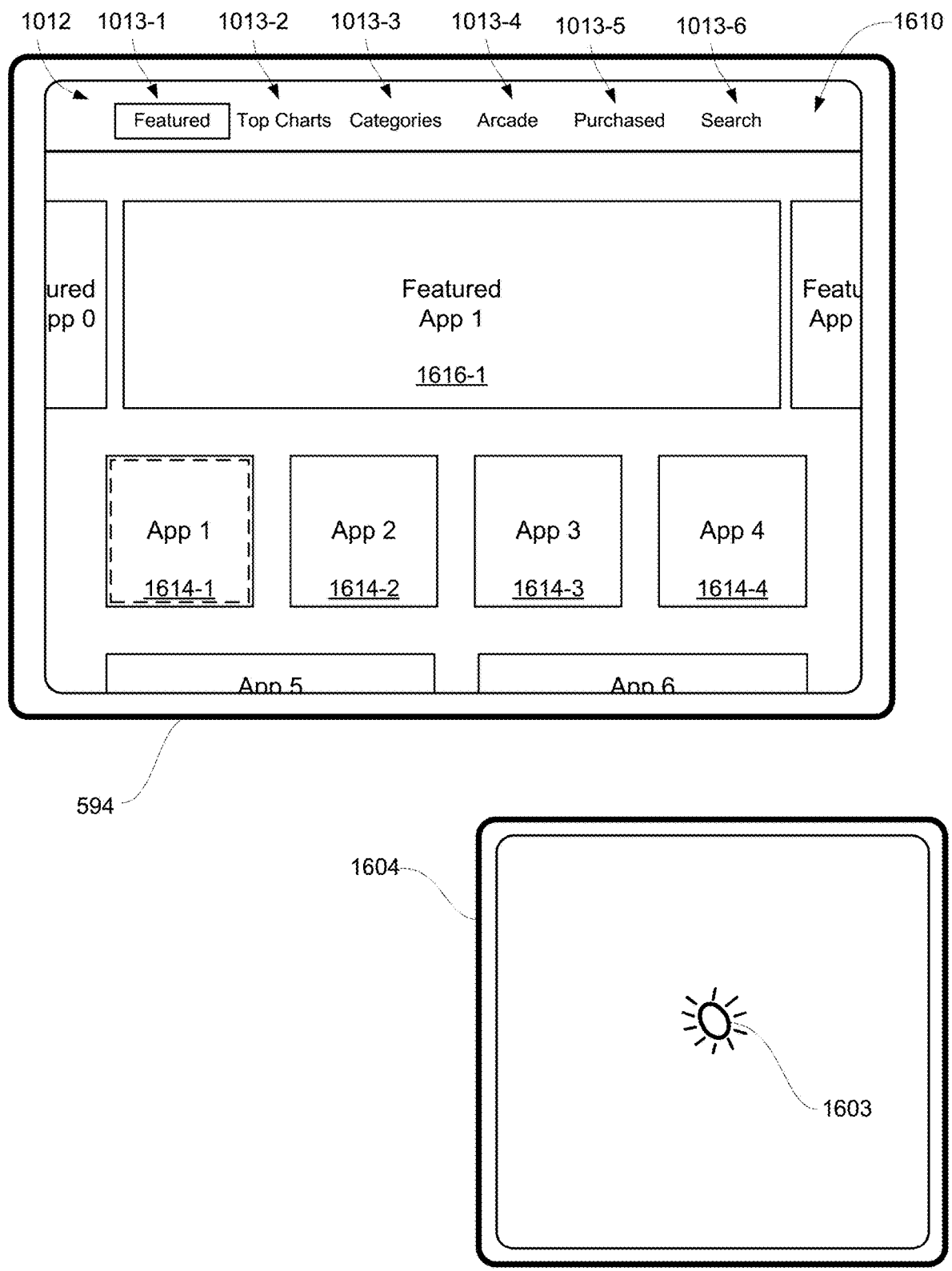
Figure 16F:
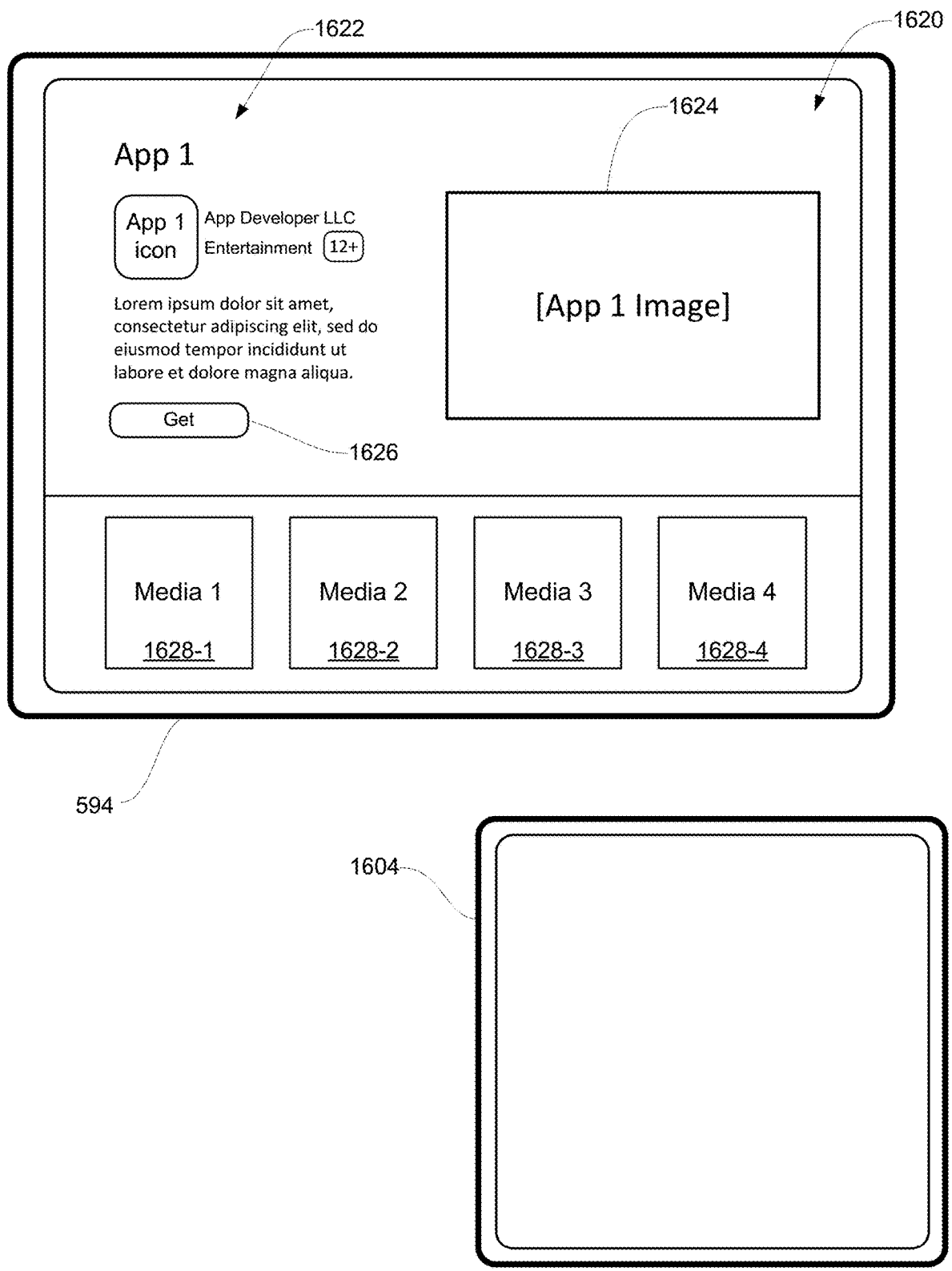
Figure 16G:
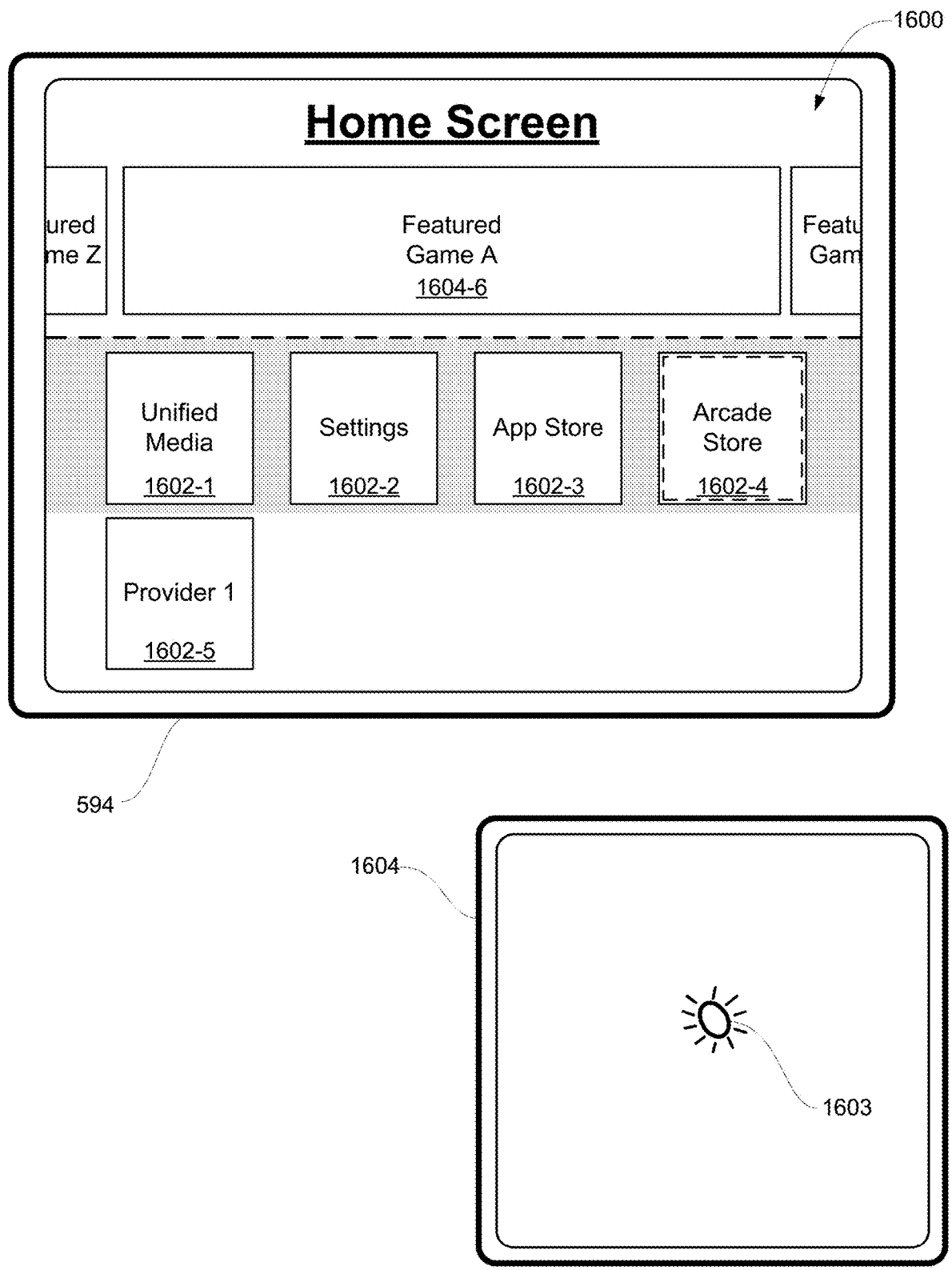
Figure 16H:
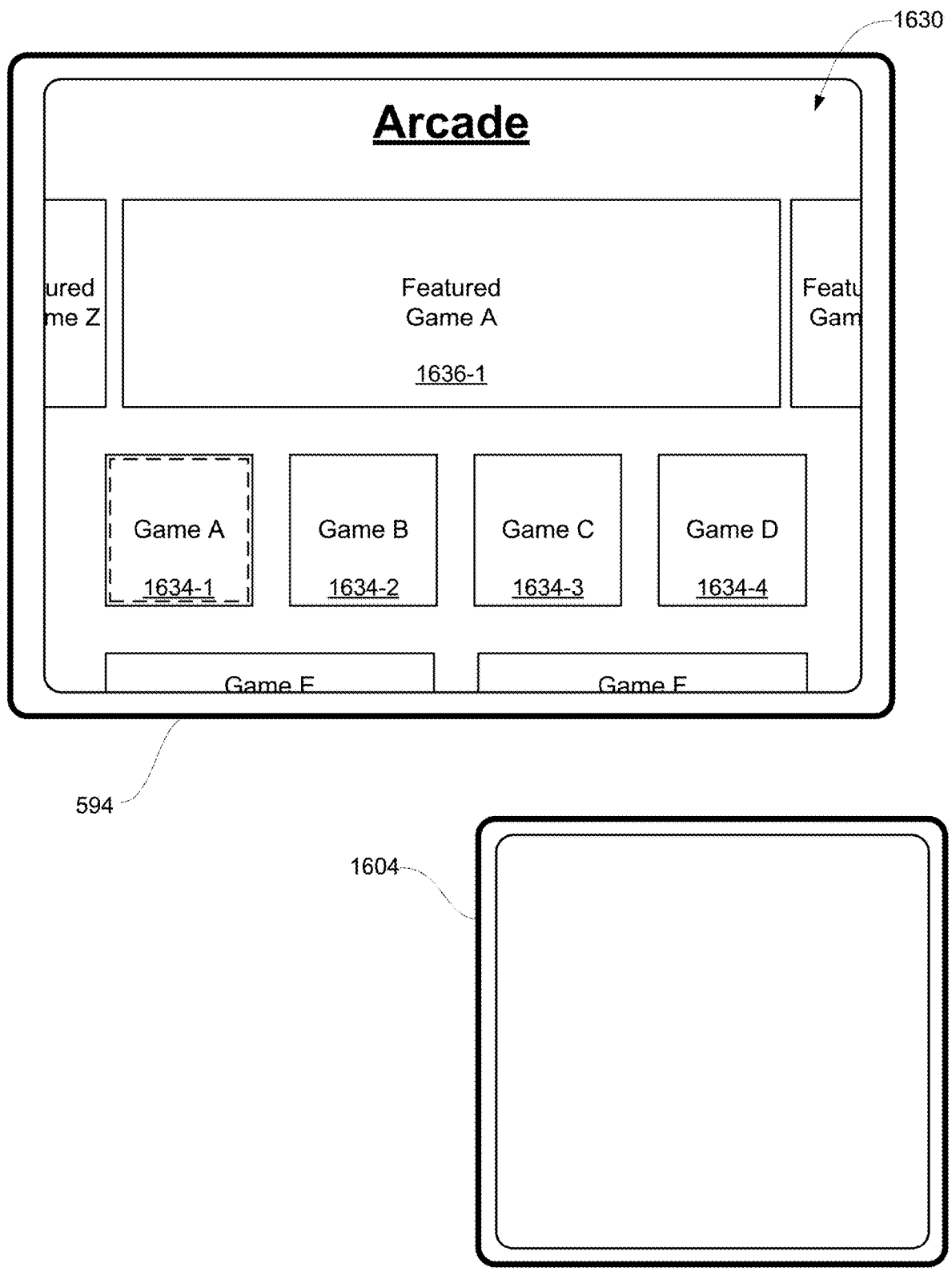
Figure 16I:
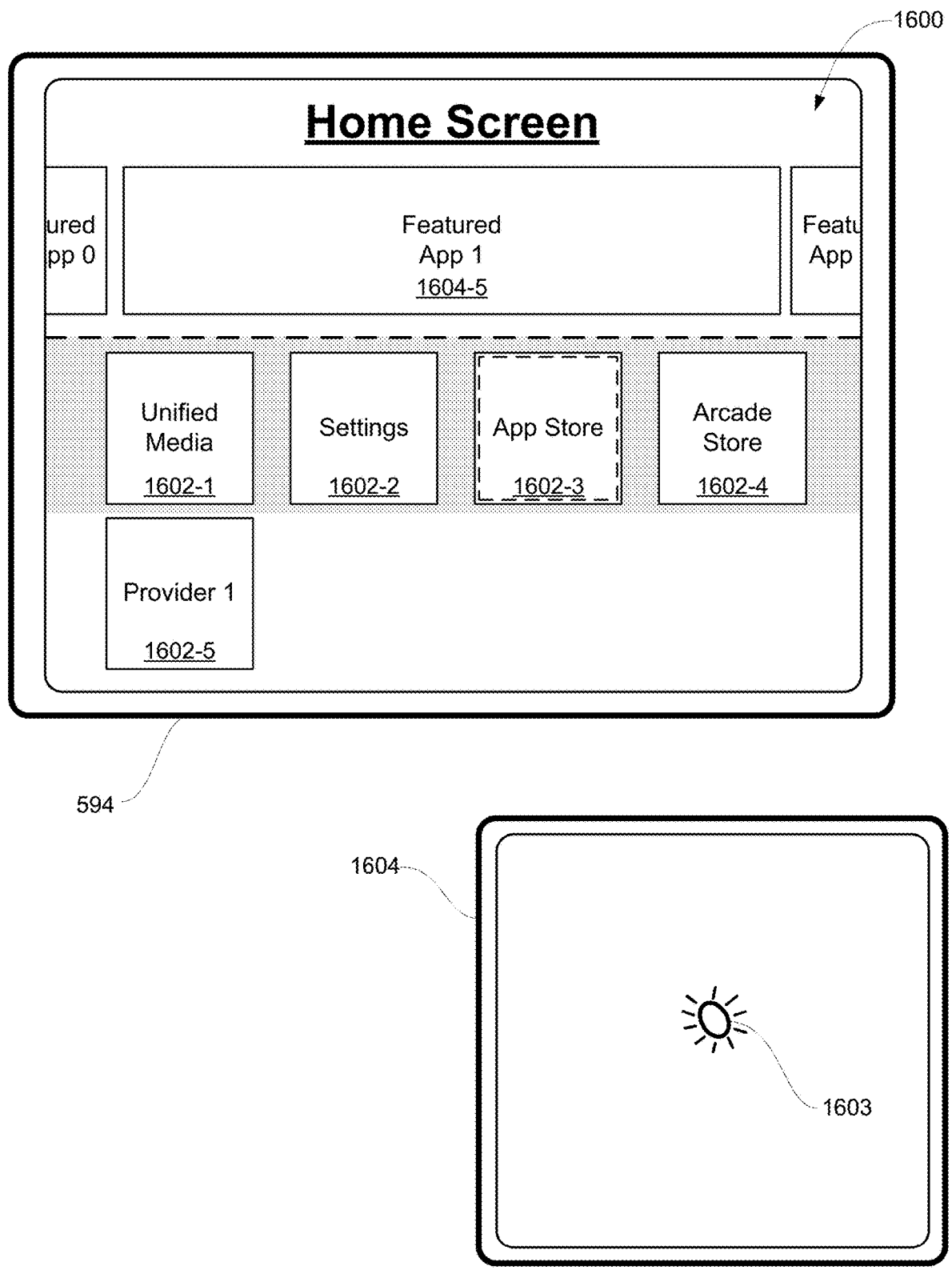
Figure 16J:
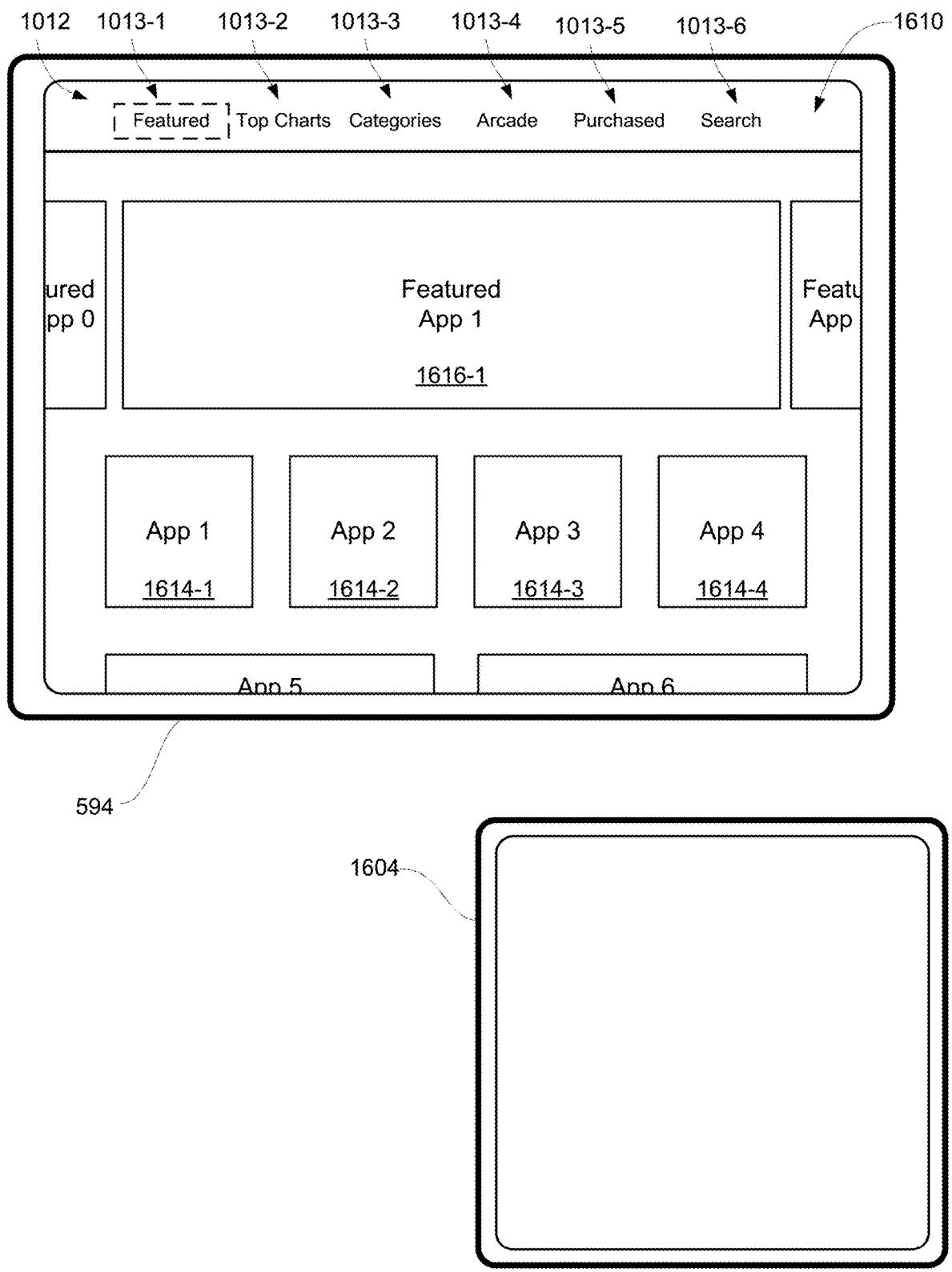
Figure 16K:
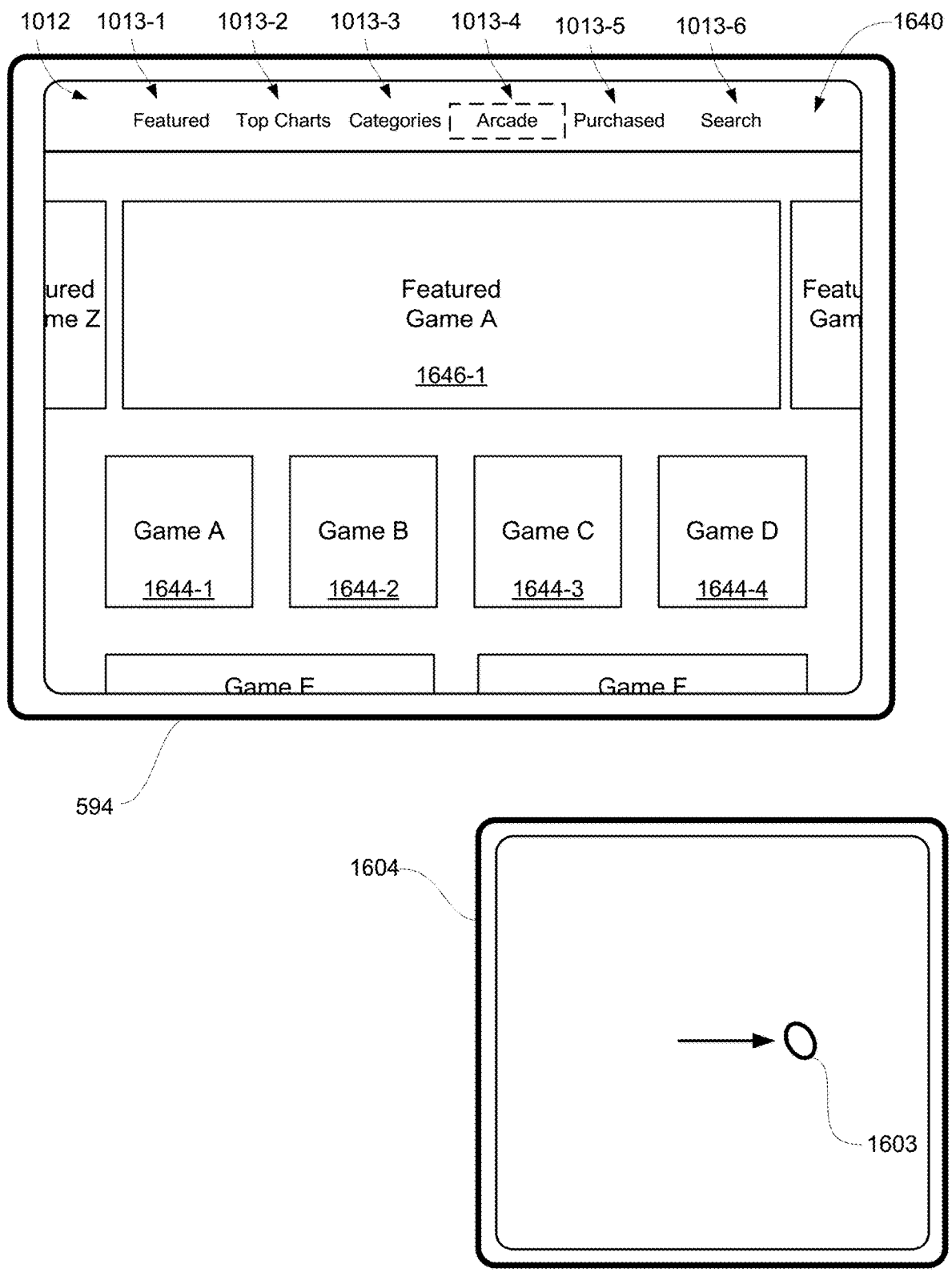
Figure 16L:
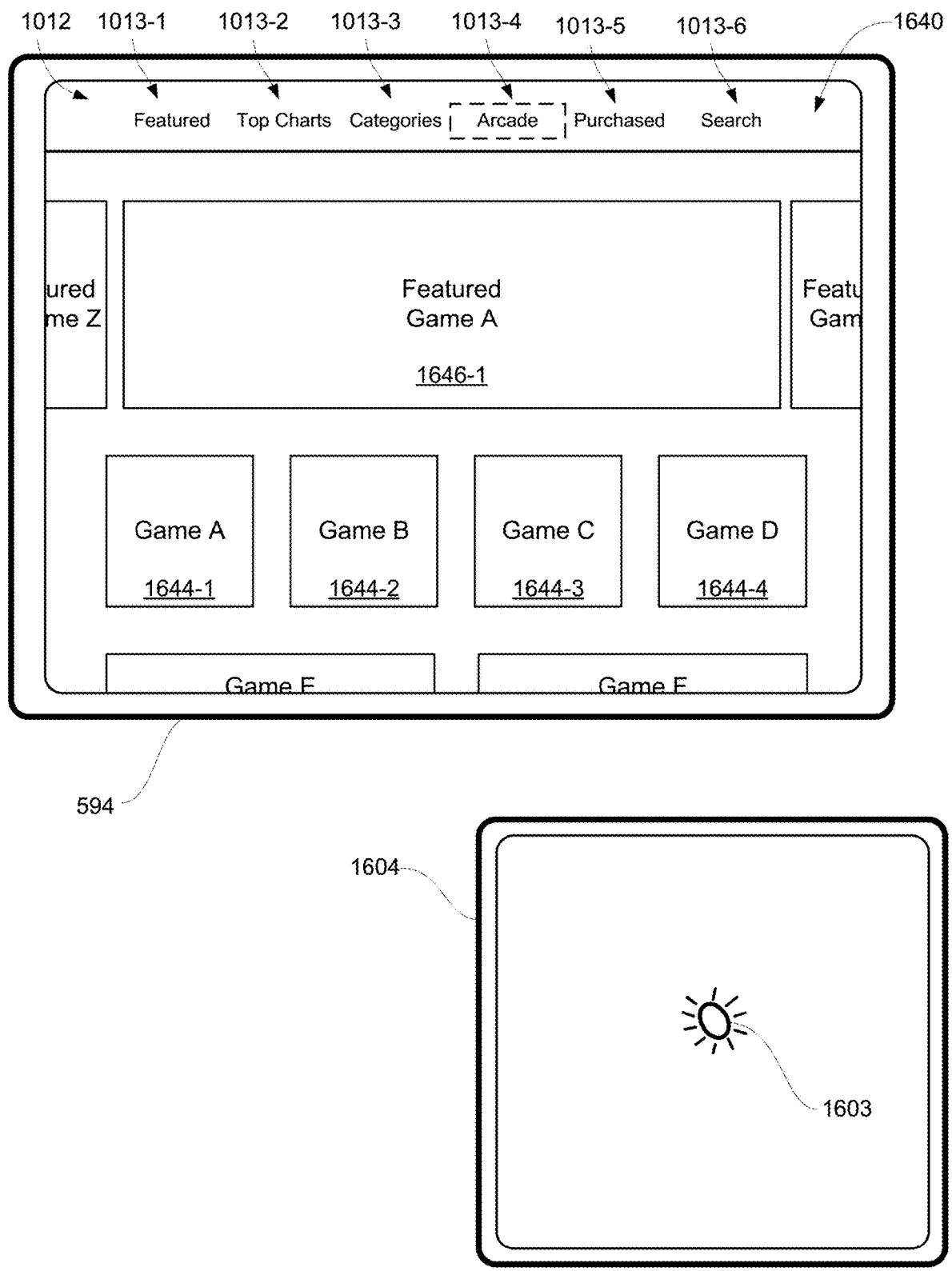
Figure 16M:
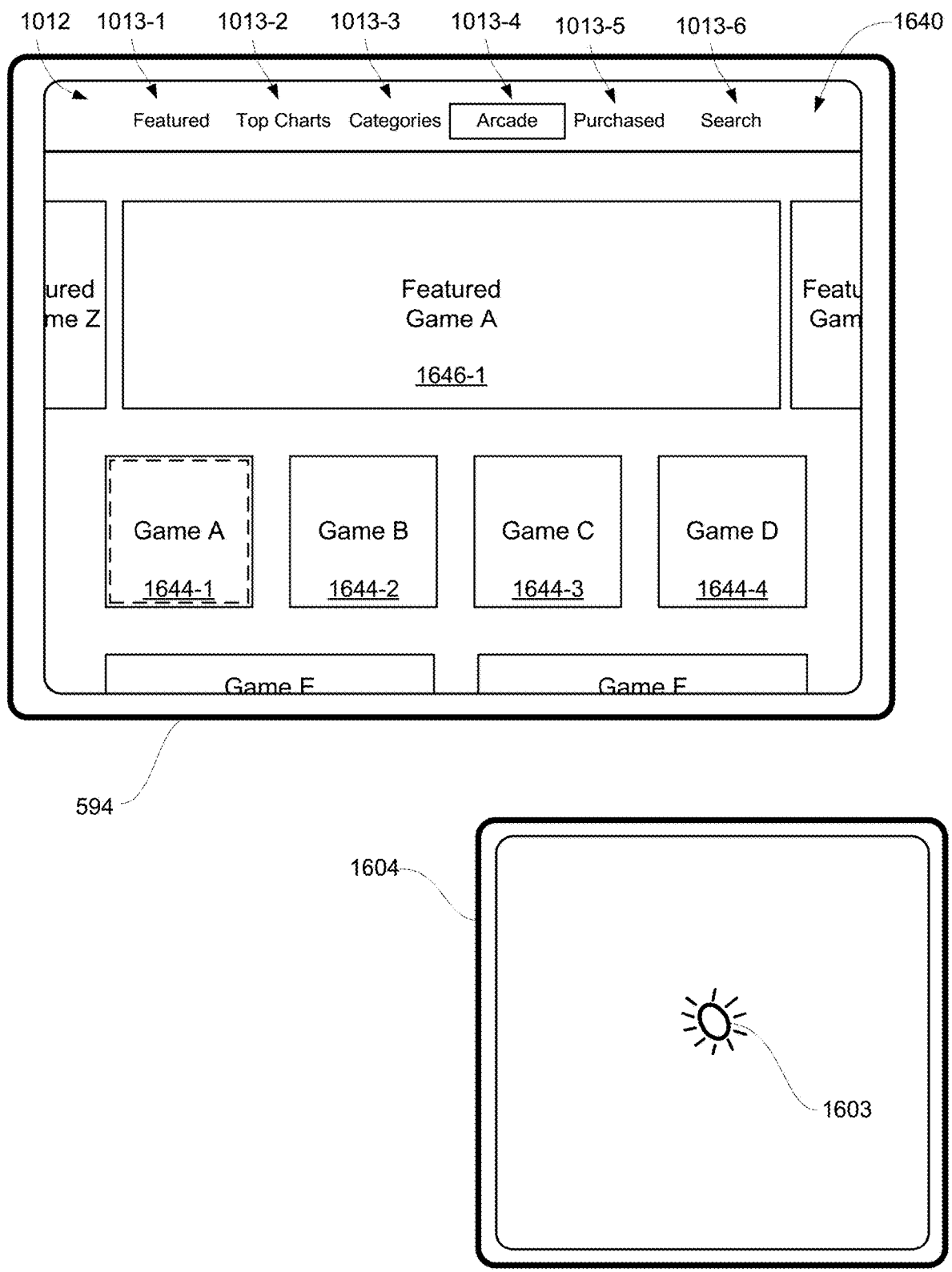
Figure 16N:
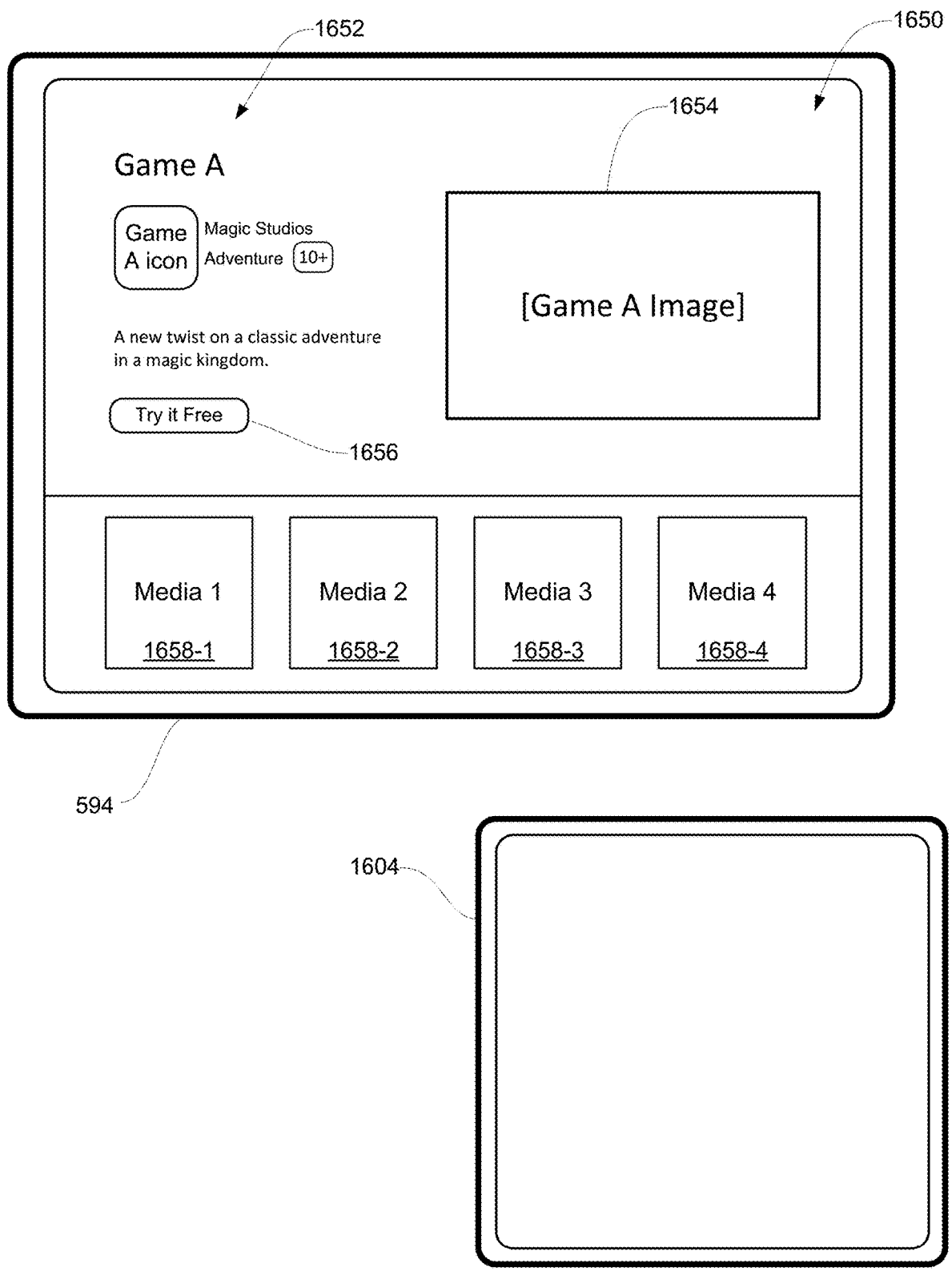
Figure 16O:
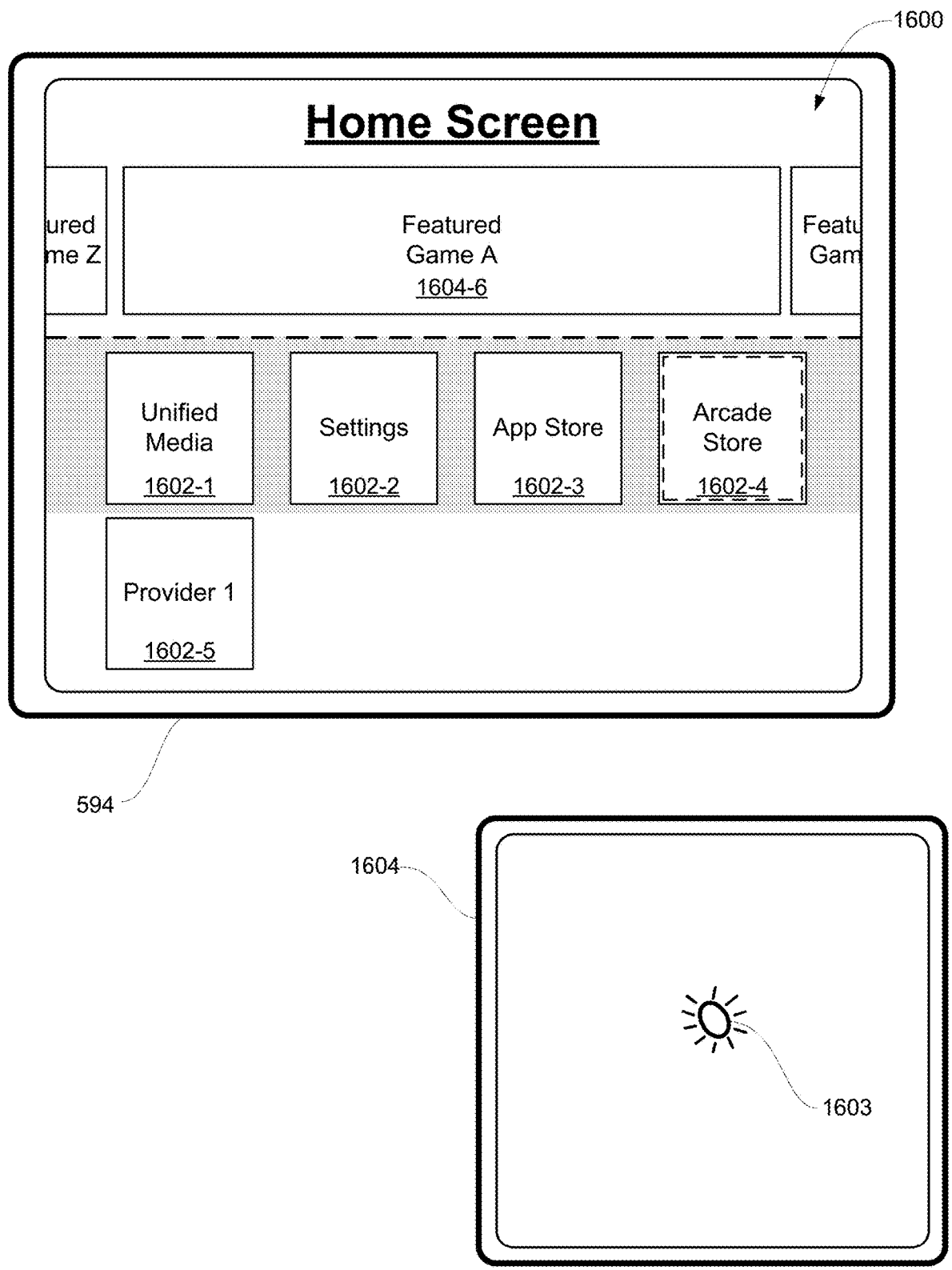
Figure 16P:
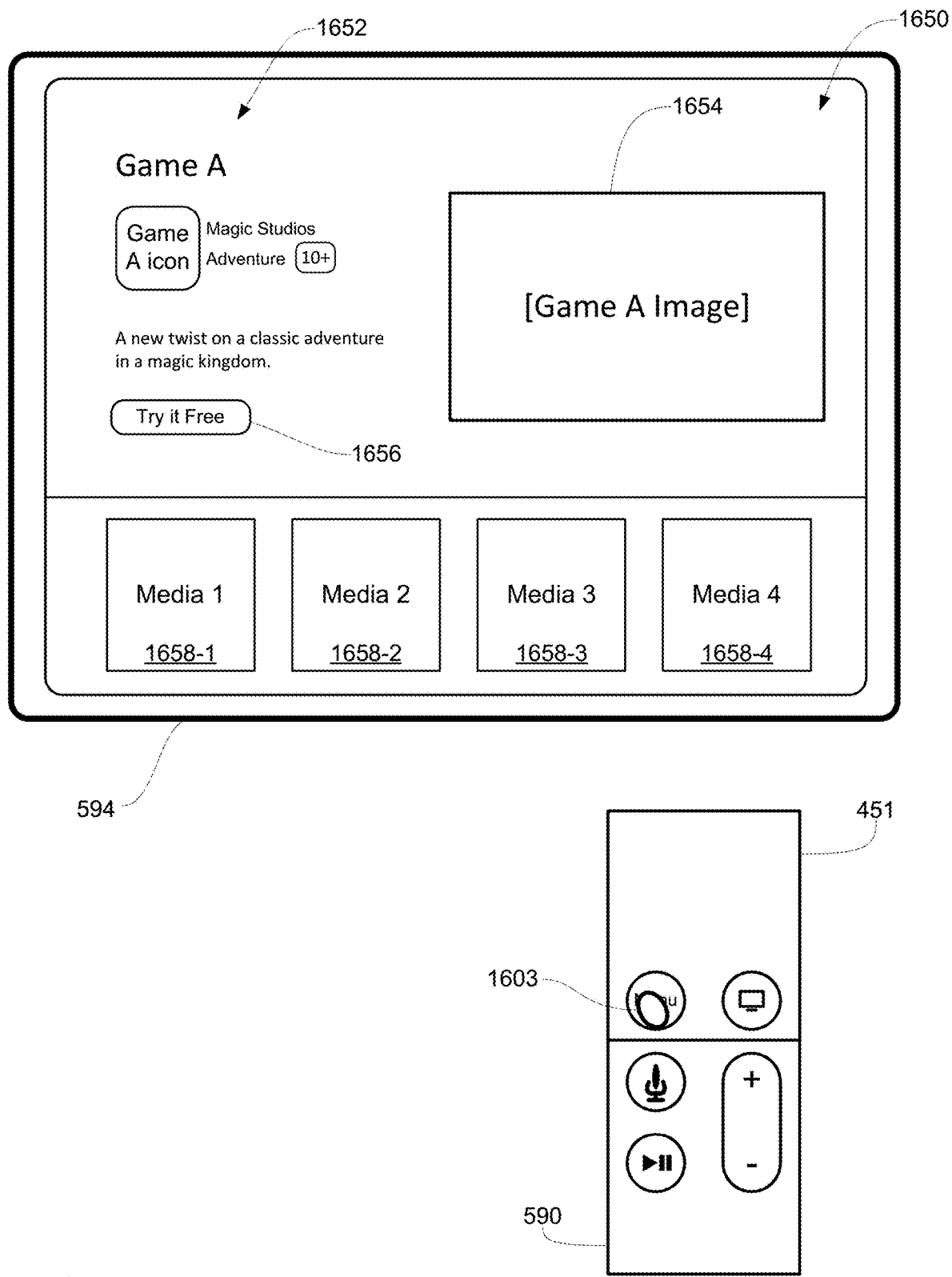
Figure 16Q:
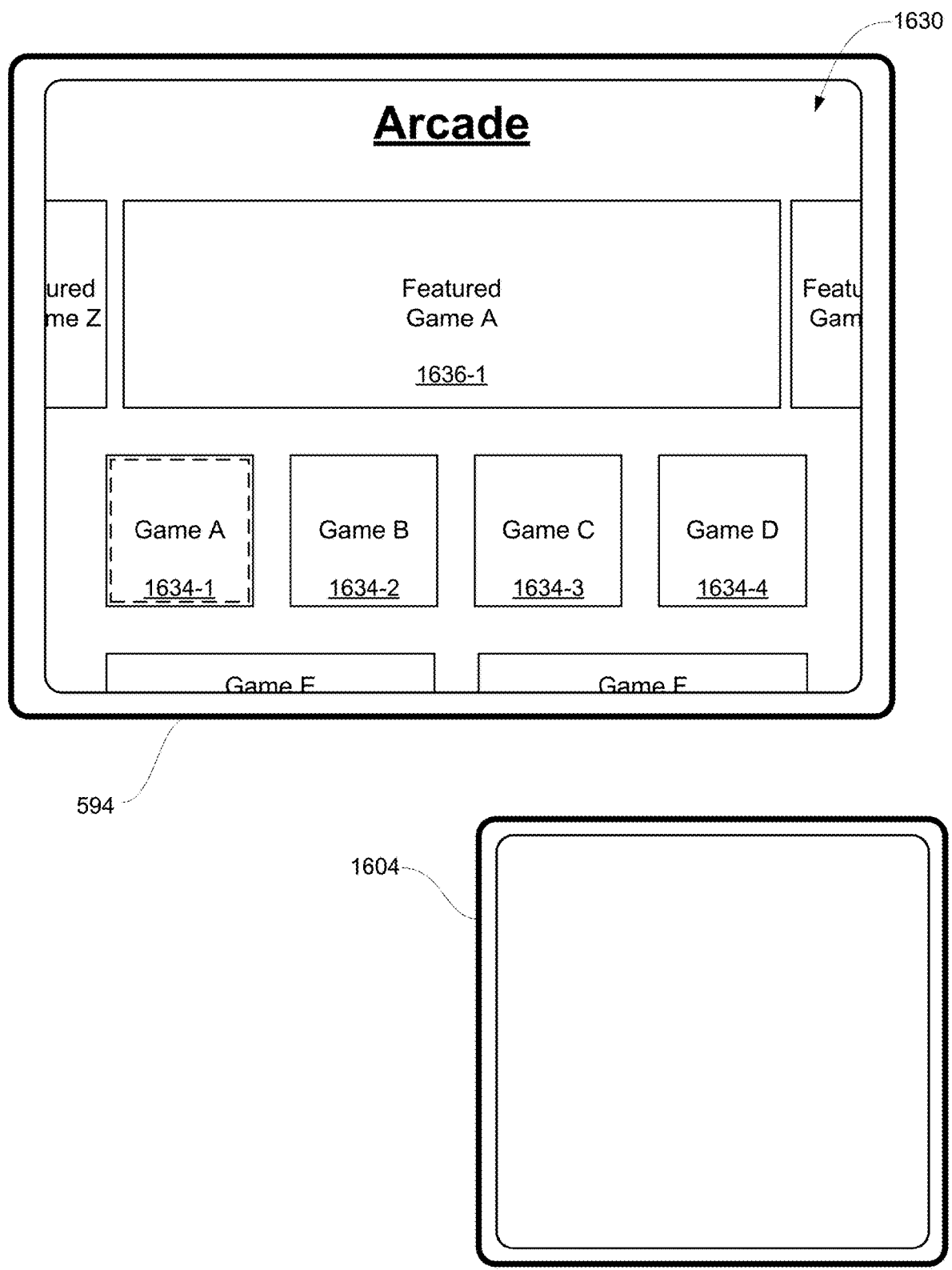
Figure 16R:
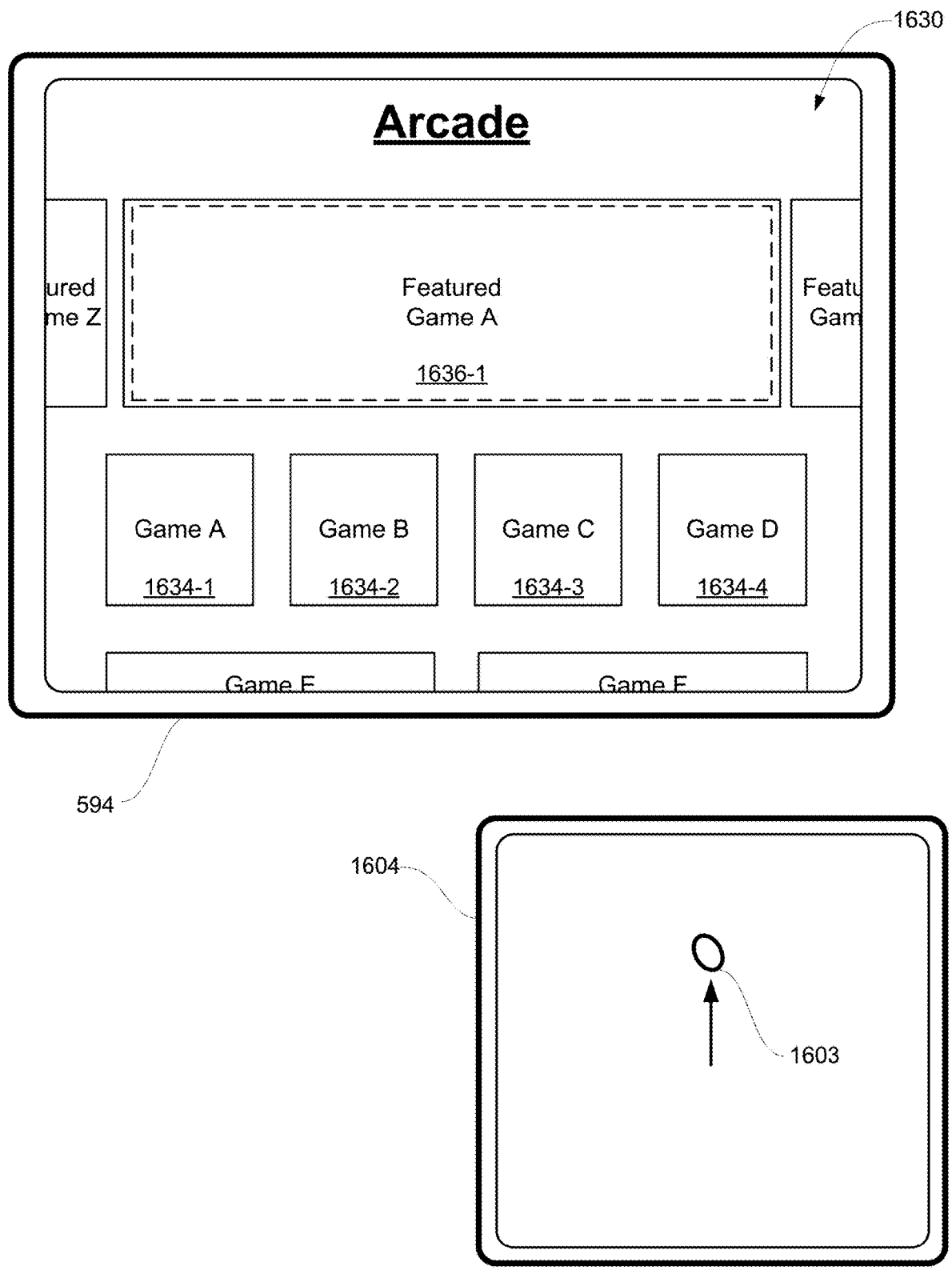
Figure 16S:
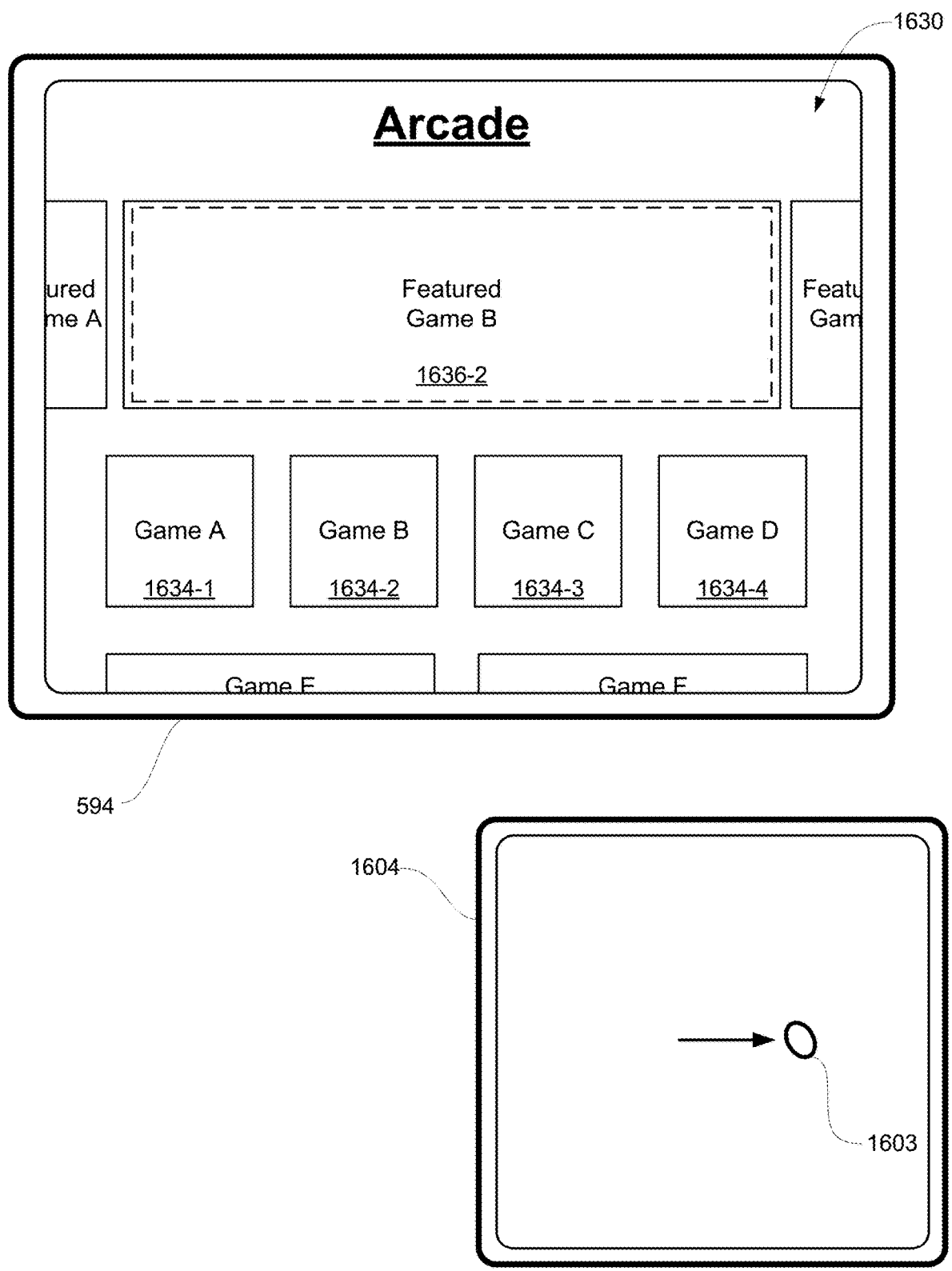
Figure 16T:
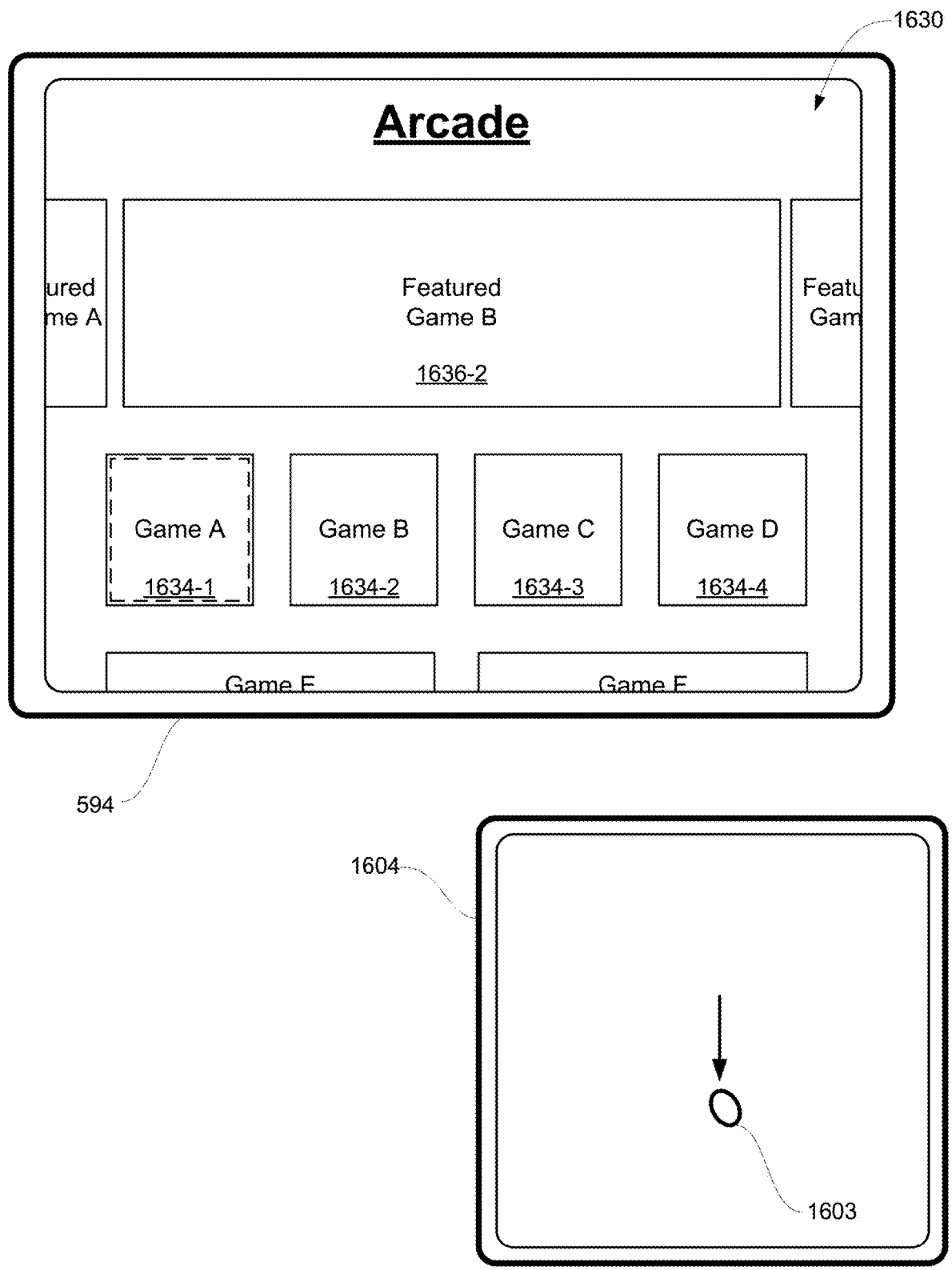
Figure 16U:
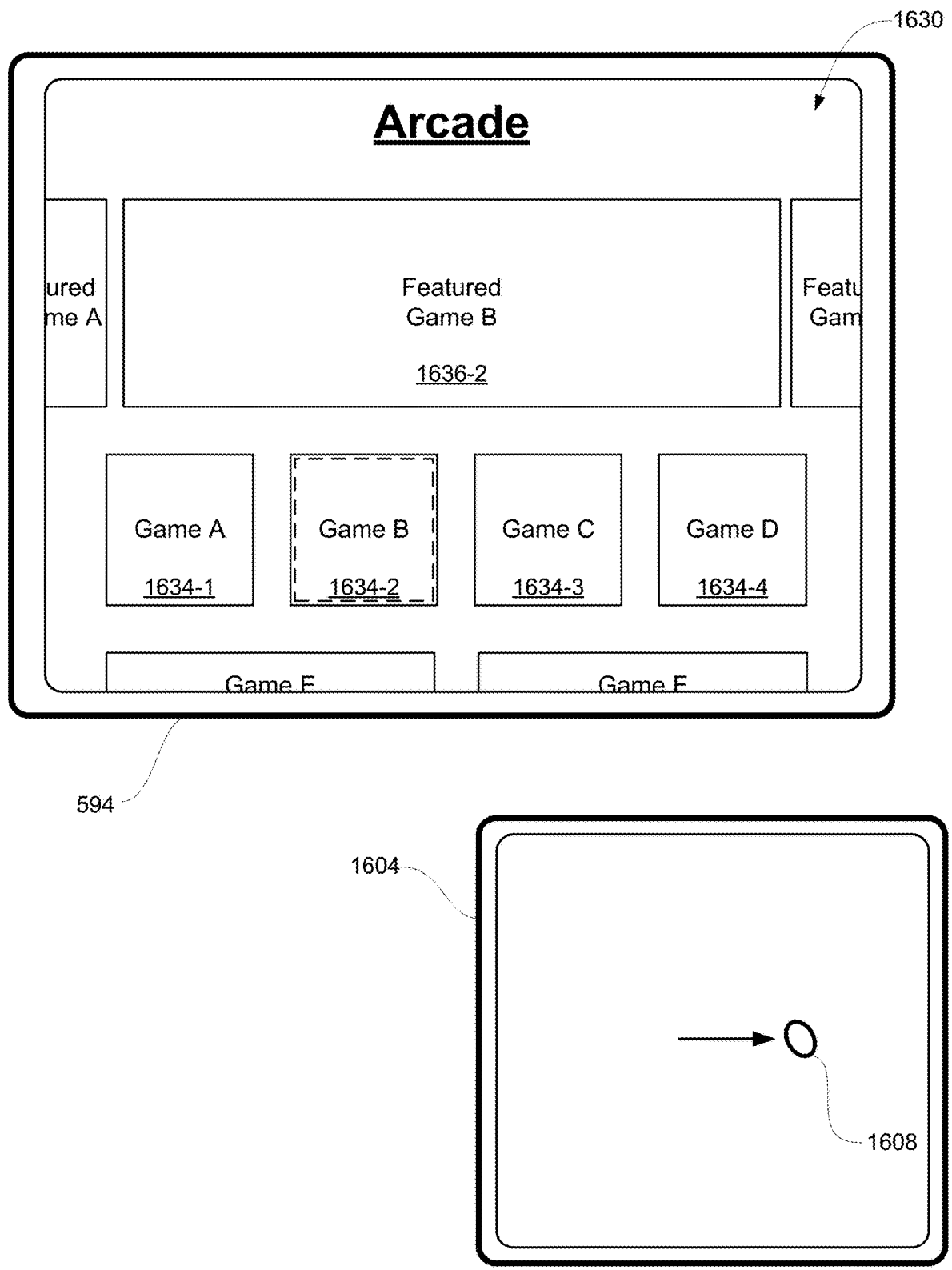
Figure 16V:
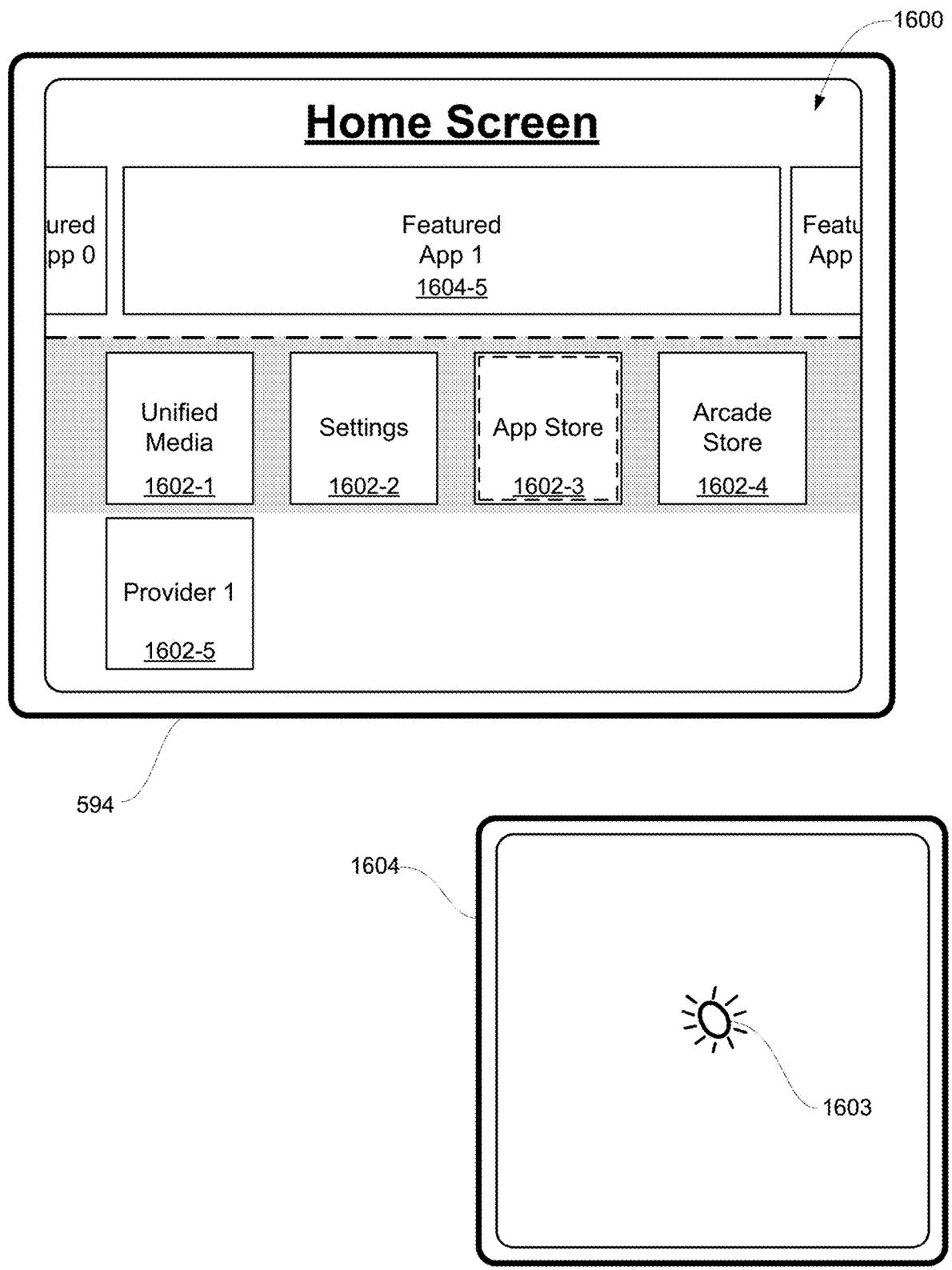
Figure 16W:
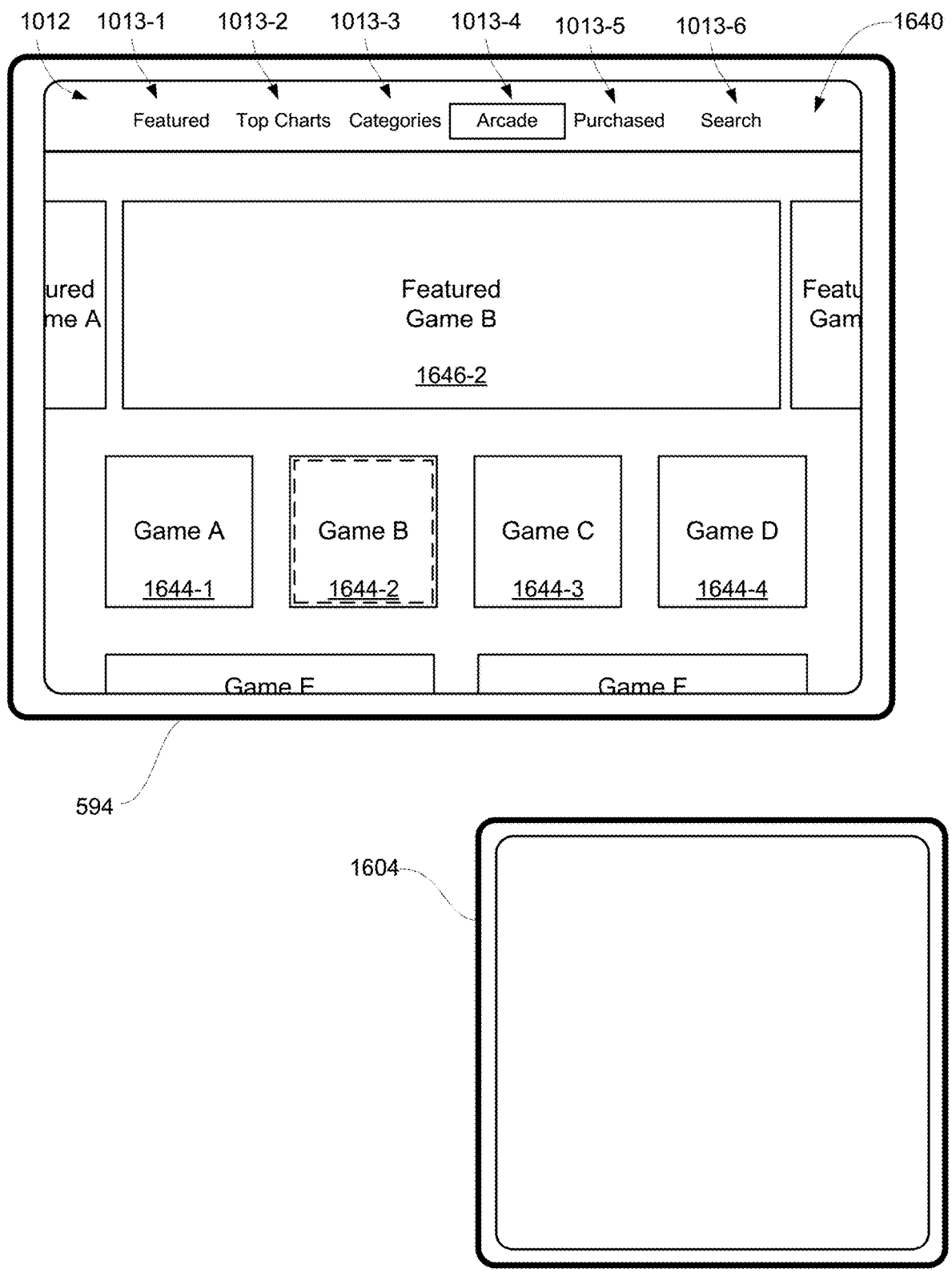
Figure 16X:
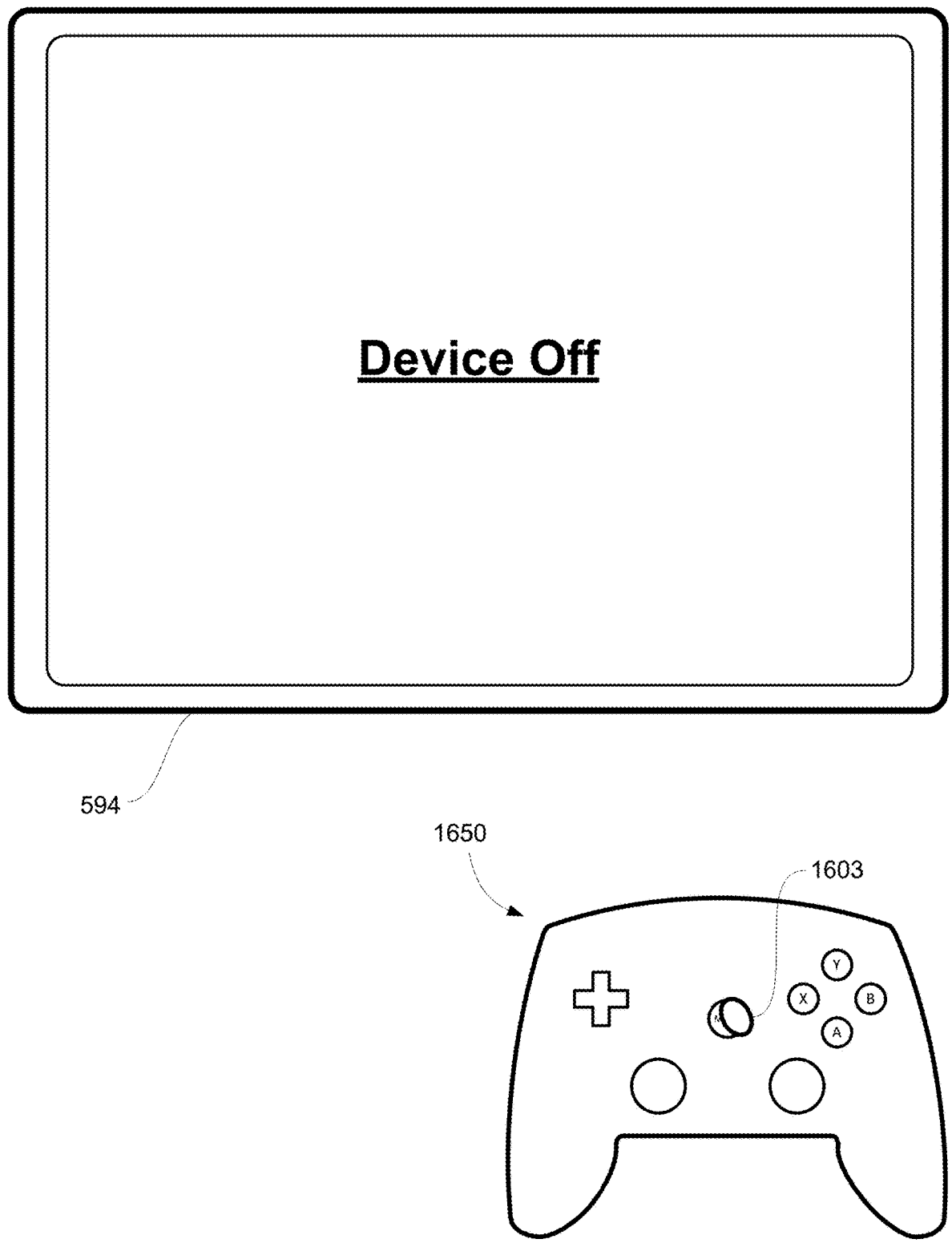
Figure 16Y:
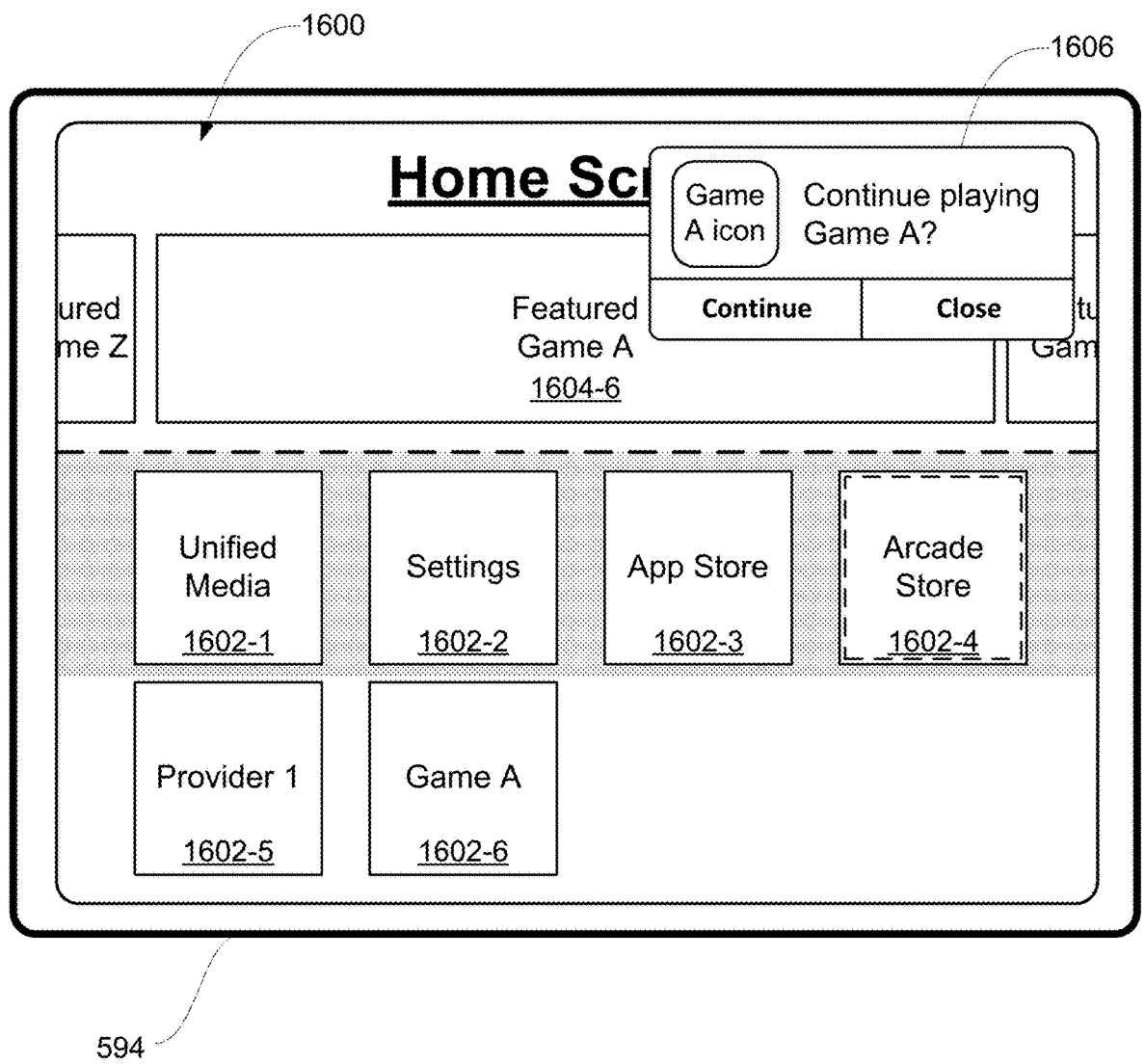
Figure 17A:
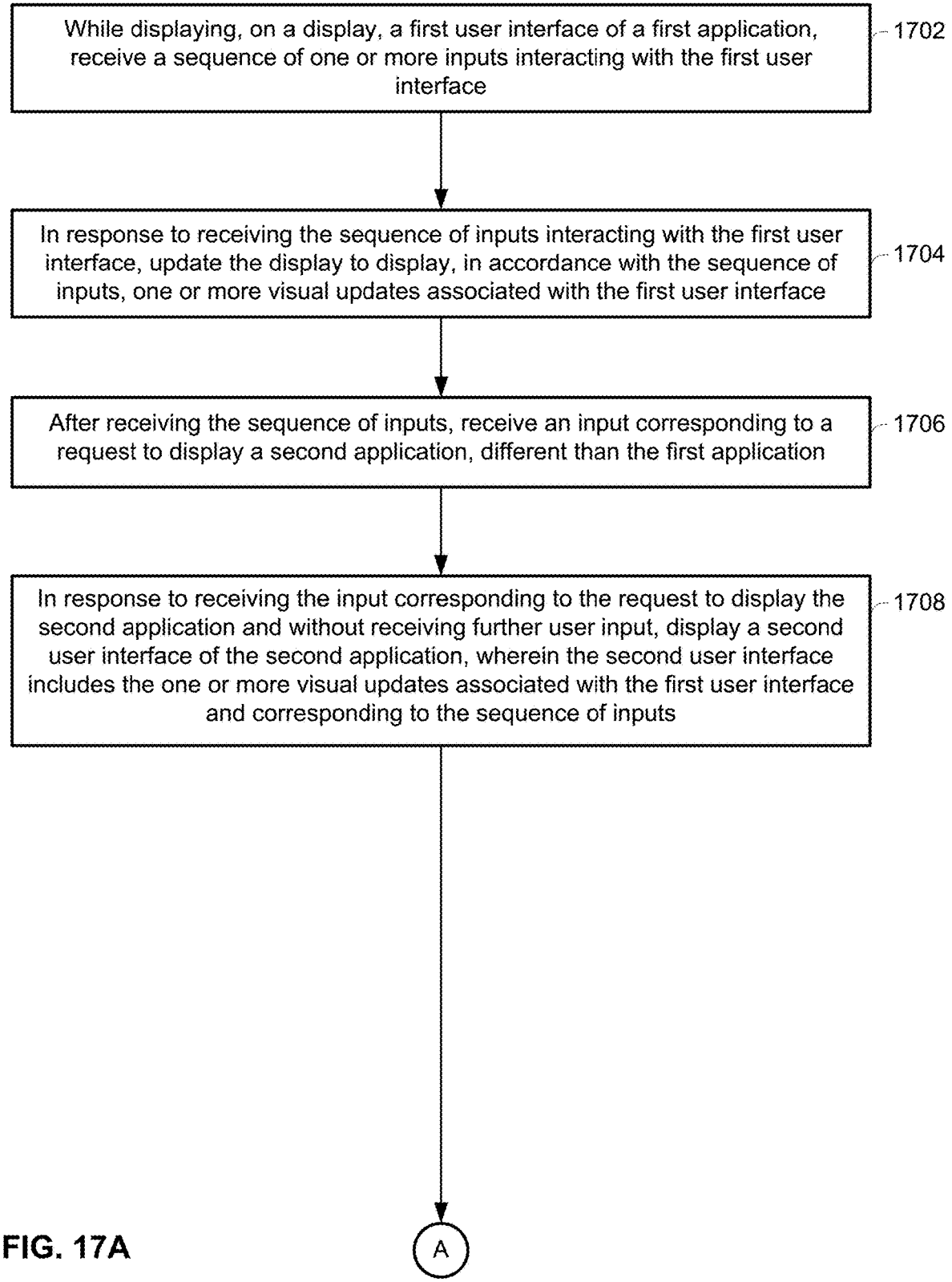
Figure 17C:
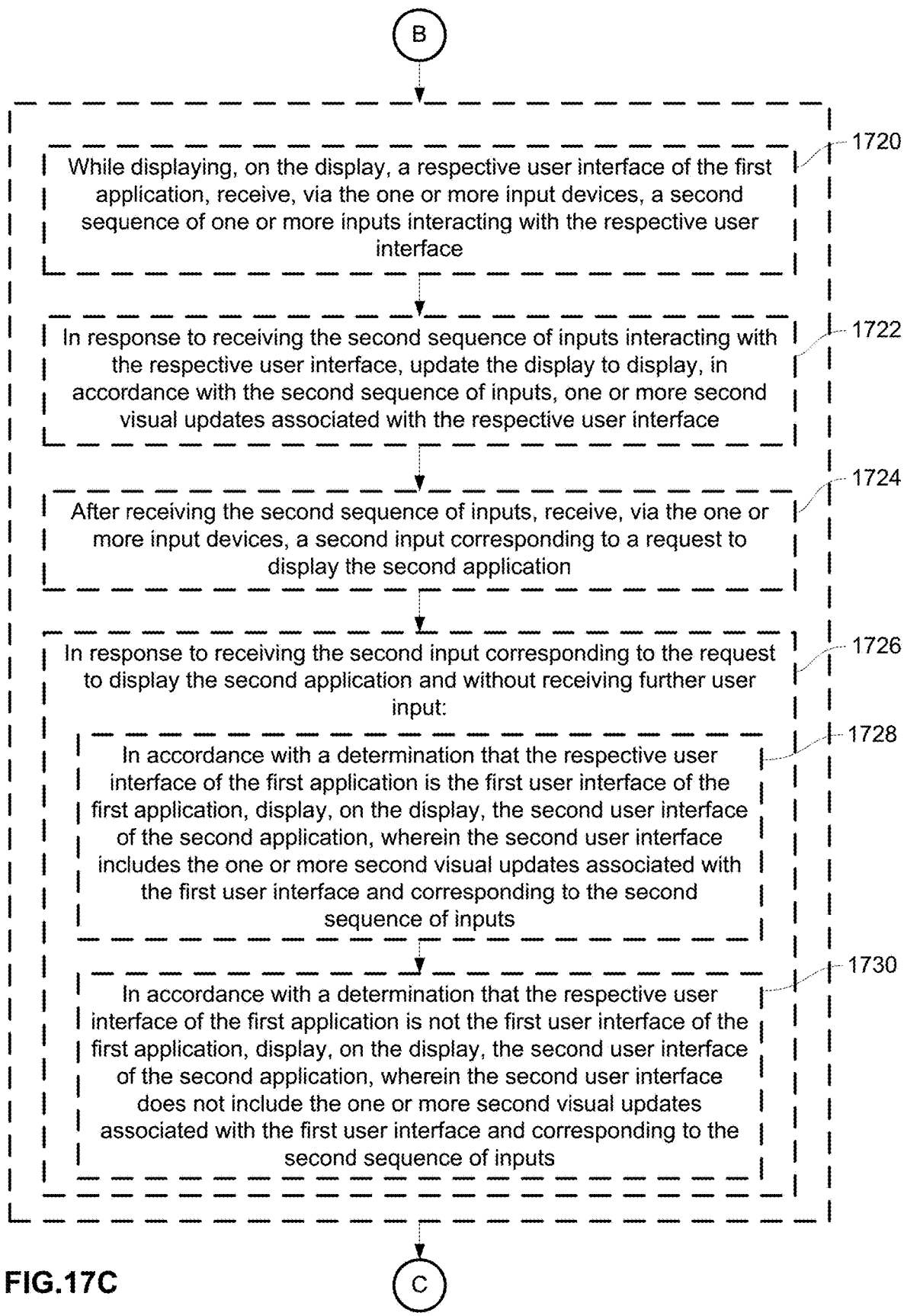
Figure 17E:
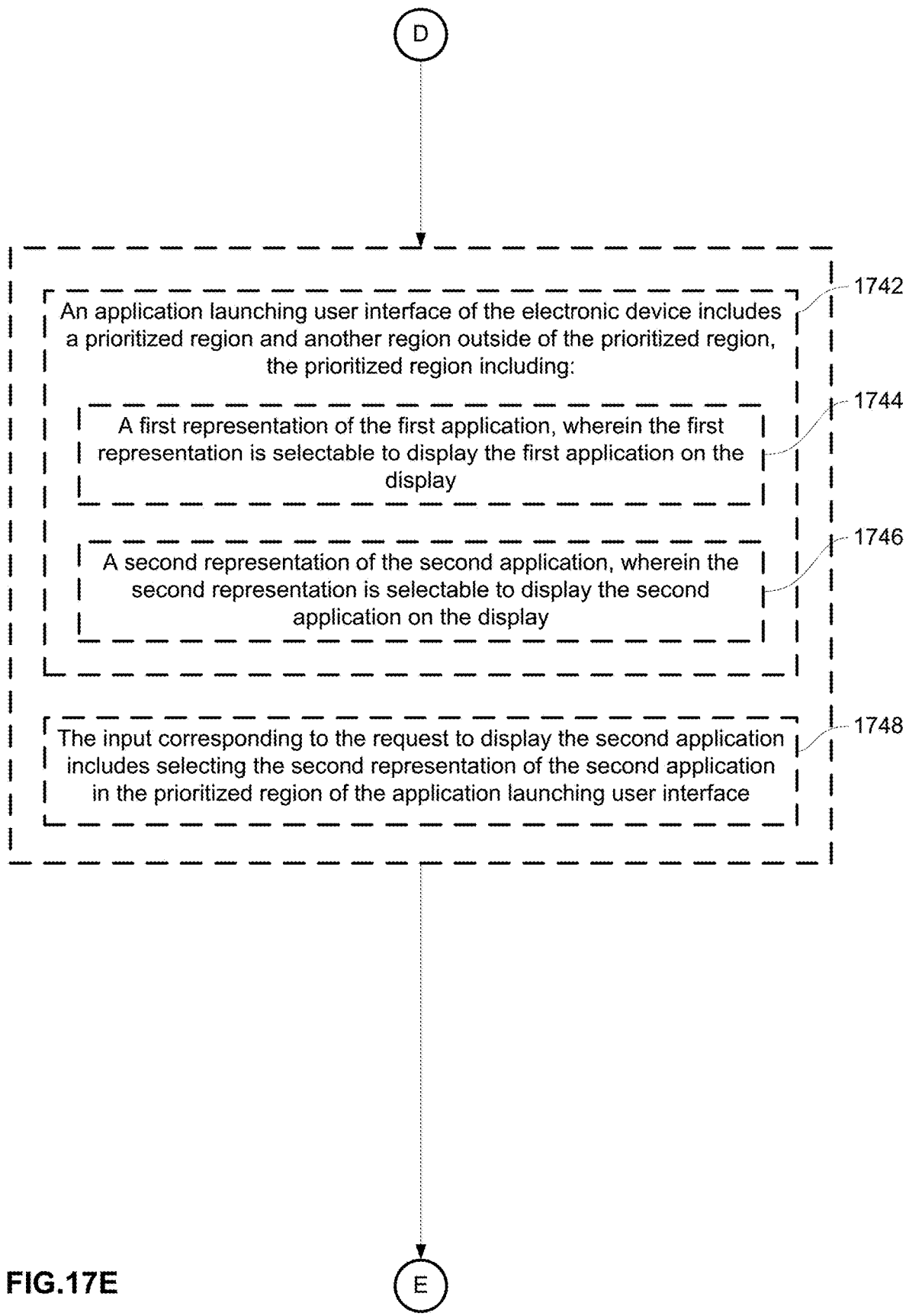
Figure 17F:
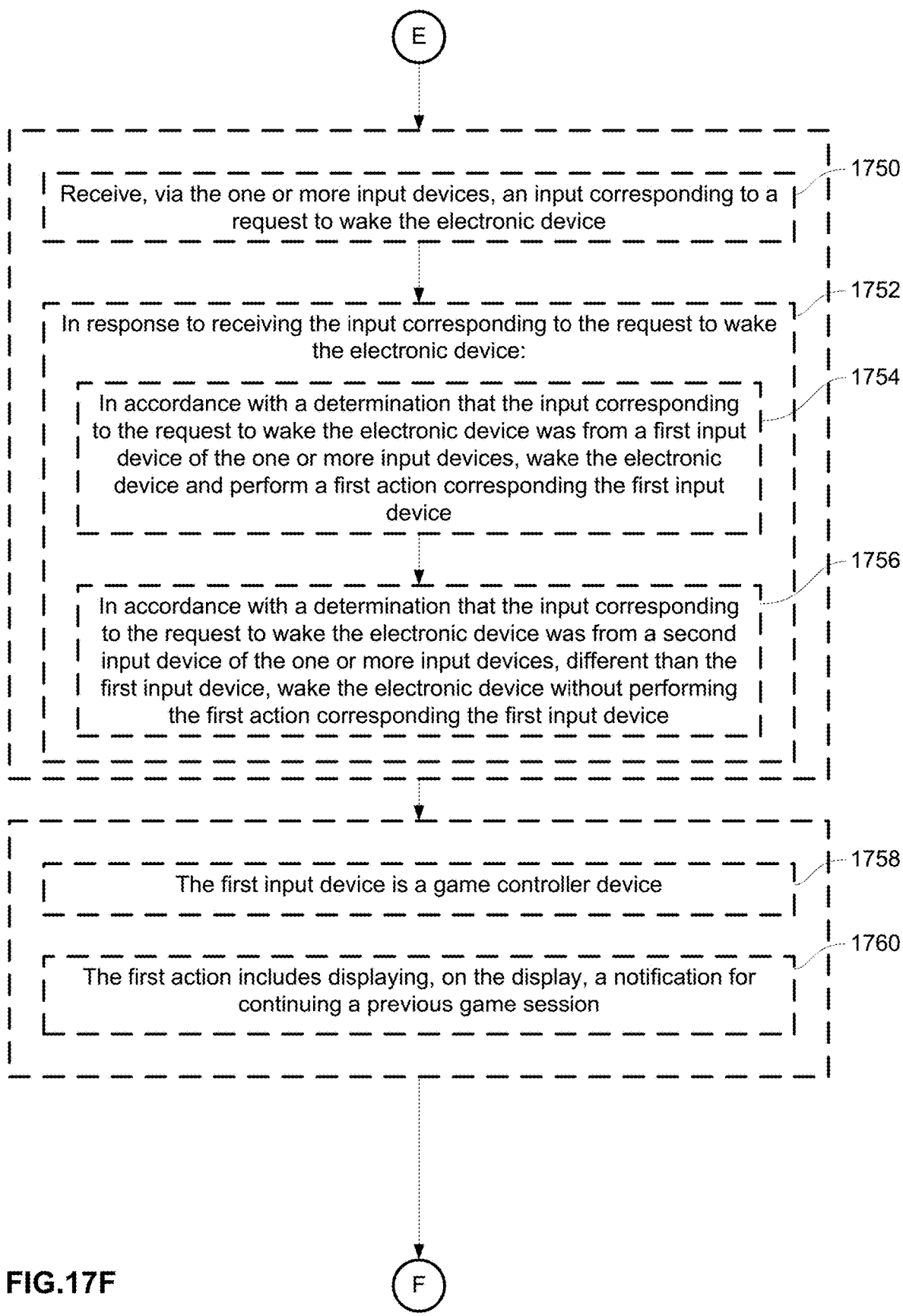
Figure 17G:
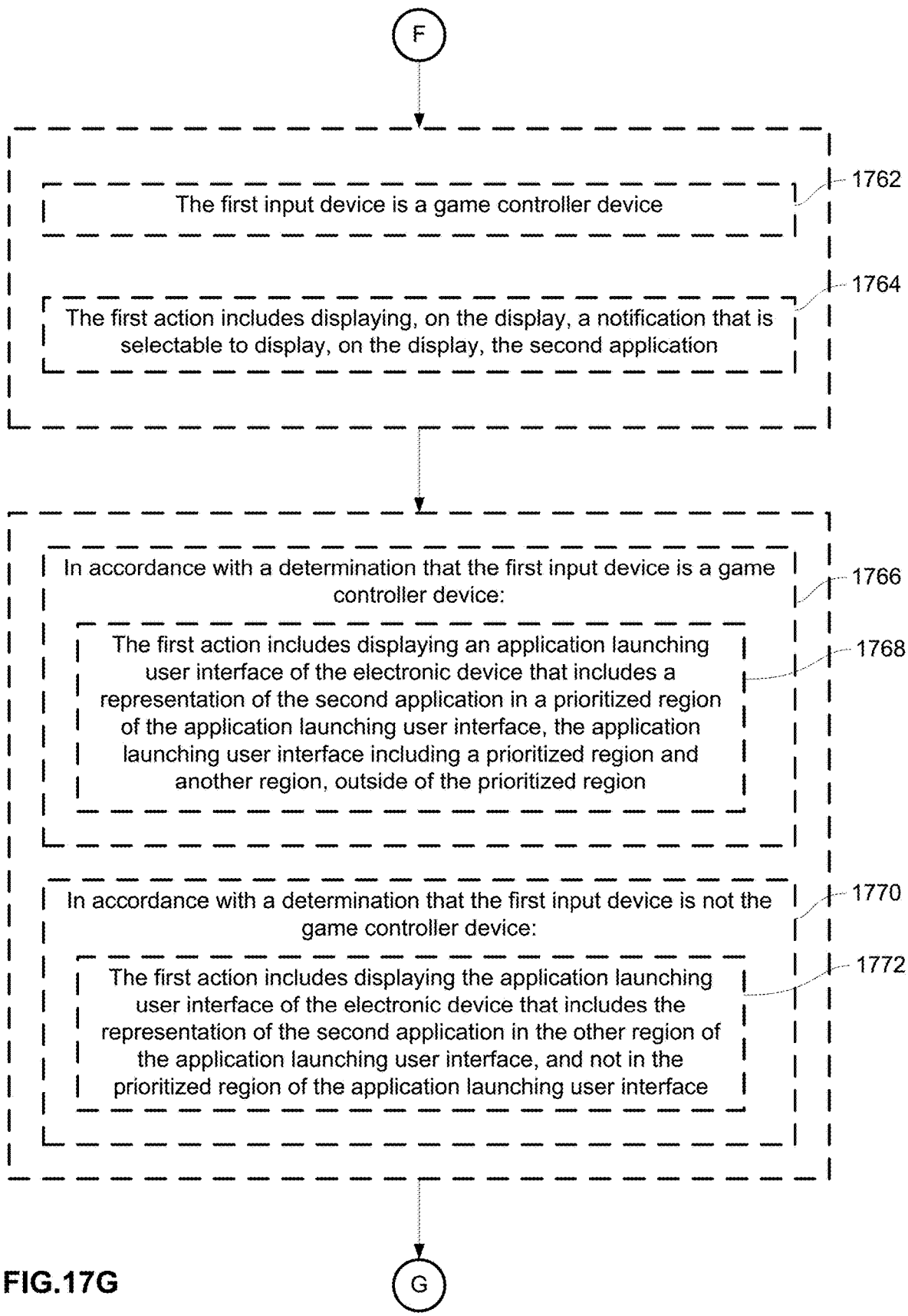
Figure 17H:
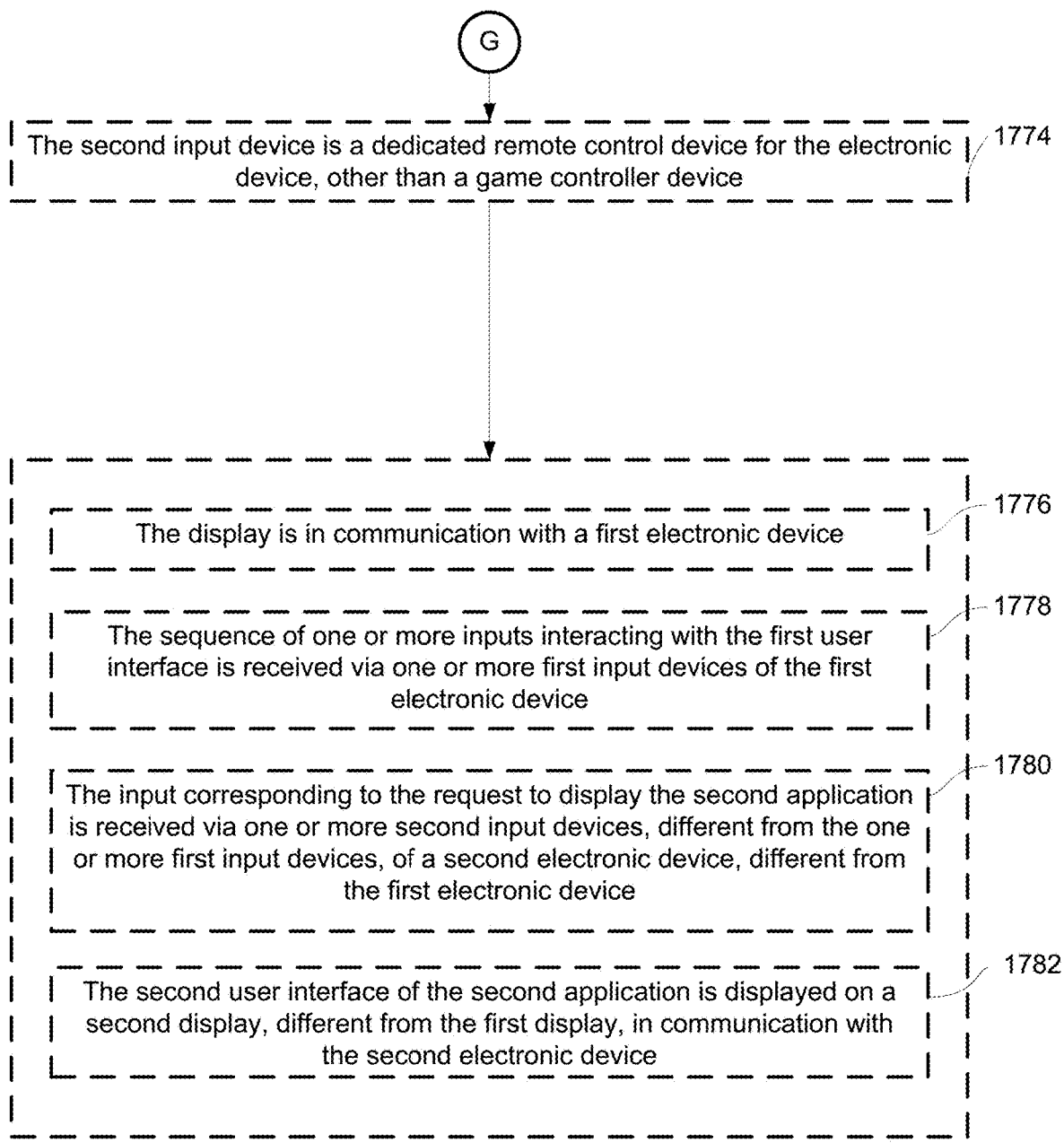

FIGS. 16A-16Y illustrate exemplary ways in which an electronic device transfers context between a generic application store application and a dedicated application store application. The embodiments in these figures are used to illustrate the processes described below with reference to FIGS. 17A-17H.

FIGS. 16A-16Y illustrate operation of the electronic device 500 for transferring context between a generic application store application and a dedicated application store application. FIG. 16A illustrates an exemplary display 594. In some embodiments, display 594 is driven by an electronic device, such as electronic device 500 (e.g., a set-top box), not shown. In some embodiments, display 594 is external or integrated with an electronic device (e.g., such as a touchscreen of a mobile device). In FIG. 16A, the electronic device (e.g., electronic device 500) is currently off and display 594 is not currently displaying any user interfaces. In some embodiments, user input 1603 is received from remote 590. In some embodiments, user input 1603 is a click input on a touch sensitive surface of remote 590. In some embodiments, user input 1603 corresponds to a request to turn on device 500. In some embodiments, a button press input on a button on remote 590 or a tap input on the touch sensitive surface of remote 590 also corresponds to a request to turn on the device. In some embodiments, in response to user input 1603, device 500 turns on (or otherwise enters an active mode from a low power or inactive mode) and displays home screen user interface 1600, as shown in FIG. 16B.

In some embodiments, home screen user interface 1600 is an application-browsing user interface of electronic device 500 that includes icons (e.g., representations) for different applications installed on device 500, the icons selectable to launch their corresponding applications on the electronic device. For example, user interface 1600 includes icons 1602-1 to 1602-5 that are selectable to launch different applications on the electronic device. For example, icon 1602-1 is selectable to launch a unified media browsing application, icon 1602-2 is selectable to launch a setting application (or interface), icon 1602-3 is selectable to launch a generic application store application, 1602-4 is selectable to launch a dedicated application store application, and icon 1602-5 is selectable to launch a media application corresponding to media provider 1. In some embodiments, icons 1602-1 to 1602-5 are arranged in a scrollable grid pattern and user interface 1600 is scrollable to display more rows of icons beyond 1602-5 (e.g., left/right scroll and/or up/down scroll). In some embodiments, the icons can be still images, animations, or videos representing the corresponding application. In some embodiments, the icons can be rearranged or otherwise customized by the user.

User interface 1600 optionally also includes a region above icons 1602 (e.g., a "top shelf" region) that optionally displays one or more user interface elements corresponding to the application whose icon 1602 has the current focus. In some embodiments, only icons in the top row of icons in user interface 1600 cause the top shelf to display user interface elements. In some embodiments, the top row is visually distinguished from the other rows to indicate that only the top row includes this behavior, as shown in FIG. 16B. For example, in FIG. 16B, icon 1602-1 corresponding to the unified media browsing application has the current focus (e.g., as indicated by the dotted square). As a result, device 500 displays representations 1604-1 to 1604-4 of media items accessible from the unified media browsing application (e.g., content that is browseable and selectable in the unified media browsing application for display within the unified media browsing application or another application that is launched in response to the user selection) in the "top shelf" region of user interface 1600. Representations 1604 optionally include information identifying each media item (e.g., textual information) and/or information about the content of each media item (e.g., video previews of the media items, still images of the media items, etc.). The "top shelf" region is, in some embodiments, a scrollable region that includes representations of suggested media items for the currently highlighted application in the home screen, and an upward swipe on remote 590 (e.g., on touch sensitive surface 451) causes the current focus to move to the top shelf. In some embodiments, selection of the items in the top shelf region (e.g., with a tap or click input on remote 590), will cause device 500 to start playing a media item that corresponds to the representation of a suggested media item that has current focus (e.g., within the unified media browsing application or another application that is launched in response to the user selection).

In FIG. 16C, the user has navigated the focus (e.g., scrolled to the right via a rightwards swipe or a tap on the right side of a touch sensitive surface, not shown) to icon 1602-3 corresponding to the generic application store application. In some embodiments, the generic application store application is an application in which the user can browse for and purchase applications (e.g., include games, services, or other content) to download and install onto electronic device 500. In some embodiments, the generic application store application includes all applications that are available to be downloaded and installed onto the electronic device (e.g., as opposed to the dedicated application store application that is dedicated to only one particular type or category of applications). In some embodiments, the application store includes both subscription and non-subscription applications for the user to purchase access, download, and/or install. In some embodiments, the subscription and non-subscription applications are the same or share similar features as those discussed above with respect to FIGS. 6-11. In some embodiments, because the generic application store application icon is in the top row (e.g., prioritized row) of home screen user interface 1600, the top shelf region displays featured content from the generic application store application when icon 1602-3 corresponding to the generic application store application has focus, such as featured app 1, featured app 0 and featured app 2. As shown in FIG. 16C, the representations in the top shelf region can be any size (e.g., as compared with FIG. 16B) and can fully display any number of different representations (e.g., 1 full representation in FIG. 16C and 4 full representations in FIG. 16B).

In FIG. 16C, user input 1603 is received selecting the generic application store application (e.g., a selection input while icon 1602-3 has a focus). In response to user input 1603 selecting the generic application store application, electronic device 500 launches and/or displays the generic application store application and displays user interface 1610. In some embodiments, user interface 1610 includes navigation bar 1012 at or near the top of user interface 1610. As shown in FIG. 16D, navigation bar 1012 includes different selectable options to navigate to different pages or user interfaces within the generic store application, such as selectable option 1013-1 for the "Featured" page, selectable option 1013-2 for the "Top Charts" page, selectable option 1013-3 for the "Categories" page, selectable option 1013-4 for the "Arcade" page, selectable option 1013-5 for the "Purchased" page, and selectable option for the "Search" page. It is understood that the order of selectable options on the navigation bar can be a different order than that shown in FIG. 16D. In some embodiments, when the generic store application is initially displayed (e.g., launched for the first time), the "Featured" page is displayed. As shown, the "Featured" page is currently selected and user interface 1610 corresponds to the "Featured" page. In some embodiments, user interface 1610 includes a scrollable list of featured applications to download onto the electronic device 500. In some embodiments, user interface 1610 includes a featured applications ribbon at or near the top of user interface 1610. In some embodiments, the featured applications ribbon is a scrollable ribbon that displays multiple featured applications.

In some embodiments, navigation bar 1012 includes selectable option 1013-4 for the "Arcade" page. In some embodiments, the "Arcade" page is a user interface of the generic application store application that is dedicated to subscription applications. For example, all of the arcade applications that are displayed in the "Arcade" page are accessible via a subscription to an arcade subscription service (e.g., similarly to the arcade subscription services described above).

In some embodiments, as shown in FIG. 16E, while representation 1614-1 corresponding to application 1 has a focus and electronic device 500 receives a user input 1603 corresponding to a click input on a touch sensitive surface. In some embodiments, in response to user input 1603, device 500 displays user interface 1620, as shown in FIG. 16F. In some embodiments, user interface 1620 is a product page corresponding to application 1. In some embodiments, user interface 1620 includes image 1624 representing the application (e.g., a logo, icon, or other image). In some embodiments, image 1624 is an animated graphic or a video clip. In some embodiments, user interface 1620 includes information section 1622, which includes an icon of the application, a title of the application, the developer or producer of the application, the maturity rating of the application (e.g., and/or any other status indicators), and a description of the application. In some embodiments, user interface 1620 includes selectable option 1626 (e.g., button or affordance labeled "Get") for downloading or otherwise acquiring application 1 (e.g., or otherwise initiating a process for downloading application 1). In some embodiments, user interface 1620 includes a list of media content that is available from provider 1, such as representations 1628-1 to 1628-4 corresponding to Media 1 to Media 4. In some embodiments, selection of representations 1628-1 to 1628-4 displays a preview of the selected media content. In some embodiments, selection of representations 1628-1 to 1628-4 causes initiation of a process for downloading application 1.

In FIG. 16G, while home screen user interface 1600 is displayed, a user input 1603 is received selecting the dedicated application store application (e.g., a selection input while icon 1602-4 has a focus). In some embodiments, as described above, the dedicated application store application is an application store application that is dedicated to subscription based applications (e.g., subscription applications and/or arcade subscription games). For example, all applications that gain access via a subscription to a subscription service are included in the dedicated application store application. It is understood that although the dedicated application store application contains only subscription based applications, the generic application store application also includes subscription based applications for the user to browse and acquire (e.g., in the "Arcade" page). In some embodiments, as shown in FIG. 16G, while icon 1602-4 has a focus, the top shelf region displays featured content from the dedicated application store application, such as featured game A, featured game Z, and featured game B.

In some embodiments, in response to user input 1603 selecting the dedicated application store application, device 500 displays arcade user interface 1630. In some embodiments, arcade user interface 1630 shares similar features as the "Arcade" page of the generic application store application (e.g., but without a navigation bar). In some embodiments, arcade user interface 1630 includes a featured ribbon with featured games (such as representation 1636-1 for featured game A, featured game Z, and featured game B). In some embodiments, the featured ribbon is a scrollable list of featured games. In some embodiments, beneath the featured ribbon, arcade user interface 1630 displays rows of arcade games that are included in the arcade subscription service. For example, user interface 1630 includes a first row of games 1634-1 to 1634-4 and a second row of games (e.g., game E and game F). In some embodiments, the row of games are scrollable (e.g., left/right and/or up/down) to reveal more games or more rows of games. In some embodiments, the rows of games are sorted into categories of items. In some items, the categories and/or rows are ordered based on the user's interests. For example, content items that are more likely to be of interest to the user are displayed earlier or higher than content items that are less likely to be of interest to the user.

In FIG. 16I, while displaying home screen user interface 1600, a user input 1603 is received selecting representation 1602-3 corresponding to the generic application store application. In some embodiments, in response to the user input 1603 selecting representation 1602-3 corresponding to the generic application store application, device 500 displays user interface 1610 corresponding to the "Featured" page of the generic application store application, as shown in FIG. 16J.

In FIG. 16K, while displaying user interface 1610, input 1603 is received performing a rightwards navigation on the navigation bar 1012 (e.g., rightwards swipe). In some embodiments, in response to user input 1603, focus is moved rightwards from selectable option 1013-1 (corresponding to the "Featured" page) to selectable option 1013-4 (corresponding to the "Arcade" page). In some embodiments, in response to selectable option 1013-4 having a focus, device 500 replaces display of user interface 1610 with display of user interface 1640 corresponding to the "Arcade" page. In some embodiments, user interface 1640 is a dedicated page for arcade subscription applications. In some embodiments, user interface 1640 is the same or includes similar elements as user interface 1630 of the dedicated application store application. In some embodiments, user interface 1640 is identical to user interface 1630 except for the display of navigation bar 1012. In some embodiments, any and all interactions, changes, user inputs, and/or updates that occur within user interface 1640 dedicated to arcade subscription applications are transferred to user interface 1630 of the dedicated application store application. In other words, the two user interfaces of the two applications optionally identically mirror each other, as will be shown below.

In FIG. 16L, user input 1603 corresponding to a click input is received thus moving the focus from the navigation bar 1012 onto an element of the arcade page, as shown in FIG. 16M. In some embodiments, the focus is moved to the first element (e.g., top-most or left-most element) in the user interface. In some embodiments, the focus skips the banner row and moves to the first element of the row of content items (e.g., representation 1644-1). In some embodiments, the focus moves to the element that was previously in focus when the user interface was previously displayed. For example, if the user previous had selected icon 1644-2 when the user navigated away from user interface 1640, then the focus will move back to icon 1644-2 when the user navigates back to user interface 1640.

In some embodiments, while icon 1644-1 has a focus, user input 1603 is received selecting game A. In some embodiments, in response to user input 1603, device 500 displays user interface 1650 corresponding to the product page for game A, as shown in FIG. 16N. In some embodiments, user interface 1650 is a product page corresponding to game A. In some embodiments, user interface 1650 includes image 1654 representing the game (e.g., a logo, icon, or other image). In some embodiments, image 1654 is an animated graphic or a video clip. In some embodiments, user interface 1650 includes information section 1652, which includes an icon of the game, a title of the game, the developer or producer of the game, the maturity rating of the game (e.g., and/or any other status indicators), and a description of the game. In some embodiments, user interface 1650 includes selectable option 1656 (e.g., button or affordance labeled "Try it free") for initiating a process for subscribing to the subscription service (e.g., or otherwise initiating a process for downloading game A if the user already has a subscription to the subscription service). In some embodiments, user interface 1650 includes a list of media representing game A, such as media 1658-1 to 1658-4. In some embodiments, the media items are screen shots or videos of game A. In some embodiments, selection of media 1658-1 to 1658-4 displays an enlarged view of the selected media item. It is understood that user interface 1650 is an exemplary example and can include similar features as the product pages described above with respect to at least FIGS. 6G, 6T, 10J, 10N, 10O, etc.

In FIG. 16O, after displaying user interface 1650, a user input 1603 is received on home screen user interface 1600 selecting icon 1602-4 corresponding to the dedicated application store application. In some embodiments, in response to user input 1603, the dedicated application store application is launched. In some embodiments, launching the dedicated application store application causes display of user interface 1650 corresponding to the product page for game A, as shown in FIG. 16P. In some embodiments, because the generic application store application was displaying user interface 1650 in response to a user's interaction on user interface 1640 corresponding to the "Arcade" page, the same user interface is displayed in the generic application store application (e.g., without receiving any further user input after launching the dedicated application store application). In other words, the user's interactions on user interface 1640 corresponding to the "Arcade" page are automatically transferred to the generic application store application. In some embodiments, as a result, all visual changes and updates in the generic application store application (e.g., restricted to the "Arcade" page) are also reflected in the dedicated application store application, and vice versa (e.g., inputs and/or visual changes in the dedicated application store application are also transferred to the "Arcade" page of the generic application store application). In some embodiments, the changes are transparent and a user would be unable to identify any differences between the two interfaces (e.g., as if they were the same interface), except optionally that the "Arcade" page of the generic application store application displays a navigation bar for navigating to other pages. In some embodiments, the visual changes and updates that are transferred include not only simple scrolling updates (as will be discussed in further below with respect to FIG. 16W), but also the displaying of an entirely new page (e.g., user interface 1650), optionally as long as the new page (e.g., user interface 1650) is associated with the "arcade" page, was a result of a selection of an icon on the "arcade" page, or otherwise has a corresponding page in the dedicated application store application.

In FIG. 16P, user input 1603 is received selecting a "menu" or "back" button on remote 590, while user interface 1650 is displayed. In some embodiments, in response to user input 1603, device 500 navigates backwards (e.g., or "upwards" in a navigation hierarchy) and displays user interface 1630 corresponding to the initial user interface of the dedicated application store application. In some embodiments, while displaying user interface 1630, user input 1603 (e.g., an upward swipe on a touch sensitive surface) is received moving a focus from iron 1634-1 to banner 1636-1 corresponding to featured game A, as shown in FIG. 16R. In some embodiments, as shown in FIG. 16S, user input 1603 (e.g., a rightward swipe on a touch sensitive surface) is received scrolling through the banner and moving focus to banner 1636-2 corresponding to featured game B.

In some embodiments, user input 1603 (e.g., downward swipe on a touch sensitive surface) is received moving the focus back to the row of content items 1634-1 to 1634-4, as shown in FIG. 16T. In some embodiments, as shown in FIG. 16U, user input 1603 (e.g., a rightward swipe on a touch sensitive surface) is received moving the focus to icon 1634-2 corresponding to game B. In some embodiments, after the sequence of user inputs described above, user interface 1630 displays icon 1634-2 corresponding to game B as having a focus and banner 1636-2 corresponding to featured game B as being displayed in the center of the banner, as shown in FIG. 16U.

In some embodiments, after receiving the series of user inputs discussed above, a user input 1603 is received on home screen user interface 1600 selecting icon 1602-3 corresponding to the generic application store application, as shown in FIG. 16V. In response to the user input 1603, device 500 launches the generic application store application, as shown in FIG. 16W. In some embodiments, device 500 displays user interface 1640 corresponding to the "Arcade" page in the exact same state and configuration as user interface 1630 that was displayed when the user navigated away from the dedicated application store application, including all of the visual updates displayed in response to the user's inputs (e.g., except for the including of navigation bar 1012). For example, banner 1646-2 corresponding to featured game B is in the center banner and icon 1644-2 corresponding to game B has a focus. Thus, as described above, in some embodiments, the state, context, and/or user inputs are transmitted between the dedicated store application and the "Arcade" page of the generic application store application in either direction. In some embodiments, the user interfaces reflect the most recent updates and/or user interactions. In some embodiments, this feature allows the user to navigate freely between the generic application store application and the dedicated store application without re-performing any user inputs to reach the most recent display state.

In FIG. 16X, while device 500 is off, a user input 1603 is received from game controller 1650 corresponding to a request to turn on device 500. In some embodiments, the request to turn on device 500 is received by selecting a "menu" or "power" button on game controller 1650. In some embodiments, the request to turn on device 500 is received by selecting any of the buttons on game controller 1650. In some embodiments, in response to receiving the request to turn on device 500 from game controller 1650, device 500 powers on (e.g., or otherwise enters an active state from an inactive state) and displays home screen user interface 1600, as shown in FIG. 16Y. In some embodiments, because the request to power on was received from a game controller (e.g., game controller 1650) as opposed to a non-game controller remote (e.g., remote 590), electronic device 500 determines that the user desires to play a game. In some embodiments, device 500 displays pop-up 1606 (e.g., or other type of notification message) providing the user with the option to continue playing game A. In some embodiments, selection of the "Continue" button of pop-up 1606 causes launch of game A. In some embodiments, launching game A continues a previous gaming session of game A. In some embodiments, the previous gaming session of game A is from another device on which the user has logged into the same user account as on device 500. In some embodiments, the previous gaming session of game A is from the previous session of usage of device 500. In some embodiments, device 500 launches game A and does not load a previous gaming session.

In some embodiments, if icon 1602-4 corresponding to the arcade store is not in the visually distinguished top row of user interface 1600 (e.g., due to the user moving the icon away from the top row), device 500 will temporarily move icon 1602-4 to the top row (e.g., icon 1602-4 is moved for the current session and will return to its original location when the device is next powered on with a device that is not a game controller). In some embodiments, device 500 will automatically move the focus to icon 1602-4 corresponding to the arcade store when device 500 is powered on using a game controller. In some embodiments, device 500 will automatically move focus to one of the arcade subscription games (e.g., icon 1602-6 corresponding to game A) when device 500 is powered on using a game controller.

It is understood that although the above description refers to the transfer of context and/or information between a generic application store application and a dedicated application store application, the transfer of context and/or information disclosed above is not limited to only application store applications and context and/or information can be transferred between any and all types of compatible applications. Furthermore, it is understood that the above-disclosed transfer of context is not limited to applications that are installed on the same device. For example, context and/or information can be transferred between a generic application store application of a first device and a generic application store application of a second device (e.g., and not necessarily limited to only the "Arcade" page), between a generic application store application of a first device and a dedicated application store application of a second device, and between a dedicated application store application of a first device and a dedicated application store application of a second device.

FIGS. 17A-17H are flow diagrams illustrating a method 1700 of transferring context between a generic application store application and a dedicated application store application in accordance with some embodiments. The method 1700 is optionally performed at an electronic device such as device 100, device 300, device 500, device 501, device 510, device 591, and device 480 as described above with reference to FIGS. 1A-1B, 2-3, 4A-4B and 5A-5K. Some operations in method 1700 are, optionally combined and/or order of some operations is, optionally, changed.

As described below, the method 1700 provides ways to transfer context between a generic application store application and a dedicated application store application. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, while displaying, on a display, a first user interface of a first application, a sequence of one or more inputs interacting with the first user interface is received (1702), such as in FIG. 16M. In some embodiments, the first user interface is a subscription application user interface of an application store application for browsing and purchasing subscription applications. In some embodiments, the application store application is a general application store application and includes a plurality of pages, tabs or other user interfaces from which a user can browse for and purchase applications, content, or other services. In some embodiments, the applications purchased from the application store application can be downloaded and installed onto the electronic device. In some embodiments, the applications purchased from the application store application can be for use on another electronic device. In some embodiments, the application store application includes a page for browsing for and purchasing non-subscription applications. In some embodiments, the application store application includes a page for browsing for subscription applications and from which the user can initiate a process for subscribing to a subscription service that grants the user access to the subscription applications. In some embodiments, a subscription application is an application to which the user has access only if the user has a subscription to a respective subscription service. In some embodiments, having a subscription to a respective subscription service grants the user access to all applications that are included in the subscription service. In some embodiments, the subscription can include a periodic payment plan and can be for any length of time and/or can be canceled anytime. It is understood that although the application store application is described as an application for browsing and purchasing applications, the application store application is not limited to only browsing for and purchasing applications. For example, the application store application can allow the user to browse and purchase media content, widgets, etc. In some embodiments, the sequence of one or more inputs includes browsing in the subscription application user interface, selecting a respective subscription application and displaying the respective subscription application's landing page, or otherwise interacting with the subscription application user interface in any way that does or does not display any visual results of the interaction or change a context of the subscription application user interface to reflect the user's interaction with the user interface (e.g., changing environmental variables, changing global or local variables, etc.).

In some embodiments, in response to receiving the sequence of inputs interacting with the first user interface, the display is updated (1704) to display, in accordance with the sequence of inputs, one or more visual updates associated with the first user interface, such as in FIG. 16N. In some embodiments, in response to a user selecting an application and requesting display of more information regarding the selected application, the display is updated to display the selected application's canonical page. In some embodiments, in response to the user scrolling or browsing through the user interface, updating the display in response to the browsing input. For example, if a user performs a scrolling gesture on a list of applications, visually scrolling through the list of applications.

In some embodiments, after receiving the sequence of inputs, an input corresponding to a request to display a second application, different than the first application, is received (1706), such as in FIG. 16O. In some embodiments, the user selects an icon on a home screen user interface for the second application and requesting to launch the second application. In some embodiments, the second application is a dedicated application for browsing and/or purchasing a particular type of application. In some embodiments, the particular type of application available for purchase in the dedicated application is also available for purchase from the application store application. In some embodiments, the dedicated application is for purchasing subscription applications. In some embodiments, the subscription applications available for purchase in the dedicated application are the same subscription applications that are browseable and/or purchasable from the subscription application user interface of the application store application.

In some embodiments, in response to receiving the input corresponding to the request to display the second application and without receiving further user input, a second user interface of the second application is displayed, wherein the second user interface includes the one or more visual updates associated with the first user interface and corresponding to the sequence of inputs (1708), such as in FIG. 16P. In some embodiments, the dedicated application for browsing and/or purchasing subscription applications is displayed. In some embodiments, the user interface of the dedicated application is identical or similar to the subscription application user interface of the application store application. In some embodiments, the user interface of the dedicated application does not include pages or tabs to navigate to pages that are navigable in the application store application (e.g., the tabs or pages that are not related to the subscription applications). In some embodiments, the second user interface of the second application reflects the user's interactions on the subscription application user interface of the application store application. For example, if, while interacting with the subscription application user interface of the application store application, the user selected an application and caused display of the selected application's canonical page, then the second application, when displayed, will also display the selected application's canonical page. As another example, if, while interacting with the subscription application user interface of the application store application, the user scrolled through a list of applications and caused visual scrolling of the list of applications, the second application will also display a scrolled list of applications that is scrolled to the same position as in the subscription application user interface of the application store application. In some embodiments, the contexts and/or user interactions of the subscription application user interface of the application store application are shared with the second application such that the user's interactions with and experience of the second application is identical or similar to the user's interactions with and experience with the subscription application user interface or the application store application such that the user experience is seamless between the second application and the subscription application user interface of the first application. In some embodiments, the contexts and/or user interactions are shared via the two applications pointing to the same variables or flags, via the first application transferring data and/or information to the second application (e.g., via an API and/or by writing a file), via the second application requesting data and/or information from the first application (e.g., via an API and/or by reading a file), via the first application transmitting data and/or information to a server and the second application receiving data and/or information from the server, or via any other suitable means of transferring context data. In some embodiments, the user's interactions with other user interfaces on the first application that are not associated with subscription applications are not shared with the second application and are not reflected in the second application. It is understood that although the above describes context as being transferred and/or shared between two applications on the same electronic device, the context, user inputs, and/or visual updates can be transferred from one electronic device to another electronic device. For example, context can be transferred from a generic application store application on a first electronic device to a dedicated application store application on the same first electronic device. In some embodiments, context is transferred from a generic application store application on a first electronic device to another generic application store application on a second electronic device (e.g., a different electronic device than the first electronic device). In some embodiments, context is transferred from a generic application store application on a first electronic device to a dedicated application store application on the second electronic device (e.g., a different electronic device than the first electronic device). In some embodiments, context is transferred from a dedicated application store application on a first electronic device to another dedicated application store application on a second electronic device (e.g., a different electronic device than the first electronic device). These and other combinations of transferring context between a generic application store application and dedicated application store application between one or more electronic devices are contemplated.

The above-described manner of updating two user interfaces of two different applications (e.g., by displaying a subscription-specific user interface from a generic application store application and reflecting visual updates on the subscription-specific user interface on a dedicated subscription application store application) allows the electronic device to provide the user with a seamless experience between two different applications (e.g., by transferring visual changes in the user interface of one application to the user interface of another application such that when the user launches a dedicated subscription store application indicating the user's desire to see only subscription-specific information, the user is presented with the most recently displayed user interface for the subscription service, regardless of whether the interaction was on the dedicated subscription store application or a generic application store application), which simplifies the interaction between the user and the electronic device and enhances the operability of the electronic device and makes the user-device interface more efficient (e.g., by automatically including the same visual updates to the first user interface of the first application and to the second user interface of the second application without requiring the user to perform the same inputs and interactions on the second user interface to reach the same state as the first user interface), which additionally reduces power usage and improves battery life of the electronic device by enabling the user to use the electronic device more quickly and efficiently while reducing errors in the usage of the device.

In some embodiments, the display is in communication with an electronic device (1710), such as in FIG. 16A (e.g., electronic device 500, a mobile device (e.g., a tablet, a smartphone, a media player, or a wearable device) including a touch screen, a computer including one or more of a keyboard, mouse, trackpad, and touch screen, or a set-top box in communication with a remote control device). In some embodiments, the sequence of one or more inputs interacting with the first user interface is received via one or more input devices of the electronic device (1712), such as in FIG. 16M (e.g., receiving user input from the keyboard, mouse, trackpad, or touch screen of the mobile device). In some embodiments, the input corresponding to the request to display the second application is received via the one or more input devices (1714), such as in FIG. 16O (e.g., receiving user input from the keyboard, mouse, trackpad, or touch screen of the mobile device). In some embodiments, the second user interface of the second application is displayed on the display (1716), such as in FIG. 16P (e.g., displaying the second application on the same device that displayed the first application).

The above-described manner of updating two user interfaces of two different applications (e.g., by displaying a subscription-specific user interface from a generic application store application and reflecting visual updates on the subscription-specific user interface on a dedicated subscription application store application) allows the electronic device to provide the user with a seamless experience between two different applications (e.g., by transferring visual changes in the user interface of one application to the user interface of another application such that when the user launches a dedicated subscription store application indicating the user's desire to see only subscription-specific information, the user is presented with the most recently displayed user interface for the subscription service, regardless of whether the interaction was on the dedicated subscription store application or a generic application store application), which simplifies the interaction between the user and the electronic device and enhances the operability of the electronic device and makes the user-device interface more efficient (e.g., by automatically including the same visual updates to the first user interface of the first application and to the second user interface of the second application without requiring the user to perform the same inputs and interactions on the second user interface to reach the same state as the first user interface), which additionally reduces power usage and improves battery life of the electronic device by enabling the user to use the electronic device more quickly and efficiently while reducing errors in the usage of the device.

In some embodiments, the first application is a first application store application from which access to subscription applications and non-subscription applications can be purchased, such as in FIG. 16D (e.g., a generic application store application), and the second application is a second application store application from which access to subscription applications can be purchased but from which access to non-subscription applications cannot be acquired (1718), such as in FIG. 16H. In some embodiments, the generic application store application is an application in which the user can browse for and/or purchase applications and/or other content for use on the electronic device. In some embodiments, the generic application store application allows the user to browse for and purchase any and all types of applications and/or content that is compatible on the electronic device. In some embodiments, the second application is a dedicated application store application in which only applications and/or content of a certain type can be browsed for and purchased. For example, the dedicated application store application can be a store that is dedicated to only subscription applications. In such examples, non-subscription applications are not included in the dedicated application store application. In some embodiments, the generic application store application can have an interface, page, or tab, that is also dedicated to subscription applications and the content in the dedicated application store application for subscription applications is similar or identical to the interface, page, or tab of the generic application store application that is dedicated to subscription applications.

The above-described manner of linking specific user interfaces of an application store application and a dedicated application store application (e.g., by reflecting visual updates from a user interface of one application to the user interface of the other application) allows the electronic device to provide the user with a seamless experience between two different applications (e.g., by transferring visual changes in the user interface of the application store application to the user interface of the dedicated application store application (and vice versa) such that when the user launches a dedicated subscription store application indicating the user's desire to see only subscription-specific information, the user is presented with the most recently displayed user interface for the subscription service, regardless of whether the interaction was on the dedicated subscription store application or a generic application store application), which simplifies the interaction between the user and the electronic device and enhances the operability of the electronic device and makes the user-device interface more efficient (e.g., by automatically including the same visual updates to the first user interface of the first application and to the second user interface of the second application without requiring the user to perform the same inputs and interactions on the second user interface to reach the same state as the first user interface), which additionally reduces power usage and improves battery life of the electronic device by enabling the user to use the electronic device more quickly and efficiently while reducing errors in the usage of the device.

In some embodiments, while displaying, on the display, a respective user interface of the first application, the electronic device receives (1720), via the one or more input devices, a second sequence of one or more inputs interacting with the respective user interface, such as in FIG. 16M. In some embodiments, the second sequence of one or more inputs includes browsing in the user interface, selecting an item and causing display of the item's landing page, or otherwise interacting with the respective user interface in any way that does or does not display any visual results of the interaction or change a context of the respective user interface to reflect the user's interaction with the respective user interface (e.g., changing environmental variables, changing global or local variables, etc.). In some embodiments, in response to receiving the second sequence of inputs interacting with the respective user interface, the electronic device updates (1722) the display to display, in accordance with the second sequence of inputs, one or more second visual updates associated with the respective user interface, such as in FIG. 16N. In some embodiments, in response to a user selecting an item and requesting display of more information regarding the selected item, the electronic device updates the display to display the selected item's canonical page. In some embodiments, in response to the user scrolling or browsing through the respective user interface, updating the display in response to the browsing input. For example, if a user performs a scrolling gesture on a list of applications, visually scrolling through the list of applications. In some embodiments, after receiving the second sequence of inputs, the electronic device receives (1724), via the one or more input devices, a second input corresponding to a request to display the second application, such as in FIG. 16O. In some embodiments, the user selects an icon on a home screen user interface for the second application and requesting to launch the dedicated application store application for subscription applications. In some embodiments, in response to receiving the second input corresponding to the request to display the second application and without receiving further user input (1726): in accordance with a determination that the respective user interface of the first application is the first user interface of the first application, the electronic device displays (1728), on the display, the second user interface of the second application, wherein the second user interface includes the one or more second visual updates associated with the first user interface and corresponding to the second sequence of inputs, such as in FIG. 16P. In some embodiments, the determination is whether the respective user interface is a user interface of the first application that is dedicated to subscription applications or otherwise linked to the dedicated application store application's content. In some embodiments, the electronic device displays the dedicated application store application including all the visual updates reflecting the user's interaction with the first user interface on the first application. For example, if the user's interaction was with the tab in the generic application store application that is dedicated to subscription applications, then the dedicated application store application for subscription applications also reflect the interactions as if the user was interacting with the dedicated application store application itself. In some embodiments, in accordance with a determination that the respective user interface of the first application is not the first user interface of the first application, the electronic device displays (1730), on the display, the second user interface of the second application, wherein the second user interface does not include the one or more second visual updates associated with the first user interface and corresponding to the second sequence of inputs, such as in FIG. 16H. In some embodiments, the determination is whether the respective user interface is not a user interface of the first application that is dedicated to subscription applications or otherwise linked to the dedicated application store application's content. In other words, the user has navigated away from the page dedicated to subscription applications and/or is interacting with other pages, tabs, or user interfaces of the generic application store application that is not dedicated or related to subscription applications. In some embodiments, the electronic device displays the dedicated application store application without any of the visual updates resulting from the user's interaction with the first user interface on the first application. For example, if the user's interaction was with the tab in the generic application store application that is not dedicated to subscription applications, then the dedicated application store application for subscription applications does not reflect any of those interactions.

The above-described manner of not linking specific user interfaces of the application store application to the dedicated application store application (e.g., by reflecting visual updates from a specific user interface of one application to the user interface of the other application but not reflecting visual updates from other user interfaces of the one application to the user interface of the other application) allows the electronic device to provide the user with a seamless experience between two different applications while avoiding transferring unnecessary information between applications (e.g., by transferring only visual changes that are relevant between the two applications and forgoing transferring visual changes to user interfaces with content that is not shared between the two applications (e.g., non-subscription content)), which simplifies the interaction between the user and the electronic device and enhances the operability of the electronic device and makes the user-device interface more efficient (e.g., by automatically including the same visual updates to the first user interface of the first application and to the second user interface of the second application without requiring the user to perform the same inputs and interactions on the second user interface to reach the same state as the first user interface), which additionally reduces power usage and improves battery life of the electronic device by enabling the user to use the electronic device more quickly and efficiently while reducing errors in the usage of the device.

In some embodiments, the respective user interface of the first application is not the first user interface of the first application, and the first user interface of the first application is accessible from the respective user interface of the first application (1732), such as in FIG. 16K. In some embodiments, the generic application store application includes a user interface, such as a tab, page, or other user interface, that is not dedicated or otherwise related to subscription applications, and the user interface is accessible from the user interface that is dedicated to subscription applications. For example, the generic application store application includes a navigation bar or tabs which allow the user to navigate between multiple different user interfaces or pages and while the user is on the page that is dedicated to subscription applications, the user can select another page on the navigation bar and replace display of the user interface dedicated to subscription applications with a user interface that is not dedicated or related to subscription applications. In some embodiments, a user can interact with the user interface dedicated to subscription applications and the interactions will be reflected to the second application, and after interacting with the user interface dedicated to subscription applications, the user can navigate to a user interface that is not dedicated to subscription applications and navigate with that user interface. In such embodiments, the interaction with the user interface that is not dedicated to subscription applications will not be transmitted or otherwise reflected to the second application even though the earlier interactions with the user interface that is dedicated to subscription applications is reflected to the second application.

The above-described manner of not linking some user interfaces of the application store application but linking other user interfaces of the application store application (e.g., by reflecting visual changes from a specific user interface of one application to the other application, but not reflecting visual changes from another user interface of the one application, even though the other user interface is accessible from the specific user interface) allows the electronic device to provide the user with a seamless experience between two different applications while avoiding transferring unnecessary information between applications (e.g., by transferring only visual changes that are relevant between the two applications and forgoing transferring visual changes to user interfaces with content that is not shared between the two applications (e.g., non-subscription content)), which simplifies the interaction between the user and the electronic device and enhances the operability of the electronic device and makes the user-device interface more efficient (e.g., by automatically including the same visual updates to the first user interface of the first application and to the second user interface of the second application without requiring the user to perform the same inputs and interactions on the second user interface to reach the same state as the first user interface), which additionally reduces power usage and improves battery life of the electronic device by enabling the user to use the electronic device more quickly and efficiently while reducing errors in the usage of the device.

In some embodiments, the sequence of one or more inputs includes scrolling the first user interface, and the one or more visual updates include updating a view of the first user interface to be a scrolled view of the first user interface (1734), such as in FIGS. 16S and 16U. In some embodiments, scrolling inputs on the first user interface are reflected in the second application. For example, if a user performs a scrolling gesture on a list of items, visually scrolling through the list of items and also reflecting the same scrolled state in the second application.

The above-described manner of reflecting scrolling interactions (e.g., by reflecting visual changes from a scrolling input) allows the electronic device to provide the user with a seamless experience between two different applications (e.g., by transferring the visual changes resulting from a user scrolling through a list of items), which simplifies the interaction between the user and the electronic device and enhances the operability of the electronic device and makes the user-device interface more efficient (e.g., by automatically including the same visual updates from the scrolling inputs without requiring the user to perform the same scrolling inputs to reach the same scrolled state as shown in the first user interface), which additionally reduces power usage and improves battery life of the electronic device by enabling the user to use the electronic device more quickly and efficiently while reducing errors in the usage of the device.

In some embodiments, the sequence of one or more inputs includes an input corresponding to a request to display more information about a respective application displayed on the first user interface, and the one or more visual updates include displaying a user interface specific to the respective application (1736), such as in FIG. 16N. In some embodiments, the sequence of one or more inputs includes selection inputs on applications that cause display of a user interface specific to the selected application, without leaving the page that is relevant to subscription applications. For example, if a user selects a particular subscription application within the subscription applications page and causes display of a page with more information about the selected subscription application, the same page with more information about the selected subscription application is reflected in the second application. In some embodiments, if the user launches the second application and without performing any additional user interactions, the user will see the page with more information about the selected application.

The above-described manner of reflecting selection interactions (e.g., by reflecting the display of user interfaces as a result of selection inputs) allows the electronic device to provide the user with a seamless experience between two different applications (e.g., by transferring the visual changes resulting from a user selecting an item), which simplifies the interaction between the user and the electronic device and enhances the operability of the electronic device and makes the user-device interface more efficient (e.g., by automatically including the same visual updates from the selection input without requiring the user to perform the same selection inputs to reach the same user interface or page as was displayed in the first user interface), which additionally reduces power usage and improves battery life of the electronic device by enabling the user to use the electronic device more quickly and efficiently while reducing errors in the usage of the device.

In some embodiments, in response to receiving the sequence of inputs interacting with the first user interface, the electronic device transfers (1738), by the first application to the second application, information corresponding to the sequence of inputs interacting with the first user interface, such as in FIG. 16P (e.g., reflecting the visual changes in the second application is achieved by transferring the inputs received by the first application to the second application). In some embodiments, the inputs are transferred by accessing an API of the second application. In some embodiments, the inputs are transferred by the second application accessing an API of the first application. In some embodiments, the inputs are transferred via a server. In some embodiments, instead of transferring the inputs from one application to another, only information about the visual updates are transferred. In some embodiments, the entire state or context of the user interface and/or of the first application is transferred to the second application. In some embodiments, the second application receives more data than necessary and filters the data to only the relevant data and/or only accesses the relevant portions of the data. In some embodiments, the second user interface of the second application is displayed based on the transferred information received from the first application (1740), such as in FIG. 16P (e.g., using the information received from the first application to reflect the visual updates in the second application). In some embodiments, updating the second user interface involves applying the updates to the user interface of the second application. In some embodiments, updating the second user interface involves accessing the state of the first user interface and applying the state to the second application (e.g., loading the first user interface into the second user interface rather than applying only changes to the second user interface).

The above-described manner of reflecting updates on the second user interface (e.g., by transmitting information from the first application to the second application and using the information to display the second user interface) allows the electronic device to provide the user with a seamless experience between two different applications (e.g., by transferring information regarding the state of and/or the changes to the first user interface to the second application and using the transferred information to determine the look and feel of the second user interface of the second application), which simplifies the interaction between the user and the electronic device and enhances the operability of the electronic device and makes the user-device interface more efficient (e.g., by automatically transferring information from the first application to the second application and reflecting the information in the second user interface without requiring the user to perform the same selection inputs to achieve the same state as was displayed in the first user interface), which additionally reduces power usage and improves battery life of the electronic device by enabling the user to use the electronic device more quickly and efficiently while reducing errors in the usage of the device.

In some embodiments, an application launching user interface of the electronic device includes a prioritized region and another region outside of the prioritized region, the prioritized region including (1742): a first representation of the first application, wherein the first representation is selectable to display the first application on the display (1744), such as in FIG. 16B. In some embodiments, on a home screen or other user interface which displays representations of applications, selection of which causes the applications to be launched, including a prioritized region and a nonprioritized region. In some embodiments, the prioritized region can include representations or icons of applications. In some embodiments, the representations in the prioritized region have functionalities that are not enabled in the nonprioritized regions. For example, when an icon in the prioritized region is highlighted or has a focus, a preview of content in the respective application can be displayed in a content preview region (e.g., above the prioritized region). In some embodiments, the prioritized region is the first row of the application launching user interface. In some embodiments, when a user scrolls beyond the first row (e.g., to the nonprioritized rows), the content preview region is scrolled away and hidden such that no content is displayed in the content preview region. In some embodiments, applications can be relocated in the application launching user interface such that applications in the nonprioritized region can be moved to the prioritized region and can have the same features and benefits of being located in the prioritized region. In some embodiments, if an application does not support or is not compatible with the features that are associated with the prioritized region, relocating the application to the prioritized region may not cause all features specific to the prioritized region to be available. In some embodiments, if the application does not support providing content previews, then if the application is in the prioritized region and has a focus, content previews will not appear in the content preview region. In some embodiments, a first icon corresponding to a first application which, when selected, causes launching of the first application. In some embodiments, when the first representation of the first application has a focus and if the first representation is in the prioritized region, then samples of content from the first application can be displayed in a content preview region of the user interface. For example, if the first application is a generic application store application, the content preview region can display a number of different featured applications available for purchase in the generic application store application. In some embodiments, items that are not in the prioritized region will not cause content to be displayed in the content preview region when the item is in focus. In some embodiments, the prioritized region includes a second representation of the second application, wherein the second representation is selectable to display the second application on the display (1746), such as in FIG. 16B. In some embodiments, a second icon corresponding to a second application which, when selected, causes launching of the second application. In some embodiments, when the second representation of the second application has a focus and if the second representation is in the prioritized region, then samples of content from the second application can be displayed in a content preview region of the user interface. For example, if the first application is a dedicated application store application for subscription applications, the content preview region can display a number of different featured subscription applications available for purchase in the dedicated application store application. In some embodiments, the input corresponding to the request to display the second application includes selecting the second representation of the second application in the prioritized region of the application launching user interface (1748), such as in FIG. 16G (e.g., receiving a user input selecting the second representation while the second representation is highlighted or otherwise has a focus.).

The above-described manner of displaying icons on an application launching user interface (e.g., by including a prioritized region and a nonprioritized region and including the two representations in the prioritized region) allows the electronic device to provide the user with a user interface to launch applications and to preview the content of some of the applications being launched (e.g., by including a prioritized region in which applications in the prioritized region will display previews of content in the respective application when the respective application has focus), which simplifies the interaction between the user and the electronic device and enhances the operability of the electronic device and makes the user-device interface more efficient (e.g., by providing a location in which a user can preview content relevant to an application without requiring the user to launch and navigate through the respective application to determine whether the application is relevant to the user's interests), which additionally reduces power usage and improves battery life of the electronic device by enabling the user to use the electronic device more quickly and efficiently while reducing errors in the usage of the device.

In some embodiments, the electronic device receives (1750), via the one or more input devices, an input corresponding to a request to wake the electronic device, such as in FIG. 16A (e.g., receiving an input from a remote control device when the electronic device is powered off or in a sleep state). In some embodiments, the input can be any input interacting with the electronic device. In some embodiments, the input is a wake command. In some embodiments, the remote control device is a game controller device configured to remotely control the electronic device. In some embodiments, in response to receiving the input corresponding to the request to wake the electronic device (1752): in accordance with a determination that the input corresponding to the request to wake the electronic device was from a first input device of the one or more input devices, the electronic device wakes (1754) and performs (1754) a first action corresponding the first input device, such as in FIG. 16Y. In some embodiments, if the wake request is received from a game controller device, the electronic device wakes and performs an action relevant to the game controller. For example, the electronic device can automatically launch the previously played game (e.g., and/or resume the previous game session), provide a pop-up asking the user whether the user would like to launch the previously played game, or perform other actions that are consistent with the user's indication that the user intends to play games using the game controller. In some embodiments, the previously played game can have been played on another electronic device and the electronic device can resume the game session and/or launch the game that was previously played on the other electronic device. In some embodiments, in accordance with a determination that the input corresponding to the request to wake the electronic device was from a second input device of the one or more input devices, different than the first input device, the electronic device wakes (1756) without performing the first action corresponding the first input device, such as in FIG. 16B. In some embodiments, if the wake request is received from a remote control device that is not a game controller, the device launches without automatically performing the actions that are relevant to the user's intent to play games. In some embodiments, waking the device comprises displaying the home screen user interface or displaying the interface that was previously displayed when the device entered the sleep or low power state.

The above-described manner of waking the device (e.g., by performing a first action if the wake request was received from a first type of device and not performing the first action if the wake request was received from a second type of device) allows the electronic device to provide the user with options relevant to the user's intent based on the device used to wake the device (e.g., by deducing the user's intent to play games if the request was received from a game controller and preparing the device or otherwise updating the user interface to allow the user to access games more quickly), which simplifies the interaction between the user and the electronic device and enhances the operability of the electronic device and makes the user-device interface more efficient (e.g., by automatically preparing the electronic device when the user indicates that the user intends to play games without requiring the user to perform additional user inputs to access the applications of interest to the user), which additionally reduces power usage and improves battery life of the electronic device by enabling the user to use the electronic device more quickly and efficiently while reducing errors in the usage of the device.

In some embodiments, the first input device is a game controller device (1758), such as in FIG. 16X. In some embodiments, if the user sends a wake request from a game controller device, it can be deduced that the user intends to play games on the electronic device. In some embodiments, the game controller device is a universal game controller device that is compatible with the electronic device. In some embodiments, the game controller device is a device dedicated for and specific to the electronic device. In some embodiments, the game controller device can remotely control the electronic device (e.g., via Bluetooth, RF, IR, or any other suitable wireless protocol) or can be connected to the electronic device via a wire or a cable. In some embodiments, the first action includes displaying, on the display, a notification for continuing a previous game session (1760), such as in FIG. 16Y (e.g., on the electronic device or on another device that is logged into the same user account as is the electronic device). In some embodiments, selecting the notification causes the electronic device to launch the previous game session.

The above-described manner of launching a previous game session (e.g., by displaying a notification for the user to launch a previous game session when the wake request is received from a game controller device) allows the electronic device to provide the user with options relevant to the user's intent based on the device used to wake the device (e.g., by deducing the user's intent to play games if the request was received from a game controller and asking the user whether the user desires to continue the user's previous game session), which simplifies the interaction between the user and the electronic device and enhances the operability of the electronic device and makes the user-device interface more efficient (e.g., by providing a pop-up option for the user to restore the previous game play session without requiring the user to perform extra inputs to navigate to the appropriate game), which additionally reduces power usage and improves battery life of the electronic device by enabling the user to use the electronic device more quickly and efficiently while reducing errors in the usage of the device.

In some embodiments, the first input device is a game controller device (1762), such as in FIG. 16X. In some embodiments, if the user sends a wake request from a game controller device, it can be deduced that the user intends to play games on the electronic device. In some embodiments, the first action includes displaying, on the display, a notification that is selectable to display, on the display, the second application (1764), such as in FIG. 16Y. In some embodiments, selecting the notification causes the electronic device to launch or otherwise display the dedicated application store application for subscription applications. For example, if the user does not have any games downloaded or installed on the electronic device, waking the device with a game controller will take the user to the application store to acquire games to play.

The above-described manner of launching a dedicated application store application for subscription applications (e.g., by displaying an application for browsing and downloading subscription applications and/or games when the wake request is received from a game controller device)

allows the electronic device to provide the user with options relevant to the user's intent based on the device used to wake the device (e.g., by deducing the user's intent to play games if the request was received from a game controller and providing the user with a shortcut to launch a dedicated application store application from which the user can download and install games onto the electronic device), which simplifies the interaction between the user and the electronic device and enhances the operability of the electronic device and makes the user-device interface more efficient (e.g., by providing a pop-up option for the user to launch the dedicated application store application for subscription applications without requiring the user to perform extra inputs to navigate to the appropriate application store application), which additionally reduces power usage and improves battery life of the electronic device by enabling the user to use the electronic device more quickly and efficiently while reducing errors in the usage of the device.

In some embodiments, in accordance with a determination that the first input device is a game controller device (1766): the first action includes displaying an application launching user interface of the electronic device that includes a representation of the second application in a prioritized region of the application launching user interface, the application launching user interface including a prioritized region and another region, outside of the prioritized region (1768), such as in FIG. 16Y. In some embodiments, if the user wakes the electronic device using a game controller device and the dedicated application store application for subscription applications is not currently located in the prioritized region of the application launching user interface, the electronic device automatically moves the dedicated application store application to the prioritized region. In some embodiments, the dedicated application store application will have a focus such that the user can quickly launch the application. In some embodiments, other applications on the application launching user interface will not have the focus, even though they may have had the focus right before the electronic device was last powered down. In some embodiments, in accordance with a determination that the first input device is not the game controller device (1770): the first action includes displaying the application launching user interface of the electronic device that includes the representation of the second application in the other region of the application launching user interface, and not in the prioritized region of the application launching user interface (1772), such as in FIG. 16B. In some embodiments, if the user wakes the electronic device with a device other than a game controller, and dedicated application store application is not in the prioritized region, the electronic device leaves the dedicated application store application in its current location. In some embodiments, if the dedicated application store application is in the prioritized region, the electronic device moves it out of the prioritized region.

The above-described manner of moving the second application according to the user's deduced intent (e.g., by moving the application to a prioritized location if the wake request was received from a game controller or by moving the application out of the prioritized location if the wake request was received from a device other than a game controller) allows the electronic device to provide the user with options relevant to the user's intent based on the device used to wake the device (e.g., by deducing the user's intent to play games if the request was received from a game controller and promoting the dedicated application store application for subscription applications from which the user can download and install games onto the electronic device to a location that is easier and quicker to access and by demoting the dedicated application store application out of the prioritized region to make room for other applications when the user does not display an intent to play games), which simplifies the interaction between the user and the electronic device and enhances the operability of the electronic device and makes the user-device interface more efficient (e.g., by moving the second application to a location that is easier to access when the user's actions indicate that the second application would be of interest to the user without requiring the user to perform extra inputs to navigate to the appropriate application store application), which additionally reduces power usage and improves battery life of the electronic device by enabling the user to use the electronic device more quickly and efficiently while reducing errors in the usage of the device.

In some embodiments, the second input device is a dedicated remote control device for the electronic device, other than a game controller device (1774), such as in FIG. 16A. In some embodiments, the second input device is a remote control device for controlling the electronic device. In some embodiments, the dedicated remote control device does not include additional buttons, thumbpads, joysticks, and/or directional pads that facilitate two-handed gameplay. In some embodiments, regardless of the type of input device used to wake the electronic device, the electronic device displays the home screen interface. In some embodiments, as described above, the home screen interface can be different based on the type of device used to wake the electronic device. In some embodiments, the home screen can be unchanged and the electronic device can treat a game controller device the same as a dedicated remote control device.

The above-described manner of waking the electronic device (e.g., with a dedicated remote control device or by a game controller device) allows the electronic device to provide the user with different types of remote control devices to perform the same or similar functions (e.g., supporting both dedicated remote control devices and game controller devices, both of which can be used to wake the electronic device), which simplifies the interaction between the user and the electronic device and enhances the operability of the electronic device and makes the user-device interface more efficient (e.g., by allowing the game controller device to also wake the electronic device without requiring the user to use the dedicated remote control device to wake the device before switching to using the game controller device), which additionally reduces power usage and improves battery life of the electronic device by enabling the user to use the electronic device more quickly and efficiently.

In some embodiments, the display is in communication with a first electronic device (1776), such as in FIG. 16B (e.g., a first mobile device (e.g., a tablet, a smartphone, a media player, or a wearable device) including a touch screen, a computer including one or more of a keyboard, mouse, trackpad, and touch screen, or a set-top box in communication with a remote control device). In some embodiments, the sequence of one or more inputs interacting with the first user interface is received via one or more first input devices of the first electronic device (1778), such as in FIG. 16B (e.g., receiving user input from the keyboard, mouse, trackpad, or touch screen of the mobile device). In some embodiments, the input corresponding to the request to display the second application is received via one or more second input devices, different from the one or more first input devices, of a second electronic device, different from the first electronic device (1780), such as described above (e.g., a second mobile device (e.g., a tablet, a smartphone, a media player, or a wearable device) including a touch screen, a computer including one or more of a keyboard, mouse, trackpad, and touch screen, or a set-top box in communication with a remote control device). In some embodiments, the second user interface of the second application is displayed on a second display, different from the first display, in communication with the second electronic device (1782), such as described above (e.g., displaying the second application on a different device that displayed the first application). In some embodiments, the context, user inputs, and/or visual updates can be transferred from one electronic device to another. For example, context can be transferred from a generic application store application on a first electronic device to a dedicated application store application on the same first electronic device. In some embodiments, context is transferred from a generic application store application on a first electronic device to another generic application store application on a second electronic device (e.g., a different electronic device than the first electronic device). In some embodiments, context is transferred from a generic application store application on a first electronic device to a dedicated application store application on the second electronic device (e.g., a different electronic device than the first electronic device). In some embodiments, context is transferred from a dedicated application store application on a first electronic device to another dedicated application store application on a second electronic device (e.g., a different electronic device than the first electronic device). These and other combinations of transferring context between a generic application store application and dedicated application store application between one or more electronic devices are contemplated.

The above-described manner of updating two user interfaces of two different applications on two different devices (e.g., by displaying a subscription-specific user interface from a generic application store application on a first device and reflecting visual updates on the subscription-specific user interface on a dedicated subscription application store application of a second device) allows the electronic device to provide the user with a seamless experience between two different devices (e.g., by transferring visual changes in the user interface of one application on one device to the user interface of another application on another device such that when the user launches a dedicated subscription store application on another device, the user is presented with the most recently displayed user interface for the subscription service, regardless of whether the interaction was on the first electronic device or the second electronic device), which simplifies the interaction between the user and the electronic device and enhances the operability of the electronic device and makes the user-device interface more efficient (e.g., by automatically including the same visual updates to the first user interface of the first application on the first electronic device and to the second user interface of the second application on the second electronic device without requiring the user to perform the same inputs and interactions on the second user interface to reach the same state as the first user interface), which additionally reduces power usage and improves battery life of the electronic device by enabling the user to use the electronic device more quickly and efficiently while reducing errors in the usage of the device.

It should be understood that the particular order in which the operations in FIGS. 17A-17H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, and 1900) are also applicable in an analogous manner to method 1700 described above. For example, the operation of the electronic device in the transfer of context between a generic application store and a dedicated application store for a respective category of applications described above with reference to method 1700 optionally has one or more of the characteristics of an application store that are specific to a respective application, user interfaces of an application store that include information about a respective category of applications, user interfaces of an application store for accessing a respective category of applications, visual indications of the number of available updates, user interfaces of an electronic device for launching and removing a respective application, notifications of the completion of a download, etc., described herein with reference to other methods described herein (e.g., methods 700, 900, 1100, 1300, 1500, and 1900). Furthermore, the application store(s) described with reference to method 1700 above optionally has one or more of the features of the application store(s) described with reference to methods 700, 900, 1100, 1300, 1500, and 1900. For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5K) or application specific chips. Further, the operations described with reference to FIGS. 15A-15G are, optionally, implemented by components depicted in FIGS. 1A-1B. For example, displaying operations 1702, 1704, 1708, 1722, 1728, 1730, 1760, 1764, 1768, and 1772, receiving operations 1702, 1706, 1720, 1724, and 1750, and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Application Download Completion Notifications

Users interact with electronic devices in many different manners. In some embodiments, applications are installed onto the electronic devices. In some embodiments, the applications serve any number of purposes from accessing content to receiving information to playing games. In some embodiments, the applications installed onto the electronic devices can be included with the electronic device, purchased and installed onto the electronic device by the user, or can be "rented" or "leased" by the user. In some embodiments, after purchasing or renting/leasing applications, the applications are downloaded and installed onto the electronic device. In some embodiments, the download and/or installation of the applications require a certain amount of time. The embodiments described below provide ways in which an electronic device notifies a user notifies a user of the completion of a download of an application, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 18A:
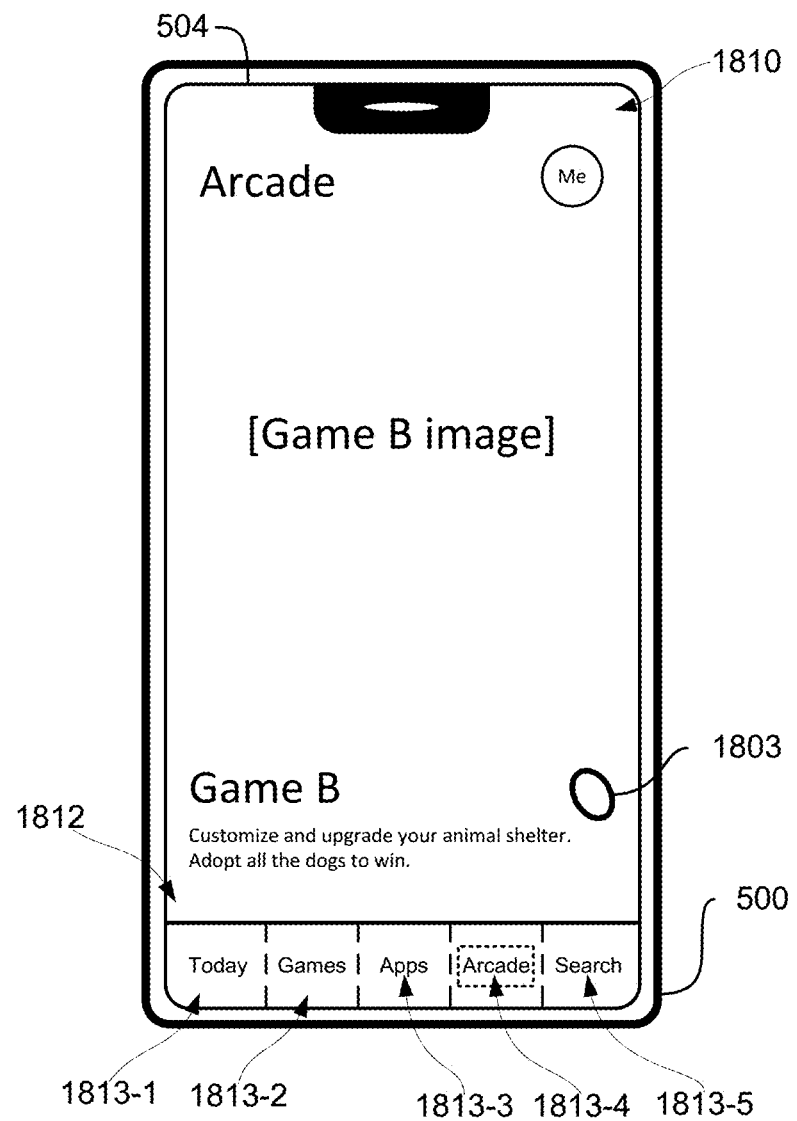
FIGS. 18A-18Y illustrate exemplary ways in which an electronic device notifies a user of the completion of a download in accordance with some embodiments.
Figure 18B:
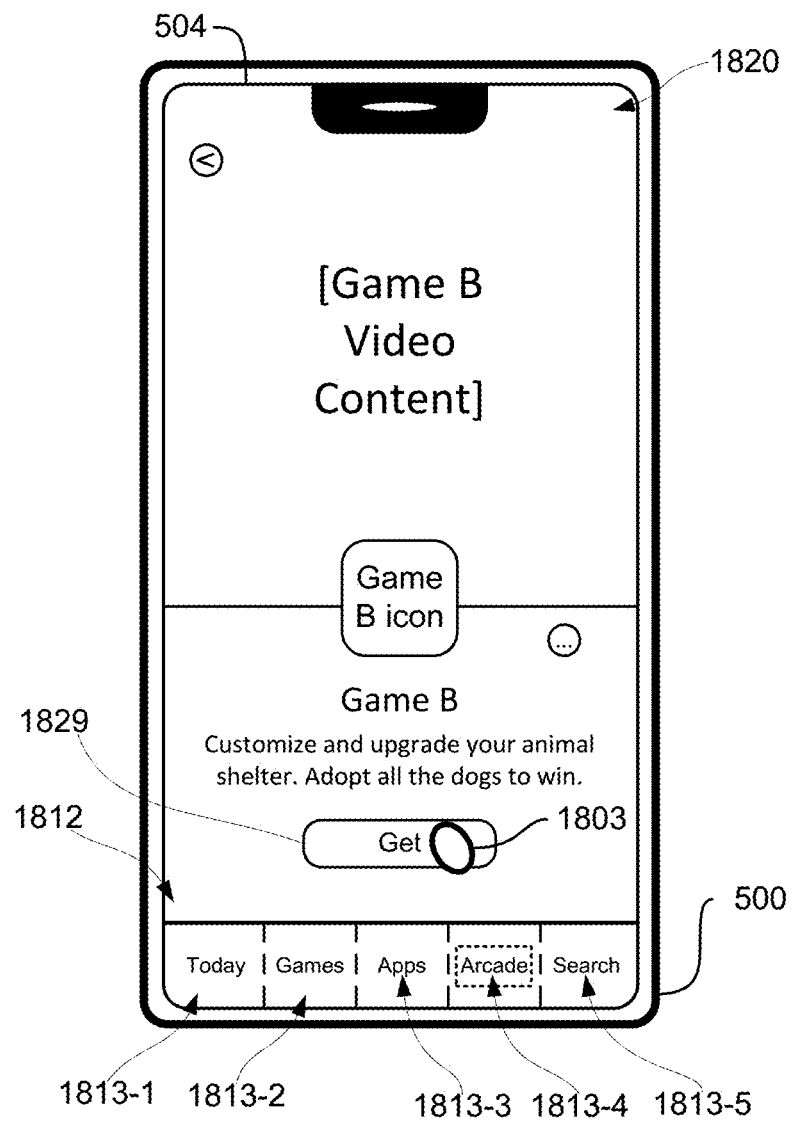
Figure 18C:
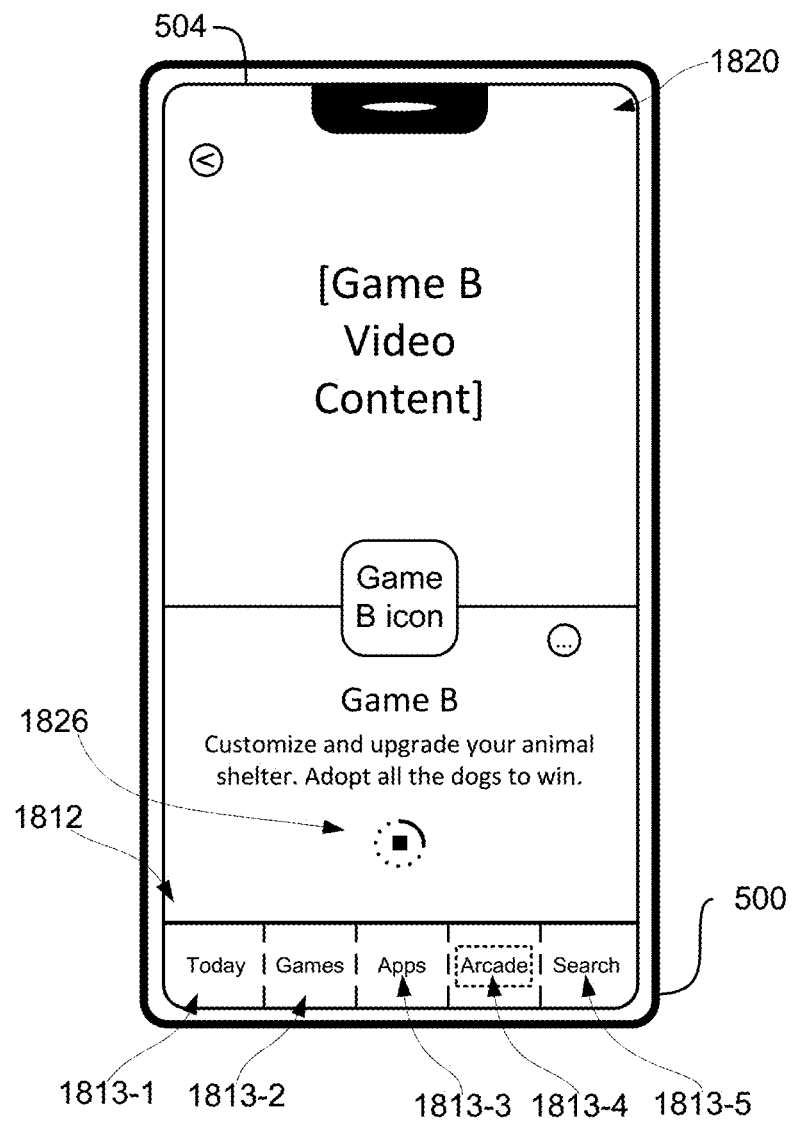
Figure 18D:
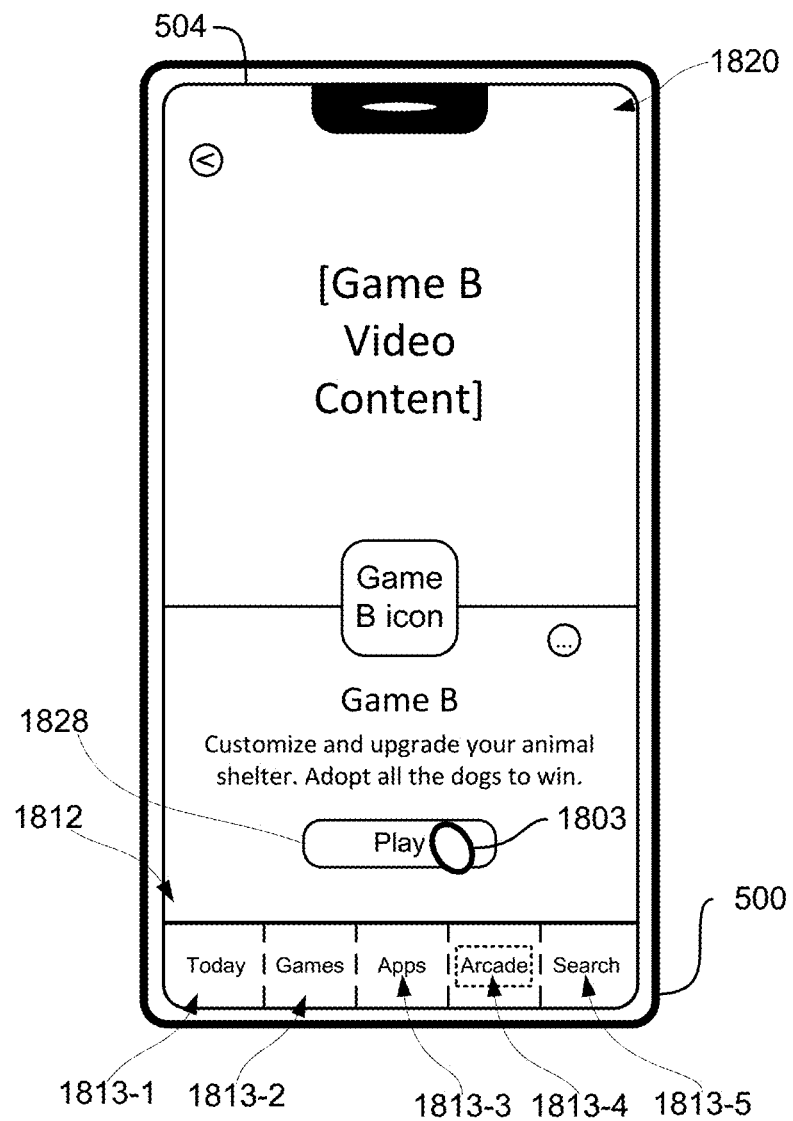
Figure 18E:
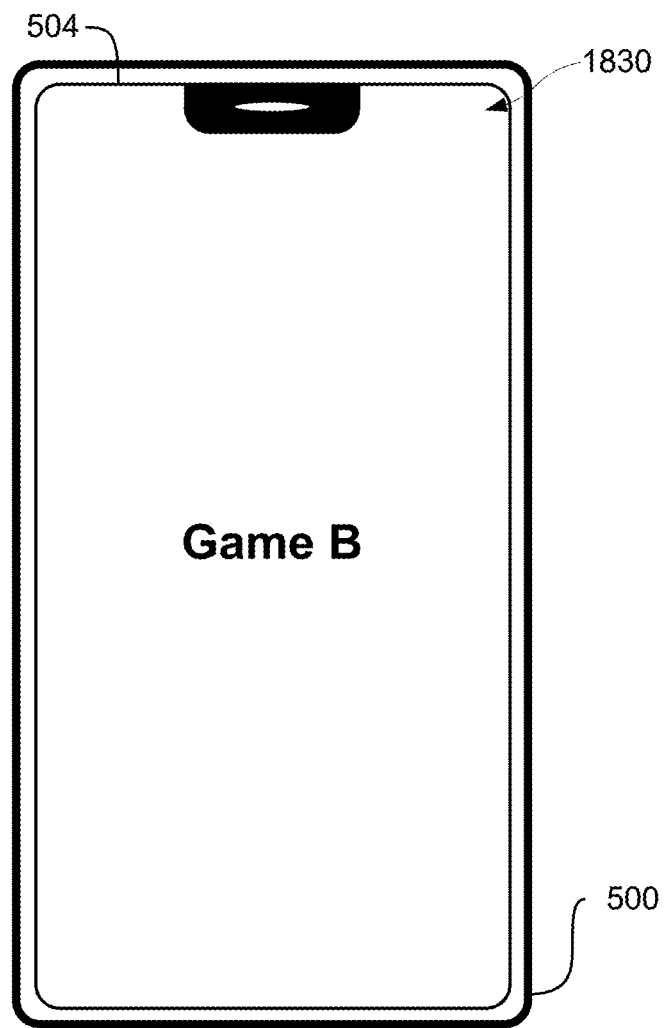
Figure 18F:
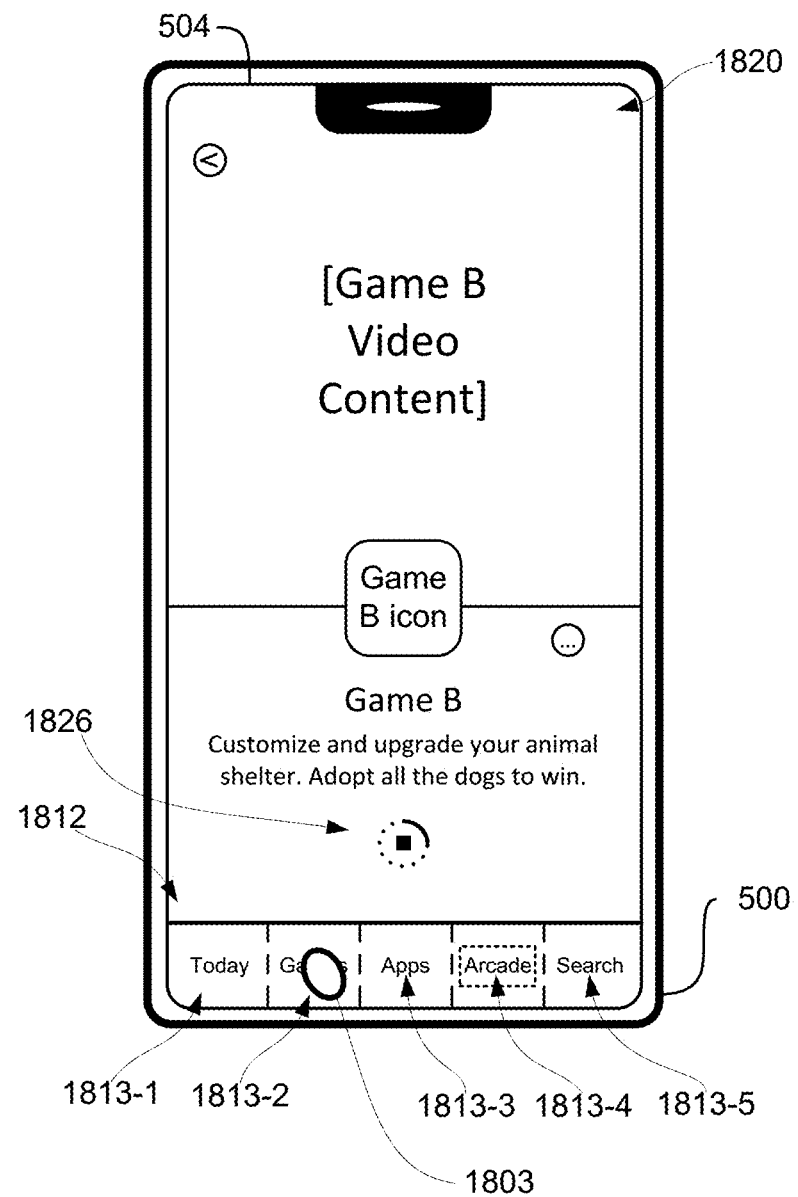
Figure 18G:
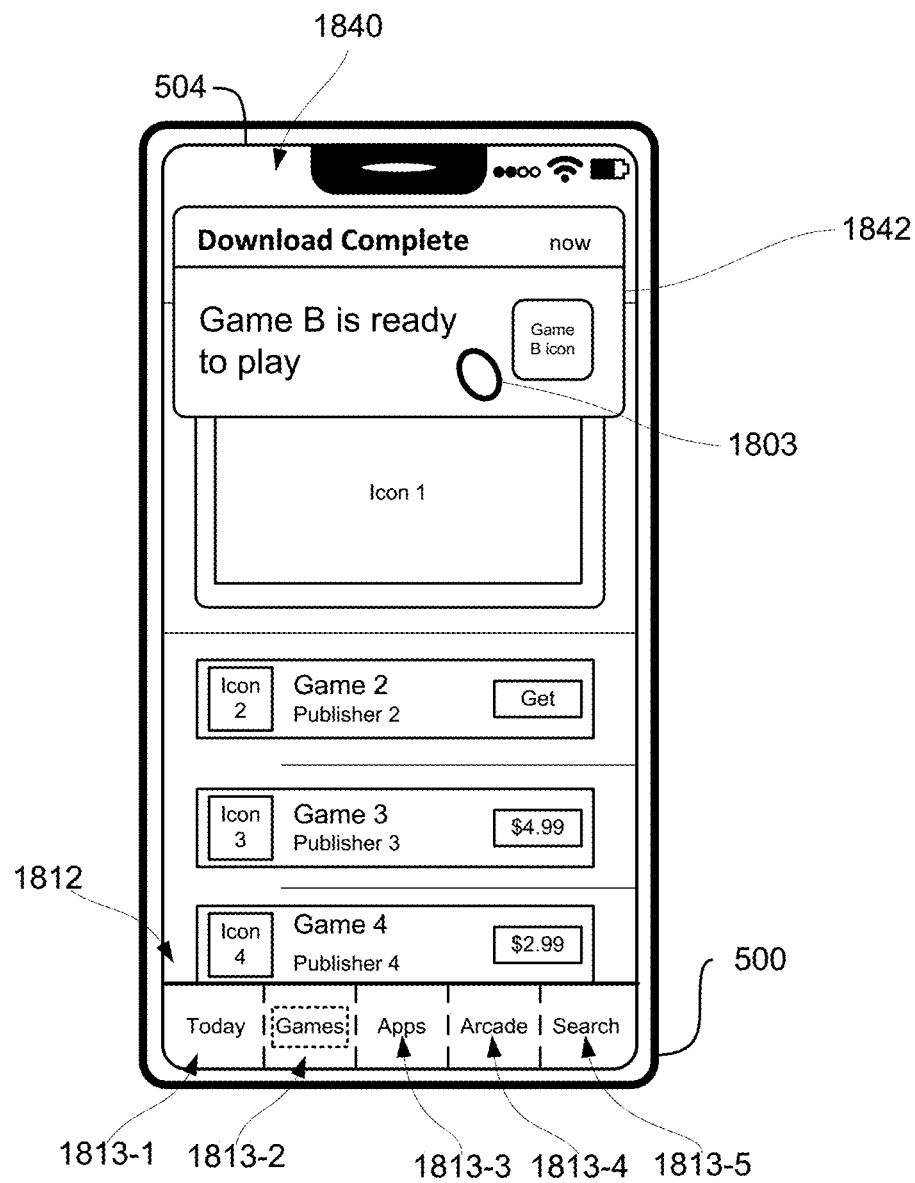
Figure 18H:
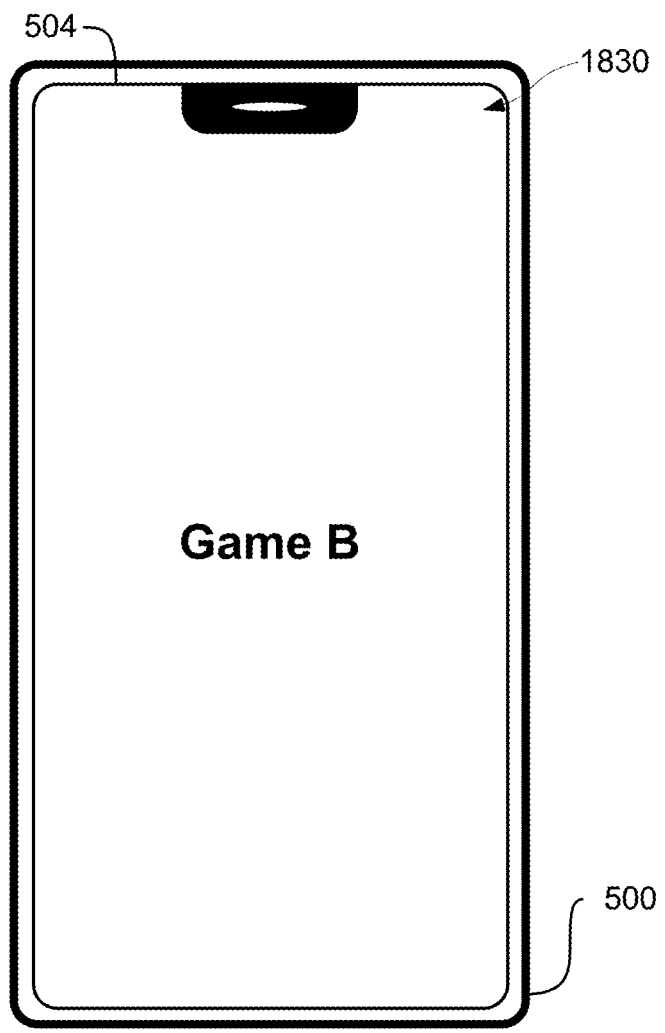
Figure 18I:
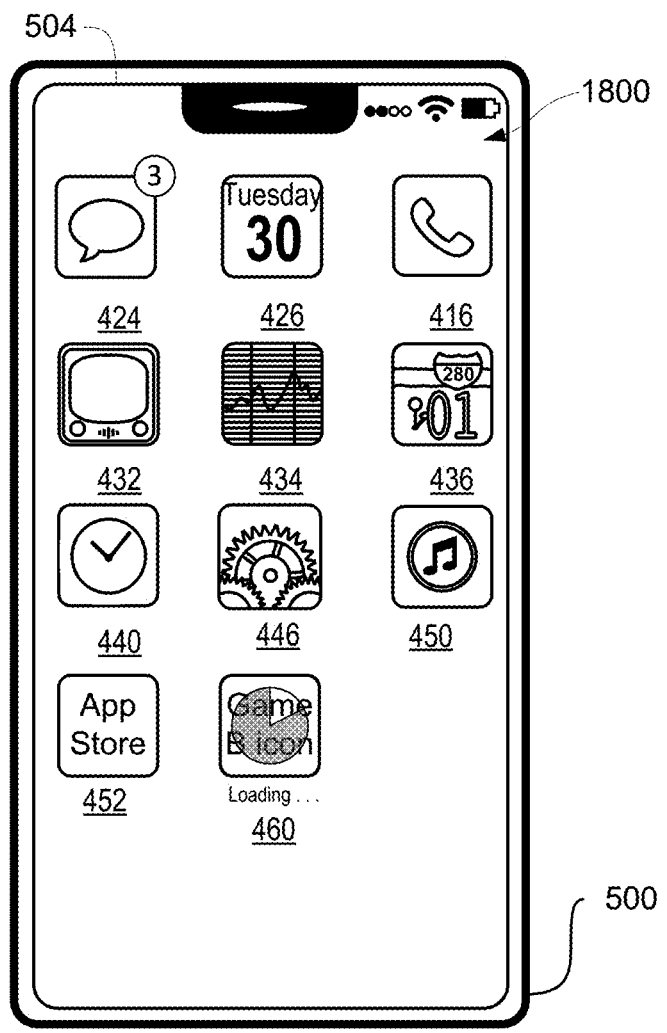
Figure 18J:
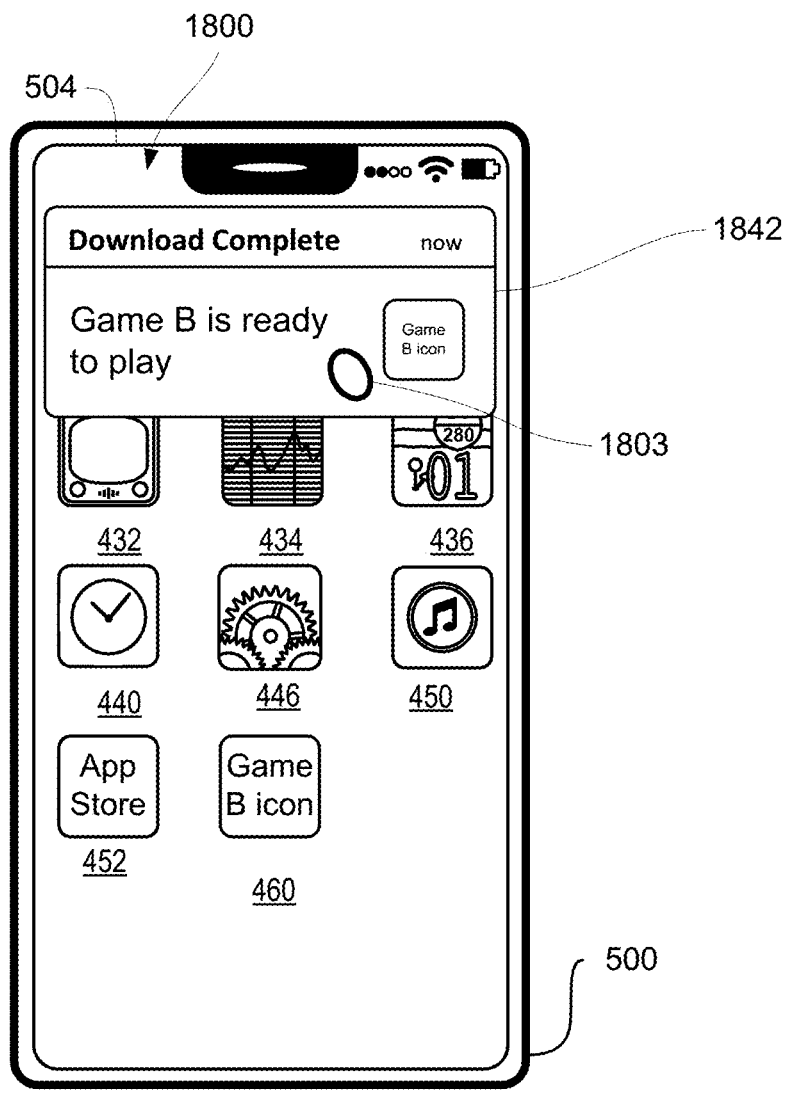
Figure 18K:
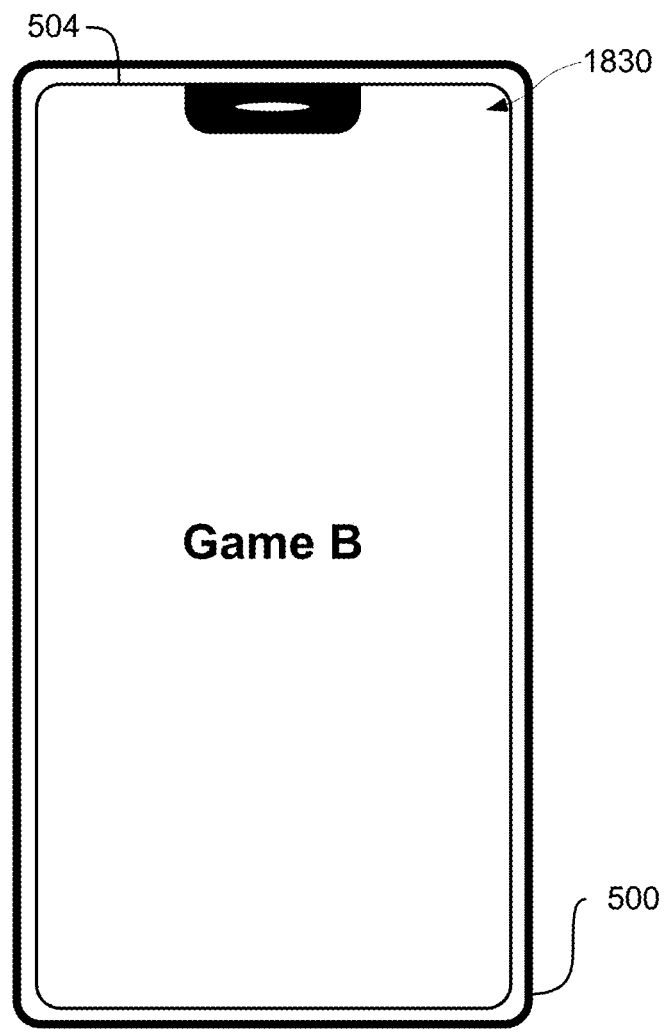
Figure 18L:
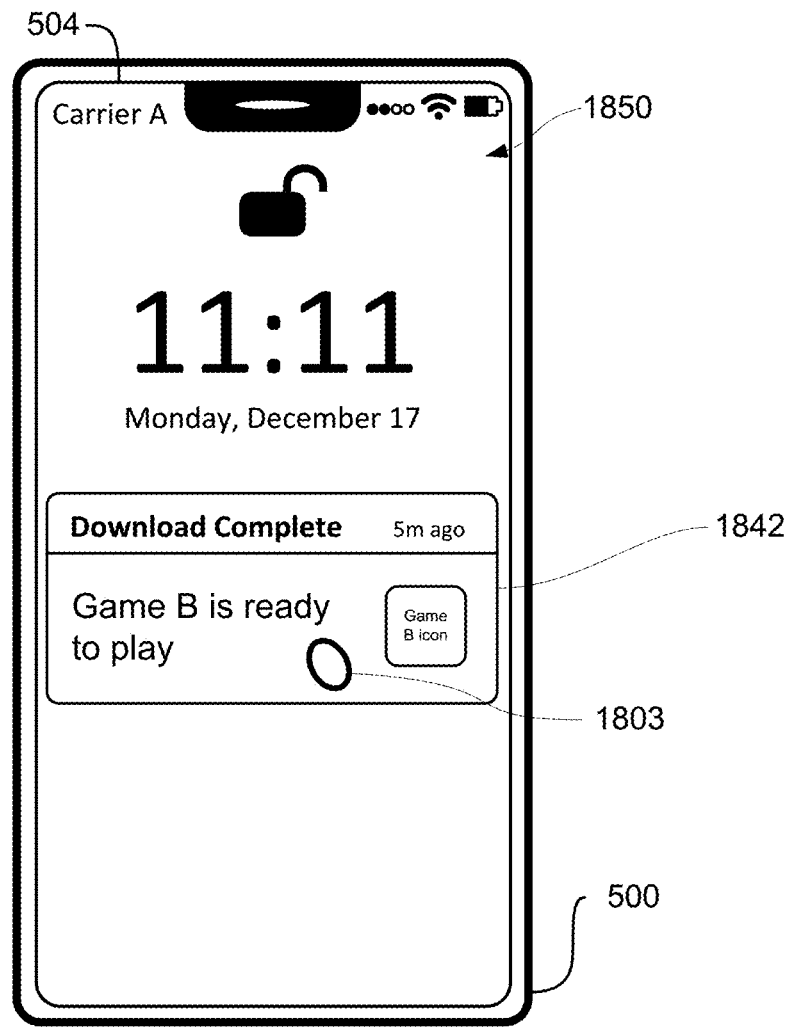
Figure 18M:
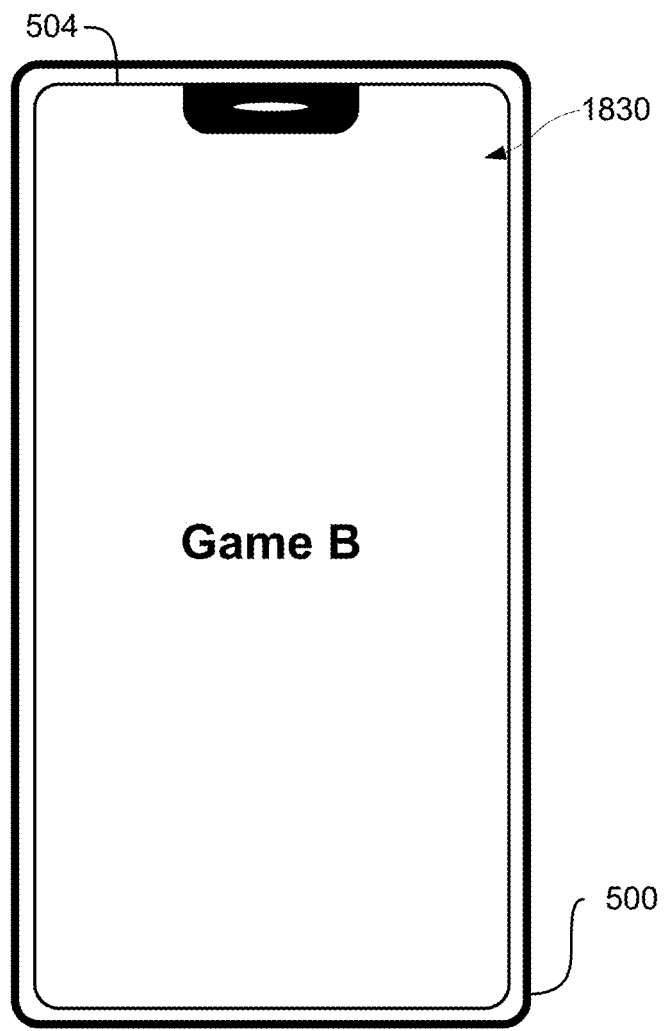
Figure 18N:
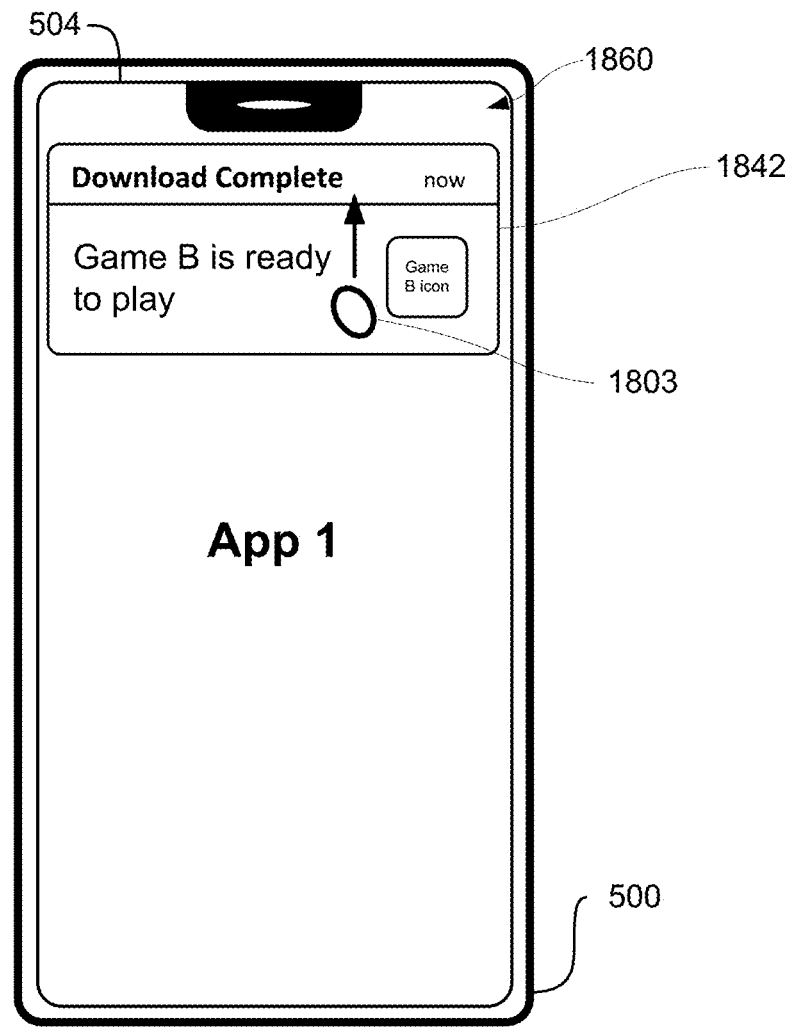
Figure 18O:
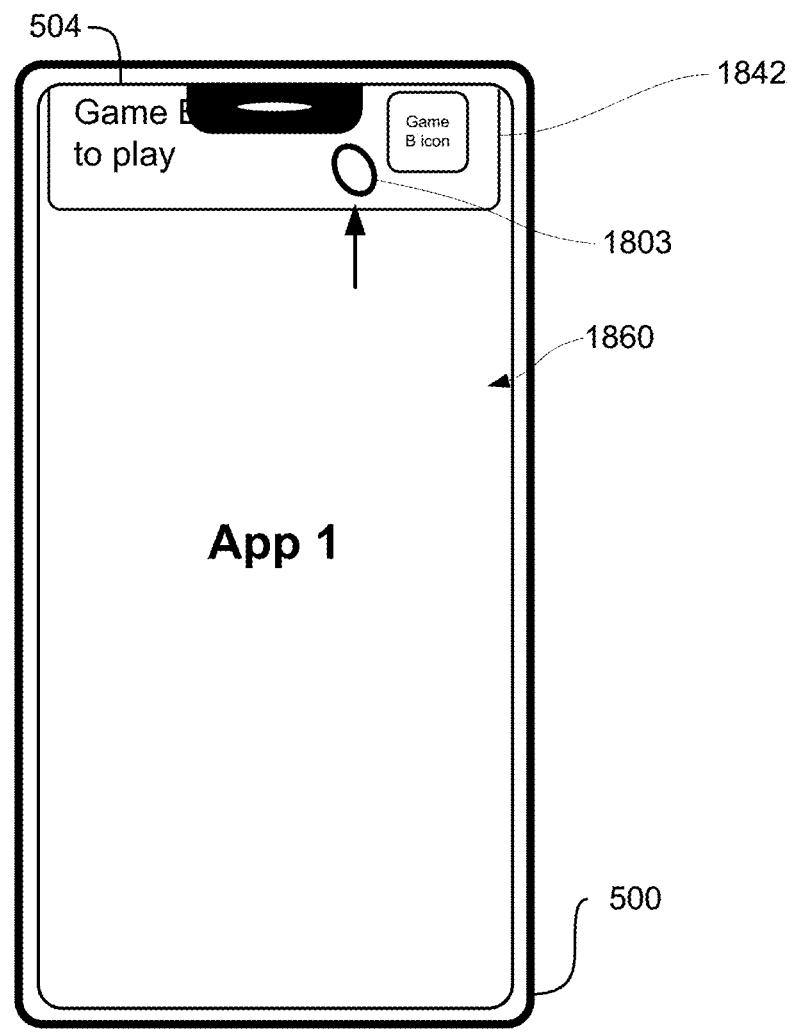
Figure 18P:
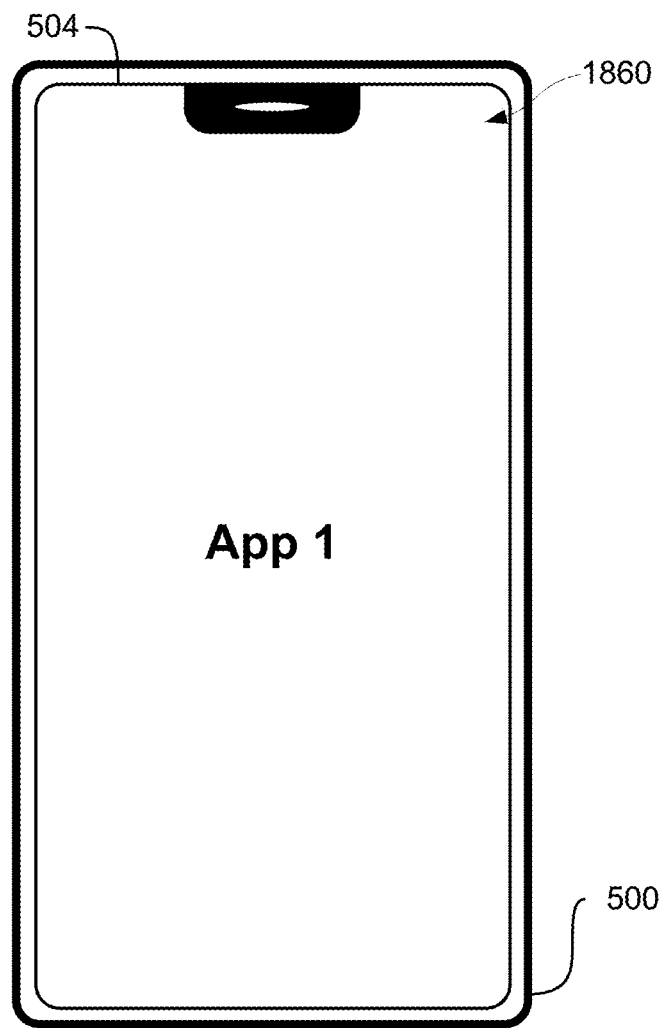
Figure 18Q:
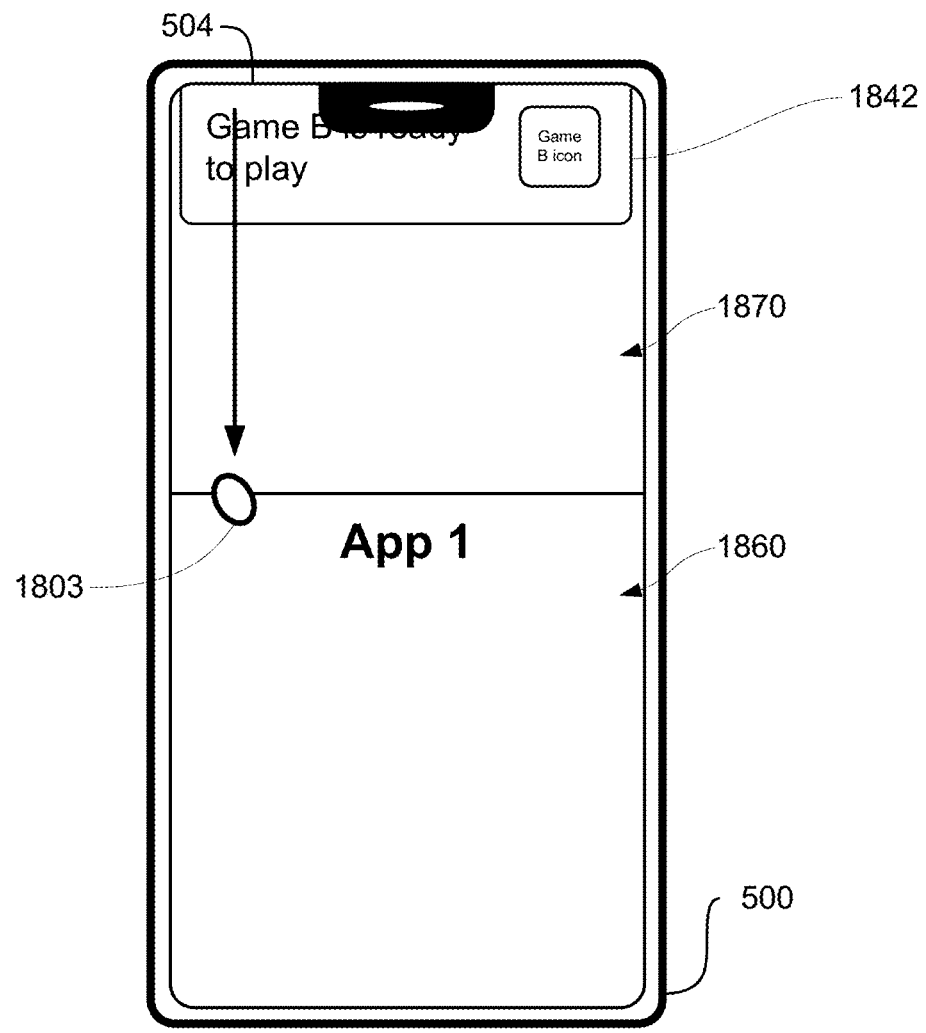
Figure 18R:
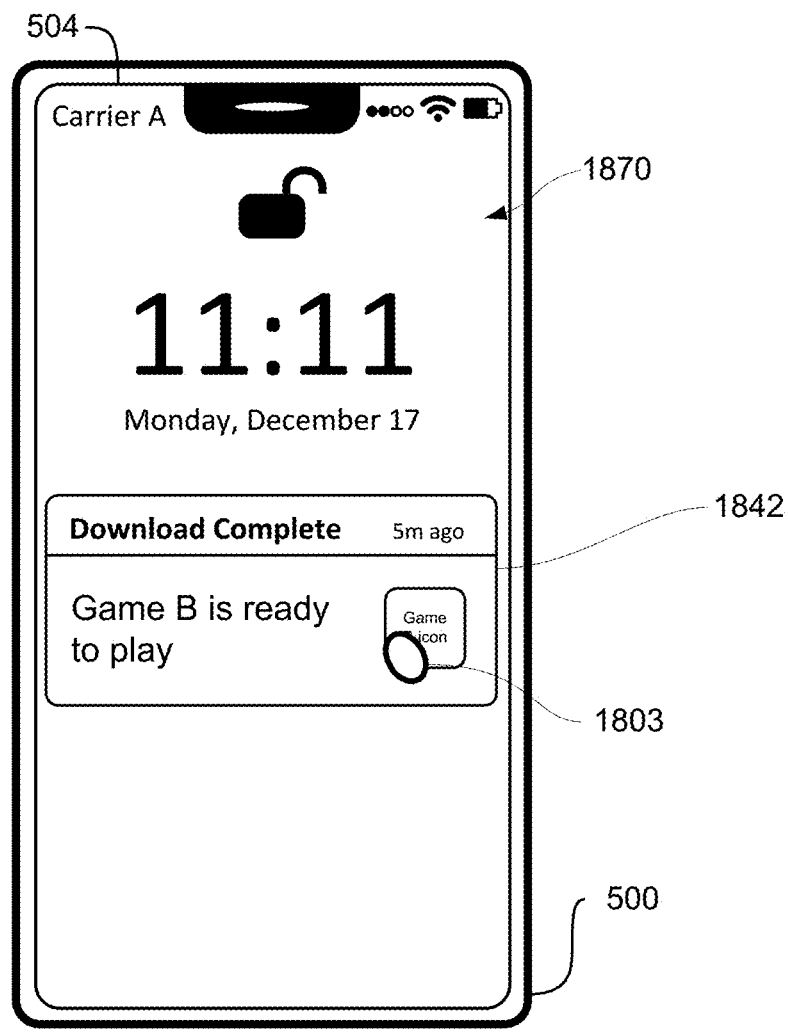
Figure 18S:
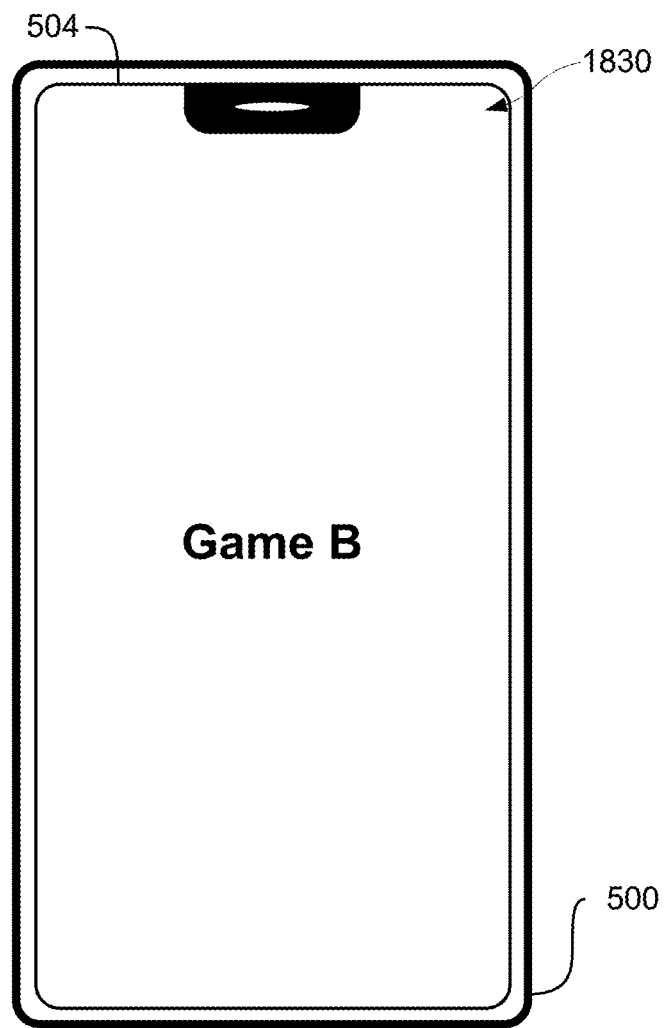
Figure 18T:
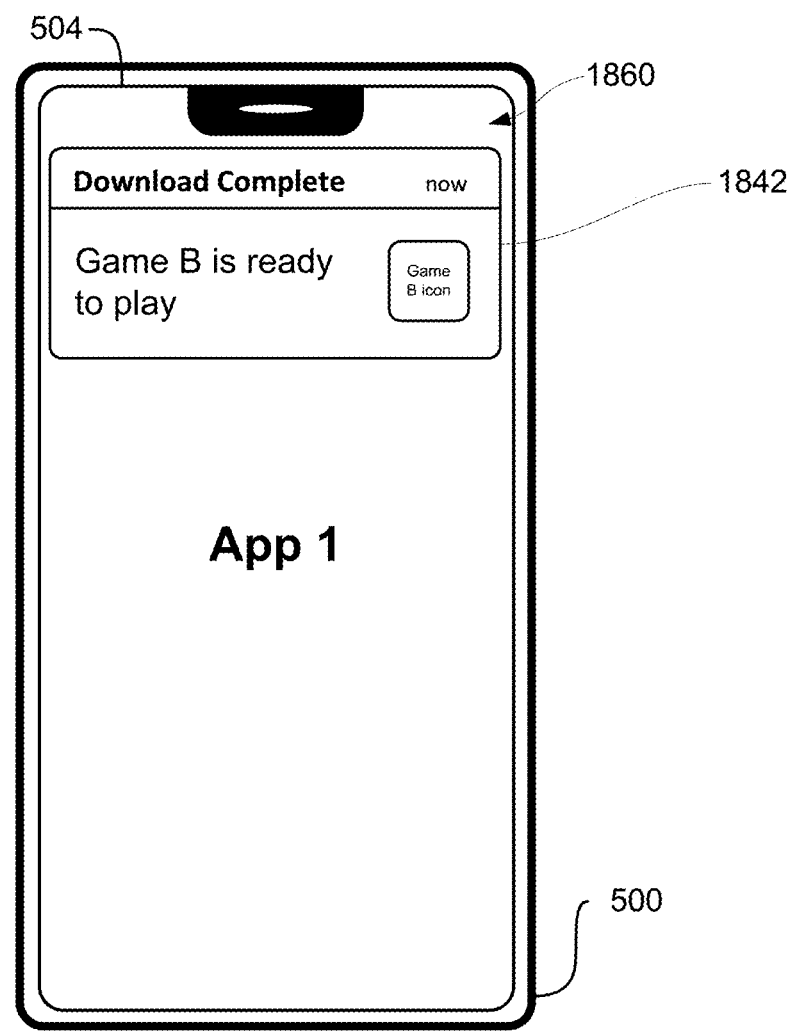
Figure 18U:
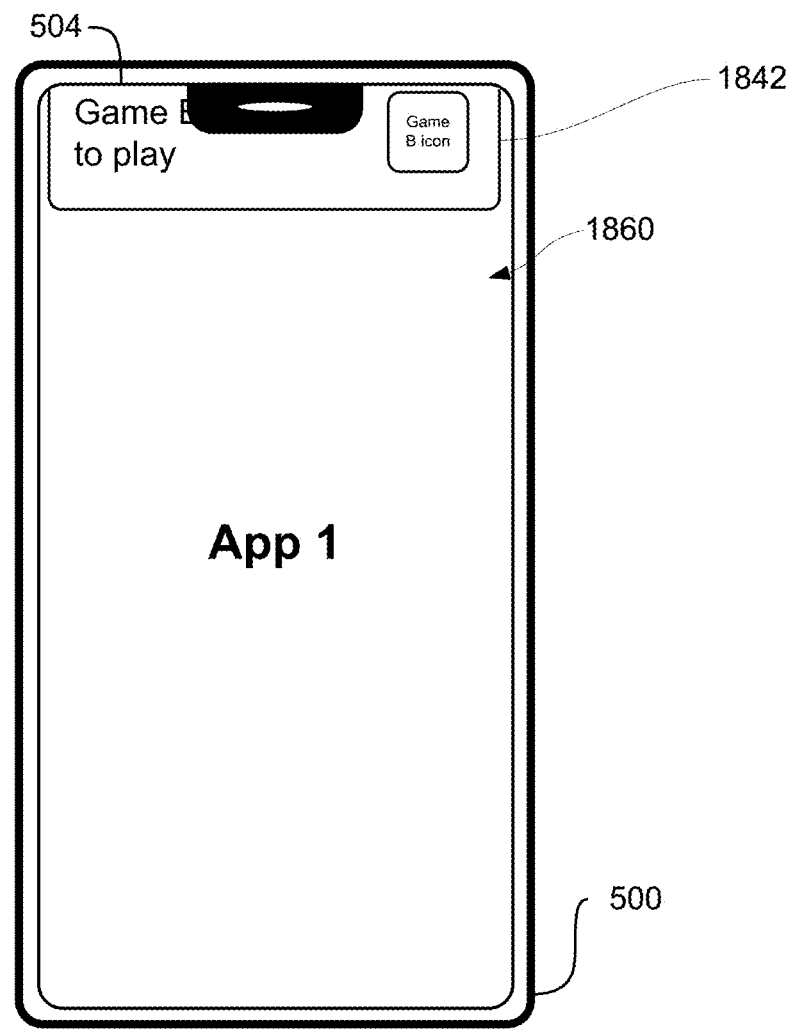
Figure 18V:
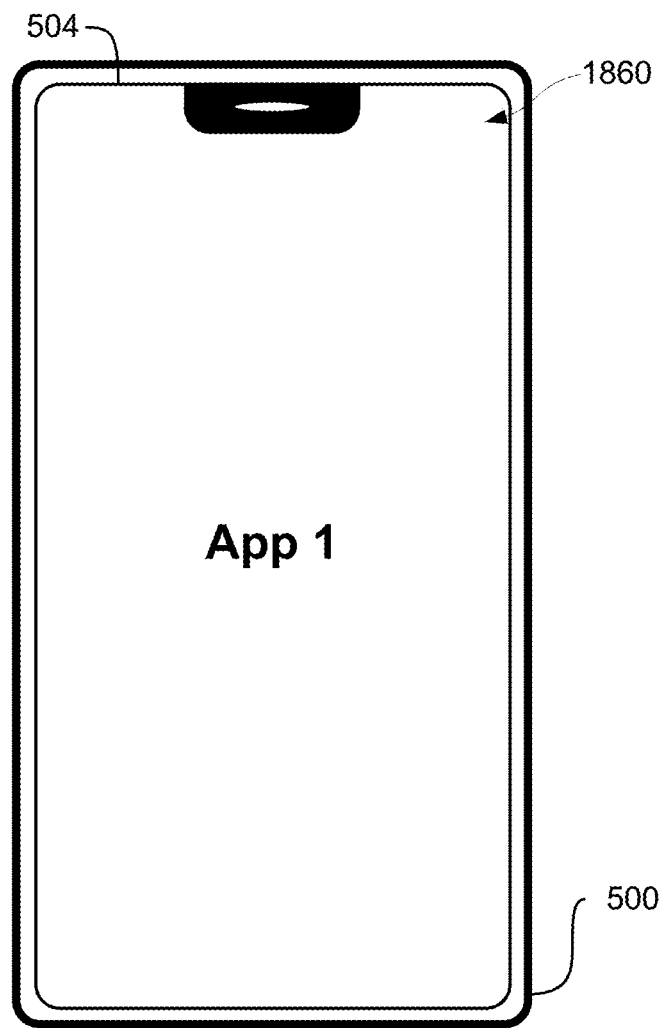
Figure 18W:
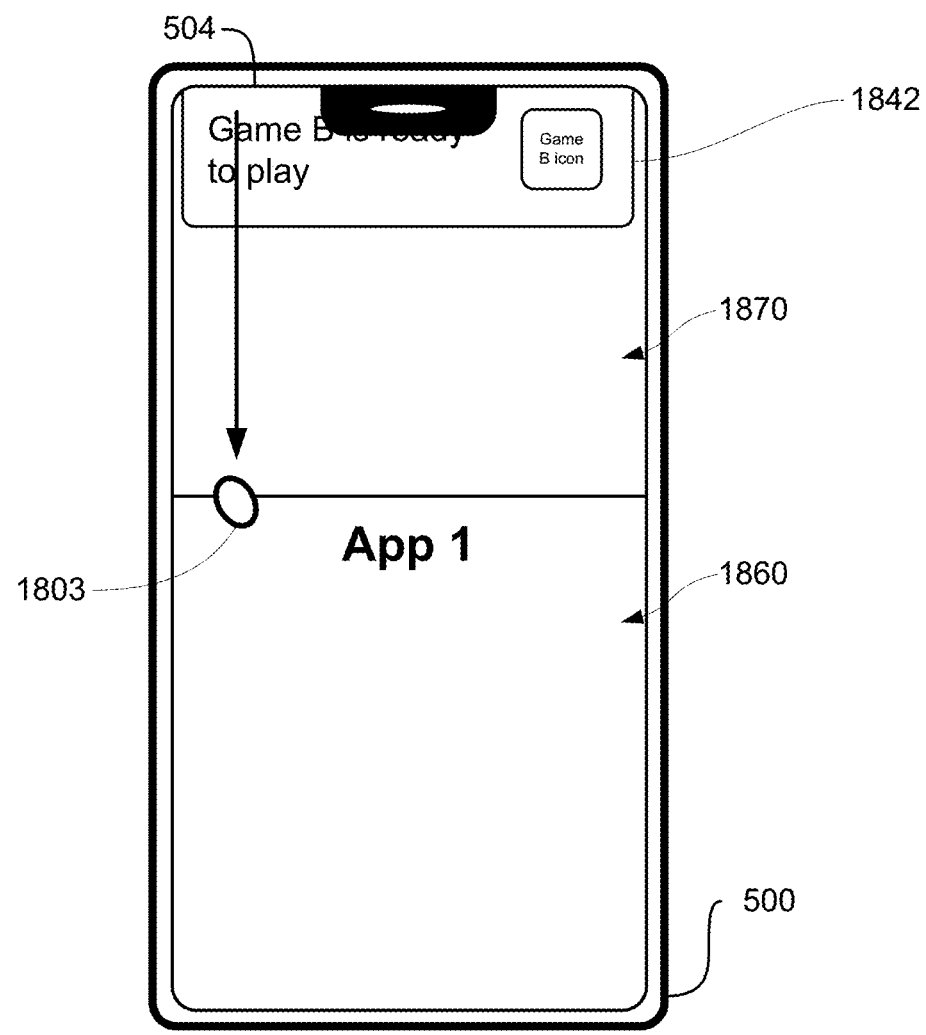
Figure 18X:
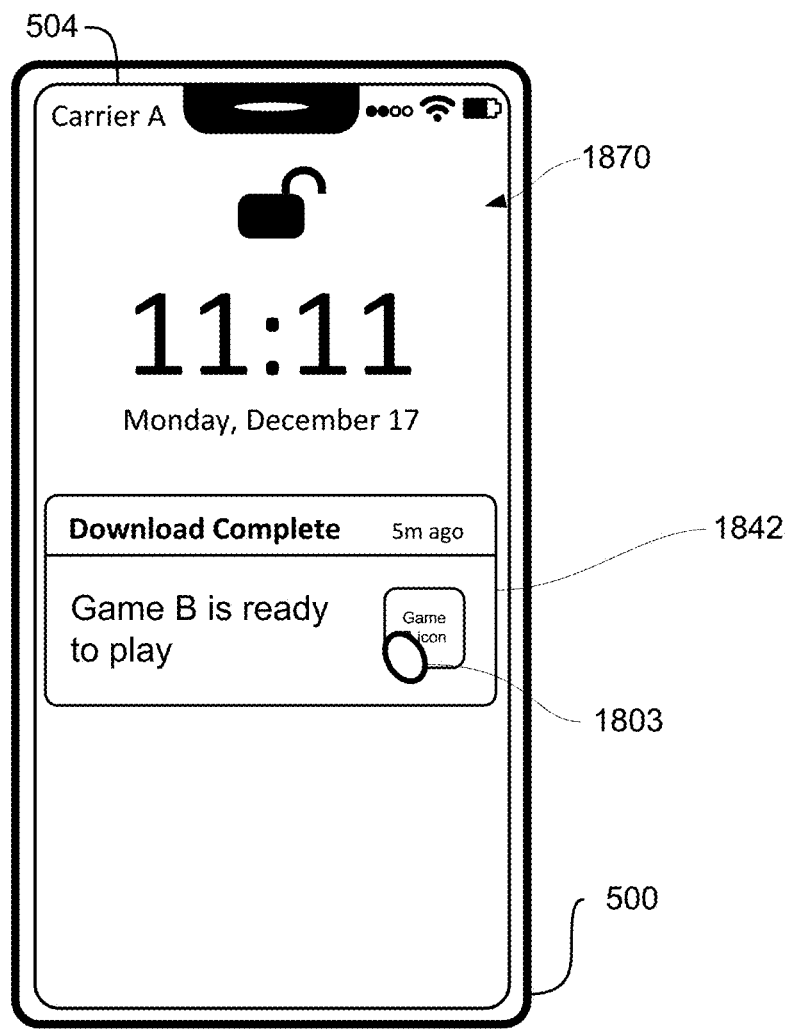
Figure 18Y:
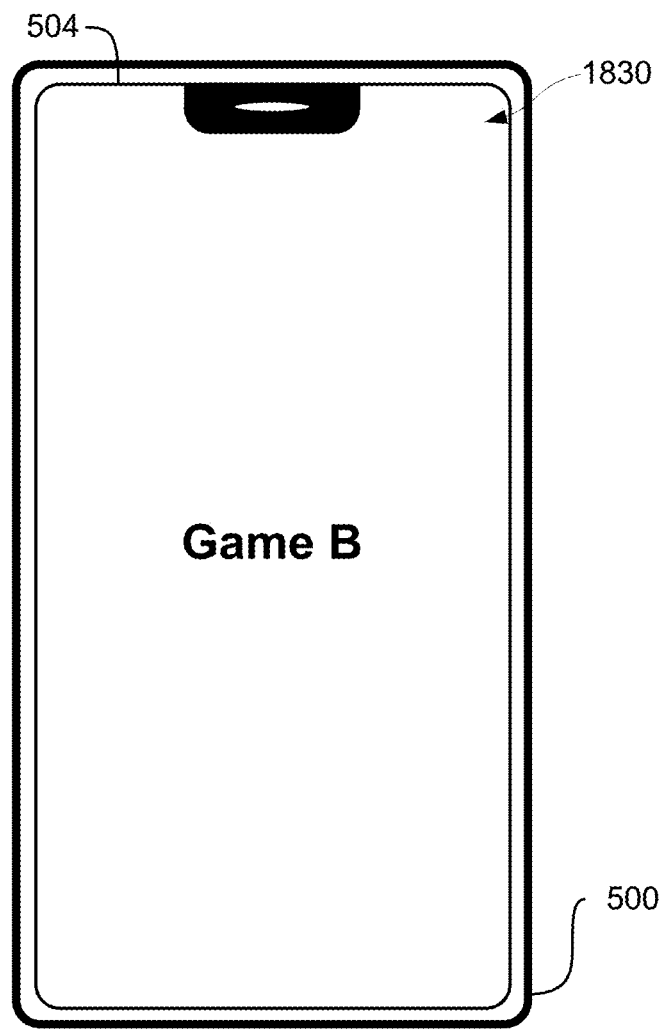
Figure 19A:
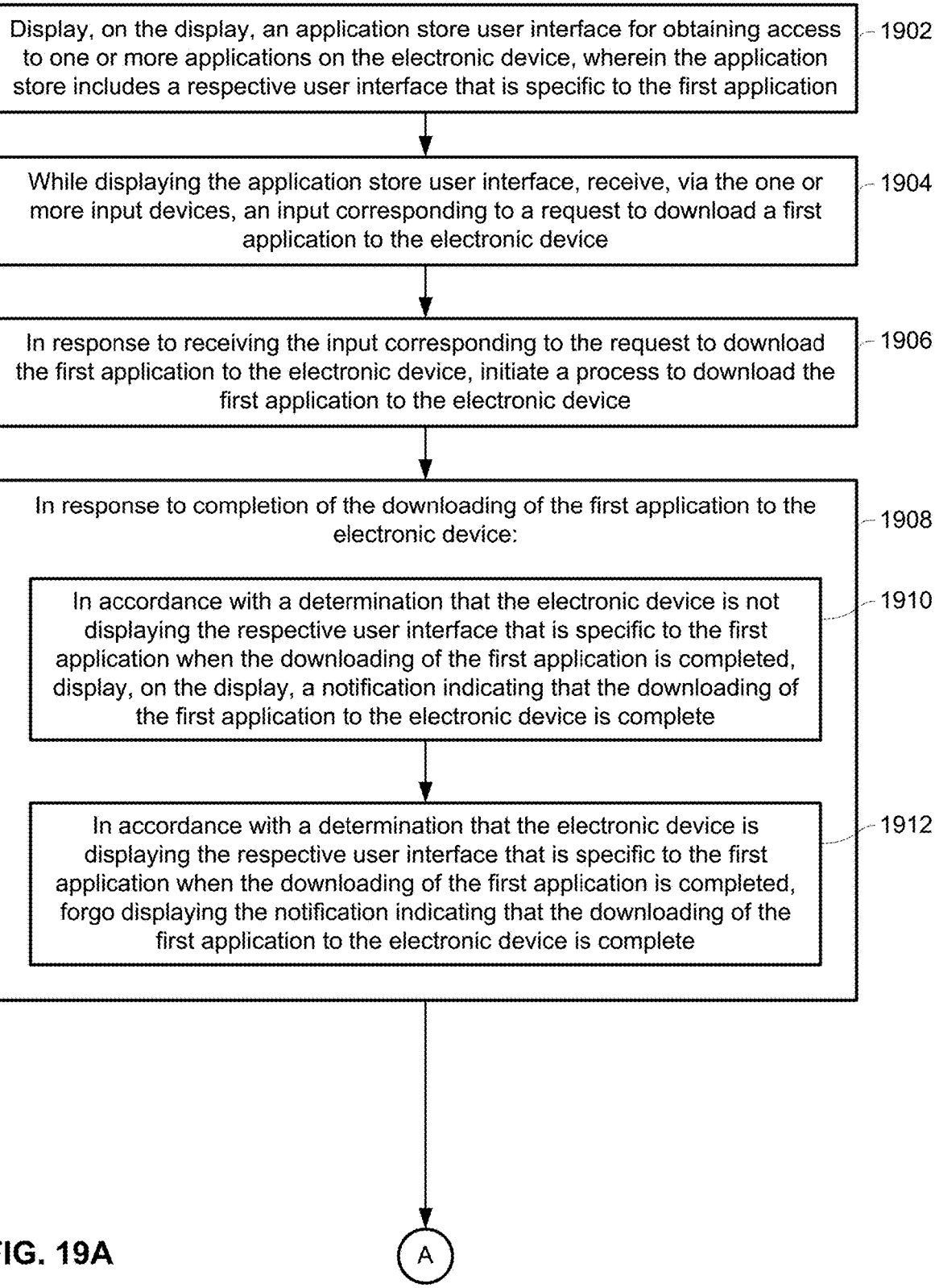
FIGS. 19A-19D are flow diagrams illustrating a method of providing ways to notify a user of the completion of a download in accordance with some embodiments.
Figure 19B:
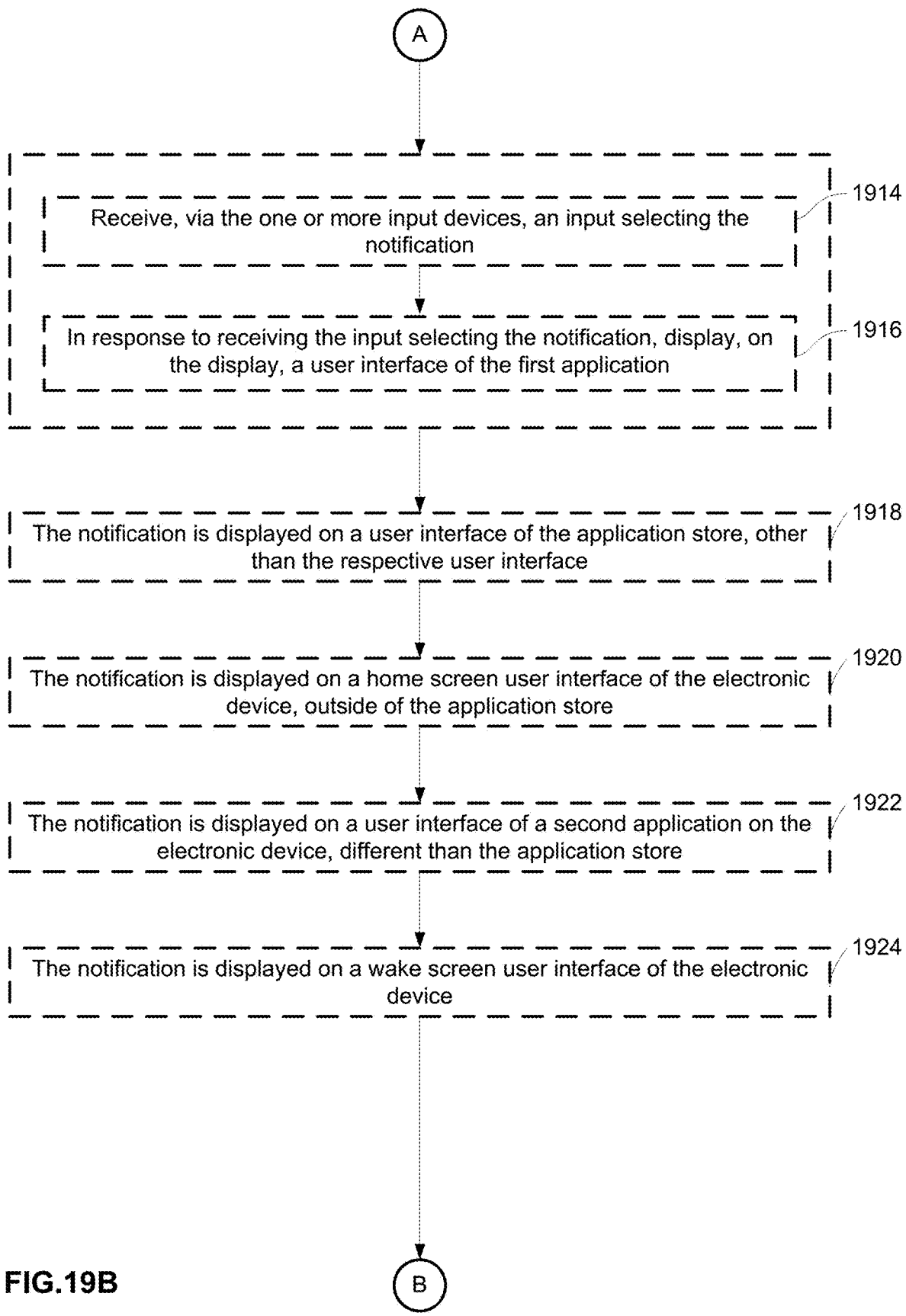
Figure 19C:
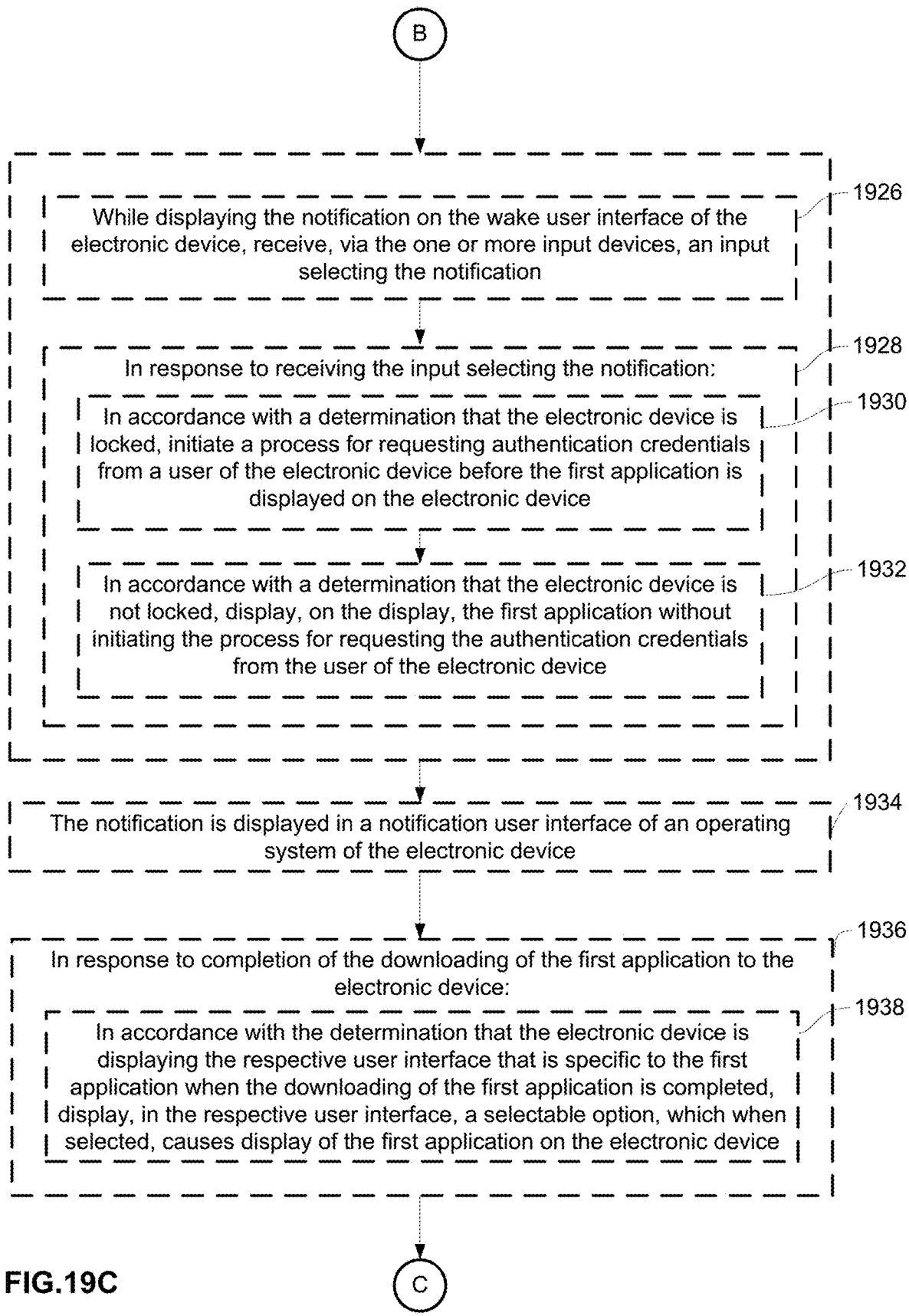
Figure 19D:
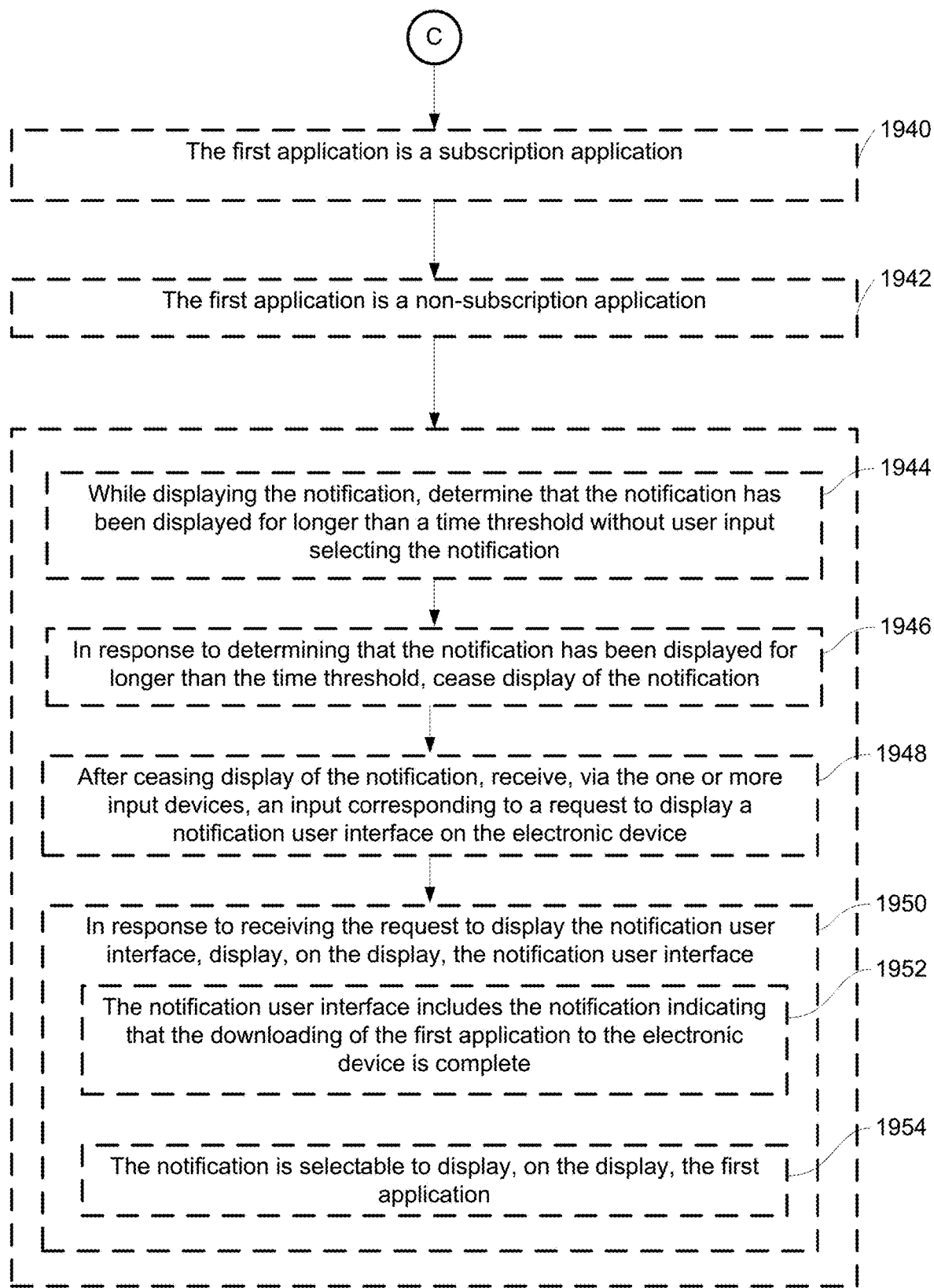

FIGS. 18A-18Y illustrate exemplary ways in which an electronic device notifies a user of the completion of a download in accordance with some embodiments of the disclosure. The embodiments in these figures are used to illustrate the processes described below with reference to FIGS. 19A-19D.

FIGS. 18A-18Y illustrate operation of electronic device 500 for notifying a user of the completion of a download. FIG. 18A illustrates an exemplary device 500 that includes touch screen 504. As shown in FIG. 18A, the electronic device 500 presents user interface 1810 corresponding to an application store application dedicated to browsing and purchasing "arcade" applications (e.g., arcade subscription games). In some embodiments, user interface 1810 shares similar features as user interface 1030 described in FIG. 10Q. For example, when a user of device 500 has a subscription to the arcade subscription service, user interface 1810 is displayed in response to a request to display the arcade page of the application store application.

In FIG. 18A, a user input 1803 clicks or selects the game B image or description (or other element related to game B. In some embodiments, in response to the user selection, user interface 1820 corresponding to a product page for game B is displayed, as shown in FIG. 18B. In some embodiments, user interface 1820 for game B (e.g., game B product page) shares similar elements as user interface 1040 described with respect to FIG. 10R. In some embodiments, because the user has a subscription to the arcade subscription service, product pages display a "Get" button instead of a "Try it Free" button (e.g., selectable option 1829). In other words, in some embodiments, the user no longer needs to subscribe to the arcade subscription service, and selection of the "get" button will begin a process for downloading the game, without requiring the user to proceed through the subscription process again.

As shown in FIG. 18B, user input 1803 is detected selecting selectable option 1829 (e.g., button or affordance labeled "Get") indicating the user's request to download or otherwise access game B. In some embodiments, in response to the user input 1829 selecting selectable option 1829, the electronic device begins download of game B. In some embodiments, when downloading begins, selectable option 1829 is replaced with an icon 1826 indicating the download progress of the game, as shown in FIG. 18C. In some embodiments, icon 1826 is an animated icon the animated icon. In some embodiments, icon 1826 shares similar features as icon 1406 described in Fig. OS. In some embodiments, after the download of game B completes, icon 1406 is replaced with selectable option 1828 (e.g., button or affordance labeled "Play), as shown in FIG. 18D. In some embodiments, if the user remains on the product page for game B (e.g., user interface 1820) when the download completes, no notification is displayed or provided to the user. In other words, the user can easily track the download status of game B and does not necessarily need a notification to inform the user that the downloaded completed. In some embodiments, in response to receiving a user input 1803 selecting selectable option 1828, game B is launched, as shown in FIG. 18E.

FIG. 18F illustrates device 500 as download of game B is in progress, as shown by icon 1826. In some embodiments, a user input 1803 is received on navigation bar 1812 selecting selectable option 1813-2 corresponding to the "Games" tab. In response to user input 1803, device 500 displays user interface 1840 corresponding to the "Games" tab. In some embodiments, while user interface 1840 is displayed, device 500 completes the download of game B. In some embodiments, in response to the download complete, device 500 displays notification 1842 informing the user that the download has complete and game B is ready to be played. In some embodiments, notification 1842 includes an icon representing game B (e.g., a logo or still image). In some embodiments, notification 1842 is selectable to launch the game. For example, as shown in FIG. 18G, user input 1803 is detected selecting notification 1842. In response to the user input 1803 selecting notification 1842, device 500 launches game B, as shown in FIG. 18H.

It is understood that although the notifications described herein are displayed when download of a subscription application completes, the displaying of notifications are not limited to only subscription applications and can also be displayed upon the completion of download of a non-subscription application.

FIG. 18I illustrates device 500 displaying home screen user interface 1800 as download of game B is in progress. In some embodiments, while the download of game B is in progress, icon 460 corresponding to game B includes a download status indicator indicating that the download is in progress. In some embodiments, as shown in FIG. 18J, when the download of game B completes while device 500 is displaying home screen user interface 1800, notification 1842 is displayed informing the user that the download has complete and game B is ready to be played. In some embodiments, notification 1842 is similar to notification 1842 described with respect to FIG. 18G and selection of notification 1842 causes device 500 to launch game B, as shown in FIG. 18K.

FIG. 18L illustrates a wake screen user interface 1850 (e.g., lock screen user interface) displaying notification 1842 informing the user that the download has complete and game B is ready to be played. In some embodiments, the download completed while device 500 was asleep or in an inactive state. In some embodiments, when a user wakes up the display of device 500, wake screen user interface 1850 is displayed and notification 1842 indicates that the download has completed (e.g., 5 minutes ago). In some embodiments, notification 1842 is similar to notification 1842 described with respect to FIG. 18G and selection of notification 1842 causes device 500 to launch game B (e.g., if the device is unlocked), as shown in FIG. 18M. In some embodiments, if device 500 is still locked, then selection of notification 1842 causes device to initiate a process for unlocking the device (e.g., authenticating the user via a passcode or biometric verification such as facial recognition or fingerprint recognition). In some embodiments, after authenticating the user and/or unlocking the device, then device 500 launches game B, as shown in FIG. 18M.

FIG. 18N-18S shows a method of displaying a notification while device 500 is displaying an application. FIG. 18N illustrates device 500 while application 1 is launched. In some embodiments, download of game B completes while application 1 is displayed on device 500. In some embodiments, in response to the completion of the download, notification 1842 is displayed informing the user that the download has complete and game B is ready to be played. In some embodiments, notification 1842 is similar to notification 1842 described with respect to FIG. 18G and selection of notification 1842 causes device 500 to launch game B. In some embodiments, notification 1842 is dismissible via a user input 1803 (e.g., upward swipe), as shown in FIG. 18N. In some embodiments, notification 1842 follows the user's upward gesture dismissing the notification, as shown in FIG. 18O. In some embodiments, as shown in 18P, notification 1842 is fully dismissed and the user can resume interaction with application 1. In some embodiments, as shown in FIG. 18Q, the user requests display of the notification drawer 1870 (e.g., notification tray), which includes notification 1842, via user input 1803 (e.g., downward swipe from the top-left portion of touch screen 504). In some embodiments, the notification drawer 1870 aggregates the notifications from multiple applications and displays all the notifications in one user interface. In some embodiments, as shown in FIG. 18R, the user completes the downward gesture and the notification drawer 1870 is fully displayed on touch screen 504. In some embodiments, notification drawer 1870 shares similar elements as wake screen user interface 1850 described in FIG. 18L, except that the device is optionally automatically unlocked. In some embodiments, selection of notification 1842 from the notification drawer 1870 causes launch of game B, as shown in FIG. 18S.

FIG. 18T-18Y shows a similar method of displaying a notification while device 500 is displaying an application. In FIG. 18T, while displaying application 1, notification 1842 is displayed informing the user that the download has complete and game B is ready to be played. In some embodiments, notification 1842 is similar to notification 1842 described with respect to FIG. 18G and selection of notification 1842 causes device 500 to launch game B. In some embodiments, notification 1842 is automatically dismissed after a threshold amount of time without user input. For example, as shown in FIG. 18U, without any user input selecting notification 1842 after a threshold amount of time (e.g., 1 second, 3 seconds, 5 seconds), notification 1842 automatically dismisses by sliding upwards and off-screen. In some embodiments, as shown in 18V, notification 1842 is fully dismissed. In some embodiments, as shown in FIG. 18W, the user requests display of the notification drawer 1870 (e.g., notification tray), which includes notification 1842, via user input 1803 (e.g., downward swipe from the top-left portion of touch screen 504). In some embodiments, the notification drawer 1870 aggregates the notifications from multiple applications and displays all the notifications in one user interface. In some embodiments, as shown in FIG. 18X, the user completes the downward gesture and the notification drawer 1870 is fully displayed on touch screen 504. In some embodiments, notification drawer 1870 shares similar elements as wake screen user interface 1850 described in FIG. 18L, except that the device is optionally automatically unlocked. In some embodiments, selection of notification 1842 from the notification drawer 1870 causes launch of game B, as shown in FIG. 18Y.

It is understood that although the notifications described above are described as being displayed when the download of a subscription application completes, the methods discussed above are not limited to only subscription applications, and notifications can be displayed for non-subscription applications similarly to that discussed above with respect to subscription applications.

FIGS. 19A-19D are flow diagrams illustrating a method 1900 of providing ways to notify a user of the completion of a download in accordance with some embodiments. The method 1900 is optionally performed at an electronic device such as device 100, device 300, device 500, device 501, device 510, device 591, device 480 as described above with reference to FIGS. 1A-1B, 2-3, 4A-4B and 5A-5K. Some operations in method 1900 are, optionally combined and/or order of some operations is, optionally, changed.

As described below, the method 1900 provides ways to notify a user of the completion of a download. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, a mobile device (e.g., a tablet, a smartphone, a media player, or a wearable device) including a touch screen, a computer including one or more of a keyboard, mouse, trackpad, and touch screen, or a set-top box in communication with a remote control device) in communication with a display and one or more input devices displays (1902), on the display, an application store user interface for obtaining access to one or more applications on the electronic device, such as in FIG. 18A (e.g., an application store application in which users can browse for and purchase applications, content, or other services), wherein the application store includes a respective user interface that is specific to the first application. In some embodiments, the applications purchased from the application store application can be downloaded and installed onto the electronic device. In some embodiments, the applications purchased from the application store application can be for use on another electronic device. In some embodiments, the respective user interface includes a product page for the first application in the application store application. In some embodiments, the product page is accessed when the user selects an icon for the first application indicating an interest in receiving more information about the first application or to acquire the first application.

In some embodiments, while displaying the application store user interface, the electronic device receives (1904), via the one or more input devices, an input corresponding to a request to download a first application to the electronic device, such as in FIG. 18B (e.g., selecting a selectable option or otherwise performing an input to indicate that the user desires to download or otherwise acquire the first application.).

In some embodiments, in response to receiving the input corresponding to the request to download the first application to the electronic device, the electronic device initiates (1906) a process to download the first application to the electronic device, such as in FIG. 18C (e.g., display a confirmation page, initiate a purchase transaction to purchase the first application, and/or begin downloading the first application onto the electronic device). In some embodiments, the first application is a purchasable application and the user must first approve a transaction to purchase the first application. In some embodiments, the first application is a free application and the user need not first approve the transaction. In some embodiments, before initiating download, the electronic device provides a confirmation page indicating that download will begin upon confirmation. In some embodiments, the first application is a subscription application and initiating a process to download includes determining whether the user has a valid subscription to the subscription service and/or subscribing the user to the subscription service (e.g., as necessary based on the result of the determination). In some embodiments, the product page of the first application will be updated to display an animation corresponding to the download status of the first application.

In some embodiments, in response to completion of the downloading of the first application to the electronic device (1908), such as in FIG. 18D (e.g., when the first application has completed download and/or installation onto the electronic device or is otherwise ready to be launched or executed.): in accordance with a determination that the electronic device is not displaying the respective user interface that is specific to the first application when the downloading of the first application is completed, the electronic device displays (1910), on the display, a notification indicating that the downloading of the first application to the electronic device is complete, such as in FIG. 18G (e.g., displaying a notification to the user if the user has navigated or browsed away from the product page of the first application). In some embodiments, the notification informs the user that the download has completed. In some embodiments, selection of the notification causes the first application to be launched.

In some embodiments, in accordance with a determination that the electronic device is displaying the respective user interface that is specific to the first application when the downloading of the first application is completed, the electronic device forgoes (1912) displaying the notification indicating that the downloading of the first application to the electronic device is complete, such as in FIG. 18D. In some embodiments, if the user has not navigated or browsed away from the product page of the first application and the product page is still displayed on the display, then the electronic device does not display a notification that the download has completed. In some embodiments, the product page includes a status animation that indicates the download progress of the download. In some embodiments, when the download completes, the status animation changes to a selectable option that indicates that the application is ready to be launched (e.g., "Play"). In some embodiments, a notification is unnecessary because the product page provides sufficient indication that the download has completed.

The above-described manner of notifying the user of a completed download (e.g., by displaying a notification to the user when the download completes if the user has navigated away from the application's product page or by not displaying a notification when the user is still viewing the application's product page) allows the electronic device to provide the user with status updates regarding the download status of the application being downloaded (e.g., by displaying a notification if the user has browsed away and is likely not focused on the download status of the application, or by not displaying a notification if the user remains on the product page which displays the download status of the download and is likely awaiting the completion of the download and a notification is unnecessary), which simplifies the interaction between the user and the electronic device and enhances the operability of the electronic device and makes the user-device interface more efficient (e.g., by only displaying a notification when the user has shifted his or her focus away from the download and may want a notification when the desired application is ready to be launched, while forgoing displaying the notification when it is unnecessary to inform the user of the download's completion), which additionally reduces power usage and improves battery life of the electronic device by enabling the user to use the electronic device more quickly and efficiently.

In some embodiments, the electronic device receives (1914), via the one or more input devices, an input selecting the notification, such as in FIG. 18G (e.g., receiving a tap input from the input device selecting the notification or selecting a selectable option in the notification); and in response to receiving the input selecting the notification, the electronic device displays (1916), on the display, a user interface of the first application, such as in FIG. 18H (e.g., launching the first application).

The above-described manner of launching the first application (e.g., by displaying a notification to the user that download of the application is completed, receiving a user input selecting the notification, and launching the application) allows the electronic device to provide the user with a quick way to launch the downloaded application (e.g., by launching the application when the user selects the notification that notifies the user that the download is completed and the application is ready to be launched), which simplifies the interaction between the user and the electronic device and enhances the operability of the electronic device and makes the user-device interface more efficient (e.g., by providing the user with a quick and convenient way to launch the application without requiring the user to separately determine whether the download has completed and performing another user input to launch the downloaded application), which additionally reduces power usage and improves battery life of the electronic device by enabling the user to use the electronic device more quickly and efficiently.

In some embodiments, the notification is displayed on a user interface of the application store, other than the respective user interface (1918), such as in FIG. 18G. In some embodiments, the notification can be displayed when the user is still browsing in the application store, if the user has navigated away from the first application's product page. In some embodiments, if the user has browsed away from the first application's product page, the user has no other indication of the download progress of the first application. Thus, in some embodiments, a notification is provided to the user while the user is browsing through over user interfaces of the application store.

The above-described manner of notifying the user of a completed download (e.g., by displaying a notification to the user when the user has browsed away from the first application's product page but is still within the application store) allows the electronic device to provide the user with status updates regarding the download status of the application being downloaded (e.g., by displaying a notification if the user has browsed away and is likely not focused on the download status of the application), which simplifies the interaction between the user and the electronic device and enhances the operability of the electronic device and makes the user-device interface more efficient (e.g., by displaying a notification when the user has shifted his or her focus away from the download and may want a notification when the desired application is ready to be launched without requiring the user to navigate to a different user interface to determine whether the download is completed), which additionally reduces power usage and improves battery life of the electronic device by enabling the user to use the electronic device more quickly and efficiently.

In some embodiments, the notification is displayed on a home screen user interface of the electronic device, outside of the application store (1920), such as in FIG. 18J. In some embodiments, the notification can be displayed when the user has browsed away from the application store and is on the home screen user interface. In some embodiments, if the user has browsed away from the application store, the user has no other indication of the download progress of the first application. Thus, in some embodiments, a notification is provided to the user while the home screen user interface is displayed on the display.

The above-described manner of notifying the user of a completed download (e.g., by displaying a notification to the user when the user has browsed away from the first application store) allows the electronic device to provide the user with status updates regarding the download status of the application being downloaded (e.g., by displaying a notification if the user has browsed away and is likely not focused on the download status of the application), which simplifies the interaction between the user and the electronic device and enhances the operability of the electronic device and makes the user-device interface more efficient (e.g., by displaying a notification when the user has shifted his or her focus away from the download and may want a notification when the desired application is ready to be launched without requiring the user to navigate to a different user interface to determine whether the download is completed), which additionally reduces power usage and improves battery life of the electronic device by enabling the user to use the electronic device more quickly and efficiently.

In some embodiments, the notification is displayed on a user interface of a second application on the electronic device, different than the application store (1922), such as in FIG. 18N. In some embodiments, while the user has launched and/or is interaction with another application, the electronic device displays a notification indicating that the download of the first application is completed. In some embodiments, if the user is interacting with another application, the user has no other indication of the download progress of the first application. Thus, in some embodiments, a notification is provided to the user even though the user is interacting with a different application.

The above-described manner of notifying the user of a completed download (e.g., by displaying a notification to the user when the user has launched another application) allows the electronic device to provide the user with status updates regarding the download status of the application being downloaded (e.g., by displaying a notification if the user has browsed away and is likely not focused on the download status of the application), which simplifies the interaction between the user and the electronic device and enhances the operability of the electronic device and makes the user-device interface more efficient (e.g., by displaying a notification when the user has shifted his or her focus away from the download and may want a notification when the desired application is ready to be launched without requiring the user to interrupt the user's interaction with the second application and navigate to a different user interface to determine whether the download is completed), which additionally reduces power usage and improves battery life of the electronic device by enabling the user to use the electronic device more quickly and efficiently.

In some embodiments, the notification is displayed on a wake screen user interface of the electronic device (1924), such as in FIG. 18L (e.g., providing a notification to the user on the wake screen such that if the user has locked the device and is returning to the device, the user is informed that the download has completed and is now ready to be launched.).

The above-described manner of notifying the user of a completed download (e.g., by displaying a notification on the wake screen interface such that the user is informed that the download is completed when the user returns to and wakes the electronic device) allows the electronic device to provide the user with status updates regarding the download status of the application being downloaded (e.g., by displaying a notification on the wake screen so the user is informed of the completed download as soon as the user returns to interacting with the device), which simplifies the interaction between the user and the electronic device and enhances the operability of the electronic device and makes the user-device interface more efficient (e.g., by displaying a notification as soon as the user returns to interacting with the device, without requiring the user to navigate to a different user interface to determine whether the download is completed), which additionally reduces power usage and improves battery life of the electronic device by enabling the user to use the electronic device more quickly and efficiently.

In some embodiments, while displaying the notification on the wake user interface of the electronic device, the electronic device receives (1926), via the one or more input devices, an input selecting the notification, such as in FIG. 18L (e.g., receiving a user input selecting the notification while the notification is displayed on the wake screen). In some embodiments, the wake screen user interface of the electronic device is also a lock screen user interface. In some embodiments, the lock screen verifies whether the user of the electronic device is an authorized user of the electronic device. In some embodiments, if the user is determined not to be an authorized user, the lock screen prevents the user from entering the electronic device and accessing any other user interfaces of the electronic device. In some embodiments, if the user is determined to be an authorized user, the lock screen will unlock and allow the user to enter the electronic device and access other user interfaces and/or applications of the electronic device. In some embodiments, in response to receiving the input selecting the notification (1928): in accordance with a determination that the electronic device is locked, the electronic device initiates (1930) a process for requesting authentication credentials from a user of the electronic device before the first application is displayed on the electronic device, such as in FIG. 18L. In some embodiments, if the electronic device is on the wake screen and the device is still locked (e.g., the user has not yet been verified), then in response to receiving the user's selection of the notification, the electronic device determines whether the user is an authorized user before unlocking the device and launching the first application. In some embodiments, verifying whether the user is an authorized user involves requesting the user to enter a passcode or PIN to unlock the device. In some embodiments, verifying the user is performed via a biometric verification process, such as facial or fingerprint identification, etc. In some embodiments, after verification of the user's credentials, the phone unlocks and then launches the first application. In some embodiments, in accordance with a determination that the electronic device is not locked, the electronic device displays (1932), on the display, the first application without initiating the process for requesting the authentication credentials from the user of the electronic device, such as in FIG. 18M. In some embodiments, if the electronic device is on the wake screen and the device is unlocked (e.g., because the device is not set to lock the phone or because the device has verified that the user is an authorized user and unlocked the phone), then in response to receiving the user's selection of the notification, the electronic device launches the application.

The above-described manner of launching the first application (e.g., from the wake screen, after determining whether the user is an authorized user and unlocking the phone before launching the application) allows the electronic device to provide the user with an method of quickly launching the application while preserving the device's security procedures (e.g., by only launching the application if the device is unlocked and by unlocking the device after verifying the user's credentials if the device is locked), which simplifies the interaction between the user and the electronic device and enhances the operability of the electronic device and makes the user-device interface more efficient (e.g., by launching the application directly from the wake screen, after the device verifies that the user is authorized to use the device, without requiring the user to navigate to a different user interface to determine whether the download is completed and to launch the application), which additionally reduces power usage and improves battery life of the electronic device by enabling the user to use the electronic device more quickly and efficiently.

In some embodiments, the notification is displayed in a notification user interface of an operating system of the electronic device (1934), such as in FIG. 18R. In some embodiments, the notification is included in a notification drawer of the electronic device, which can be a user interface of the operating system of electronic device (rather than being a user interface of a particular application on the electronic device). In some embodiments, the notification drawer is a repository that aggregates all notifications from multiple different applications that have been displayed to the user. In some embodiments, the notification drawer can be displayed in response to a user's request to display the notification drawer. In some embodiments, system settings can determine what notifications are included in the notification drawer (e.g., by swiping down from the top or top-left of the touch screen or performing any other suitable mechanism to display the notification drawer). In some embodiments, a user can dismiss notifications that appear on the screen and the dismissed notifications can be included in the notification drawer for future access. In some embodiments, a user can dismiss notifications away from the notification drawer in which case, in some embodiments, the specific notification will not be displayed again.

The above-described manner of notifying the user of a completed download (e.g., by displaying a notification in a notification drawer) allows the electronic device to provide the user with status updates regarding the download status of the application being downloaded (e.g., by displaying a notification in the notification drawer such that the user can manually request to view his or her notifications in one user interface), which simplifies the interaction between the user and the electronic device and enhances the operability of the electronic device and makes the user-device interface more efficient (e.g., by displaying a notification when the user requests to view the notification, even if the user has previously dismissed the notification or if the user has previously missed the notification, without requiring the user to navigate to a different user interface to determine whether the download is completed), which additionally reduces power usage and improves battery life of the electronic device by enabling the user to use the electronic device more quickly and efficiently.

In some embodiments, in response to completion of the downloading of the first application to the electronic device (1936): in accordance with the determination that the electronic device is displaying the respective user interface that is specific to the first application when the downloading of the first application is completed, the electronic device displays (1938), in the respective user interface, a selectable option, which when selected, causes display of the first application on the electronic device, such as in FIG. 18D. In some embodiments, instead of the notification, the "get" or "download" indication (e.g., button or selectable option) on the product page changes to "play" once downloading of the first application is complete, and is selectable to launch or otherwise display the first application on the electronic device. In some embodiments, before displaying the "play" indicator and while the first application is downloading, a download animation is displayed in the place of the "get" or "download" indicator to indicate the status of the download.

The above-described manner of notifying the user of a completed download (e.g., by changing the "get" or "download" indicator to a "play" indicator) allows the electronic device to indicate to the user that the application is available to be launched (e.g., by replacing the button to download or acquire the first application to one that launches the application), which simplifies the interaction between the user and the electronic device and enhances the operability of the electronic device and makes the user-device interface more efficient (e.g., by removing the option to download or purchase the application and replacing it with an option to launch the application, without requiring the user to navigate to a separate user interface to determine whether the download is completed or to launch the device, and avoiding the user from unnecessarily attempting to buy or download the application again), which additionally reduces power usage and improves battery life of the electronic device by enabling the user to use the electronic device more quickly and efficiently while reducing errors in the usage of the device.

In some embodiments, the first application is a subscription application (1940), such as in FIG. 18B (e.g., an application in which access is granted by having a subscription to a subscription service). In some embodiments, a subscription to a subscription service provides access to a plurality of applications. In some embodiments, when the subscription to the subscription service ends, the access to the first application is rescinded and the user must then re-subscribe to the subscription service to launch and interact with the first application.

The above-described manner of notifying the user of a completed download of a subscription application (e.g., by displaying a notification when the subscription application has completed downloading) allows the electronic device to indicate to the user that the subscription application is available to be launched (e.g., by displaying a notification when download of the subscription application has completed), which simplifies the interaction between the user and the electronic device and enhances the operability of the electronic device and makes the user-device interface more efficient (e.g., by displaying a notification when the download has completed, giving the user an simple and easy method of launching the application by selecting the notification without requiring the user to navigate to a separate user interface to determine whether the subscription application is finished downloading and to launch the subscription application), which additionally reduces power usage and improves battery life of the electronic device by enabling the user to use the electronic device more quickly and efficiently.

In some embodiments, the first application is a non-subscription application (1942), such as in FIG. 18B (e.g., an application which can be purchased and downloaded onto the electronic device). In some embodiments, after purchasing the non-subscription application, the user can access, launch, or otherwise interact with the non-subscription application without requiring a subscription to a subscription service.

The above-described manner of notifying the user of a completed download of a non-subscription application (e.g., by displaying a notification when the non-subscription application has completed downloading) allows the electronic device to indicate to the user that the non-subscription application is available to be launched (e.g., by displaying a notification when download of the non-subscription application has completed), which simplifies the interaction between the user and the electronic device and enhances the operability of the electronic device and makes the user-device interface more efficient (e.g., by displaying a notification when the download has completed, giving the user an simple and easy method of launching the application by selecting the notification without requiring the user to navigate to a separate user interface to determine whether the non-subscription application is finished downloading and to launch the non-subscription application), which additionally reduces power usage and improves battery life of the electronic device by enabling the user to use the electronic device more quickly and efficiently.

In some embodiments, while displaying the notification, the electronic device determines (1944) that the notification has been displayed for longer than a time threshold (e.g., 2, 3, 5 seconds) without user input selecting the notification, such as in FIG. 18U (e.g., the notification times out without user input). In some embodiments, in response to determining that the notification has been displayed for longer than the time threshold, the electronic device ceases (1946) display of the notification, such as in FIG. 18U (e.g., after the notification times out, automatically stopping display of the notification). In some embodiments, ceasing display of the notification comprises performing an animation sliding the notification off the screen. In some embodiments, the user can cause the notification to cease displaying, without waiting for the time threshold, by performing a gesture or other user input dismissing the notification. For example, a user could perform a gesture to swipe the notification away from display, thus causing the notification to slide off the screen. In some embodiments, after ceasing display of the notification, the electronic device receives (1948), via the one or more input devices, an input corresponding to a request to display a notification user interface on the electronic device, such as in FIG. 18W. In some embodiments, the input is a user input requesting display of a notification drawer (e.g., notification tray) of the operating system of the electronic device which aggregates multiple notifications, including notifications that have timed out or have been manually dismissed by the user. For example, the user can perform a swipe-down gesture from the top or top-left of the touch screen to request display of the notification drawer. In some embodiments, in response to receiving the request to display the notification user interface, the electronic device displays (1950), on the display, the notification user interface, such as in FIGS. 18W-18X. In some embodiments, the notification drawer includes, among other notifications, the notification that has timed out or been dismissed. In some embodiments, the notification user interface includes the notification indicating that the downloading of the first application to the electronic device is complete (1952), such as in FIG. 18X. In some embodiments, the notification drawer includes the notification that the download has completed. In some embodiments, the notification drawer includes this notification either or both when the notification has timed out and ceased displaying and when the notification has been manually dismissed by the user. In some embodiments, the notification is selectable to display, on the display, the first application (1954), such as in FIG. 18Y. In some embodiments, the notification on the notification drawer is selectable to cause the first application to launch or otherwise be displayed. In some embodiments, the notification user interface has a similar look and feel as the wake screen user interface (e.g., except that the device is already unlocked and the user is already verified). In some embodiments, the notification in the notification drawer looks identical or similar to the notification that was originally displayed to the user.

The above-described manner of notifying the user of a completed download (e.g., by aggregating the notification in a notification drawer after the notification times out or is dismissed by the user) allows the electronic device to provide the user with status updates regarding the download status of the application being downloaded even after the initial notification is no longer displayed (e.g., by storing the notification in the notification drawer such that the user can manually request to view his or her notifications in one user interface), which simplifies the interaction between the user and the electronic device and enhances the operability of the electronic device and makes the user-device interface more efficient (e.g., by displaying a notification when the user requests to view the notification, even if the user has previously dismissed the notification or if the user has previously missed the notification, without requiring the user to navigate to a different user interface to determine whether the download is completed), which additionally reduces power usage and improves battery life of the electronic device by enabling the user to use the electronic device more quickly and efficiently.

It should be understood that the particular order in which the operations in FIGS. 19A-19D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, and 1700) are also applicable in an analogous manner to method 1900 described above. For example, the operation of the electronic device in providing notifications of the completion of a download described above with reference to method 1900 optionally has one or more of the characteristics of an application store that are specific to a respective application, user interfaces of an application store that include information about a respective category of applications, user interfaces of an application store for accessing a respective category of applications, visual indications of the number of available updates, user interfaces of an electronic device for launching and removing a respective application, user interfaces of a generic application store and a dedicated application store for a respective category of applications, etc., described herein with reference to other methods described herein (e.g., methods 700, 900, 1100, 1300, 1500, and 1700). Furthermore, the application store(s) described with reference to method 1900 above optionally has one or more of the features of the application store(s) described with reference to methods 700, 900, 1100, 1300, 1500, and 1700. For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5K) or application specific chips. Further, the operations described above are, optionally, implemented by components depicted in FIGS. 1A-1B. For example, displaying operations 1902, 1910, 1916, 1932, 1938, 1946, receiving operations 1904, 1914, 1926, and initiating operations are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content and/or subscription and non-subscription applications that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display device and one or more input devices:
displaying, via the display device, a product page user interface for a subscription application, wherein the product page user interface is a user interface of an application store application, wherein the application store application is an application from which access to subscription applications and non-subscription applications can be purchased, wherein access to download the subscription application is provided via a subscription service that provides access to download a plurality of subscription applications, including the subscription application, and wherein the product page user interface includes a selectable option associated with the subscription application;
while displaying the product page user interface and while the user of the electronic device is subscribed to the subscription service that enables access to download the subscription application, receiving, via the one or more input devices, an indication of a selection of the selectable option; and
in response to receiving the indication of the selection of the selectable option,
initiating a process to access the subscription application without initiating the process for providing payment to access the subscription application;
wherein:
the product page user interface is displayed with a header region on the display device, overlaid on the product page user interface, that remains at a location on the display device as the user scrolls through the product page,
while a current scroll position in the product page is a first scroll position, the header region is displayed with a first appearance and includes a first selectable option for performing a first function that has a first visual characteristic, and
while the current scroll position in the product page is a second scroll position, different than the first scroll position, the header region is displayed with a second appearance, different than the first appearance, and includes a second selectable option for performing the first function that has a second visual characteristic, different than the first visual characteristic.

2. The method of claim 1, wherein:
while displaying the product page user interface while user of the electronic device is not subscribed to the subscription service that enables access to download the subscription application, the header region having the second appearance includes a third selectable option for initiating the process for subscribing to the subscription service, and
while displaying the product page user interface while the user of the electronic device is subscribed to the subscription service that enables access to download the subscription application, the header region having the second appearance includes a fourth selectable option for initiating the process to access the subscription application without initiating the process for subscribing to the subscription service.

3. The method of claim 1, wherein the first function is a backward navigation function in the application store application, the first selectable option for performing the first function that has the first visual characteristic has a first size, and the second selectable option for performing the first function that has the second visual characteristic has a second size, larger than the first size.

4. The method of claim 1, further comprising:
while displaying, via the display device, the product page user interface, receiving, via the one or more input devices, an input corresponding to a request to download the subscription application to the electronic device; and
in response to receiving the input corresponding to the request to download the subscription application to the electronic device:
initiating a process to download the subscription application to the electronic device; and
displaying, via the display device, one or more representations of one or more editorial stories related to the subscription application while the subscription application is being downloaded to the electronic device, wherein the one or more representations of the one or more editorial stories are selectable to display the one or more editorial stories via the display device.

5. The method of claim 4, wherein the one or more editorial stories related to the subscription application include a first set of one or more editorial stories related to the subscription application, and a second set of one or more editorial stories related to one or more other applications based on the subscription application, the method further comprising:
while displaying the one or more representations of the one or more editorial stories related to the subscription application, receiving, via the one or more input devices, an input corresponding to a request to scroll through the one or more representations of the one or more editorial stories related to the subscription application; and
in response to receiving the input corresponding to the request to scroll through the one or more representations of the one or more editorial stories, scrolling through the one or more representations of the one or more editorial stories to reveal, via the display device, a first set of the one or more editorial stories that were not previously displayed via the display device.

6. The method of claim 1, further comprising:
while displaying, via the display device, the product page user interface, receiving, via the one or more input devices, an input corresponding to a request to download the subscription application to the electronic device; and
in response to receiving the input corresponding to the request to download the subscription application to the electronic device:

initiating a process to download the subscription application to the electronic device; and displaying, via the display device, video content corresponding to the subscription application while the subscription application is being downloaded to the electronic device.

7. The method of claim 6, further comprising:

determining that the downloading of the subscription application to the electronic device is complete; and in response to determining that the downloading of the subscription application to the electronic device is complete, automatically displaying, via the display device, the subscription application.

8. An electronic device, comprising:

one or more processors;

memory; and one or more programs, wherein the one or more programs are stored in the memory and configured to be executed by the one or more processors, the one or more programs including instructions for:

displaying, via a display device, a product page user interface for a subscription application, wherein the product page user interface is a user interface of an application store application, wherein the application store application is an application from which access to subscription applications and non-subscription applications can be purchased, wherein access to download the subscription application is provided via a subscription service that provides access to download a plurality of subscription applications, including the subscription application, and wherein the product page user interface includes a selectable option associated with the subscription application;

while displaying the product page user interface, receiving, via the one or more input devices, an indication of a selection of the selectable option; and in response to receiving the indication of the selection of the selectable option:

in accordance with a determination that the subscription application is a subscription application and the product page user interface is a product page user interface for the subscription application:

in accordance with a determination that the user of the electronic device is subscribed to the subscription service that enables access to download the subscription application, initiating a process to access the subscription application without initiating the process for providing payment to access the subscription application, wherein:

the product page user interface is displayed with a header region on the display device, overlaid on the product page user interface, that remains at a location on the display device as the user scrolls through the product page, in accordance with a determination that a current scroll position in the product page is a first scroll position, the header region is displayed with a first appearance and includes a first selectable option for performing a first function that has a first visual characteristic, and in accordance with a determination that the current scroll position in the product page is a second scroll position, different than the first scroll position, the header region is displayed with a second appearance, different than the first appearance, and includes a second selectable option for performing the first function that has a second visual characteristic, different than the first visual characteristic.

9. The electronic device of claim 8, wherein:

while displaying the product page user interface while user of the electronic device is not subscribed to the subscription service that enables access to download the subscription application, the header region having the second appearance includes a third selectable option for initiating the process for subscribing to the subscription service, and while displaying the product page user interface while the user of the electronic device is subscribed to the subscription service that enables access to download the subscription application, the header region having the second appearance includes a fourth selectable option for initiating the process to access the subscription application without initiating the process for subscribing to the subscription service.

10. The electronic device of claim 8, wherein the first function is a backward navigation function in the application store application, the first selectable option for performing the first function that has the first visual characteristic has a first size, and the second selectable option for performing the first function that has the second visual characteristic has a second size, larger than the first size.

11. The electronic device of claim 8, wherein the one or more programs further include instructions for:

while displaying, via the display device, the product page user interface, receiving, via the one or more input devices, an input corresponding to a request to download the subscription application to the electronic device; and in response to receiving the input corresponding to the request to download the subscription application to the electronic device:

initiating a process to download the subscription application to the electronic device; and displaying, via the display device, one or more representations of one or more editorial stories related to the subscription application while the subscription application is being downloaded to the electronic device, wherein the one or more representations of the one or more editorial stories are selectable to display the one or more editorial stories via the display device.

12. The electronic device of claim 8, wherein the one or more programs further include instructions for:

while displaying, via the display device, the product page user interface, receiving, via the one or more input devices, an input corresponding to a request to download the subscription application to the electronic device; and in response to receiving the input corresponding to the request to download the subscription application to the electronic device:

initiating a process to download the subscription application to the electronic device; and displaying, via the display device, video content corresponding to the subscription application while the subscription application is being downloaded to the electronic device.

13. The electronic device of claim 12, wherein the one or more programs further include instructions for:

determining that the downloading of the subscription application to the electronic device is complete; and in response to determining that the downloading of the subscription application to the electronic device is complete, automatically displaying, via the display device, the subscription application.

14. A non-transitory computer readable storage medium storing one or more programs, the one or more programs comprising instructions, which when executed by one or more processors of an electronic device, cause the electronic device to:
- display, via the display device, a product page user interface for a subscription application, wherein the product page user interface is a user interface of an application store application, wherein the application store application is an application from which access to subscription applications and non-subscription applications can be purchased, wherein access to download the subscription application is provided via a subscription service that provides access to download a plurality of subscription applications, including the subscription application, and wherein the product page user interface includes a selectable option associated with the subscription application;
- while displaying the product page user interface, receive, via the one or more input devices, an indication of a selection of the selectable option; and
- in response to receiving the indication of the selection of the selectable option:
  - in accordance with a determination that the subscription application is a subscription application and the product page user interface is a product page user interface for the subscription application:
    - in accordance with a determination that the user of the electronic device is subscribed to the subscription service that enables access to download the subscription application, initiate a process to access the subscription application without initiating the process for providing payment to access the subscription application,
  - wherein:
    - the product page user interface is displayed with a header region on the display device, overlaid on the product page user interface, that remains at a location on the display device as the user scrolls through the product page,
    - in accordance with a determination that a current scroll position in the product page is a first scroll position, the header region is displayed with a first appearance and includes a first selectable option for performing a first function that has a first visual characteristic, and
    - in accordance with a determination that the current scroll position in the product page is a second scroll position, different than the first scroll position, the header region is displayed with a second appearance, different than the first appearance, and includes a second selectable option for performing the first function that has a second visual characteristic, different than the first visual characteristic.

15. The non-transitory computer readable storage medium of claim 14, wherein:
- while displaying the product page user interface while user of the electronic device is not subscribed to the subscription service that enables access to download the subscription application, the header region having the second appearance includes a third selectable option for initiating the process for subscribing to the subscription service, and
- while displaying the product page user interface while the user of the electronic device is subscribed to the subscription service that enables access to download the subscription application, the header region having the second appearance includes a fourth selectable option for initiating the process to access the subscription application without initiating the process for subscribing to the subscription service.

16. The non-transitory computer readable storage medium of claim 14, wherein the first function is a backward navigation function in the application store application, the first selectable option for performing the first function that has the first visual characteristic has a first size, and the second selectable option for performing the first function that has the second visual characteristic has a second size, larger than the first size.

17. The non-transitory computer readable storage medium of claim 14, wherein the header region having the first appearance is overlaid on video content, in the product page user interface, corresponding to the subscription application, and the product page user interface further includes information about the subscription application overlaid on the video content.

18. The non-transitory computer readable storage medium of claim 14, wherein the product page user interface includes information about the subscription application overlaid on video content corresponding to the subscription application.

19. The non-transitory computer readable storage medium of claim 18, wherein the information overlaid on the video content includes the selectable option and an image of an icon for the subscription application.

20. The non-transitory computer readable storage medium of claim 18, wherein the information about the subscription application is overlaid on a first portion of the video content, and the first portion of the video content is a modified version of a second portion of the video content, different than the first portion.

21. The non-transitory computer readable storage medium of claim 14, wherein the product page user interface includes horizontally scrollable information about the subscription application that is displayed below the selectable option.

22. The non-transitory computer readable storage medium of claim 14, wherein the product page user interface further includes a section with one or more representations of one or more editorial stories related to the subscription application, and the one or more representations of the one or more editorial stories are selectable to display the one or more editorial stories via the display device.

23. The non-transitory computer readable storage medium of claim 22, wherein:
- while a state of progression of the user through the subscription application is a first state of progression, the one or more stories include a first set of stories and not a second set of stories, and
- while the state of progression of the user through the subscription application is a second state of progression, different than the first state of progression, the one or more stories include the second set of stories and not the first set of stories.

24. The non-transitory computer readable storage medium of claim 14, wherein the one or more programs further cause the electronic device to:
- while displaying, via the display device, the product page user interface, receive, via the one or more input devices, an input corresponding to a request to download the subscription application to the electronic device; and in response to receiving the input corresponding to the request to download the subscription application to the electronic device:
   initiate a process to download the subscription application to the electronic device; and
   display, via the display device, one or more representations of one or more editorial stories related to the subscription application while the subscription application is being downloaded to the electronic device, wherein the one or more representations of the one or more editorial stories are selectable to display the one or more editorial stories via the display device.

25. The non-transitory computer readable storage medium of claim 24, wherein the one or more programs further cause the electronic device to:
  determine that the downloading of the subscription application to the electronic device is complete; and
  in response to determining that the downloading of the subscription application to the electronic device is complete, automatically display, via the display device, the subscription application.

26. The non-transitory computer readable storage medium of claim 24, wherein the one or more programs further cause the electronic device to:
  while displaying the one or more representations of the one or more editorial stories related to the subscription application while the subscription application is being downloaded to the electronic device, receive, via the one or more input devices, an input corresponding to a request to display a first story of the one or more editorial stories; and
  in response to receiving the input corresponding to the request to display the first story:
   display, via the display device:
    the first story; and
    a download information region overlaid on the first story, the download information region including information about the subscription application, and:
     while the subscription application is being downloaded to the electronic device, information about a download status of the subscription application; and
     after completion of the downloading of the subscription application to the electronic device, a selectable option that is selectable to display, via the display device, the subscription application.

27. The non-transitory computer readable storage medium of claim 24, wherein the one or more editorial stories related to the subscription application include a first set of one or more editorial stories related to the subscription application, and a second set of one or more editorial stories related to one or more other applications based on the subscription application, wherein the one or more programs further cause the electronic device to:
  while displaying the one or more representations of the one or more editorial stories related to the subscription application, receive, via the one or more input devices, an input corresponding to a request to scroll through the one or more representations of the one or more editorial stories related to the subscription application; and
  in response to receiving the input corresponding to the request to scroll through the one or more representations of the one or more editorial stories, scroll through the one or more representations of the one or more editorial stories to reveal, via the display device, a first set of the one or more editorial stories that were not previously displayed via the display device.

28. The non-transitory computer readable storage medium of claim 14, wherein the one or more programs further cause the electronic device to:
  while displaying, via the display device, the product page user interface, receive, via the one or more input devices, an input corresponding to a request to download the subscription application to the electronic device; and
  in response to receiving the input corresponding to the request to download the subscription application to the electronic device:
   initiate a process to download the subscription application to the electronic device; and
   display, via the display device, video content corresponding to the subscription application while the subscription application is being downloaded to the electronic device.

29. The non-transitory computer readable storage medium of claim 28, wherein the one or more programs further cause the electronic device to:
  determine that the downloading of the subscription application to the electronic device is complete; and
  in response to determining that the downloading of the subscription application to the electronic device is complete, automatically display, via the display device, the subscription application.

30. The non-transitory computer readable storage medium of claim 14, wherein the one or more programs further cause the electronic device to:
  while displaying a product page user interface for a non-subscription application, display a section that includes information about reviews of the non-subscription application in the product page user interface for the non-subscription application, and
  while displaying the product page user interface for the subscription application, forgo displaying a section that includes the information about reviews of the subscription application.

\* \* \* \* \*